US011860782B2

(12) United States Patent
Hillel et al.

(10) Patent No.: US 11,860,782 B2
(45) Date of Patent: Jan. 2, 2024

(54) COMPENSATING FOR DRAM ACTIVATION PENALTIES

(71) Applicant: NeuroBlade Ltd., Tel Aviv (IL)

(72) Inventors: Eliad Hillel, Herzliya (IL); Elad Sity, Tel Aviv (IL); David Shamir, Tel Aviv (IL); Shany Braudo, Tel Aviv (IL)

(73) Assignee: NeuroBlade Ltd., Tel Aviv (IL)

( * ) Notice: Subject to any disclaimer, the term of this patent is extended or adjusted under 35 U.S.C. 154(b) by 0 days.

(21) Appl. No.: 17/668,240

(22) Filed: Feb. 9, 2022

(65) Prior Publication Data

US 2022/0164285 A1 May 26, 2022

Related U.S. Application Data

(63) Continuation of application No. PCT/IB2020/000665, filed on Aug. 13, 2020.

(Continued)

(51) Int. Cl.
*G06F 12/0802* (2016.01)
*G06F 12/06* (2006.01)

(Continued)

(52) U.S. Cl.
CPC ...... *G06F 12/0802* (2013.01); *G06F 12/0646* (2013.01); *G06F 12/1458* (2013.01);

(Continued)

(58) Field of Classification Search
CPC ............ G06F 12/0802; G06F 2212/60; G06F 2212/7202

(Continued)

(56) References Cited

U.S. PATENT DOCUMENTS

2003/0179637 A1* 9/2003 Elzur ...................... G11C 8/12 365/230.03
2005/0071536 A1* 3/2005 Osborne ............ G06F 13/1668 711/5

(Continued)

FOREIGN PATENT DOCUMENTS

WO WO 2019/025862 A1 2/2019
WO WO 2019/025864 A2 2/2019
WO WO 2020/049363 A2 3/2020

OTHER PUBLICATIONS

International Search Report issued in PCT International Application No. PCT/IB2020/000665, dated May 27, 2021 (14 pages).

(Continued)

*Primary Examiner* — Prasith Thammavong
*Assistant Examiner* — Sidney Li
(74) *Attorney, Agent, or Firm* — FINNEGAN, HENDERSON, FARABOW, GARRETT & DUNNER, LLP

(57) ABSTRACT

In some embodiments, an integrated circuit may include a substrate and a memory array disposed on the substrate, where the memory array includes a plurality of discrete memory banks. The integrated circuit may also include a processing array disposed on the substrate, where the processing array includes a plurality of processor subunits, each one of the plurality of processor subunits being associated with one or more discrete memory banks among the plurality of discrete memory banks. The integrated circuit may also include a controller configured to implement at least one security measure with respect to an operation of the integrated circuit and take one or more remedial actions if the at least one security measure is triggered.

18 Claims, 197 Drawing Sheets

Related U.S. Application Data

(60) Provisional application No. 62/983,174, filed on Feb. 28, 2020, provisional application No. 62/971,912, filed on Feb. 7, 2020, provisional application No. 62/907,659, filed on Sep. 29, 2019, provisional application No. 62/886,328, filed on Aug. 13, 2019.

(51) Int. Cl.

| | |
|---|---|
| ***G06F 12/14*** | (2006.01) |
| ***G06F 13/16*** | (2006.01) |
| ***G06F 15/78*** | (2006.01) |
| *G06F 12/0871* | (2016.01) |

(52) U.S. Cl.
CPC ...... *G06F 13/1657* (2013.01); *G06F 13/1668* (2013.01); *G06F 15/786* (2013.01); *G06F 2212/1056* (2013.01); *G06F 2212/60* (2013.01); *G06F 2212/7202* (2013.01)

(58) Field of Classification Search
USPC .......................................................... 711/118
See application file for complete search history.

(56) References Cited

U.S. PATENT DOCUMENTS

2009/0072856 A1* 3/2009 Subramaniam ..... G06F 13/1668 326/38
2012/0005421 A1 1/2012 Miura et al.
2012/0038952 A1* 2/2012 Cho .................... G06F 12/1081 358/1.16
2012/0102576 A1 4/2012 Chew
2012/0226888 A1* 9/2012 Rychlik .............. G06F 12/1027 711/207
2012/0255018 A1 10/2012 Sallam
2012/0291133 A1 11/2012 Nagpal et al.
2014/0040622 A1 2/2014 Kendall et al.
2014/0136915 A1 5/2014 Hyde et al.
2014/0143470 A1 5/2014 Dobbs et al.
2015/0089162 A1* 3/2015 Ahsan ................. G06F 13/1663 711/147
2015/0301757 A1* 10/2015 Iwata ...................... G06F 3/068 711/114
2015/0371689 A1* 12/2015 Li ....................... G06F 12/0875 711/105
2019/0102325 A1 4/2019 Natu et al.
2019/0370632 A1* 12/2019 Hashemi ............. G06F 12/0862
2020/0034054 A1* 1/2020 Zamsky ................ G06F 3/0659
2020/0081848 A1* 3/2020 Bae ....................... G06F 3/0656
2021/0020213 A1* 1/2021 Mirichigni ............ G06F 3/0683

OTHER PUBLICATIONS

Extended Search Report in Application No. 20852497.5-1224/4010808 PCT/IB2020000665 dated Oct. 13, 2023 (14 pages).
Stankovic et al., DRAM Controller with a Complete Predictor: Preliminary Results, XP010874696, Telsiks 2005, Serbia and Montenegro, Nis, Sep. 28-30, 2005 (4 pages).

* cited by examiner

3506

5140

5140(2)

5140(4)

5300

5350

9400

9011

9012

9019

10800

9010

9302

9303

11016'

11017'

11018'

11300

11350

Prior art

12010

COMPENSATING FOR DRAM ACTIVATION PENALTIES

CROSS REFERENCES TO RELATED APPLICATIONS

This application is a continuation of PCT International Application No. PCT/IB2020/000665, filed Aug. 13, 2020, which claims the benefit of priority of U.S. Provisional Application No. 62/886,328, filed on Aug. 13, 2019; U.S. Provisional Application No. 62/907,659, filed on Sep. 29, 2019; U.S. Provisional Application No. 62/971,912, filed on Feb. 7, 2020; and U.S. Provisional Application No. 62/983,174, filed on Feb. 28, 2020. The foregoing applications are incorporated herein by reference in their entirety.

BACKGROUND

Technical Field

The present disclosure relates generally to apparatuses for facilitating memory-intensive operations. In particular, the present disclosure relates to hardware chips that include processing elements coupled to dedicated memory banks. The present disclosure also relates to apparatuses for improving power efficiency and speed of memory chips. In particular, the present disclosure relates system and methods for implementing partial refreshes, or even no refreshes, on a memory chip. The present disclosure also relates to selectable-sized memory chips and dual-port capabilities on a memory chip.

Background Information

As processor speeds and memory sizes both continue to increase, a significant limitation on effective processing speeds is the von Neumann bottleneck. The von Neumann bottleneck results from throughput limitations resulting from conventional computer architecture. In particular, data transfer from memory to the processor is often bottlenecked compared to actual computations undertaken by the processor. Accordingly, the number of clock cycles to read and write from memory increases significantly with memory-intensive processes. These clock cycles result in lower effective processing speeds because reading and writing from memory consumes clock cycles that cannot be used for performing operations on data. Moreover, the computational bandwidth of the processor is generally larger than the bandwidth of the buses that the processor uses to access the memory.

These bottlenecks are particularly pronounced for memory-intensive processes, such as neural network and other machine learning algorithms; database construction, indexing searching, and querying; and other tasks that include more reading and writing operation than data processing operations.

Additionally, the rapid growth in volume and granularity of available digital data has created opportunities to develop machine learning algorithms and has enabled new technologies. However, it has also brought cumbersome challenges to the world of data bases and parallel computing. For example, the rise of social media and the Internet of Things (IoT) creates digital data at a record rate. This new data can be used to create algorithms for a variety of purposes, ranging from new advertising techniques to more precise control methods of industrial processes. However, the new data has been difficult to store, process, analyze and handle.

New data resources can be massive, sometimes in the order of peta- to zettabytes. Moreover, the growth rate of these data resources may exceed data processing capabilities. Therefore, data scientists have turned to parallel data processing techniques, to tackle these challenges. In an effort to increase computation power and handle the massive amount of data, scientists have attempted to create systems and methods capable of parallel intensive computing. But these existing systems and methods have not kept up with the data processing requirements, often because the techniques employed are limited by their demand of additional resources for data management, integration of segregated data, and analysis of the sectioned data.

To facilitate the manipulation of large data sets, engineers and scientists now seek to improve the hardware used to analyze data. For example, new semiconductor processors or chips (such as those described herein) may be designed specifically for data intensive tasks by incorporating memory and processing functions in a single substrate fabricated in technologies more fitting for memory operations rather than arithmetic computation. With integrated circuits specifically designed for data-intensive tasks, it is possible to meet the new data processing requirements. Nonetheless, this new approach to tackle data processing of large data sets requires solving new issues in chip design and fabrication. For instance, if the new chips designed for data intensive tasks are manufactured with fabrication techniques and architectures used for common chips, they would have a poor performance and/or unacceptable yields. In addition, if the new chips are designed to operate with current data handling methods, they will have poor performance because current methods can limit the chip's ability to handle parallel operations.

The present disclosure describes solutions for mitigating or overcoming one or more of the problems set forth above, among other problems in the prior art.

SUMMARY

In some embodiments, an integrated circuit may include a substrate and a memory array disposed on the substrate, where the memory array includes a plurality of discrete memory banks. The integrated circuit may also include a processing array disposed on the substrate, where the processing array includes a plurality of processor subunits, each one of the plurality of processor subunits being associated with one or more discrete memory banks among the plurality of discrete memory banks. The integrated circuit may also include a controller configured to implement at least one security measure with respect to an operation of the integrated circuit and take one or more remedial actions if the at least one security measure is triggered.

The disclosed embodiments may also include a method of securing an integrated circuit against tampering, where the method includes implementing, using a controller associated with the integrated circuit, at least one security measure with respect to an operation of the integrated circuit and taking one or more remedial actions if the at least one security measure is triggered, and wherein the integrated circuit includes: a substrate; a memory array disposed on the substrate, the memory array including a plurality of discrete memory banks, and a processing array disposed on the substrate, the processing array including a plurality of processor subunits, each one of the plurality of processor subunits being associated with one or more discrete memory banks among the plurality of discrete memory banks.

The disclosed embodiments may include an integrated circuit, comprising: a substrate; a memory array disposed on the substrate, the memory array including a plurality of discrete memory banks; a processing array disposed on the substrate, the processing array including a plurality of processor subunits, each one of the plurality of processor subunits being associated with one or more discrete memory banks among the plurality of discrete memory banks; and a controller configured to: implement at least one security measure with respect to an operation of the integrated circuit; wherein the at least one security measure includes duplicating a program code in at least two different memory portions.

In some embodiments, a distributed processor memory chip comprising a substrate, a memory array disposed on the substrate, a processing array disposed on the substrate, a first communication port, and a second communication port is provided. The memory array may include a plurality of discrete memory banks. The processing array can include a plurality of processor subunits, each one of the plurality of processor subunits being associated with one or more discrete memory banks from among the plurality of discrete memory banks. The first communication port can be configured to establish a communication connection between the distributed processor memory chip and an external entity other than another distributed processor memory chip. The second communication port can be configured to establish a communication connection between the distributed processor memory chip and a first additional distributed processor memory chip.

In some embodiments, a method of transferring data between a first distributed processor memory chip and a second distributed processor memory chip may include: determining, using a controller associated with at least one of the first distributed processor memory chip and the second distributed processor memory chip, whether a first processor subunit among a plurality of processor subunits disposed on the first distributed processor memory chip is ready to transfer data to a second processor subunit included in the second distributed processor memory chip; and using a clock enable signal, controlled by the controller, to initiate a transfer of the data from the first processor subunit to the second processor subunit after determining that the first processor subunit is ready to transfer the data to the second processor subunit.

In some embodiments, a memory unit may include: a memory array including a plurality of memory banks; at least one controller configured to control at least one aspect of read operations relative to the plurality of memory banks; at least one zero value detection logic unit configured to detect a multi-bit zero value stored in a particular address of the plurality of memory banks; and wherein the at least one controller and the at least one zero value detection logic unit are configured to return a zero value indicator to one or more circuits outside the memory unit in response to a zero value detection by the at least one zero value detection logic.

Some embodiments may include a method for detecting a zero value in a particular address of a plurality of discrete memory banks, comprising: receiving, from a circuit outside a memory unit, a request to read data stored in an address of a plurality of discrete memory banks; activating, in response to the received request, a zero value detection logic unit to detect a zero value in the received address by a controller and transmitting, by the controller, a zero value indicator to the circuit in response to the zero value detection by the zero value detection logic unit.

Some embodiments may include a non-transitory computer-readable medium storing a set of instructions that are executable by a controller of a memory unit to cause the memory unit to detect a zero value in a particular address of a plurality of discrete memory banks, the method comprising: receiving, from a circuit outside a memory unit, a request to read data stored in an address of a plurality of discrete memory banks; activating, in response to the received request, a zero value detection logic unit to detect a zero value in the received address by a controller; and transmitting, by the controller, a zero value indicator to the circuit in response to the zero value detection by the zero value detection logic unit.

In some embodiments, a memory unit may include: one or more memory banks; a bank controller, and an address generator; wherein the address generator is configured to provide to the bank controller a current address in a current row to be accessed in an associated memory bank, determine a predicted address of a next row to be accessed in the associated memory bank, and provide the predicted address to the bank controller before completion of a read operation relative to the current row associated with the current address.

In some embodiments, a memory unit may include: one or more memory banks, wherein each of the one or more memory banks includes a plurality of rows, a first row controller configured to control a first subset of the plurality of rows, a second row controller configured to control a second subset of the plurality of rows, a single data input to receive data to be stored in the plurality of rows, and a single data output to provide data retrieved from the plurality of rows.

In some embodiments, a distributed processor memory chip may include: a substrate; a memory array disposed on the substrate, the memory array including a plurality of discrete memory banks; a processing array disposed on the substrate, the processing array including a plurality of processor subunits, each one of the processor subunits being associated with a corresponding, dedicated one of the plurality of discrete memory banks; a first plurality of buses, each connecting one of the plurality of processor subunits to its corresponding, dedicated memory bank; and a second plurality of buses, each connecting one of the plurality of processor subunits to another of the plurality of processor subunits. At least one of the memory banks may include at least one DRAM memory mat disposed on the substrate. At least one of the processor units may include one or more logic components that are associated with the at least one memory mat. The at least one memory mat and the one or more logic components may be configured to serve as a cache for one or more of the plurality of processing subunits.

In some embodiments, a method of executing at least one instruction in a distributed processor memory chip may include: retrieving one or more data values from a memory array of the distributed processor memory chip; storing the one or more data values in a register formed in a memory mat of the distributed processor memory chip; and accessing the one or more data values stored in the register according to at least one instruction executed by a processor element; wherein the memory army includes a plurality of discrete memory banks disposed on a substrate; wherein the processor element is a processor subunit from among a plurality of processor subunits included in a processing array disposed on the substrate, wherein each one of the processor subunits is associated with a corresponding, dedicated one of the plurality of discrete memory banks; and wherein the register is provided by a memory mat disposed on the substrate.

Some embodiments may include a device that comprises a substrate; a processing unit disposed on the substrate; and a memory unit disposed on the substrate, wherein the memory unit is configured to store data to be accessed by the processing unit, and wherein the processing unit comprises a memory mat that is configured to serve as a cache for the processing unit.

Processing systems are expected to process increasing amounts of information at very high rate. For example—fifth generation (5G) mobile internet networks are expected to receive vast amounts of information streams and process these information streams at an increasing rate.

The processing system may include one or more buffers and a processor. The processing operations applied by the processor may have a certain latency and this may require vast buffers. Vast buffers may be costly and/or area consuming.

The transfer of vast amount of information from the buffers to the processor may require high bandwidth connectors and/or high-bandwidth buses between the buffers and the processor—which also may increase the cost and area of the processing system.

There is a growing need to provide an efficient processing system.

Processing systems are expected to process increasing amounts of information at very high rate. For example—fifth generation (5G) mobile internet networks are expected to receive vast amounts of information streams and process these information streams at an increasing rate.

The processing system may include one or more buffers and a processor. The processing operations applied by the processor may have a certain latency and this may require vast buffers. Vast buffers may be costly and/or area consuming.

The transfer of vast amount of information from the buffers to the processor may require high bandwidth connectors and/or high-bandwidth buses between the buffers and the processor—which also may increase the cost and area of the processing system.

There is a growing need to provide an efficient processing system.

A disaggregated server includes multiple subsystems, whereas each subsystems has a unique role. For example, a disaggregated server may include one or more switching subsystems, one or more computing subsystems, and one or more storage subsystems.

The one or more computing subsystems and one or more storage subsystems are coupled to each other via the one or more switching subsystems.

A computing subsystem may include multiple computing units.

A switching subsystem may include multiple switching units.

A storage subsystem may include multiple storage units.

The bottleneck of such a disaggregated server lies in the bandwidth required for transferring information between the subsystems.

This is especially true when performing distributed calculations that require to share information units between all (or at least a substantial part of) the computing units (such as graphic processing units) of the different computing subsystems.

Assuming that there are N computing units that participate in the sharing, that N is a very large integer (for example—at least 1024), and that each one of the N computing units has to send (and receive) an information unit to (and from) all other computing units. Under these assumptions there is a need to perform an order of N×N transfer processes of information units. The large number of transfer processes is time and energy consuming and will dramatically limit the throughput of the disaggregated server.

There is a growing need to provide an efficient disaggregated server and an efficient manner of performing distributed processing.

Databases include many entries that include multiple fields. Database processing usually included executing one or more queries that include one or more filtering parameter (for example identity one or more relevant fields and one or more relevant field values) and also include one or more operation parameters that may determine a type of operation to be executed, a variable or constant to be used when applying the operation, and the like.

For example—a database query may request to perform a statistical operation (operational parameter) on all records of the database in which a certain field has a value within a predefined range (filtering parameter). Yet for another example—a database query may request to delete (operation parameter) records that have a certain field that is smaller than a threshold (filtering parameter).

A large database is usually stored in storage devices. In order to respond to a query, the database is sent to a memory unit—usually one database segment after the other.

The entries of the database segments are sent from the memory unit to a processor that does not belong to the same integrated circuit as the memory unit. The entries are then processed by the processor.

For each database segment of the database stored in the memory unit the processing includes the following steps: (i) selecting a record of the database segment, (ii) sending the record to the processor from the memory unit, (iii) filtering the record by the processor to determine whether the record is relevant, and (iv) performing one or more additional operations (summing, applying any other mathematical and/or statistical operation) on the relevant records.

The filtering process ends after all the records were sent to the processor and the processor determined which records were relevant.

In case where the relevant entries of a database segment are not stored in the processor—then there is a need to send these relevant records to the processor to be further processed (applying the operation that follows the processing) after the filtering stage.

When multiple processing operations follow a single filtering then the results of each operation may be sent to the memory unit and then sent again to the processor.

This process is bandwidth and time consuming.

There is a growing need to provide an efficient manner to perform database processing.

Word embedding is the collective name for a set of language modeling and feature learning techniques in natural language processing (NLP) where words or phrases from the vocabulary are mapped to vectors of elements. Conceptually it involves a mathematical embedding from a space with many dimensions per word to a continuous vector space with a much lower dimension (www.wikipedia.org).

Methods to generate this mapping include neural networks, dimensionality reduction on the word co-occurrence matrix, probabilistic models, explainable knowledge base method, and explicit representation in terms of the context in which words appear.

Word and phrase embeddings, when used as the underlying input representation, have been shown to boost the performance in NLP tasks such as syntactic parsing and sentiment analysis.

A sentence may be segmented to words or phrases and each segment may be represented by a vector. A sentence may be represented by a matrix that includes all the vectors that represents the words or phrases of the sentence.

A vocabulary that maps the words to the vectors may be stored in a memory unit (such as a dynamic random access memory (DRAM) that may be accessed using a word or a phrase (or an index representing the word).

The accesses may be random accesses which reduces the throughput of the DRAM. In addition—the accesses may saturate the DRAM—especially when a large number of accesses are fed to the DRAM.

Especially—the words that are included in a sentence are usually quite random. Accessing DRAM memories that store the mapping, even when using DRAM bursts will usually result in a lower performance of a random access—because usually only one of a small fraction of the DRAM memory bank entry (out of the multiple entries of different memory banks that are concurrently accessed) during a burst will store entries that are relevant to a certain sentence.

Accordingly—the throughput of the DRAM memory is low and non-continuous.

Each word or phrase of a sentence is retrieved from the DRAM memory under the control of a host computer that is external to integrated circuit of the DRAM memory—and has to control each retrieval of each vector representing each word or segments based on knowledge of the location of the words—which is a time and resource consuming task.

Data centers and other computerized systems are expected to process and exchange increasing amounts of information at very high rate.

The exchange of increasing amounts of data may be the bottleneck of data centers and other computerized systems—and may cause such data centers and other computerized systems to utilize only a fraction of their capabilities.

FIG. 96A illustrates an example of a prior art database 12010 and a prior art server mother board 12011. The database may include multiple servers, each server includes multiple server motherboards (also denoted "CPU+Memory+Network). Each server motherboard 12011 include a CPU 12012 (such as but not limited to XEON of INTEL) that receives traffic, is connected to a memory unit 12013 (denoted RAM) and to multiple data base accelerators (DB accelerator) 12014.

The DB accelerators are optional and the DB acceleration operations may be performed by the CPU 12012.

All traffic flows through the CPU and the CPU may be coupled to the DB accelerators through links of relatively limited bandwidth such as PCIe.

A large amount of resources are dedicated to routing information units between the multiple server motherboards.

There is a growing need to provide efficient data centers and other computerized systems.

The size of artificial intelligence (AI) applications such as neural network is dramatically increasing. In order to cope with the increasing sizes of neural networks, multiple servers, each as AI acceleration servers (that include server motherboards) are used to perform neural network processing tasks such as but not limited to training. An example of a system that includes multiple AI acceleration servers arranged in different racks is shown in FIG. 1.

In a typical training session very number of images are processed concurrently to provide a vast number of values such as losses. The vast number of values are conveyed between the different AI acceleration servers and results in an exceptional amount of traffic. For example—some neural network layers may be computed across multiple GPUS located in different AI acceleration servers and aggregation over the network that is bandwidth consuming may be required.

The transfer of the exceptional amount of traffic requires ultra-high bandwidth that may be non-feasible or may not be cost effective.

FIG. 97A illustrates a system 12050 that include sub-systems, each sub-system includes a switch 12051 for connecting AI acceleration servers 12052 having server motherboards 12055 that includes a RAM memory (RAM 12056), a central processing unit (CPU) 12054, a network interface card (NIC) 12053, whereas the CPU 12054 is connected (via PCIe bus) to multiple AI accelerators 12057 (such as graphic processing units. AI chips (AI ASIC), FPGAs and the like). The NICs are coupled to each other (for example by one or more switches) by a network (using for example Ethernet, UDP links, and the like) and these NICs may be able to convey the ultra-high bandwidth required by the system.

There is a growing need to provide an efficient AI computing system.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 78 is a diagrammatic representation of an elliptical array of processing groups consistent with the disclosed embodiments.

Figure 87A:
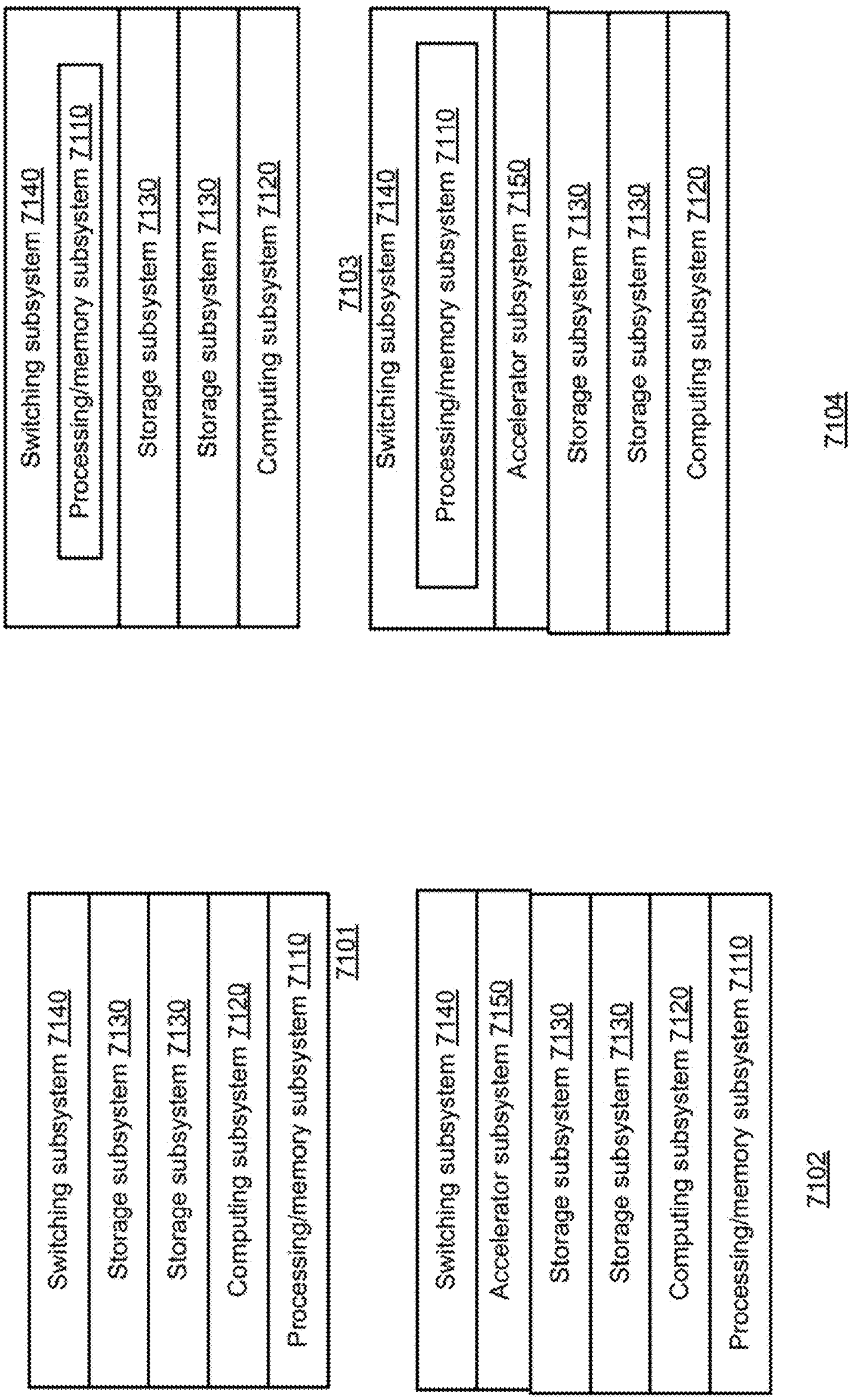
Figure 87B:
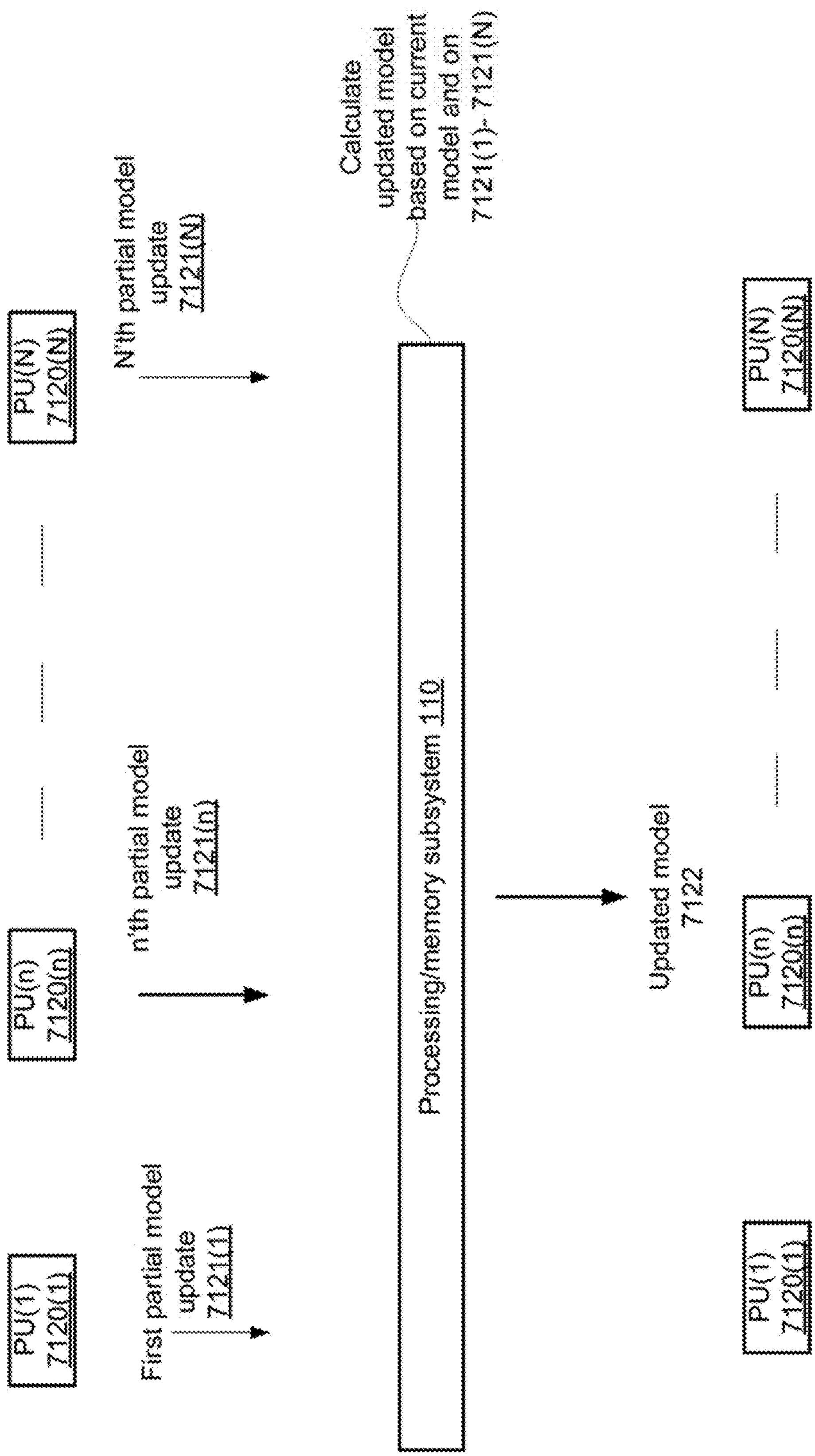
Figure 87C:
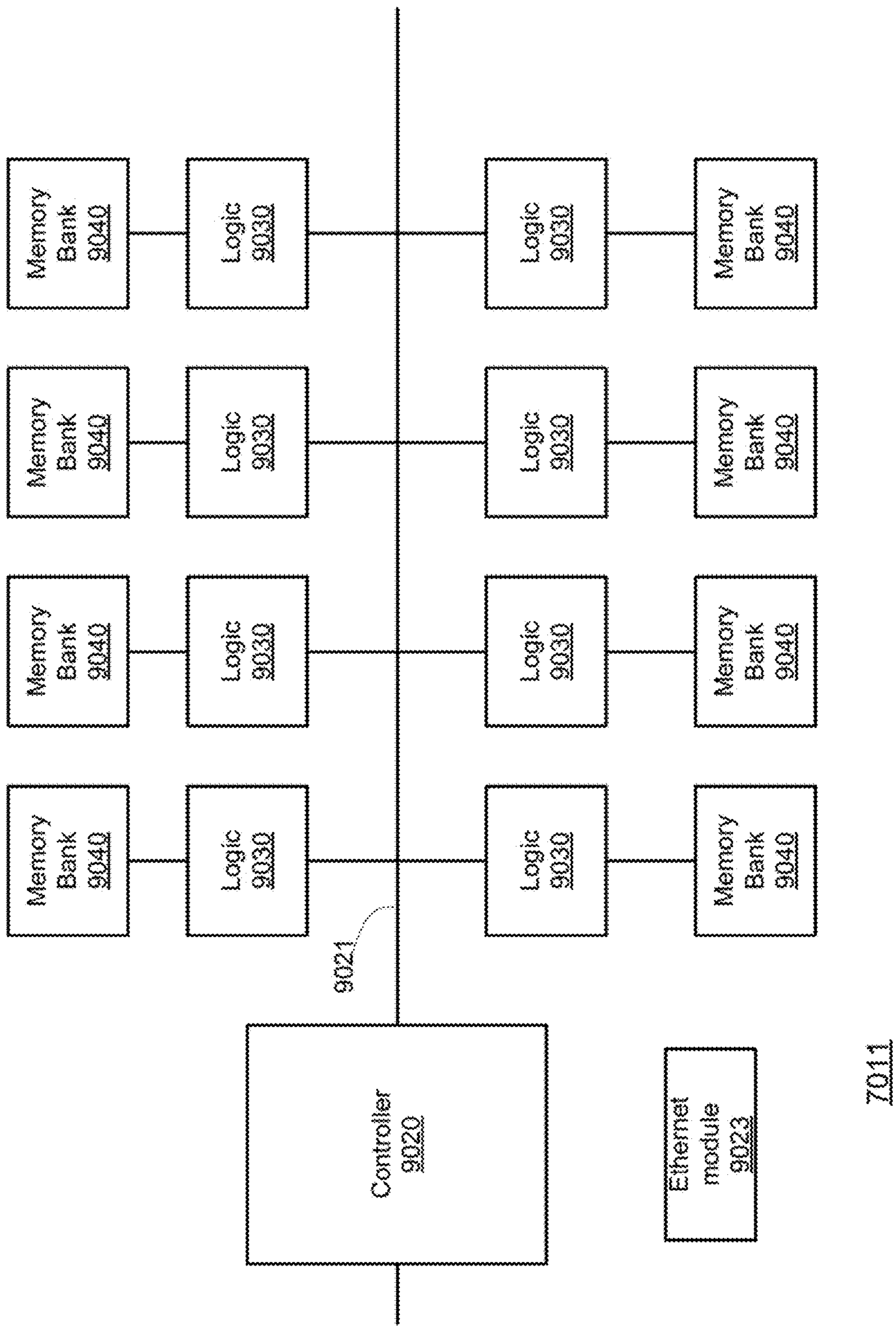
Figure 87D:
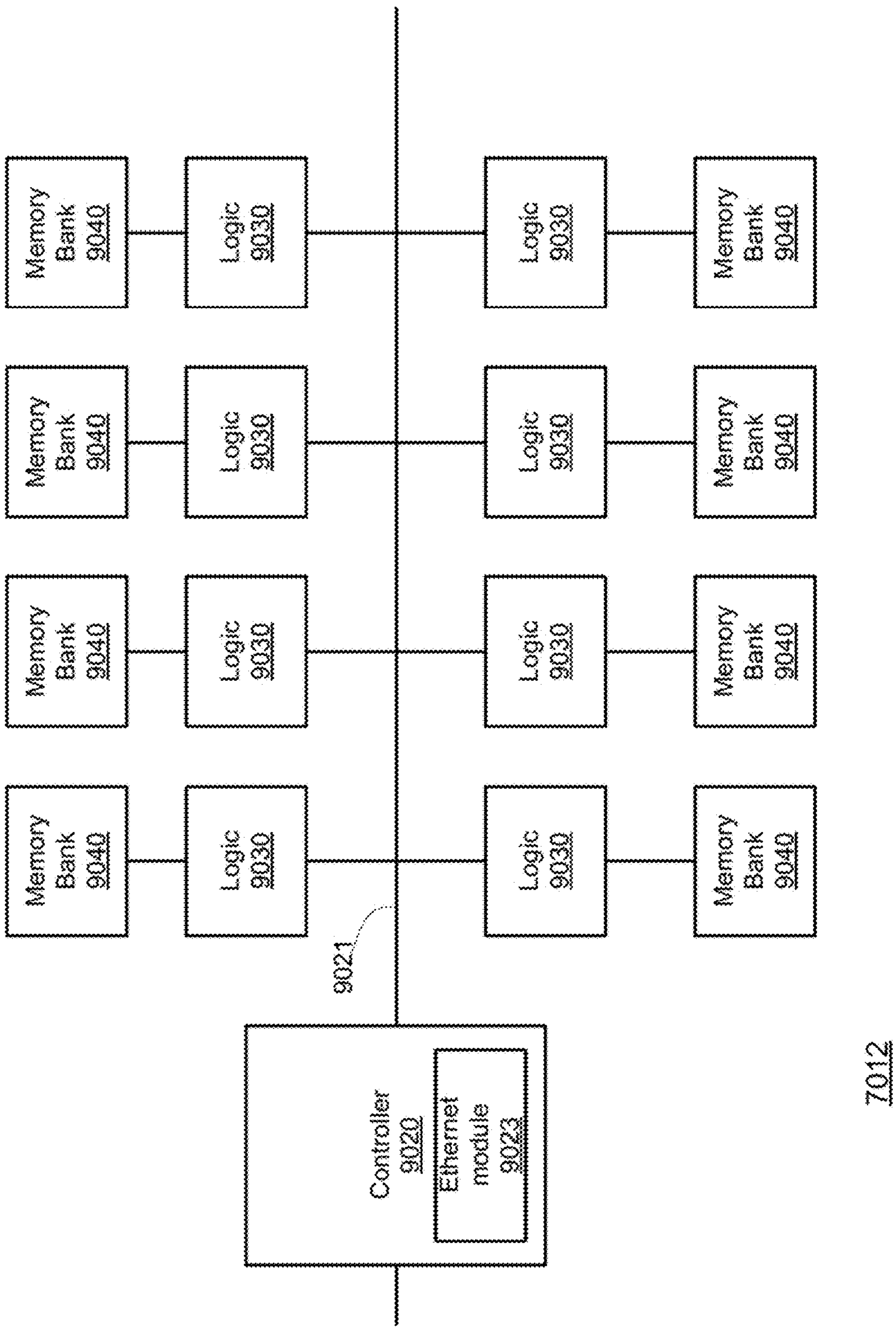
Figure 87E:
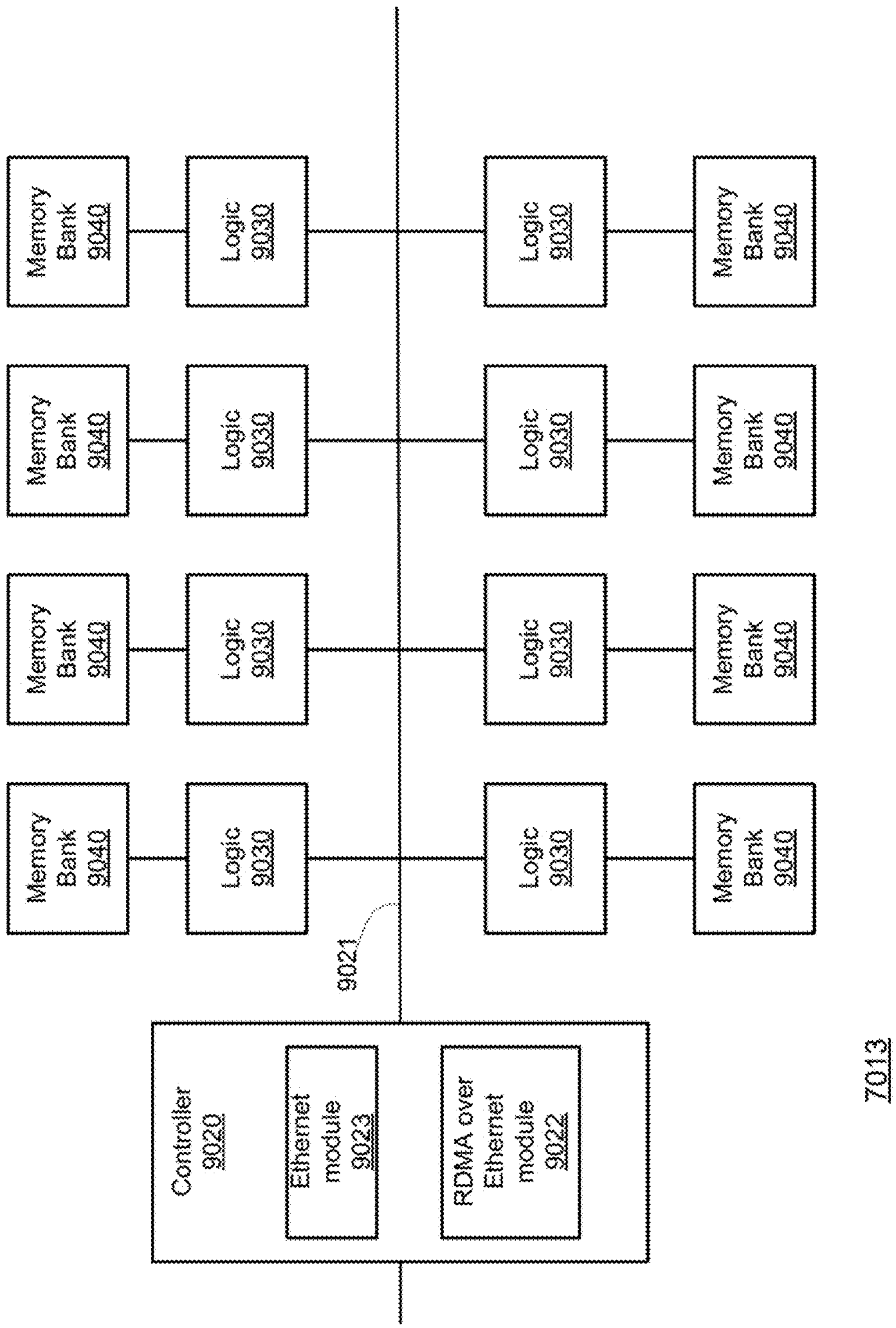
Figure 87F:
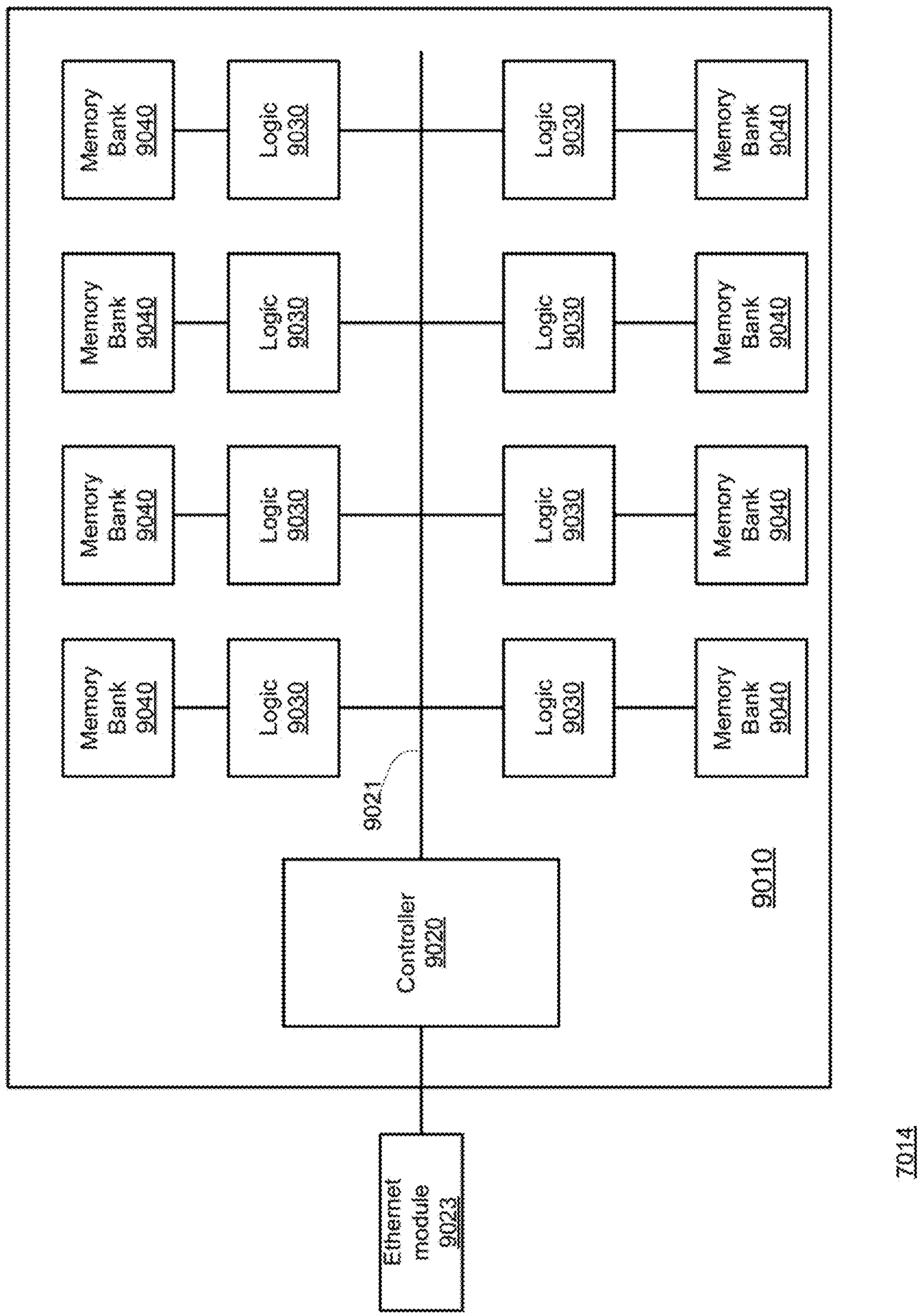
Figure 87G:
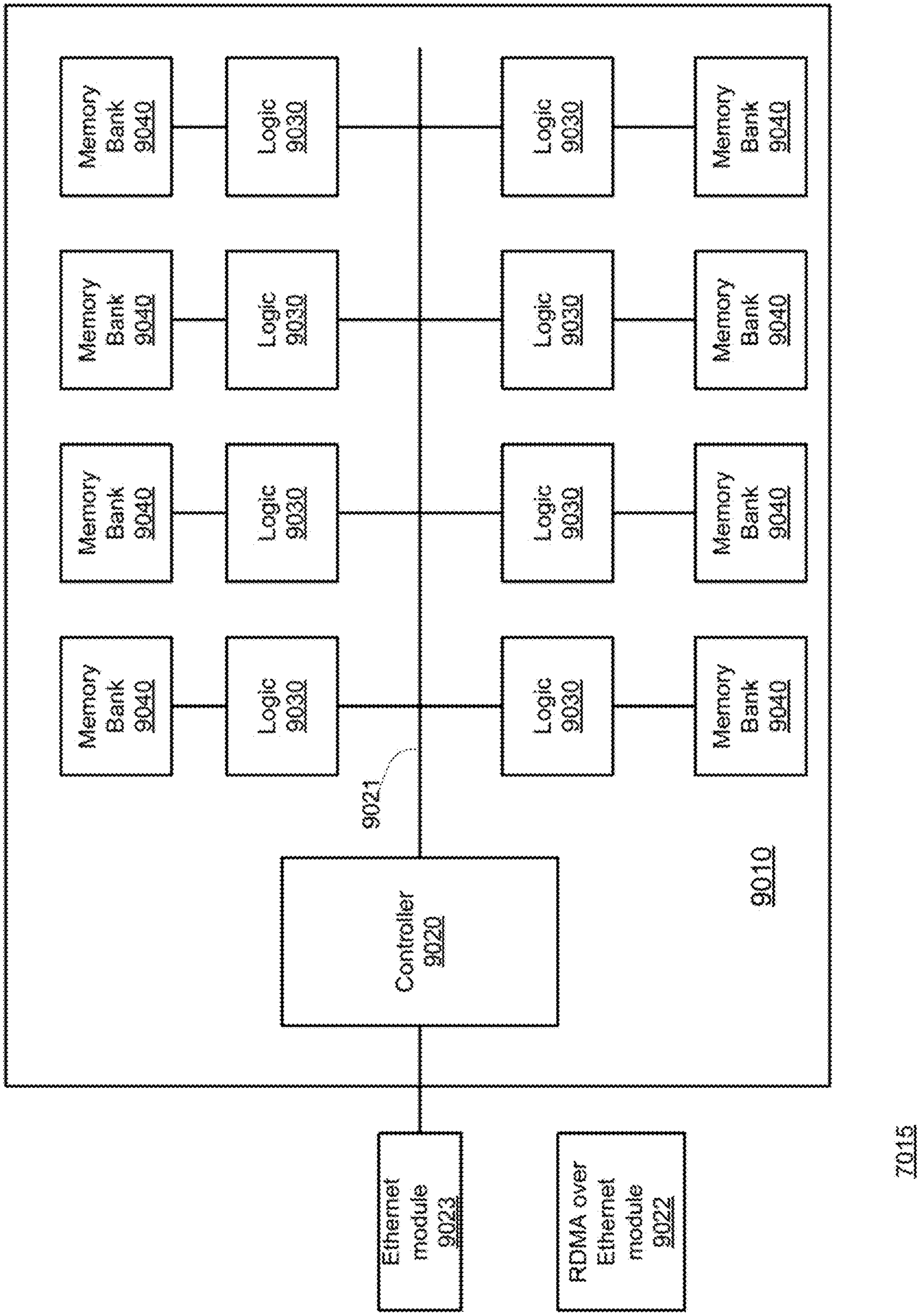
Figure 87H:
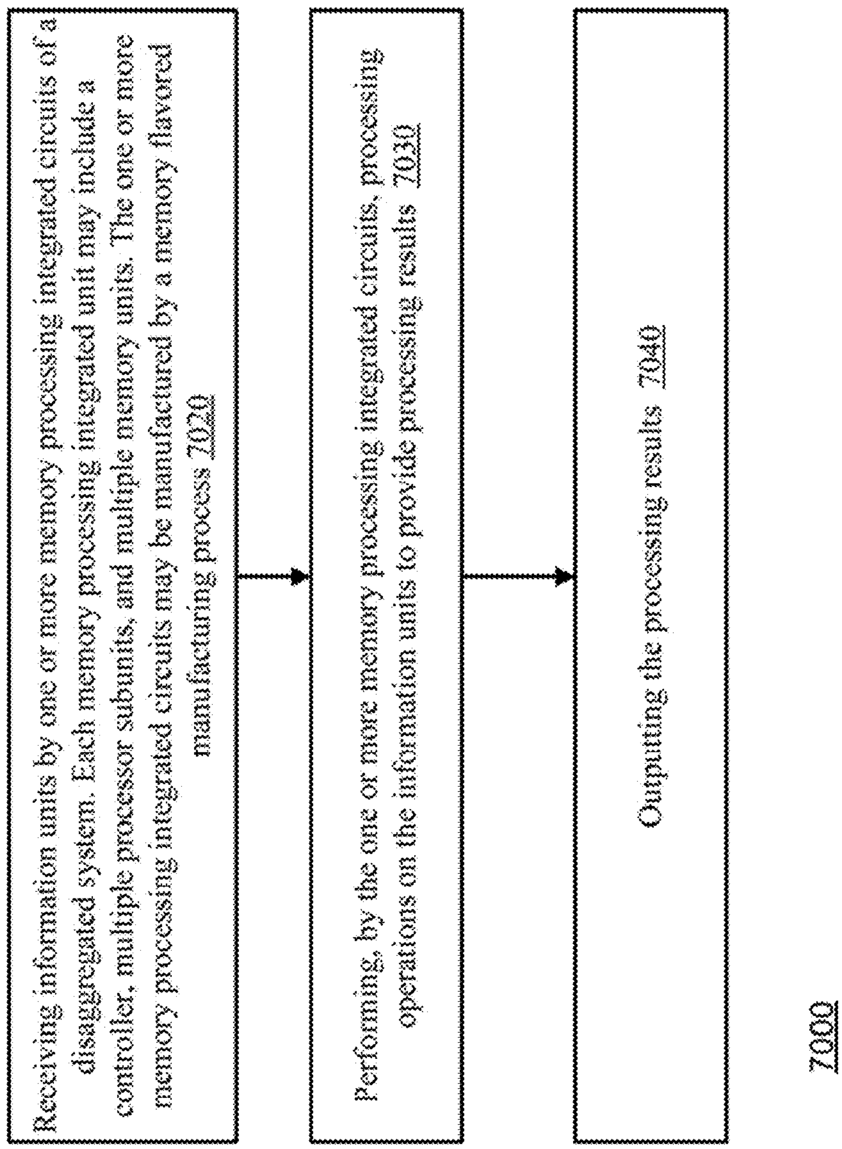
Figure 87I:
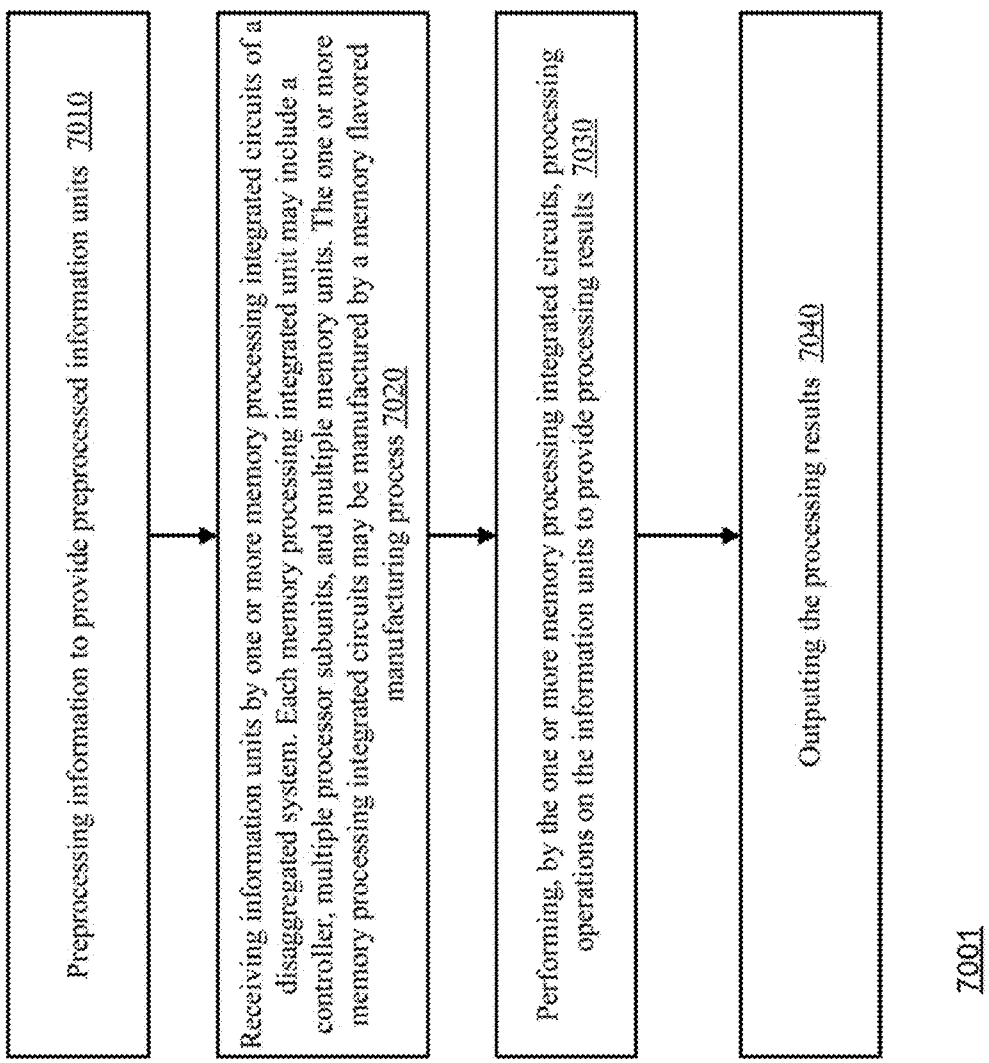
Figure 88A:
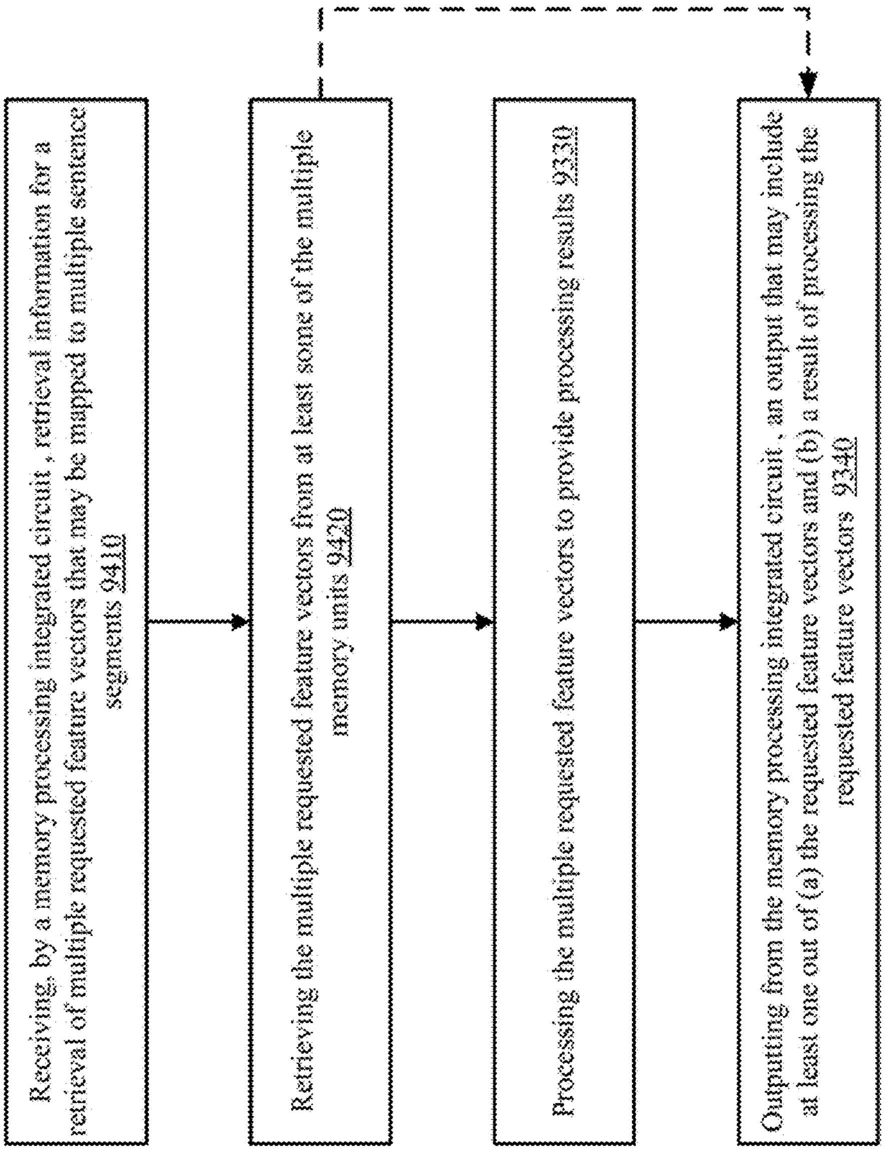
Figure 88B:
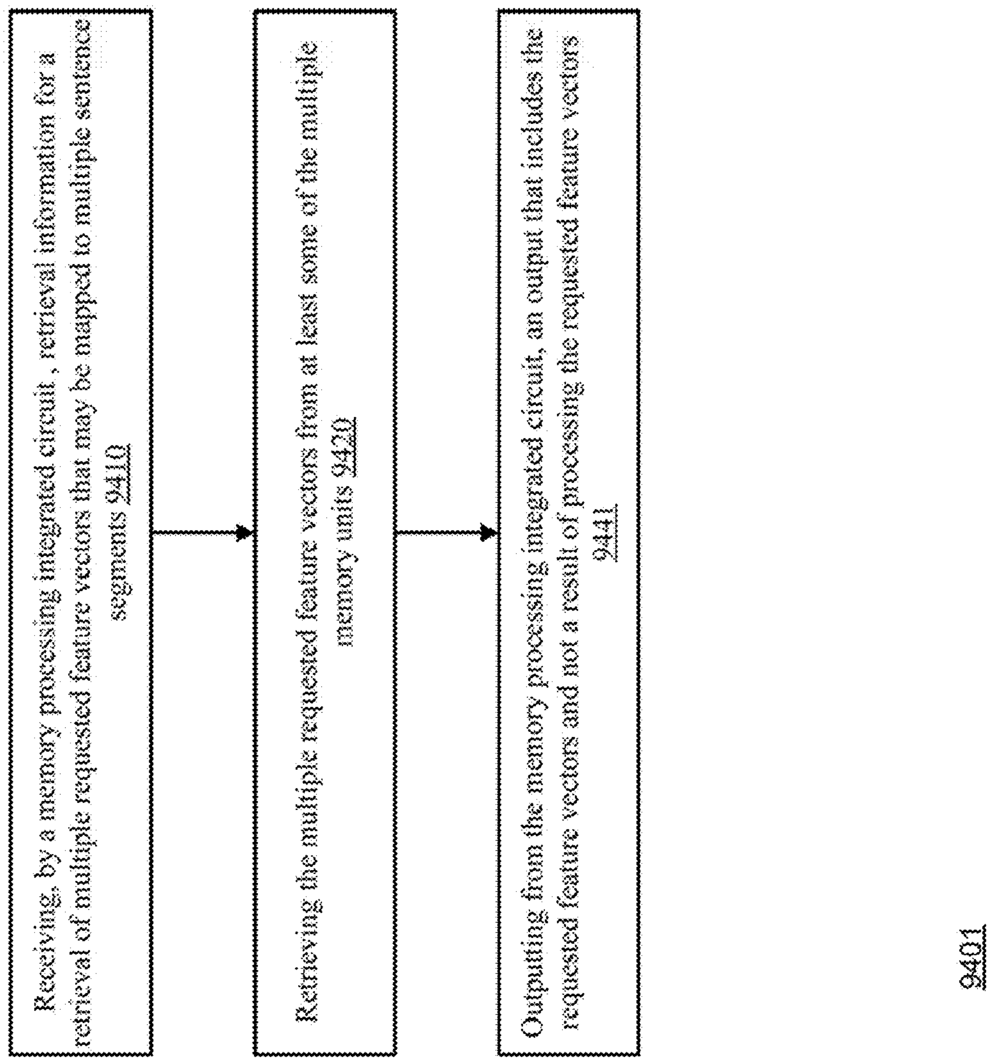
Figure 88C:
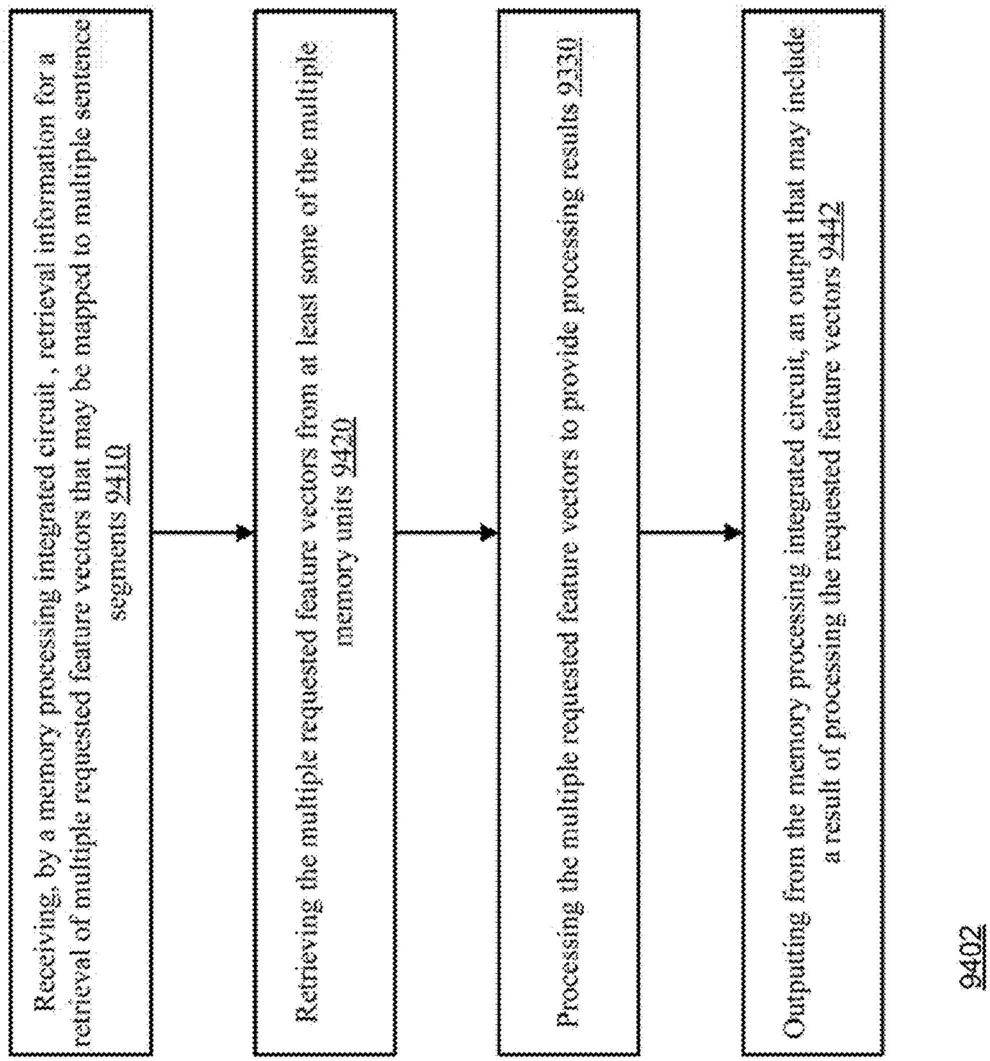
Figure 89A:
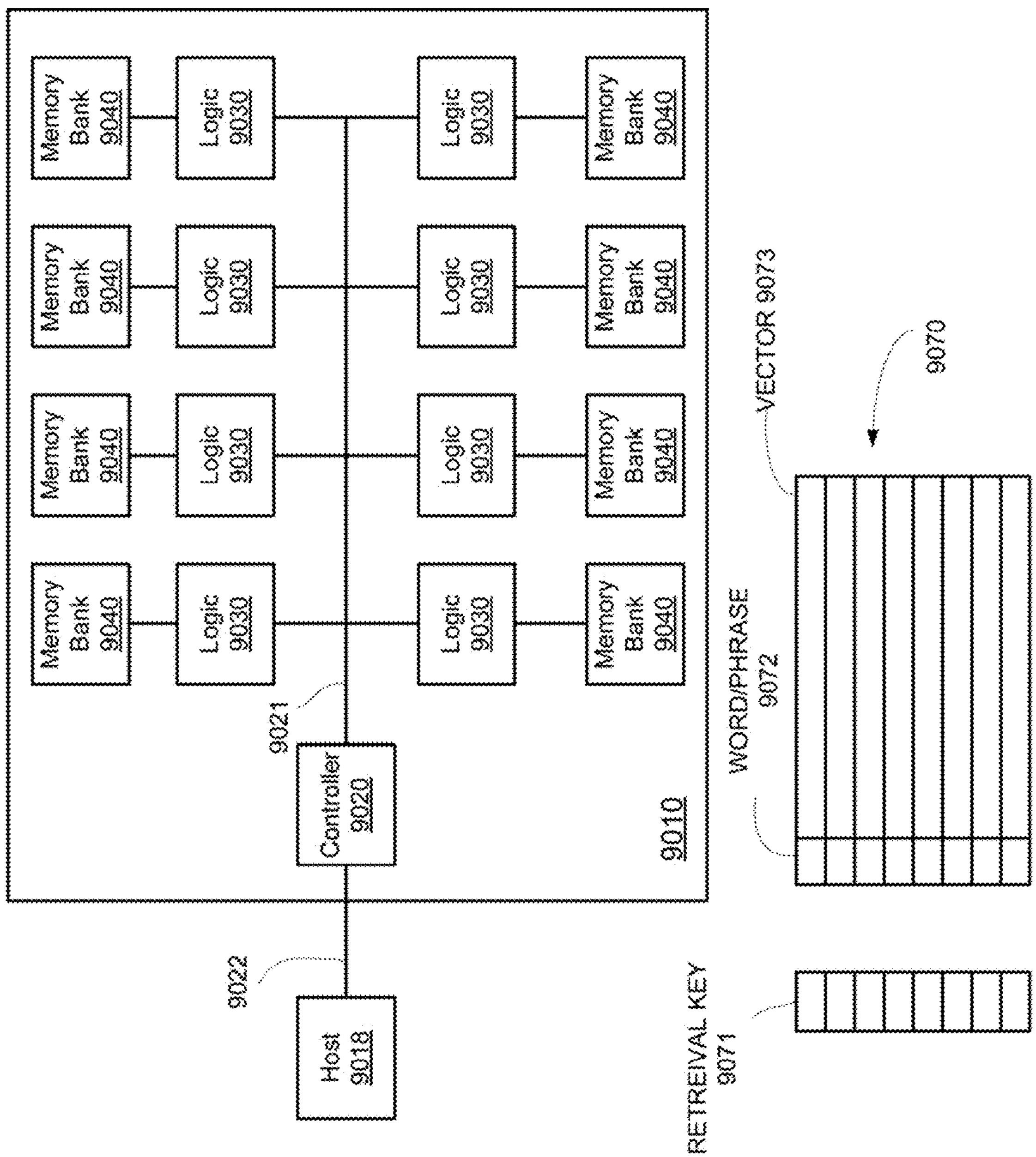
Figure 89B:
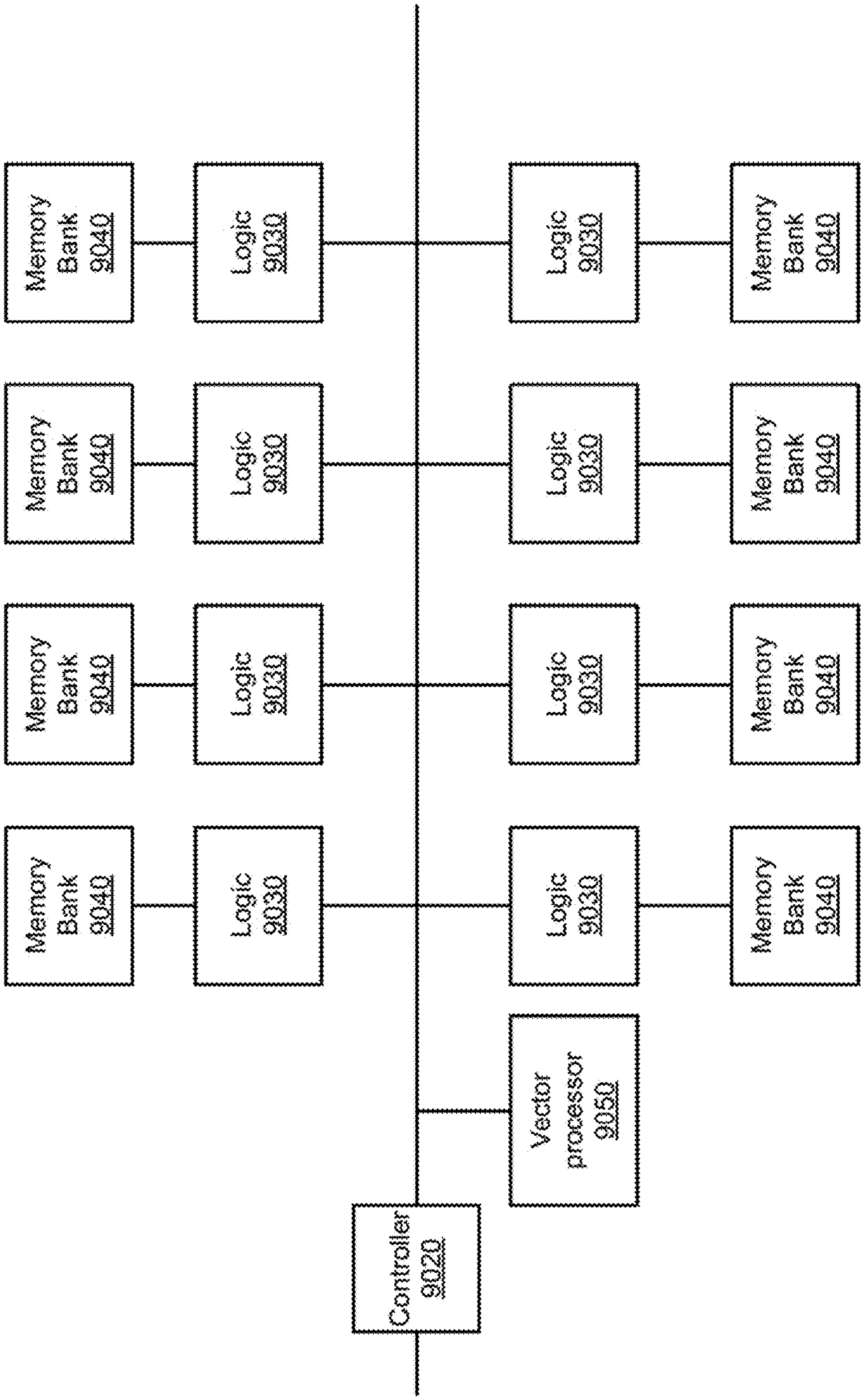
Figure 89C:
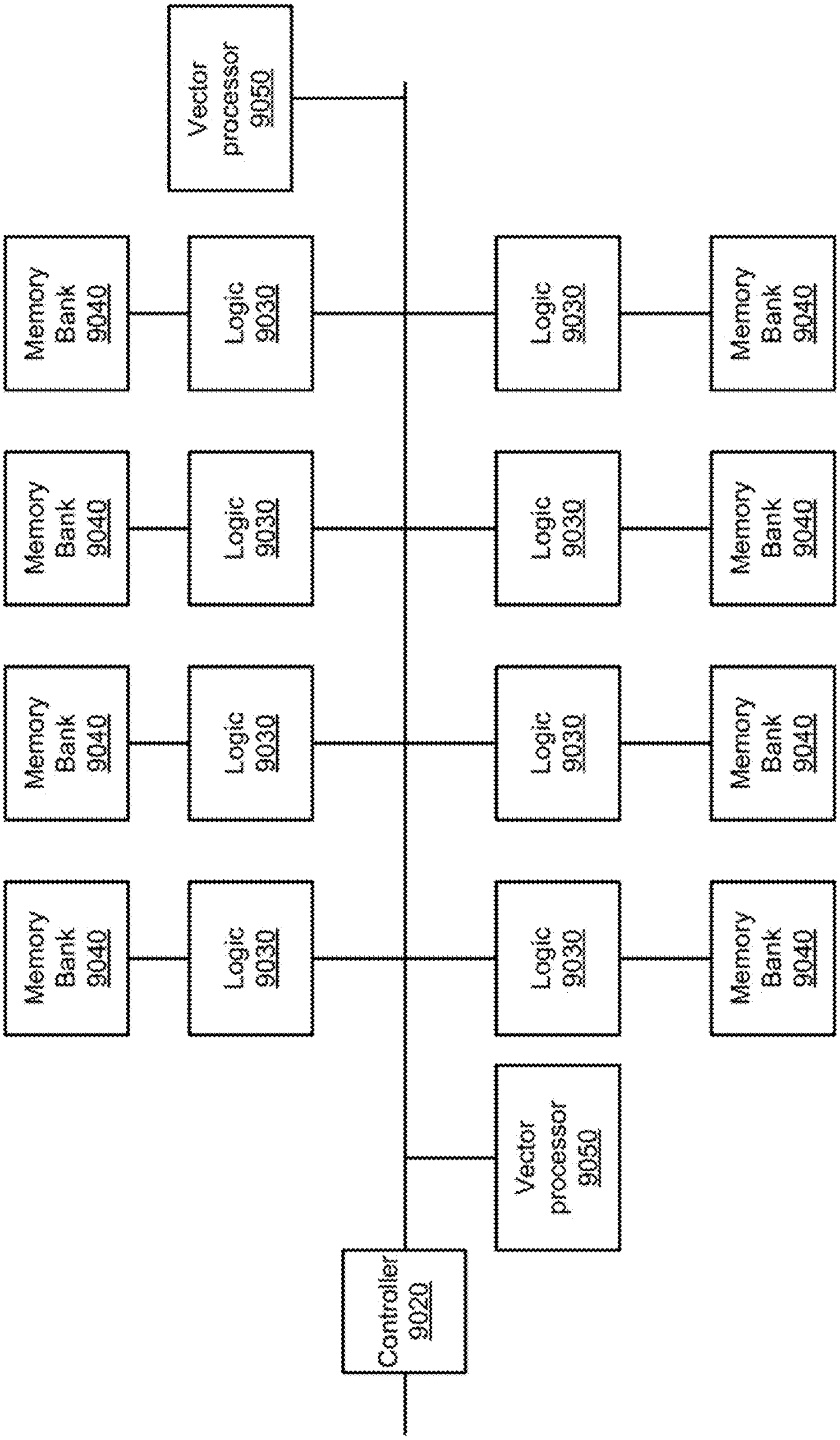
Figure 89D:
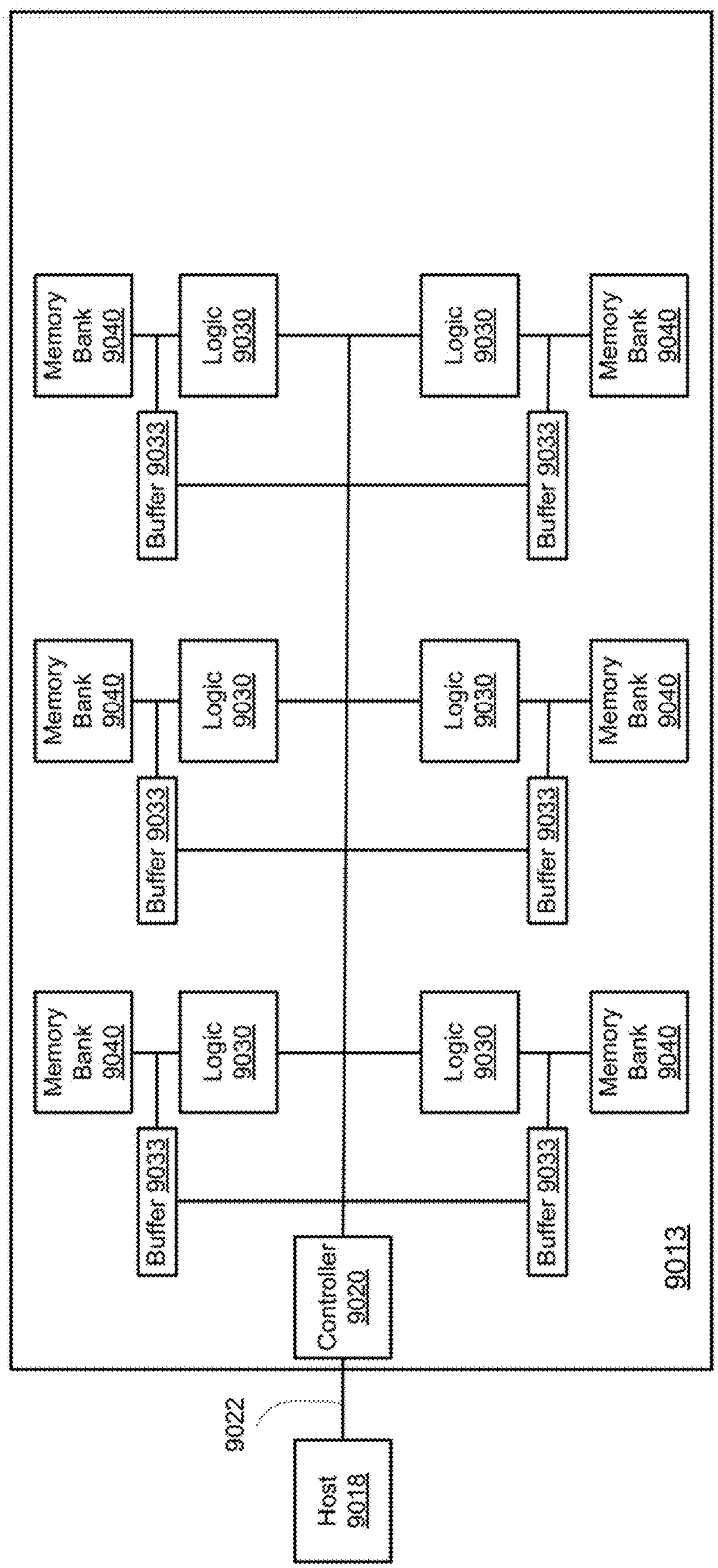
Figure 89E:
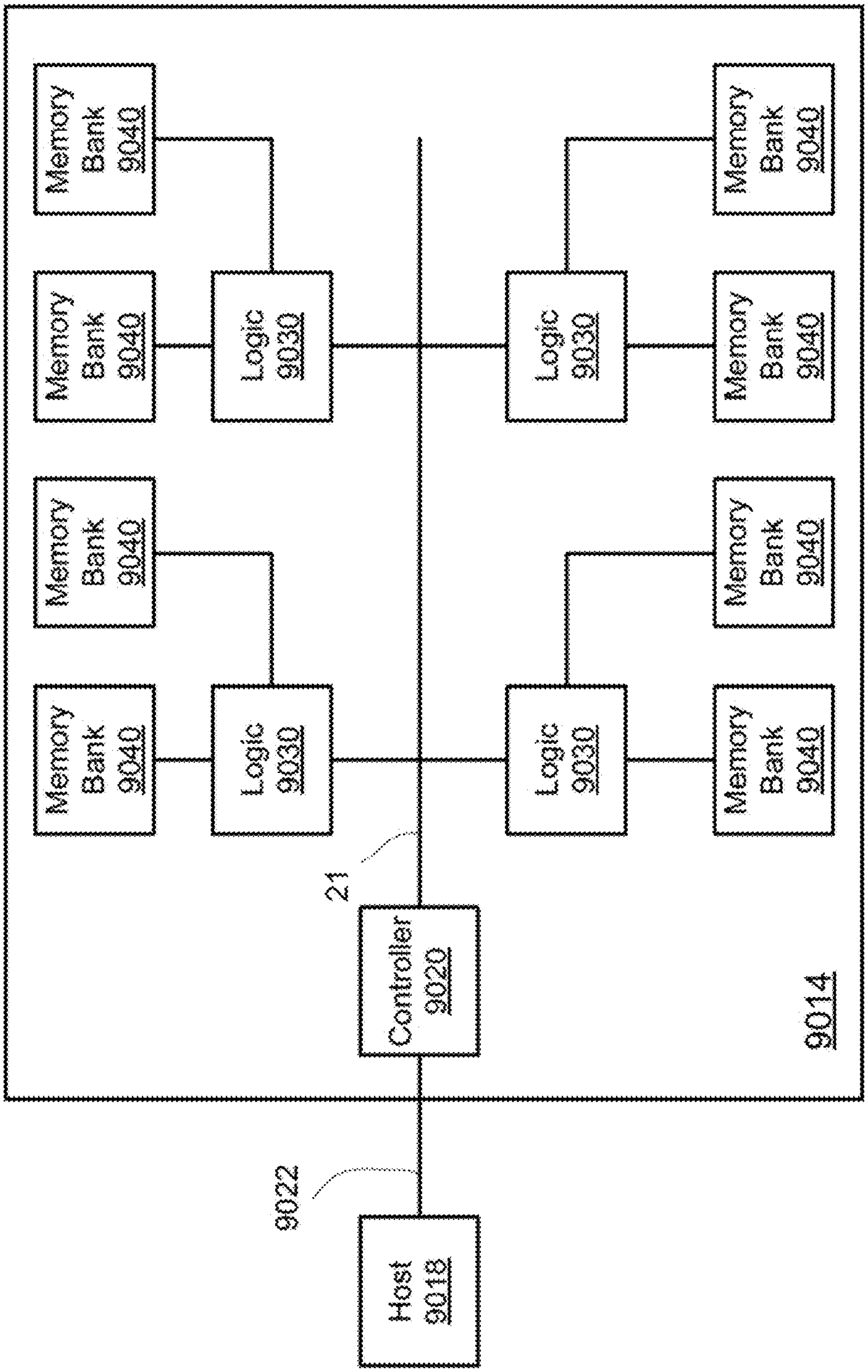
Figure 89F:
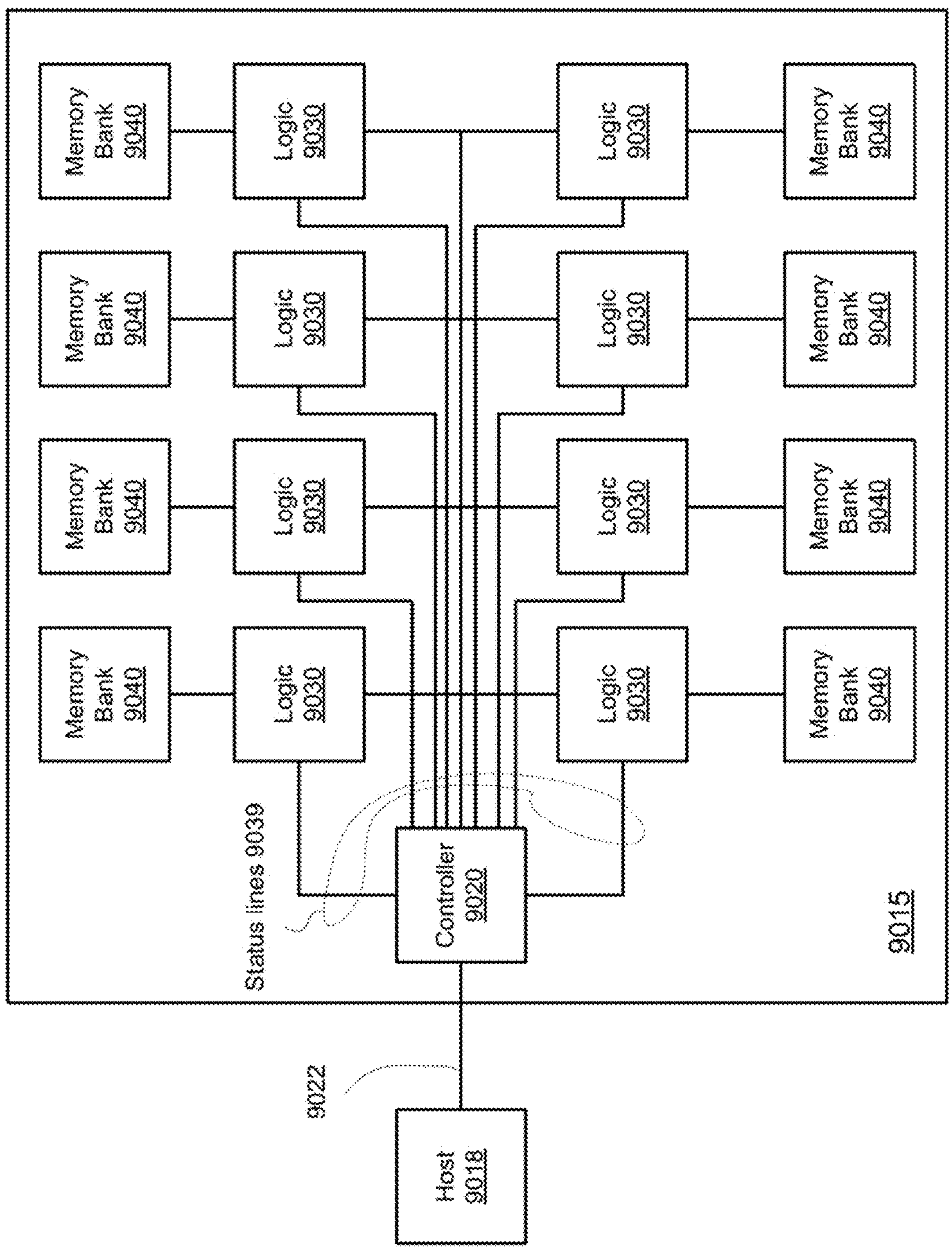
Figure 89G:
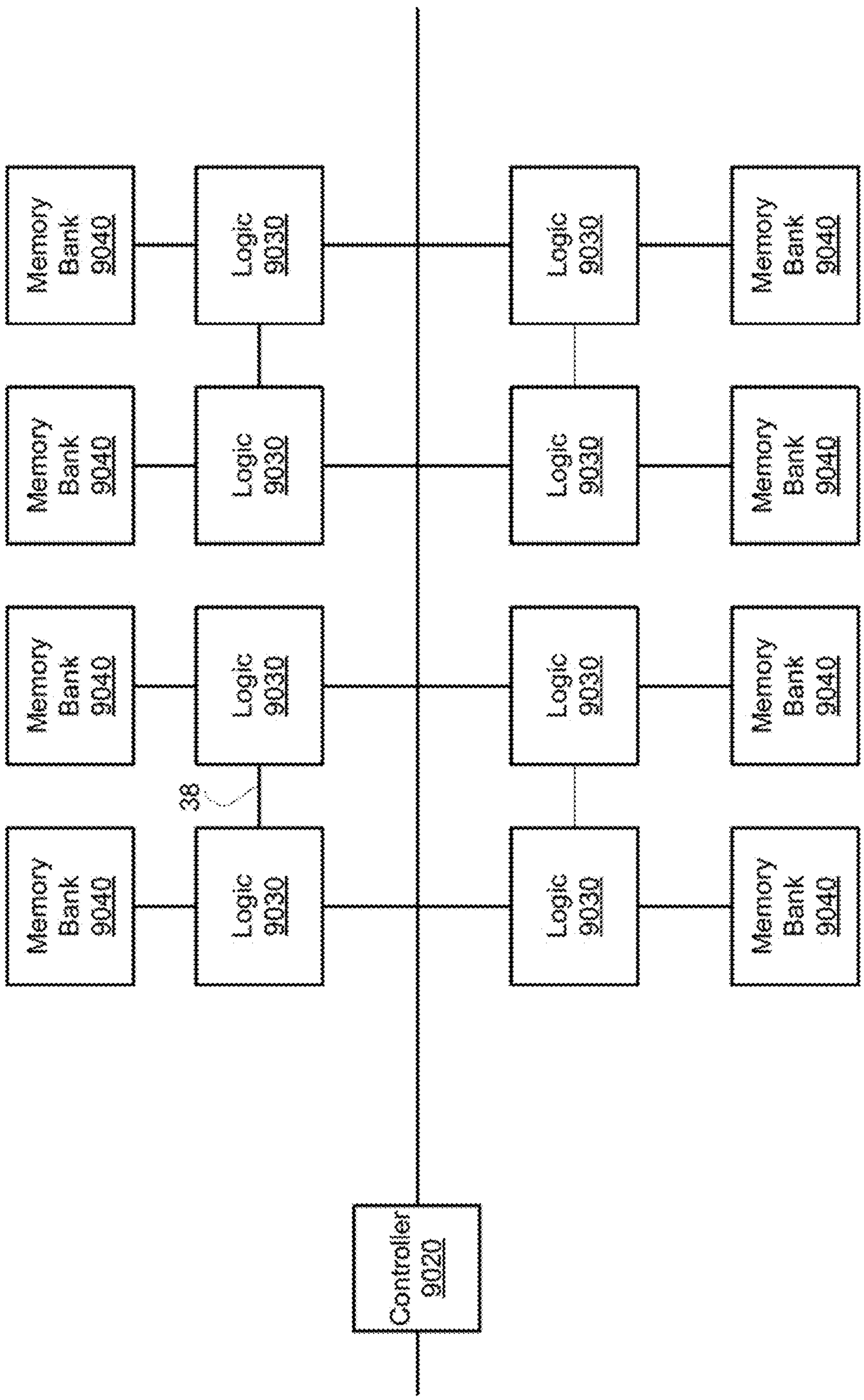
Figure 89H:
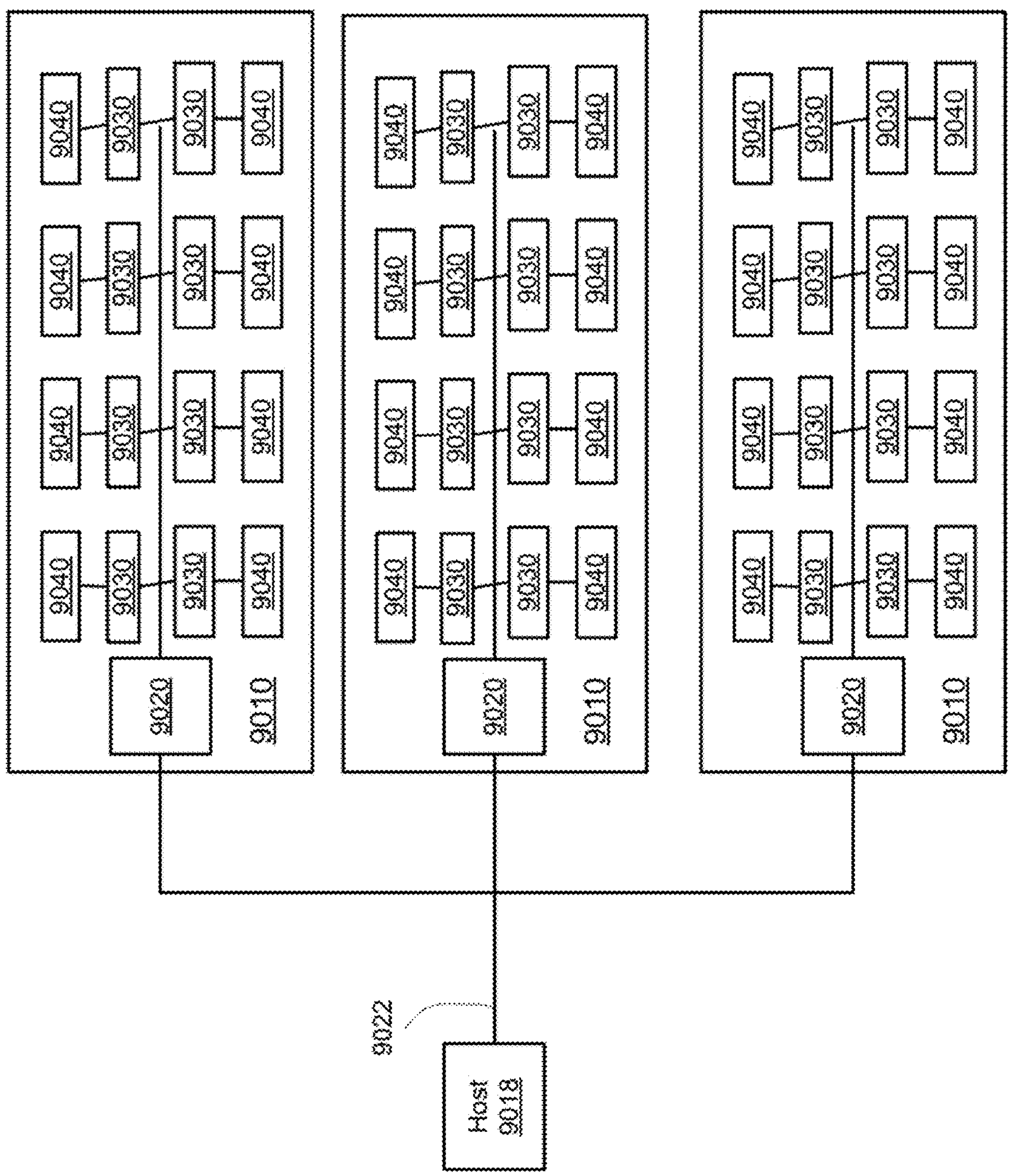
Figure 90A:
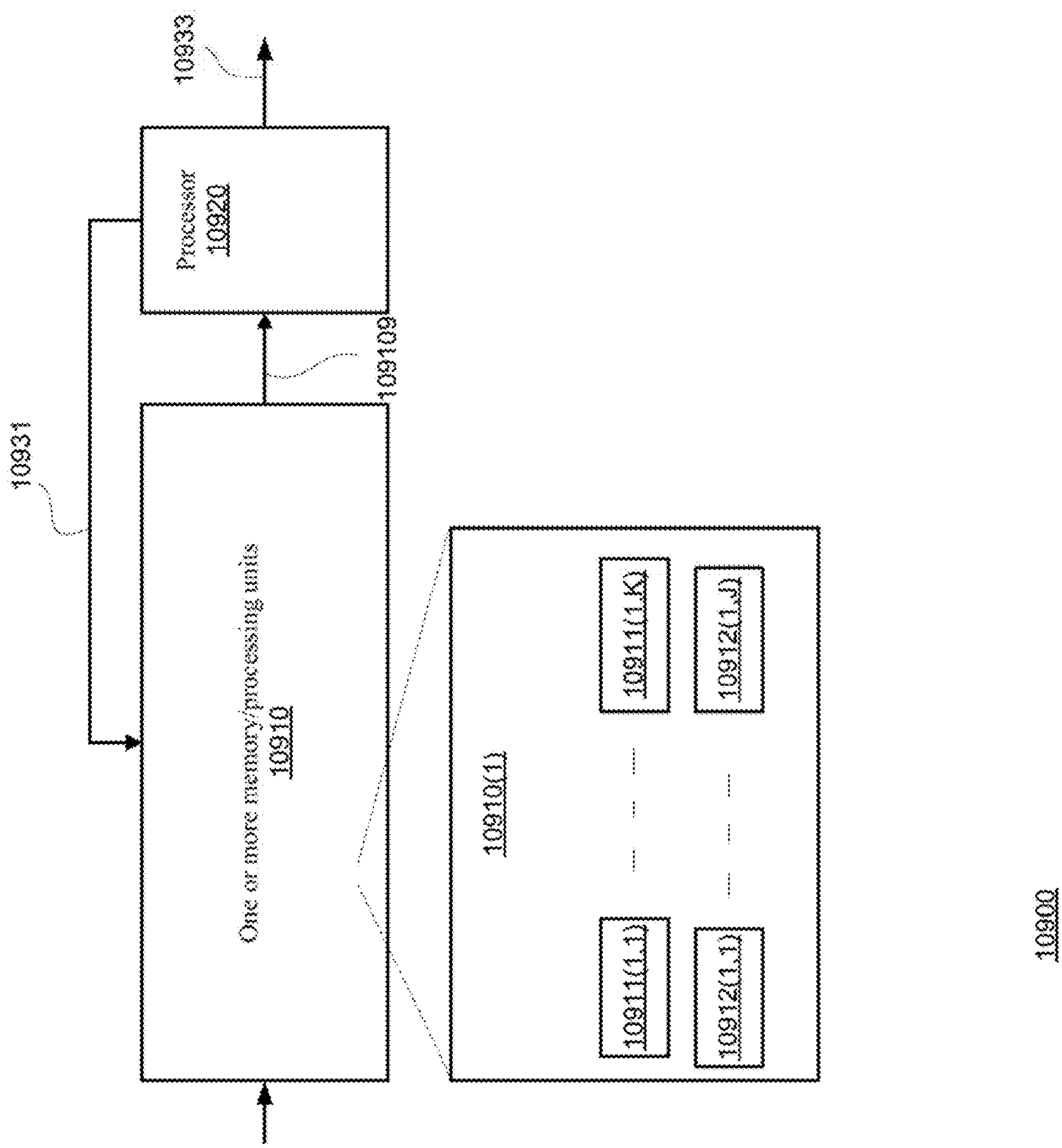
Figure 90B:
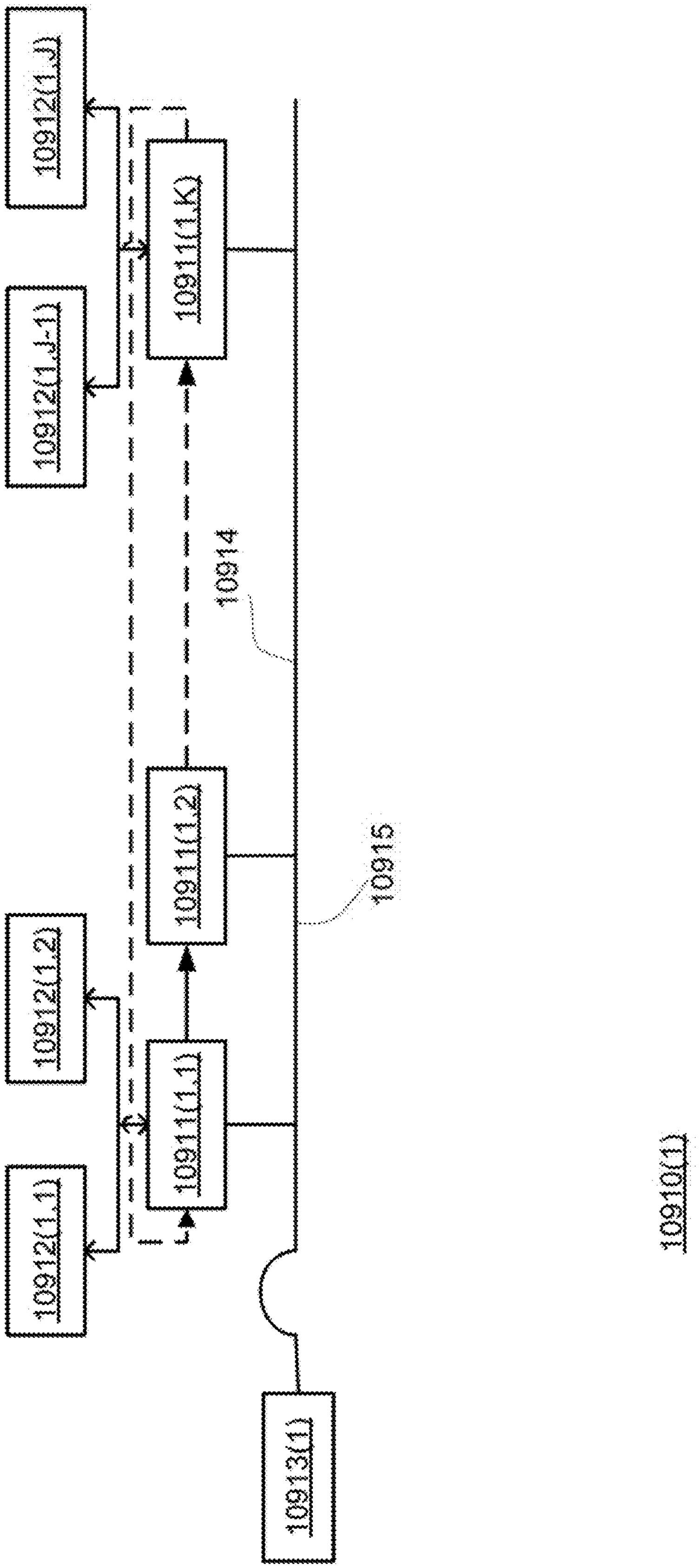
Figure 90C:
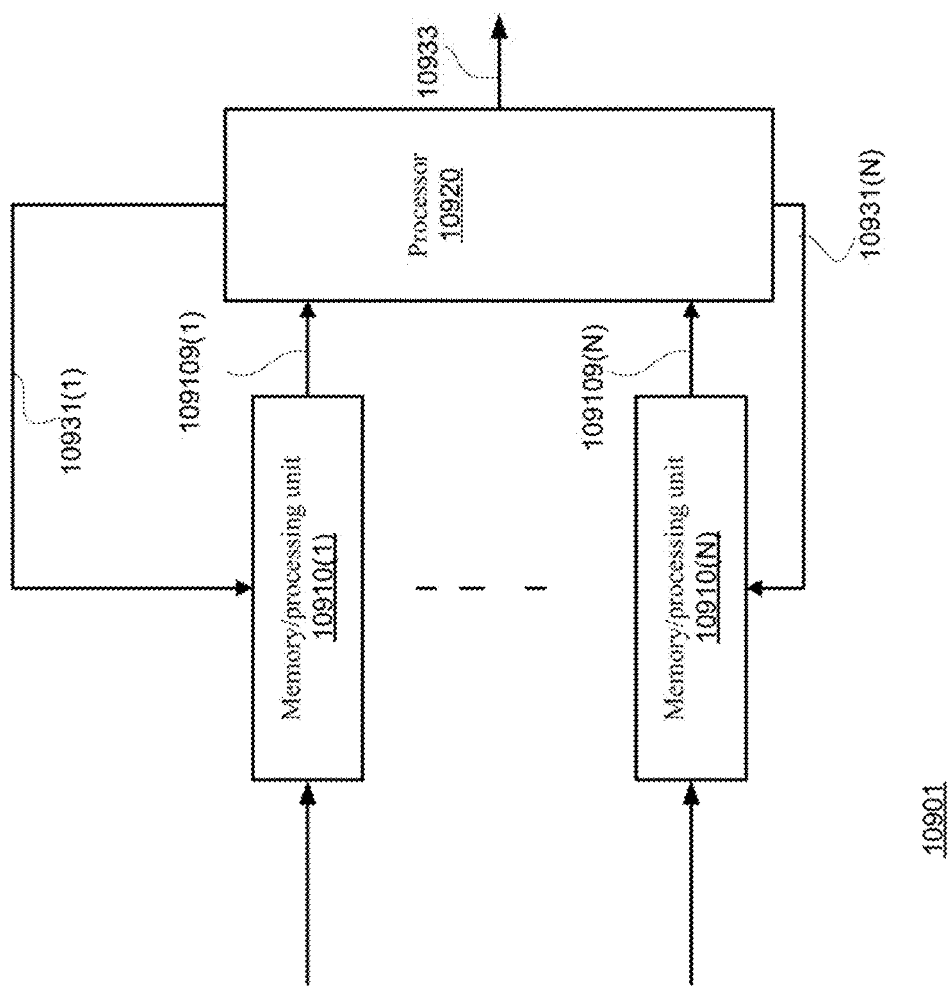
Figure 90D:
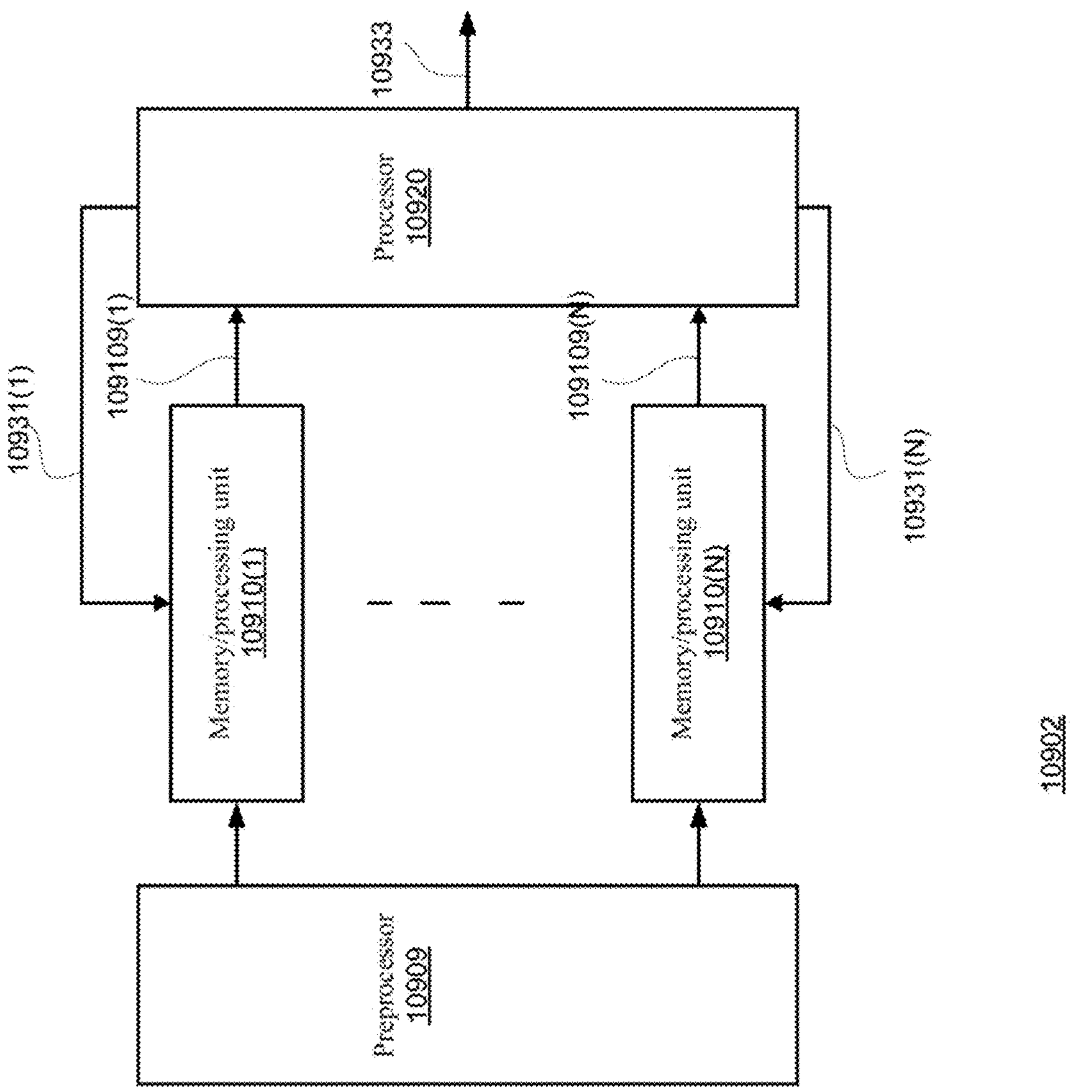
Figure 90E:
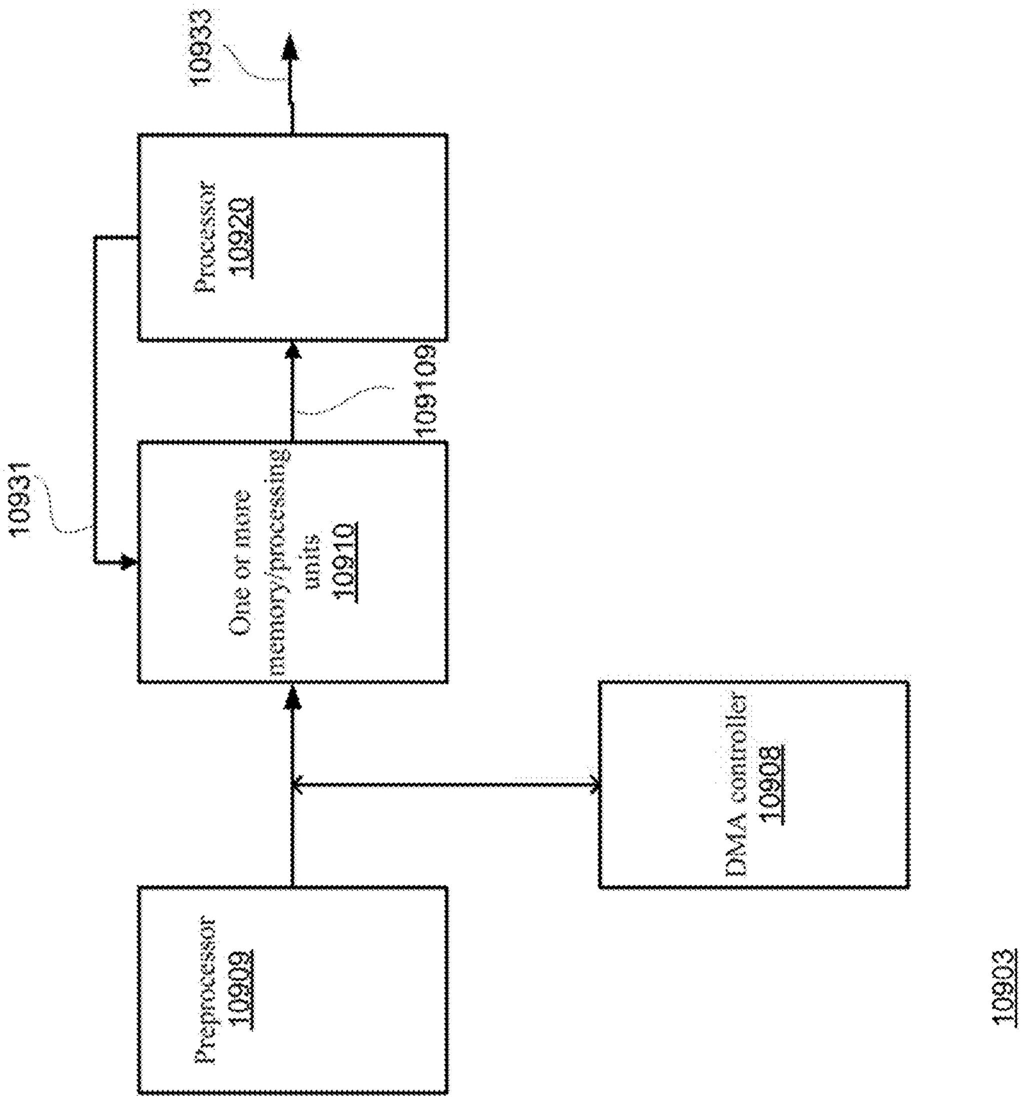
Figure 90F:
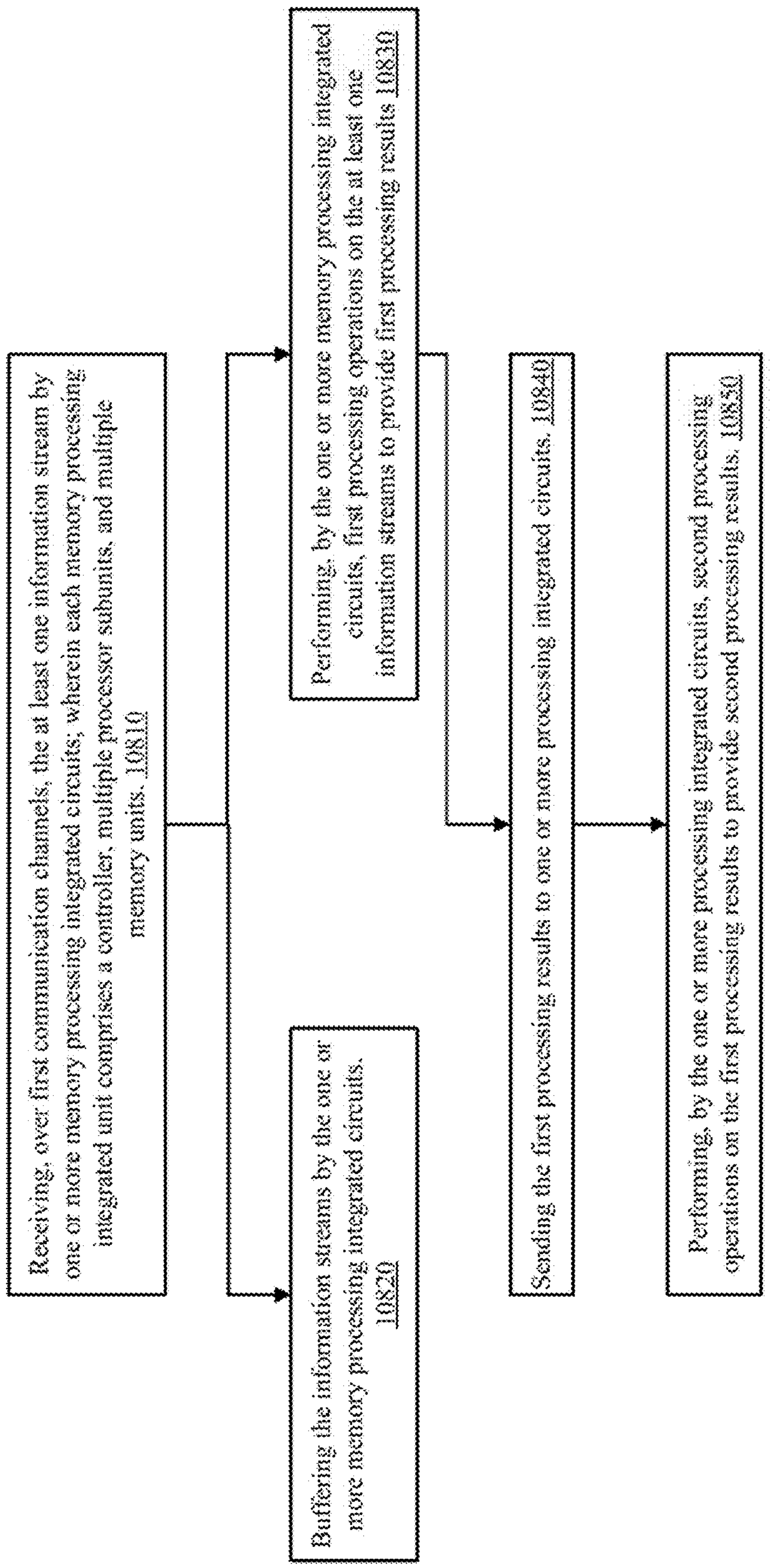
Figure 91A:
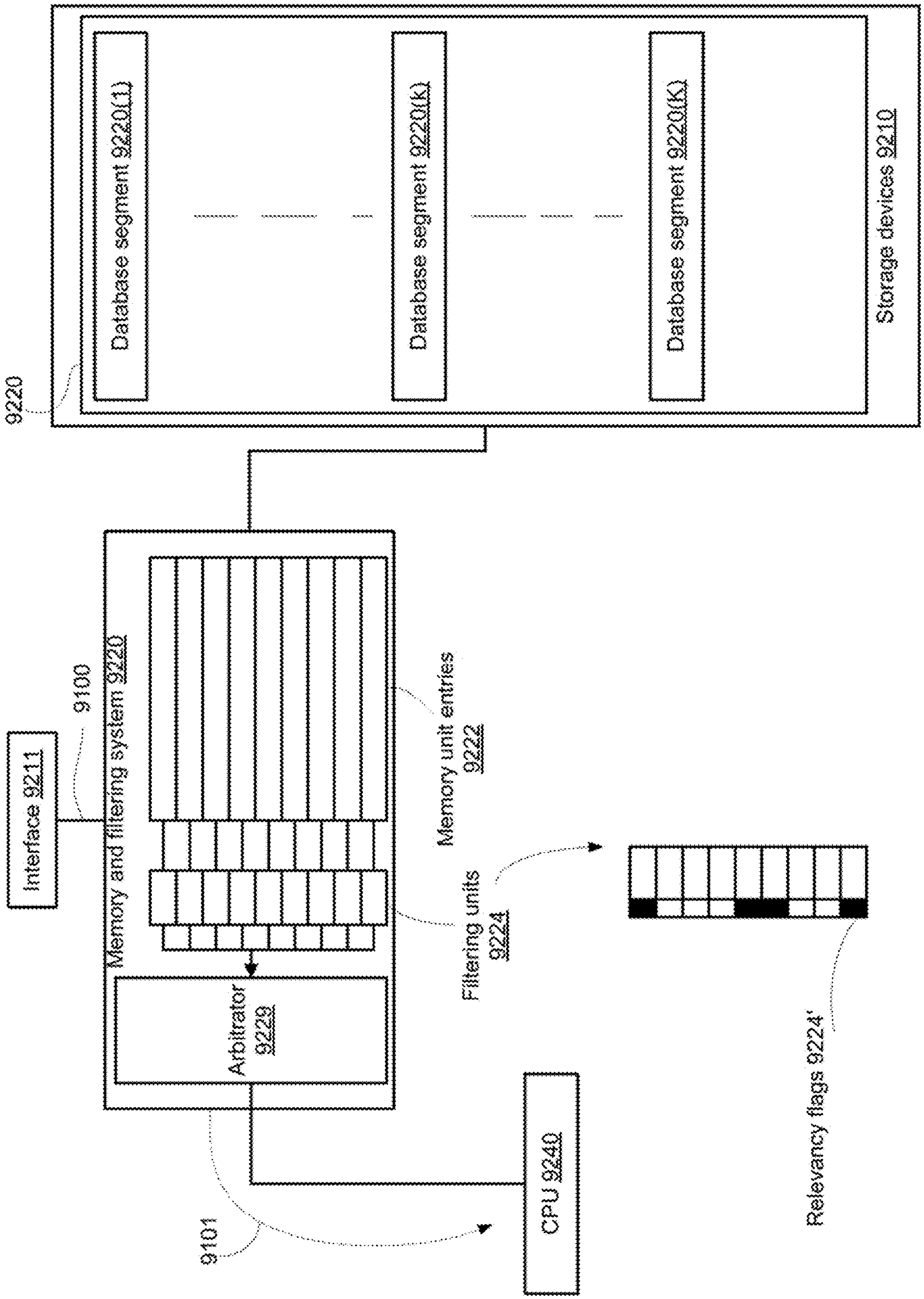
Figure 91B:
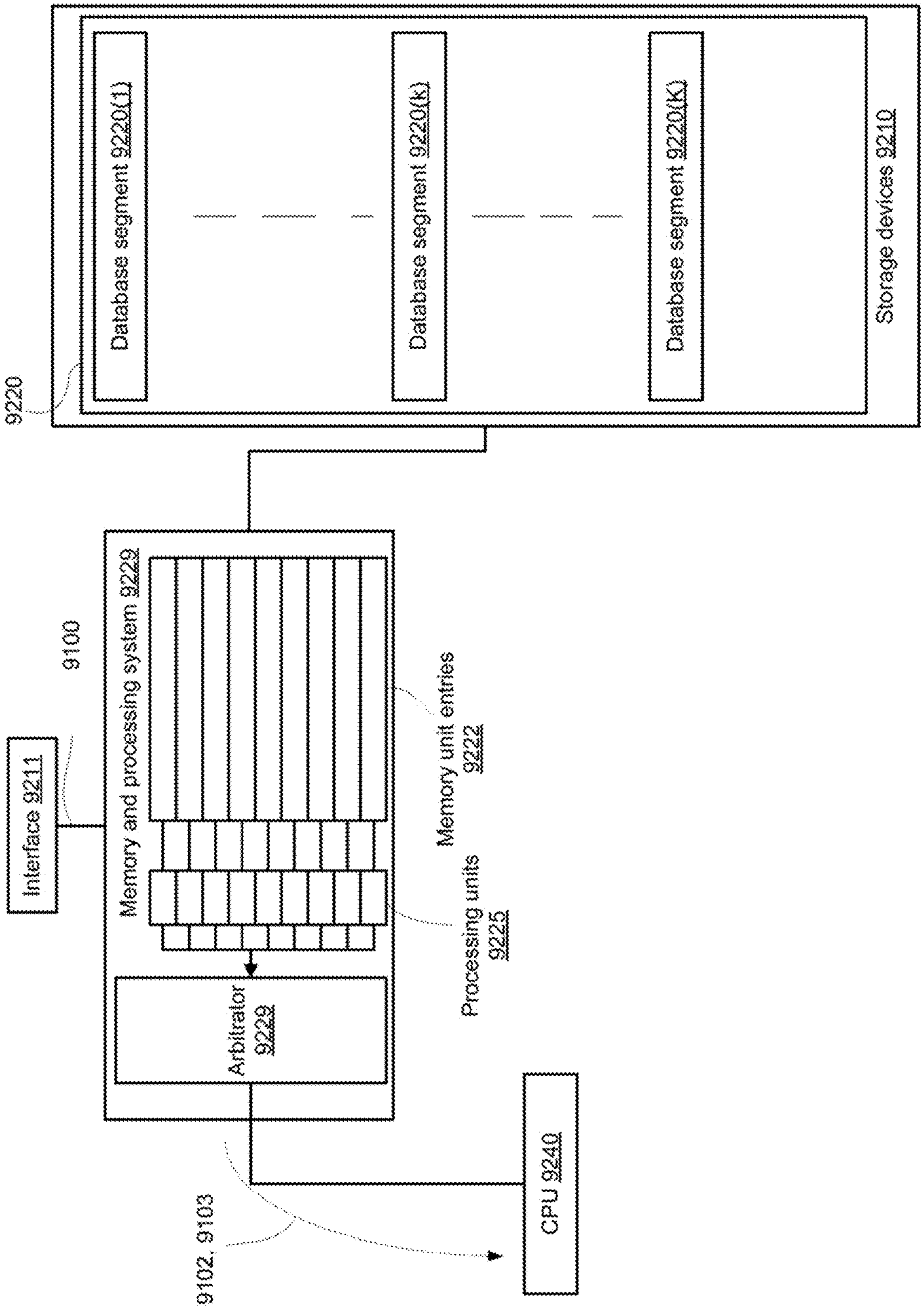
Figure 92A:
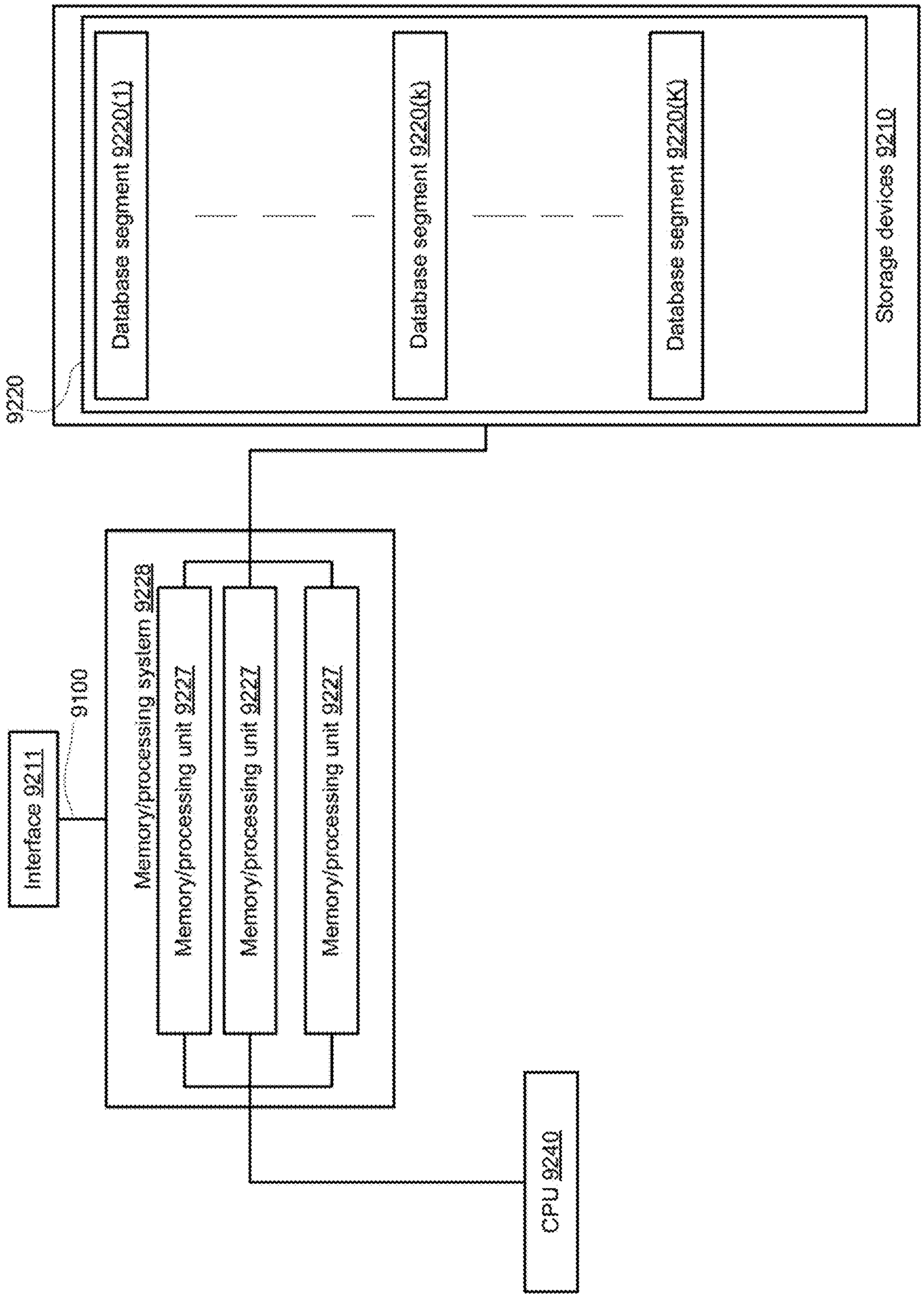
Figure 92B:
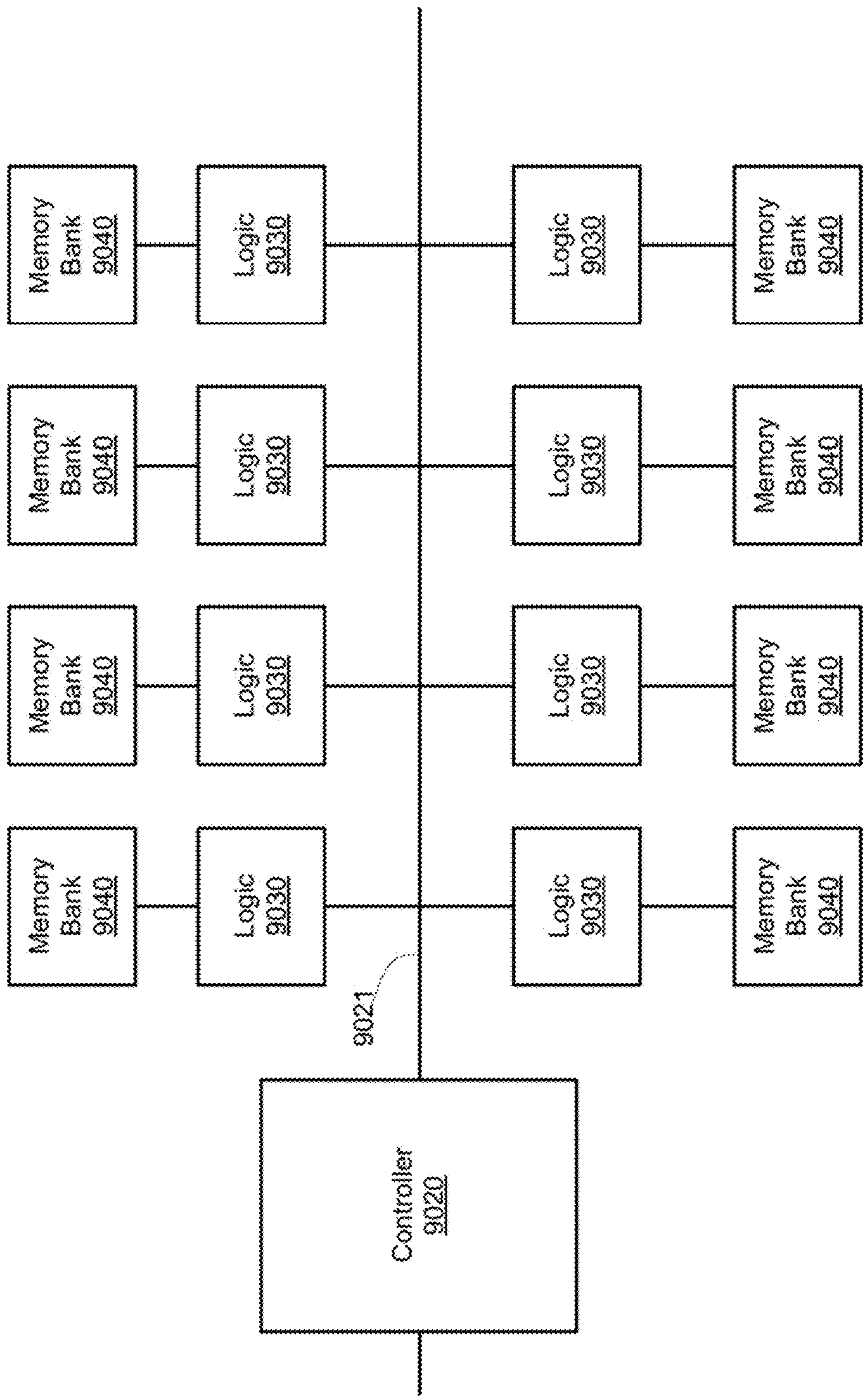
Figure 92C:
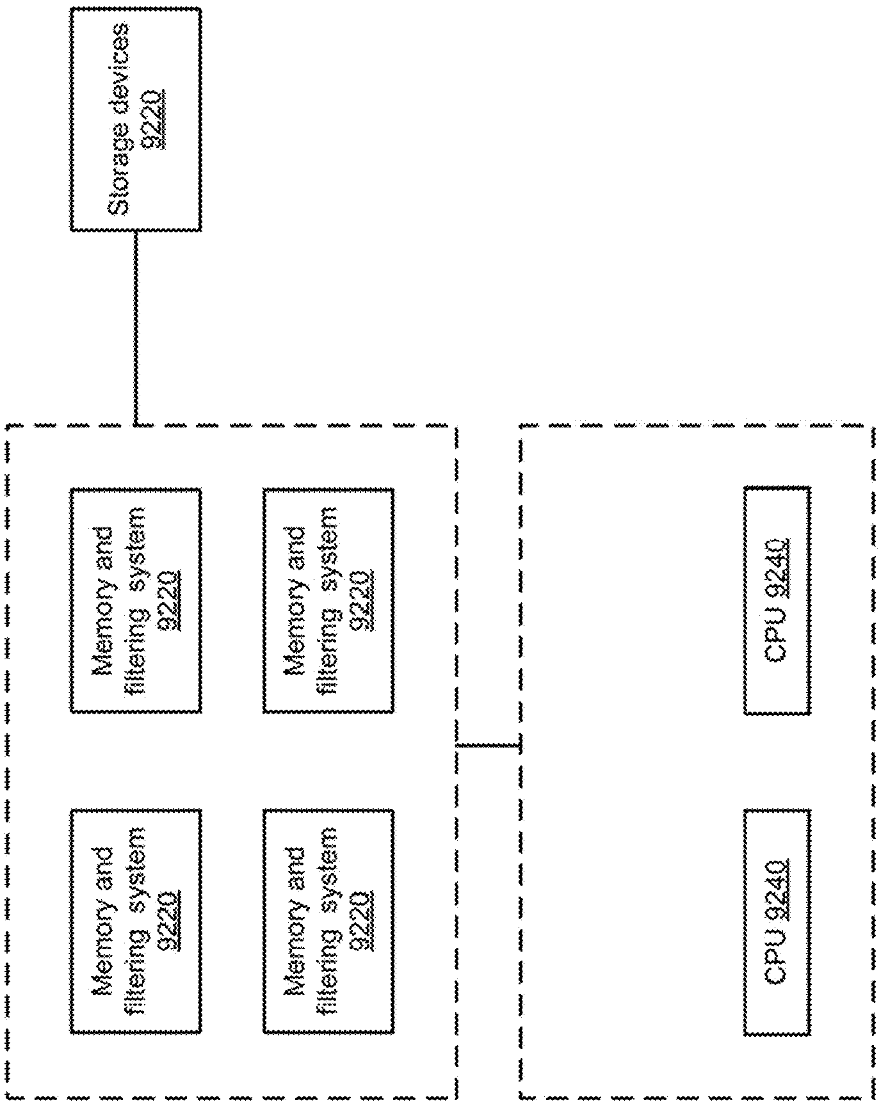
Figure 92D:
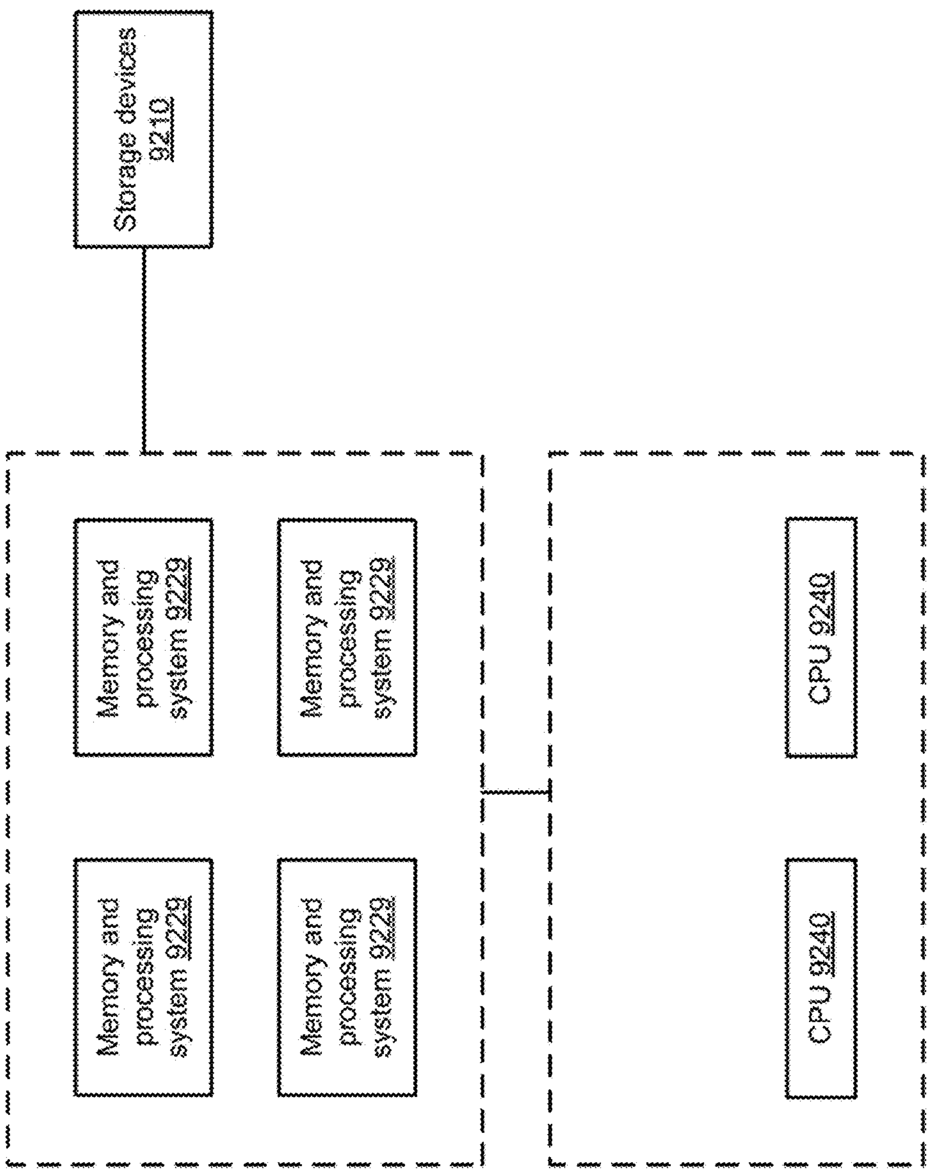
Figure 92E:
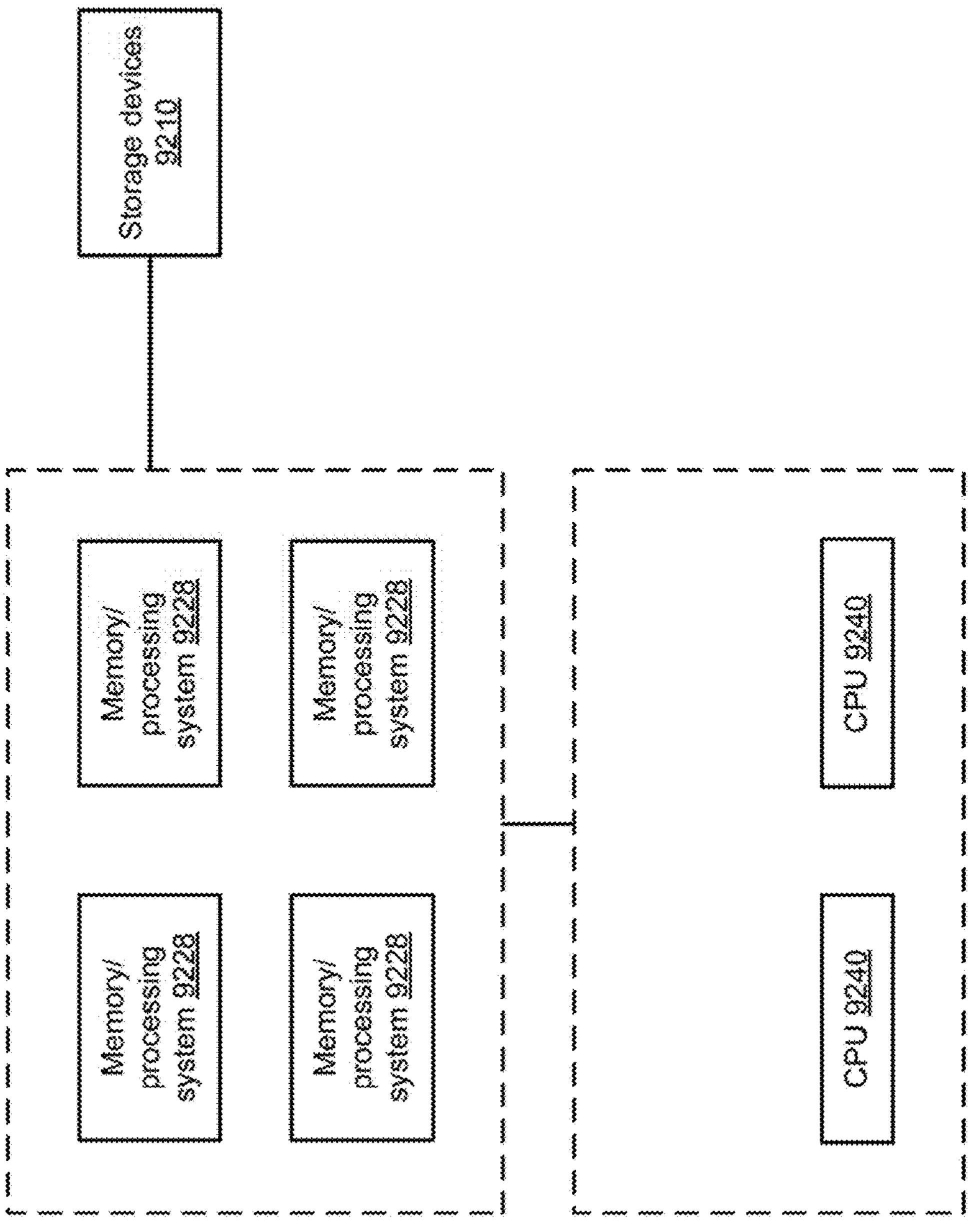
Figure 92F:
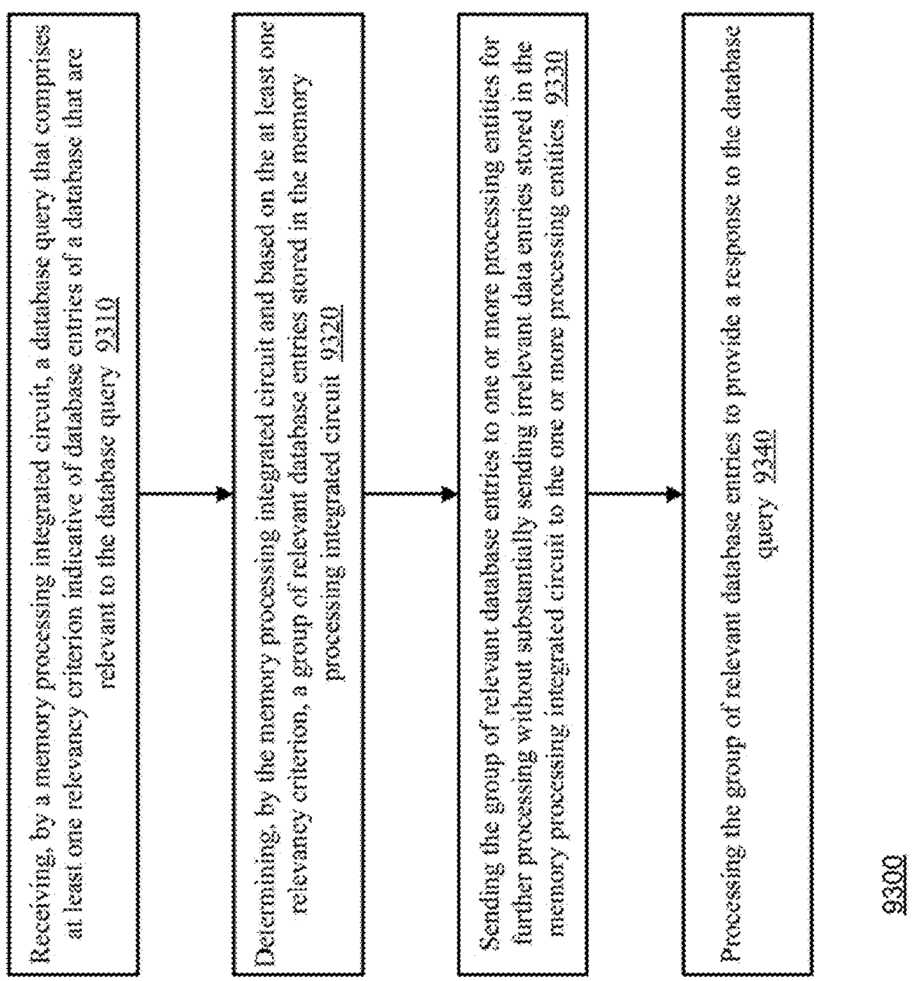
Figure 92G:
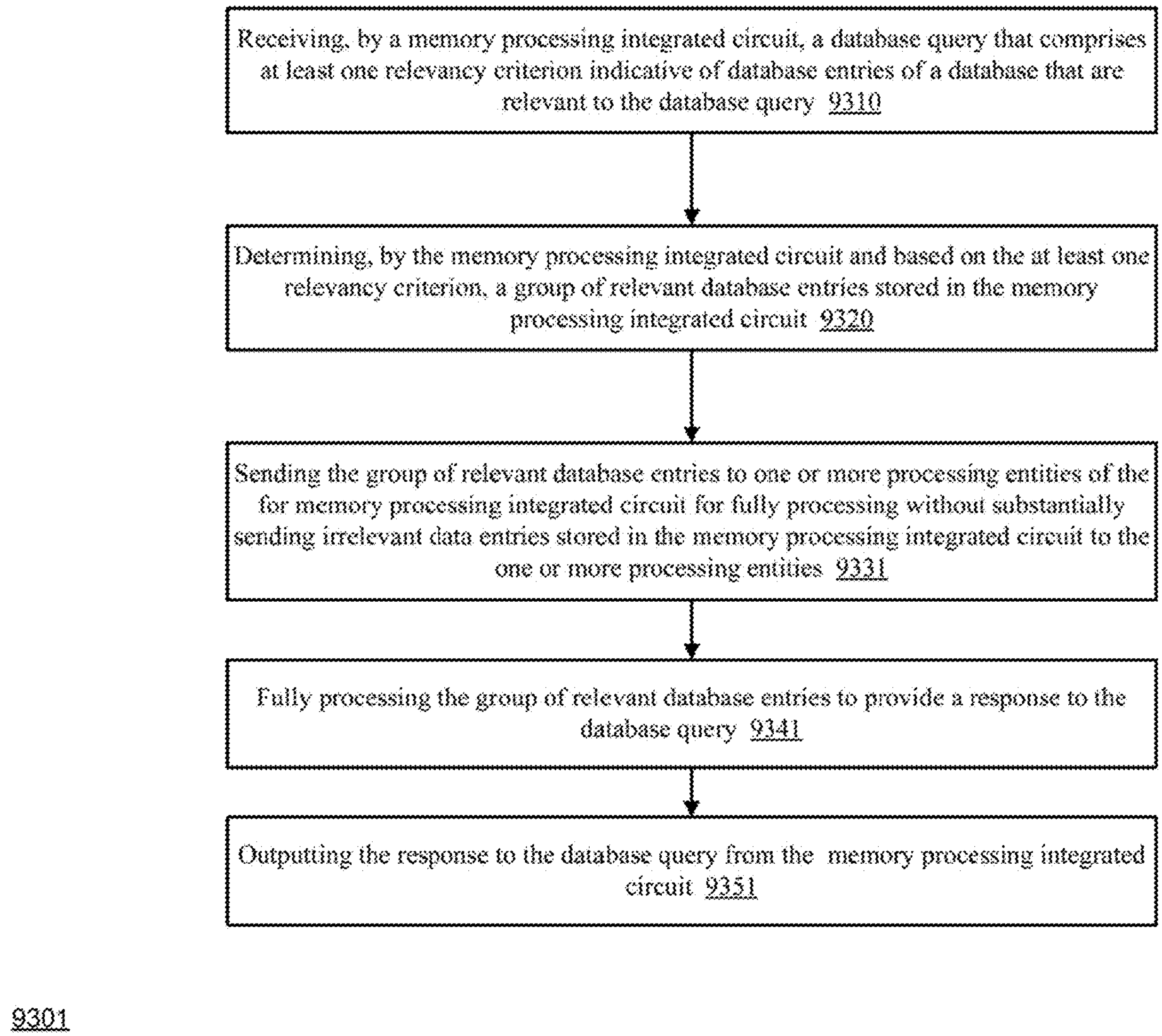
Figure 92H:
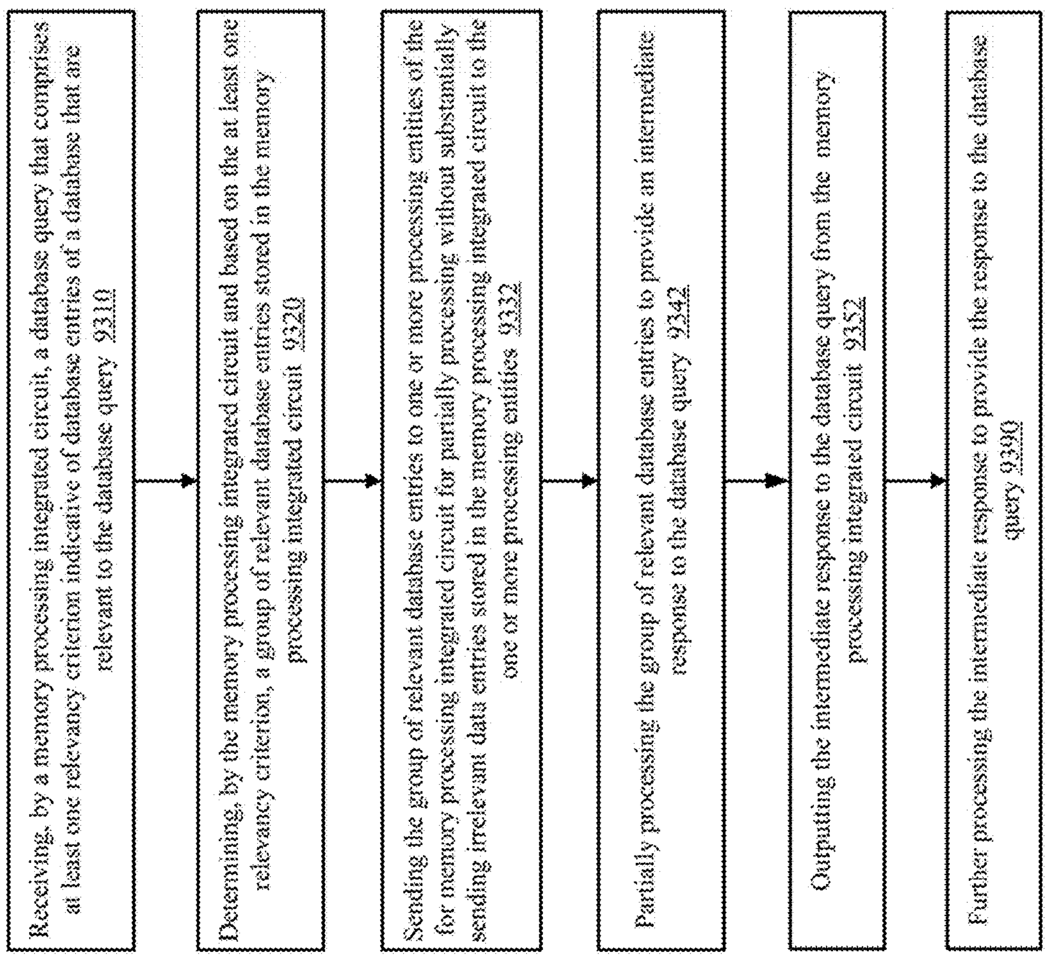
Figure 92I:
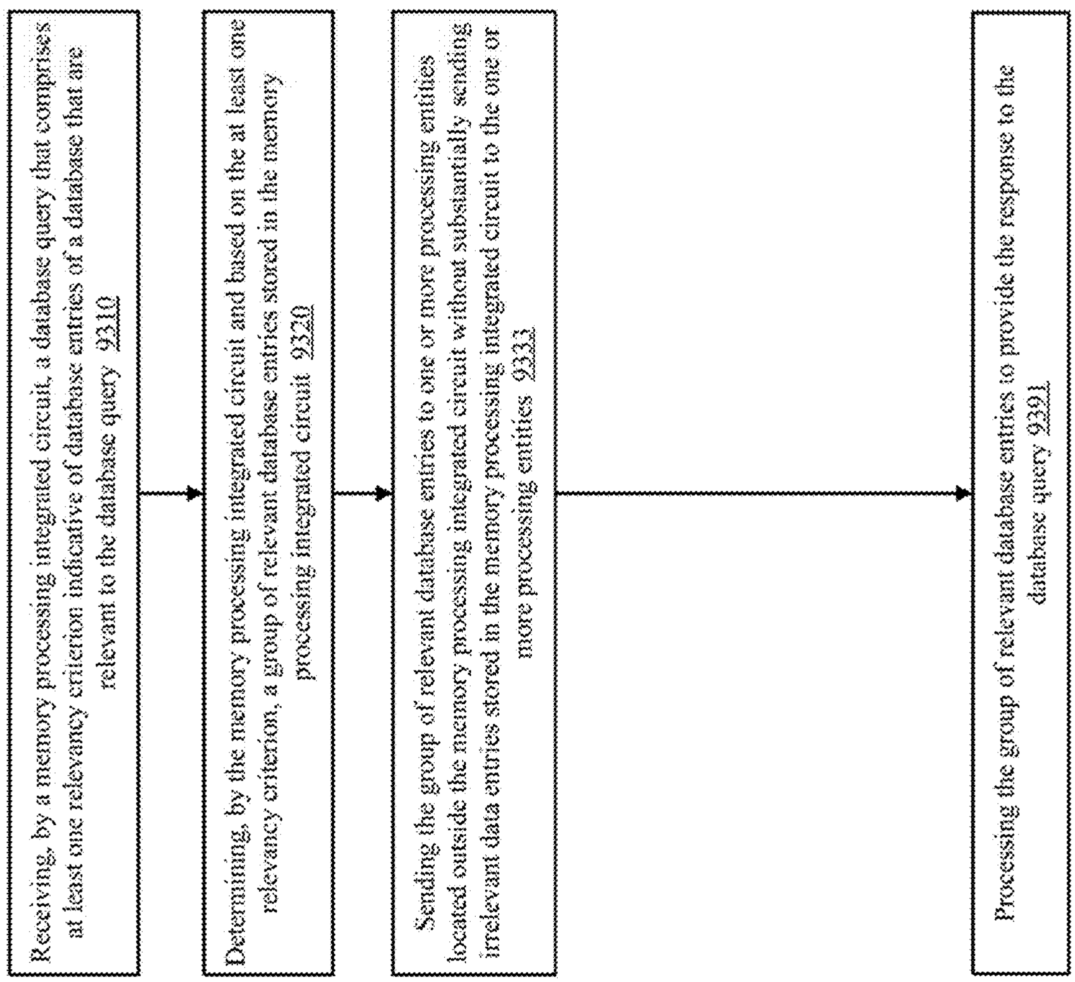
Figure 92J:
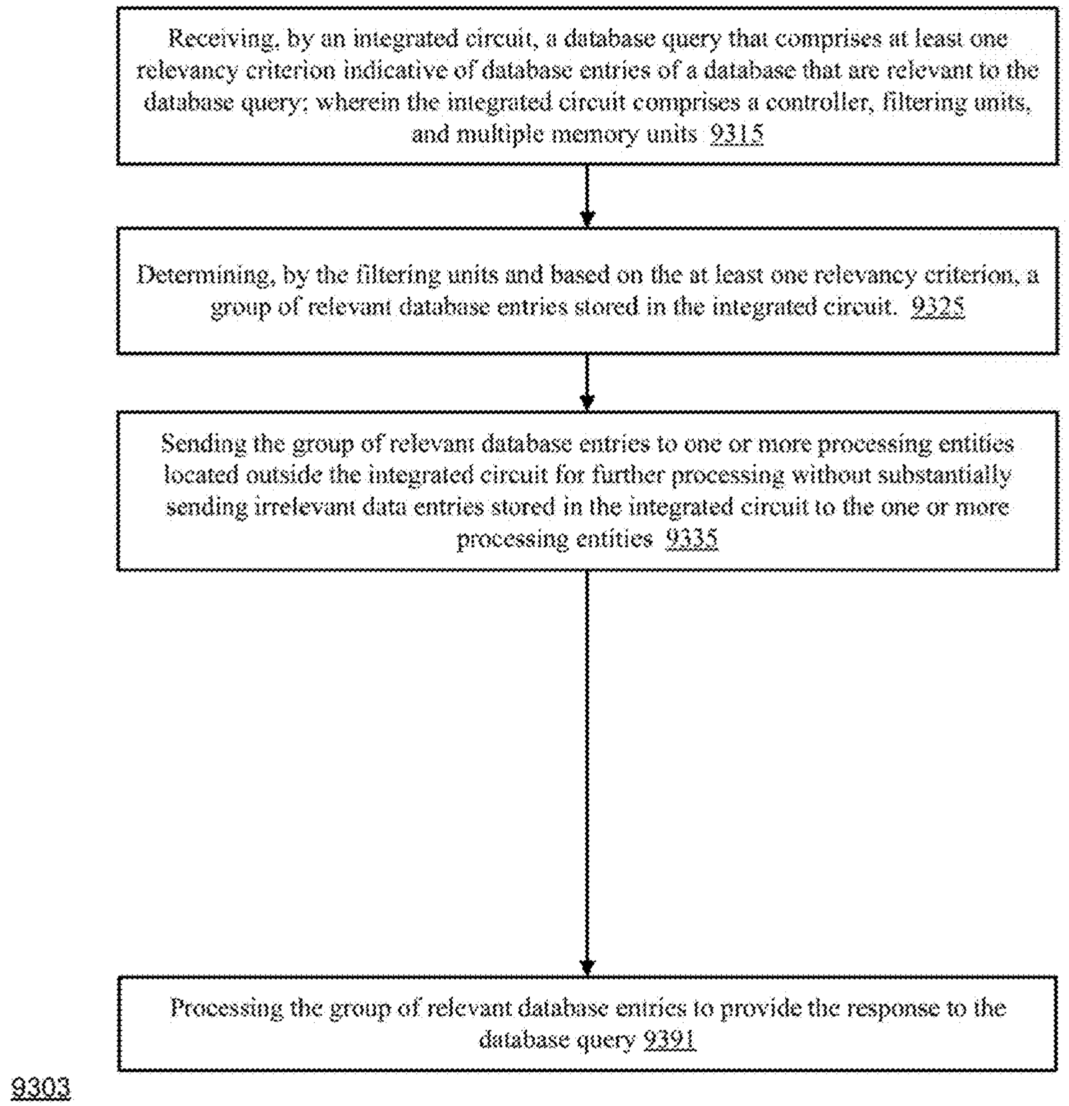
Figure 92K:
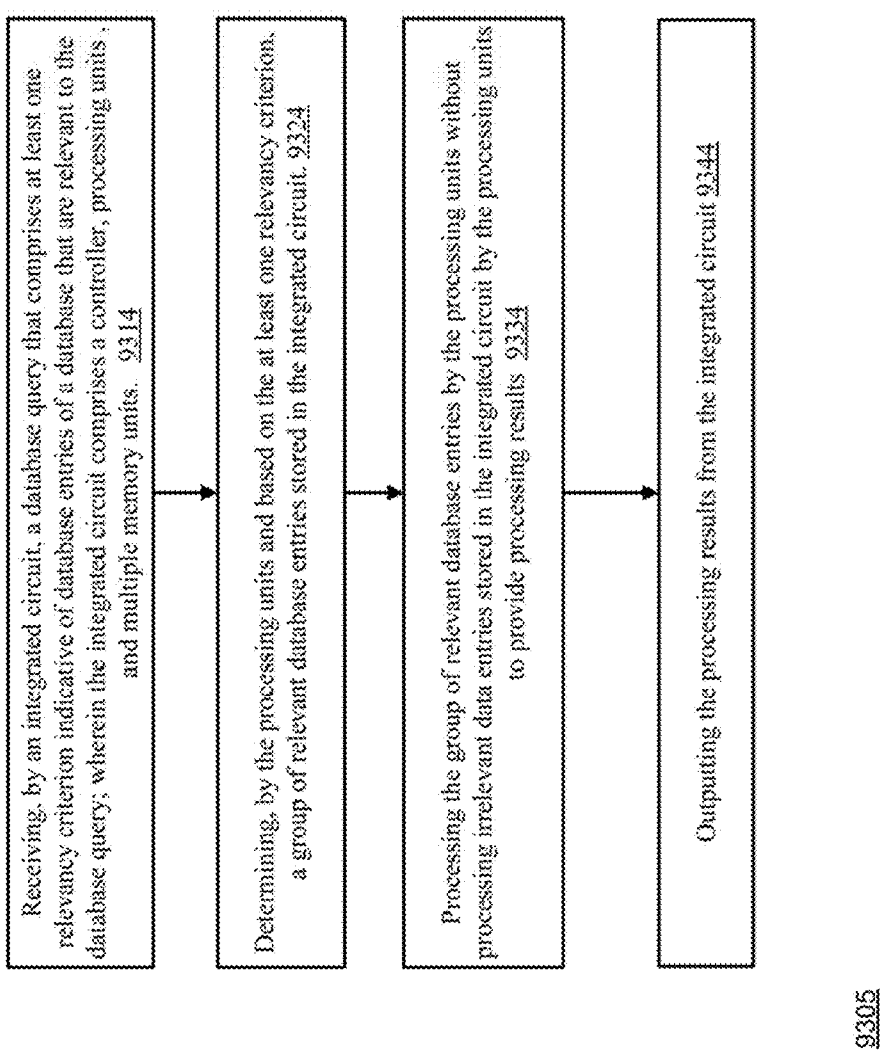
Figure 93A:
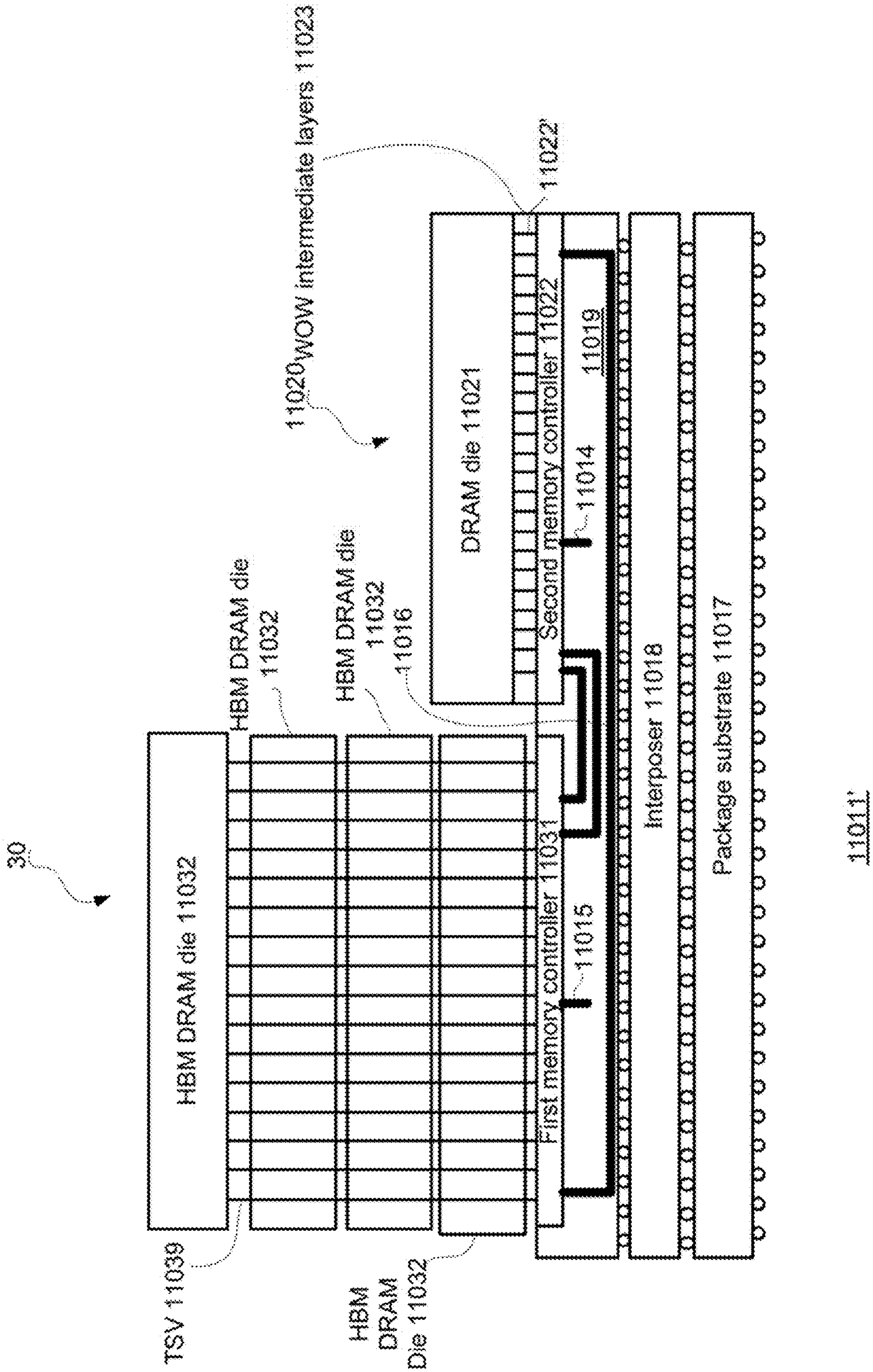
Figure 93B:
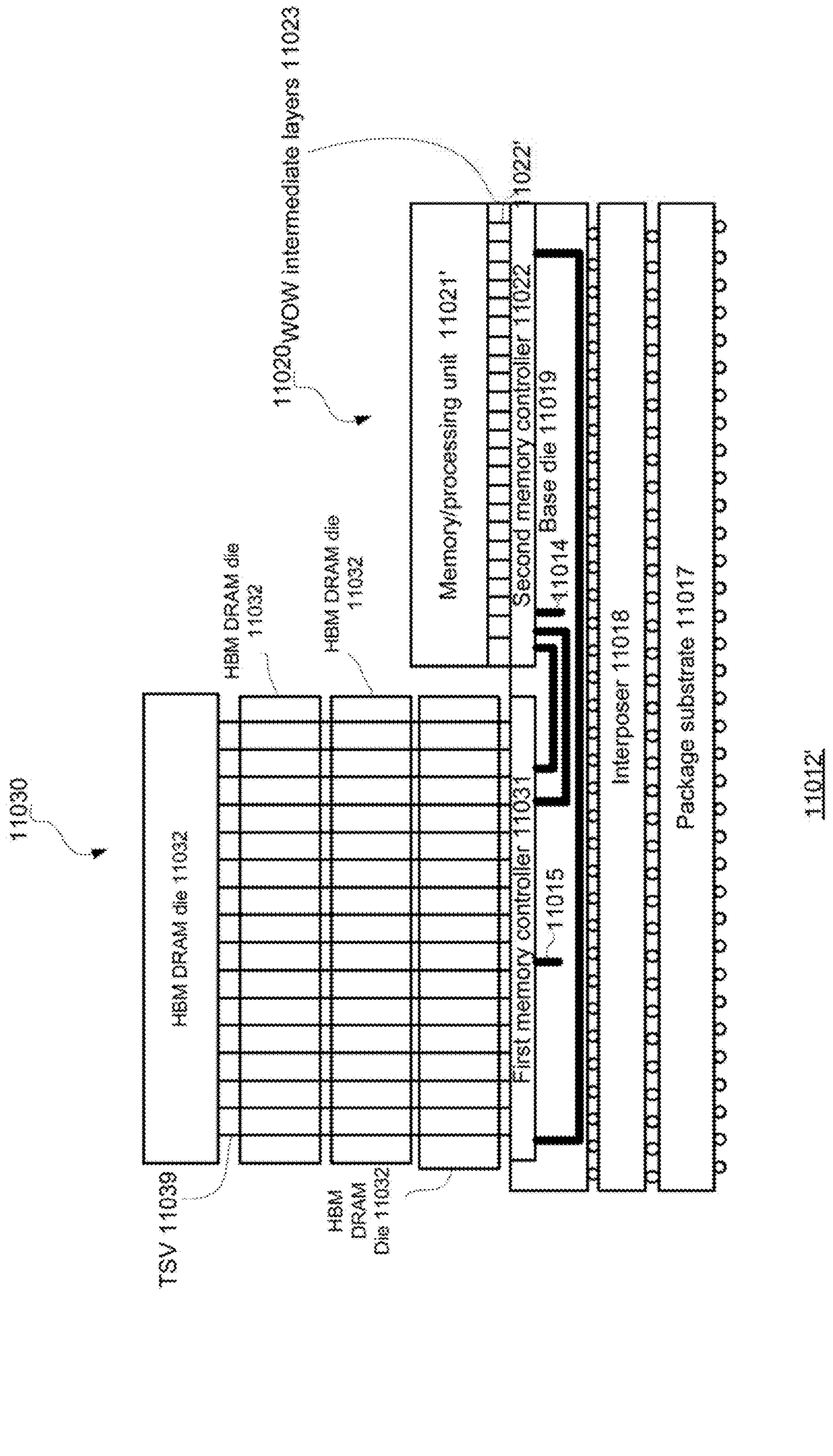
Figure 93C:
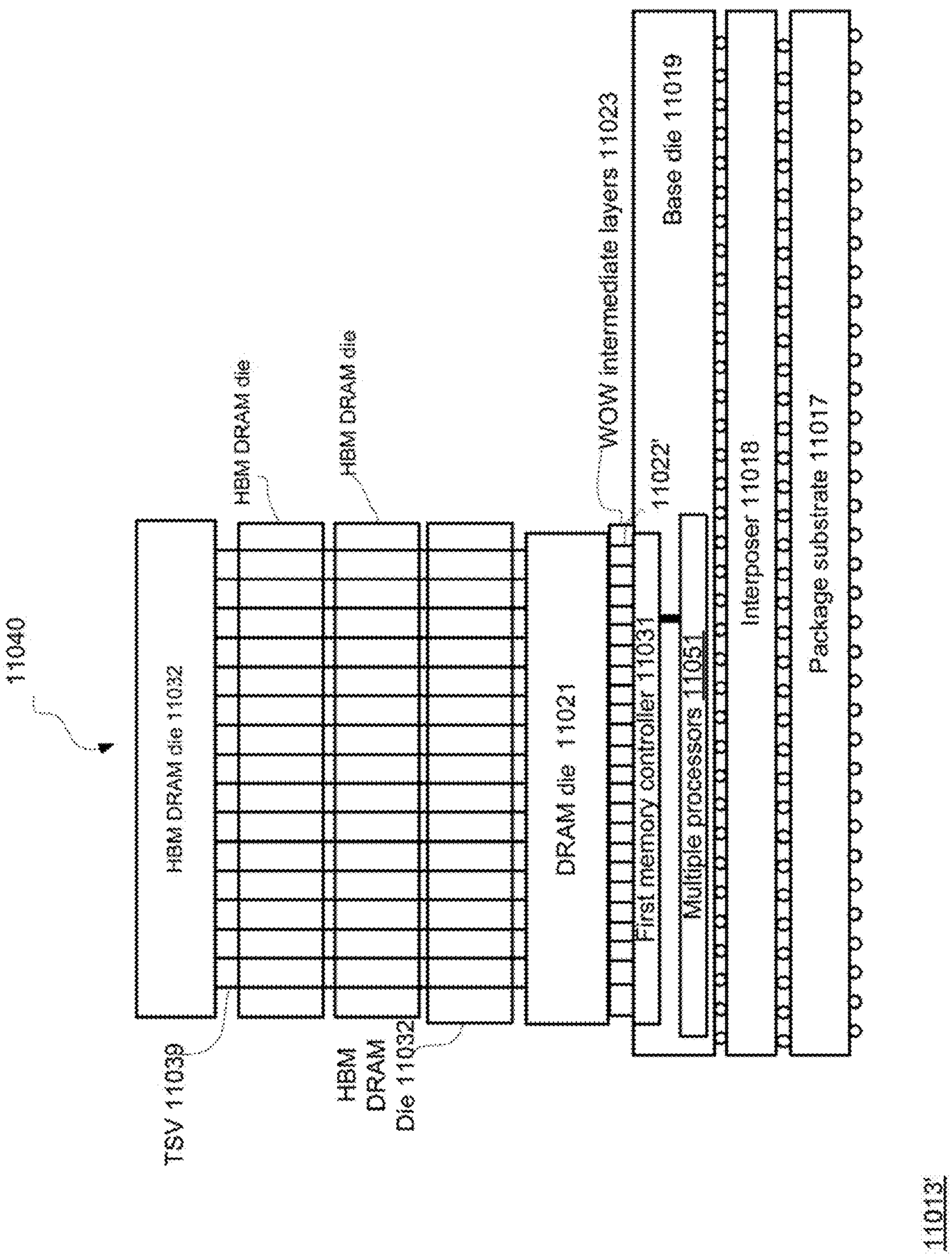
Figure 93D:
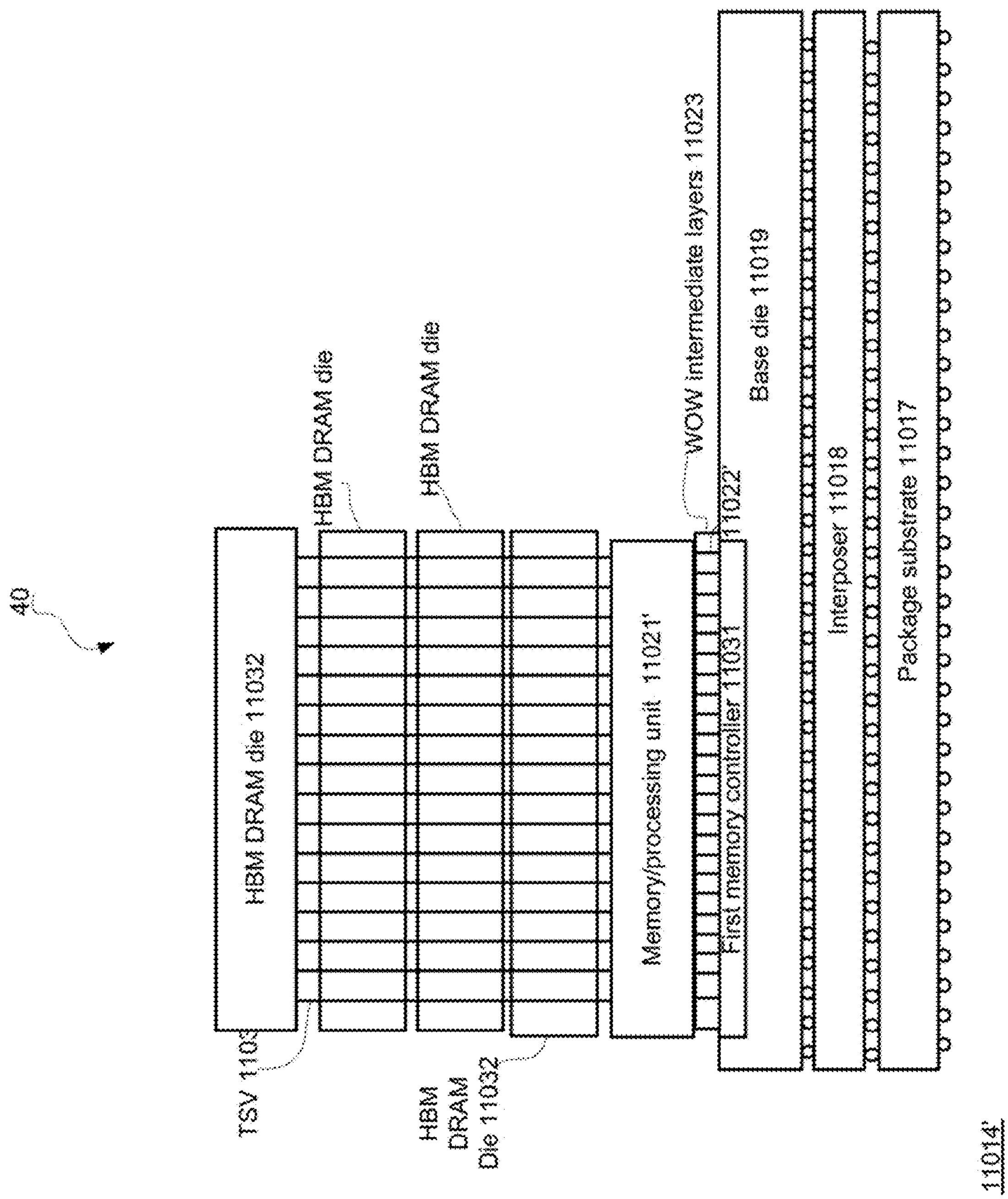
Figure 93E:
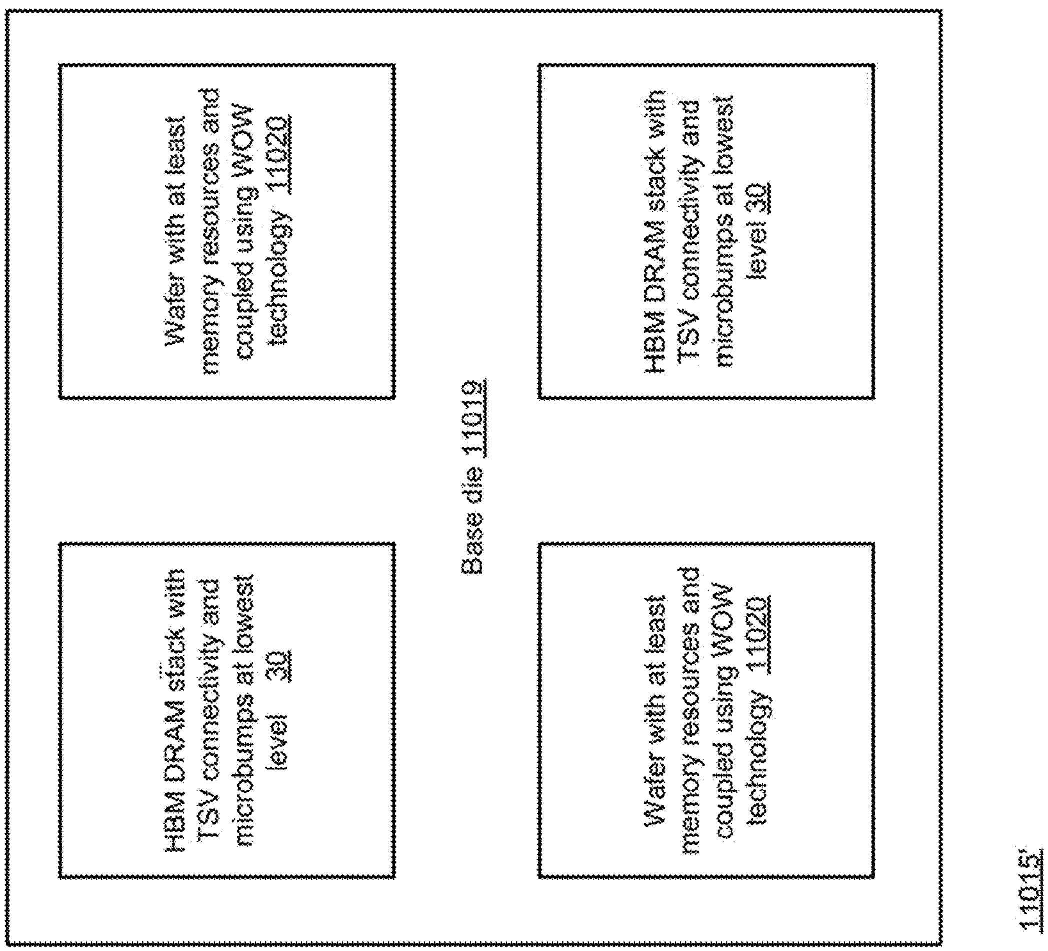
Figure 93F:
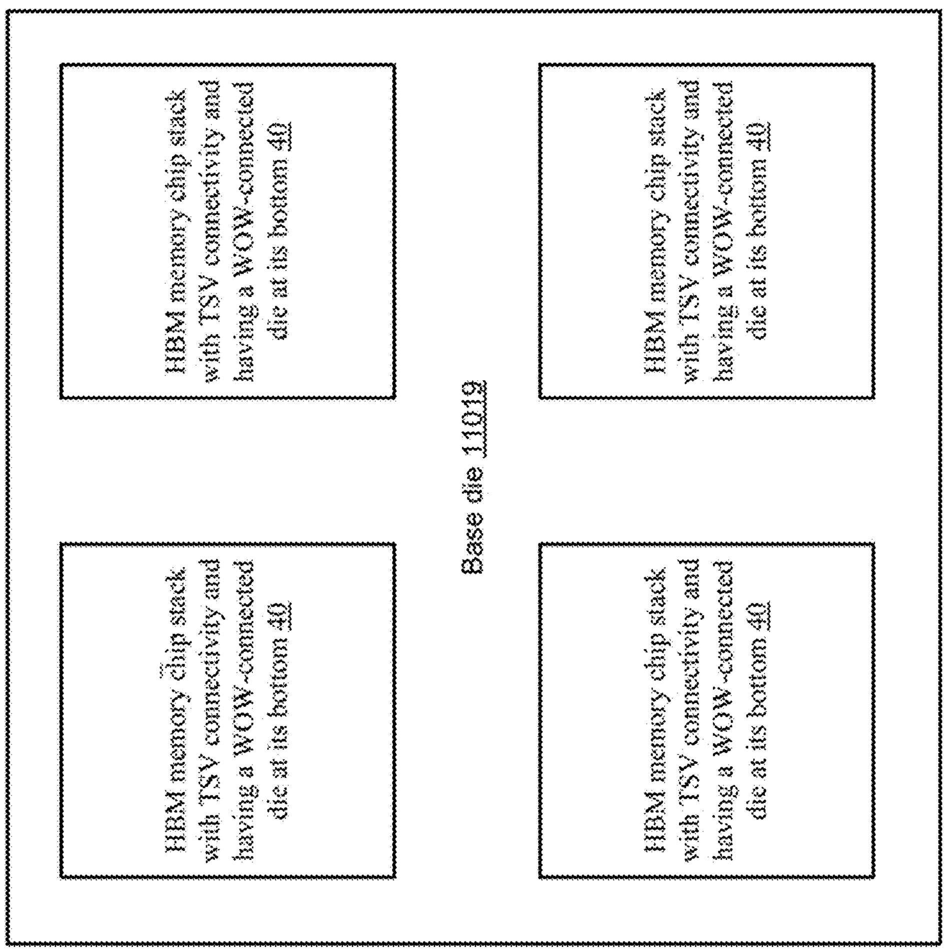
Figure 93G:
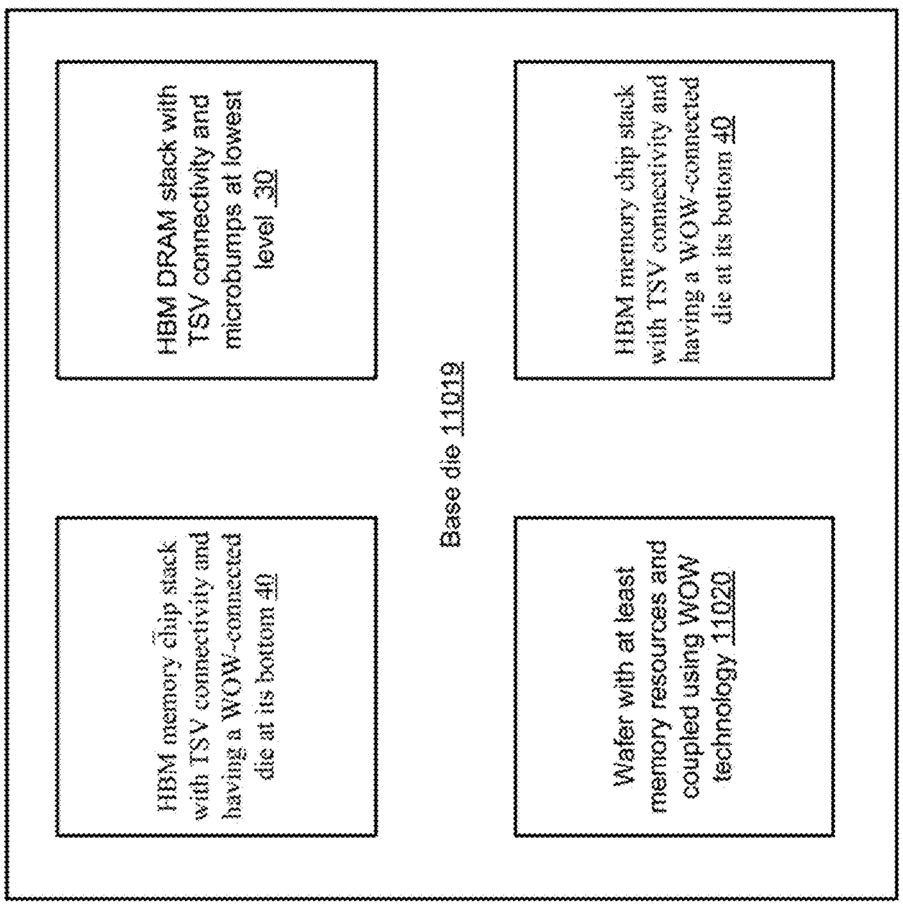
Figure 93H:
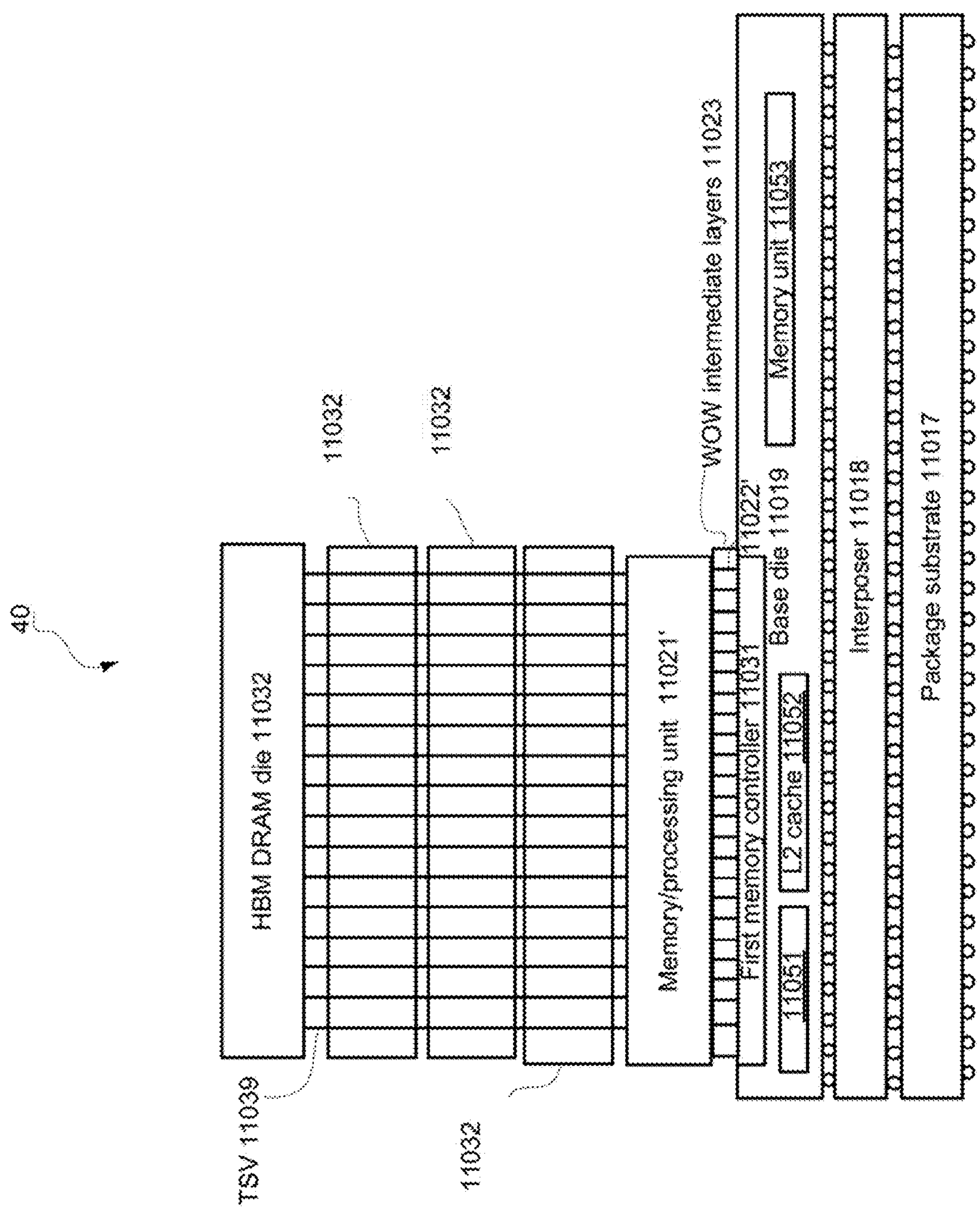
Figure 93I:
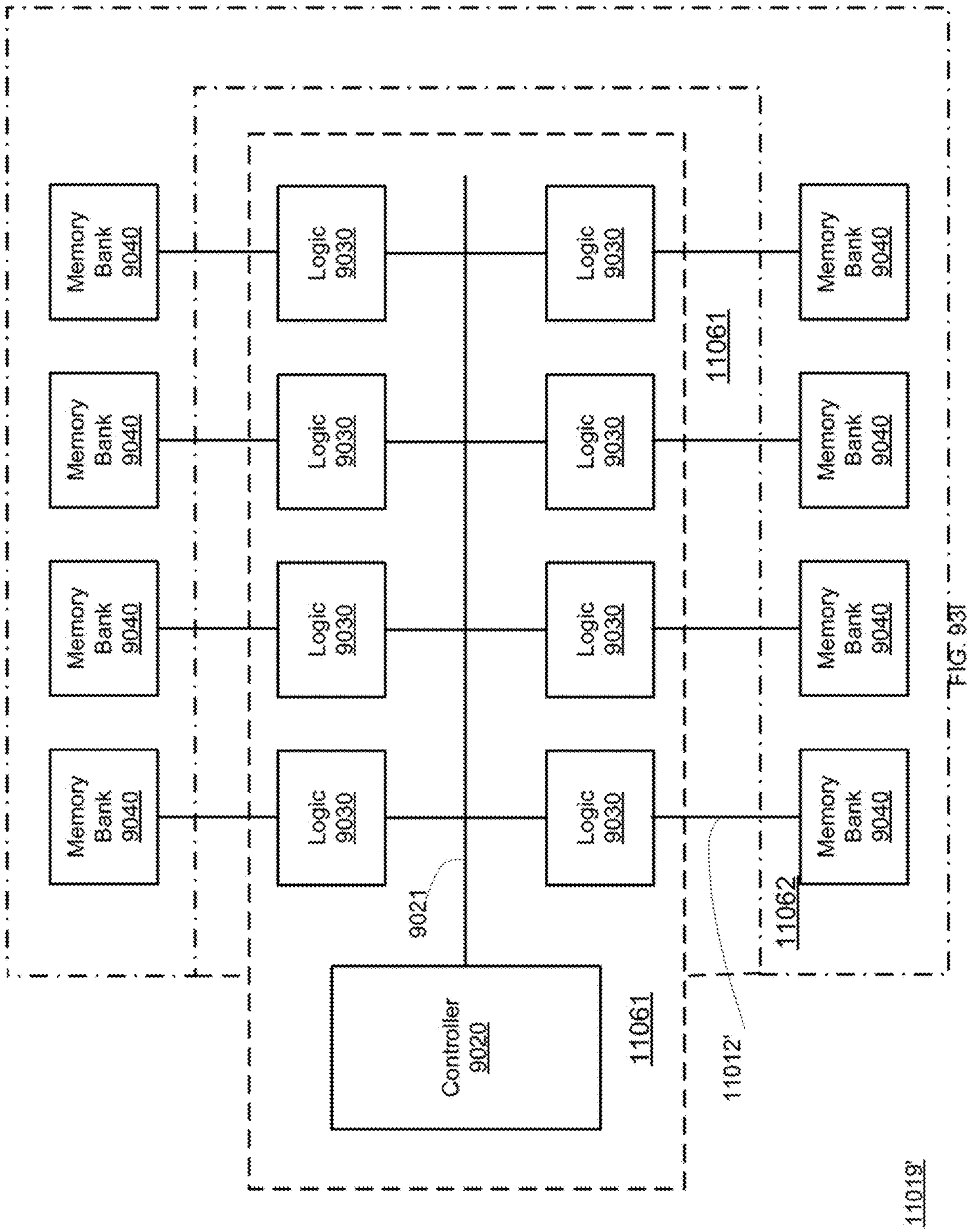
Figure 93J:
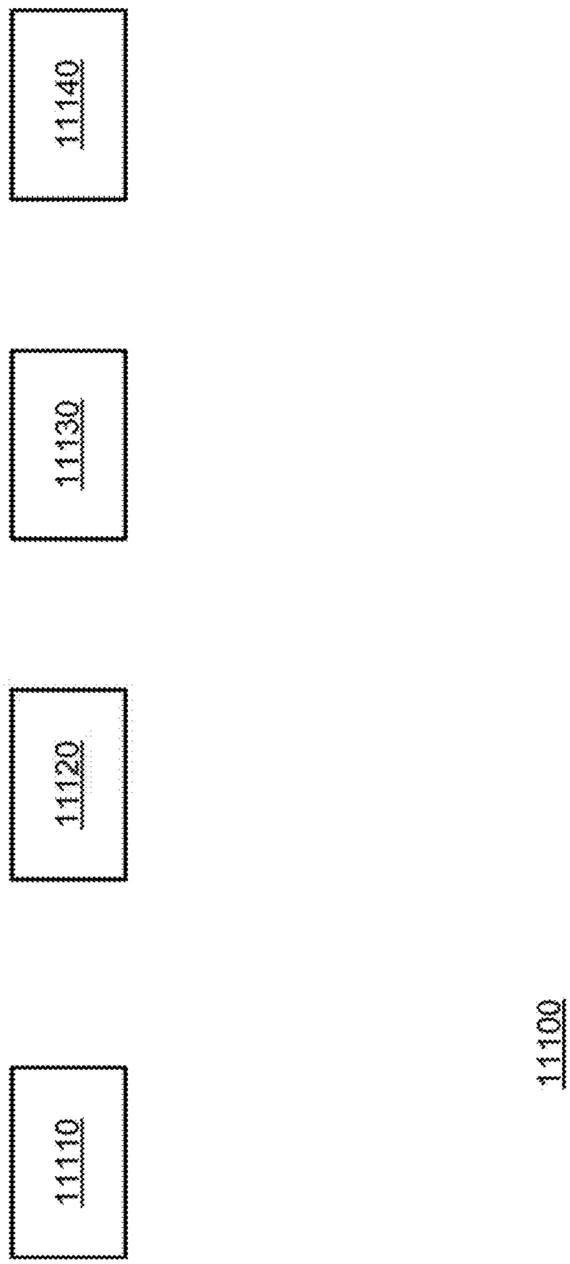
Figure 94A:
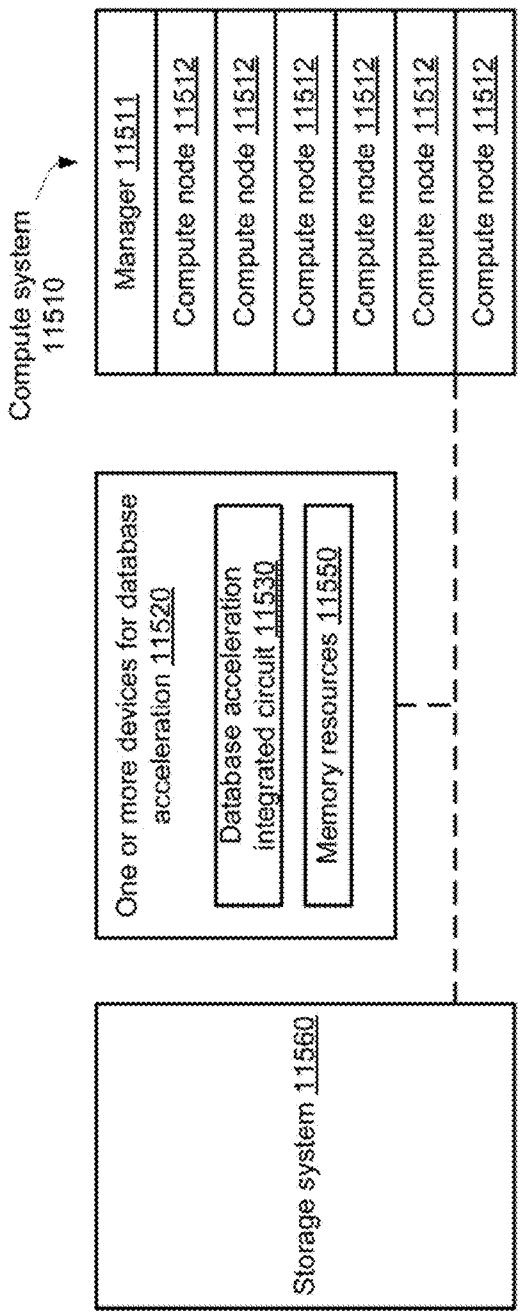
Figure 94B:
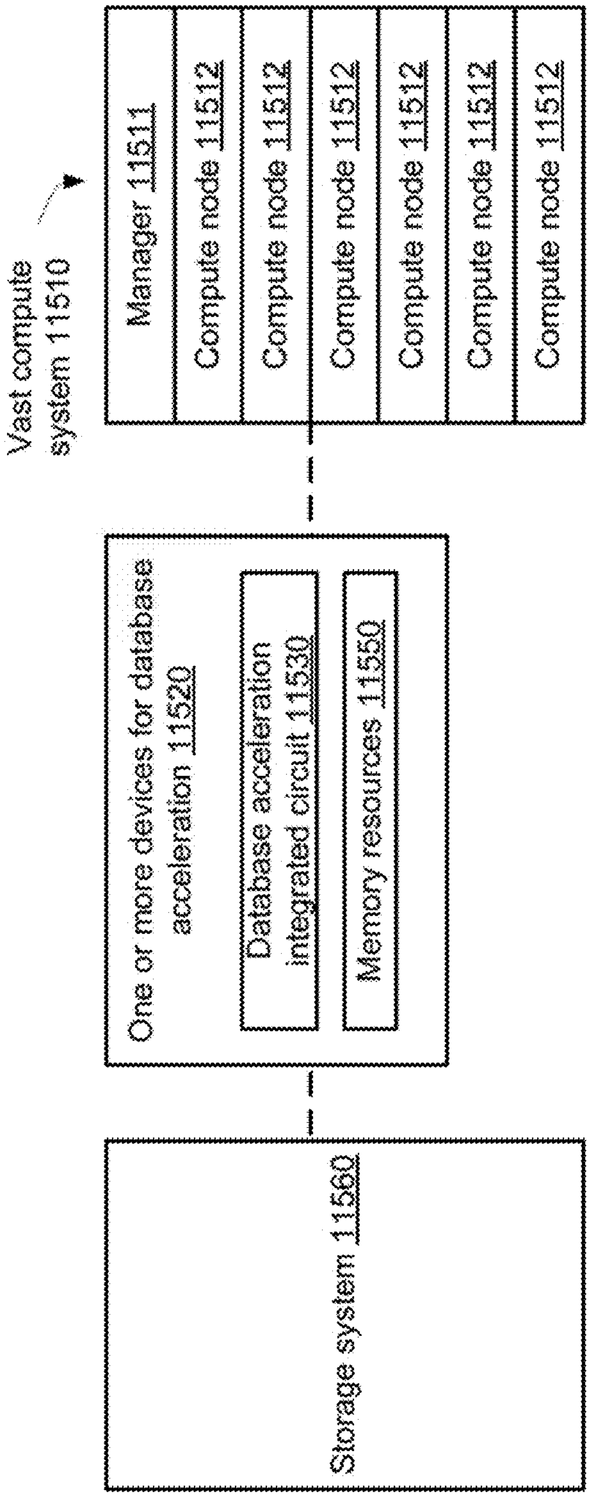
Figure 94C:
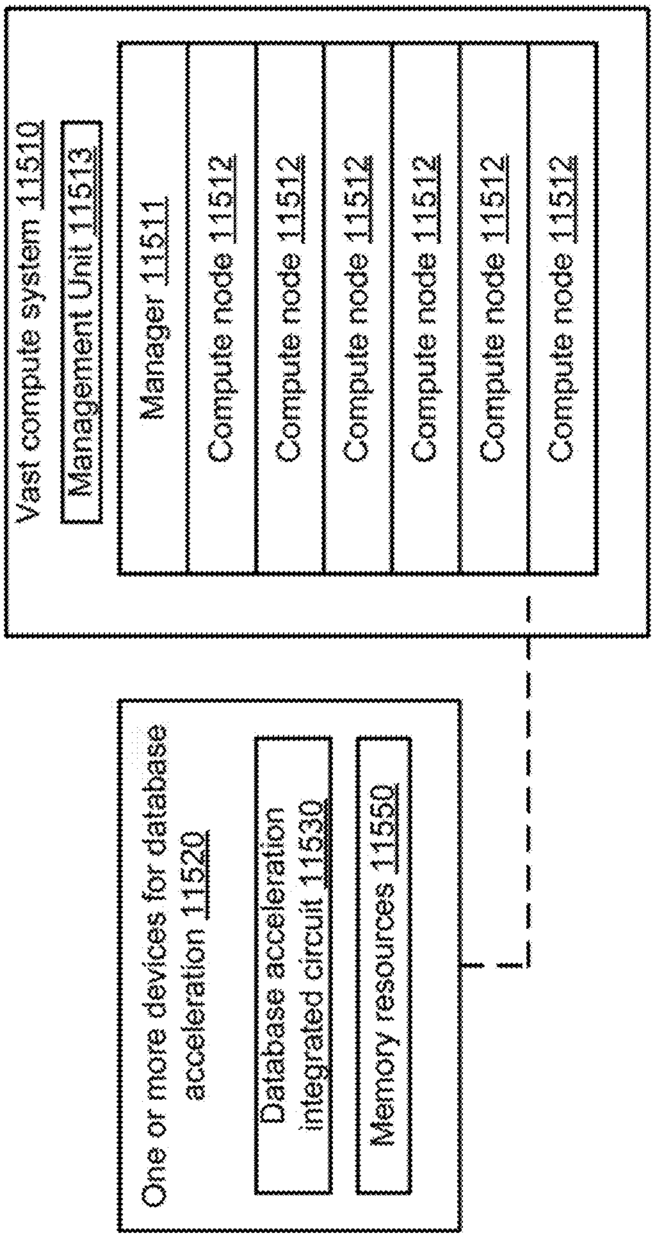
Figure 94D:
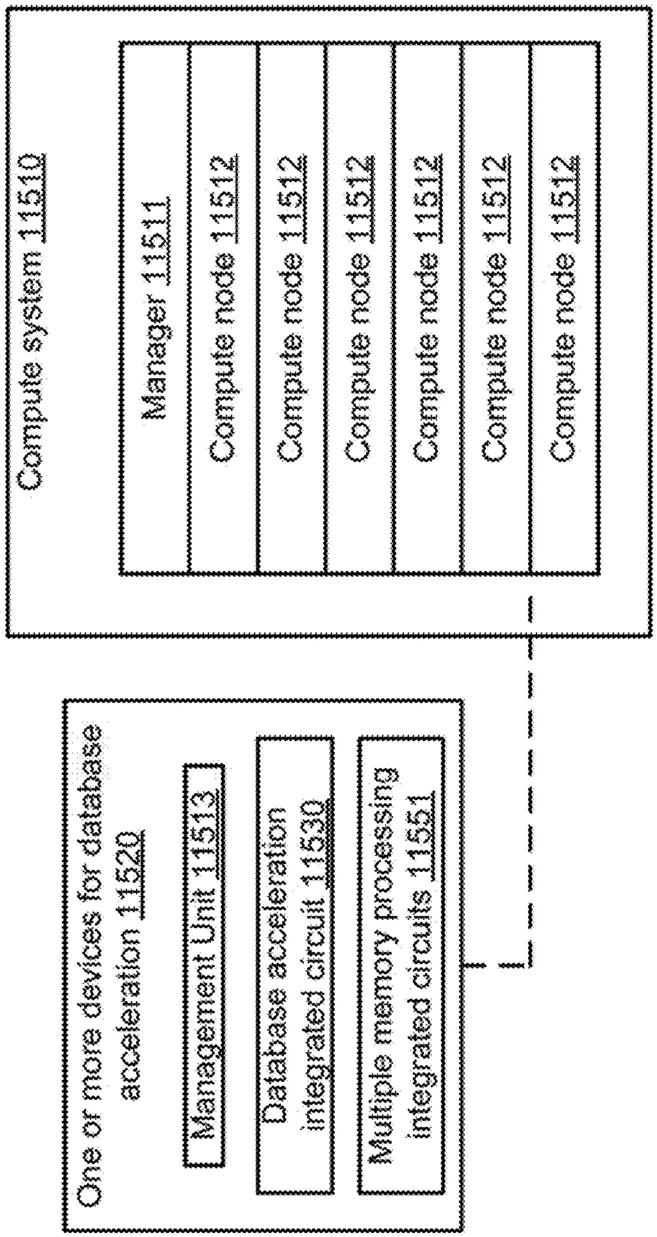
Figure 94E:
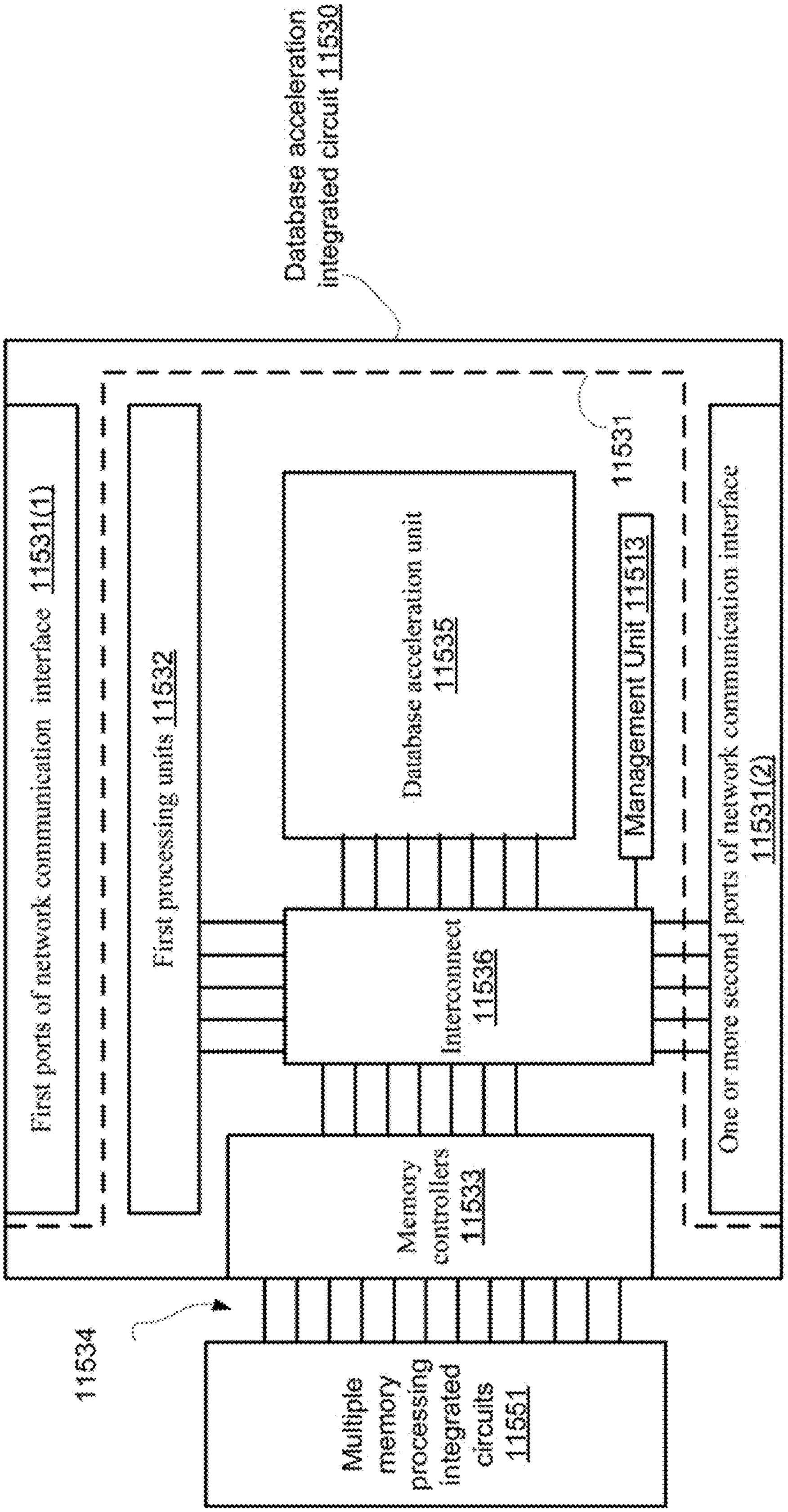
Figure 94F:
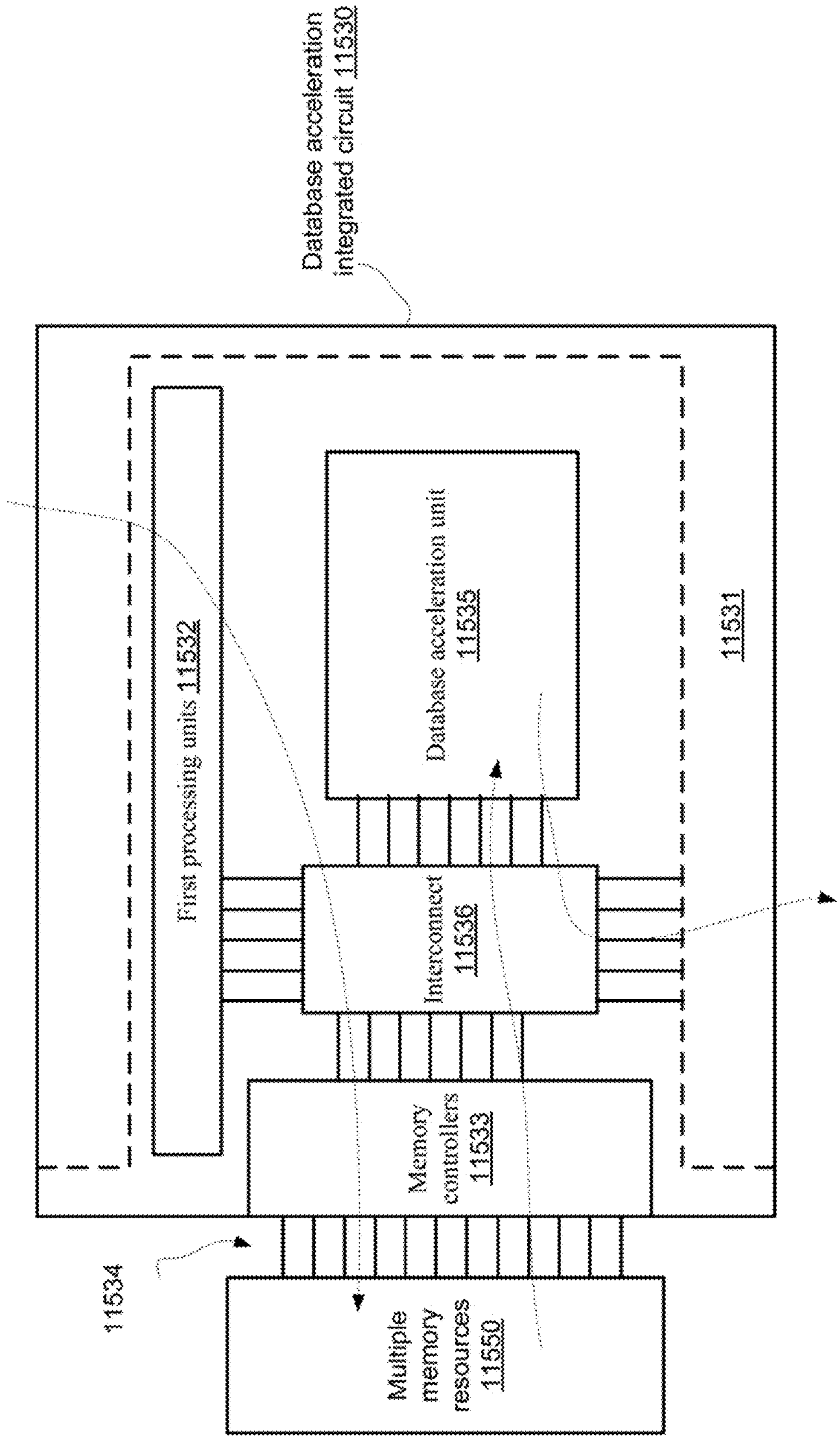
Figure 94G:
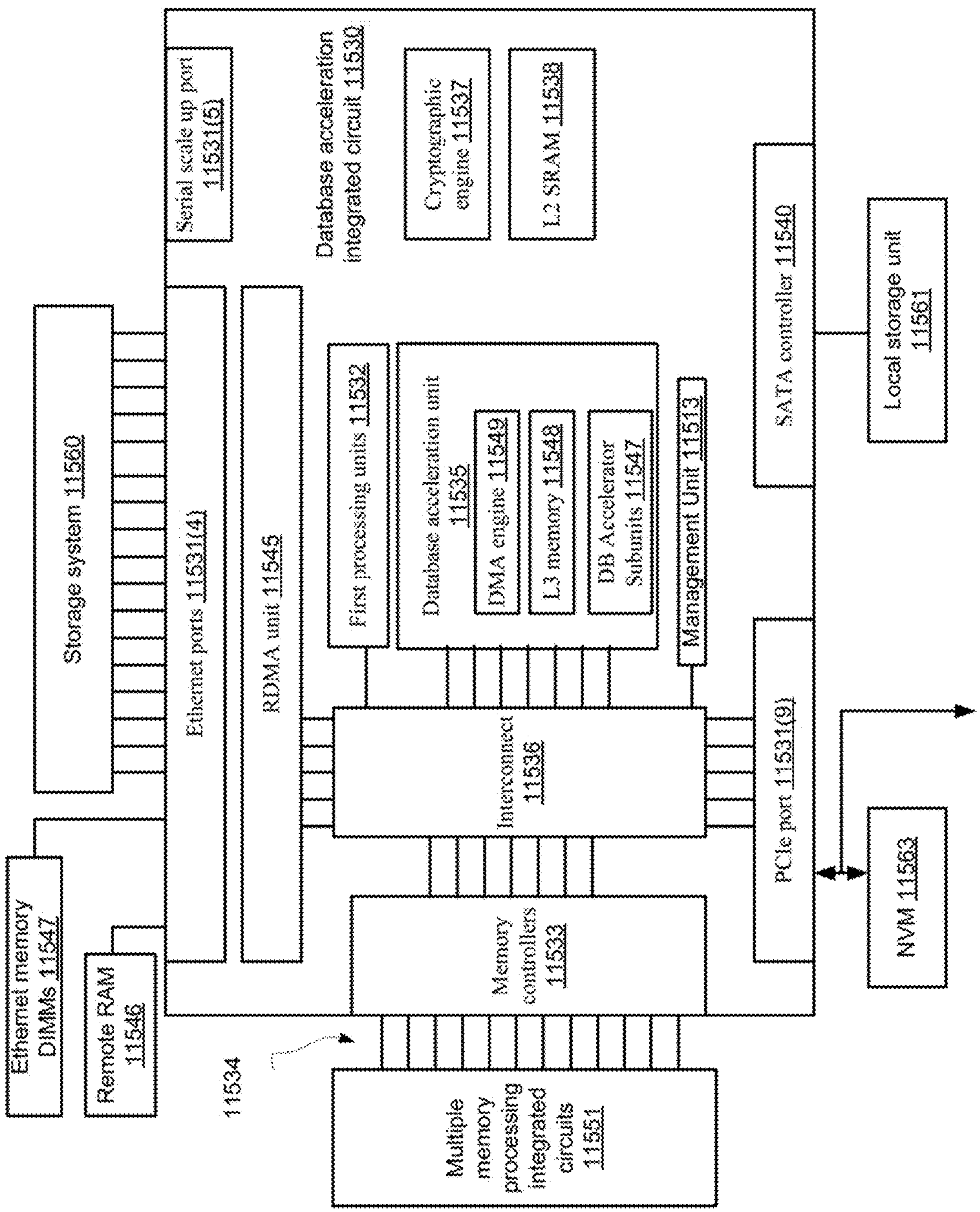
Figure 94H:
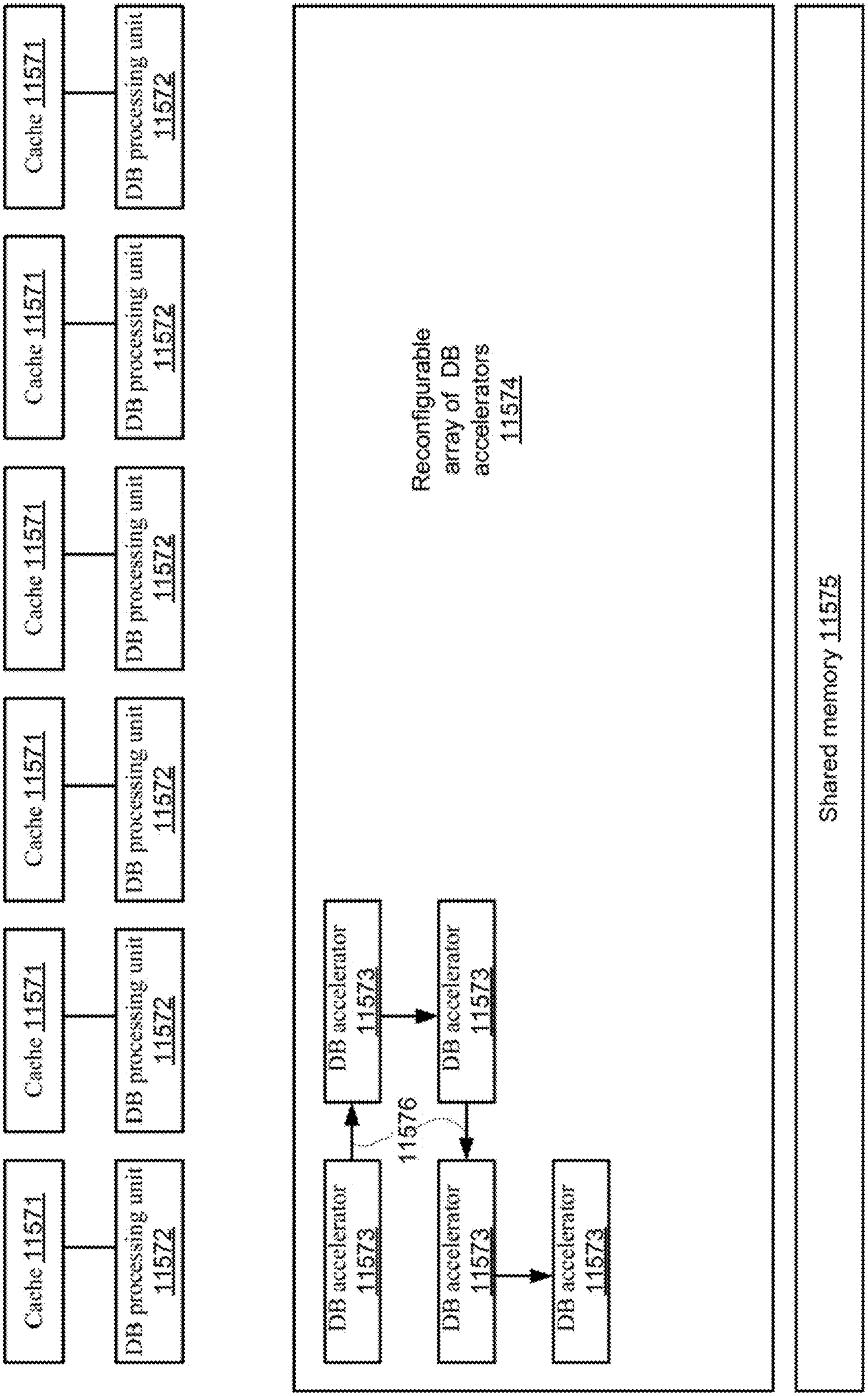
Figure 94I:
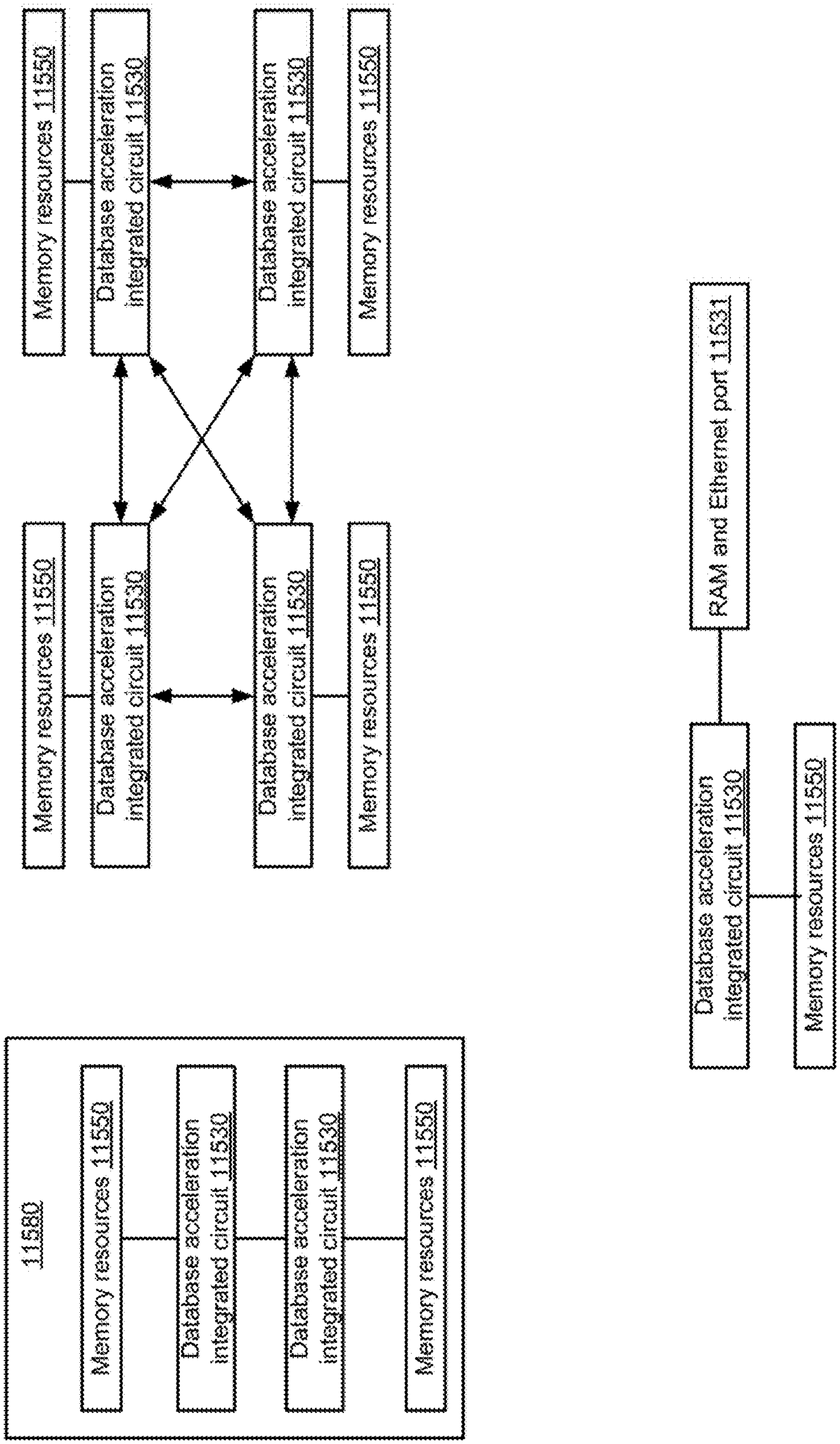
Figure 94J:
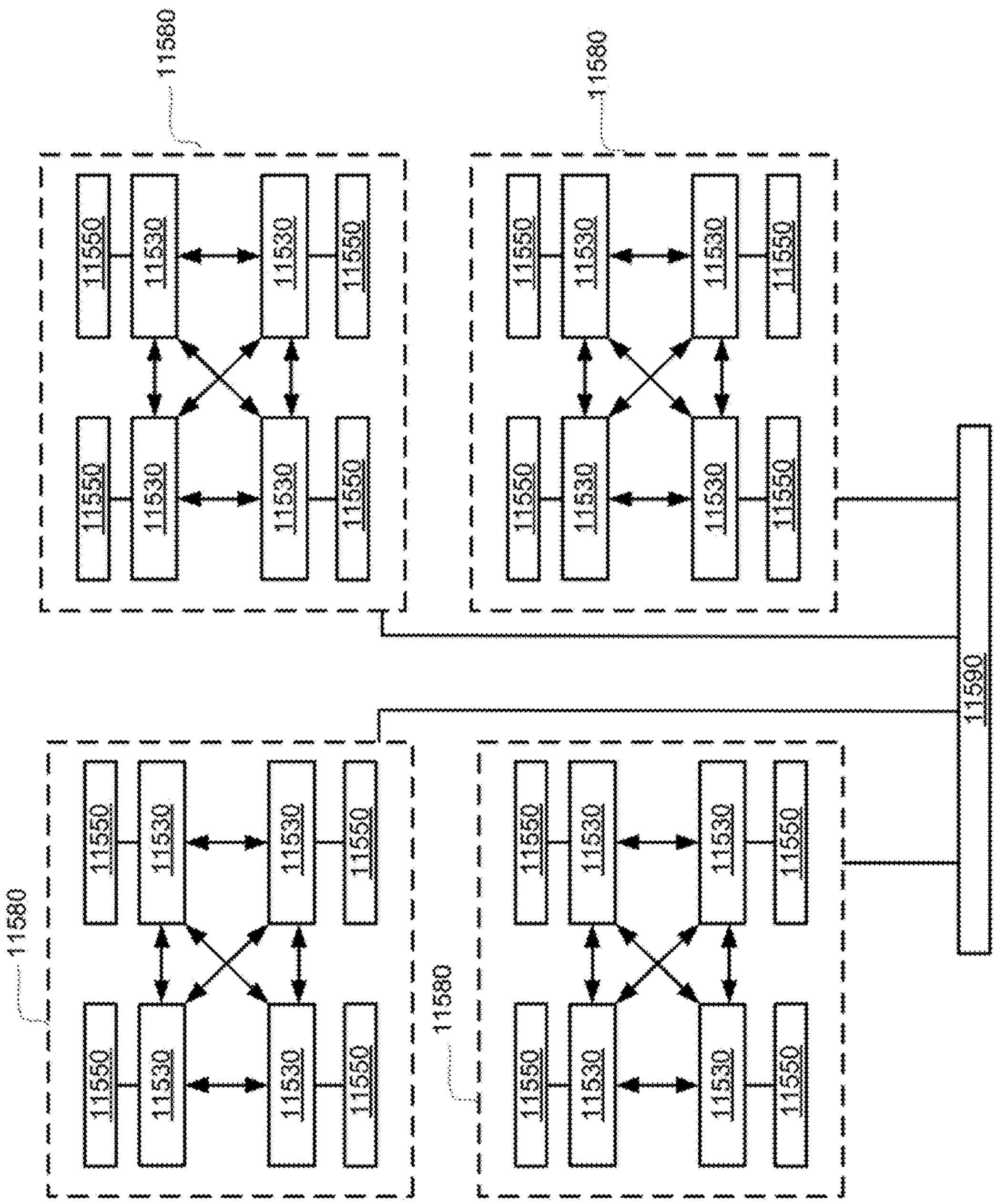
Figure 94K:
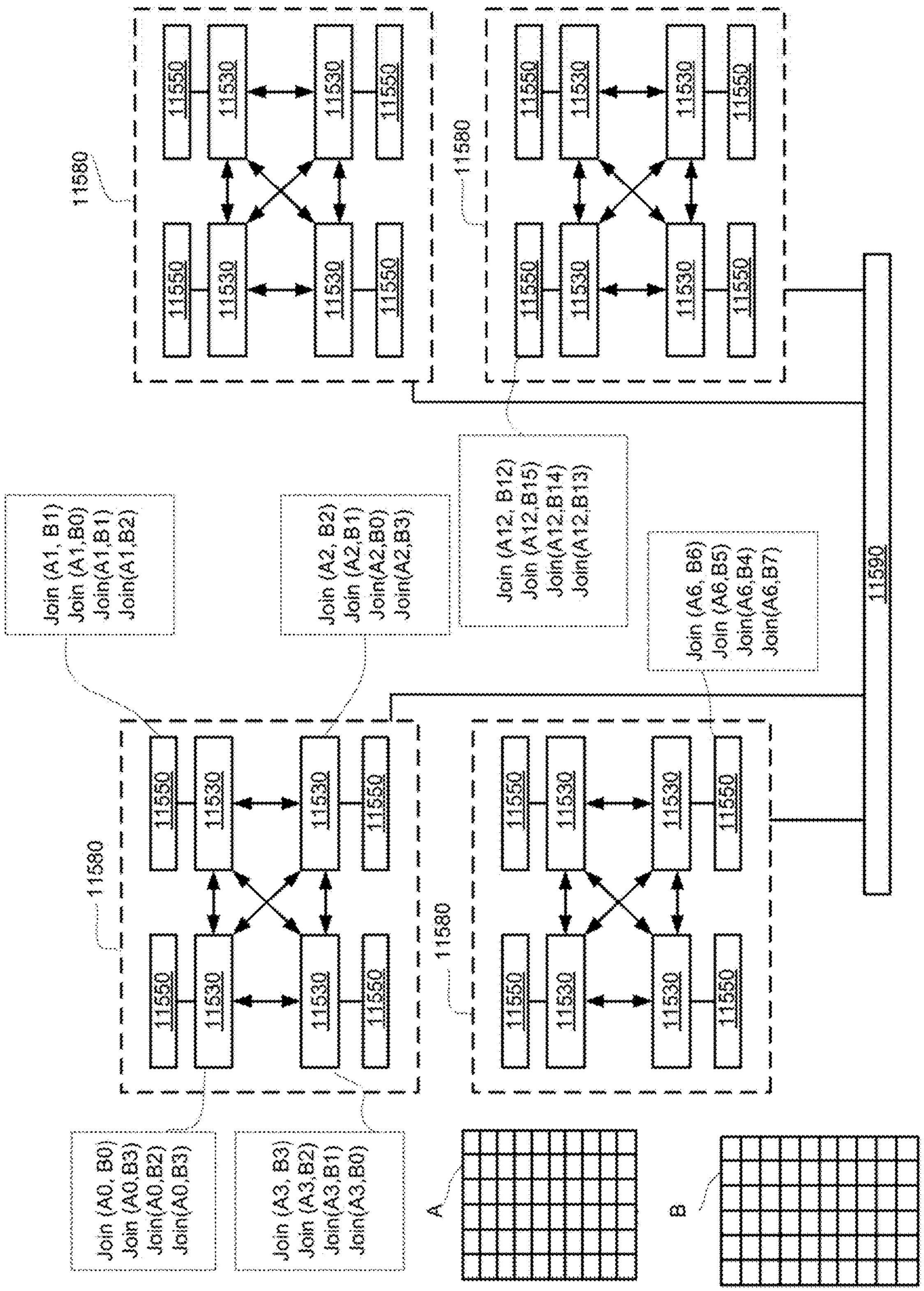
Figure 94L:
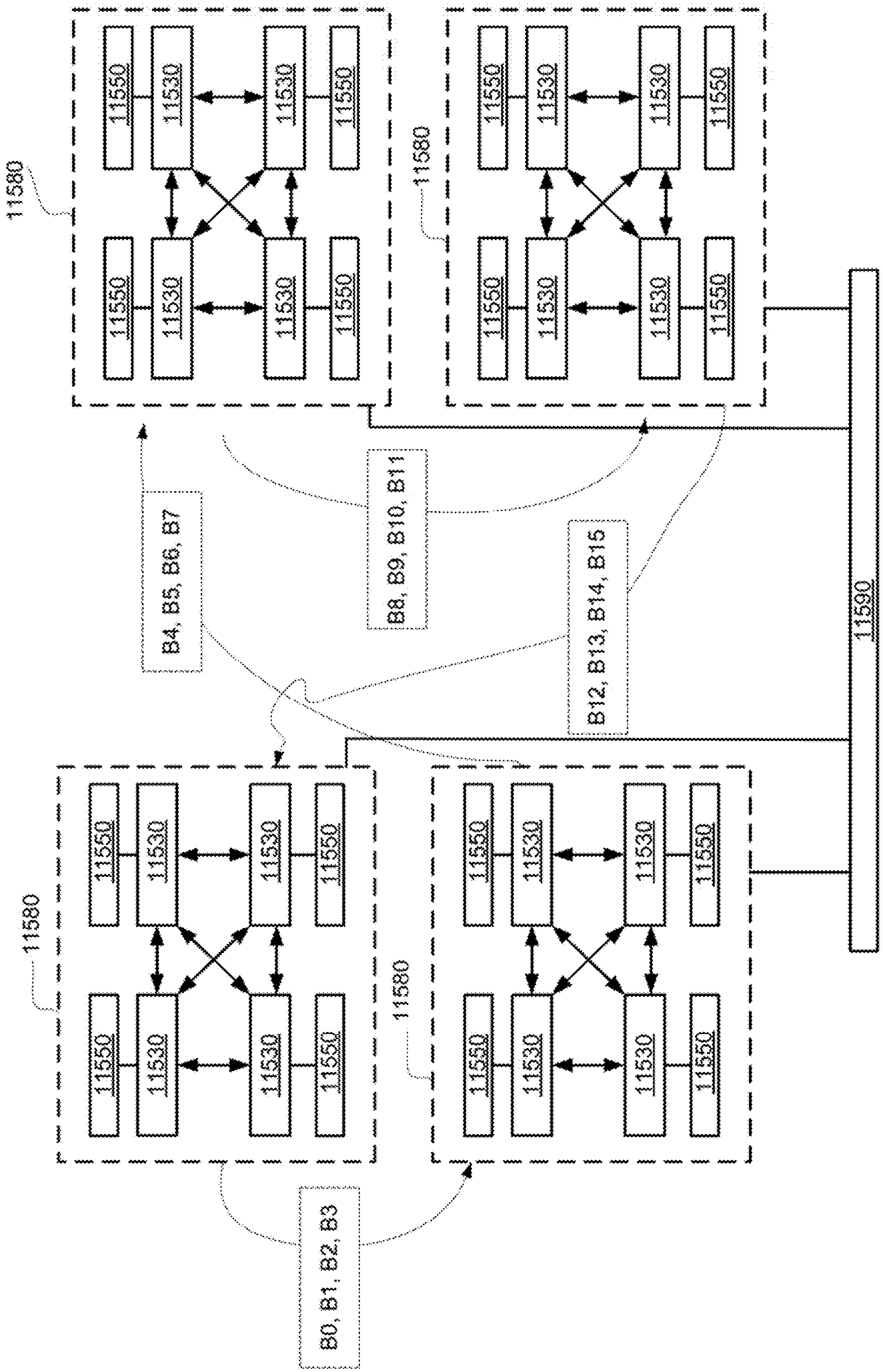
Figure 94M:
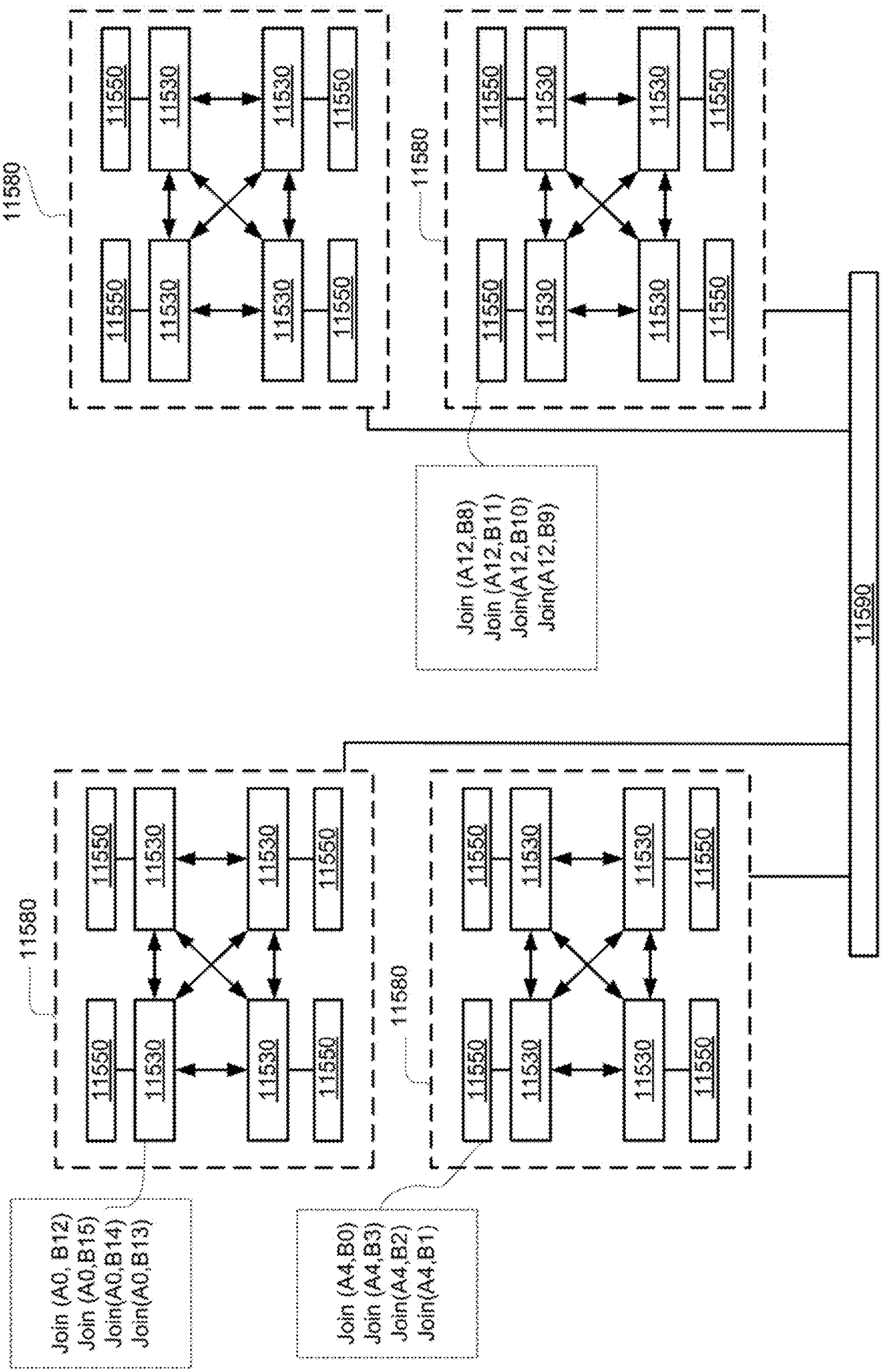
Figure 94N:
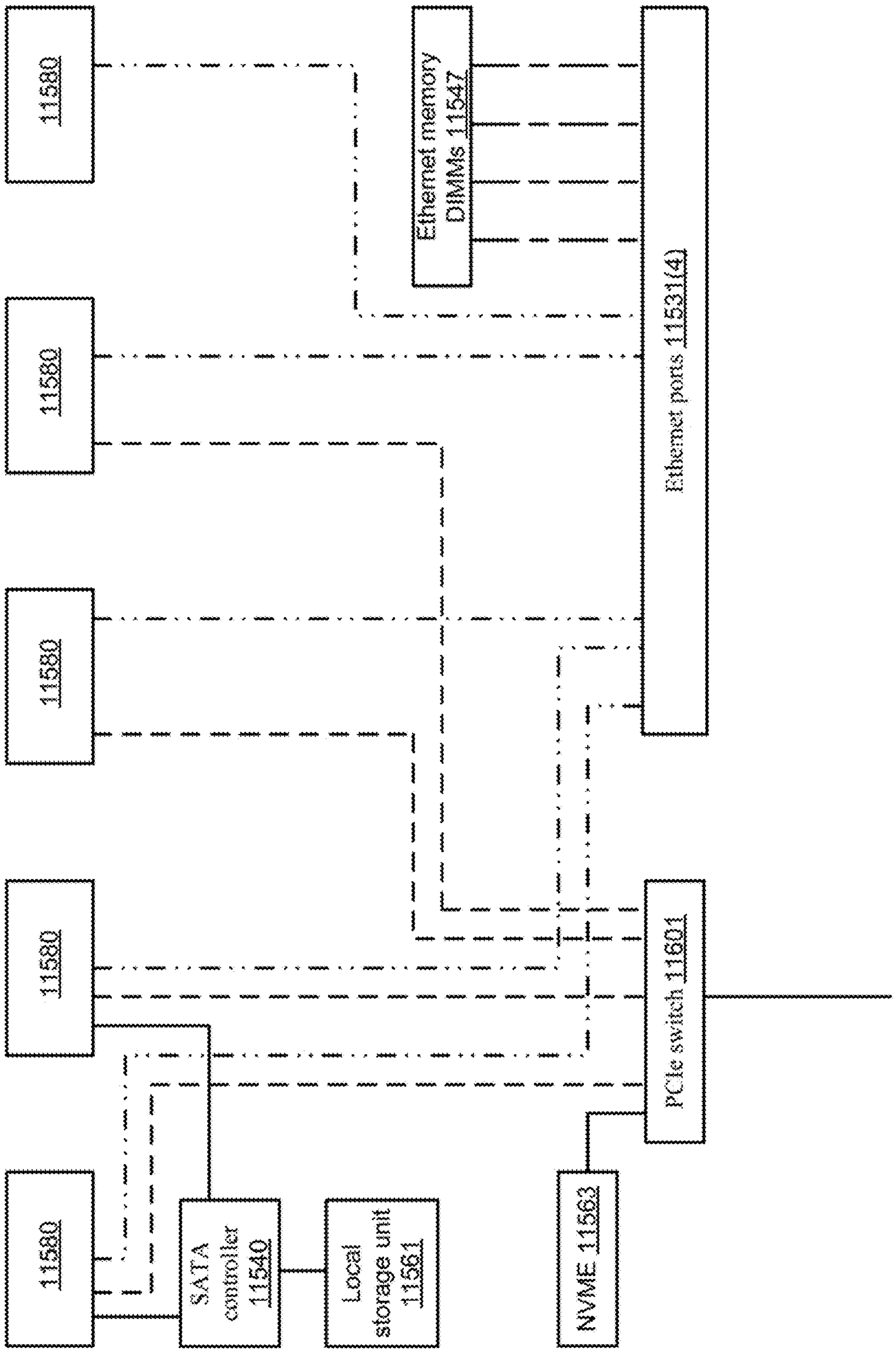
Figure 94O:
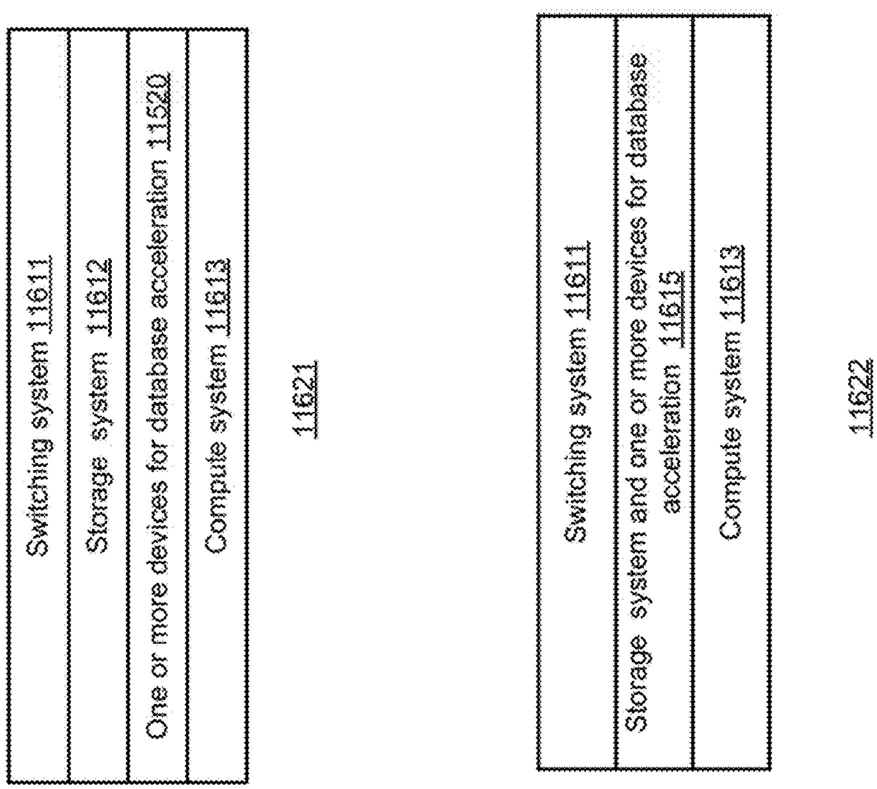
Figure 94P:
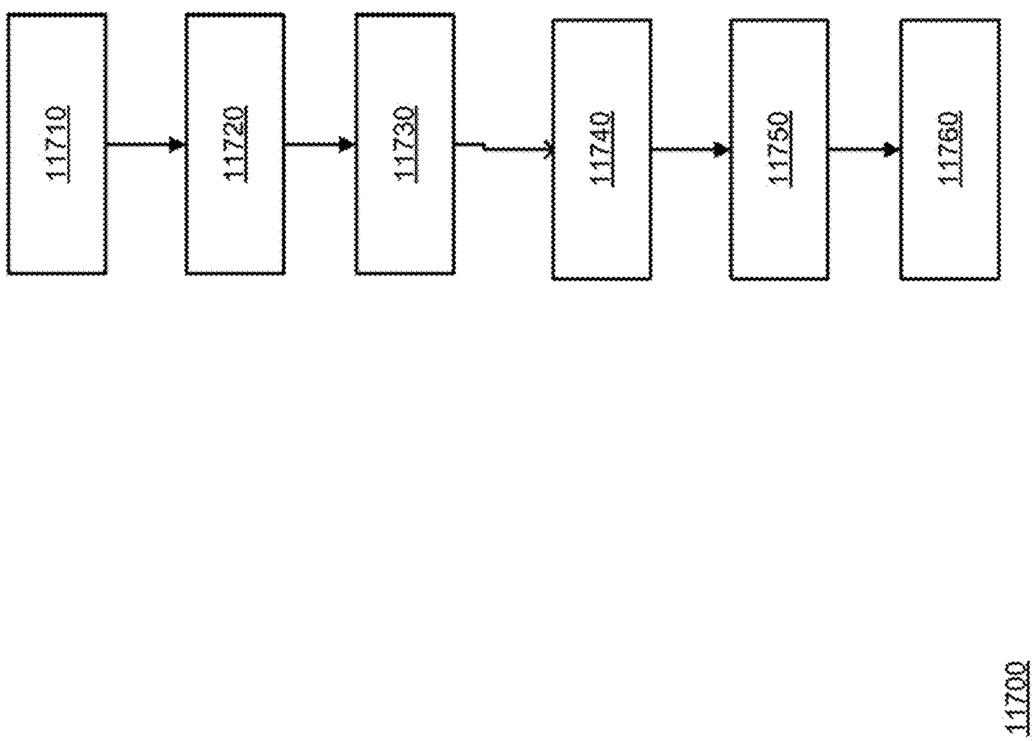
Figure 95A:
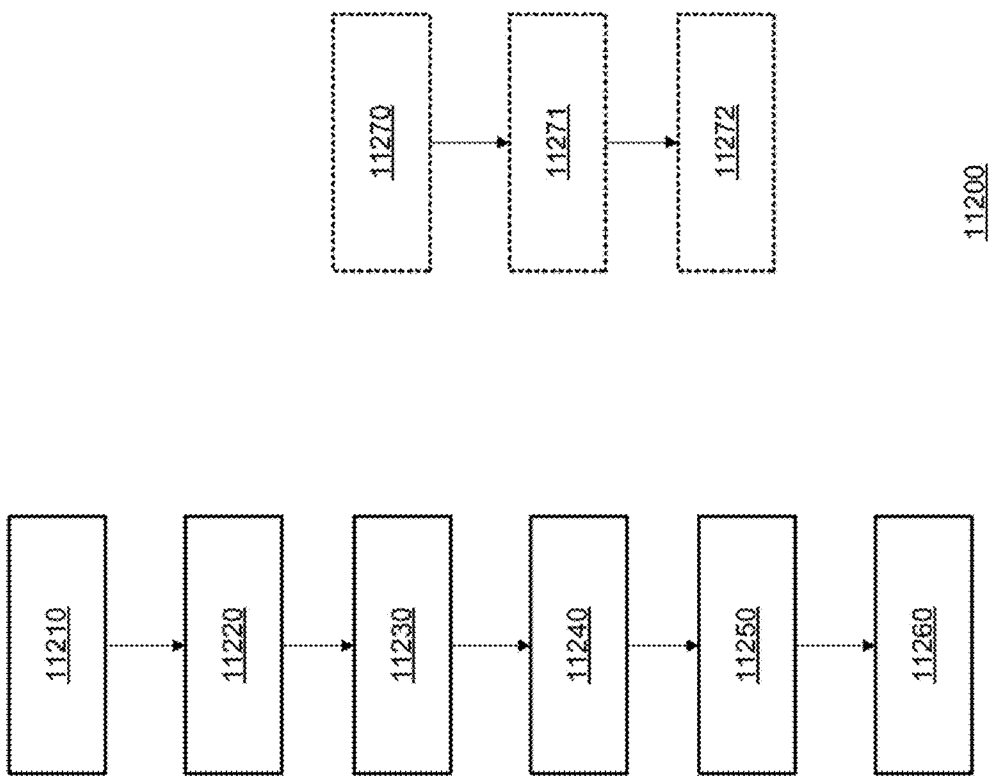
Figure 95B:
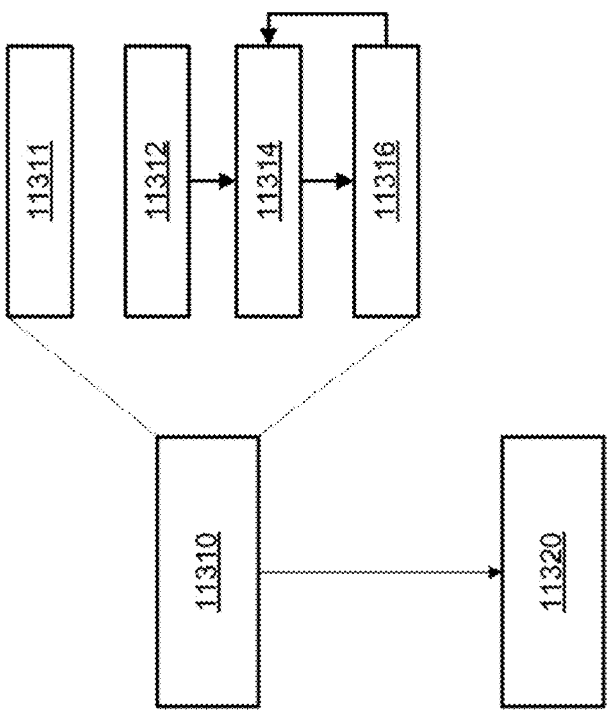
Figure 95C:
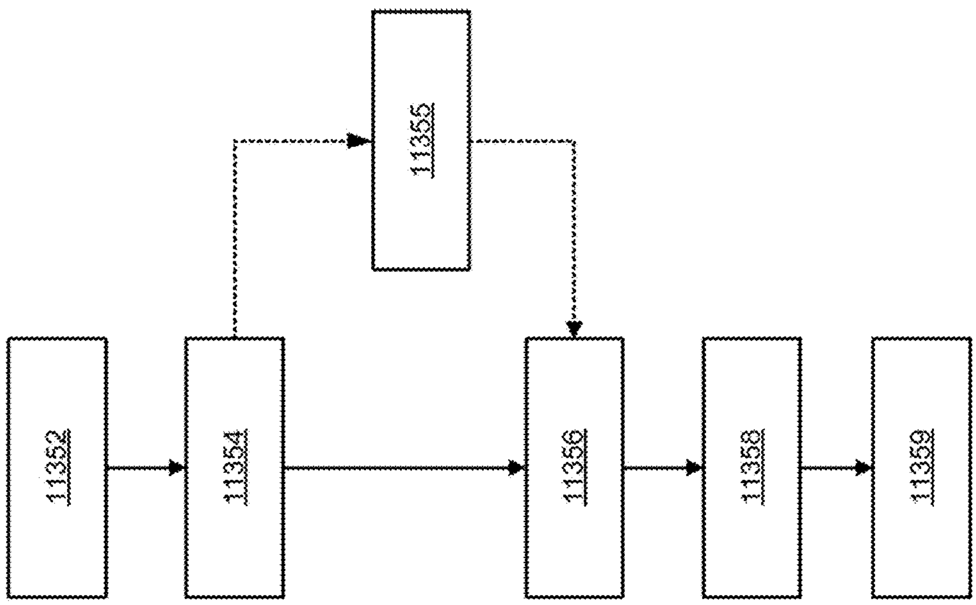
Figure 96A:
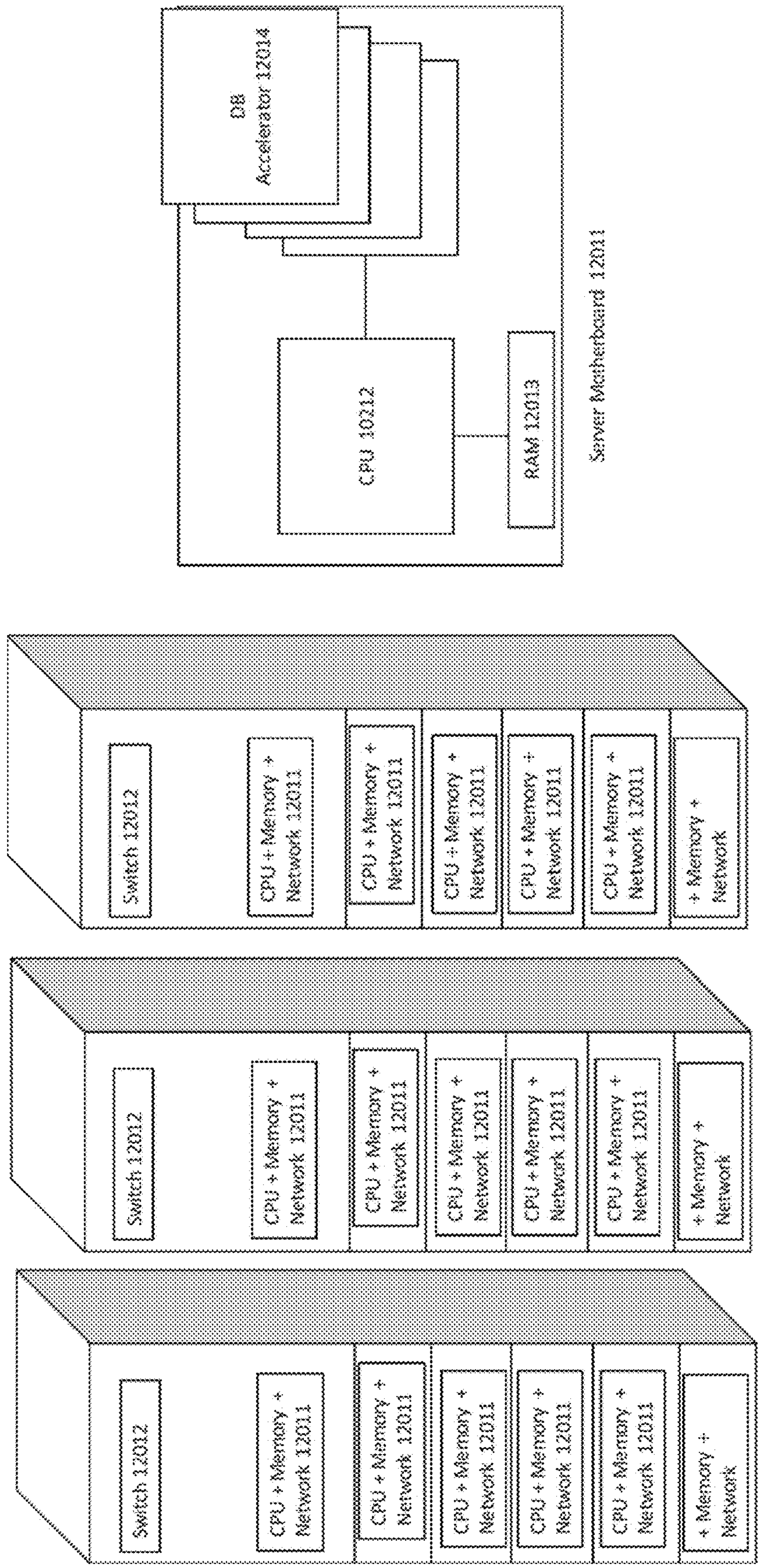
Figure 96B:
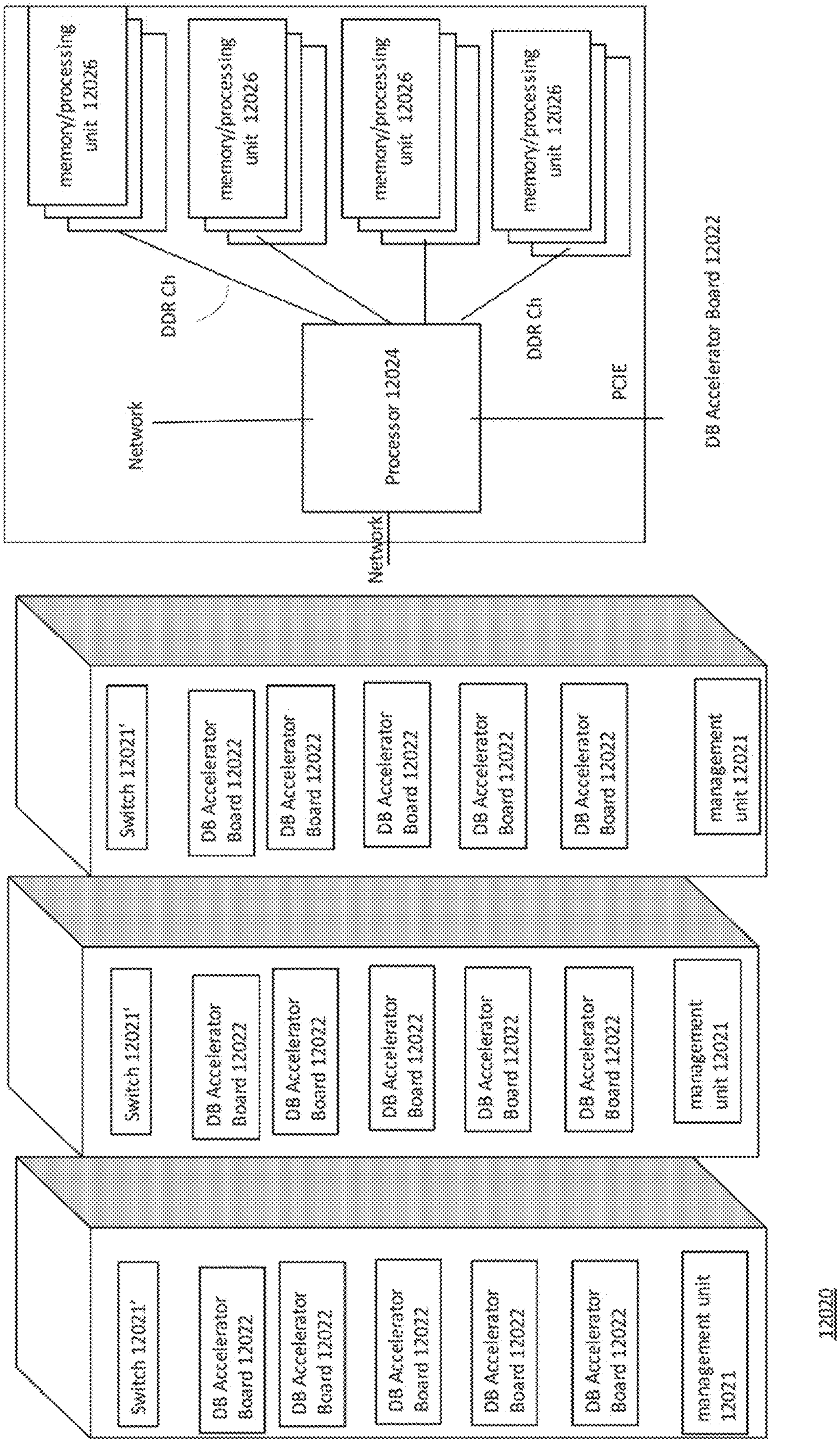
Figure 96C:
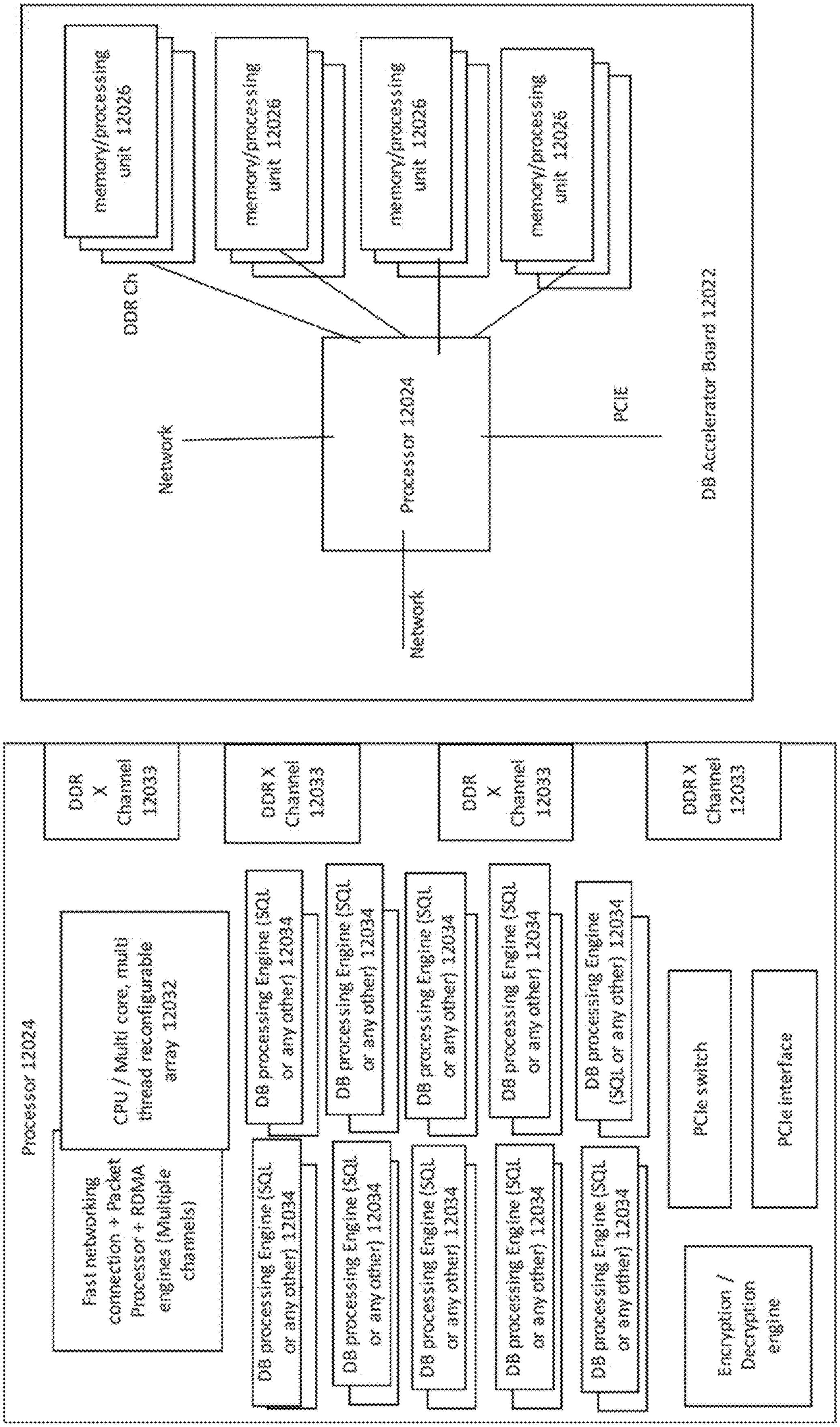
Figure 96D:
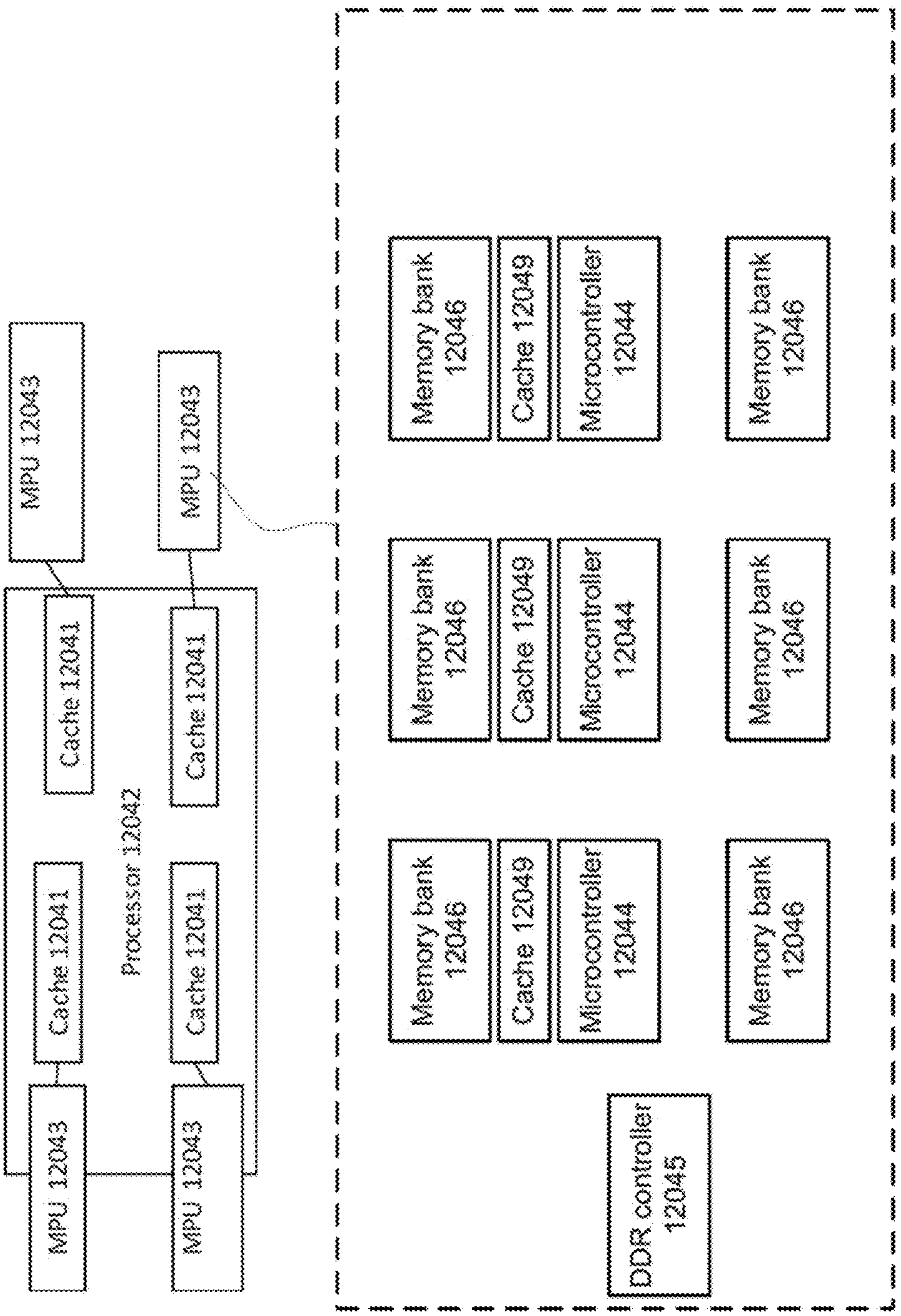
Figure 97A:
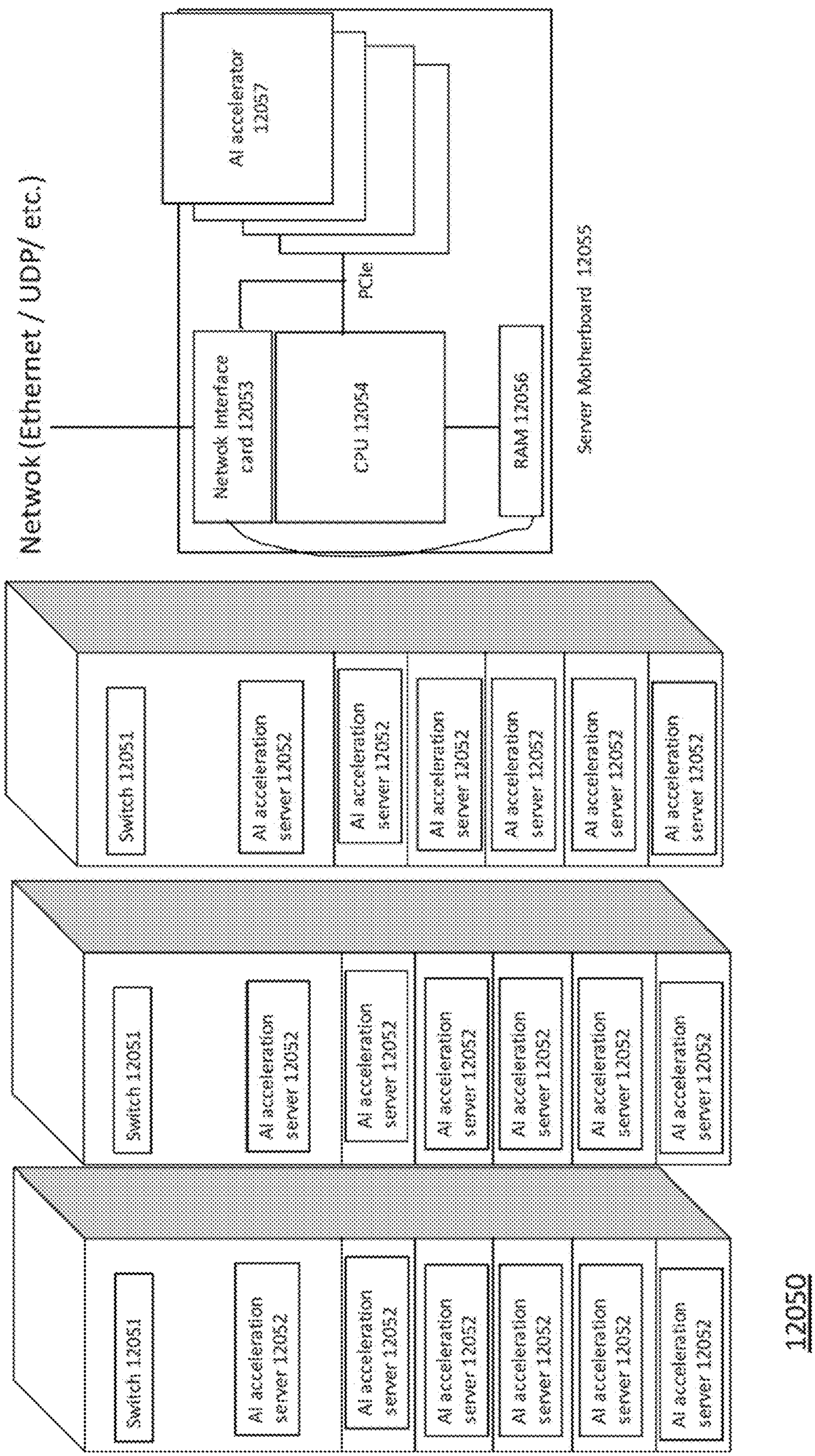
Figure 97B:
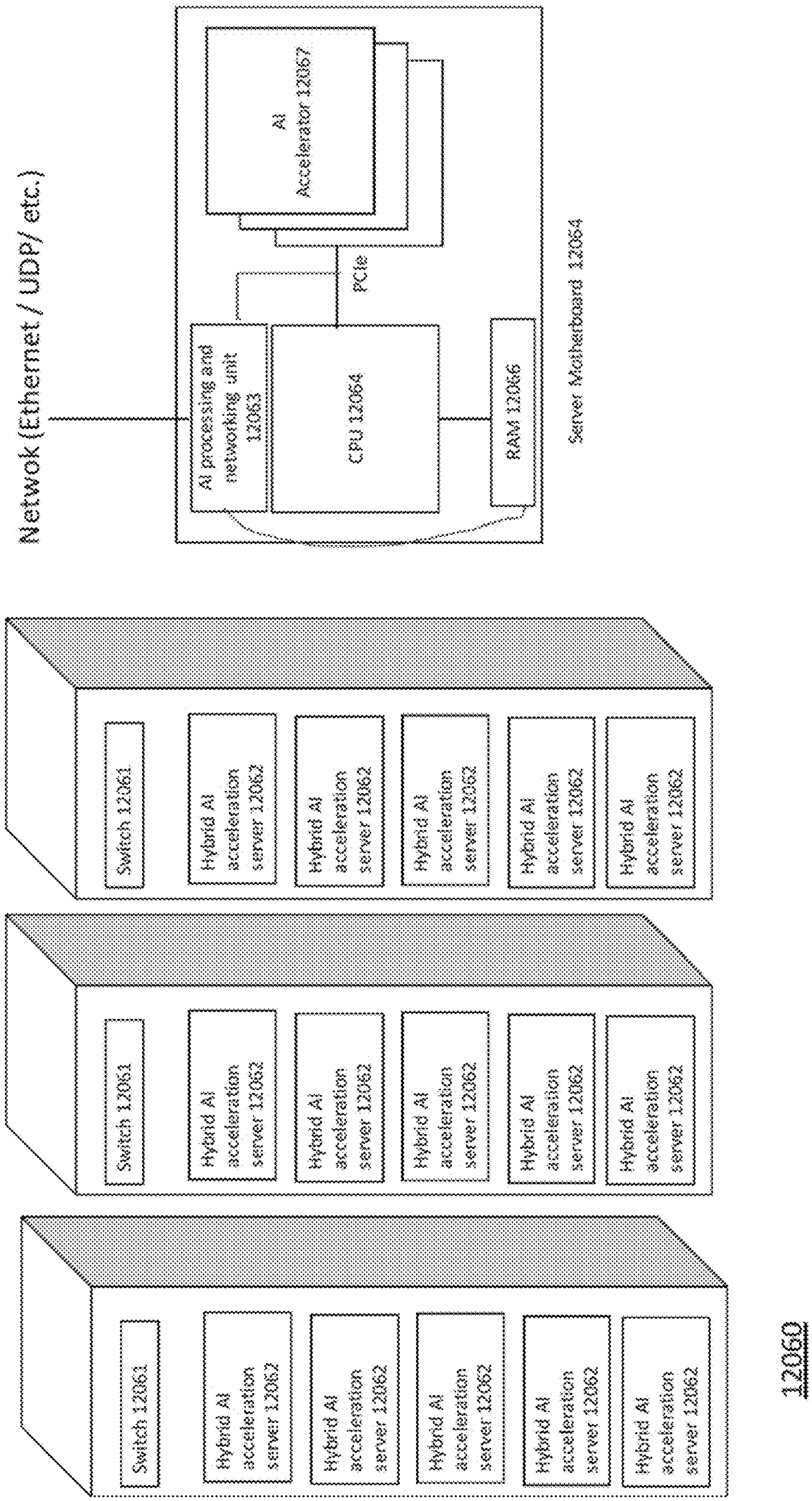

FIG. 87A includes examples of disaggregated servers;

FIG. 87B is an example of a distributed processing;

FIG. 87C is an example of a memory/processing unit;

FIG. 87D is an example of a memory/processing unit;

FIG. 87E is an example of a memory/processing unit;

FIG. 87F is an example of an integrated circuit that includes a memory/processing unit and one or more communication modules;

FIG. 87G is an example of an integrated circuit that includes a memory/processing unit and one or more communication modules;

FIG. 87H is an example of a method;

FIG. 87I is an example of a method;

FIG. 88A is an example of a method;

FIG. 88B is an example of a method;

FIG. 88C is an example of a method;

FIG. 89A is an example of a memory/processing unit and of a vocabulary;

FIG. 89B is an example of a memory/processing unit;

FIG. 89C is an example of a memory/processing unit;

FIG. 89D is an example of a memory/processing unit:

FIG. 89E is an example of a memory/processing unit;

FIG. 89F is an example of a memory/processing unit;

FIG. 89G is an example of a memory/processing unit;

FIG. 89H is an example of memory/processing units;

FIG. 90A is an example of a system;

FIG. 90B is an example of a system;

FIG. 90C is an example of a system;

FIG. 90D is an example of a system;

FIG. 90E is an example of a system;

FIG. 90F is an example of a method;

FIG. 91A is an example of a memory and filtering system, storage devices and a CPU;

FIG. 91B is an example of a memory and processing system, storage devices and a CPU;

FIG. 92A is an example of a memory and processing system, storage devices and a CPU;

FIG. 92B is an example of a memory/processing unit;

FIG. 92C is an example of memory and filtering systems, storage devices and CPUs;

FIG. 92D is an example of memory and processing systems, storage devices and CPUs;

FIG. 92E is an example of memory and processing systems, storage devices and CPUs;

FIG. 92F is an example of a method;

FIG. 92G is an example of a method;

FIG. 92H is an example of a method;

FIG. 92I is an example of a method;

FIG. 92J is an example of a method;

FIG. 92K is an example of a method;

FIG. 93A is a cross sectional view of an example of a hybrid integrated circuit;

FIG. 93B is a cross sectional view of an example of a hybrid integrated circuit;

FIG. 93C is a cross sectional view of an example of a hybrid integrated circuit;

FIG. 93D is a cross sectional view of an example of a hybrid integrated circuit;

FIG. 93E is a top view of an example of a hybrid integrated circuit;

FIG. 93F is a top view of an example of a hybrid integrated circuit;

FIG. 93G is a top view of an example of a hybrid integrated circuit;

FIG. 93H is a cross sectional view of an example of a hybrid integrated circuit;

FIG. 93I is a cross sectional view of an example of a hybrid integrated circuit;

FIG. 93J is an example of a method;

FIG. 94A is an example of a storage system, one or more devices and a compute system;

FIG. 94B is an example of a storage system, one or more devices and a compute system;

FIG. 94C is an example of one or more devices and a compute system;

FIG. 94D is an example of one or more devices and a compute system;

FIG. 94E is an example of a database acceleration integrated circuit;

FIG. 94F is an example of a database acceleration integrated circuit;

FIG. 94G is an example of a database acceleration integrated circuit;

FIG. 94H is an example of a database acceleration unit;

FIG. 94I is an example of a blade, and a group of database acceleration integrated circuits;

FIG. 94J is an example of groups of database acceleration integrated circuits;

FIG. 94K is an example of groups of database acceleration integrated circuits;

FIG. 94L is an example of groups of database acceleration integrated circuits;

FIG. 94M is an example of groups of database acceleration integrated circuits;

FIG. 94N is an example of a system;

FIG. 94O is an example of systems;

FIG. 94P is an example of a method;

FIG. 95A is an example of a method;

FIG. 95B is an example of a method;

FIG. 95C is an example of a method;

FIG. 96A is an example of a prior art system;

FIG. 96B is an example of a system;

FIG. 96C is an example of a database accelerator board;

FIG. 96D is an example of a part of a system;

FIG. 97A is an example of a prior art system;

FIG. 97B is an example of a system; and

Figure 97C:
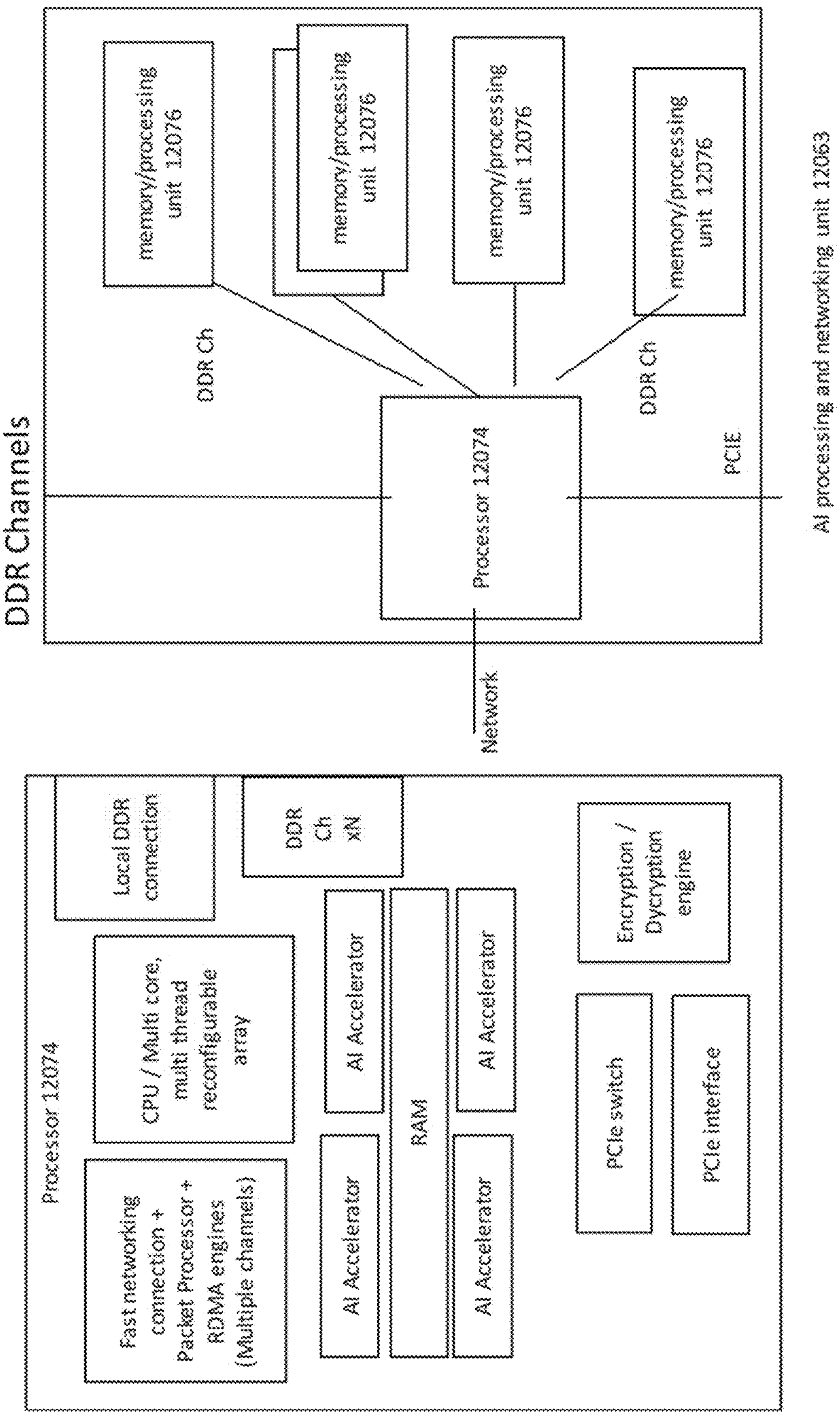

FIG. 97C is an example of an AI network interface card.

DETAILED DESCRIPTION

The following detailed description refers to the accompanying drawings. Wherever convenient, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Processor Architecture

As used throughout this disclosure, the term "hardware chip" refers to a semiconductor wafer (such as silicon or the like) on which one or more circuit elements (such as transistors, capacitors, resistors, and/or the like) are formed. The circuit elements may form processing elements or memory elements. A "processing element" refers to one or more circuit elements that, together, perform at least one logic function (such as an arithmetic function, a logic gate, other Boolean operations, or the like). A processing element may be a general-purpose processing element (such as a configurable plurality of transistors) or a special-purpose processing element (such as a particular logic gate or a plurality of circuit elements designed to perform a particular logic function). A "memory element" refers to one or more circuit elements that can be used to store data. A "memory element" may also be referred to as a "memory cell." A memory element may be dynamic (such that electrical refreshes are required to maintain the data store), static (such that data persists for at least some time after power loss), or non-volatile memories.

Processing elements may be joined to form processor subunits. A "processor subunit" may thus comprise a smallest grouping of processing elements that may execute at least one task or instructions (e.g., of a processor instruction set). For example, a subunit may comprise one or more general-purpose processing elements configured to execute instructions together, one or more general-purpose processing elements paired with one or more special-purpose processing elements configured to execute instructions in a complementary fashion, or the like. The processor subunits may be arranged on a substrate (e.g., a wafer) in an array. Although the "array" may comprise a rectangular shape, any arrangement of the subunits in the array may be formed on the substrate.

Memory elements may be joined to form memory banks. For example, a memory bank may comprise one or more lines of memory elements linked along at least one wire (or other conductive connection). Furthermore, the memory elements may be linked along at least one addition wire in another direction. For example, the memory elements may be arranged along wordlines and bitlines, as explained below. Although the memory bank may comprise lines, any arrangement of the elements in the bank may be used to form the bank on the substrate. Moreover, one or more banks may be electrically joined to at least one memory controller to form a memory array. Although the memory array may comprise a rectangular arrangement of the banks, any arrangement of the banks in the array may be formed on the substrate.

As further used throughout this disclose, a "bus" refers to any communicative connection between elements of a substrate. For example, a wire or a line (forming an electrical connection), an optical fiber (forming an optical connection), or any other connection conducting communications between components may be referred to as a "bus."

Figure 1:
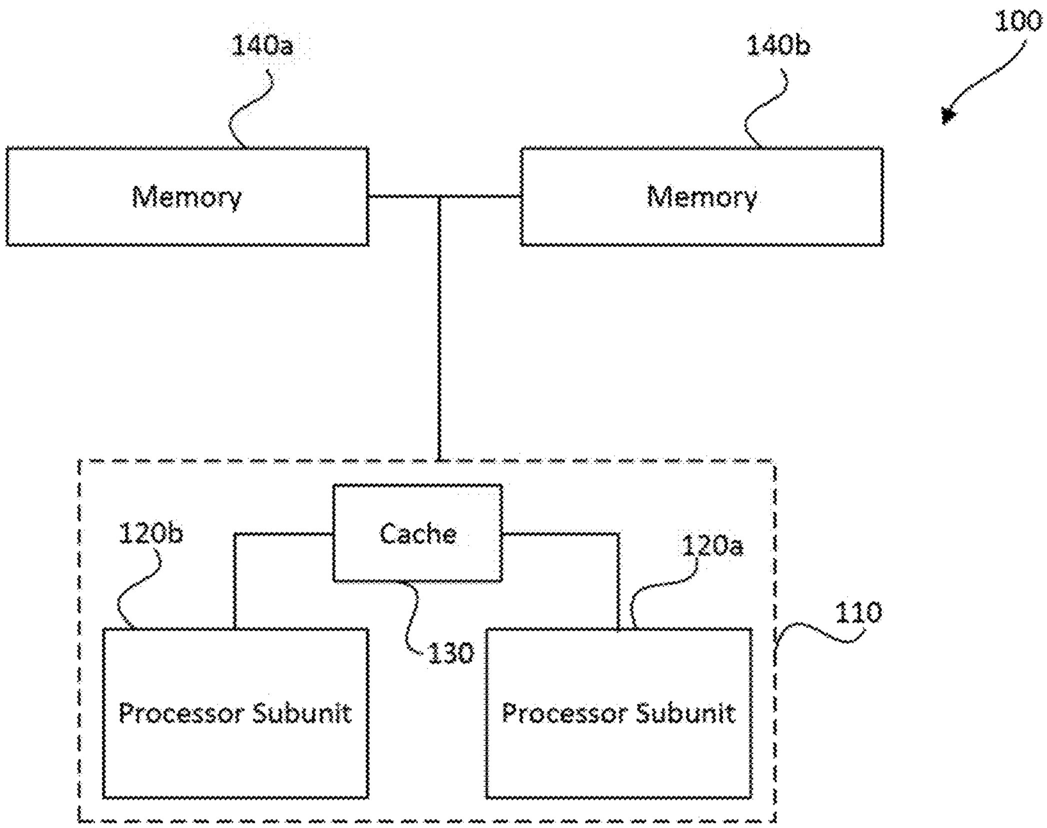
FIG. 1 is a diagrammatic representation of a central processing unit (CPU).

Conventional processors pair general-purpose logic circuits with shared memories. The shared memories may store both instruction sets for execution by the logic circuits as well as data used for and resulting from execution of the instruction sets. As described below, some conventional processors use a caching system to reduce delays in performing pulls from the shared memory; however, conventional caching systems remain shared. Conventional processors include central processing units (CPUs), graphics processing units (GPUs), various application-specific integrated circuits (ASICs), or the like. FIG. 1 shows an example of a CPU, and FIG. 2 shows an example of a GPU.

As shown in FIG. 1, a CPU 100 may comprise a processing unit 110 that includes one or more processor subunits, such as processor subunit 120*a* and processor subunit 120*b*. Although not depicted in FIG. 1, each processor subunit may comprise a plurality of processing elements. Moreover, the processing unit 110 may include one or more levels of on-chip cache. Such cache elements are generally formed on the same semiconductor die as processing unit 110 rather than being connected to processor subunits 120*a* and 120*b* via one or more buses formed in the substrate containing processor subunits 120*a* and 120*b* and the cache elements. An arrangement directly on the same die, rather than being connected via buses, is common for both first-level (L1) and second-level (L2) caches in conventional processors. Alternatively, in older processors, L2 caches were shared amongst processor subunits using back-side buses between the subunits and the L2 caches. Back-side buses are generally larger than front-side buses, described below. Accordingly, because cache is to be shared with all processor subunits on the die, cache 130 may be formed on the same die as processor subunits 120*a* and 120*b* or communicatively coupled to processor subunits 120*a* and 120*b* via one or more back-side buses. In both embodiments without buses (e.g., cache is formed directly on-die) as well as embodiments using back-side buses, the caches are shared between processor subunits of the CPU.

Moreover, processing unit 110 communicates with shared memory 140*a* and memory 140*b*. For example, memories 140*a* and 140*b* may represent memory banks of shared dynamic random access memory (DRAM). Although depicted with two banks, most conventional memory chips include between eight and sixteen memory banks. Accordingly, processor subunits 120*a* and 120*b* may use shared memories 140*a* and 140*b* to store data that is then operated upon by processor subunits 120*a* and 120*b*. This arrangement, however, results in the buses between memories 140*a* and 140*b* and processing unit 110 acting as a bottleneck when the clock speeds of processing unit 110 exceed data transfer speeds of the buses. This is generally true for conventional processors, resulting in lower effective processing speeds than the stated processing speeds based on clock rate and number of transistors.

Figure 2:
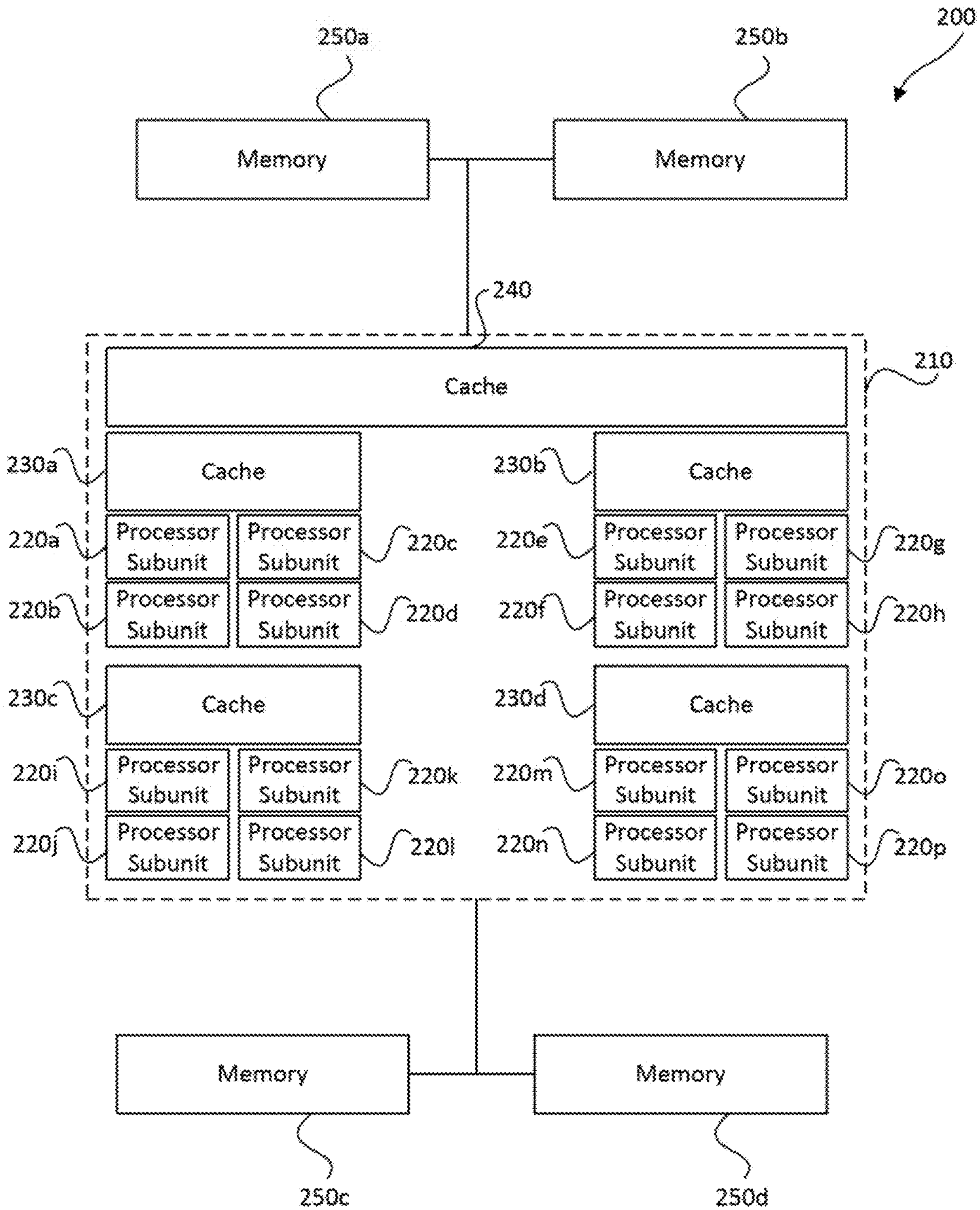
FIG. 2 is a diagrammatic representation of a graphics processing unit (GPU).

As shown in FIG. 2, similar deficiencies persist in GPUs. A GPU 200 may comprise a processing unit 210 that includes one or more processor subunits (e.g., subunits 220*a*, 220*b*, 220*c*, 220*d*, 220*e*, 220*f*, 220*g*, 220*h*, 220*i*, 220*j*, 220*k*, 220*l*, 220*m*, 220*n*, 220*o*, and 220*p*). Moreover, the processing unit 210 may include one or more levels of on-chip cache and/or register files. Such cache elements are generally formed on the same semiconductor die as processing unit 210. Indeed, in the example of FIG. 2, cache 210 is formed on the same die as processing unit 210 and shared amongst all of the processor subunits, while caches 230*a*, 230*b*, 230*c*, and 230*d* are formed on a subset of the processor subunits, respectively, and dedicated thereto.

Moreover, processing unit 210 communicates with shared memories 250*a*, 250*b*, 250*c*, and 250*d*. For example, memories 250*a*, 250*b*, 250*c*, and 250*d* may represent memory banks of shared DRAM. Accordingly, the processor subunits of processing unit 210 may use shared memories 250*a*, 250*b*, 250*c*, and 250*d* to store data that is then operated upon by the processor subunits. This arrangement, however, results in the buses between memories 250*a*, 250*b*, 250*c*, and 250*d* and processing unit 210 acting as a bottleneck, similar to the bottleneck described above for CPUs.

Overview of Disclosed Hardware Chins

Figure 3A:
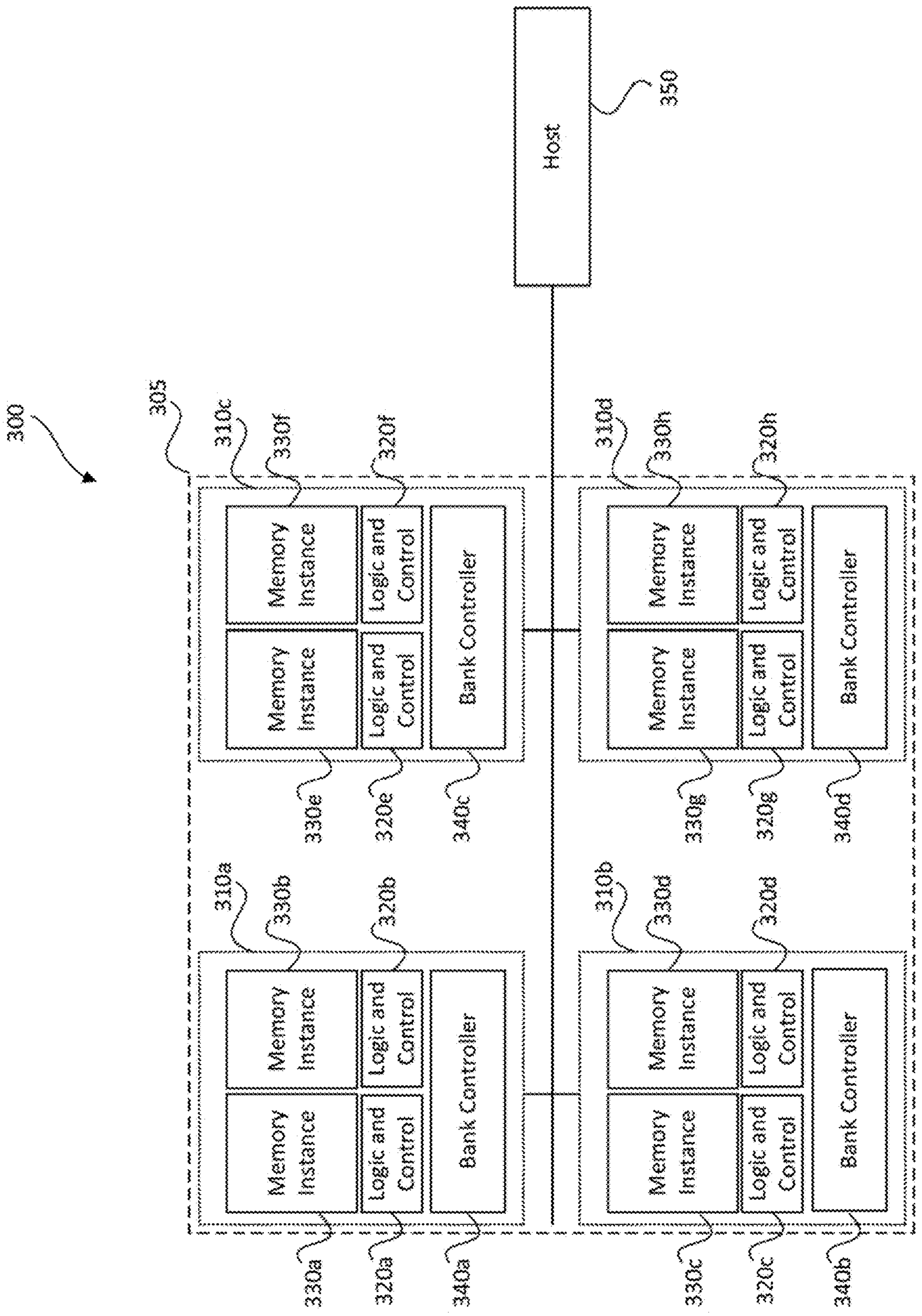
FIG. 3A is a diagrammatic representation of an embodiment of an exemplary hardware chip consistent with the disclosed embodiments.

FIG. 3A is a diagrammatic representation of an embodiment depicting an exemplary hardware chip 300. Hardware chip 300 may comprise a distributed processor designed to mitigate the bottlenecks described above for CPUs, GPUs, and other conventional processors. A distributed processor may include a plurality of processor subunits distributed spatially on a single substrate. Moreover, as explained above, in distributed processors of the present disclosure, corresponding memory banks are also spatially distributed on the substrate. In some embodiments, a distributed processor may be associated with a set of instructions, and each one of the processor subunits of the distributed processor may be responsible for performing one or more tasks included in the set of instructions.

As depicted in FIG. 3A, hardware chip 300 may comprise a plurality of processor subunits, e.g., logic and control subunits 320*a*, 320*b*, 320*c*, 320*d*, 320*e*, 320*f*, 320*g*, and 320*h*. As further depicted in FIG. 3A, each processor subunit may have a dedicated memory instance. For example, logic and control subunit 320*a* is operably connected to dedicated memory instance 330*a*, logic and control subunit 320*b* is operably connected to dedicated memory instance 330*b*, logic and control subunit 320*c* is operably connected to dedicated memory instance 330*c*, logic and control subunit 320*d* is operably connected to dedicated memory instance 330*d*, logic and control subunit 320*e* is operably connected to dedicated memory instance 330*e*, logic and control subunit 320*f* is operably connected to dedicated memory instance 330*f*, logic and control subunit 320*g* is operably connected to dedicated memory instance 330*g*, and logic and control subunit 320*h* is operably connected to dedicated memory instance 330*h*.

Although FIG. 3A depicts each memory instance as a single memory bank, hardware chip 300 may include two or more memory banks as a dedicated memory instance for a processor subunit on hardware chip 300. Furthermore, although FIG. 3A depicts each processor subunit as comprising both a logic component and a control for the dedicated memory bank(s), hardware chip 300 may use controls for the memory banks that are separate, at least in part, from the logic components. Moreover, as depicted in FIG. 3A, two or more processor subunits and their corresponding memory banks may be grouped, e.g., into processing groups 310*a*, 310*b*, 310*c*, and 310*d*. A "processing group" may represent a spatial distinction on a substrate on which hardware chip 300 is formed. Accordingly, a processing group may include further controls for the memory banks in the group, e.g., controls 340*a*, 340*b*, 340*c*, and 340*d*. Additionally or alternatively, a "processing group" may represent a logical grouping for the purposes of compiling code for execution on hardware chip 300. Accordingly, a compiler for hardware chip 300 (further described below) may divide an overall set of instructions between the processing groups on hardware chip 300.

Furthermore, host 350 may provide instructions, data, and other input to hardware chip 300 and read output from the same. Accordingly, a set of instructions may be executed entirely on a single die, e.g., the die hosting hardware chip 300. Indeed, the only communications off-die may include the loading of instructions to hardware chip 300, any input sent to hardware chip 300, and any output read from hardware chip 300. Accordingly, all calculations and memory operations may be performed on-die (on hardware chip 300) because the processor subunits of hardware chip 300 communicate with dedicated memory banks of hardware chip 300.

Figure 3B:
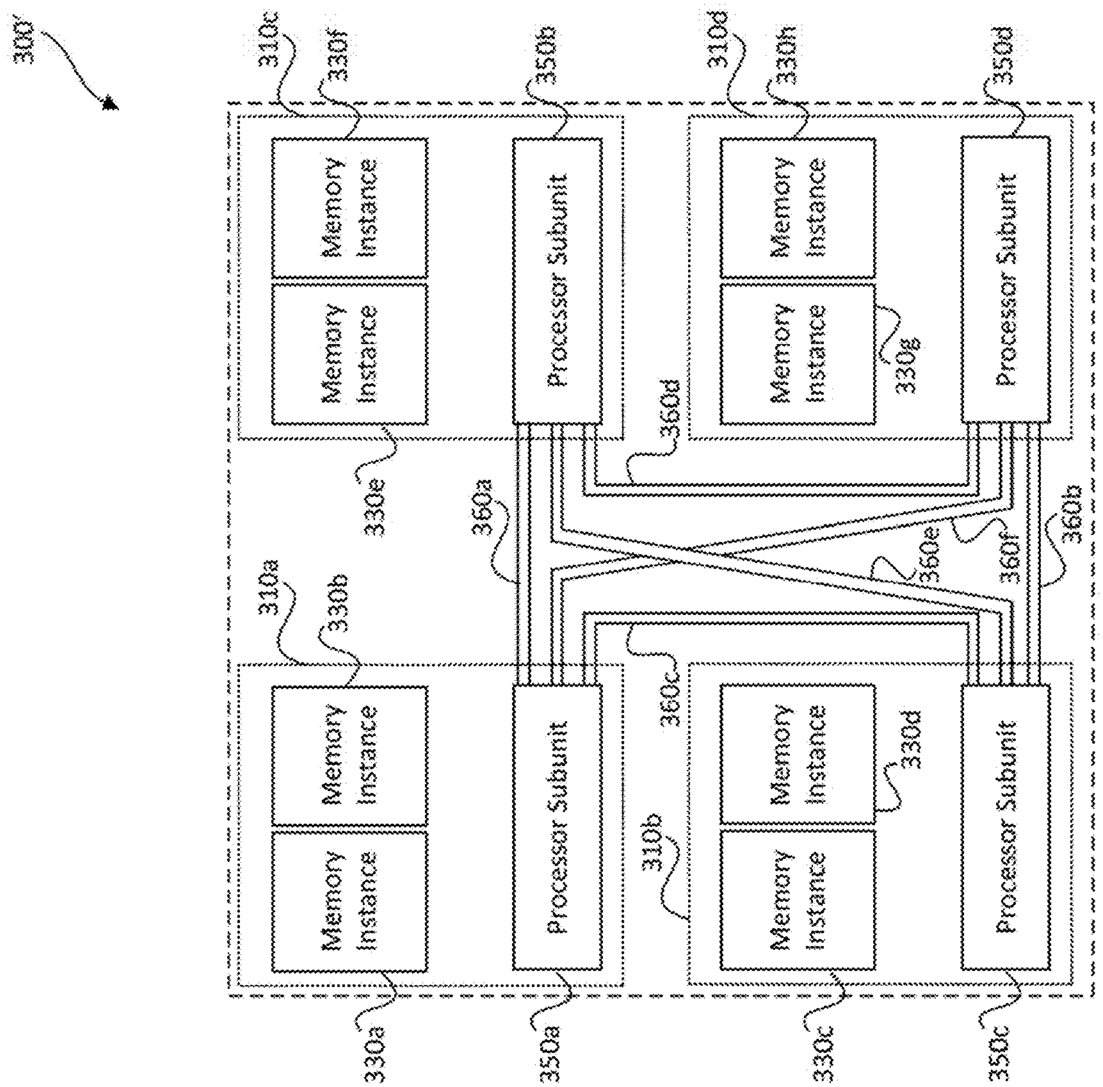
FIG. 3B is a diagrammatic representation of another embodiment of an exemplary hardware chip consistent with the disclosed embodiments.

FIG. 3B is a diagrammatic representation of an embodiment depicting another exemplary hardware chip 300'. Although depicted as an alternative to hardware chip 300, the architecture depicted in FIG. 38 may be combined, at least in part, with the architecture depicted in FIG. 3A.

As depicted in FIG. 38, hardware chip 300' may comprise a plurality of processor subunits, e.g., processor subunits 350*a*, 350*b*. 350*c*, and 350*d*. As further depicted in FIG. 38, each processor subunit may have a plurality of dedicated memory instances. For example, processor subunit 350*a* is operably connected to dedicated memory instances 330*a* and 330*b*, processor subunit 350*b* is operably connected to dedicated memory instances 330*c* and 330*d*, processor subunit 350*c* is operably connected to dedicated memory instances 330*e* and 330*f*, and processor subunit 350*d* is operably connected to dedicated memory instances 330*g* and 330*h*. Moreover, as depicted in FIG. 3B, the processor subunits and their corresponding memory banks may be grouped, e.g., into processing groups 310*a*, 310*b*, 310*c*, and 310*d*. As explained above, a "processing group" may represent a spatial distinction on a substrate on which hardware chip 300' is formed and/or a logical grouping for the purposes of compiling code for execution on hardware chip 300'.

As further depicted in FIG. 3B, the processor subunits may communicate with each other via buses. For example, as shown in FIG. 3B, processor subunit 350*a* may communicate with processor subunit 350*b* via bus 360*a*, with processor subunit 350*c* via bus 360*c*, and with processor subunit 350*d* via bus 360*f*. Similarly, processor subunit 350*b* may communicate with processor subunit 350*a* via bus 360*a* (as described above), with processor subunit 350*c* via bus 360*e*, and with processor subunit 350*d* via bus 360*d*. In addition, processor subunit 350*c* may communicate with processor subunit 350*a* via bus 360*c* (as described above), with processor subunit 350*b* via bus 360*e* (as described above), and with processor subunit 350*d* via bus 360*b*. Accordingly, processor subunit 350*d* may communicate with processor subunit 350*a* via bus 360*f* (as described above), with processor subunit 350*b* via bus 360*d* (as described above), and with processor subunit 350*c* via bus 360*b* (as described above). One of ordinary skill will understand that fewer buses than depicted in FIG. 3B may be used. For example, bus 360*e* may be eliminated such that communications between processor subunit 350*b* and 350*c* pass through processor subunit 350*a* and/or 350*d*. Similarly, bus

360 may be eliminated such that communications between processor subunit 350*a* and processor subunit 350*d* pass through processor subunit 350*b* or 350*c*.

Moreover, one of ordinary skill will understand that architectures other than those depicted in FIGS. 3A and 3B may be used. For example, an array of processing groups, each with a single processor subunit and memory instance, may be arranged on a substrate. Processor subunits may additionally or alternatively form part of controllers for corresponding dedicated memory banks, part of controllers for memory mats of corresponding dedicated memory, or the like.

In view of the architecture described above, hardware chips 300 and 300' may provide significant increases in efficiency for memory-intensive tasks as compared with traditional architectures. For example, database operations and artificial intelligence algorithms (such as neural networks) are examples of memory-intensive tasks for which traditional architectures are less efficient than hardware chips 300 and 300'. Accordingly, hardware chips 300 and 300' may be referred to as database accelerator processors and/or artificial intelligence accelerator processors.

Configuring the Disclosed Hardware Chips

The hardware chip architecture described above may be configured for execution of code. For example, each processor subunit may individually execute code (defining a set of instructions) apart from other processor subunits in the hardware chip. Accordingly, rather than relying on an operating system to manage multithreading or using multitasking (which is concurrency rather than parallelism), hardware chips of the present disclosure may allow for processor subunits to operate fully in parallel.

In addition to a fully parallel implementation described above, at least some of the instructions assigned to each processor subunit may be overlapping. For example, a plurality of processor subunits on a distributed processor may execute overlapping instructions as, for example, an implementation of an operating system or other management software, while executing non-overlapping instructions in order to perform parallel tasks within the context of the operating system or other management software.

Figure 4:
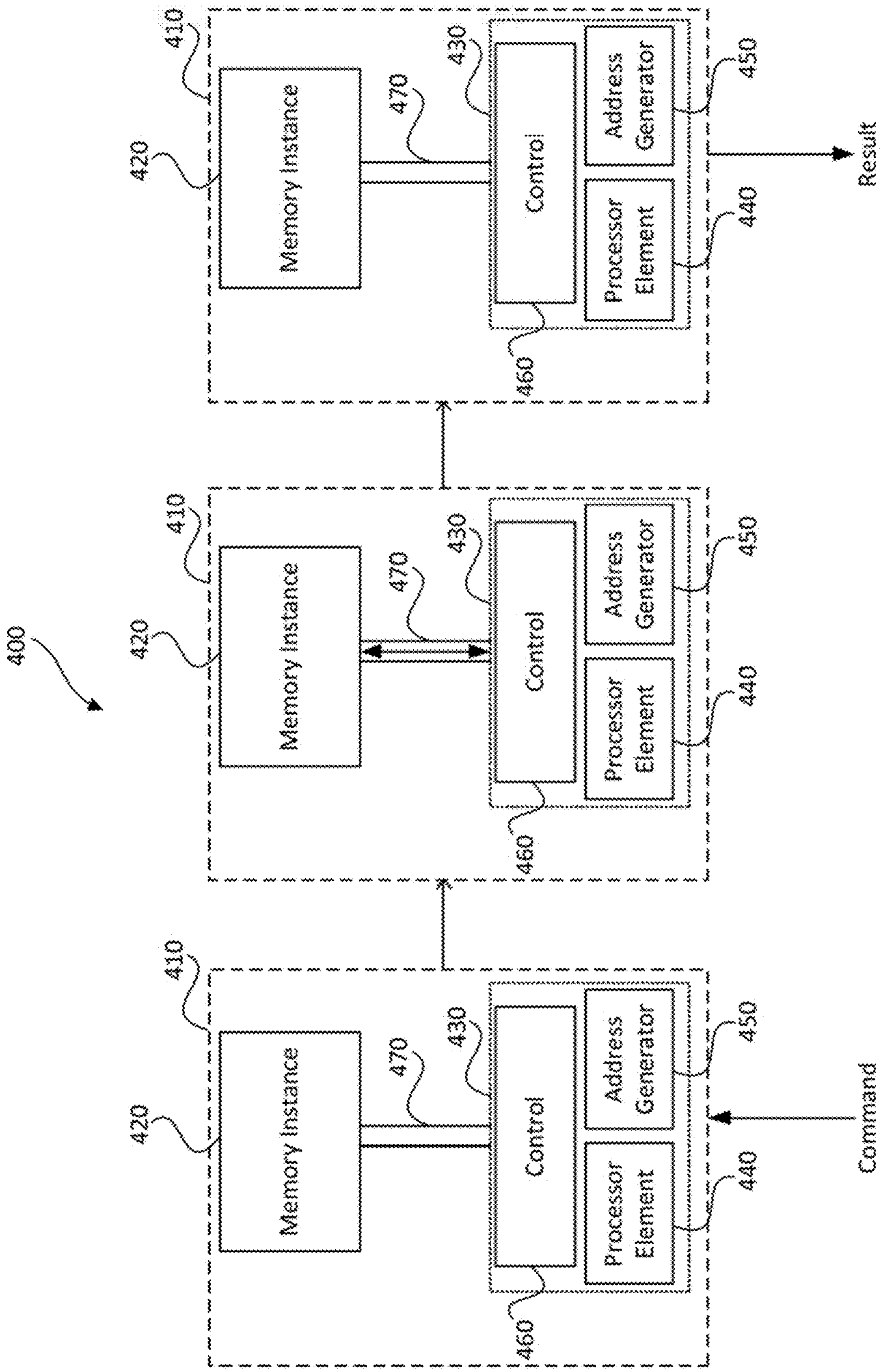
FIG. 4 is a diagrammatic representation of a generic command executed by an exemplary hardware chip consistent with the disclosed embodiments.

FIG. 4 depicts an exemplary process 400 for executing a generic command with processing group 410. For example, processing group 410 may comprise a portion of a hardware chip of the present disclosure, e.g., hardware chip 300, hardware chip 300', or the like.

As depicted in FIG. 4, a command may be sent to processor subunit 430, which is paired with dedicated memory instance 420. An external host (e.g., host 350) may send the command to processing group 410 for execution. Alternatively, host 350 may have sent an instruction set including the command for storage in memory instance 420 such that processor subunit 430 may retrieve the command from memory instance 420 and execute the retrieved command. Accordingly, the command may be executed by processing element 440, which is a generic processing element configurable to execute the received command. Moreover, processing group 410 may include a control 460 for memory instance 420. As depicted in FIG. 4, control 460 may perform any reads and/or writes to memory instance 420 required by processing element 440 when executing the received command. After execution of the command, processing group 410 may output the result of the command, e.g., to the external host or to a different processing group on the same hardware chip.

In some embodiments, as depicted in FIG. 4, processor subunit 430 may further include an address generator 450. An "address generator" may comprise a plurality of processing elements that are configured to determine addresses in one or more memory banks for performing reads and writes and may also perform operations on the data located at the determined addresses (e.g., addition, subtraction, multiplication, or the like). For example, address generator 450 may determine addresses for any reads or writes to memory. In one example, address generator 450 may increase efficiency by overwriting a read value with a new value determined based on the command when the read value is no longer needed. Additionally or alternatively, address generator 450 may select available addresses for storage of results from execution of the command. This may allow for scheduling of result read-off for a later clock cycle, when it is more convenient for the external host. In another example, address generator 450 may determine addresses to read from and write to during a multi-cycle calculation, such as a vector or matrix multiply-accumulate calculation. Accordingly, address generator 450 may maintain or calculate memory addresses for reading data and writing intermediate results of the multi-cycle calculation such that processor subunit 430 may continue processing without having to store these memory addresses.

Figure 5:
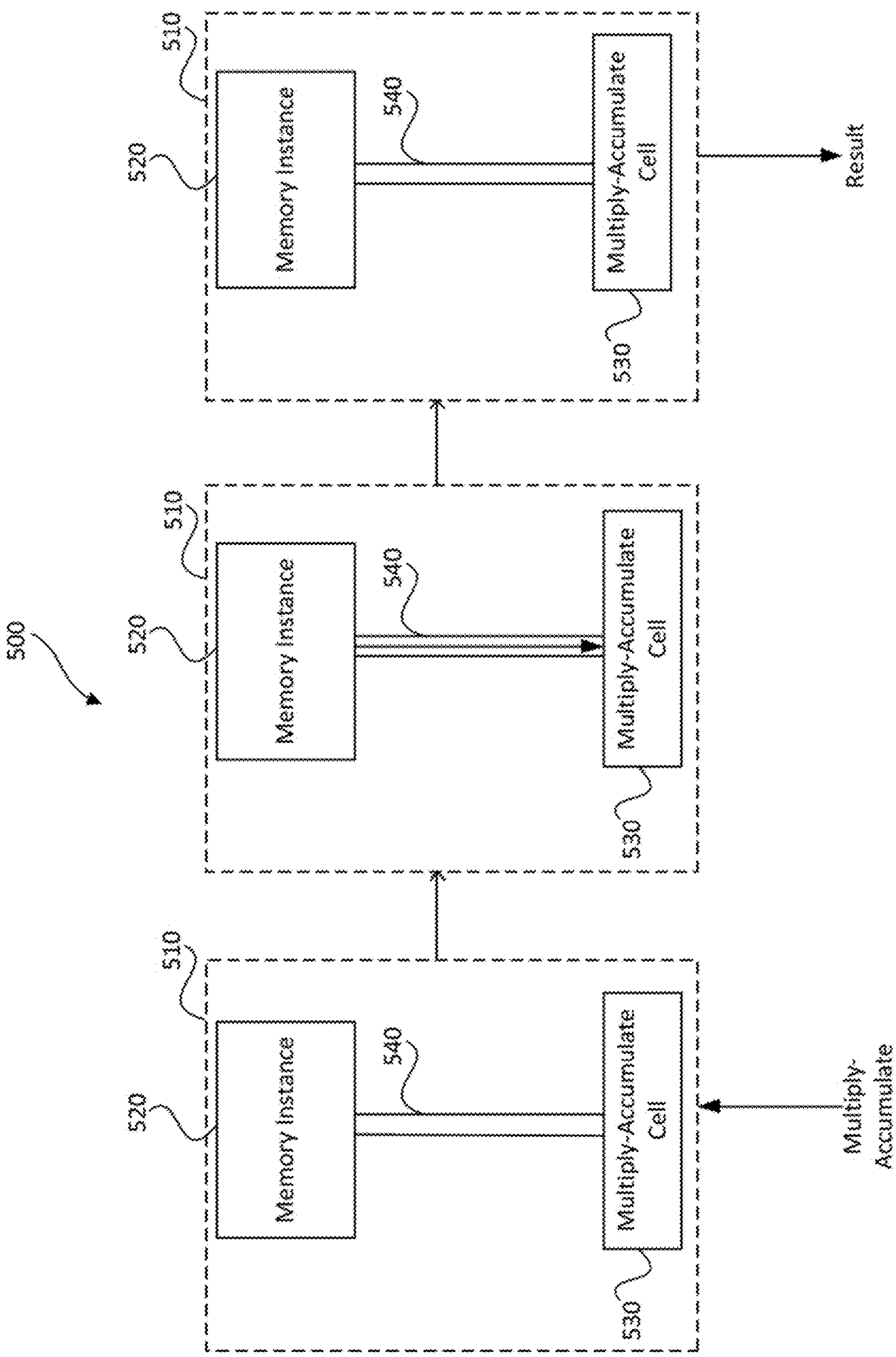
FIG. 5 is a diagrammatic representation of a specialized command executed by an exemplary hardware chip consistent with the disclosed embodiments.

FIG. 5 depicts an exemplary process 500 for executing a specialized command with processing group 510. For example, processing group 510 may comprise a portion of a hardware chip of the present disclosure, e.g., hardware chip 300, hardware chip 300', or the like.

As depicted in FIG. 5, a specialized command (e.g., a multiply-accumulate command) may be sent to processing element 530, which is paired with dedicated memory instance 520. An external host (e.g., host 350) may send the command to processing element 530 for execution. Accordingly, the command may be executed at a given signal from the host by processing element 530, a specialized processing element configurable to execute particular commands (including the received command). Alternatively, processing element 530 may retrieve the command from memory instance 520 for execution. Thus, in the example of FIG. 5, processing element 530 is a multiply-accumulate (MAC) circuit configured to execute MAC commands received from the external host or retrieved from memory instance 520. After execution of the command, processing group 410 may output the result of the command, e.g., to the external host or to a different processing group on the same hardware chip. Although depicted with a single command and a single result, a plurality of commands may be received or retrieved and executed, and a plurality of results may be combined on processing group 510 before output.

Although depicted as a MAC circuit in FIG. 5, additional or alternative specialized circuits may be included in processing group 510. For example, a MAX-read command (which returns the max value of a vector) a MAX0-read command (a common function also termed a rectifier, which returns the entire vector but also does MAX with 0), or the like may be implemented.

Although depicted separately, the generalized processing group 410 of FIG. 4 and the specialized processing group 510 of FIG. 5 may be combined. For example, a generic processor subunit may be coupled to one or more specialized processor subunits to form a processor subunit. Accordingly, the generic processor subunit may be used for all instructions not executable by the one or more specialized processor subunits.

One of ordinary skill will understand that neural network implementation and other memory-intensive tasks may be handled with specialized logic circuits. For example, database queries, packet inspection, string comparison, and other functions may increase in efficiency if executed by the hardware chips described herein.

A Memory-Based Architecture for Distributed Processing

On hardware chips consistent with the present disclosure, dedicated buses may transfer data between processor subunits on the chip and/or between the processor subunits and their corresponding dedicated memory banks. The use of dedicated buses may reduce arbitration costs because competing requests are either not possible or easily avoided using software rather than hardware.

Figure 6:
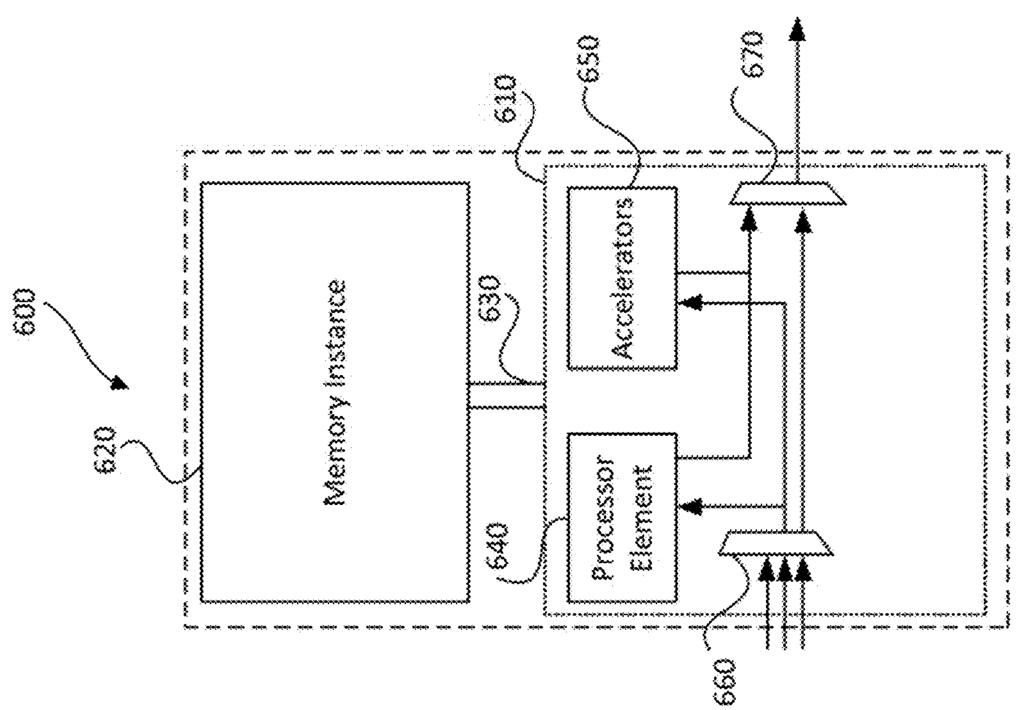
FIG. 6 is a diagrammatic representation of a processing group for use in an exemplary hardware chip consistent with the disclosed embodiments.

FIG. 6 schematically depicts a diagrammatic representation of a processing group 600. Processing group 60 may be for use in a hardware chip, e.g., hardware chip 300, hardware chip 300', or the like. Processor subunit 610 may be connected via buses 630 to memory 620. Memory 620 may comprise a Randomly Accessible Memory (RAM) element that stores data and code for execution by processor subunit 610. In some embodiments, memory 620 may be an N-Way memory (wherein N is a number equal to or larger than 1 that implies the number of segments in an interleaved memory 620). Because processor subunit 610 is coupled to memory 620 dedicated to processor subunit 610 via bus 630, N may be kept relatively small without compromising the execution performance. This represents an improvement over conventional multiway register files or caches where a lower N generally results in lower execution performance, and a higher N generally results in large area and power loss.

The size of memory 620, the number of ways, and the width of bus 630 may be adjusted to meet the requirements of tasks and application implementations of a system using processing group 600 according to, for instance, the size of data involved in the task or tasks. Memory element 620 may comprise one or more types of memory known in the art, e.g., volatile memory (such as RAM, DRAM, SRAM, phase-change RAM (PRAM), magnetoresistive RAM (MRAM), resistive RAM (ReRAM), or the like) or non-volatile memory (such as flash or ROM). According to some embodiments, a portion of memory element 620 may comprise a first memory type, while another portion may comprise another memory type. For instance, the code region of a memory element 620 may comprise a ROM element, while a data region of the memory element 620 may comprise a DRAM element. Another example for such partitioning is storing the weights of a neural network in flash while storing the data for calculation in DRAM.

Processor subunit 610 comprises a processing element 640 that may comprise a processor. The processor can be pipelined or not pipelined, a customized Reduced Instruction Set Computing (RISC) element or other processing scheme, implemented on any commercial Integrated Circuit (IC) known in the art (such as ARM, ARC, RISC-V, etc.), as appreciated by one of ordinary skill. Processing element 640 may comprise a controller that, in some embodiments, includes an Arithmetic Logic Unit (ALU) or other controller.

According to some embodiments, processing element 640, which executes received or stored code, may comprise a generic processing element and, therefore, be flexible and capable of performing a wide variety of processing operations. Non-dedicated circuitry typically consumes more power than specific-operation-dedicated circuitry when comparing the power consumed during performance for a specific operation. Therefore, when performing specific complex arithmetic calculations, processing element 640 may consume more power and perform less efficiently than dedicated hardware. Therefore, according to some embodiments, a controller of processing element 640 may be designed to perform specific operations (e.g., addition or "move" operations).

In one example, the specific operations may be performed by one or more accelerators 650. Each accelerator may be dedicated and programmed to perform a specific calculation (such as multiplication, floating point vector operations, or the like). By using accelerator(s), the average power consumed per calculation per processor subunit may be lowered, and the calculation throughput henceforth increases. Accelerator(s) 650 may be chosen according to an application that the system is designed to implement (e.g., execution of neural networks, execution of database queries, or the like). Accelerator(s) 650 may be configured by processing element 640 and may operate in tandem therewith for lowering power consumption and accelerating calculations and computations. The accelerator may additionally or alternatively be used to transfer data between memory and MUXs/DEMUXs/input/output ports (e.g., MUX 650 and DEMUX 660) of processing group 600, such as a smart DMA (direct memory access) peripheral.

Accelerator(s) 650 may be configured to perform a variety of functions. For instance, one accelerator may be configured to perform 16-bit floating point calculation or 8-bit integer calculations, which are often used in neural networks. Another example of an accelerator function is a 32-bit floating point calculation, which is often used during a training stage of a neural network. Yet another example of an accelerator function is query processing, such as that used in databases. In some embodiments, accelerator(s) 650 may comprise specialized processing elements to perform these functions and/or may be configured according to configuration data, stored on the memory element 620, such that it may be modified.

Accelerator(s) 650 may additionally or alternatively implement a configurable scripted list of memory movements to time movements of data to/from memory 620 or to/from other accelerators and/or inputs/outputs. Accordingly, as explained further below, all the data movement inside the hardware chip using processing group 600 may use software synchronization rather than hardware synchronization. For example, an accelerator in one processing group (e.g., group 600) may transfer data from its input to its accelerator every tenth cycle and then output data at the next cycle, thereby letting the information flow from the memory of the processing group to another one.

As further depicted in FIG. 6, in some embodiments, processing group 600 may further comprise at least one input multiplexer (MUX) 660 connected to its input port and at least one output DEMUX 670 connected to its output port. These MUXs/DEMUXs may be controlled by control signals (not shown) from processing element 640 and/or from one of accelerator(s) 650, determined according to a current instruction being carried out by processing element 640 and/or the operation executed by an accelerator of accelerator(s) 650. In some scenarios, processing group 600 may be required (according to a predefined instruction from its code memory) to transfer data from its input port to its output port. Accordingly, one or more of the input MUXs (e.g., MUX 660) may be directly connected via one or more buses to an output DEMUX (e.g., DEMUX 670), in addition to each of the DEMUXs/MUXs being connected to processing element 640 and accelerator(s) 650.

Figure 7A:
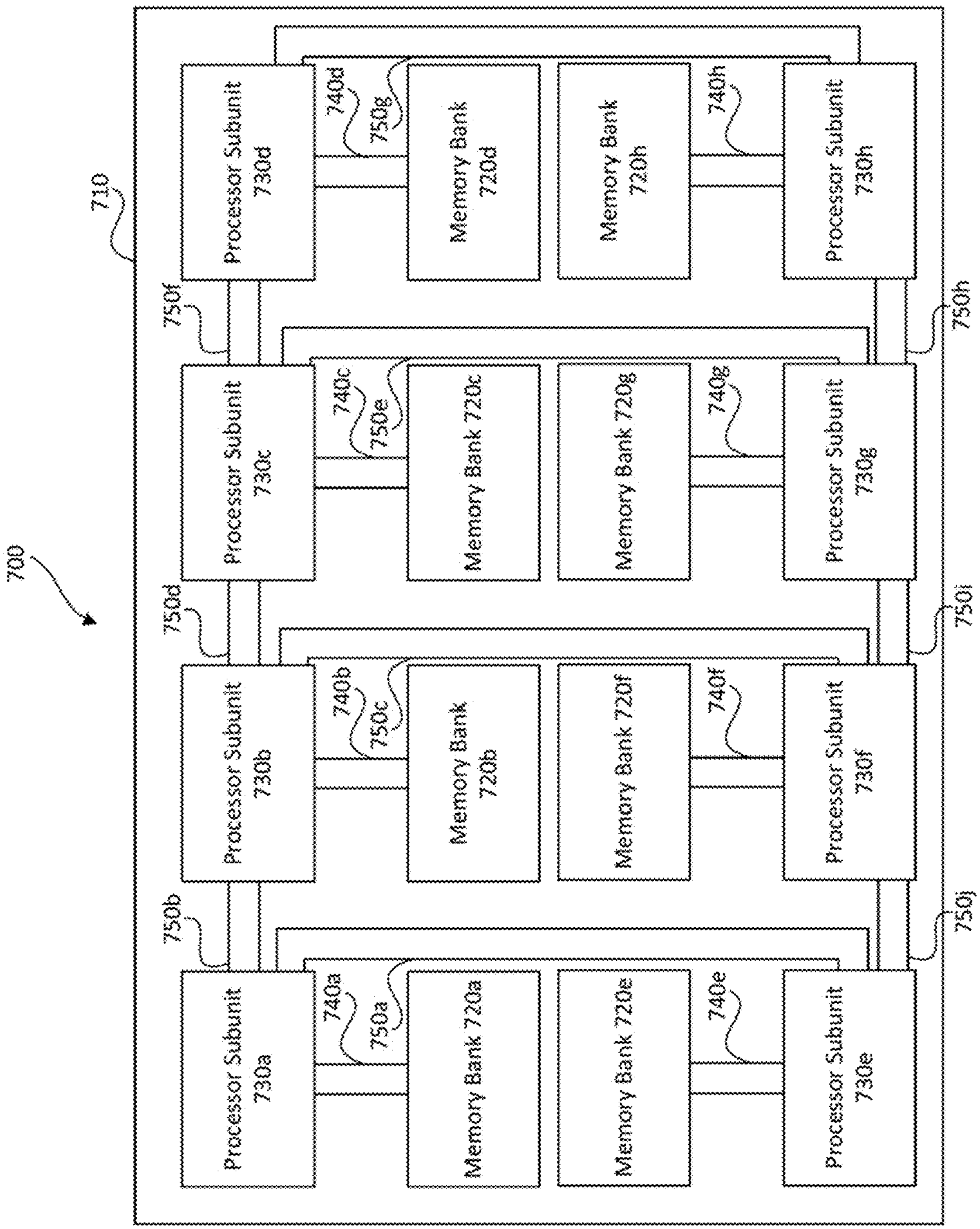
FIG. 7A is a diagrammatic representation of a rectangular array of processing groups consistent with the disclosed embodiments.

The processing group 600 of FIG. 6 may be arrayed to form a distributed processor, for example, as depicted in FIG. 7A. The processing groups may be disposed on substrate 710 to form an array. In some embodiments, substrate 710 may comprise a semiconductor substrate, such as silicon. Additionally or alternatively, substrate 710 may comprise a circuit board, such as a flexible circuit board.

As depicted in FIG. 7A, substrate 710 may include, disposed thereon, a plurality of processing groups, such as processing group 600. Accordingly, substrate 710 includes a memory array that includes a plurality of banks, such as banks 720*a*, 720*b*, 720*c*, 720*d*, 720*e*, 720*f*, 720*g*, and 720*h*. Furthermore, substrate 710 includes a processing array that may include a plurality of processor subunits, such as subunits 730*a*, 730*b*, 730*c*, 730*d*, 730*e*, 730*f*, 730*g*, and 730*h*.

Furthermore, as explained above, each processing group may include a processor subunit and one or more corresponding memory banks dedicated to the processor subunit. Accordingly, as depicted in FIG. 7A, each subunit is associated with a corresponding, dedicated memory bank, e.g.; Processor subunit 730*a* is associated with memory bank 720*a*, processor subunit 730*b* is associated with memory bank 720*b*, processor subunit 730*c* is associated with memory bank 720*c*, processor subunit 730*d* is associated with memory bank 720*d*, processor subunit 730*e* is associated with memory bank 720*e*, processor subunit 730*f* is associated with memory bank 720*f*, processor subunit 730*g* is associated with memory bank 720*g*, processor subunit 730*h* is associated with memory bank 720*h*.

To allow each processor subunit to communicate with its corresponding, dedicated memory bank(s), substrate 710 may include a first plurality of buses connecting one of the processor subunits to its corresponding, dedicated memory bank(s). Accordingly, bus 740*a* connects processor subunit 730*a* to memory bank 720*a*, bus 740*b* connects processor subunit 730*b* to memory bank 720*b*, bus 740*c* connects processor subunit 730*c* to memory bank 720*c*, bus 740*d* connects processor subunit 730*d* to memory bank 720*d*, bus 740*e* connects processor subunit 730*e* to memory bank 720*e*, bus 740*f* connects processor subunit 730*f* to memory bank 720*f*, bus 740*g* connects processor subunit 730*g* to memory bank 720*g*, and bus 740*h* connects processor subunit 730*h* to memory bank 720*h*. Moreover, to allow each processor subunit to communicate with other processor subunits, substrate 710 may include a second plurality of buses connecting one of the processor subunits to another of the processor subunits. In the example of FIG. 7A, bus 750*a* connects processor subunit 730*a* to processor subunit 750*e*, bus 750*b* connects processor subunit 730*a* to processor subunit 750*b*, bus 750*c* connects processor subunit 730*b* to processor subunit 750*f*, bus 750*d* connects processor subunit 730*b* to processor subunit 750*c*, bus 750*e* connects processor subunit 730*c* to processor subunit 750*g*, bus 750*f* connects processor subunit 730*c* to processor subunit 750*d*, bus 750*g* connects processor subunit 730*d* to processor subunit 750*h*, bus 750*h* connects processor subunit 730*h* to processor subunit 750*g*, bus 750*i* connects processor subunit 730*g* to processor subunit 750*g*, and bus 750*j* connects processor subunit 730*f* to processor subunit 750*e*.

Accordingly, in the example arrangement shown in FIG. 7A, the plurality of logic processor subunits is arranged in at least one row and at least one column. The second plurality of buses connect each processor subunit to at least one adjacent processor subunit in the same row and to at least one adjacent processor subunit in the same column. FIG. 7A may be referred to as a "partial file connection."

The arrangement shown in FIG. 7A may be modified to form a "full tile connection." A full tile connection includes additional buses connecting diagonal processor subunits. For example, the second plurality of buses may include additional buses between processor subunit 730*a* and processor subunit 730*f*, between processor subunit 730*b* and processor subunit 730*e*, between processor subunit 730*b* and processor subunit 730*g*, between processor subunit 730*c* and processor subunit 730*f*, between processor subunit 730*c* and processor subunit 730*h*, and between processor subunit 730*d* and processor subunit 730*g*.

A full tile connection may be used for convolution calculations, in which data and results stored in a near processor subunit are used. For example, during convolutional image processing, each processor subunit may receive a tile of the image (such as a pixel or a group of pixels). In order to calculate the convolution results, each processor subunit may acquire data from all eight adjacent processor subunits, each of which have received a corresponding tile. In a partial tile connection, the data from the diagonal adjacents may be passed through other adjacent processor subunits connected to the processor subunit. Accordingly, the distributed processor on a chip may be an artificial intelligence accelerator processor.

In a specific example of a convolutional calculation, an N×M image may be divided across a plurality of processor subunits. Each processor subunit may perform a convolution with an A×B filter on its corresponding tile. To perform the filtering on one or more pixels on a boundary between tiles, each processor subunit may require data from neighboring processor subunits having tiles including pixels on the same boundary. Accordingly, the code generated for each processor subunit configures the subunit to calculate the convolutions and pull from one of the second plurality of buses whenever data is needed from an adjacent subunit. Corresponding commands to output data to the second plurality of buses are provided to the subunits to ensure proper timing of needed data transfers.

The partial tile connection of FIG. 7A may be modified to be an N-partial tile connection. In this modification, the second plurality of buses may further connect each processor subunit to processor subunits within a threshold distance of the processor subunit (e.g., within n processor subunits) in the four directions along which the buses of FIG. 7A run (i.e., up, down, left, and right). A similar modification may be made to the full-tile connection (to result in an N-full tile connection) such that the second plurality of buses further connects each processor subunit to processor subunits within a threshold distance of the processor subunit (e.g., within n processor subunits) in the four directions along which the buses of FIG. 7A run in additional to the two diagonal directions.

Other arrangements are possible. For example, in the arrangement shown in FIG. 7B, bus 750*a* connects processor subunit 730*a* to processor subunit 730*d*, bus 750*b* connects processor subunit 730*a* to processor subunit 730*b*, bus 750*c* connects processor subunit 730*b* to processor subunit 730*c*, and bus 750*d* connects processor subunit 730*c* to processor subunit 730*d*. Accordingly, in the example arrangement shown in FIG. 7B, the plurality of processor subunits is arranged in a star pattern. The second plurality of buses connect each processor subunit to at least one adjacent processor subunit within the star pattern.

Further arrangements (not shown) are possible. For example, a neighbor connection arrangement may be used such that the plurality of processor subunits is arranged in one or more lines (e.g., similar to that depicted in FIG. 7A). In a neighbor connection arrangement, the second plurality of buses connect each processor subunit to a processor subunit to the left in the same line, to a processor subunit to the right in the same line, to the processor subunits both to the left and to the right in the same line, etc.

In another example, an N-linear connection arrangement may be used. In an N-linear connection arrangement, the second plurality of buses connect each processor subunit to processor subunits within a threshold distance of the processor subunit (e.g., within n processor subunits). The N-linear connection arrangement may be used with the line array (described above), the rectangular array (depicted in FIG. 7A), the elliptical array (depicted in FIG. 7B), or any other geometrical array.

In yet another example, an N-log connection arrangement may be used. In an N-log connection arrangement, the second plurality of buses connect each processor subunit to processor subunits within a threshold power of two distance of the processor subunit (e.g., within $2^n$ processor subunits). The N-log connection arrangement may be used with the line array (described above), the rectangular array (depicted in FIG. 7A), the elliptical array (depicted in FIG. 7B), or any other geometrical array.

Any of the connection schemes described above may be combined for use in the same hardware chip. For example, a full tile connection may be used in one region while a partial tile connection is used in another region. In another example, an N-linear connection arrangement may be used in one region while an N-full tile connection is used in another region.

Alternatively to or in addition with dedicated buses between processor subunits of the memory chip, one or more shared buses may be used to interconnect all (or a subset of) the processor subunits of a distributed processor. Collisions on the shared buses may still be avoided by timing data transfers on the shared buses using code executed by the processor subunits, as explained further below. Additionally with or alternatively to shared buses, configurable buses may be used to dynamically connect processor subunits to form groups of processors units connected to separated buses. For example, the configurable buses may include transistors or other mechanisms that may be controlled by processor subunit to direct data transfers to a selected processor subunit.

Figure 7B:
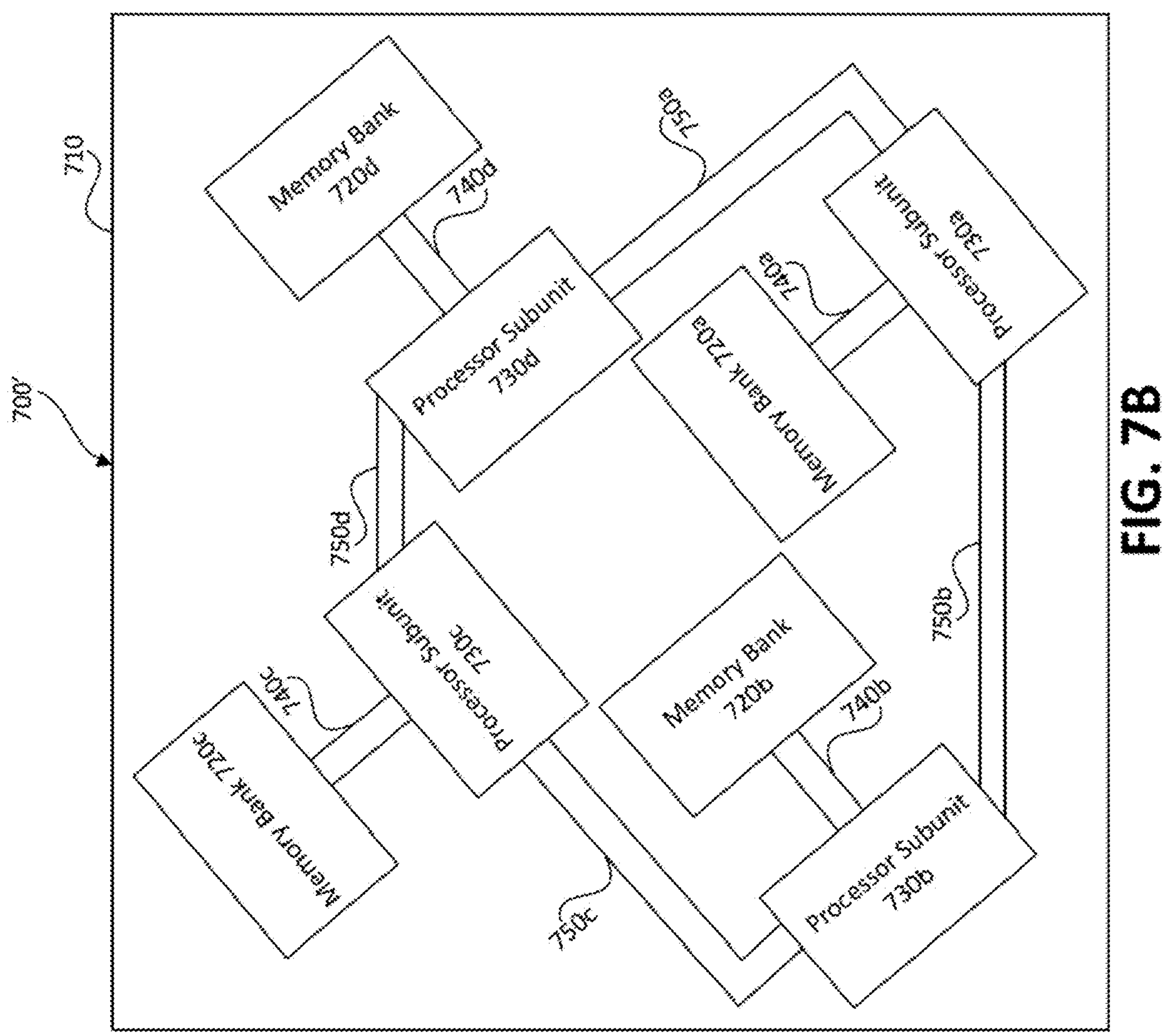
FIG. 7C is a diagrammatic representation an array of hardware chips consistent with the disclosed embodiments.
FIG. 7D is a diagrammatic representation another array of hardware chips consistent with the disclosed embodiments.

In both FIGS. 7A and 7B, the plurality of processor subunits of the processing array is spatially distributed among the plurality of discrete memory banks of the memory array. In other alternative embodiments (not shown), the plurality of processor subunits may be clustered in one or more regions of the substrate, and the plurality of memory banks may be clustered in one or more other regions of the substrate. In some embodiments, a combination of spatial distribution and clustering may be used (not shown). For example, one region of the substrate may include a cluster of processor subunits, another region of the substrate may include a cluster of memory banks, and yet another region of the substrate may include processing arrays distributed amongst memory banks.

One of ordinary skill will recognize that arraying processor groups 600 on a substrate is not an exclusive embodiment. For example, each processor subunit may be associated with at least two dedicated memory banks. Accordingly, processing groups 310*a*, 310*b*, 310*c*, and 310*d* of FIG. 3B may be used in lieu of or in combination with processing group 600 to form the processing array and the memory array. Other processing groups including, for example, three, four, or more dedicated memory banks (not shown) may be used.

Each of the plurality of processor subunits may be configured to execute software code associated with a particular application independently, relative to other processor subunits included in the plurality of processor subunits. For example, as explained below, a plurality of sub-series of instructions may be grouped as machine code and provided to each processor subunit for execution.

In some embodiments, each dedicated memory bank comprises at least one dynamic random access memory (DRAM). Alternatively, the memory banks may comprise a mix of memory types, such as static random access memory (SRAM), DRAM, Flash or the like.

In conventional processors, data sharing between processor subunits is usually performed with shared memory. Shared memory typically requires a large portion of chip area and/or performed a bus that is managed by additional hardware (such as arbiters). The bus results in bottlenecks, as described above. In addition, the shared memory, which may be external to the chip, typically includes cache coherency mechanisms and more complex caches (e.g., L1 cache, L2 cache, and shared DRAM) in order to provide accurate and up-to-date data to the processor subunits. As explained further below, the dedicated buses depicted in FIGS. 7A and 7B allow for hardware chips that are free of hardware management (such as arbiters). Moreover, the use of dedicated memories as depicted in FIGS. 7A and 7B allow for the elimination of complex caching layers and coherency mechanism.

Instead, in order to allow each processor subunit to access data calculated by other processor subunits and/or stored in memory banks dedicated to the other processor subunits, buses are provided whose timing is performed dynamically using code individually executed by each processor subunit. This allows for elimination of most, if not all, bus management hardware as conventionally used. Moreover, complex caching mechanisms are replaced with direct transfers over these buses, resulting in lower latency times during memory reads and writes.

Memory-Based Processing Arrays

As depicted in FIGS. 7A and 7B, a memory chip of the present disclosure may operate independently. Alternatively, memory chips of the present disclosure may be operably connected with one or more additional integrated circuits, such as a memory device (e.g., one or more DRAM banks), a system-on-a-chip, a field-programmable gate array (FPGA), or other processing and/or memory chip. In such embodiments, tasks in a series of instructions executed by the architecture may be divided (e.g., by a compiler, as described below) between processor subunits of the memory chip and any processor subunits of the additional integrated circuit(s). For example, the other integrated circuits may comprise a host (e.g., host 350 of FIG. 3A) that inputs instructions and/or data to the memory chip and receives output therefrom.

In order to interconnect memory chips of the present disclosure with one or more additional integrated circuits, the memory chip may include a memory interface, such as a memory interface complying with a Joint Elcectron Device Engineering Council (JEDEC) standard or any of its variants. The one or more additional integrated circuits may then connect to the memory interface. Accordingly, if the one or more additional integrated circuits are connected to a plurality of memory chips of the present disclosure, data may be shared between the memory chips through the one or more additional integrated circuits. Additionally or alternatively, the one or more additional integrated circuits may include buses to connect to buses on the memory chips of the present disclosure such that the one or more additional integrated circuits may execute code in tandem with the memory chips of the present disclosure. In such embodiments, the one or more additional integrated circuits further assist with distributed processing even though they may be on different substrates than the memory chips of the present disclosure.

Figure 7C:
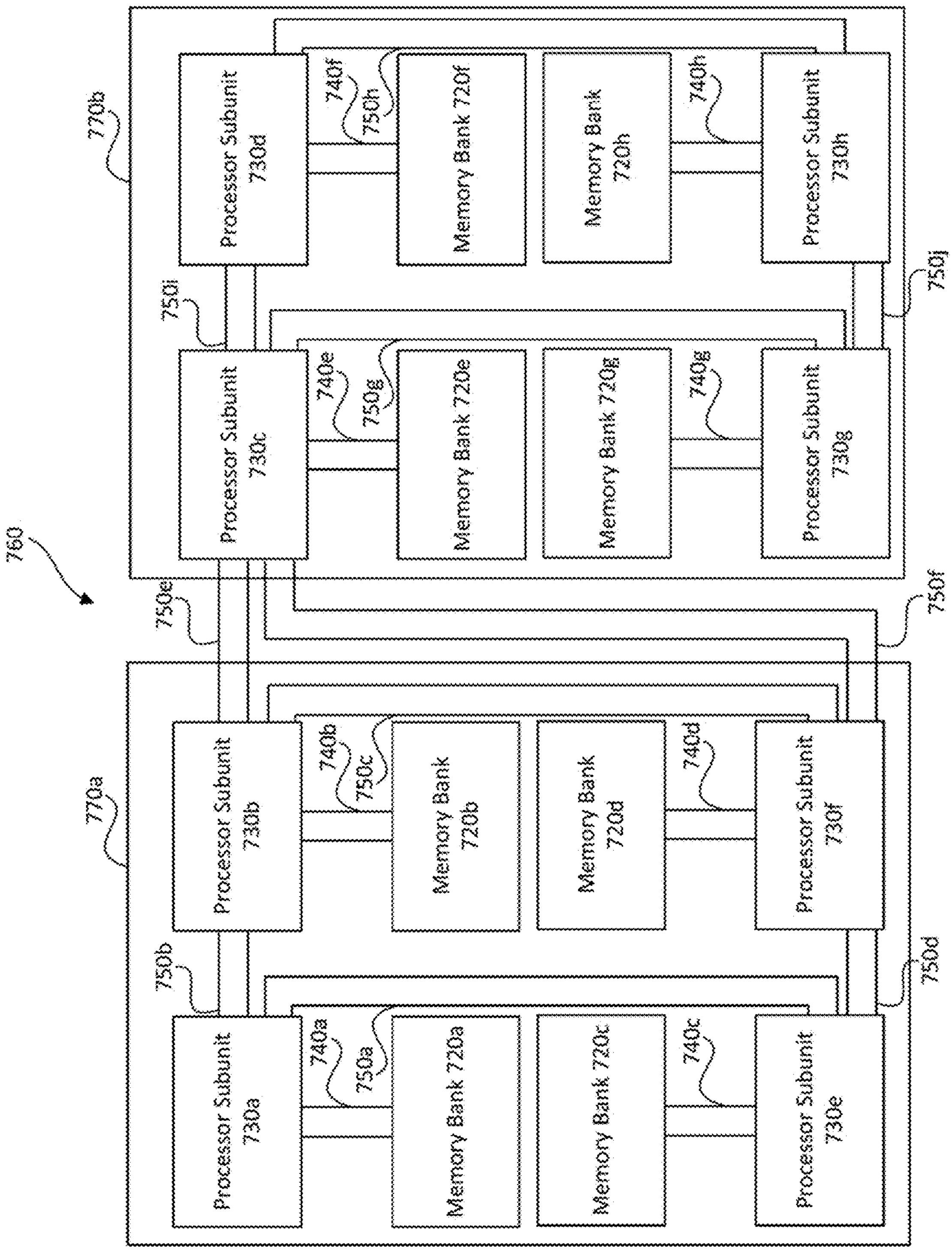
Figure 7D:
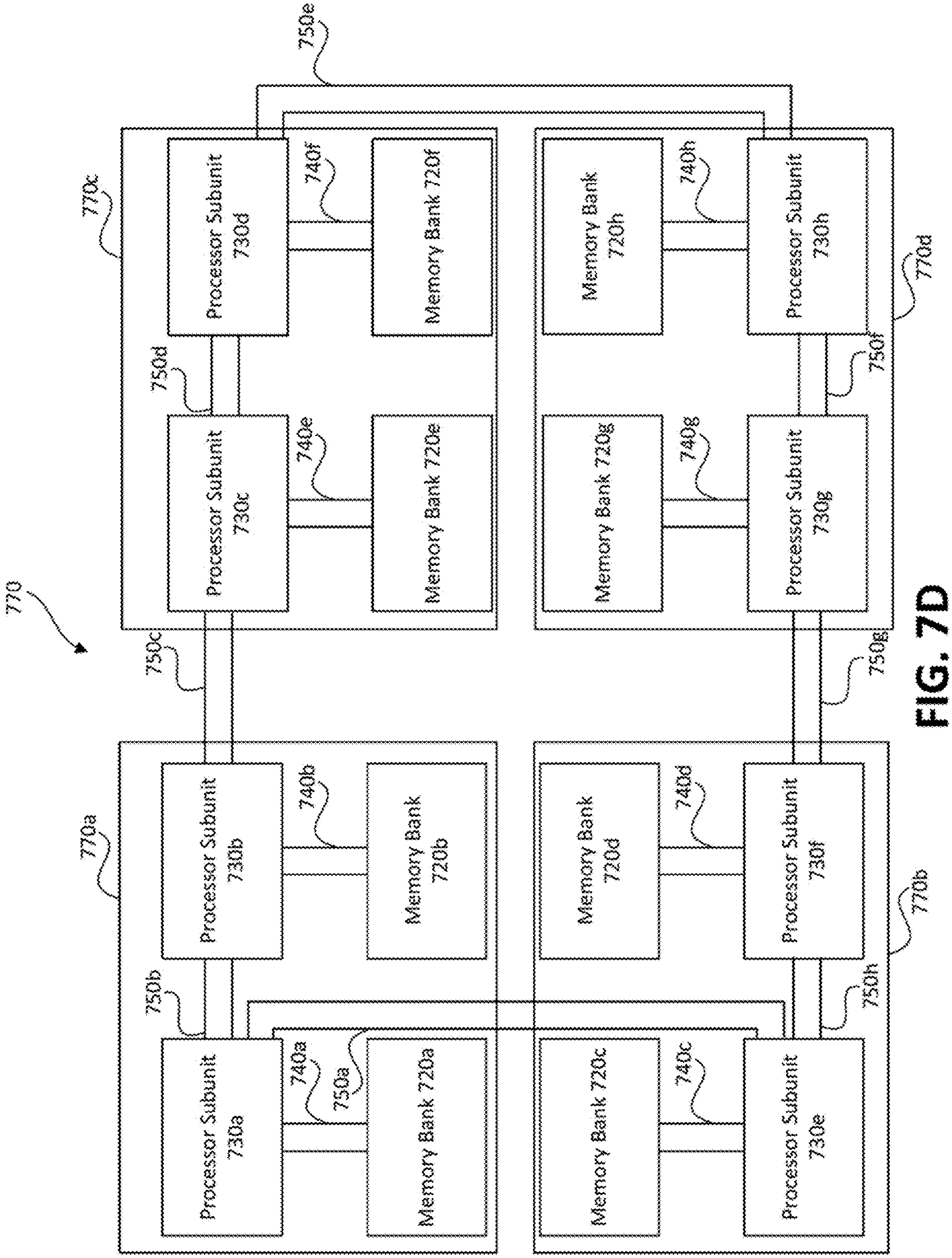

Furthermore, memory chips of the present disclosure may be arrayed in order to form an array of distributed processors. For example, one or more buses may connect a memory chip 770*a* to an additional memory chip 770*b*, as depicted in FIG. 7C. In the example of FIG. 7C, memory chip 770*a* includes processor subunits with one or more corresponding memory banks dedicated to each processor subunit, e.g.: Processor subunit 730*a* is associated with memory bank 720*a*, processor subunit 730*b* is associated with memory bank 720*b*, processor subunit 730*c* is associated with memory bank 720*c*, and processor subunit 730*f* is associated with memory bank 720*d*. Buses connect each processor subunit to its corresponding memory bank. Accordingly, bus 740*a* connects processor subunit 730*a* to memory bank 720*a*, bus 740*b* connects processor subunit 730*b* to memory bank 720*b*, bus 740*c* connects processor subunit 730*e* to memory bank 720*c*, and bus 740*d* connects processor subunit 730*f* to memory bank 720*d*. Moreover, bus 750*a* connects processor subunit 730*a* to processor subunit 750*e*, bus 750*b* connects processor subunit 730*a* to processor subunit 750*b*, bus 750*c* connects processor subunit 730*b* to processor subunit 750*f*, and bus 750*d* connects processor subunit 730*c* to processor subunit 750*f*. Other arrangements of memory chip 770*a* may be used, for example, as described above.

Similarly, memory chip 770*b* includes processor subunits with one or more corresponding memory banks dedicated to each processor subunit, e.g.: Processor subunit 730*c* is associated with memory bank 720*e*, processor subunit 730*d* is associated with memory bank 720*f*, processor subunit 730*g* is associated with memory bank 720*g*, and processor subunit 730*h* is associated with memory bank 720*h*. Buses connect each processor subunit to its corresponding memory bank. Accordingly, bus 740*c* connects processor subunit 730*c* to memory bank 720*e*, bus 740*f* connects processor subunit 730*d* to memory bank 720*f*, bus 740*g* connects processor subunit 730*g* to memory bank 720*g*, and bus 740*h* connects processor subunit 730*h* to memory bank 720*h*. Moreover, bus 750*g* connects processor subunit 730*c* to processor subunit 750*g*, bus 750*h* connects processor subunit 730*d* to processor subunit 750*h*, bus 750*i* connects processor subunit 730*c* to processor subunit 750*d*, and bus 750*j* connects processor subunit 730*g* to processor subunit 750*h*. Other arrangements of memory chip 770*b* may be used, for example, as described above.

The processor subunits of memory chip 770*a* and 770*b* may be connected using one or more buses. Accordingly, in the example of FIG. 7C, bus 750*e* may connect processor subunit 730*b* of memory chip 770*a* and processor subunit 730*c* of memory chip 770*b*, and bus 750*f* may connect processor subunit 730*f* of memory chip 770*a* and processor subunit 730*c* of memory 770*b*. For example, bus 750*e* may serve as an input bus to memory chip 770*b* (and thus an output bus for memory chip 770*a*) while bus 750*f* may serve as an input bus to memory chip 770*a* (and thus an output bus for memory chip 770*b*) or vice versa. Alternatively, buses 750*c* and 750*f* may both server as two-way buses between memory chips 770*a* and 770*b*.

Buses 750*e* and 750*f* may include direct wires or may be interleaved on a high-speed connection in order to reduce the pins used for the inter-chip interface between memory chip 770*a* and integrated circuit 770*b*. Moreover, any of the connection arrangements described above used in the memory chip itself may be used to connect the memory chip to one or more additional integrated circuits. For example, memory chip 770*a* and 770*b* may be connected using a full-tile or partial-tile connection rather than only two buses as shown in FIG. 7C.

Accordingly, although depicted using buses 750*e* and 750*f*, architecture 760 may include fewer buses or additional buses. For example, a single bus between processor subunits 730*b* and 730*c* or between processor subunits 730*f* and 730*c* may be used. Alternatively, additional buses, e.g., between processor subunits 730*b* and 730*d*, between processor subunits 730*f* and 730*d*, or the like, may be used.

Furthermore, although depicted as using a single memory chip and an additional integrated circuit, a plurality of memory chips may be connected using buses as explained above. For example, as depicted in the example of FIG. 7C, memory chips 770*a*, 770*b*, 770*c*, and 770*d* are connected in an array. Each memory chip includes processor subunits and dedicated memory banks similar to the memory chips described above. Accordingly, a description of these components is not repeated here.

In the example of FIG. 7C, memory chips 770*a*, 770*b*, 770*c*, and 770*d* are connected in a loop. Accordingly, bus 750*a* connects memory chips 770*a* and 770*d*, bus 750*c* connects memory chips 770*a* and 770*b*, bus 750*c* connects memory chips 770*b* and 770*c*, and bus 750*g* connects memory chips 770*c* and 770*d*. Although memory chips 770*a*, 770*b*. 770*c*, and 770*d* may be connected with full-tile connections, partial-tile connections, or other connection arrangements, the example of FIG. 7C allows for fewer pin connections between memory chips 770*a*, 770*b*, 770*c*, and 770*d*.

Relatively Large Memories

Embodiments of the present disclosure may use dedicated memories of relatively large size as compared with shared memories of conventional processors. The use of dedicated memories rather than shared memories allows for gains in efficiency to continue without tapering off with memory increases. This allows for memory-intensive tasks such as neural network processing and database queries to be performed more efficiently than in conventional processors, where the efficiency gains of increasing shared memory taper off due to the von Neumann bottleneck.

For example, in distributed processors of the present disclosure, a memory array disposed on the substrate of the distributed processor may include a plurality of discrete memory banks. Each of the discrete memory banks may have a capacity greater than one megabyte, as well as a processing array disposed on the substrate, including a plurality of processor subunits. As explained above, each one of the processor subunits may be associated with a corresponding, dedicated one of the plurality of discrete memory banks. In some embodiments, the plurality of processor subunits may be spatially distributed among the plurality of discrete memory banks within the memory array. By using dedicated memories of at least one megabyte, rather than shared caches of a few megabytes for a large CPU or GPU, the distributed processors of the present disclosure gain efficiencies that are not possible in conventional systems due to the von Neumann bottleneck in CPUs and GPUs.

Different memories may be used as the dedicated memories. For example, each dedicated memory bank may comprise at least one DRAM bank. Alternatively, each dedicated memory bank may comprise at least one static random access memory bank. In other embodiments, different types of memories may be combined on a single hardware chip.

As explained above, each dedicated memory may be at least one megabyte. Accordingly, each dedicated memory bank may be the same size or at least two of the plurality of memory banks may have different sizes.

Moreover, as described above, the distributed processor may include a first plurality of buses, each connecting one of the plurality of processor subunits to a corresponding, dedicated memory bank and a second plurality of buses, each connecting one of the plurality of processor subunits to another one of the plurality of processor subunits.

Synchronization Using Software

As explained above, hardware chips of the present disclosure may manage data transfers using software rather than hardware. In particular, because the timings of transfers on the buses, mads and writes to the memories, and calculations of the processor subunits are set by the sub-series of instructions executed by the processor subunits, hardware chips of the present disclosure may execute code to prevent collisions on the buses. Accordingly, hardware chips of the present disclosure may avoid hardware mechanisms conventionally used to manage data transfers (such as network controllers within in a chip, packet parsers and packets transferors between processor subunits, bus arbitrators, a plurality of buses to avoid arbitration, or the like).

If hardware chips of the present disclosure transferred data conventionally, connecting N processor subunits with buses would require bus arbitration or wide MUXs controlled by an arbiter. Instead, as described above, embodiments of the present disclosure may use a bus that is only a wire, an optical cable, or the like between processor subunits, where the processor subunits individually execute code to avoid collision on the buses. Accordingly, embodiments of the present disclosure may preserve space on the substrate as well as materials cost and efficiency losses (e.g., due to power and time consumption by arbitration). The efficiency and space gains are even greater when compared to other architectures using first-in-first-out (FIFO) controllers and/or mailboxes.

Furthermore, as explained above, each processor subunit may include one or more accelerators in addition to one or more processing elements. In some embodiments, the accelerator(s) may read and write from the buses rather than the processing element(s). In such embodiments, additional efficiency may be obtained by allowing the accelerator(s) to transmit data during the same cycle in which the processing element(s) perform one or more calculations. Such embodiments, however, require additional materials for the accelerator(s). For example, additional transistors may be required for fabrication of the accelerator(s).

The code also may account for the internal behavior, including timing and latencies, of the processor subunits (e.g., including the processing elements and/or accelerators forming part of the processor subunit). For example, a compiler (as described below) may perform pre-processing that accounts for the timing and latencies when generating the sub-series of instructions that control the data transfers.

In one example, a plurality of processor subunits may be assigned a task of calculating a neural network layer containing a plurality of neurons fully-connected to a previous layer of a larger plurality of neurons. Assuming data of the previous layer is evenly spread between the plurality of processor subunits, one way to perform the calculation may be to configure each processor subunit to transmit the data of the previous layer to the main bus in turn and then each processor subunit will multiply this data by the weight of the corresponding neuron that the subunit implements. Because each processor subunit calculates more than one neuron, each processor subunit will transmit the data of the previous layer a number of times equal to the number of neurons. Thus, the code of each processor subunit is not the same as the code for other processor subunits because the subunits will transmit at different times.

In some embodiments, a distributed processor may comprise a substrate (e.g., a semiconductor substrate, such as silicon and/or a circuit board, such as a flexible circuit board) with a memory array disposed on the substrate, the memory array including a plurality of discrete memory banks, and a processing array disposed on the substrate, the processing array including a plurality of processor subunits, as depicted. e.g., in FIGS. 7A and 7B. As explained above, each one of the processor subunits may be associated with a corresponding, dedicated one of the plurality of discrete memory banks. Moreover, as depicted, e.g., in FIGS. 7A and 7B, the distributed processor may further comprise a plurality of buses, each one of the plurality of buses connecting one of the plurality of processor subunits to at least another one of the plurality of processor subunits.

As explained above, the plurality of buses may be controlled in software. Accordingly, the plurality of buses may be free of timing hardware logic components such that data transfers between processor subunits and across corresponding ones of the plurality of buses are uncontrolled by timing hardware logic components. In one example, the plurality of buses may be free of bus arbiters such that data transfers between processor subunits and across corresponding ones of the plurality of buses are uncontrolled by bus arbiters.

In some embodiments, as depicted, e.g., in FIGS. 7A and 7B, the distributed processor may further comprise a second plurality of buses connecting one of the plurality of processor subunits to a corresponding, dedicated memory bank. Similar to the plurality of buses described above, the second plurality of buses may be free of timing hardware logic components such that data transfers between processor subunits and corresponding, dedicated memory banks are uncontrolled by timing hardware logic components. In one example, the second plurality of buses may be free of bus arbiters such that data transfers between processor subunits and corresponding, dedicated memory banks are uncontrolled by bus arbiters.

As used herein, the phrase “free of” does not necessarily imply the absolute absence of components, such as timing hardware logic components (e.g., bus arbiters, arbitration trees, FIFO controllers, mailboxes, or the like). Such components may still be included in a hardware chip described as “free of” those components. Instead, the phrase “free of” refers to the function of the hardware chip; that is, a hardware chip “free of” timing hardware logic components controls the timing of its data transfers without use of the timing hardware logic components, if any, included therein. For example, a hardware chip that executes code including sub-series of instructions that control data transfers between processor subunits of the hardware chip, even if the hardware chip includes timing hardware logic components as a secondary precaution to protect against collisions due to errors in the executed code.

As explained above, the plurality of buses may comprise at least one of wires or optical fibers between corresponding ones of the plurality of processor subunits. Accordingly, in one example, a distributed processor free of timing hardware logic components may include only wires or optical fibers without bus arbiters, arbitration trees, FIFO controllers, mailboxes, or the like.

In some embodiments, the plurality of processor subunits is configured to transfer data across at least one of the plurality of buses in accordance with code executed by the plurality of processor subunits. Accordingly, as explained below, a compiler may organize sub-series of instructions, each sub-series comprising code executed by a single processor subunit. The sub-series instructions may instruct the processor subunit when to transfer data onto one of the buses and when to retrieve data from the buses. When the sub-series are executed in tandem across the distributed processor, the timing of transfers between the processor subunits may be governed by the instructions to transfer and retrieve included in the sub-series. Thus, the code dictates timing of data transfers across at least one of the plurality of buses. The compiler may generate code to be executed by a single processor subunit. Additionally, the compiler may generate code to be executed by groups of processor subunits. In some cases, the compiler may treat all the processor subunits together as if they were one super-processor (e.g., a distributed processor), and the compiler may generate code for execution by that defined super-processor/distributed processor.

As explained above and depicted in FIGS. 7A and 7B, the plurality of processor subunits may be spatially distributed among the plurality of discrete memory banks within the memory array. Alternatively, the plurality of processor subunits may be clustered in one or more regions of the substrate, and the plurality of memory banks may be clustered in one or more other regions of the substrate. In some embodiments, a combination of spatial distribution and clustering may be used, as explained above.

In some embodiments, a distributed processor may comprise a substrate (e.g., a semiconductor substrate, including silicon and/or a circuit board, such as a flexible circuit board) with a memory array disposed on the substrate, the memory array including a plurality of discrete memory banks. A processing array may also be disposed on the substrate, the processing array including a plurality of processor subunits, as depicted, e.g., in FIGS. 7A and 7B. As explained above, each one of the processor subunits may be associated with a corresponding, dedicated one of the plurality of discrete memory banks. Moreover, as depicted, e.g., in FIGS. 7A and 7B, the distributed processor may further comprise a plurality of buses, each one of the plurality of buses connecting one of the plurality of processor subunits to a corresponding, dedicated one of the plurality of discrete memory banks.

As explained above, the plurality of buses may be controlled in software. Accordingly, the plurality of buses may be free of timing hardware logic components such that data transfers between a processor subunit and a corresponding, dedicated one of the plurality of discrete memory banks and across a corresponding one of the plurality of buses are not controlled by timing hardware logic components. In one example, the plurality of buses may be free of bus arbiters such that data transfers between processor subunits and across corresponding ones of the plurality of buses are uncontrolled by bus arbiters.

In some embodiments, as depicted, e.g., in FIGS. 7A and 7B, the distributed processor may further comprise a second plurality of buses connecting one of the plurality of processor subunits to at least another one of the plurality of processor subunits. Similar to the plurality of buses described above, the second plurality of buses may be free of timing hardware logic components such that data transfers between processor subunits and corresponding, dedicated memory banks are uncontrolled by timing hardware logic components. In one example, the second plurality of buses may be free of bus arbiters such that data transfers between processor subunits and corresponding, dedicated memory banks are uncontrolled by bus arbiters.

In some embodiments, the distributed processor may use a combination of software timing with hardware timing components. For example, a distributed processor may comprise a substrate (e.g., a semiconductor substrate, including silicon and/or a circuit board, such as a flexible circuit board) with a memory array disposed on the substrate, the memory array including a plurality of discrete memory banks. A processing array may also be disposed on the substrate, the processing army including a plurality of processor subunits, as depicted, e.g., in FIGS. 7A and 7B. As explained above, each one of the processor subunits may be associated with a corresponding, dedicated one of the plurality of discrete memory banks. Moreover, as depicted, e.g., in FIGS. 7A and 7B, the distributed processor may further comprise a plurality of buses, each one of the plurality of buses connecting one of the plurality of processor subunits to at least another one of the plurality of processor subunits. Moreover, as explained above, the plurality of processor subunits may be configured to execute software that controls timing of data transfers across the plurality of buses to avoid colliding data transfers on at least one of the plurality of buses. In such an example, the software may control the timing of the data transfers, but the transfers themselves may be controlled, at least in part, by one or more hardware components.

In such embodiments, the distributed processor may further comprise a second plurality of buses connecting one of the plurality of processor subunits to a corresponding, dedicated memory bank. Similar to the plurality of buses described above, the plurality of processor subunits may be configured to execute software that controls timing of data transfers across the second plurality of buses to avoid colliding data transfers on at least one of the second plurality of buses. In such an example, as explained above, the software may control the timing of the data transfers, but the transfers themselves may be controlled, at least in part, by one or more hardware components.

Division of Code

As explained above, hardware chips of the present disclosure may execute code in parallel across processor subunits included on a substrate forming the hardware chip. Additionally, hardware chips of the present disclosure may perform multitasking. For example, hardware chips of the present disclosure may perform area multitasking, in which one group of processor subunits of the hardware chip execute one task (e.g., audio processing) while another group of processor subunits of the hardware chip execute another task (e.g., image processing). In another example, hardware chips of the present disclosure may perform timing multitasking, in which one or more processor subunits of the hardware chip execute one task during a first period of time and another task during a second period of time. A combination of area and timing multitasking may also be used such that one task may be assigned to a first group of processor subunits during a first period of time while another task may be assigned to a second group of processor subunits during the first period of time, after which a third task may be assigned to processor subunits included in the first group and the second group during a second period of time.

In order to organize machine code for execution on memory chips of the present disclosure, machine code may be divided between processor subunits of the memory chip. For example, a processor on a memory chip may comprise a substrate and a plurality of processor subunits disposed on the substrate. The memory chip may further comprise a corresponding plurality of memory banks disposed on the substrate, each one of the plurality processor subunits being connected to at least one dedicated memory bank not shared by any other processor subunit of the plurality of processor subunits. Each processor subunit on the memory chip may be configured to execute a series of instructions independent from other processor subunits. Each series of instructions may be executed by configuring one or more general processing elements of the processor subunit in accordance with code defining the series of instructions and/or by activating one or more special processing elements (e.g., one or more accelerators) of the processor subunit in accordance with a sequence provided in the code defining the series of instructions.

Accordingly, each series of instructions may define a series of tasks to be performed by a single processor subunit. A single task may comprise an instruction within an instruction set defined by the architecture of one or more processing elements in the processor subunit. For example, the processor subunit may include particular registers, and a single task may push data onto a register, pull data from a register, perform an arithmetic function on data within a register, perform a logic operation on data within a register, or the like. Moreover, the processor subunit may be configured for any number of operands, such as a 0-operand processor subunit (also called a "stack machine"), a 1-operand processor subunit (also called an accumulator machine), a 2-operand processor subunit (such as a RISC), a 3-operand processor subunit (such as a complex instruction set computer (CISC)), or the like. In another example, the processor subunit may include one or more accelerators, and a single task may activate an accelerator to perform a specific function, such as a MAC function, a MAX function, a MAX-0 function, or the like.

The series of instructions may further include tasks for reading and writing from the dedicated memory banks of the memory chip. For example, a task may include writing a piece of data to a memory bank dedicated to the processor subunit executing the task, reading a piece of data from a memory bank dedicated to the processor subunit executing the task, or the like. In some embodiments, the reading and writing may be performed by the processor subunit in tandem with a controller of the memory bank. For example, the processor subunit may execute a read or write task by sending a control signal to the controller to perform the read or write. In some embodiments, the control signal may include a particular address to use for reads and writes. Alternatively, the processor subunit may defer to the memory controller to select an available address for the reads and writes.

Additionally or alternatively, the reading and writing may be performed by one or more accelerators in tandem with a controller of the memory bank. For example, the accelerators may generate the control signals for the memory controller, similar to how the processor subunit generates control signals, as described above.

In any of the embodiments described above, an address generator may also be used to direct the reads and writes to specific addresses of a memory bank. For example, the address generator may comprise a processing element configured to generate memory addresses for reads and writes. The address generator may be configured to generate addresses in order to increase efficiency, e.g., by writing results of a later calculation to the same address as the results of a former calculation that are no longer needed. Accordingly, the address generator may generate the controls signals for the memory controller, either in response to a command from the processor subunit (e.g., from a processing element included therein or from one or more accelerator(s) therein) or in tandem with the processor subunit. Additionally or alternatively, the address generator may generate the addresses based on some configuration or registers for example generating a nested loop structure to iterate on certain addresses in the memory at a certain pattern.

In some embodiments, each series of instructions may comprise a set of machine code defining a corresponding series of tasks. Accordingly, the series of tasks described above may be encapsulated within machine code comprising the series of instructions. In some embodiments, as explained below with respect to FIG. 8, the series of tasks may be defined by a compiler configured to distribute a higher-level series of tasks amongst the plurality of logic circuits as a plurality of series of tasks. For example, the compiler may generate the plurality of series of tasks based on the higher-level series of tasks such that the processor subunits, executing each corresponding series of tasks in tandem, perform the same function as outlined by the higher-level series of tasks.

As explained further below, the higher-level series of tasks may comprise a set of instructions in a human-readable programming language. Correspondingly, the series of tasks for each processor subunit may comprise lower-level series of tasks, each of which comprises a set of instructions in a machine code.

As explained above with respect to FIGS. 7A and 7B, the memory chip may further comprise a plurality of buses, each bus connecting one of the plurality of processor subunits to at least one other of the plurality of processor subunits. Moreover, as explained above, data transfers on the plurality of buses may be controlled using software. Accordingly, data transfers across at least one of the plurality of buses may be predefined by the series of instructions included in a processor subunit connected to the at least one of the plurality of buses. Therefore, one of the tasks included in the series of instructions may include outputting data to one of the buses or pulling data from one of the buses. Such tasks may be executed by a processing element of the processor subunit or by one or more accelerators included in the processor subunit. In the latter embodiment, the processor subunit may perform a calculation or send a control signal to a corresponding memory bank in the same cycle during which accelerator(s) pull data from or place data on one of the buses.

In one example, the series of instructions included in the processor subunit connected to the at least one of the plurality of buses may include a sending task that comprises a command for the processor subunit connected to the at least one of the plurality of buses to write data to the at least one of the plurality of buses. Additionally or alternatively, the series of instructions included in the processor subunit connected to the at least one of the plurality of buses may include a receiving task that comprises a command for the processor subunit connected to the at least one of the plurality of buses to read data from the at least one of the plurality of buses.

Additionally or alternatively to distribution of code amongst processor subunits, data may be divided between memory banks of the memory chip. For example, as explained above, a distributed processor on a memory chip may comprise a plurality of processor subunits disposed on the memory chip and a plurality of memory banks disposed on the memory chip. Each one of the plurality of memory banks may be configured to store data independent from data stored in other ones of the plurality of memory banks, and each one of the plurality of processor subunits may be connected to at least one dedicated memory bank from among the plurality of memory banks. For example, each processor subunit may have access to one or more memory controllers of one or more corresponding memory banks dedicated to the processor subunit, and no other processor subunit may have access to these corresponding one or more memory controllers. Accordingly, the data stored in each memory bank may be unique to the dedicated processor subunit. Moreover, the data stored in each memory bank may be independent of the memory stored in other memory banks because no memory controllers may be shared between memory banks.

In some embodiments, as described below with respect to FIG. 8, the data stored in each of the plurality of memory banks may be defined by a compiler configured to distribute data amongst the plurality of memory banks. Moreover, the compiler may be configured to distribute data defined in a higher-level series of tasks amongst the plurality of memory banks using a plurality of lower-level tasks distributed amongst corresponding processor subunits.

As explained further below, the higher-level series of tasks may comprise a set of instructions in a human-readable programming language. Correspondingly, the series of tasks for each processor subunit may comprise lower-level series of tasks, each of which comprises a set of instructions in a machine code.

As explained above with respect to FIGS. 7A and 7B, the memory chip may further comprise a plurality of buses, each bus connecting one of the plurality of processor subunits to one or more corresponding, dedicated memory banks from among the plurality of memory banks. Moreover, as explained above, data transfers on the plurality of buses may be controlled using software. Accordingly, data transfers across a particular one of the plurality of buses may be controlled by a corresponding processor subunit connected to the particular one of the plurality of buses. Therefore, one of the tasks included in the series of instructions may include outputting data to one of the buses or pulling data from one of the buses. As explained above, such tasks may be executed by (i) a processing element of the processor subunit or (ii) one or more accelerators included in the processor subunit. In the latter embodiment, the processor subunit may perform a calculation or use buses connecting the processor subunit to other processor subunits in the same cycle during which accelerator(s) pull data from or place data on one of the buses connected to the one or more corresponding, dedicated memory banks.

Therefore, in one example, the series of instructions included in the processor subunit connected to the at least one of the plurality of buses may include a sending task. The sending task may comprise a command for the processor subunit connected to the at least one of the plurality of buses to write data to the at least one of the plurality of buses for storage in the one or more corresponding, dedicated memory banks. Additionally or alternatively, the series of instructions included in the processor subunit connected to the at least one of the plurality of buses may include a receiving task. The receiving task may comprise a command for the processor subunit connected to the at least one of the plurality of buses to read data from the at least one of the plurality of buses for storage in the one or more corresponding, dedicated memory banks. Accordingly, the sending and receiving tasks in such embodiments may comprise control signals that are sent, along the at least one of the plurality of buses, to one or more memory controllers of the one or more corresponding, dedicated memory banks. Moreover, the sending and receiving tasks may be executed by one portion of the processing subunit (e.g., by one or more accelerators thereof) concurrently with a calculation or other task executed by another portion of the processing subunit (e.g., by one or more different accelerators thereof). An example of such a concurrent execution may include a MAC-relay command, in which receiving, multiplying, and sending are executed in tandem.

In addition to distributing data amongst the memory banks, particular portions of data may be duplicated across different memory banks. For example, as explained above, a distributed processor on a memory chip may comprise a plurality of processor subunits disposed on the memory chip and a plurality of memory banks disposed on the memory chip. Each one of the plurality of processor subunits may be connected to at least one dedicated memory bank from among the plurality of memory banks, and each memory bank of the plurality of memory banks may be configured to store data independent from data stored in other ones of the plurality of memory banks. Moreover, at least some of the data stored in one particular memory bank from among the plurality of memory banks may comprise a duplicate of data stored in at least another one of the plurality of memory banks. For example, a number, string, or other type of data used in the series of instructions may be stored in a plurality of memory banks dedicated to different processor subunits rather than being transferred from one memory bank to other processor subunits in the memory chip.

In one example, parallel string matching may use data duplication described above. For example, a plurality of strings may be compared to the same string. A conventional processor would compare each string in the plurality to the same string in sequence. On a hardware chip of the present disclosure, the same string may be duplicated across the memory banks such that the processor subunits may compare a separate string in the plurality to the duplicated string in parallel.

In some embodiments, as described below with respect to FIG. 8, the at least some data duplicated across the one particular memory bank from among the plurality of memory banks and the at least another one of the plurality of memory banks is defined by a compiler configured to duplicate data across memory banks. Moreover, the compiler may be configured to duplicate the at least some data using a plurality of lower-level tasks distributed amongst corresponding processor subunits.

Duplication of data may be useful for certain tasks that re-use the same portions of data across different calculations. By duplicating these portions of data, the different calculations may be distributed amongst processor subunits of the memory chip for parallel execution while each processor subunit may store the portions of data in, and access the stored portions from, a dedicated memory bank (rather than pushing and pulling the portions of data across buses connecting the processor subunits). In one example, the at least some data duplicated across the one particular memory bank from among the plurality of memory banks and the at least another one of the plurality of memory banks may comprise weights of a neural network. In this example, each node in the neural network may be defined by at least one processor subunit from among the plurality of processor subunits. For example, each node may comprise machine code executed by the at least one processor subunit defining the node. In this example, duplication of the weights may allow each processor subunit to execute machine code to effect, at least in part, a corresponding node while only accessing one or more dedicated memory banks (rather than performing data transfers with other processor subunits). Because the timing of reads and writes to the dedicated memory bank(s) are independent of other processor subunits while the timing of data transfers between processor subunits requires timing synchronization (e.g., using software, as explained above), duplication of memory to avoid data transfers between processor subunits may produce further efficiencies in overall execution.

As explained above with respect to FIGS. 7A and 7B, the memory chip may further comprise a plurality of buses, each bus connecting one of the plurality of processor subunits to one or more corresponding, dedicated memory banks from among the plurality of memory banks. Moreover, as explained above, data transfers on the plurality of buses may be controlled using software. Accordingly, data transfers across a particular one of the plurality of buses may be controlled by a corresponding processor subunit connected to the particular one of the plurality of buses. Therefore, one of the tasks included in the series of instructions may include outputting data to one of the buses or pulling data from one of the buses. As explained above, such tasks may be executed by (i) a processing element of the processor subunit or (ii) one or more accelerators included in the processor subunit. As further explained above, such tasks may include a sending task and/or a receiving tasks that comprise control signals that are sent, along the at least one of the plurality of buses, to one or more memory controllers of the one or more corresponding, dedicated memory banks.

Figure 8:
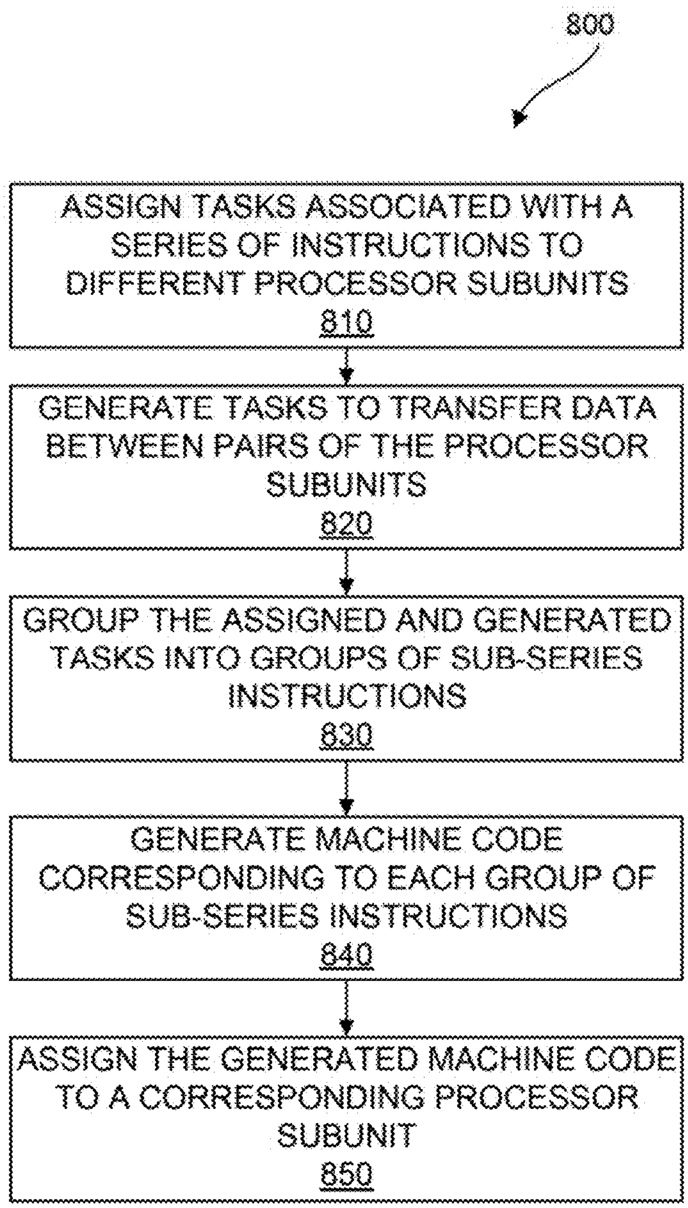
FIG. 8 is a flowchart depicting an exemplary method for compiling a series of instructions for execution on an exemplary hardware chip consistent with the disclosed embodiments.

FIG. 8 depicts a flowchart of a method 800 for compiling a series of instructions for execution on an exemplary memory chip of the present disclosure, e.g., as depicted in FIGS. 7A and 7B. Method 800 may be implemented by any conventional processor, whether generic or special-purpose.

Method 800 may be executed as a portion of a computer program forming a compiler. As used herein, a "compiler" refers to any computer program that converts a higher-level language (e.g., a procedural language, such as C, FORTRAN, BASIC, or the like; an object-oriented language, such as Java, C++, Pascal, Python, or the like: etc.) to a lower-level language (e.g., assembly code, object code, machine code, or the like). The compiler may allow a human to program a series of instructions in a human-readable language, which is then converted to a machine-executable language.

At step 810, the processor may assign tasks associated with the series of instructions to different ones of the processor subunits. For example, the series of instructions may be divided into subgroups, the subgroups to be executed in parallel across the processor subunits. In one example, a neural network may be divided into its nodes, and one or more nodes may be assigned to separate processor subunits. In this example, each subgroup may comprise a plurality of nodes connected across different layers. Thus, a processor subunit may implement a node from a first layer of the neural network, a node from a second layer connected to the node from the first layer implemented by the same processor subunit, and the like. By assigning nodes based on their connections, data transfers between the processor subunits may be lessened, which may result in greater efficiency, as explained above.

As explained above depicted in FIGS. 7A and 7B, the processor subunits may be spatially distributed among the plurality of memory banks disposed on the memory chip. Accordingly, the assignment of tasks may be, at least in part, a spatial divisional as well as a logical division.

At step 820, the processor may generate tasks to transfer data between pairs of the processor subunits of the memory chip, each pair of processor subunits being connected by a bus. For example, as explained above, the data transfers may be controlled using software. Accordingly, processor subunits may be configured to push and pull data on buses at synchronized times. The generated tasks may thus include tasks for performing this synchronized pushing and pulling of data.

As explained above, step 820 may include pre-processing to account for the internal behavior, including timing and latencies, of the processor subunits. For example, the processor may use known times and latencies of the processor subunits (e.g., the time to push data to a bus, the time to pull data from a bus, the latency between a calculation and a push or pull, or the like) to ensure that the generated tasks synchronize. Therefore, the data transfers comprising at least one push by one or more processor subunits and at least one pull by one or more processor subunits may occur simultaneously rather than incurring a delay due to timing differences between the processor subunits, latencies of the processor subunits, or the like.

At step 830, the processor may group the assigned and generated tasks into the plurality of groups of sub-series instructions. For example, the sub-series instructions may each comprise a series of tasks for execution by a single processor subunit. Therefore, each of the plurality of groups of sub-series instructions may correspond to a different one of the plurality of processor sub-units. Accordingly, steps 810, 820, and 830 may result in dividing the series of instructions into a plurality of groups of sub-series instructions. As explained above, step 820 may ensure that any data transfers between the different groups are synchronized.

At step 840, the processor may generate machine code corresponding to each of the plurality of groups of subs-series instructions. For example, the higher-level code representing sub-series instructions may be converted to lower-level code, such as machine code, executable by corresponding processor subunits.

At step 850, the processor may assign the generated machine code corresponding to each of the plurality of groups of subs-series instructions to a corresponding one of the plurality of processor subunits in accordance with the division. For example, the processor may label each sub-series instructions with an identifier of the corresponding processor subunit. Thus, when the sub-series instructions are uploaded to a memory chip for execution (e.g., by host 350 of FIG. 3A), each sub-series may configure a correct processor subunit.

In some embodiments, assigning tasks associated with the series of instructions to the different ones of the processor subunits may depend, at least in part, on a spatial proximity between two or more of the processor subunits on the memory chip. For example, as explained above, efficiency may be increased by lessening the number of data transfers between processor subunits. Accordingly, the processor may minimize data transfers that move data across more than two of processor subunits. Therefore, the processor may use a known layout of the memory chip in combination with one or more optimization algorithms (such as a greedy algorithm) in order to assign sub-series to processor subunits in a way that maximizes (at least locally) adjacent transfers and minimizes (at least locally) transfers to non-neighboring processor subunits.

Method 800 may include further optimizations for the memory chips of the present disclosure. For example, the processor may group data associated with the series of instructions based on the division and assign the data to the memory banks in accordance with the grouping. Accordingly, the memory banks may hold data used for the sub-series instructions assigned to each processor subunit to which each memory bank is dedicated.

In some embodiments, grouping the data may include determining at least a portion of the data to duplicate in two or more of the memory banks. For example, as explained above, some data may be used across more than one sub-series instructions. Such data may be duplicated across the memory banks dedicated to the plurality of processor subunits to which the different sub-series instructions are assigned. This optimization may further reduce data transfers across processor subunits.

The output of method 800 may be input to a memory chip of the present disclosure for execution. For example, a memory chip may comprise a plurality of processor subunits and a corresponding plurality of memory banks, each processor subunit being connected to at least one memory bank dedicated to the processor subunit, and the processor subunits of the memory chip may be configured to execute the machine code generated by method 800. As explained above with respect to FIG. 3A, host 350 may input the machine code generated by method 800 to the processor subunits for execution.

Sub-Banks and Sub-Controllers

In conventional memory banks, controllers are provided at the bank level. Each bank includes a plurality of mats, which are typically arranged in a rectangular manner but may be arranged in any geometrical shape. Each mat includes a plurality of memory cells, which are also typically arranged in a rectangular manner but may be arranged in any geometrical shape. Each cell may store a single bit of data (e.g., depending on whether the cell is retained at a high voltage or a low voltage).

Figure 9:
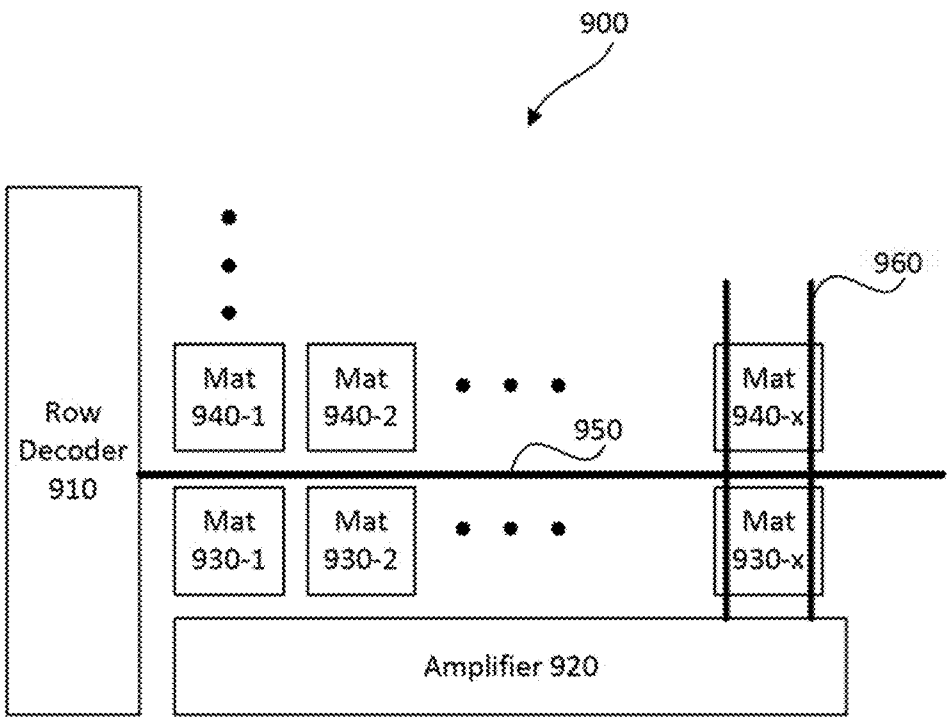
FIG. 9 is a diagrammatic representation of a memory bank.
Figure 10:
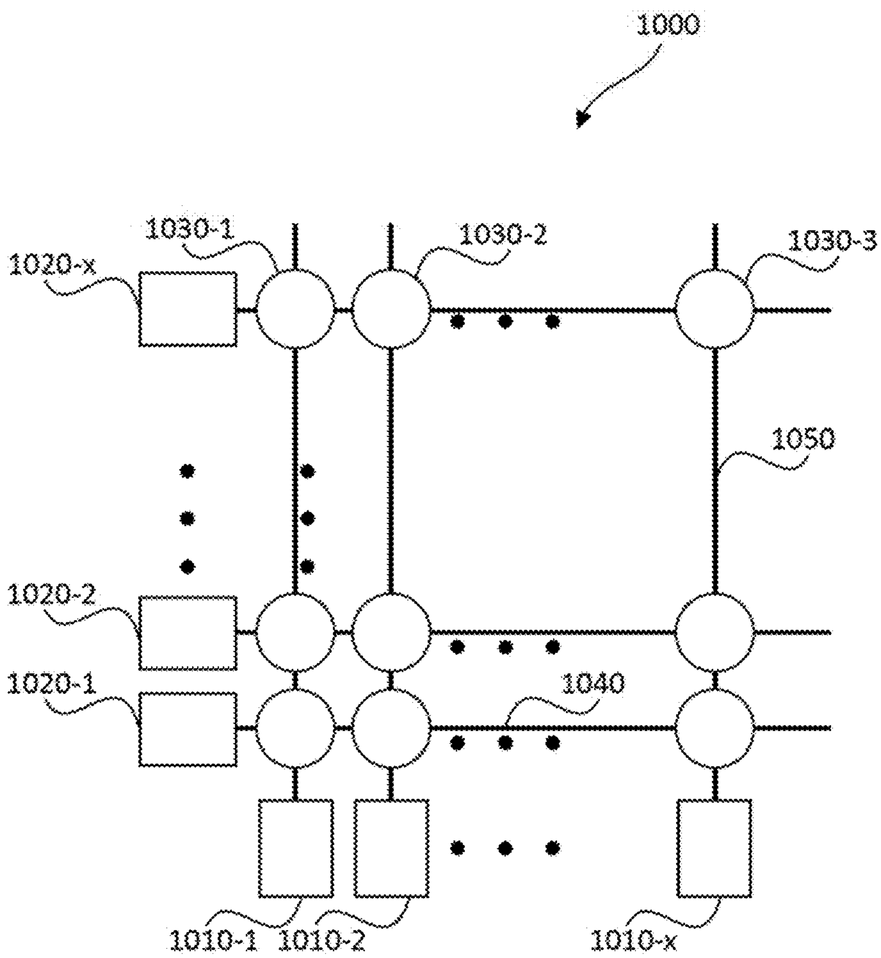
FIG. 10 is a diagrammatic representation of a memory bank.

An example of this conventional architecture is depicted in FIGS. 9 and 10. As shown in FIG. 9, at the bank level, a plurality of mats (e.g., mats 930-1, 930-2, 940-1, and 940-2) may form bank 900. In a conventional rectangular organization, bank 900 may be controlled across global wordlines (e.g., wordline 950) and global bitlines (e.g., bitline 960). Accordingly, row decoder 910 may select the correct wordline based on an incoming control signal (e.g., a request for a read from an address, a request for a write to an address, or the like) and global sense amplifier 920 (and/or a global column decoder, not shown in FIG. 9) may select the correct bitline based on the control signal. Amplifier 920 may also amplify any voltage levels from a selected bank during a read operation. Although depicted as using a row decoder for initial selecting and performing amplification along columns, a bank may additionally or alternatively use a column decoder for initial selecting and perform amplification along rows.

FIG. 10 depicts an example of a mat 1000. For example, mat 100 may form a portion of a memory bank, such as bank 900 of FIG. 9. As depicted in FIG. 10, a plurality of cells (e.g., cells 1030-1, 1030-2, and 1030-3) may form mat 1000. Each cell may comprise a capacitor, a transistor, or other circuitry that stores at least one bit of data. For example, a cell may comprise a capacitor that is charged to represent a '1' and discharged to represent a '0' or may comprise a flip-flop having a first state representing a '1' and a second state representing a '0.' A conventional mat may comprise, for example, 512 bits by 512 bits. In embodiments where mat 1000 forms a portion of MRAM, ReRAM, or the like, a cell may comprise a transistor, resistor, capacitor or other mechanism for isolating an ion or portion of a material that stores at least one bit of data. For example, a cell may comprise a electrolyte ion, a portion of chalcogenide glass, or the like, having a first state representing a '1' and a second state representing a '0.'

As further depicted in FIG. 10, in a conventional rectangular organization, mat 1000 may be controlled across local wordlines (e.g., wordline 1040) and local bitlines (e.g., bitline 1050). Accordingly, wordline drivers (e.g., wordline driver 1020-1, 1020-2, . . . , 1020-*x*) may control the selected wordline to perform a read, write, or refresh based on a control signal from a controller associated with the memory bank of which mat 1000 forms a part (e.g., a request for a read from an address, a request for a write to an address, a refresh signal). Moreover, local sense amplifiers (e.g., local amplifiers 1010-1, 1010-2, . . . , 1010-*x*) and/or local column decoders (not shown in FIG. 10) may control the selected bitline to perform a read, write, or refresh. The local sense amplifiers may also amplify any voltage levels from a selected cell during a read operation. Although depicted as using a wordline driver for initial selecting and performing amplification along columns, a mat may instead use a bitline driver for initial selecting and perform amplification along rows.

As explained above, a large number of mats are duplicated to form a memory bank. Memory banks may be grouped to form a memory chip. For example, a memory chip may comprise eight to thirty-two memory banks. Accordingly, pairing processor subunits with memory banks on a conventional memory chip may result in only eight to thirty two processor subunits. Accordingly, embodiments of the present disclosure may include memory chips with additional sub-bank hierarchy. These memory chips of the present disclosure may then include processor subunits with memory sub-banks used as the dedicated memory banks paired with the processor subunits allowing for a larger number of sub processors, which may then achieve higher parallelism and performance of in-memory computing.

In some embodiments of the present disclosure, the global row decoder and global sense amplifier of bank 900 may be replaced with sub-bank controllers. Accordingly, rather than sending control signals to a global row decoder and a global sense amplifier of the memory bank, a controller of the memory bank may direct the control signal to the appropriate sub-bank controller. The direction may be controlled dynamically or may be hard-wired (e.g., via one or more logic gates). In some embodiments, fuses may be used to indicate the controller of each sub bank or mat whether to block or pass the control signal to the appropriate sub-bank or mat. In such embodiments, faulty sub-banks may thus be deactivated using the fuses.

In one example of such embodiments, a memory chip may include a plurality of memory banks, each memory bank having a bank controller and a plurality of memory sub-banks, each memory sub-bank having a sub-bank row decoder and a sub-bank column decoder for allowing reads and writes to locations on the memory sub-bank. Each sub-bank may comprise a plurality of memory mats, each memory mat having a plurality of memory cells and may have internally local row decoders, column decoders, and/or local sense amplifiers. The sub-bank row decoders and the sub-bank column decoders may process read and write requests from the bank controller or from a sub-bank processor subunit used for in memory computations on the sub-bank memory, as described below. Additionally, each memory sub-bank may further have a controller configured to determine whether to process read requests and write requests from the bank controller and/or to forward them to the next level (e.g., of row and column decoders on a mat) or to block the requests, e.g., to allow an internal processing element or processor subunit to access the memory. In some embodiments, the bank controller may be synchronized to a system clock. However, the sub-bank controllers may be not synchronized to the system clock.

As explained above, the use of sub-banks may allow for the inclusion of a larger number processor subunits in the memory chip than if processor subunits were paired with memory banks of conventional chips. Accordingly, each sub-bank may further have a processor subunit using the sub-bank as a dedicated memory. As explained above, the processor subunit may comprise a RISC, a CISC, or other general-purpose processing subunit and/or may comprise one or more accelerators. Additionally, the processor subunit may include an address generator, as explained above. In any of the embodiments described above, each processor subunit may be configured to access a sub-bank dedicated to the processor subunit using the row decoder and the column decoder of the sub-bank without using the bank controller. The processor sub-unit associated with the sub-bank may also handle the memory mats (including the decoder and memory redundancy mechanisms, described below) and/or determine whether a read or write request from an upper level (e.g., the bank level or the memory level) is forwarded and handled accordingly.

In some embodiments, the sub-bank controller may further include a register that stores a state of the sub-bank. Accordingly, the sub-bank controller may return an error if the sub-bank controller receives a control signal from the memory controller while the register indicates that the sub-bank is in use. In embodiments where each sub-bank further includes a processor subunit, the register may indicate an error if the processor subunit in the sub-bank is accessing the memory in conflict with an external request from the memory controller.

Figure 11:
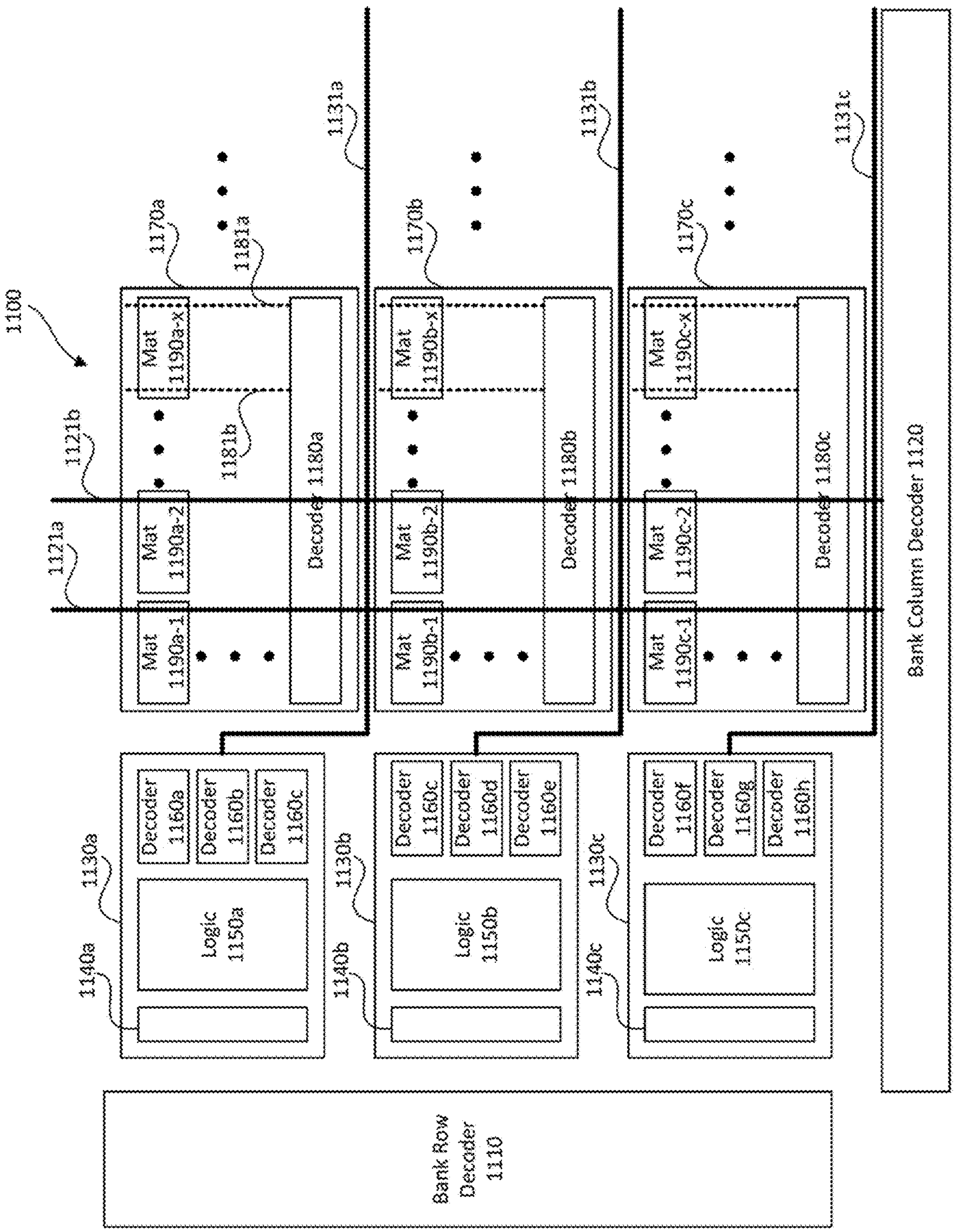
FIG. 11 is a diagrammatic representation of an embodiment of an exemplary memory bank with sub-bank controls consistent with the disclosed embodiments.

FIG. 11 shows an example of another embodiment of a memory bank using sub-bank controllers. In the example of FIG. 11, bank 1100 has a row decoder 1110, a column decoder 1120, and a plurality of memory sub-banks (e.g., sub-banks 1170*a*, 1170*b*, and 1170*c*) with sub-bank controllers (e.g., controllers 1130*a*, 1130*b*, and 1130*c*), the sub-bank controllers may include address resolvers (e.g., resolvers 1140*a*, 1140*b*, and 1140*c*), which may determine whether to pass a request to one or more sub-banks controlled by the sub-bank controller.

The sub-bank controllers may further include one or more logic circuits (e.g., logic 150*sa*, 1150*b*, and 1150*c*). For example, a logic circuit comprising one or more processing elements may allow for one or more operations, such as refreshing of cells in the sub-bank, clearing of cells in the sub-bank, or the like, to be performed without processing requests externally from bank 1100. Alternatively, the logic circuit may comprise a processor subunit, as explained above, such that the processor sub-unit has any sub-banks controlled by the sub-bank controller as corresponding, dedicated memory. In the example of FIG. 11, logic 1150*a* may have sub-bank 1170*a* as a corresponding, dedicated memory, logic 1150*b* may have sub-bank 1170*b* as a corresponding, dedicated memory, and logic 1150*c* may have sub-bank 1170*c* as a corresponding, dedicated memory. In any of the embodiments described above, the logic circuits may have buses to the sub-banks, e.g., buses 1131*a*, 1131*b*, or 1131*c*. As further depicted in FIG. 11, the sub-bank controllers may each include a plurality of decoders, such as a sub-bank row decoder and a sub-bank column decoder for allowing reads and writes, either by a processing element or processor subunit or by a higher-level memory controller issuing commands, to locations on the memory sub-bank(s). For example, sub-bank controller 1130*a* includes decoders 1160*a*, 1160*b*, and 1160*c*, sub-bank controller 1130*b* includes decoders 1160*d*, 1160*e*, and 1160*f*, and sub-bank controller 1130*c* includes decoders 1160*g*, 1160*h*, and 1160*i*. The sub-bank controllers may, based on a request from bank row decoder 1110, select a wordline using the decoders included in the sub-bank controllers. The described system may allow a processing element or processor subunit of the sub-bank to access the memory without interrupting other banks and even other sub-banks, thereby allowing each sub-bank processor subunit to perform memory computations in parallel with the other sub-bank processor subunits.

Furthermore, each sub-bank may comprise a plurality of memory mats, each memory mat having a plurality of memory cells. For example, sub-bank 1170*a* includes mats 1190*a*-1, 1190*a*-2, . . . , 1190*a*-*x*; sub-bank 11706 includes mats 1190*b*-1, 1190*b*-2, . . . , 1190*b*-*x*; and sub-bank 1170*c* includes mats 1190*c*-1, 1190*c*-2, . . . , 1190*c*-3. As further depicted in FIG. 11, each sub-bank may include at least one decoder. For example, sub-bank 1170*a* includes decoder 1180*a*, sub-bank 1170*b* includes decoder 1180*b*, and sub-bank 1170*c* includes decoder 1180*c*. Accordingly, bank column decoder 1120 may select a global bitline (e.g., bitline 1121*a* or 1121*b*) based on external requests while the sub-bank selected by bank row decoder 1110 may use its column decoder to select a local bitline (e.g., bitline 1181*a* or 1181*b*) based on local requests from the logic circuit to which the sub-bank is dedicated. Accordingly, each processor subunit may be configured to access a sub-bank dedicated to the processor subunit using the row decoder and the column decoder of the sub-bank without using the bank row decoder and the bank column decoder. Thus, each processor subunit may access a corresponding sub-bank without interrupting other sub-banks. Moreover, sub-bank decoders may reflect accessed data to the bank decoders when the request to the sub-bank is external to the processor subunit. Alternatively, in embodiments where each sub-bank has only one row of memory mats, the local bitlines may be the bitlines of the mat rather than bitlines of the sub-bank.

A combination of embodiments using sub-bank row decoders and sub-bank column decoders with the embodiment depicted in FIG. 11 may be used. For example, the bank row decoder may be eliminated but the bank column decoder retained and local bitlines used.

Figure 12:
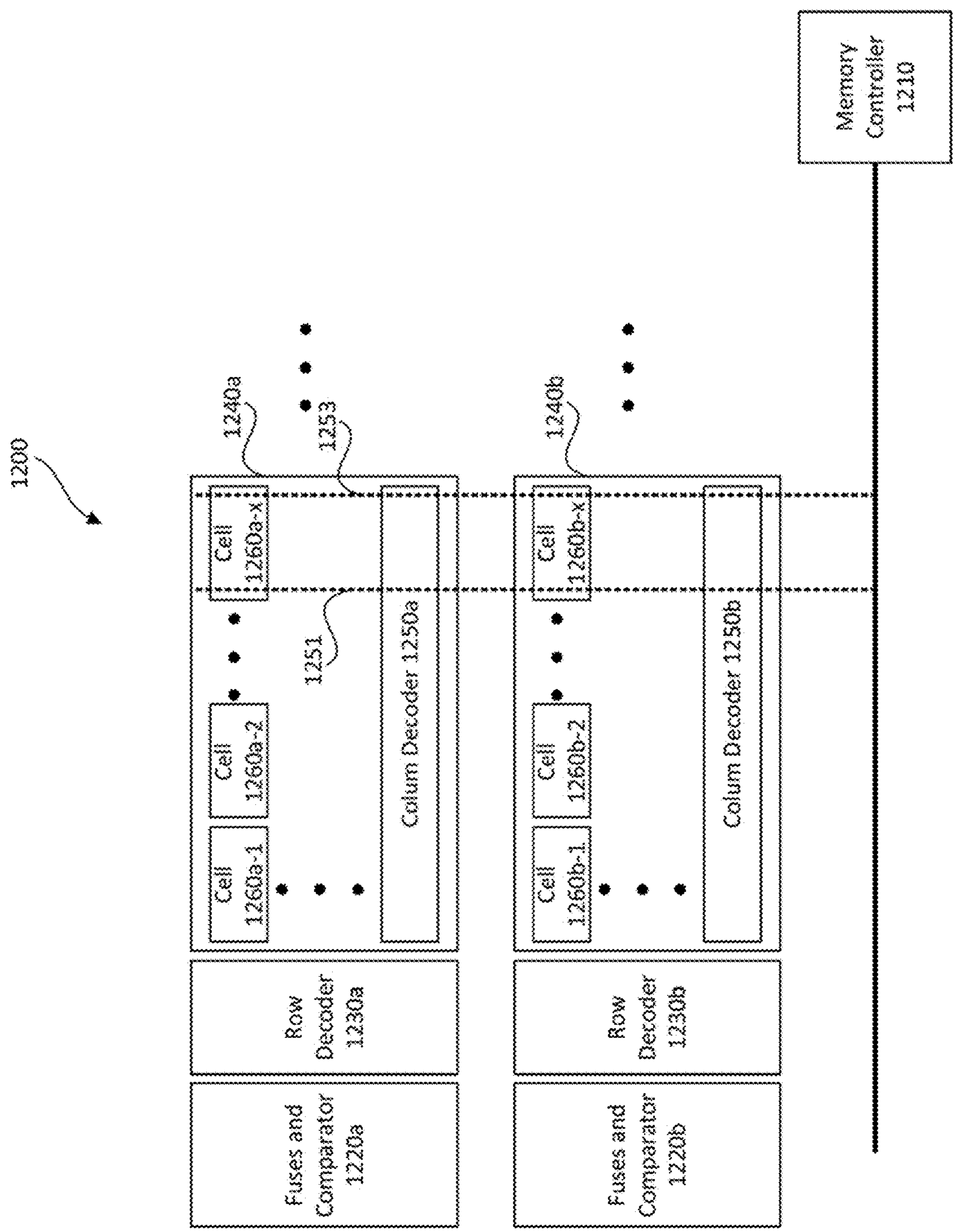
FIG. 12 is a diagrammatic representation of another embodiment of an exemplary memory bank with sub-bank controls consistent with the disclosed embodiments.

FIG. 12 shows an example of an embodiment of a memory sub-bank 1200 having a plurality of mats. For example, sub-bank 1200 may represent a portion of sub-bank 1100 of FIG. 11 or may represent an alternative implementation of a memory bank. In the example of FIG. 12, sub-bank 1200 includes a plurality of mats (e.g., mats 1240*a* and 1240*b*). Moreover, each mat may include a plurality of cells. For example, mat 1240*a* includes cells 1260*a*-1, 1260*a*-2, . . . , 1260*a*-*x*, and mat 1240*b* includes cells 1260*b*-1, 1260*b*-2, . . . , 1260*b*-*x*.

Each mat may be assigned a range of addresses that will be assigned to the memory cells of the mat. These addresses may be configured at production such that mats may be shuffled around and such that faulted mats may be deactivated and left unused (e.g., using one or more fuses, as explained further below).

Sub-bank 1200 receives read and write requests from memory controller 1210. Although not depicted in FIG. 12, requests from memory controller 1210 may be filtered through a controller of sub-bank 1200 and directed to an appropriate mat of sub-bank 1200 for address resolution. Alternatively, at least a portion (e.g., higher bits) of an address of a request from memory controller 1210 may be transmitted to all mats of sub-bank 1200 (e.g., mats 1240*a* and 1240*b*) such that each mat may process the full address and the request associated with the address only if the mat's assigned address range includes the address specified in the command. Similar to the sub-bank direction described above, the mat determination may be dynamically controlled or may be hardwired. In some embodiments, fuses may be used to determine the address range for each mat, also allowing for disabling of faulty mats by assigning an illegal address range. Mats may additionally or alternatively be disabled by other common methods or connection of fuses.

In any of the embodiments described above, each mat of the sub-bank may include a row decoder (e.g., row decoder 1230*a* or 1230*b*) for selection of a wordline in the mat. In some embodiments, each mat may further include fuses and comparators (e.g., 1220*a* and 1220*b*). As described above, the comparators may allow each mat to determine whether to process an incoming request, and the fuses may allow each mat to deactivate if faulty. Alternatively, row decoders for the bank and/or sub-bank may be used rather than a row decoder in each mat.

Furthermore, in any of the embodiments described above, a column decoder included in the appropriate mat (e.g., column decoder 1250*a* or 1250*b*) may select a local bitline (e.g., bitline 1251 or 1253). The local bitline may be connected to a global bitline of the memory bank. In embodiments where the sub-bank has local bitlines of its own, the local bitline of the cell may be further connected to the local bitline of the sub-bank. Accordingly, data in the selected cell may be read through the column decoder (and/or sense amplifier) of the cell, then through the column decoder (and/or sense amplifier) of the sub-bank (in embodiments including a sub-bank column decoder and/or sense amplifier), and then through the column decoder (and/or sense amplifier) of the bank.

Mat 1200 may be duplicated and arrayed to form a memory bank (or a memory sub-bank). For example, a memory chip of the present disclosure may comprise a plurality of memory banks, each memory bank having a plurality of memory sub-banks, and each memory sub-bank having a sub-bank controller for processing reads and writes to locations on the memory sub-bank. Furthermore, each memory sub-bank may comprise a plurality of memory mats, each memory mat having a plurality of memory cells and having a mat row decoder and a mat column decoder (e.g., as depicted in FIG. 12). The mat row decoders and the mat column decoders may process read and write requests from the sub-bank controller. For example, the mat decoders may receive all requests and determine (e.g., using a comparator) whether to process the request based on a known address range of each mat, or the mat decoders may only receive requests within the known address range based on selection of a mat by the sub-bank (or bank) controller.

Controller Data Transfers

Any of the memory chips of the present disclosure may also share data using memory controllers (or sub-bank controllers or mat controllers) in addition to sharing data using processing subunits. For example, a memory chip of the present disclosure may comprise a plurality of memory banks (e.g., an SRAM bank, a DRAM bank, or the like), each memory bank having a bank controller, a row decoder, and a column decoder for allowing reads and writes to locations on the memory bank, as well as a plurality of buses connecting each controller of the plurality of bank controllers to at least one other controller of the plurality of bank controllers. The plurality of buses may be similar to the buses connecting the processing subunits, as described above, but connecting the bank controllers directly rather than through the processing subunits. Furthermore, although described as connecting the bank controllers, buses may additionally or alternatively connect sub-bank controllers and/or mat controllers.

In some embodiments, the plurality of buses may be accessed without interruption of data transfers on main buses of the memory banks connected to one or more processor subunits. Accordingly, a memory bank (or sub-bank) may transmit data to or from a corresponding processor subunit in the same clock cycle as transmitting data to or from a different memory bank (or sub-bank). In embodiments where each controller is connected to a plurality of other controllers, the controllers may be configurable for selection of one other of the other controllers for sending or receiving of data. In some embodiments, each controller may be connected to at least one neighboring controller (e.g., pairs of spatially adjacent controllers may be connected to one another).

Redundant Logic in Memory Circuits

The disclosure is generally directed to a memory chip with primary logic portions for on-chip data processing. The memory chip may include redundant logic portions, which may replace defective primary logic portions to increase the fabrication yield of the chip. Thus, the chip may include on-chip components that allow a configuration of logic blocks in the memory chip based on individual testing of the logic portions. This feature of the chip may increase yields because a memory chip with larger areas dedicated to logic portions is more susceptible to fabrication failures. For example, DRAM memory chips with large redundant logic portions may be susceptible to fabrication issues that reduce yield. However, implementing redundant logic portions may result in increased yield and reliability because it provides a manufacturer or user of DRAM memory chips to turn on or off full logic portions while maintaining the ability of high parallelism. It should be noted that here and throughout the disclosure, example of certain memory types (such as DRAM) may be identified in order to facilitate the explanation of disclosed embodiments. It is to be understood, however, that in such instances the identified memory types are not intended to be limiting. Rather, memory types such as DRAM, Flash, SRAM, ReRAM, PRAM, MRAM, ROM, or any other memory may be used together with the disclosed embodiments even if fewer examples are specifically identified in a certain section of the disclosure.

Figure 13:
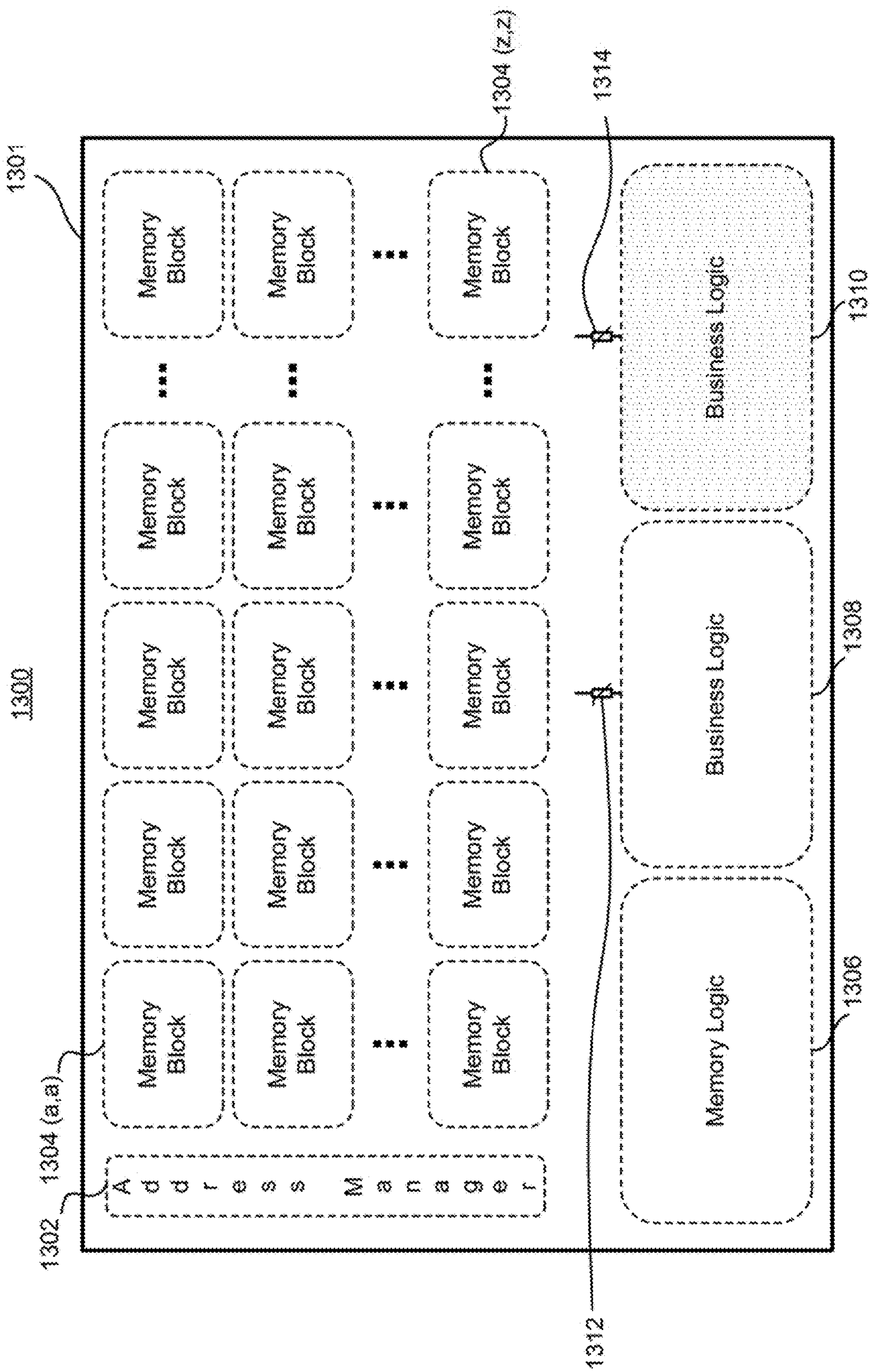
FIG. 13 is a block diagram of an exemplary memory chip, consistent with disclosed embodiments.

FIG. 13 is a block diagram of an exemplary memory chip 1300, consistent with disclosed embodiments. Memory chip 1300 may be implemented as a DRAM memory chip. Memory chip 1300 may also be implemented as any type of memory volatile or non-volatile, such as Flash, SRAM, ReRAM, PRAM, and/or MRAM, etc. Memory chip 1300 may include a substrate 1301 in which an address manager 1302, a memory array 1304 including a plurality of memory banks, 1304(*a,a*) to 1304(*z,z*), a memory logic 1306, a business logic 1308, and a redundant business logic 1310 are disposed. Memory logic 1306 and business logic 1308 may constitute primary logic blocks, while redundant business logic 1310 may constitute redundant blocks. In addition, memory chip 1300 may include configuration switches, which may include deactivation switches 1312, and an activation switches 1314. Deactivation switches 1312 and activation switches 1314 may also be disposed in the substrate 1301. In this Application, memory logic 1306, business logic 1308, and redundant business logic 1310 may also be collectively referred to as the "logic blocks."

Address manager 1302 may include row and column decoders or other type of memory auxiliaries. Alternatively, or additionally, address manager 1302 may include a microcontroller or processing unit.

In some embodiments, as shown in FIG. 13, memory chip 1300 may include a single memory army 1304 that may arrange the plurality of memory blocks in a two-dimensional array on substrate 1301. In other embodiments, however, memory chip 1300 may include multiple memory arrays 1304 and each of the memory arrays 1304 may arrange memory blocks in different configurations. For example, memory blocks in at least one of the memory arrays (also known as memory banks) may be arranged in a radial distribution to facilitate routing between address manager 1302 or memory logic 1306 to the memory blocks.

Business logic 1308 may be used to do the in-memory computation of an application that is not related to the logic used to manage the memory itself. For example, business logic 1308 may implement functions related to AI such as floating, integer, or MAC operations used as activation functions. In addition, business logic 1308 may implement data base related functions like min, max, sort, count, among others. Memory logic 1306 may perform tasks related to memory management, including (but not limited to) read, write, and refresh operations. Therefore, business logic may be added in one or more of the bank level, mats level, or a group of mats level. Business logic 1308 may have one or more address outputs and one or more data inputs/outputs. For instance, business logic 1308 can address by row\column lines to address manager 1302. In certain embodiments, however, the logic blocks may be additionally or alternatively addressed via data inputs\outputs.

Redundant business logic 1310 may be a replicate of business logic 1308. In addition, redundant business logic 1310 may be connected to deactivation switches 1312 and/or activation switches 1314, which may include small fuse\anti-fuse, and used for logic disabling or enabling one of the instances (e.g., an instance which is connected by default) and enable one of the other logic blocks (e.g., an instance which is disconnected by default). In some embodiments, as further described in connection to FIG. 15, the redundancy of blocks may be local within a logic block, such as business logic 1308.

In some embodiments, the logic blocks in memory chip 1300 may be connected to subsets of memory array 1304 with dedicated buses. For example, a set of memory logic 1306, business logic 1308, and redundant business logic 1310 may be connected to the first row of memory blocks in memory array 1304 (i.e., memory blocks 1304 (*a,a*) to 1304 (*a,z*)). The dedicated buses may allow associated logic blocks to quickly access data from the memory blocks without requirements of opening communication lines through, for example, address manager 1302.

Each of the plurality of primary logic blocks may be connected to at least one of the plurality of memory banks 1304. Also, redundant blocks, such as redundant business block 1310, may be connected to at least one of the memory instances 1304(*a,a*)-(*z,z*). Redundant blocks may replicate at least one of the plurality of primary logic blocks, such as memory logic 1306 or business logic 1308. Deactivation switches 1312 may be connected to at least one of the plurality of primary logic blocks and activation switches 1314 may be connected to at least one of the plurality of redundant blocks.

In these embodiments, upon detecting of a fault associated with one of the plurality of primary logic blocks (memory logic 1306 and/or business logic 1308), deactivation switches 1312 may be configured to disable the one of the plurality of primary logic blocks. Simultaneously, activation switches 1314 may be configured to enable one of the plurality of redundant blocks, such as redundant logic block 1310, that replicates the one of the plurality of primary logic blocks.

In addition, activation switches 1314 and deactivation switches 1312, which may collectively be referred to as "configuration switches," may include an external input to configure the status of the switch. For instance, activation switches 1314 may be configured so an activation signal in the external input causes a closed switch condition, while deactivation switches 1312 may be configured so a deactivation signal in the external input causes an open switch condition. In some embodiments, all configuration switches in 1300 may be deactivated by default and become activated or enabled after a test indicates an associated logic block is functional and a signal is applied in the external input. Alternatively, in some cases, all configuration switches in 1300 may be enabled by default and way be deactivated or disabled after a test indicates an associated logic block is not functional and a deactivation signal is applied in the external input.

Regardless of whether a configuration switch is initially enabled or disabled, upon detection of a fault associated with an associated logic block, the configuration switch may disable the associated logic block. In cases where the configuration switch is initially enabled, the state of the configuration switch may be changed to disabled in order to disable the associated logic block. In cases where the configuration switch is initially disabled, the state of the configuration switch may be left in its disabled state in order to disable the associated logic block. For example, the result of an operability test may indicate that a certain logic block is nonoperational or that it fails to operate within certain specifications. In such cases, the logic block may be disabled my not enabling its corresponding configuration switch.

In some embodiments, configuration switches may be connected to two or more logic blocks and may be configured to choose between different logic blocks. For example, a configuration switch may be connected to both business logic 1308 and redundant logic block 1310. Configuration switch may enable redundant logic block 1310 while disabling business logic 1308.

Alternatively, or additionally, at least one of the plurality of primary logic blocks (memory logic 1306 and/or business logic 1308) may be connected to a subset of the plurality of memory banks or memory instances 1304 with a first dedicated connection. Then, at least one of the plurality of redundant blocks (such as redundant business logic 1310), which replicates the at least one of the plurality of primary logic blocks, may be connected to the subset of the same plurality of memory banks or instances 1304 with a second dedicated connection.

Moreover, memory logic 1306 may have different functions and capabilities than business logic 1308. For example, while memory logic 1306 may be designed to enable read and write operations in the memory bank 1304, business logic 1308 may be designed to perform in-memory computations. Therefore, if the business logic 1308 includes a first business logic block, and the business logic 1308 includes a second business logic block (like redundant business logic 1310), it is possible to disconnect defective business logic 1308 and reconnect redundant business logic 1310 without missing any capability.

In some embodiments, configuration switches (including deactivation switches 1312 and activation switches 1314) may be implemented with a fuse, an anti-fuse, or a programmable device (including a one-time programmable device), or other form of non-volatile memory.

Figure 14:
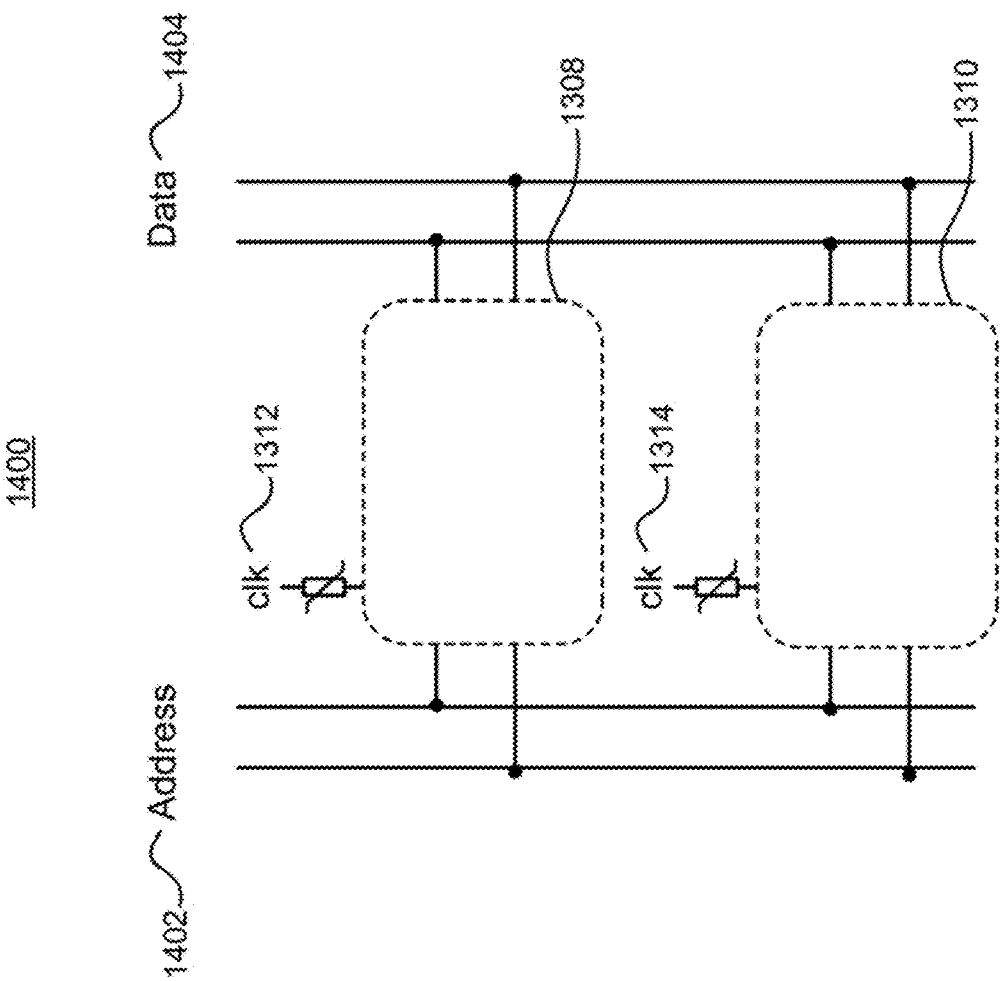
FIG. 14 is a block diagram of an exemplary redundant logic block set, consistent with disclosed embodiments.

FIG. 14 is a block diagram of an exemplary redundant logic block set 1400, consistent with disclosed embodiments. In some embodiments, redundant logic block set 1400 may be disposed in substrate 1301. Redundant logic block set 1400 may include at least one of business logic 1308, and redundant business logic 1310, connected to switches 1312 and 1314, respectively. In addition, business logic 1308 and redundant business logic 1310 may be connected to an address bus 1402 and a data bus 1404.

In some embodiments, as shown in FIG. 14, the switches 1312 and 1314 may connect logic blocks to a clock node. In this way, the configuration switches may engage or disengage the logic blocks from the clock signal, effectively activating or deactivating the logic blocks. In other embodiments, however, switches 1312 and 1314 may connect logic blocks to other nodes for activation or deactivation. For instance, configuration switches may connect logic blocks to a voltage supply node (e.g., VCC) or to the ground node (e.g., GND) or clock signal. In this way, the logic blocks may be enable of disable by the configuration switches because they would create an open circuit or cut-off the logic block power supply.

In some embodiments, as shown in FIG. 14, address bus 1402 and data bus 1404 may be in opposite sides of the logic blocks, which are connected in parallel to each one of the buses. In this way, routing of the different on-chip components may be facilitated by the logic block set 1400.

In some embodiments, each one of the plurality of deactivation switches 1312 couple at least one of the plurality of primary logic blocks with a clock node, and each one of the plurality of activation switches 1314 may be couple at least one of the plurality of redundant blocks with the clock node allowing to connect\disconnect the clock as a simple activation\deactivation mechanism.

Redundant business logic 1310 of redundant logic block set 1400 allows the designer to choose, based on area and routing, the blocks that are worth duplication. For example, a chip designer may select larger blocks for duplication because larger blocks may be more error prone. Thus, a chip designer may decide to duplicate large logic blocks. On the other hand, a designer may prefer to duplicate smaller logic blocks because they are easily duplicated without a significant loss of space. Moreover, using the configuration in FIG. 14, a designer may easily choose to duplicate logic blocks depending on the statistics of errors per area.

Figure 15:
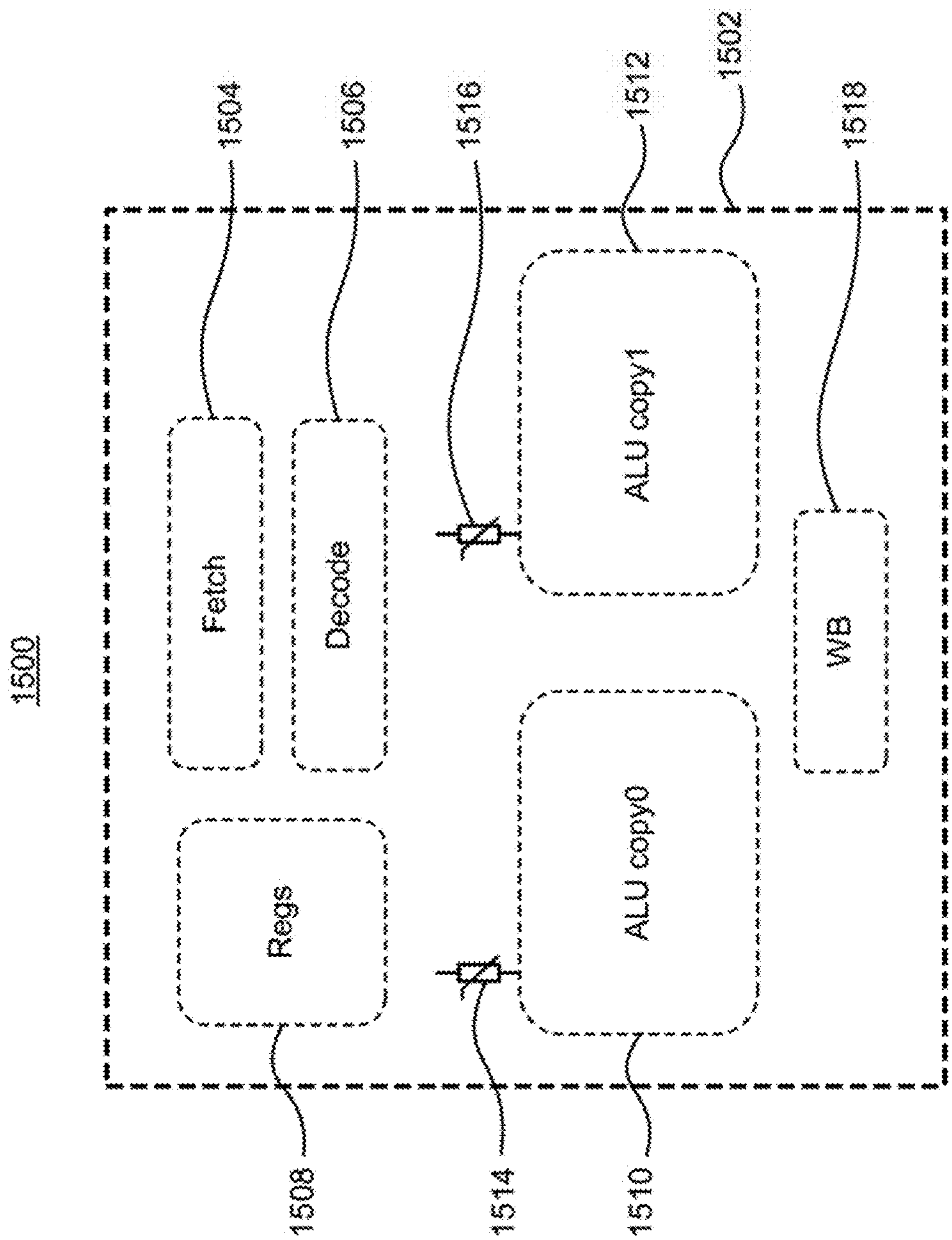
FIG. 15 is a block diagram for an exemplary logic block, consistent with disclosed embodiments.

FIG. 15 is a block diagram for an exemplary logic block 1500, consistent with disclosed embodiments. The logic block may be business logic 1308 and/or redundant business logic 1310. In other embodiments, however, the exemplary logic block may describe memory logic 1306 or other component of memory chip 1300.

Logic block 1500 presents yet another embodiment where the logic redundancy is used within a small processor pipeline. The logic block 1500 may include a register 1508, a fetch circuit 1504, decoder 1506, and a write-back circuit 1518. In addition, logic block 1500 may include a computation unit 1510 and a duplicated computing unit 1512. However, in other embodiments, logic block 1500 may include other units that do not comprise a controller pipeline but include sporadic processing elements that comprise a required business logic.

Computation unit 1510 and duplicated computation unit 1512 may include a digital circuit capable of performing digital calculations. For example, computation unit 1510 and duplicated computation unit 1512 may include an arithmetic logic unit (ALU) to perform arithmetic and bitwise operations on binary numbers. Alternatively, computation unit 1510 and duplicated computation unit 1512 may include a floating-point unit (FPU), which operates on floating point numbers. In addition, in some embodiments computation unit 1510 and duplicated computation unit 1512 may implement data base related functions like min, max, count, and compare operations, among others.

In some embodiments, as shown in FIG. 15, computation unit 1510 and duplicated computation unit 1512 may be connected to switching circuits 1514 and 1516. When activated the switching circuits may enable or disable the computing units.

In logic block 1500, the duplicated computation unit 1512 may replicate the computation unit 1510. Moreover, in some embodiments, register 1508, fetch circuit 1504, decoder 1506, and write-back circuit 1518 (collectively referred to as the local logic units) may be smaller in size than the computation unit 1510. Because larger elements are more prone to issues during fabrication, a designer may decide to replicate larger units (such as computation unit 1510) instead of smaller units (such as the local logic units). Depending on historic yields and error rates, however, a designed may elect to duplicate local logic units additionally or alternatively to large units (or the entire block). For example, computation unit 1510 may be larger, and thus more error prone, than register 1508, fetch circuit 1504, decoder 1506, and write-back circuit 1518. A designer may choose to duplicate computation unit 1510 instead of the other elements in logic block 1500 or the whole block.

Logic block 1500 may include a plurality of local configuration switches, each one of the plurality of local configuration switches being connected to at least one of the at least one of computation unit 1510 or duplicated computation unit 1512. Local configuration switches may be configured to disable computation unit 1510 and enable duplicated computation unit 1512 when a fault is detected in the computation unit 1510.

Figure 16:
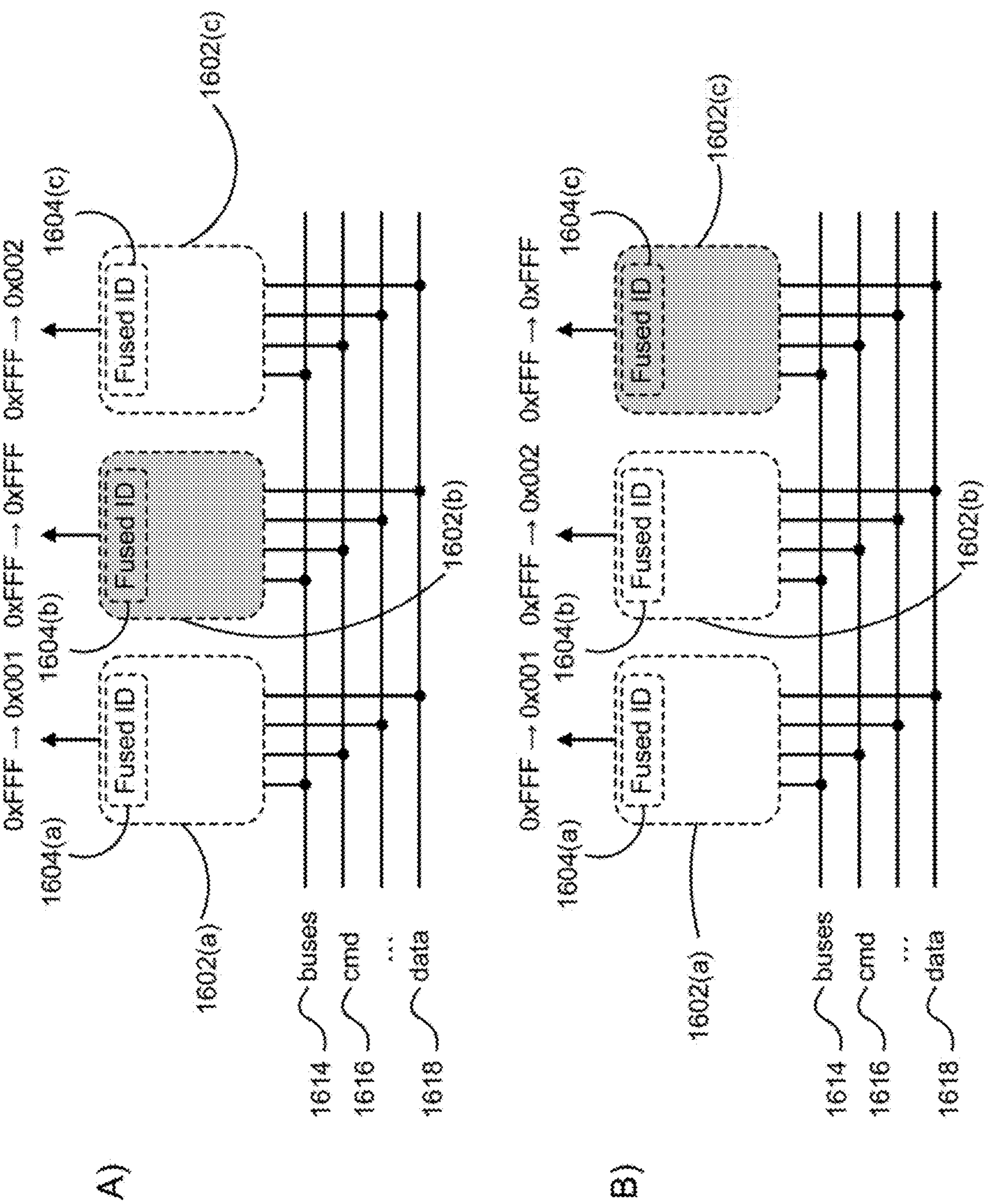
FIG. 16 are block diagrams of exemplary logic blocks connected with a bus, consistent with disclosed embodiments.

FIG. 16 shows block diagrams of exemplary logic blocks connected with a bus, consistent with disclosed embodiments. In some embodiments, logic blocks 1602 (which may represent memory logic 1306, business logic 1308, or redundant business logic 1310) may be independent of each other, may be connected via a bus, and may be activated externally by addressing them specifically. For example, memory chip 1300 may include many logic blocks, each logic block having an ID number. In other embodiments, however, logic blocks 1602 may represent larger units comprised of a plurality one or more of memory logic 1306, business logic 1308, or redundant business logic 1310.

In some embodiments, each one of logic blocks 1602 may be redundant with the other logic blocks 1602. This complete redundancy, in which all blocks may operate as primary or redundant blocks, may improve fabrication yields because a designer may disconnect faulty units while maintaining functionality of the overall chip. For example, a designer may have the ability to disable logic areas that are prone to errors but maintain similar computation capabilities because the all duplicate blocks may be connected to the same address and data buses. For example, the initial number of logic blocks 1602 may greater than a target capability. Then, disabling some logic blocks 1602 would not affect the target capability.

A bus connected to the logic blocks may include address bus 1614, command lines 1616, and data lines 1618. As shown in FIG. 16, each one of the logic blocks may be connected independently from each line in the bus. In certain embodiments, however, logic blocks 1602 may be connected in a hierarchical structure to facilitate routing. For instance, each line in the bus may be connected to a multiplexer that routes the line to different logic blocks 1602.

In some embodiments, to allow external access without knowing the internal chip structure, which may change due to enable and disabled units, each one of the logic blocks may include Fused IDs such as fused identification 1604. Fused identification 1604 may include an array of switches (like fuses) that determine an ID and may be connected to a managing circuit. For example, fused identification 1604 may be connected to address manager 1302. Alternatively, fused identification 1604 may be connected to higher memory address units. In these embodiments, fused identification 1604 may be configurable to for a specific address. For example, fused identification 1604 may include a programmable, non-volatile device that determines a final ID based on instructions received form a managing circuit.

A distributed processor on a memory chip may be designed with the configuration depicted in FIG. 16. A testing procedure executed as BIST at chip wakeup or at factory testing may assign running ID numbers to blocks in the plurality of primary logic blocks (memory logic 1306 and business logic 1308) that pass a testing protocol. A testing procedure may also assign illegal ID numbers to blocks in the plurality of primary logic blocks that do not pass the testing protocol. The test procedure may also assign running ID numbers to blocks in the plurality of redundant blocks (redundant logic block 1310) that pass the testing protocol. Because redundant blocks replace failing primary logic blocks, the blocks in the plurality of redundant blocks assigned running ID numbers may be equal to, or greater than, the blocks in the plurality of primary logic blocks assigned illegal ID numbers, thereby disabling the block. In addition, each one of the plurality of primary logic blocks and each one of the plurality of redundant blocks may include at least one fused identification 1604. Also, as shown in FIG. 16, the bus connecting logic blocks 1602 may include a command line, a data line, and an address line.

In other embodiments, however, all logic blocks 1602 that are connected to the bus will start disabled and with no ID number. Tested one by one, each good logic block will get a running ID number, and those logic blocks not working will remain with illegal ID, which would disable these blocks. In this manner, redundant logic blocks may improve the fabrication yields by replacing blocks that arm known to be defective during the testing process.

Address bus 1614 may couple a managing circuit to each one of the plurality of memory banks, each one of the plurality of primary logic blocks, and each one of the plurality of redundant blocks. These connections allow the managing circuit to, upon detection of the fault associated with a primary logic blocks (such as business logic 1308), assign an invalid address to the one of the plurality of primary logic blocks and assign a valid address to the one of the plurality of redundant blocks.

For example, as shown in FIG. 16A, illegal IDs are configured to all logic blocks 1602(*a*)-(*c*) (e.g., address 0xFFF). After testing logic blocks 1602(*a*) and 1602(*c*) are verified to be functional while logic block 1602(*b*) is not functional. In FIG. 16A unshaded logic blocks may represent logic blocks that passed the functionality test successfully, while shaded logic blocks may represent logic blocks that failed the test for functionality. Then, the test procedure changes the illegal IDs to legal IDs for logic blocks that are functional while leaving the illegal IDs for logic blocks that are not functional. As an example, in FIG. 16A, the address for logic blocks 1602(*a*) and 1602(*c*) is changed from 0xFFF to 0x00 and 0x002, respectively. In contrast, the address for logic block 1602(*b*) remains the illegal address 0xFFF. In some embodiments, the ID is changed by programming a corresponding fused identification 1604.

Different results from the testing of logic blocks 1602 may result in a different configuration. For example, as shown in FIG. 16B, address manager 1302 may initially assign illegal IDs to all logic blocks 1602 (i.e., 0xFFF). The testing results, however, may indicate that both logic blocks 1602(*a*) and 1602(*b*) are functional. In these cases, testing of logic block 1602(*c*) may not be necessary because memory chip 1300 may require only two logic blocks. Therefore, to minimize testing resources, logic blocks may be tested only according to the minimum number of functional logic blocks needed by the product definition of 1300, leaving other logic blocks untested. FIG. 16B also shows unshaded logic blocks, which represent tested logic blocks that passed the test for functionality, and shaded logic blocks, which represent untested logic blocks.

In these embodiments, a production tester (external or internal, automatic or manual) or a controller executing a BIST at startup, may change illegal IDs to running IDs for tested logic blocks that are functional while leaving the illegal IDs to untested logic blocks. As an example, in FIG. 16B, the address for logic blocks 1602(*a*) and 1602(*b*) is changed from 0xFFF to 0x00 and 0x002, respectively. In contrast, the address for untested logic block 1602(*c*) remains with the illegal address 0xFFF.

Figure 17:
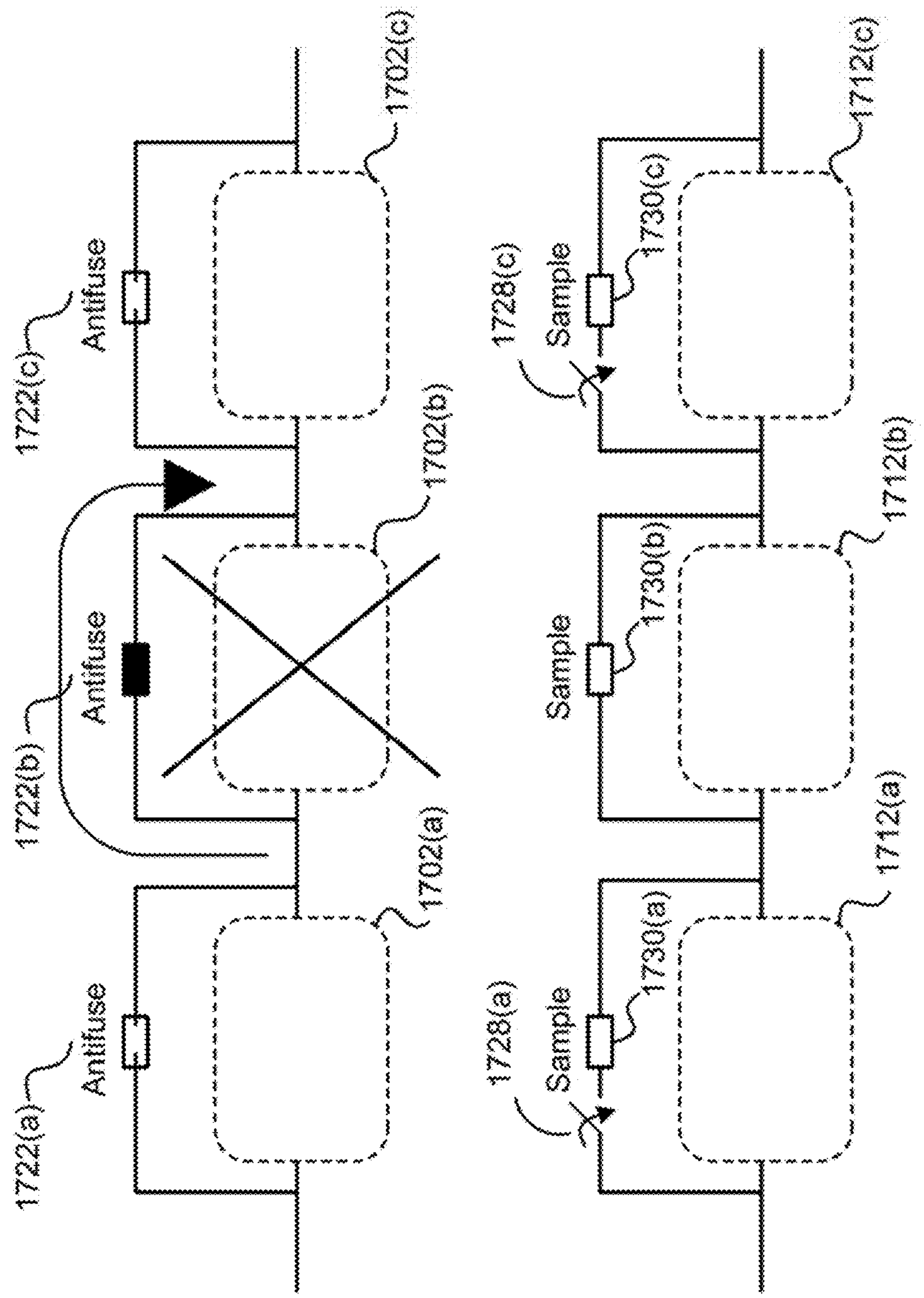
FIG. 17 is a block diagram for exemplary logic blocks connected in series, consistent with disclosed embodiments.

FIG. 17 is a block diagram for exemplary units 1702 and 1712 connected in series, consistent with disclosed embodiments. FIG. 17 may represent an entire system or chip. Alternatively. FIG. 17 may represent a block in a chip containing other functional blocks.

Units 1702 and 1712 may represent complete units that include a plurality of logic blocks such as memory logic 1306 and/or business logic 1308. In these embodiments units 1702 and 1712 may also include elements required to perform operations such as address manager 1302. In other embodiments, however, units 1702 and 1712 may represent logic units such as business logic 1308 or redundant business logic 1310.

FIG. 17 presents embodiments in which units 1702 and 1712 may need to communicate between themselves. In such cases, units 1702 and 1712 may be connected in series. However, a non-working unit may break the continuity between the logic blocks. Therefore, the connection between units may include a bypass option when a unit needs to be disabled due to a defect. The bypass option can also be a part of the bypassed unit itself.

In FIG. 17 units may be connected in series (e.g., 1702(*a*)-(*c*)), and a failing unit (e.g., 1702(*b*)) may be bypassed when it is defective. The units may further be connected in parallel with switching circuits. For example, in some embodiments units 1702 and 1712 may be connected with switching circuits 1722 and 1728, as depicted in FIG. 17. In the example depicted in FIG. 17, unit 1702(*b*) is defective. For example, unit 1702(*b*) does not pass a test for a circuit functionality. Therefore, unit 1702(*b*) may be disabled using, for example, activation switches 1314 (not shown in FIG. 17) and/or switching circuit 1722(*b*) may be activated to bypass unit 1702(*b*) and sustain the connectivity between logic blocks.

Accordingly, when a plurality of primary units are connected in series, each one of the plurality of units may be connected in parallel with a parallel switch. Upon detection of a fault associated with the one of the plurality of units, the parallel switch connected to the one of the plurality of units may be activated to connect two of the plurality of units.

In other embodiments, as shown in FIG. 17, switching circuits 1728 may include a sampling point or more that would cause a cycle or cycles delay maintaining synchronization between different lines of units. When a unit is disabled, shorting the connection between adjacent logic blocks may generate synchronization errors with other calculations. For example, if a task requires data from both A and B lines, and each of A and B is carried by an independent series of units, disabling a unit would cause a desynchronization between the lines that would require further data management. To prevent desynchronizations, sample circuits 1730 may simulate the delay caused by the disabled unit 1712(*b*). Nonetheless, in some embodiments, the parallel switch may include an anti-fuse instead of a sampling circuit 1730.

Figure 18:
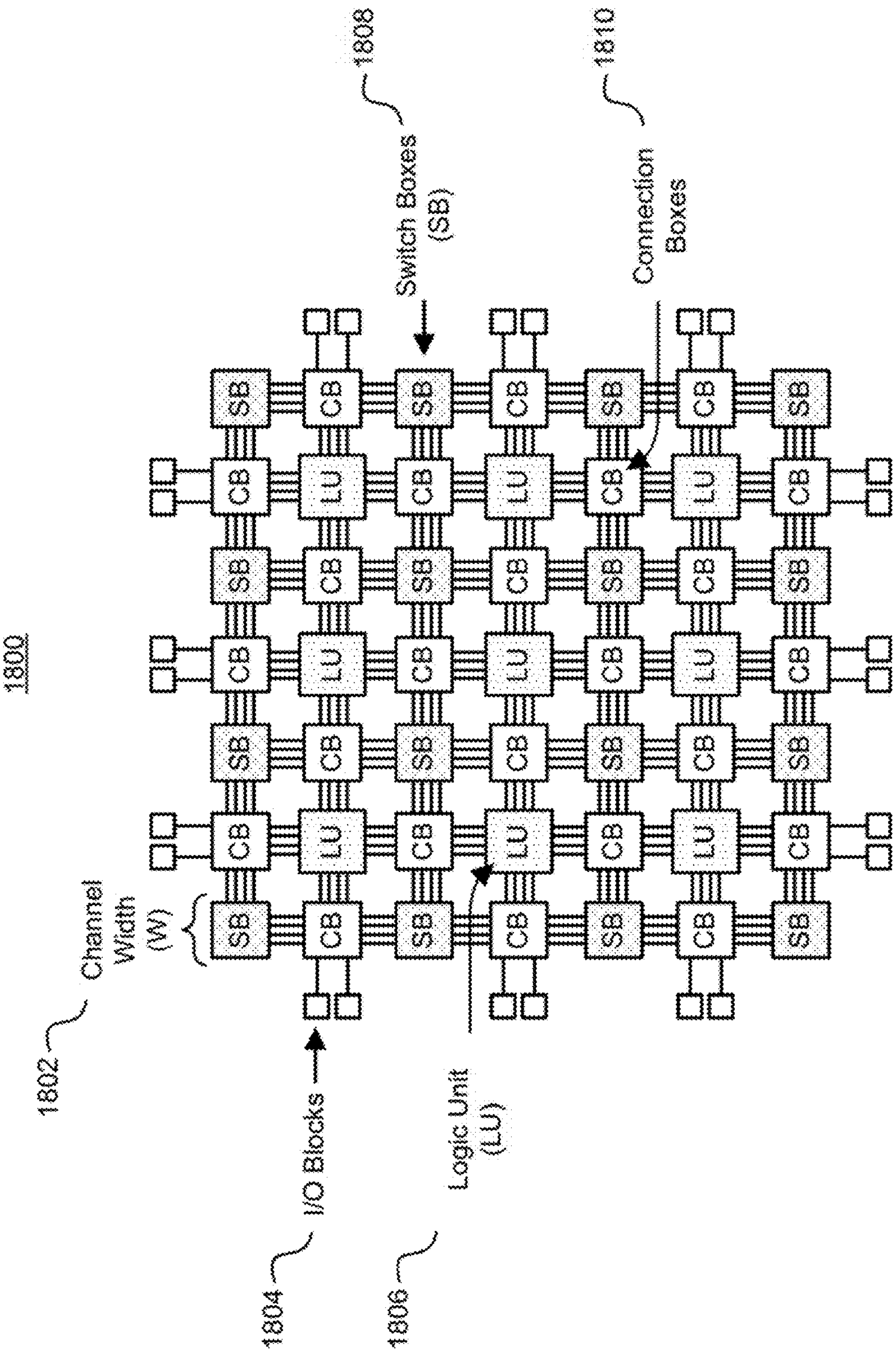
FIG. 18 is a block diagram of exemplary logic blocks connected in a two-dimension array, consistent with disclosed embodiments.

FIG. 18 is a block diagram of exemplary units connected in a two-dimension array, consistent with disclosed embodiments. FIG. 18 may represent an entire system or chip. Alternatively, FIG. 18 may represent a block in a chip containing other functional blocks.

Units 1806 may represent autonomous units that include a plurality of logic blocks such as memory logic 1306 and/or business logic 1308. However, in other embodiments units 1806 may represent logic units such as business logic 1308. Where convenient, discussion of FIG. 18 may refer to elements identified in FIG. 13 (e.g., memory chip 1300) and discussed above.

As shown in FIG. 18, units may be arranged in a two-dimensional array in which units 1806 (which may include or represent one or more of memory logic 1306, business logic 1308, or redundant business logic 1310) are interconnected via switching boxes 1808 and connection boxes 1810. In addition, in order to control the configuration of the two-dimensional array, the two-dimensional array may include I/O blocks 1804 in the periphery of the two-dimensional array.

Connection boxes 1810 may be programmable and reconfigurable devices that may respond to signals inputted from the I/O blocks 1804. For example, connection boxes may include a plurality of input pins from units 1806 and may also be connected to switching boxes 1808. Alternatively, connection boxes I/O may include a group of switches connecting pins of programmable logic cells with routing tracks, while switching boxes 1808 may include a group of switches connecting different tracks.

In certain embodiments, connection boxes 1810 and switching boxes 1808 may be implemented with configuration switches such as switches 1312 and 1314. In such embodiments, connection boxes 1810 and switching boxes 1808 may be configured by a production tester or a BIST executed at chip startup.

In some embodiments, connection boxes 1810 and switching boxes 1808 may be configured after units 1806 are tested for a circuit functionality. In such embodiments, I/O blocks 1804 may be used to send testing signals to units 1806. Depending on the test results, I/O blocks 1804 may send programming signals that configure connection boxes 1810 and switching boxes 1808 in a manner disabling the units 1806 that fail the testing protocol and enabling units 1806 that pass the testing protocol.

In such embodiments, the plurality of primary logic blocks and the plurality of redundant blocks may be disposed on the substrate in a two-dimensional grid. Therefore, each one of the plurality of primary units 1806 and each one of the plurality of redundant blocks, such as redundant business logic 1310, may be interconnected with switching boxes 1808, and an input block may be disposed in the periphery of each line and each column of the two-dimensional grid.

Figure 19:
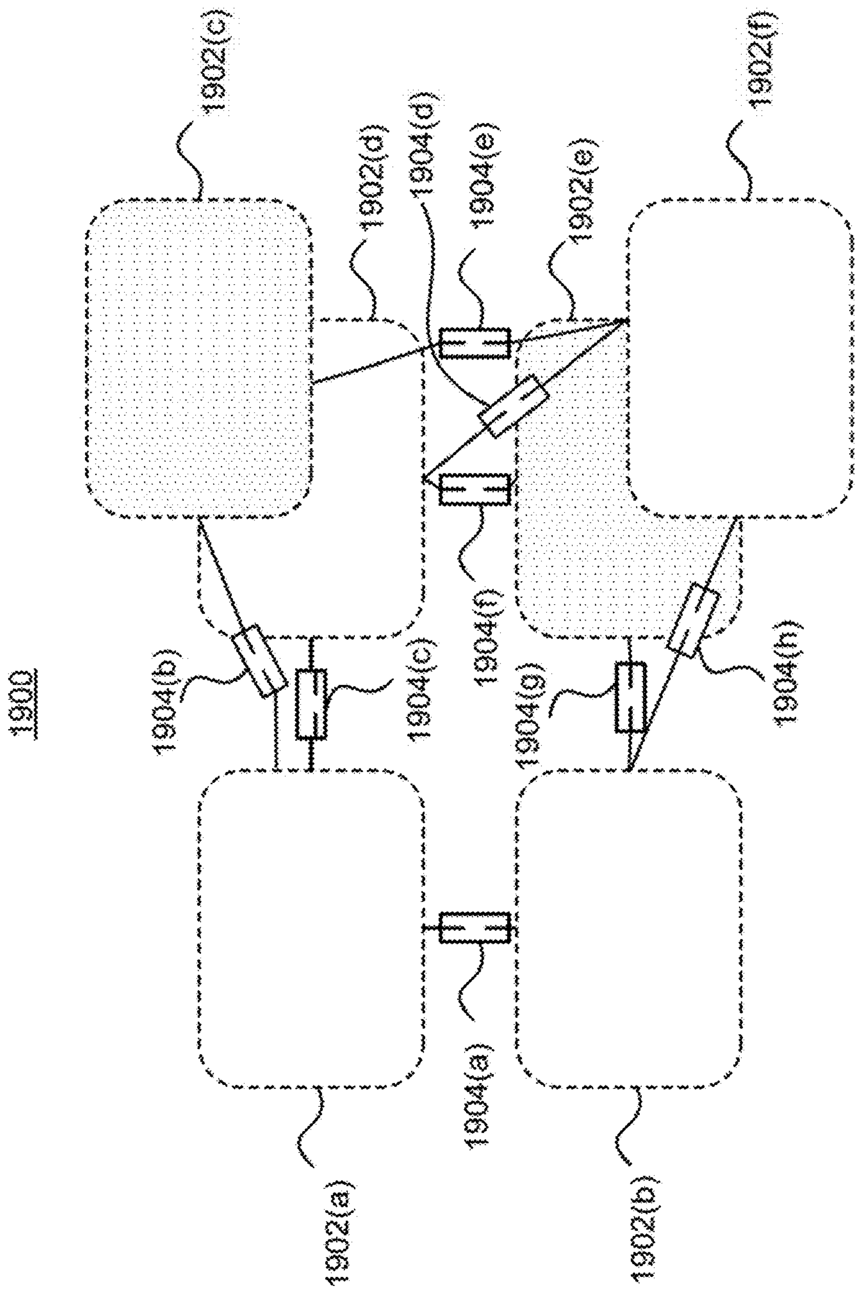
FIG. 19 is a block diagram for exemplary logic blocks in a complex connection, consistent with disclosed embodiments.

FIG. 19 is a block diagram for exemplary units in a complex connection, consistent with disclosed embodiments. FIG. 19 may represent an entire system. Alternatively, FIG. 19 may represent a block in a chip containing other functional blocks.

The complex connection of FIG. 19 includes units 1902 (*a*)-(*f*) and configuration switches 1904(*a*)-(*h*). Units 1902 may represent autonomous units that include a plurality of logic blocks such as memory logic 1306 and/or business logic 1308. However, in other embodiments units 1902 may represent logic units such as memory logic 1306, business logic 1308, or redundant business logic 1310. Configuration switches 1904 may include any of deactivation switches 1312 and activation switches 1314.

As shown in FIG. 19, the complex connection may include units 1902 in two planes. For example, the complex connection may include two independent substrates separated in the z-axis. Alternatively, or additionally, units 1902 may be arranged in two surfaces of a substrate. For example, with the objective to reduce the area of memory chip 1300, substrate 1301 may be arranged in two overlapping surfaces and connected with configuration switches 1904 arranged in three dimensions. Configuration switches may include deactivation switches 1312 and/or activation switches 1314.

A first plane of the substrate may include "main" unit 1902. These blocks may be enabled by default. In such embodiments, a second plain may include "redundant" unit 1902. These units may be disabled by default.

In some embodiments, configuration switches 1904 may include anti-fuses. Thus, after testing of units 1902, the blocks may be connected in a tile of functional units by switching certain anti-fuses to "always-on" and disable selected units 1902, even if they are in a different plane. In the example presented in FIG. 19, one of the 'main' units (unit 1902(*e*)) is not working. FIG. 19 may represent nonfunctional or untested blocks as shaded blocks while tested or functional blocks may be unshaded. Therefore, configuration switches 1904 are configured so one of the logic blocks in a different plane (e.g., unit 1902(*f*)) becomes active. In this way even though one of the main logic blocks was defective, the memory chip is still working by replacing a spare logic unit.

FIG. 19 additionally shows that one of the units 1902 (i.e., 1902(*c*)) in the second plane is not tested or enabled because the main logic blocks are functional. For example, in FIG. 19, both main units 1902(*a*) and 1902(*d*) passed a test for functionality. Thus, units 1902(*c*) was not tested or enabled. Therefore, FIG. 19 shows the ability to specifically select the logic blocks that become active depending on testing results.

In some embodiments, as shown in FIG. 19, not all units 1902 in a first plain may have a corresponding spare or redundant blocks. However, in other embodiments, all units may be redundant with each other for complete redundancy where all units are both primary or redundant. In addition, while some implementations may follow the star network topology depicted in FIG. 19, other implementation may use parallel connections, serial connections, and/or couple the different elements with configuration switches in parallel or in series.

Figure 20:
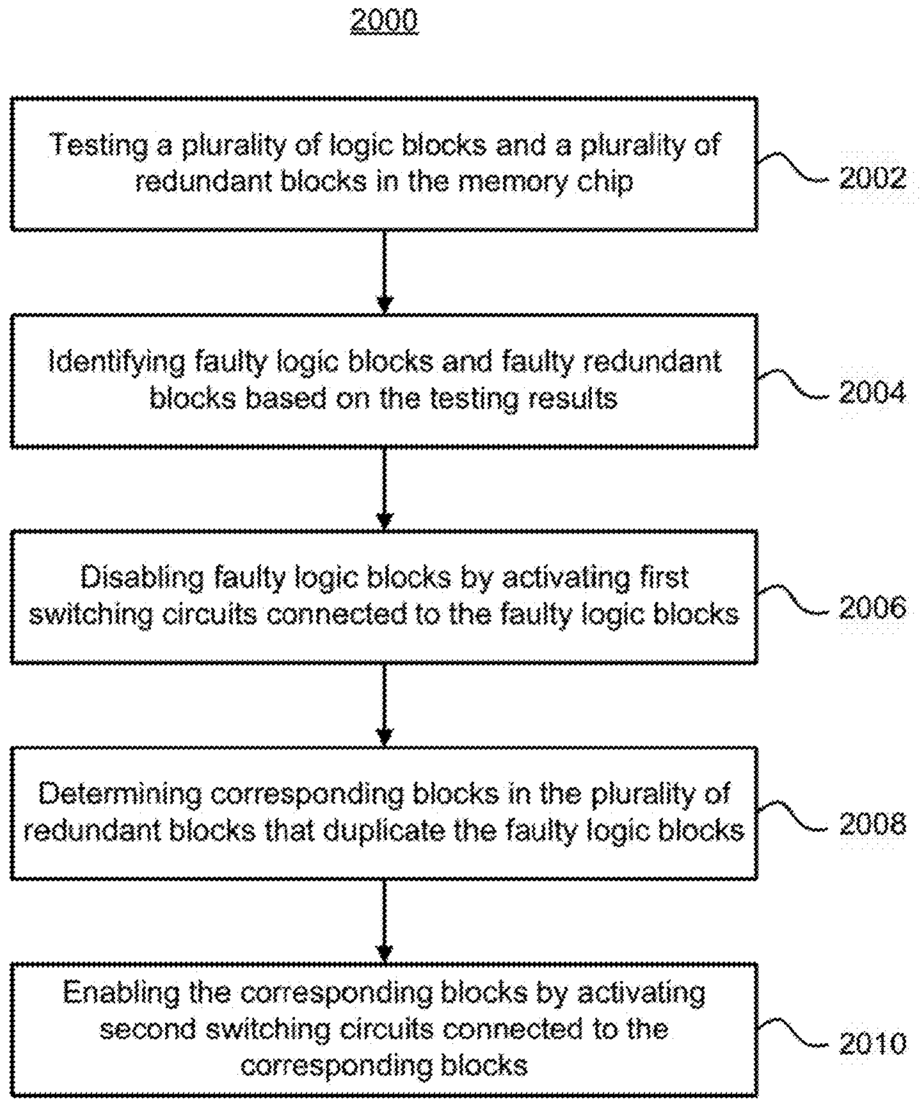
FIG. 20 is an exemplary flow chart illustrating a redundant block enabling process, consistent with disclosed embodiments.

FIG. 20 is an exemplary flowchart illustrating a redundant block enabling process 2000, consistent with disclosed embodiments. The enabling process 2000 may be implemented for memory chip 1300 and specially for DRAM memory chips. In some embodiments, process 2000 may include steps of testing each one of a plurality of logic blocks on the substrate of the memory chip for at least one circuit functionality, identifying faulty logic blocks in the plurality of primary logic blocks based on the testing results, testing at least one redundant or additional logic block on the substrate of the memory chip for the at least one circuit functionality, disabling the at least one faulty logic block by applying an external signal to a deactivation switch, and enabling the at least one redundant block by applying the external signal to an activation switch, the activation switch being connected with the at least one redundant block and being disposed on the substrate of the memory chip. The description of FIG. 20 below further elaborates on each step of process 2000.

Process 2000 may include testing a plurality of logic blocks (step 2002), such as business block 1308 and a plurality of redundant blocks (e.g., redundant business block 1310). The testing may be before packaging using, for example, probing stations for on-wafer testing. Step 2000, however, may also be performed after packaging.

The testing in step 2002 may include applying a finite sequence of testing signals to every logic block in memory chip 1300 or a subset of logic blocks in memory chip 1300. The testing signals may include requesting a computation that is expected to yield a 0 or a 1. In other embodiments, the testing signal may request reading a specific address in a memory bank or writing in a specific memory bank.

Testing techniques may be implemented to test the response of the logic blocks under iterative processes in step 2002. For example, the test may involve testing logic blocks by transmitting instructions to write data in a memory bank and then verifying the integrity of the written data. In some embodiments, the testing may include repeating the algorithm with data inversed.

In alternative embodiments, the testing of step 2002 may include running a model of the logic blocks to generate a target memory image based on a set of testing instructions. Then, the same sequence of instructions may be executed to the logic blocks in the memory chip, and the results may be recorded. The residual memory image of the simulation may also be compared to the image taken from the rest, and any mismatch may be flagged as a failure.

Alternatively, in step 2002, testing may include shadow modeling, where a diagnostic is generated but the results are not necessarily predicted. Instead, the test using shadow modeling may be run in parallel on both the memory chip and a simulation. For example, when the logic blocks in the memory chip complete an instruction or task, the simulation may be signaled to execute the same instruction. Once the logic blocks in the memory chip finalize the instructions, the two models' architectural states may be compared. If there is a mismatch, then a failure is flagged.

In some embodiments, all logic blocks (including, e.g., each one of memory logic 1306, business logic 1308, or redundant business logic 1310) may be tested in step 2002. In other embodiments, however, only subsets of the logic blocks may be tested in different testing rounds. For example, in a first round of testing only memory logic 1306 and associated blocks may be tested. In a second round, only business logic 1308 and associated blocks may be tested. In a third round, depending on the results of the first two rounds, logic blocks associated with redundant business logic 1310 may be tested.

Process 2000 may continue to step 2004. In step 2004, faulty logic blocks may be identified, and faulty redundant blocks may also be identified. For example, logic blocks that do not pass the testing of step 2002 may be identified as faulty blocks in step 2004. In other embodiments, however, only certain faulty logic blocks may be initially identified. For example, in some embodiments, only logic blocks associated with business logic 1308 may be identified, and faulty redundant blocks are only identified if they are required for substituting a faulty logic block. In addition, identifying faulty blocks may include writing on a memory bank or a nonvolatile memory the identification information of the identified faulty blocks.

In step 2006, faulty logic blocks may be disabled. For example, using a configuration circuit, the faulty logic blocks may be disabled by disconnecting them from clock, ground, and/or power nodes. Alternatively, faulty logic blocks may be disabled by configuring connection boxes in an arrangement that avoids the logic blocks. Yet, in other embodiments, faulty logic blocks may be disabled by receiving an illegal address from address manager 1302.

In step 2008, redundant blocks that duplicate the faulty logic blocks may be identified. To support the same capabilities of the memory chips even though some logic blocks have failed, in step 2008, redundant blocks that are available and can duplicate faulty logic blocks may be identified. For example, if a logic block that performs multiplications of vectors is determined to be faulty, in step 2008, an address manager 1302 or an on-chip controller may identify an available redundant logic block that also performs multiplication of vectors.

In step 2010, the redundant blocks identified in step 2008 may be enabled. In contrast to the disable operation of step 2006, in step 2010, the identified redundant blocks may be enabled by connecting them to clock, ground, and/or power nodes. Alternatively, identified redundant blocks may be enabled by configuring connection boxes in an arrangement that connects the identified redundant blocks. Yet, in other embodiments, identified redundant blocks may be enabled by receiving a running address at the test procedure execution time.

Figure 21:
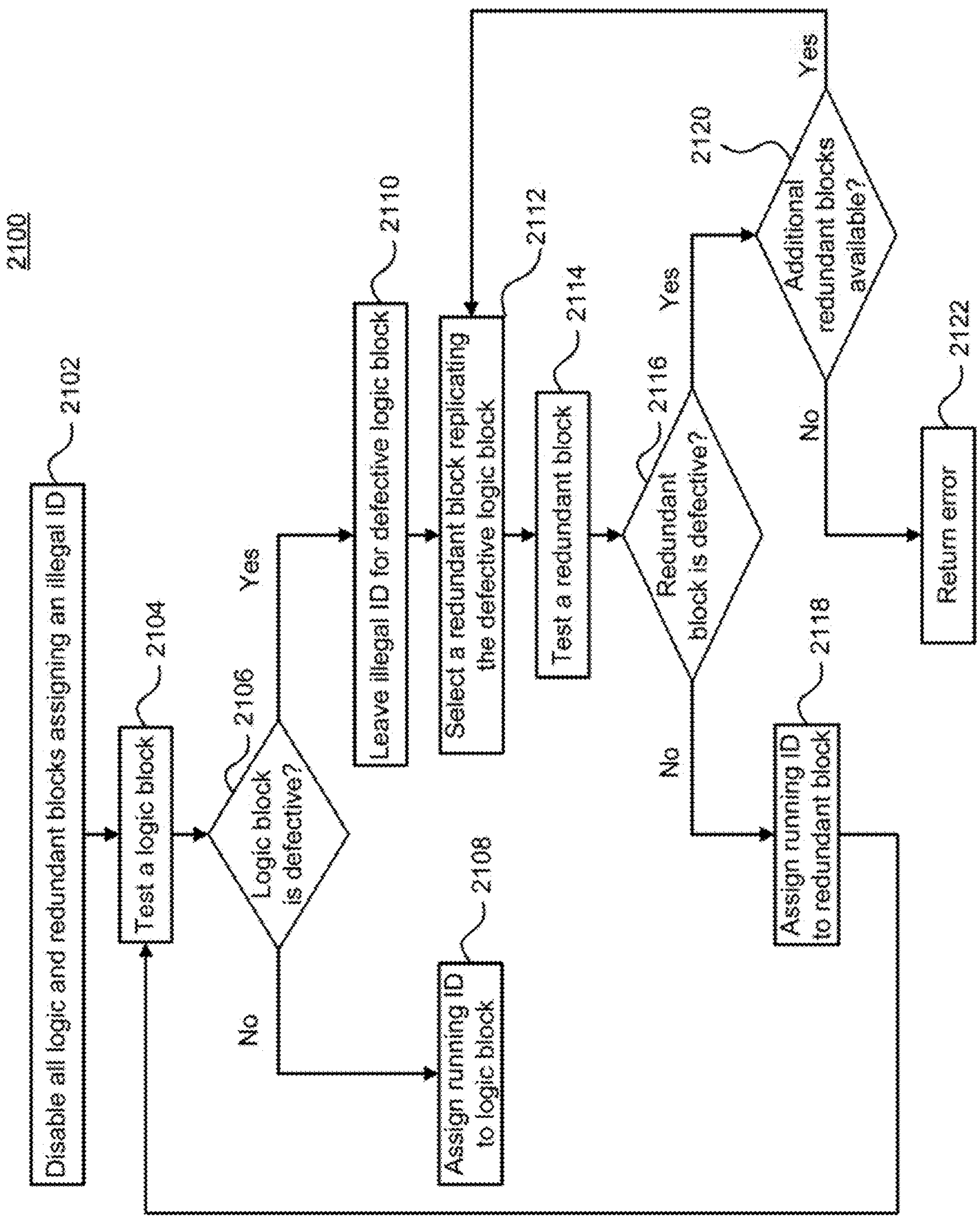
FIG. 21 is an exemplary flow chart illustrating an address assignment process, consistent with disclosed embodiments.

FIG. 21 is an exemplary flow chart illustrating an address assignment process 2100, consistent with disclosed embodiments. The address assignment process 2100 may be implemented for memory chip 1300 and specially for a DRAM memory chips. As described in relation to FIG. 16, in some embodiments, logic blocks in memory chip 1300 may be connected to a data bus and have an address identification. Process 2100 describes an address assignment method that disables faulty logic blocks and enables logic blocks that pass a test. The steps described in process 2100 will be described as being performed by a production tester or a BIST executed at chip startup; however, other components of memory chip 130M and/or external devices may also perform one or more steps of process 2100.

In step 2102, the tester may disable all logic and redundant blocks by assigning an illegal identification to each logic block at a chip level.

In step 2104, the tester may execute a testing protocol of a logic block. For example, the tester may run testing methods described in step 2002 for one or more of the logic blocks in memory chip 1300.

In step 2106, depending on the results of the test in step 2104, the tester may determine whether the logic block is defective. If the logic block is not defective (step 2106: no), address manager may assign a running ID to the tested logic block in step 2108. If the logic block is defective (step 2106: yes), address manager 1302 may leave the illegal ID for the defective logic block in step 2110.

In step 2112, address manager 1302 may select a redundant logic block that replicates the defective logic block. In some embodiments, the redundant logic block that replicates the defective logic block may have the same components and connections to the defective logic blocks. In other embodiments, however, the redundant logic block may have different components and/or connections to the defective logic blocks but be able to perform an equivalent operation. For example, if the defective logic block is designed to perform multiplication of vectors, the selected redundant logic block would also be capable of performing multiplication of vectors, even if it does not have the same architecture as the defective unit.

In step 2114, address manager 1302 may test the redundant block. For instance, the tester may apply the testing techniques applied in step 2104 to the identified redundant block.

In step 2116, based on the results of testing in step 2114, the tester may determine whether the redundant block is defective. In step 2118, if the redundant block is not defective (step 2116: no), the tester may assign a running ID to the identified redundant block. In some embodiments, process 2100 may return to step 2104 after step 2118, creating an iteration loop to test all logic blocks in the memory chip.

If the tester determines the redundant block is defective (step 2116: yes), in step 2120, the tester may determine if additional redundant blocks are available. For example, the tester may query a memory bank with information regarding available redundant logic blocks. If redundant logic blocks are available (step 2120: yes), the tester may return to step 2112 and identify a new redundant logic block replicating the defective logic block. If redundant logic blocks are not available (step 2120: no), in step 2122, the tester may generate an error signal. The error signal may include information of the defective logic block and the defective redundant block.

Coupled Memory Banks

The presently disclosed embodiments also include a distributed high-performance processor. The processor may include a memory controller that interfaces memory banks and processing units. The processor may be configurable to expedite delivery of data to the processing units for calculations. For example, if a processing unit requires two data instances to perform a task, the memory controller may be configured so communication lines independently provide access to the information from two data instances. The disclosed memory architecture seeks to minimize hardware requirements that are associated with complex cache memory and complex register files schemes. Normally, processor chips include cache hierarchies that allow cores to work directly with registers. However, the cache operations require significant die area and consume additional power. The disclosed memory architecture avoids the use of a cache hierarchy by adding logic components in the memory.

The disclosed architecture also enables strategic (or even optimized) placement of data in memory banks. Even if the memory banks have a single port and high latency, the disclosed memory architecture may enable high performance and avoid memory accessing bottlenecks by strategically positioning data in different blocks of memory banks. With the goal of providing a continuous stream of data to the processing units, a compilation optimization step may determine how data should be stored in memory banks for specific or generic tasks. Then, the memory controller, which interfaces processing units and memory banks, may be configured to grant access to specific processing units when they require data to perform operations.

The configuration of the memory chip may be performed by a processing unit (e.g., a configuration manager) or an external interface. The configuration may be also written by a compiler or other SW tool. In addition, the configuration of the memory controller may be based on the available ports in the memory banks and the organization of data in the memory banks. Accordingly, the disclosed architecture may provide processing units with a constant flow of data or simultaneous information from different memory blocks. In this way, computation tasks within the memory may be quickly processed by avoiding latency bottlenecks or cache memory requirements.

Moreover, data stored in the memory chip may be arranged based on compilation optimization steps. The compilation may allow for building of processing routines in which the processor efficiently assigns tasks to processing units without memory latency associated delays. The compilation may be performed by a compiler and transmitted to a host connected to an external interface in the substrate. Normally, high latency for certain access patterns and/or low numbers of ports would result in data bottlenecks for processing units requiring the data. The disclosed compilation, however, may position data in memory banks in a way that enables processing units to continuously receive data even with disadvantageous memory types.

Furthermore, in some embodiments, a configuration manager may signal required processing units based on computations that are required by a task. Different processing units or logic blocks in the chip may have specialized hardware or architectures for different tasks. Therefore, depending on the task that will be performed, a processing unit, or a group of processing units, may be selected to perform the task. The memory controller on the substrate may be configurable to route data, or grant access, according to the selection of processing subunits to improve data transfer rates. For example, based on the compilation optimization and the memory architecture, processing units may be granted access to memory banks when they are required to perform a task.

Moreover, the chip architecture may include on-chip components that facilitate transfer of data by reducing the time required to access data in the memory banks. Therefore, the present disclosure describes chip architecture(s), along with a compilation optimization step, for a high-performance processor capable of performing specific or generic tasks using simple memory instances. The memory instances may have high latency in random access and/or low number of ports, such as those used in a DRAM device or other memory-oriented technologies, but the disclosed architecture may overcome these shortcomings by enabling a continuous (or nearly continuous) flow of data from memory banks to processing units.

In this application, simultaneous communication may refer to communication within a clock cycle. Alternatively, simultaneous communication may refer to sending information within a predetermine amount of time. For example, simultaneous communication may refer to communication within a few nanoseconds.

Figure 22:
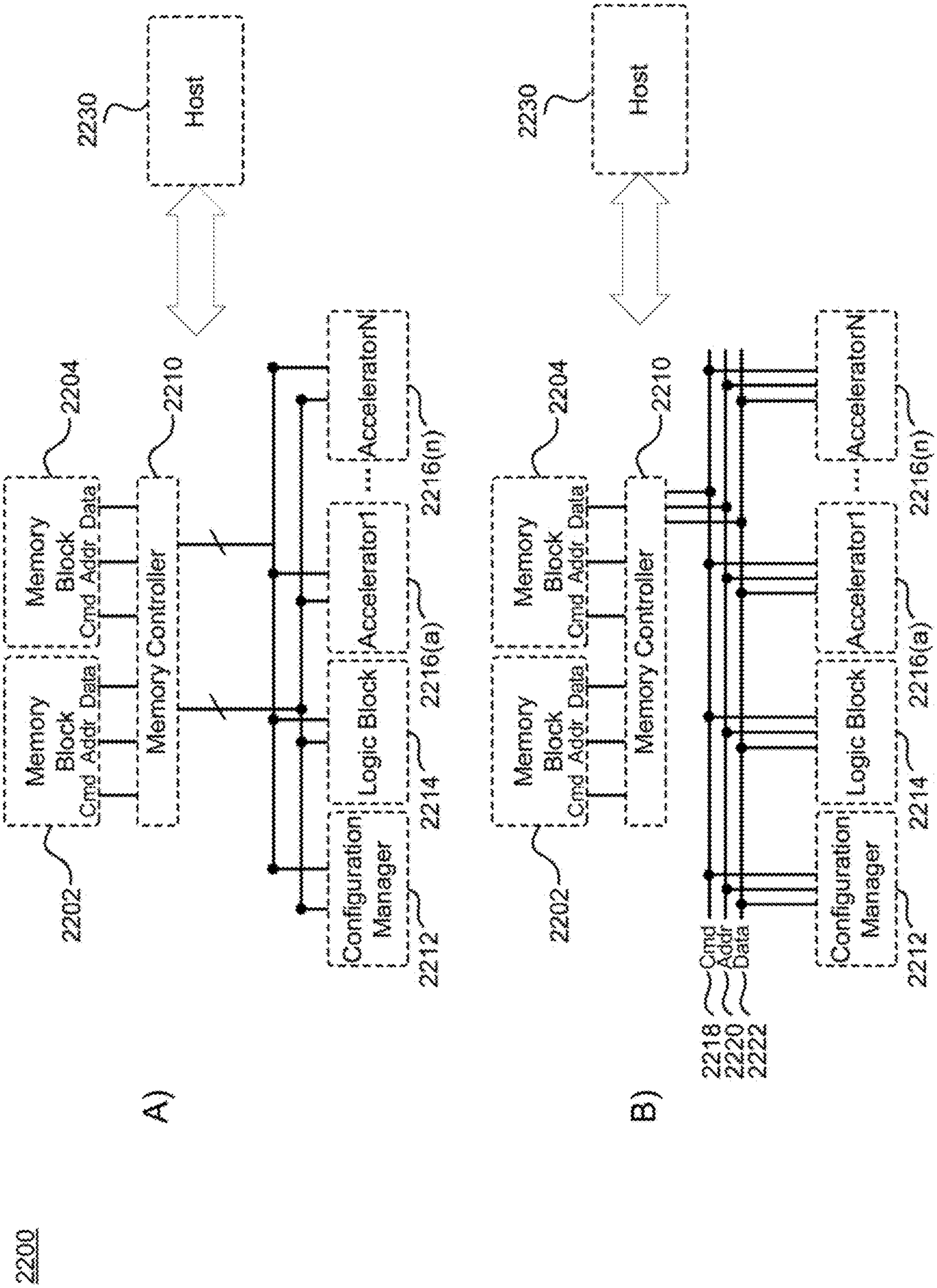
FIG. 22 provides block diagrams for exemplary processing devices, consistent with disclosed embodiments.

FIG. 22 provides block diagrams for exemplary processing devices, consistent with disclosed embodiments. FIG.

22A shows a first embodiment of a processing device 2200 in which a memory controller 2210 connects a first memory block 2202 and a second memory block 2204 using multiplexers. Memory controller 2210 may also connect at least a configuration manager 2212, a logic block 2214, and multiple accelerators 2216(*a*)-(*n*). FIG. 22B shows a second embodiment of processing device 2200 in which memory controller 2210 connects memory blocks 2202 and 2204 using a bus that connects memory controller 2210 with at least a configuration manager 2212, a logic block 2214, and multiple accelerators 2216(*a*)-(*n*). In addition, host 2230 may be external and connected to processing device 2200 through, for example, an external interface.

Memory blocks 2202 and 2204 may include a DRAM mats or group of mats, DRAM banks, MRAM\PRAM\RERAM\SRAM units. Flash mats, or other memory technologies. Memory blocks 2202 and 2204 may alternatively include non-volatile memories, a flash memory device, a Resistive Random Access Memory (ReRAM) device, or a Magnetoresistive Random Access Memory (MRAM) device.

Memory blocks 2202 and 2204 may additionally include a plurality of memory cells arranged in rows and columns between a plurality of word lines (not shown) and a plurality of bit lines (not shown). The gates of each row of memory cells may be connected to a respective one of the plurality of word lines. Each column of memory cells may be connected to a respective one of the plurality of bit lines.

In other embodiments, a memory area (including memory blocks 2202 and 2204) is built from simple memory instances. In this application, the term "memory instance" may be used interchangeably with the term "memory block." The memory instances (or blocks) may have poor characteristics. For example, the memories may be only one port memories and may have high random-access latency. Alternatively, or additionally, the memories may be inaccessible during column and line changes and face data access problems related to, for example, capacity charging and/or circuitry setups. Nonetheless, the architecture presented in FIG. 22 still facilitates parallel processing in the memory device by allowing dedicated connections between memory instances and processing units and arranging the data in a certain manner that takes the characteristics of the blocks into account.

In some device architectures, memory instances may include several ports, facilitating the parallel operations. Nonetheless, in such embodiments, the chip may still achieve an improved performance when data is compiled and organized based on the chip architecture. For example, a compiler may improve the efficiency of access in the memory area by providing instructions and organizing data placement, so it can be readily access even using one-port memories.

Furthermore, memory blocks 2202 and 2204 may be multiple types for memory in a single chip. For example, memory blocks 2202 and 2204 may be eFlash and eDRAM. Also, memory blocks may include DRAM with instances of ROM.

Memory controller 2210 may include a logic circuit to handle the memory access and return the results to the rest of the modules. For example, memory controller 2210 may include an address manager and selection devices, such as multiplexers, to route data between the memory blocks and processing units or grant access to the memory blocks. Alternatively, Memory controller 2210 may include double data rate (DDR) memory controllers used to drive DDR SDRAM, where data is transferred on both rising and falling edges of the system's memory clock.

In addition, memory controller 2210 may constitute Dual Channel memory controllers. The incorporation of dual channel memory may facilitate control of parallel access lines by memory controller 2210. The parallel access lines may be configured to have identical lengths to facilitate synchronization of data when multiple lines are used in conjunction. Alternatively, or additionally, the parallel access lines may allow access of multiple memory ports of the memory banks.

In some embodiments processing device 2200 may include one or more muxes that may be connected to processing units. The processing units may include configuration manager 2212, logic block 2214, and accelerators 2216, which may be connected directly to the mux. Also, memory controller 2210 may include at least one data input from a plurality of memory banks or blocks 2202 and 2204 and at least one data output connected to each one of the plurality of processing units. With this configuration, memory controller 2210 may simultaneously receive data from memory banks or memory blocks 2202 and 2204 via the two data inputs, and simultaneously transmits data received via to the at least one selected processing unit via the two data outputs. In some embodiments, however, the at least one data input and at least one data output may be implemented in a single port allowing only read or write operations. In such embodiments, the single port may be implemented as a data bus including data, address, and command lines.

Memory controller 2210 may be connected to each one of the plurality of memory blocks 2202 and 2204, and may also connect to processing units via, for example, a selection switch. Also processing units on the substrate, including configuration manager 2212, logic block 2214, and accelerators 2216, may be independently connected to memory controller 2210. In some embodiments, configuration manager 2212 may receive an indication of a task to be performed and, in response, configure memory controller 2210, accelerators 2216, and/or logic blocks 2214 according to a configuration stored in memory or supplied externally. Alternatively, memory controller 2210 may be configured by an external interface. The task may require at least one computation that may be used to select at least one selected processing unit from the plurality of processing units. Alternatively, or additionally, the selection may be based at least in part upon a capability of the selected processing unit for performing the at least one computation. In response, memory controller 2210 may grant access to the memory banks, or route data between the at least one selected processing unit and at least two memory banks, using dedicated buses and/or in a pipelined memory access.

In some embodiments, first memory block 2202 of at least two memory blocks may be arranged on a first side of the plurality of processing units; and second memory bank 2204 of the at least two memory banks may be arranged on a second side of the plurality of processing units opposite to the first side. Further, a selected processing unit to perform the task, for instance accelerator 2216(*n*), may be configured to access second memory bank 2204 during a clock cycle in which a communication line is opened to the first memory bank or first memory block 2202. Alternatively, the selected processing unit may be configured to transfer data to second memory block 2204 during a clock cycle in which a communication line is opened to first memory block 2202.

In some embodiments, memory controller 2210 may be implemented as an independent element, as shown in FIG.

22. In other embodiments, however, memory controller 2210 may be embedded in the memory area or may be disposed along accelerators 2216(*a*)-(*n*).

A processing area in processing device 2200 may include configuration manager 2212, logic block 2214, and accelerators 2216(*a*)-(*n*). Accelerators 2216 may include multiple processing circuits with pre-defined functions and may be defined by a specific application. For example, an accelerator may be a vector multiply accumulate (MAC) unit or a Direct Memory Access (DMA) unit handling memory moving between modules. Accelerators 2216 may also be able to calculate their own address and request the data from memory controller 2210 or write data to it. For example, configuration manager 2212 may signal at least one of accelerators 2216 that he can access the memory bank. Then accelerators 2216 may configure memory controller 2210 to route data or grant access to themselves. In addition, accelerators 2216 may include at least one arithmetic logic unit, at least one vector handling logic unit, at least one string compare logic unit, at least one register, and at least one direct memory access.

Configuration manager 2212 may include digital processing circuits to configure accelerators 2216 and instructs execution of tasks. For example, configuration manager 2212 may be connected to memory controller 2210 and each one of the plurality of accelerators 2216. Configuration manager 2212 may have its own dedicated memory to hold the configurations of accelerators 2216. Configuration manager 2212 may use the memory banks to fetch commands and configurations via memory controller 2210. Alternatively, configuration manager 2212 may be programmed through an external interface. In certain embodiments, configuration manager 2212 may be implemented with an on-chip reduced instruction set computer (RISC) or an on-chip complex CPU with its own cache hierarchy. In some embodiments, configuration manager 2212 may also be omitted and the accelerators can be configured through an external interface.

Processing device 2200 may also include an external interface (not shown). The external interface allows access to the memory from an upper level, such a memory bank controller which receives the command from external host 2230 or on-chip main processor or access to the memory from external host 2230 or on-chip main processor. The external interface may allow programming of the configuration manager 2212 and the accelerators 2216 by writing configurations or code to the memory via memory controller 2210 to be used later by configuration manager 2212 or the units 2214 and 2216 themselves. The external interface, however, may also directly program processing units without being routed through memory controller 2210. In case configuration manager 2212 is a microcontroller, configuration manager 2212 may allow loading of code from a main memory to the controller local memory via the external interface. Memory controller 2210 may be configured to interrupt the task in response to receiving a request from the external interface.

The external interface may include multiple connectors associated with logic circuits that provide a glue-less interface to a variety of elements on the processing device. The external interface may include: Data I/O Inputs for data reads and output for data writes; External address outputs; External CEO chip select pins; Active-low chip selectors; Byte enable pins; a pin for wait states on the memory cycle; a Write enable pin; an Output enable-active pin; and read-write enable pin. Therefore, the external interface has the required inputs and outputs to control processes and obtain information from the processing device. For example, the external interface may conform to JEDEC DDR standards. Alternatively, or additionally, external interface may conform to other standards such as SPI\OSPI or UART.

In some embodiments, the external interface may be disposed on the chip substrate and may be connected external host 2230. The external host may gain access to memory blocks 2202 and 2204, memory controller 2210, and processing units via the external interface. Alternatively, or additionally, external host 2230 may read and write to the memory or may signal configuration manager 2212, through read and write commands, to perform operations such as starting a process and/or stopping a process. In addition, external host 2230 may configure the accelerators 2216 directly. In some embodiments, external host 2230 be able to perform read/write operations directly on memory blocks 2202 and 2204.

In some embodiments, configuration manager 2212 and accelerators 2216 may be configured to connect the device area with the memory area using direct buses depending on the target task. For example, a subset of accelerators 2216 may connect with memory instances 2204 when the subset of accelerators has the capability to perform computations required to execute the task. By doing such a separation, it is possible to assure that dedicated accelerators get the bandwidth (BW) needed to memory blocks 2202 and 2204. Moreover, this configuration with dedicated buses may allow splitting a large memory to smaller instances or blocks because connecting memory instances to memory controller 2210 allows quick access to data in different memories even with high row latency time. To achieve the parallelization of connection, memory controller 2210 may be connected to each of the memory instances with data, address, and/or control buses.

The above-discussed inclusion of memory controller 2210 may eliminate the requirement of a cache hierarchy or complex register file in the processing device. Although the cache hierarchy can be added to give added capabilities, the architecture in processing device processing device 2200 may allow a designer to add enough memory blocks or instances based on the processing operations and manage the instances accordingly without a cache hierarchy. For example, the architecture in processing device processing device 2200 may eliminate requirements of a cache hierarchy by implementing a pipelined memory access. In the pipelined memory access, processing units may receive a sustaining flow of data in every cycle certain data lines may be opened (or activated) while other data lines receive or transmit data. The sustained flow of data using independent communication lines may allow an improved execution speed and minimum latency due to line changes.

Moreover, the disclosed architecture in FIG. 22 enables a pipelined memory access it may be possible to organize data in a low number of memory blocks and save power losses caused by line switching. For example, a In some embodiments, a compiler may communicate host 2230 the organization of, or a method to organize, data in memory banks to facilitate access to data during a given task. Then, configuration manager 2212 may define which memory banks, and in some cases which ports of the memory banks, may be accessed by the accelerators. This synchronization between the location of data in memory banks and the access method to data, improves computing tasks by feeding data to the accelerators with minimum latency. For example, in embodiments in which configuration manager 2212 includes a RISC\CPU, the method may be implemented in offline software (SW) and then the configuration manager 2212 may be programmed to execute the method. The method may be developed in any language executable by RISC/CPU computers and may be executed on any platform. The inputs of the method may include configuration of the memories behind memory controller and the data itself along with the pattern of memory accesses. In addition, the method may be implemented in a language or machine language specific to the embodiment and may also be just a series of configuration values in binary or text.

As discussed above, in some embodiments, a compiler may provide instructions to host 2230 for organizing data in memory blocks 2202 and 2204 in preparation of a pipelined memory access. The pipelined memory access may generally include steps of: receiving a plurality of addresses of a plurality of memory banks or memory blocks 2202 and 2204; accessing the plurality of memory banks according to the received addresses using independent data lines; supplying data from a first address through a first communication line to at least one of the plurality of processing units and opening a second communication line to a second address, the first address being in a first memory bank of the plurality of memory banks, the second address being in second memory bank 2204 of the plurality of memory banks; and supplying data from the second address through the second communication line to the at least one of the plurality of processing units and opening a third communication line to a third address in the first memory bank in the first line within a second clock cycle. In some embodiments, the pipelined memory access may be executed with two memory blocks being connected to a single port. In such embodiments, memory controller 2210 may hide the two memory blocks behind a single port but transmit data to the processing units with the pipelined memory access approach.

In some embodiments, a compiler can run on host 2230 before executing a task. In such embodiments, the compiler may be able to determine a configuration of data flow based on the architecture of the memory device since the configuration would be known to the compiler.

In other embodiments, if the configuration of memory blocks 2204 and 2202 is unknown at offline time, the pipelined method can run on host 2230 which may arrange data in memory blocks before starting calculations. For example, host 2230 may directly write data in memory blocks 2204 and 2202. In such embodiments, processing units, such as configuration manager 2212 and memory controller 2210 may not have information regarding required hardware until run time. Then, it may be necessary to delay the selection of an accelerator 2216 until a task starts running. In these situations, the processing units or memory controller 2210 may randomly select an accelerator 2216 and create a test data access pattern, which may be modified as the task is executed.

Nonetheless, when the task is known in advance, a compiler may organize data and instructions in memory banks for host 2230 to provide to a processing unit, such as configuration manager 2212, to set signal connections that minimize access latency. For example, in some cases n words may be needed at the same time by accelerators 2216. However, each memory instance supports retrieving only m words at a time, where "m" and "n" are integers and m<n. Thus, the compiler may place the needed data across different memory instances or blocks facilitating data access. Also, to avoid line miss latencies, a host may split data in different lines of different memory instances if processing device 2200 includes multiple memory instances. The division of data may allow accessing the next line of data in the next instance while still using data from the current instance.

For example, accelerator 2216(*a*) may be configured to multiply two vectors. Each one of the vectors may be stored in independent memory blocks, such as memory blocks 2202 and 2204, and each vector may include multiple words. Therefore, to complete a task requiring a multiplication by accelerator 2216(*a*), it may be necessary to access the two memory blocks and retrieve multiple words. However, in some embodiments, memory blocks only allow access of one word per clock cycle. For instance, memory blocks may have a single port. In these cases, to expedite data transmittal during an operation, a compiler may organize the words composing vectors in different memory blocks allowing parallel and/or simultaneous reading of the words. In these situations, a compiler may store words in memory blocks that have a dedicated line. For instance, if each vector includes two words and memory controller has direct access to four memory blocks, a compiler may arrange data in four memory blocks, each one transmitting a word and expediting data delivery. Moreover, in embodiments when memory controller 2210 may have more than a single connection to each memory block, the compiler may instruct configuration manager 2212 (or other processing unit) to access ports specific ports. In this way, processing device 220M may perform a pipelined memory access, continuously providing data to processing units by simultaneously loading words in some lines and transmitting data in other lines. Thus, this pipelined memory access avoid may avoid latency issues.

Figure 23:
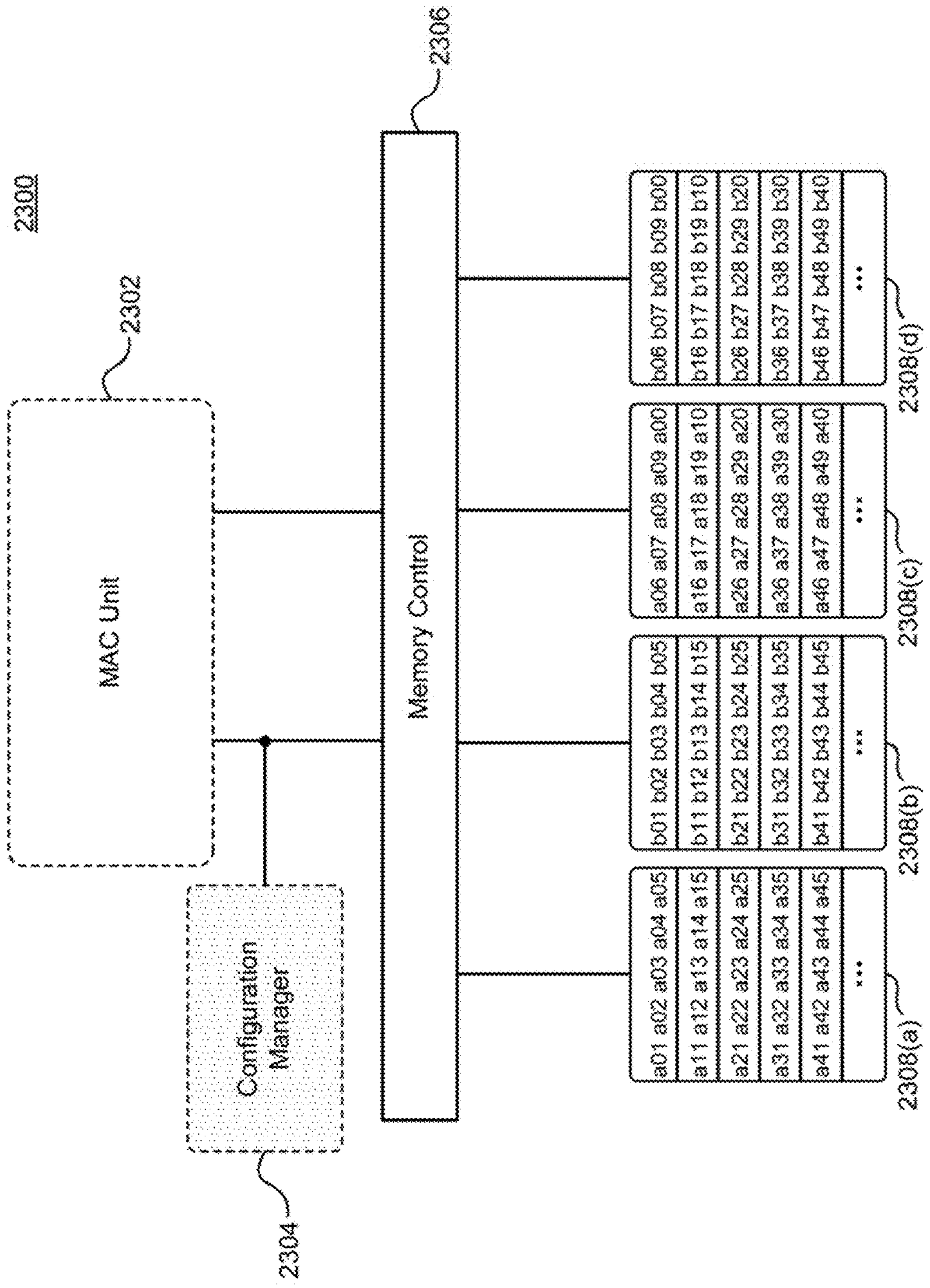
FIG. 23 is a block diagram of an exemplary processing device, consistent with disclosed embodiments.

FIG. 23 is a block diagram of an exemplary processing device 2300, consistent with disclosed embodiments. The block diagram shows a simplified processing device 2300 displaying a single accelerator in the form of MAC Unit 2302, configuration manager 2304 (equivalent or similar to configuration manager 2212), memory controller 2306 (equivalent or similar to memory controller 2210), and a plurality of memory blocks 2308(*a*)-(*d*).

In some embodiments, MAC unit 2302 may be a specific accelerator for processing a particular task. By way of example, the processing device 2300 may be tasked with 2D-convolutions. Then, configuration manager 2304 can signal an accelerator that has the appropriate hardware to perform calculations associated with the task. For instance, MAC unit 2302 may have four internal incrementing counters (logical adders and registers to manage the four loops needed by a convulsion calculation) and a multiply accumulate unit. Configuration manager 2304 may signal MAC unit 2302 to process incoming data and execute the task. Configuration manager 2304 may transmit an indication to MAC unit 2302 to execute the task. In these situations, MAC unit 2302 may iterate over calculated addresses, multiply the numbers, and accumulate them to an internal register.

In some embodiments, configuration manager 2304 may configure the accelerators while memory controller 2306 grants access to blocks 2308 and MAC unit 2302 using dedicated buses. In other embodiments, however, memory controller 2306 can directly configure the accelerators based on instructions received from configuration manger 2304 or an external interface. Alternatively, or additionally, configuration manager 2304 can pre-load a few configurations and allow the accelerator to iteratively run on different addresses with different sizes. In such embodiments, configuration manager 2304 may include a cache memory that stores a command before it is transmitted to at least one of the plurality of processing units, such as accelerators 2216. However, in other embodiments configuration manager 2304 may not include a cache.

In some embodiments, configuration manager 2304 or memory controller 2306 may receive addresses that need to be accessed for a task. Configuration manager 2304 or memory controller 2306 may check a register to determine whether the address is already in a loaded line to one of memory blocks 2308. If so, memory controller 2306 may read the word from memory block 2308 and pass it to the MAC unit 2302. If the address is not in a loaded line, configuration manager 2304 may request memory controller 2306 may load the line and signal MAC unit 2302 to delay until it is retrieved.

In some embodiments, as shown in FIG. 23, memory controller 2306 may include two inputs form two independent addresses. But if more than two addresses should be accessed simultaneously, and these addresses are in a single memory block (for example it is only in of memory blocks 2308(*a*)), memory controller 2306 or configuration manager 2304 may raise an exception. Alternatively, configuration manager 2304 may return invalid data signal when the two addresses can only be access through a single line. In other embodiments, the unit may delay the process execution until it is possible to retrieve all needed data. This may diminish the overall performance. Nonetheless, a compiler may be able to find a configuration and data placement that would prevent delays.

In some embodiments, a compiler may create a configuration or instruction set for processing device 2300 that may configure configuration manager 2304 and memory controller 2306 and accelerator 2302 to handle situations in which multiple addresses need to be accessed from a single memory block but the memory block has one port. For instance, a compiler may re-arrange data in memory blocks 2308 such that processing units may access multiple lines in memory blocks 2308.

In addition, memory controller 2306 may also work simultaneously on more than one input at the same time. For example, memory controller 2306 may allow accessing one of memory blocks 2308 through one port and supplying the data while receiving a request from a different memory block in another input. Therefore, this operation may result in and accelerator 2216 tasked with the exemplary 2D-convolutions receiving data from dedicated lines of communication with the pertinent memory blocks.

Additionally, or alternatively, memory controller 2306 or a logic block may hold refresh counters for every memory block 2308 and handle the refresh of all lines. Having such a counter allows memory controller 2306 to slip in the refresh cycles between dead access times from the devices.

Furthermore, memory controller 2306 may be configurable to perform the pipelined memory access, receiving addresses and opening lines in memory blocks before supplying the data. The pipelined memory access may provide data to processing units without interruption or delayed clock cycles. For example, while memory controller 2306 or one of the logic blocks access data with the right line in FIG. 23, it may be transmitting data in the left line. These methods will be explained in greater detail in connection to FIG. 26.

In response to the required data, processing device 2300 may use multiplexors and/or other switching devices to choose which device gets serviced to perform a given task. For example, configuration manager 2304 may configure multiplexers so at least two data lines reach the MAC unit 2302. In this way, a task requiring data from multiple addresses, such as 2D-convolutions, may be performed faster because the vectors or words requiring multiplication during convolution can reach the processing unit simultaneously, in a single clock. This data transferring method may allow the processing units, such as accelerators 2216, to quickly output a result.

In some embodiments, configuration manager 2304 may be configurable to execute processes based on priority of tasks. For example, configuration manager 2304 can be configured to let a running process finish without any interruptions. In that case, configuration manger 2304 may provide an instruction or configurations of a task to accelerators 2216, let them run uninterrupted, and switch multiplexers only when the task is finished. However, in other embodiments, configuration manager 2304 may interrupt a task and reconfigure data routing when it receives a priority task, such a request from an external interface. Nevertheless, with enough memory blocks 2308, memory controller 2306 may be configurable to route data, or grant access, to processing units with dedicated lines that do not have to be changed until a task is completed. Moreover, in some embodiments, all devices may be connected by buses to the entries of configuration manager 2304, and the devices may manage access between themselves and the buses (e.g., using the same logic as a multiplexer). Therefore, memory controller 2306 may be directly connected to a number of memory instances or memory blocks.

Alternatively, memory controller 2306 may be connected directly to memory sub-instances. In some embodiments, each memory instance or block can be built from sub-instances (for example, DRAM may be built from mats with independent data lines arranged in multiple sub-blocks). Further, the instances may include at least one of DRAM mats, DRAM, banks, flash mats, or SRAM mats or any other type of memory. Then, memory controller 2306 may include dedicated lines to address sub-instances directly to minimize latency during a pipelined memory access.

In some embodiments, memory controller 2306 may also hold the logic needed for a specific memory instance (such as row\col decoders, refresh logic, etc.) and memory blocks 2308 may handle its own logic. Therefore, memory blocks 2308 may get an address and generate commands for return\write data.

Figure 24:
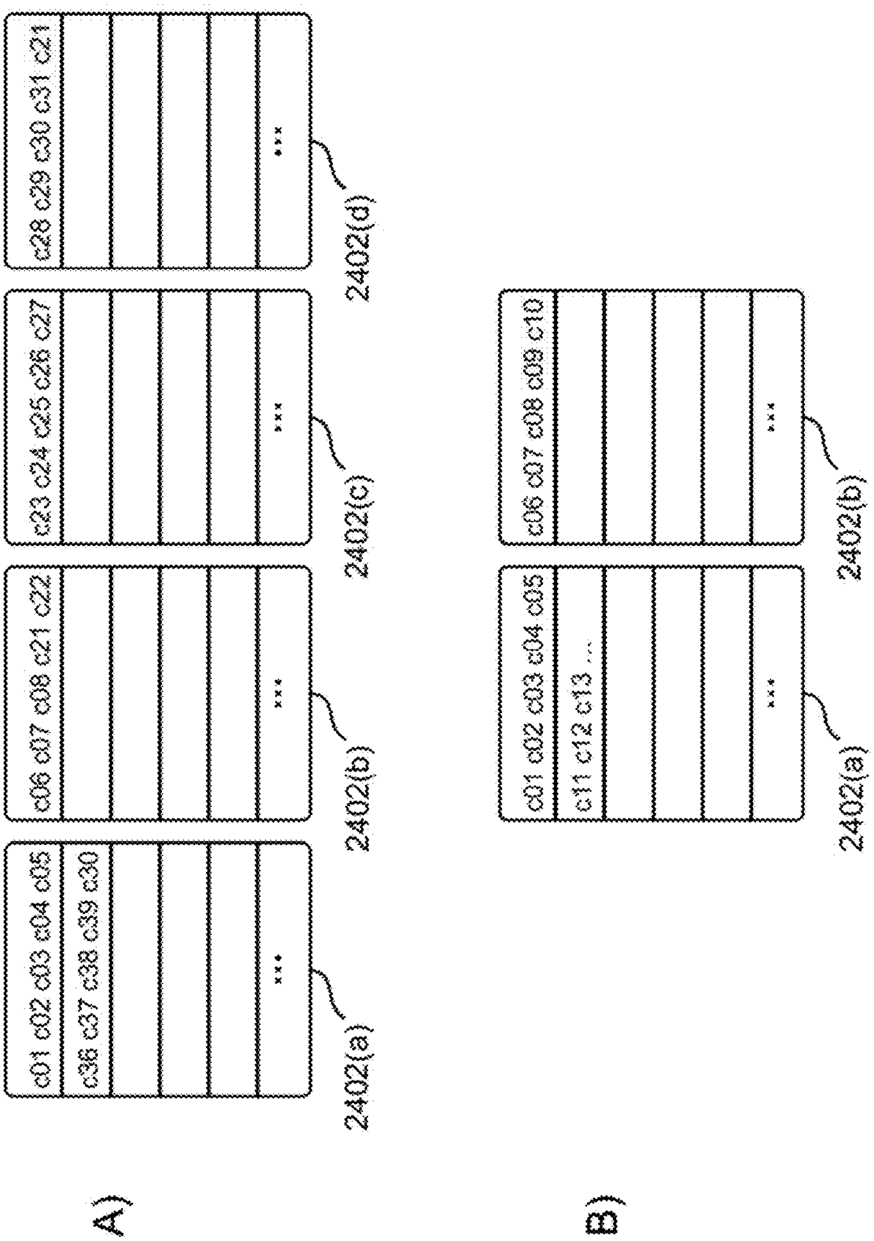
FIG. 24 includes exemplary memory configuration diagrams, consistent with disclosed embodiments.

FIG. 24 depicts exemplary memory configuration diagrams, consistent with disclosed embodiments. In some embodiments, a compiler generating code or configuration for processing device 2200 may perform a method to configure loading from memory blocks 2202 and 2204 by pre-arranging data in each block. For example, a compiler may prearrange data so each word required for a task is correlated to a line of memory instance or memory block(s). But for tasks that require more memory blocks than the one available in processing device 2200, a compiler may implement methods of fitting data in more than one memory location of each memory block. The compiler may also store data in sequence and evaluate the latency of each memory block to avoid line miss latency. In some embodiments, the host may be part of a processing unit, such as configuration manger 2212, but in other embodiments the compiler host may be connected to processing device 2200 via an external interface. In such embodiments, the host may run compiling functions, such as the ones described for the compiler.

In some embodiments, configuration manager 2212 may be a CPU or a micro controller (uC). In such embodiments, configuration manager 2212 may have to access the memory to fetch commands or instructions placed in the memory. A specific compiler may generate the code and place it in the memory in a manner that allows for consecutive commands to be stored in the same memory line and across a number of memory banks to allow for the pipelined memory access also on the fetched command. In these embodiments, configuration manager 2212 and memory controller 2210 may be capable of avoiding row latency in linear execution by facilitating the pipelined memory access.

The previous case of linear execution of a program described a method for a compiler to recognize and place the instructions to allow for pipelined memory execution. However other software structures may be more complex and would require the compiler to recognize them and act accordingly. For example, in case a task requires loops and branches, a compiler may place all the loop code inside a single line so that the single line can be looped without line opening latency. Then, memory controller 2210 may not need to change lines during an execution.

In some embodiments, configuration manager 2212 may include internal caching or small memory. The internal caching may store commands that are executed by configuration manager 2212 to handle branches and loops. For example, commands in internal caching memory may include instructions to configure accelerators for accessing memory blocks.

Figure 25:
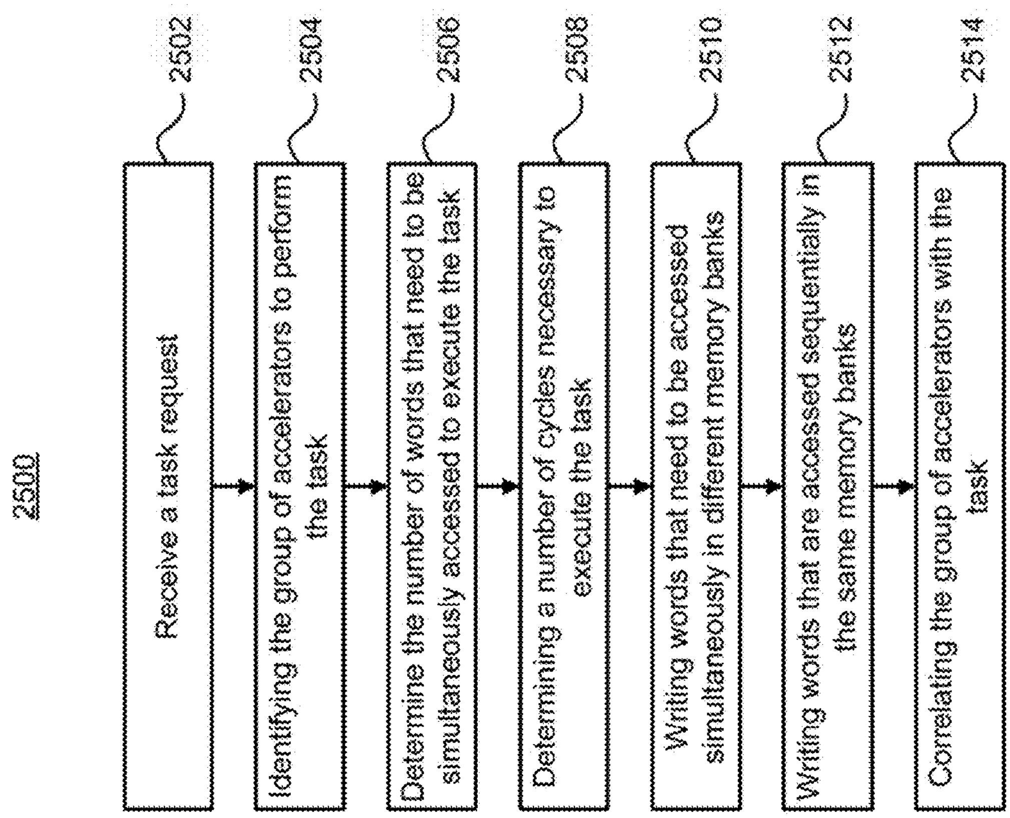
FIG. 25 is an exemplary flowchart illustrating a memory configuration process, consistent with disclosed embodiments.

FIG. 25 is an exemplary flowchart illustrating a possible memory configuration process 2500, consistent with disclosed embodiments. Where convenient in describing memory configuration process 2500, reference may be made to the identifiers of elements depicted in FIG. 22 and described above. In some embodiments, process 2500 may be executed by a compiler that provides instructions to a host connected through an external interface. In other embodiments, process 2500 may be executed by components of processing device 2200, such as configuration manager 2212.

In general, process 2500 may include determining a number of words required simultaneously to perform the task; determining a number of words that can be accessed simultaneously from each one of the plurality of memory banks; and dividing the number of words required simultaneously between multiple memory banks when the number of words required simultaneously is greater than the number of words that can be accessed simultaneously. Moreover, dividing the number of words required simultaneously may include executing a cyclic organization of words and sequentially assigning one word per memory bank.

More specifically, process 2500 may begin with step 2502, in which a compiler may receive a task specification. The specification include required computations and/or a priority level.

In step 2504, a compiler may identify an accelerator, or group of accelerators, that may perform the task. Alternatively, the compiler may generate instructions so the processing units, such as configuration manager 2212, may identify an accelerator to perform the task. For example, using the required computation configuration manger 2212 may identify accelerators in the group of accelerators 2216 that may process the task.

In step 2506, the compiler may determine a number of words that needs to be simultaneously accessed to execute the task. For example, the multiplication of two vectors requires access to at least two vectors, and the compiler may therefore determine that vector words must be simultaneously accessed to perform the operation.

In step 2508, the compiler may determine a number of cycles necessary to execute the task. For example, if the task requires a convolution operation of four by-products, the compiler may determine that at least 4 cycles will be necessary to perform the task.

In step 2510, the compiler may place words that are needed to be accessed simultaneously in different memory banks. In that way, memory controller 2210 may be configured to open lines to different memory instances and access the required memory blocks within a clock cycle, without any required cached data.

In step 2512, the compiler place words that are accessed sequentially in the same memory banks. For example, in the case that four cycles of operations are required, the compiler may generate instructions to write needed words in sequential cycles in a single memory block to avoid changing lines between different memory blocks during execution.

In step 2514, compiler generate instructions for programing processing units, such as configuration manager 2212. The instructions may specify conditions to operate a switching device (such as a multiplexor) or configure a data bus. With such instructions, configuration manager 2212 may configure memory controller 2210 to route data from, or grant access to, memory blocks to processing units using dedicated lines of communication according to a task.

Figure 26:
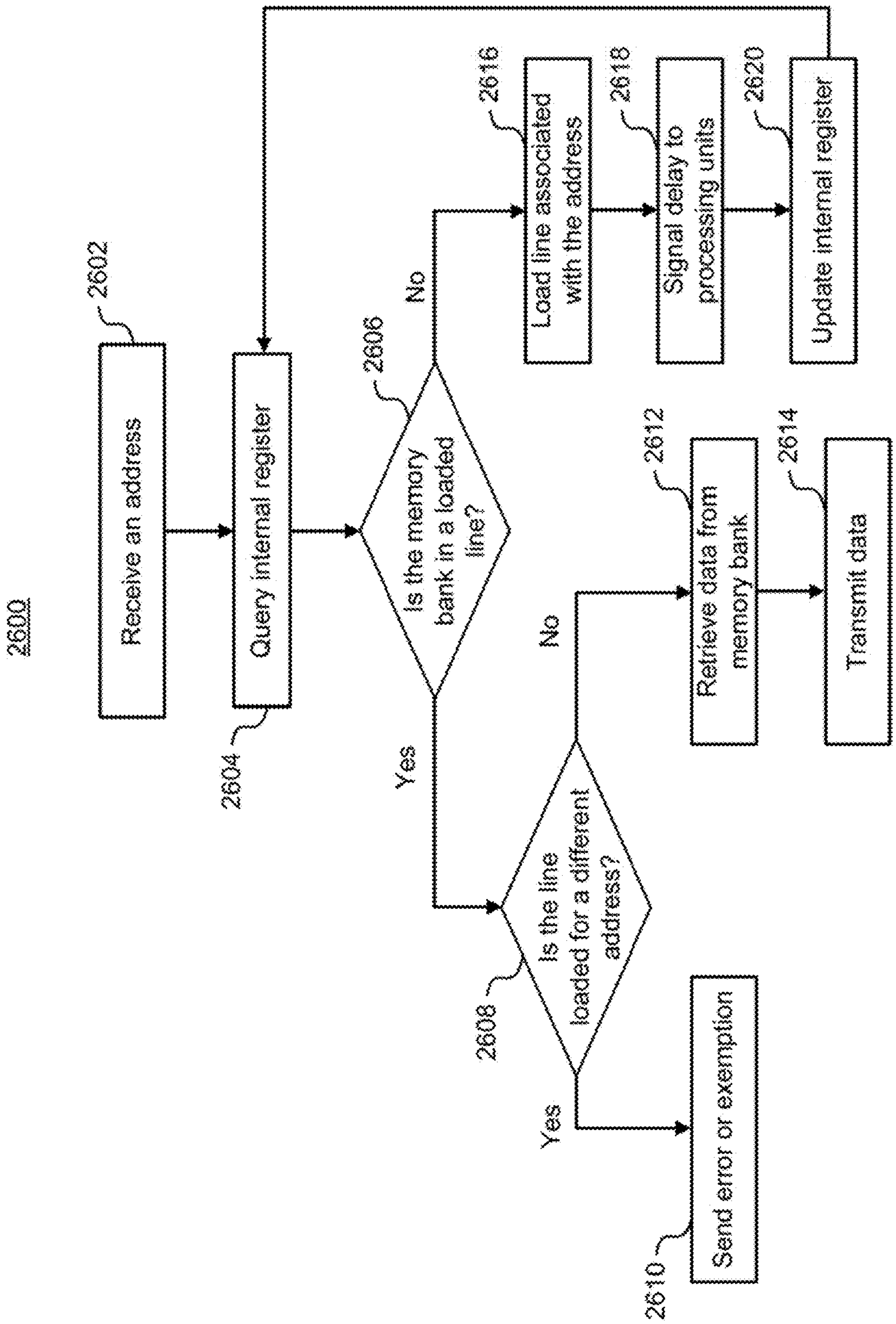
FIG. 26 is an exemplary flowchart illustrating a memory read process, consistent with disclosed embodiments.

FIG. 26 is an exemplary flowchart illustrating a memory read process 2600, consistent with disclosed embodiments. Where convenient in describing memory read process 2600, reference may be made to the identifiers of elements depicted in FIG. 22 and described above. In some embodiments, as described below, process 2600 may be implemented by memory controller 2210. In other embodiments, however, process 2600 may be implemented by other elements in the processing device 2200, such as configuration manager 2212.

In step 2602, memory controller 2210, configuration manager 2212, or other processing units may receive an indication to route data from, or grant access to, a memory bank. The request may specify an address and a memory block.

In some embodiments, the request may be received via a data bus specifying a read command in line 2218 and address in line 2220. In other embodiments, the request may be received via demultiplexers connected to memory controller 2210.

In step 2604, configuration manager 2212, a host, or other processing units, may query an internal register. The internal register may include information regarding opened lines to memory banks, opened addresses, opened memory blocks, and/or upcoming tasks. Based on the information in the internal register, it may be determined whether there are lines opened to the memory bank and/or whether the memory block received the request in step 2602. Alternatively, or additionally, memory controller 2210 may directly query the internal register.

If the internal register indicates that the memory bank is not loaded in an opened line (step 2606: no), process 2600 may continue to step 2616 and a line may be loaded to a memory bank associated with the received address. In addition, memory controller 2210 or a processing unit, such as configuration manager 2212, may signal a delay to the element requesting information from the memory address in step 2616. For example, if accelerator 2216 is requesting the memory information that is located an already occupied memory block, memory controller 2210 may send a delay signal to the accelerator in step 2618. In step 2620, configuration manager 2212 or memory controller 2210 may update the internal register to indicate a line has opened to a new memory bank or a new memory block.

If the internal register indicates that the memory bank is loaded in an opened line (step 2606: yes), process 2600 may continue to step 2608. In step 2608, it may be determined whether the line loaded the memory bank is being used for a different address. If the line is being used for a different address (step 2608: yes), it would indicate that there are two instances in a single block and, therefore, they cannot be accessed simultaneously. Thus, an error or exemption signal may be send to the element requesting information from the memory address in step 2616. But, if the line is not being used for a different address (step 2608: no), a line may be opened for the address and retrieve data from the target memory bank and continue to step 2614 to transmit data to the to the element requesting information from the memory address.

With process 2600, processing device 2200 has the ability to establish direct connections between processing units and the memory blocks or memory instances that contain the required information to perform a task. This organization of data would enable reading information from organized vectors in different memory instances, as well as allow the retrieval of information simultaneously from different memory blocks when a device requests a plurality of these addresses.

Figure 27:
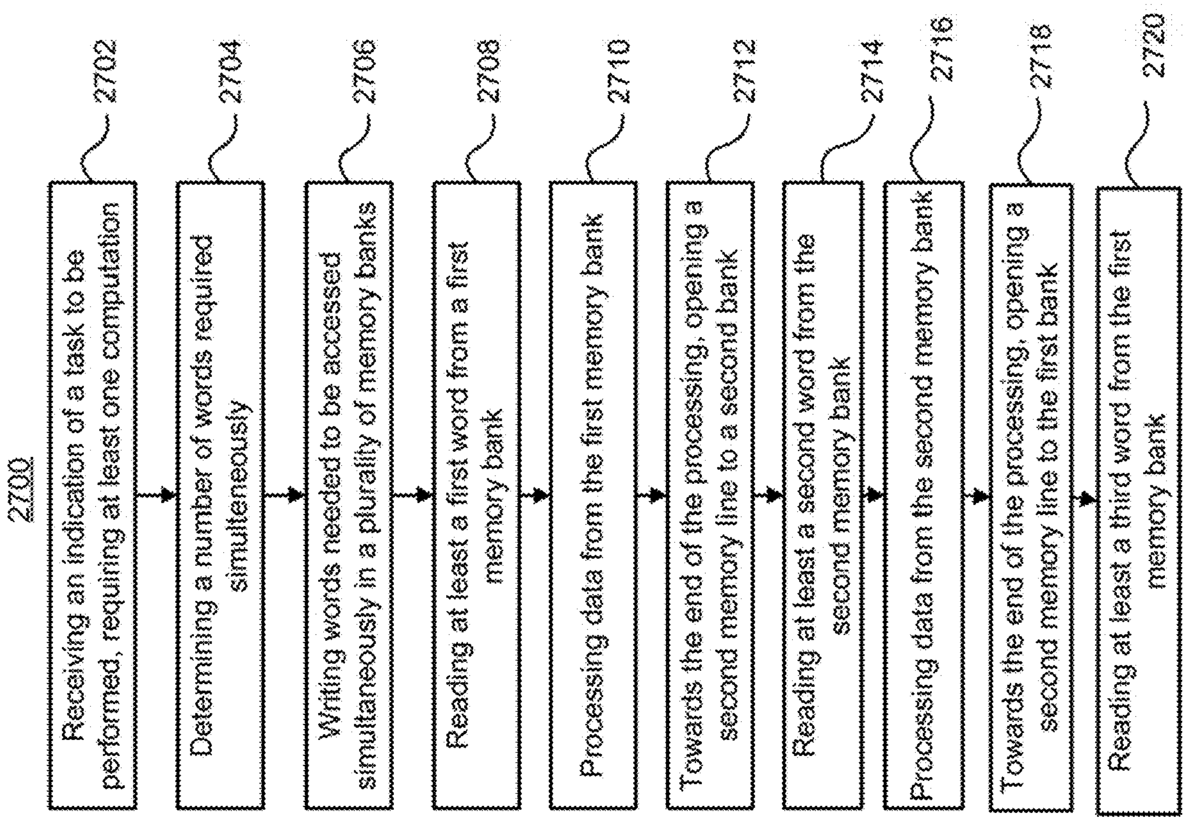
FIG. 27 is an exemplary flowchart illustrating a process execution, consistent with disclosed embodiments.

FIG. 27 is an exemplary flowchart illustrating an execution process 2700, consistent with disclosed embodiments. Where convenient in describing execution process 2700, reference may be made to the identifiers of elements depicted in FIG. 22 and described above.

In step 2702, a compiler or a local unit, such as configuration manager 2212, may receive an indication of a task that needs to be performed. The task may include a single operation (e.g., multiplication) or a more complex operation (e.g., convolution between matrixes). The task may also indicate a required computation.

In step 2704, the compiler or configuration manager 2212 may determine a number of words that is required simultaneously to perform the task. For example, configuration a compiler may determine two words are required simultaneously to perform a multiplication between vectors. In another example, a 2D convolution task, configuration manager 2212 may determine that "n" times "m" words are required for a convolution between matrices, where "n" and "m" are the matrices dimensions. Moreover, in step 2704, configuration manager 2212 may also determine a number of cycles necessary to perform the task.

In step 2706, depending on the determinations in step 2704, a compiler may write words that need to be accessed simultaneously in a plurality of memory banks disposed on the substrate. For instance, when a number a number of words that can be accessed simultaneously from one of the plurality of memory banks is lower than the number of words that are required simultaneously, a compiler may organize data in multiple memory banks to facilitate access to the different required words within a clock. Moreover, when configuration manager 2212 or the compiler determine a number of cycles is necessary to perform the task, the compiler may write words that are needed in sequential cycles in a single memory bank of the plurality of memory banks to prevent switching of lines between memory banks.

In step 2708, memory controller 2210 may be configured to read or grant access to at least one first word from a first memory bank from the plurality of memory banks or blocks using a first memory line.

In step 2170, a processing unit, for example one of accelerators 2216, may process the task using the at least one first word.

In step 2712, memory controller 2210 may be configured to open a second memory line in a second memory bank. For example, based on the tasks and using the pipelined memory access approach, memory controller 2210 may be configured to open a second memory line in a second memory block where information required for the tasks was written in step 2706. In some embodiments, the second memory line may be opened when the task in step 2170 is about to be completed. For example, if a task requires 100 clocks, the second memory line may be opened in the 90th clock.

In some embodiments, steps 2708-2712 may be executed within one line access cycle.

In step 2714, memory controller 2210 may be configured to grant access to data from at least one second word from the second memory bank using the second memory line opened in step 2710.

In step 2176, a processing unit, for example one of accelerators 2216, may process the task using the at least second word.

In step 2718, memory controller 2210 may be configured to open a second memory line in the first memory bank. For example, based on the tasks and using the pipelined memory access approach, memory controller 2210 may be configured to open a second memory line to the first memory block. In some embodiments, the second memory line to the first block may be opened when the task in step 2176 is about to be completed.

In some embodiments, steps 2714-2718 may be executed within one line access cycle.

In step 2720, memory controller 2210 may read or grant access to at least one third word from the first memory bank from the plurality of memory banks or blocks using a second memory line in the first bank or a first line in a third bank and continuing in different memory banks.

Partial Refreshes

Some memory chips, such as dynamic random access memory (DRAM) chips, use refreshes to keep stored data (e.g., using capacitance) from being lost due to voltage decay in capacitors or other electric components of the chips. For example, in DRAM each cell has to be refreshed from time to time (based on the specific process and design) to restore the charge in the capacitors so that data is not lost or damaged. As the memory capacities of a DRAM chip increase, the amount of time required to refresh the memory becomes significant. During the time periods when a certain line of memory is being refreshed, the bank containing the line being refreshed cannot be accessed. This can result in reductions in performance. Additionally, the power associated with the refresh process may also be significant. Prior efforts have attempted to reduce the rate at which refreshes are performed to reduce adverse effects associated with refreshing memory, but most of these efforts have focused on the physical layers of the DRAM.

Refreshing is similar to reading and writing back a row of the memory. Using this principle and focusing on the access pattern to the memory, embodiments of the present disclosure include software and hardware techniques, as well as modifications to the memory chips, to use less power for refreshing and to reduce amounts of time during which memory is refreshed. For example, an as an overview, some embodiments may use hardware and/or software to track line access timing and skip recently accessed rows within a refresh cycle (e.g., based on a timing threshold). In another example, some embodiments may rely on software executed by the memory chip's refresh controller to assign reads and writes such that access to the memory is non-random. Accordingly, the software may control the refresh more precisely to avoid wasted refresh cycles and/or lines. These techniques may be used alone or combined with a compiler that encodes commands for the refresh controller along with machine code for a processor such that access to the memory is again non-random. Using any combination of these techniques and configurations, which are described in detail below, the disclosed embodiments may reduce memory refresh power requirements and/or increase system performance by reducing an amount of time during which a memory unit is refreshed.

Figure 28:
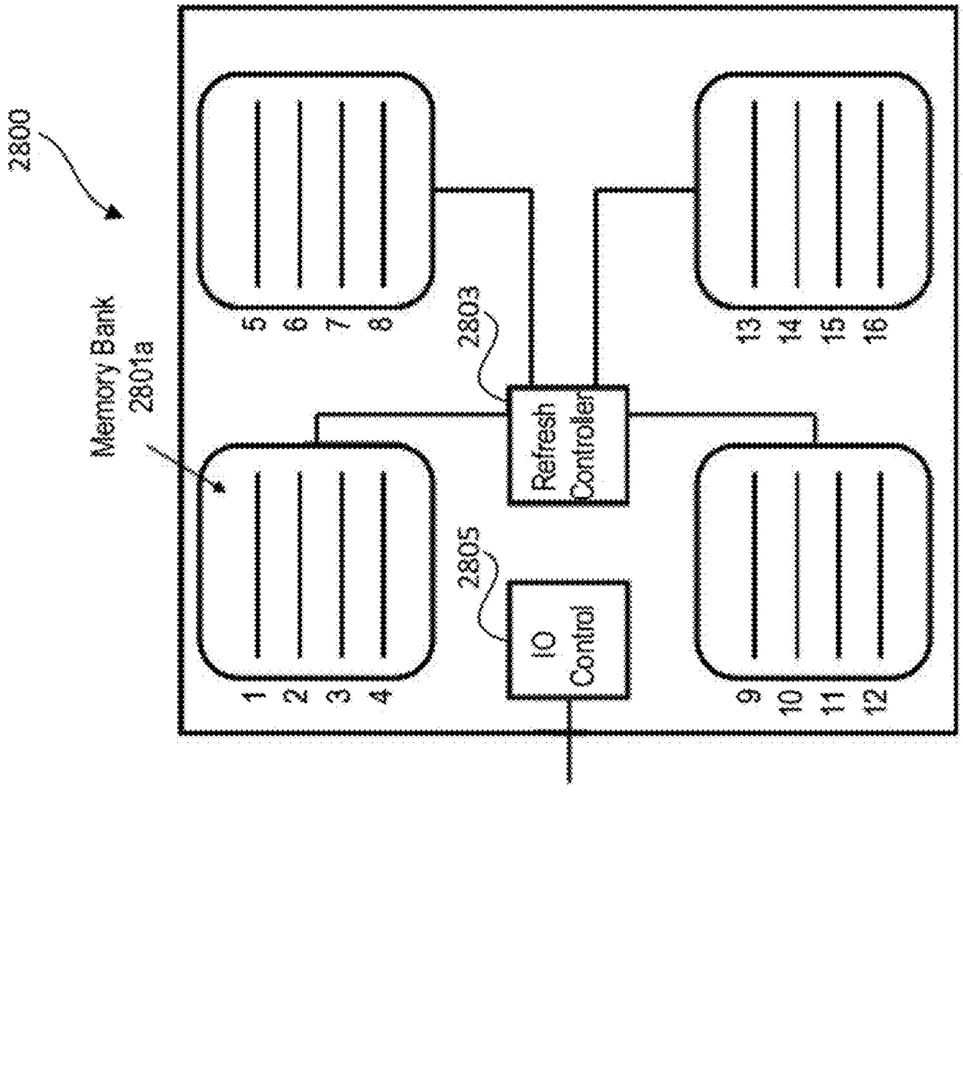
FIG. 28 shows an example memory chip with a refresh controller, consistent with the present disclosure.

FIG. 28 depicts an example memory chip 2800 with a refresh controller 2803, consistent with the present disclosure. For example, memory chip 2800 may include a plurality of memory banks (e.g., memory bank 2801*a* and the like) on a substrate. In the example of FIG. 28, the substrate includes four memory banks, each with four lines. A line may refer to a wordline within one or more memory banks of memory chip 2800 or any other collection of memory cells within memory chip 2800, such as a portion of or an entire row along a memory bank or a group of memory banks.

In other embodiments, the substrate may include any number of memory banks, and each memory bank may include any number of lines. Some memory banks may include a same number of lines (as shown in FIG. 28) while other memory banks may include different numbers of lines. As further depicted in FIG. 28, memory chip 280*x* may include a controller 2805 to receive input to memory chip 2800 and transmit output from memory chip 2800 (e.g., as described above in "Division of Code").

In some embodiments, the plurality of memory banks may comprise dynamic random access memory (DRAM). However, the plurality of memory banks may comprise any volatile memory that stores data requiring periodic refreshes.

As will be discussed in more detail below, the presently disclosed embodiments may employ counters or resistor-capacitor circuits to time refresh cycles. For example a counter or timer may be used to count time from the last fill refresh cycle and then when the counter reaches its target value another counter may be used to iterate over all rows. Embodiments of the present disclosure may additionally track accesses to segments of memory chip 2800 and reduce refresh power required. For example, although not depicted in FIG. 28, memory chip 2800 may further include a data storage configured to store access information indicative of access operations for one or more segments of the plurality of memory banks. For example, the one or more segments may comprise any portions of lines, columns, or any other groupings of memory cells within memory chip 2800. In one particular example, the one or more segments may include at least one row of memory structures within the plurality of memory banks. Refresh controller 2803 may be configured to perform a refresh operation of the one or more segments based, at least in part, on the stored access information.

For example, the data storage may comprise one or more registers, static random access memory (SRAM) cells, or the like associated with segments of memory chip 2800 (e.g., lines, columns, or any other groupings of memory cells within memory chip 2800). Further, the data storage may be configured to store bits indicative of whether the associated segment was accessed in one or more previous cycles. A "bit" may comprise any data structure storing at least one bit, such as a register, an SRAM cell, a nonvolatile memory, or the like. Moreover, a bit may be set by setting a corresponding switch (or switching element, such as a transistor) of the data structure to ON (which may be equivalent to "1" or "true"). Additionally or alternatively, a bit may be set by modifying any other property within the data structure (such as charging a floating gate of a flash memory, modifying a state of one or more flip-flops in an SRAM, or the like) in order to write a "1" to the data structure (or any other value indicating the setting of a bit). If a bit is determined to be set as part of the memory controller's refresh operation, refresh controller 2803 may skip a refresh cycle for the associated segment and clear the register(s) associated with that portion.

In another example, the data storage may comprise one or more nonvolatile memories (e.g., a flash memory or the like) associated with segments of memory chip 2800 (e.g., lines, columns, or any other groupings of memory cells within memory chip 2800). The nonvolatile memory may be configured to store bits indicative of whether the associated segment was accessed in one or more previous cycles.

Some embodiments may additionally or alternatively add a timestamp register on each row or group of rows (or other segment of memory chip 2800) holding the last tick within the current refresh cycle which the line was accessed. This means that with each row access, the refresh controller may update the row timestamp register. Thus, when a next time to refresh occurs (e.g., at the end of a refresh cycle), the refresh controller may compare the stored timestamp, and if the associated segment was previously accessed within a certain period of time (e.g., within a certain threshold as applied to the stored timestamp), the refresh controller may skip to the next segment. This saves the system from expending refresh power on segments that have been recently accessed. Moreover, the refresh controller may continue to track access to make sure each segment is accessed or refreshed at the next cycle.

Accordingly, in yet another example, the data storage may comprise one or more registers or nonvolatile memories associated with segments of memory chip 2800 (e.g., lines, columns, or any other groupings of memory cells within memory chip 2800). Rather than using bits to indicate whether an associated segment has been accessed, the registers or nonvolatile memories may be configured to store timestamps or other information indicative of a most recent access of the associated segments. In such an example, refresh controller 2803 may determine whether to refresh or access the associated segments based on whether an amount of time between timestamps stored in the associated registers or memories and a current time (e.g., from a timer, as explained below in FIGS. 29A and 29B) exceed a predetermined threshold (e.g., 8 ms, 16 ms, 32 ms, 64 ms, or the like).

Accordingly, the predetermined threshold may comprise an amount of time for a refresh cycle to ensure that the associated segments are refreshed (if not accessed) at least once per refresh cycle. Alternatively, the predetermined threshold may comprise an amount of time shorter than that required for a refresh cycle (e.g., to ensure that any required refresh or access signals may reach the associated segments before the refresh cycle is complete). For example, the predetermined time may comprise 7 ms for a memory chip with an 8 ms refresh period such that, if a segment has not been accessed in 7 ms, the refresh controller will send a refresh or access signal that reaches the segment by the end of the 8 ms refresh period. In some embodiments, the predetermined threshold may depend on the size of an associated segment. For example, the predetermined threshold may be smaller for smaller segments of memory chip 2800.

Although described above with respect to a memory chip, the refresh controllers of the present disclosure may also be used in distributed processor architectures, like those described in the sections above and throughout the present disclosure. One example of such an architecture is depicted in FIG. 7A. In such embodiments, the same substrate as memory chip 2800 may include, disposed thereon, a plurality of processing groups, e.g., as depicted in FIG. 7A. As explained above with respect to FIG. 3A, a "processing group" may refer to two or more processor subunits and their corresponding memory banks on the substrate. The group may represent a spatial distribution on the substrate and/or a logical grouping for the purposes of compiling code for execution on memory chip 2800. Accordingly, the substrate may include a memory array that includes a plurality of banks, such as banks 2801*a* and other banks shown in FIG. 28. Furthermore, the substrate may include a processing array that may include a plurality of processor subunits (such as subunits 730*a*, 730*b*, 730*c*, 730*d*, 730*e*, 730*f*, 730*g*, and 730*h* shown in FIG. 7A).

As further explained above with respect to FIG. 7A, each processing group may include a processor subunit and one or more corresponding memory banks dedicated to the processor subunit. Moreover, to allow each processor subunit to communicate with its corresponding, dedicated memory bank(s), the substrate may include a first plurality of buses connecting one of the processor subunits to its corresponding, dedicated memory bank(s).

In such embodiments, as shown in FIG. 7A, the substrate may include a second plurality of buses to connect each processor subunit to at least one other processor subunit (e.g., an adjacent subunit in in the same row, an adjacent processor subunit in the same column, or any other processor subunit on the substrate). The first and/or second plurality of buses may be free of timing hardware logic components such that data transfers between processor subunits and across corresponding ones of the plurality of buses are uncontrolled by timing hardware logic components, as explained above in the "Synchronization Using Software" section.

In embodiments where same substrate as memory chip 2800 may include, disposed thereon, a plurality of processing groups (e.g., as depicted in FIG. 7A), the processor subunits may further include an address generator (e.g., address generator 450 as depicted in FIG. 4). Moreover, each processing group may include a processor subunit and one or more corresponding memory banks dedicated to the processor subunit. Accordingly, each one of the address generators may be associated with a corresponding, dedicated one of the plurality of memory banks. In addition, the substrate may include a plurality of buses, each connecting one of the plurality of address generators to its corresponding, dedicated memory bank.

Figure 29A:
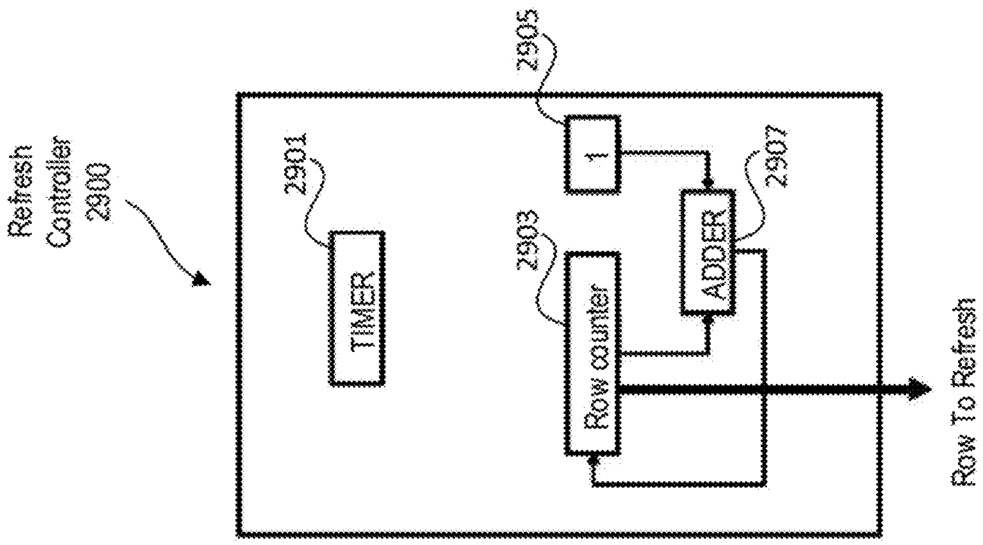
FIG. 29A shows an example refresh controller consistent with the present disclosure.

FIG. 29A depicts example refresh controller 2900 consistent with the present disclosure. Refresh controller 2900 may be incorporated in a memory chip of the present disclosure, such as memory chip 2800 of FIG. 28. As depicted in FIG. 29A, refresh controller 2900 may include a timer 2901, which may comprise a on-chip oscillator or any other timing circuit for refresh controller 2900. In the configuration depicted in FIG. 29A, timer 2901 may trigger a refresh cycle periodically (e.g., every 9 ms, 16 ms, 32 ms, 64 ms, or the like). The refresh cycle may use a row counter 2903 to cycle through all rows of a corresponding memory chip and generate a refresh signal for each row using adder 2901 combined with an active bit 2905. As shown in FIG. 29A, bit 2905 may be fixed at 1 ("true") to ensure that each row is refreshed during a cycle.

In embodiments of the present disclosure, refresh controller 2900 may be include a data storage. As described above, the data storage may comprise one or more registers or nonvolatile memories associated with segments of memory chip 2800 (e.g., lines, columns, or any other groupings of memory cells within memory chip 2800). The registers or nonvolatile memories may be configured to store timestamps or other information indicative of a most recent access of the associated segments.

Refresh controller 2900 may use the stored information to skip refreshes for segments of memory chip 2900. For example, refresh controller 2900 may skip a segment in a current refresh cycle if the information indicates it was refreshed during one or more previous refresh cycles. In another example, refresh controller 2900 may skip a segment in a current refresh cycle if a difference between the stored timestamp for the segment a current time is below a threshold. Refresh controller 2900 may further continue to track accesses and refreshes of the segments of memory chip 2800 through multiple refresh cycles. For example, refresh controller 2900 may update stored timestamps using timer 2901. In such embodiments, refresh controller 2900 may be configured to use an output of the timer in clearing the access information stored in the data storage after a threshold time interval. For example, in embodiments where the data storage stores timestamps of a most recent access or refresh for an associated segment, refresh controller 2900 may store a new timestamp in the data storage whenever an access command or refresh signal is sent to the segment. If the data storage stores bits rather than timestamps, timer 2901 may be configured to clear bits that are set for longer than a threshold period of time. For example, in embodiments where the data storage stores bits indicating that associated segments was accessed in one or more previous cycles, refresh controller 2900 may clear bits (e.g., setting them to 0) in the data storage whenever timer 2901 triggers a new refresh cycle that is a threshold number of cycles (e.g., one, two, or the like) later since the associated bits were set (e.g., set to 1).

Refresh controller 2900 may track access of the segments of memory chip 2800 in cooperation with other hardware of memory chip 2800. For example, memory chips use sense amplifiers to perform read operations (e.g., as shown above in FIGS. 9 and 10). The sense amplifiers may comprise a plurality of transistors configured to sense low-power signals from a segment of the memory chip 2800 storing a data in one or more memory cells and amplify the small voltage swing to higher voltage levels such that the data can be interpreted by logic, such as external CPUs or GPUs or integrated processor subunits as explained above. Although not depicted in FIG. 29A, refresh controller 2900 may further communicate with a sense amplifier configured to access the one or more segments and change the state of the at least one bit register. For example, when the sense amplifier accesses the one or more segments, it may set (e.g., set to 1) bits associated with the segments indicating that the associated segments were accessed in a previous cycle. In embodiments where the data storage stores timestamps of a most recent access or refresh for an associated segment, when the sense amplifier accesses the one or more segments, it may trigger a write of a timestamp from timer 2901 to the registers, memories, or other elements comprising the data storage.

In any of the embodiments described above, refresh controller 2900 may be integrated with a memory controller for the plurality of memory banks. For example, similar to the embodiments depicted in FIG. 3A, refresh controller 2900 may be incorporated into a logic and control subunit associated with a memory bank or other segment of memory chip 2800.

Figure 29B:
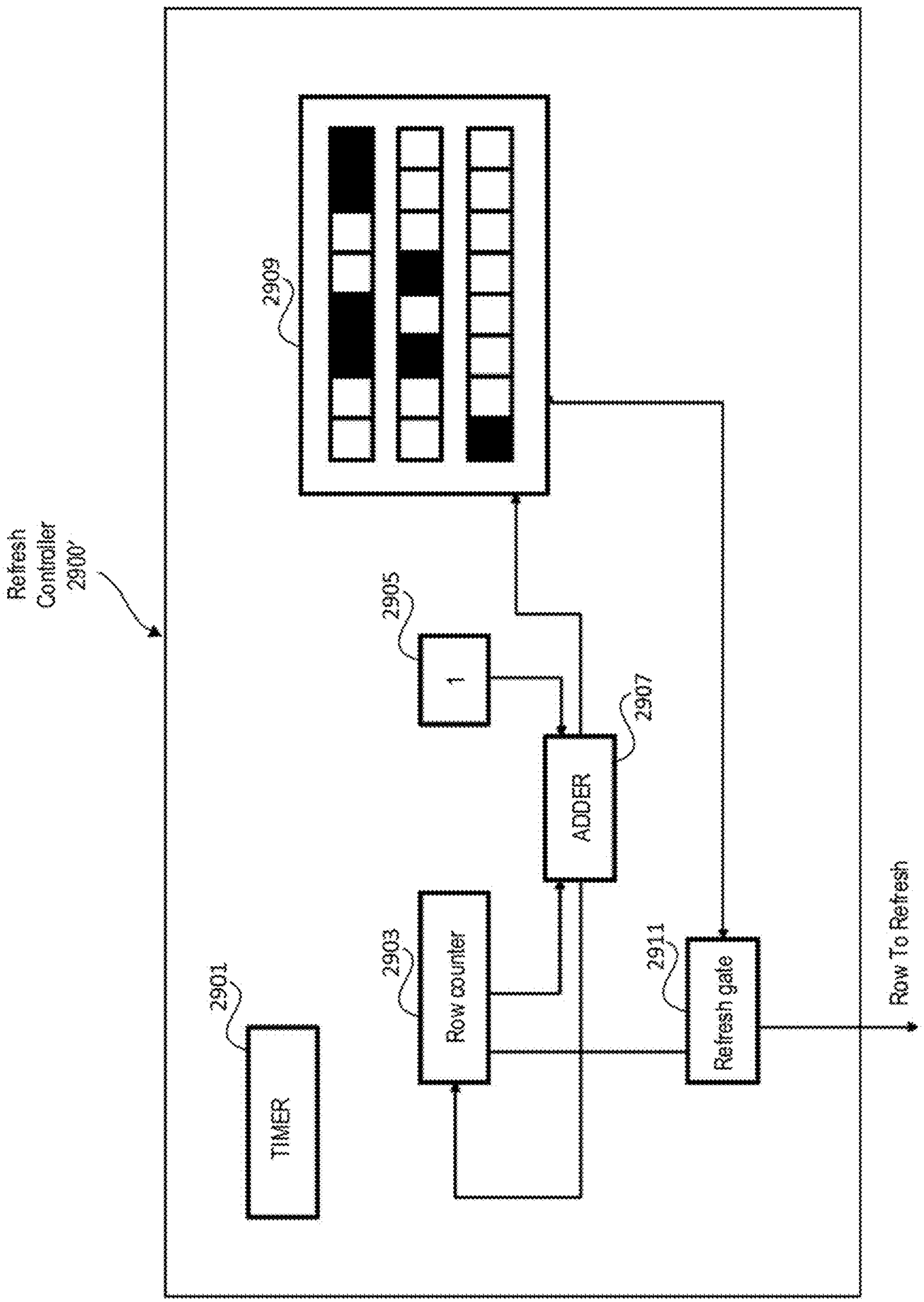
FIG. 29B shows another example refresh controller consistent with the present disclosure.

FIG. 29B depicts another example refresh controller 2900' consistent with the present disclosure. Refresh controller 2900' may be incorporated in a memory chip of the present disclosure, such as memory chip 2800 of FIG. 28. Similar to refresh controller 2900, refresh controller 2900' includes timer 2901, row counter 2903, active bit 2905, and adder 2907. Additionally, refresh controller 2900' may include data storage 2909. As shown in FIG. 29B, data storage 2909 may comprise one or more registers or nonvolatile memories associated with segments of memory chip 2800 (e.g., lines, columns, or any other groupings of memory cells within memory chip 2800), and states within the data storage may be configured to be changed (e.g., by a sense amplifier and/or other elements of refresh controller 2900', as described above) in response to the one or more segments being accessed. Accordingly, the refresh controller 2900' may be configured to skip a refresh of the one or more segments based on the states within the data storage. For example, if a stare associated with a segment is activated (e.g., set to 1 by being switched on, having a property altered in order to store a "1," or the like), refresh controller 2900' may skip a refresh cycle for the associated segment and clear the state associated with that portion. The state may be stored with at least a one-bit register or any other memory structure configured to store at least one bit of data.

In order to ensure segments of the memory chip are refreshed or accessed during each refresh cycle, refresh controller 2900' may reset or otherwise clear the states in order to trigger a refresh signal during the next refresh cycle. In some embodiments, after a segment is skipped, refresh controller 2900' may clear the associated state in order to ensure that the segment is refreshed on the next refresh cycle. In other embodiments, refresh controller 2900' may be configured to reset the states within the data storage after a threshold time interval. For example, refresh controller 2900' may clear states (e.g., setting them to 0) in the data storage whenever timer 2901 exceeds a threshold time since the associated states were set (e.g., set to 1 by being switched on, having a property altered in order to store a "1," or the like). In some embodiments, refresh controller 2900' may use a threshold number of refresh cycles (e.g., one, two, or the like) or use a threshold number of clock cycles (e.g., two, four, or the like) rather than a threshold time.

In other embodiments, the state may comprise a timestamp of a most recent refresh or access of an associated segment such that, if an amount of time between the timestamp and a current time (e.g., from timer 2901 of FIGS. 29A and 29B) exceeds a predetermined threshold (e.g., 8 ms, 16 ms, 32 ms, 64 ms, or the like), refresh controller 2900' may send an access command or a refresh signal to the associated segment and update the timestamp associated with that portion (e.g., using timer 2901). Additionally or alternatively, refresh controller 2900' may be configured to skip a refresh operation relative to the one or more segments of the plurality of memory banks if the refresh time indicator indicates a last refresh time within a predetermined time threshold. In such embodiments, refresh controller 2900', after skipping a refresh operation relative to the one or more segments, may be configured to alter the stored refresh time indicator associated with the one or more segments such that during a next operation cycle, the one or more segments will be refreshed. For example, as described above, refresh controller 2900' may use timer 2901 to update the stored refresh time indicator.

Accordingly, the data storage may include a timestamp register configured to store a refresh time indicator indicative of a time at which the one or more segments of the plurality of memory banks were last refreshed. Moreover, refresh controller 2900' may use an output of the timer in clearing the access information stored in the data storage after a threshold time interval.

In any of the embodiments described above, access to the one or more segments may include a write operation associated with the one or more segments. Additionally or alternatively, access to the one or more segments may include a read operation associated with the one or more segments.

Moreover, as depicted in FIG. 29B, refresh controller 2900' may comprise a row counter 2903 and an adder 2907 configured to assist in updating the data storage 2909 based, at least in part, on the states within the data storage. Data storage 2909 may comprise a bit table associated with the plurality of memory banks. For example, the bit table may comprise an array of switches (or switching elements such as transistors) or registers (e.g., SRAM or the like) configured to hold bits for associated segments. Additionally or alternatively, data storage 2909 may store timestamps associated with the plurality of memory banks.

Moreover, refresh controller 2900' may include a refresh gate 2911 configured to control whether a refresh to the one or more segments occurs based a corresponding value stored in the bit table. For example, refresh gate 2911 may comprise a logic gate (such as an "and" gate) configured to nullify a refresh signal from row counter 2903 if a corresponding state of data storage 2909 indicates that the associated segment was refreshed or accessed during one or more previous clock cycles. In other embodiments, refresh gate 2911 may comprise a microprocessor or other circuit configured to nullify a refresh signal from row counter 2903 if a corresponding timestamp from data storage 2909 indicates that the associated segment was refreshed or accessed within a predetermined threshold time value.

Figure 30:
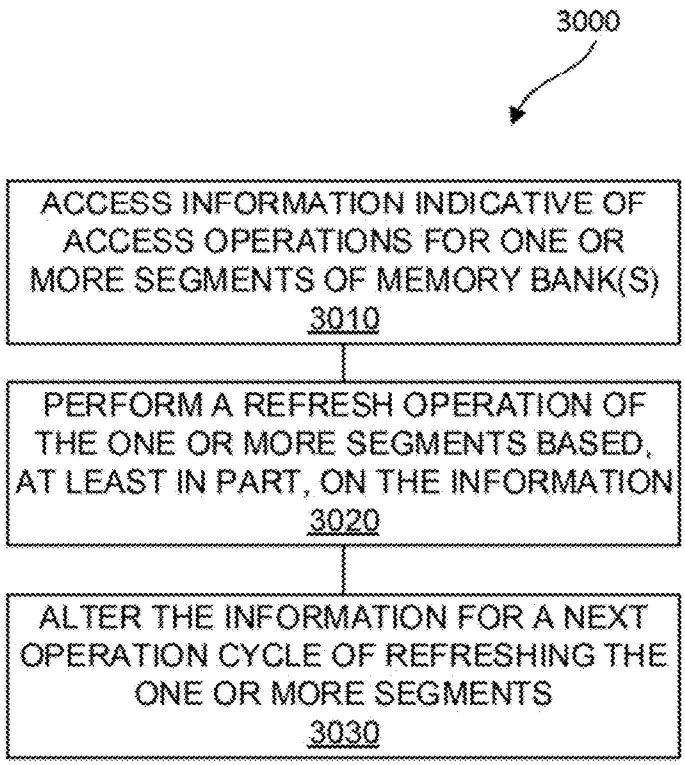
FIG. 30 is an example flowchart of a process executing by a refresh controller consistent with the present disclosure.

FIG. 30 is an example flowchart of a process 3000 for partial refreshes in a memory chip (e.g., memory chip 2800 of FIG. 28) Process 3000 may be executed by a refresh controller consistent with the present disclosure, such as refresh controller 2900 of FIG. 29A or refresh controller 2900' of FIG. 29B.

At step 3010, the refresh controller may access information indicative of access operations for one or more segments of a plurality of memory banks. For example, as explained above with respect to FIGS. 29A and 29B, the refresh controller may include a data storage associated with segments of memory chip 2800 (e.g., lines, columns, or any other groupings of memory cells within memory chip 2800) and configured to store timestamps or other information indicative of a most recent access of the associated segments.

At step 3020, the refresh controller may generate refresh and/or access commands based, at least in part, on the accessed information. For example, as explained above with respect to FIGS. 29A and 29B, the refresh controller may skip a refresh operation relative to the one or more segments of the plurality of memory banks if the accessed information indicates a last refresh or access time within a predetermined time threshold and/or if the accessed information indicates a last refresh or access occurred during one or more previous clock cycles. Additionally or alternatively, the refresh controller may generate comments to refresh or access the associated segments based on whether the accessed information indicates a last refresh or access time that exceeds a predetermined threshold and/or if the accessed information indicates a last refresh or access did not occur during one or more previous clock cycles.

At step 3030, the refresh controller may alter the stored refresh time indicator associated with the one or more segments such that during a next operation cycle, the one or more segments will be refreshed. For example, after skipping a refresh operation relative to the one or more segments, the refresh controller may alter the information indicative of access operations for the one or more segments such that, during a next clock cycle, the one or more segments will be refreshed. Accordingly, the refresh controller may clear (e.g., set to 0) states for the segments after skipping a refresh cycle. Additionally or alternatively, the refresh controller may set (e.g., set to 1) states for the segments that are refreshed and/or accessed during the current cycle. In embodiments where the information indicative of access operations for the one or more segments includes timestamps, the refresh controller may update any stored timestamps associated with segments that are refreshed and/or accessed during the current cycle.

Method 3000 may further include additional steps. For example, in addition to or as an alternative to step 3030, a sense amplifier may access the one or more segments and may change the information associated with the one or more segments. Additionally or alternatively, the sense amplifier may signal to the refresh controller when the access has occurred such that the refresh controller may update the information associated with the one or more segments. As explained above, a sense amplifier may comprise a plurality of transistors configured to sense low-power signals from a segment of the memory chip storing a data in one or more memory cells and amplify the small voltage swing to higher voltage levels such the data can be interpreted by logic, such as external CPUs or GPUs or integrated processor subunits as explained above. In such an example, whenever the sense amplifier accesses the one or more segments, it may set (e.g., set to 1) bits associated with the segments indicating that the associated segments were accessed in a previous cycle. In embodiments where the information indicative of access operations for the one or more segments includes timestamps, whenever the sense amplifier accesses the one or more segments, it may trigger a write of a timestamp from a timer of the refresh controller to the data storage to update any stored timestamps associated with the segments.

Figure 31:
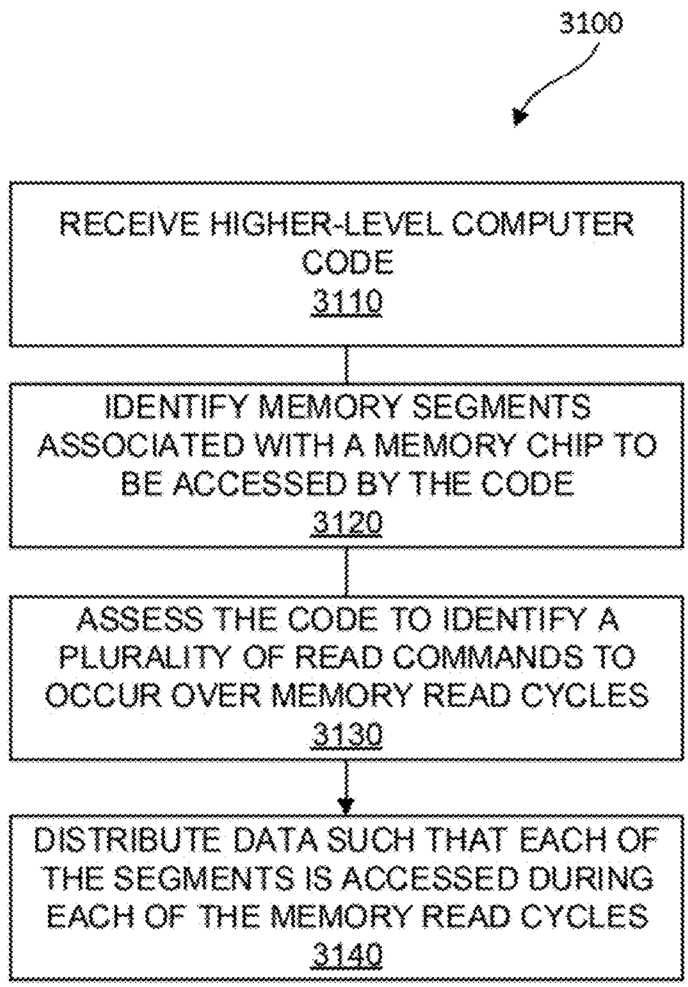
FIG. 31 is an example flowchart of a process implemented by a compiler consistent with the present disclosure.

FIG. 31 is an example flowchart of a process 3100 for determining refreshes for a memory chip (e.g., memory chip 2800 of FIG. 28). Process 3100 may be implemented within a compiler consistent with the present disclosure. As explained above, a "compiler" refers to any computer program that converts a higher-level language (e.g., a procedural language, such as C, FORTRAN, BASIC, or the like; an object-oriented language, such as Java, C++, Pascal, Python, or the like; etc.) to a lower-level language (e.g., assembly code, object code, machine code, or the like). The compiler may allow a human to program a series of instructions in a human-readable language, which is then converted to a machine-executable language. The compiler may comprise software instructions executed by one or more processors.

At step 3110, the one or more processors may receive higher-level computer code. For example, the higher-level computer code may be encoded in one or more files on a memory (e.g., a non-volatile memory such as a hard disk drive or the like, a volatile memory such as DRAM, or the like) or received over a network (e.g., the Internet or the like). Additionally or alternatively, the higher-level computer code may be received from a user (e.g., using an input device such as a keyboard).

At step 3120, the one or more processors may identify a plurality of memory segments distributed over a plurality of memory banks associated with a memory chip to be accessed by the higher-level computer code. For example, the one or more processors may access a data structure defining the plurality of memory banks and a corresponding structure of the memory chip. The one or more processor may access the data structure from a memory (e.g., a non-volatile memory such as a hard disk drive or the like, a volatile memory such as DRAM, or the like) or receive the data structure over a network (e.g., the Internet or the like). In such embodiments, the data structure may be included in one or more libraries accessible by the compiler to permit the compiler to generate instructions for the particular memory chip to be accessed.

At step 3130, the one or processors may assess the higher-level computer code to identify a plurality of memory read commands to occur over a plurality of memory access cycles. For example, the one or more processor may identify each operation within the higher-level computer code requiring one or more read commands from memory and/or one or more write commands to memory. Such instructions may include variable initialization, variable re-assignment, logic operations on variables, input-output operations, or the like.

At step 3140, the one or more processors may cause a distribution of data, associated with the plurality of memory access commands, across each of the plurality of memory segments such that each of the plurality of memory segments is accessed during each of the plurality of memory access cycles. For example, the one or more processors may identify the memory segments from the data structure defining the structure of the memory chip and then assign variables from the higher-level code to various ones of the memory segments such that each memory segment is accessed (e.g., via a write or a read) at least once during each refresh cycle (which may comprise a particular number of clock cycles). In such an example, the one or more processors may access information indicative of how many clock cycles each line of higher-level code requires in order to assign variables from the lines of higher-level code such that each memory segment is accessed (e.g., via a write or a read) at least once during the particular number of clock cycles.

In another example, the one or more processors may first generate machine code or other lower-level code from the higher-level code. The one or more processors may then assign variables from the lower-level code to various ones of the memory segments such that each memory segment is accessed (e.g., via a write or a read) at least once during each refresh cycle (which may comprise a particular number of clock cycles). In such an example, each line of lower-level code may require a single clock cycle.

In any of the examples given above, the one or more processor may further assign logic operations or other commands that use temporary output to various ones of the memory segments. Such temporary outputs may still result in read and/or write commands such that the assigned memory segment is still being accessed during that refresh cycle even though a named variable has not been assigned to that memory segment.

Method 3100 may further include additional steps. For example, the one or more processors may, in embodiments where the variables are assigned prior to compiling, generate machine code or other lower-level code from the higher-level code. Moreover, the one or more processors may transmit the compiled code for execution by the memory chip and corresponding logic circuits. The logic circuits may comprise conventional circuits such as GPUs or CPUs or may comprise processing groups on the same substrate as the memory chip, e.g., as depicted in FIG. 7A. Accordingly, as described above, the substrate may include a memory array that includes a plurality of banks, such as banks 2801*a* and other banks shown in FIG. 28. Furthermore, the substrate may include a processing array that may include a plurality of processor subunits (such as subunits 730*a*, 730*b*, 730*c*, 730*d*, 730*e*, 730*f*, 730*g*, and 730*h* shown in FIG. 7A).

Figure 32:
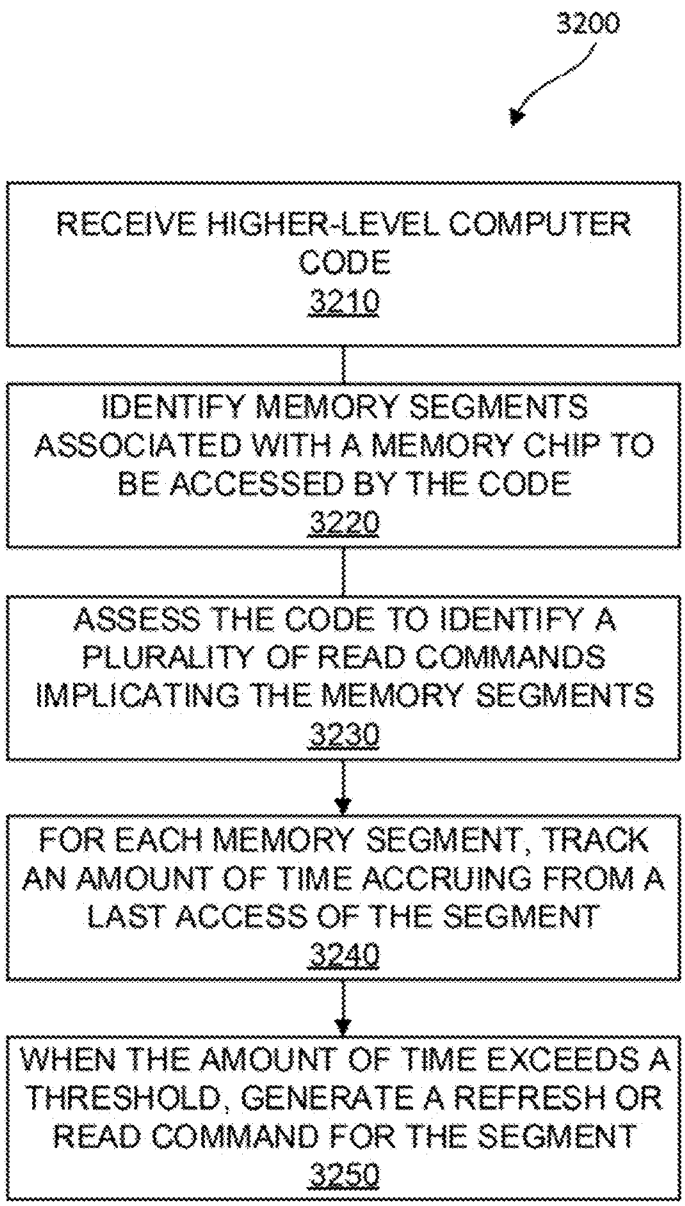
FIG. 32 is another example flowchart of a process implemented by a compiler consistent with the present disclosure.

FIG. 32 is another example flowchart of a process 3200 for determining refreshes for a memory chip (e.g., memory chip 2800 of FIG. 28). Process 3200 may be implemented within a compiler consistent with the present disclosure. Process 3200 may be executed by one or more processors executing software instructions comprising the compiler. Process 3200 may be implemented separately from or in combination with process 3100 of FIG. 31.

At step 3210, similar to step 3110, the one or more processors may receive higher-level computer code. At step 3220, similar to step 3210, the one or more processors may identify a plurality of memory segments distributed over a plurality of memory banks associated with a memory chip to be accessed by the higher-level computer code.

At step 3230, the one or more processors may assess the higher-level computer code to identify a plurality of memory read commands each implicating one or more of the plurality of memory segments. For example, the one or more processor may identify each operation within the higher-level computer code requiring one or more read commands from memory and/or one or more write commands to memory. Such instructions may include variable initialization, variable re-assignment, logic operations on variables, input-output operations, or the like.

In some embodiments, the one or more processors may simulate an execution of the higher-level code using logic circuits and the plurality of memory segments. For example, the simulation may comprise a line-by-line step-through of the higher-level code similar to that of a debugger or other instruction set simulator (ISS). The simulation may further maintain internal variables which represent the addresses of the plurality of memory segments, similar to how a debugger may maintain internal variables which represent registers of a processor.

At step 3240, the one or more processors may, based on analysis of the memory access commands and for each memory segment among the plurality of memory segments, track an amount of time that would accrue from a last access to the memory segment. For example, using the simulation described above, the one or processors may determine lengths of time between each access (e.g., a read or a write) to one or more addresses within each of the plurality of memory segments. The lengths of time may be measured in absolute time, clock cycles, or refresh cycles (e.g., determined by a known refresh rate of the memory chip).

At step 3250, in response to a determination that an amount of time since a last access for any particular memory segment would exceed a predetermined threshold, the one or more processors may introduce into the higher-level computer code at least one of a memory refresh command or a memory access command configured to cause an access to the particular memory segment. For example, the one or more processors may include a refresh command for execution by a refresh controller (e.g., refresh controller 2900 of FIG. 29A or refresh controller 2900' of FIG. 29B). In embodiments where the logic circuits are not embedded on the same substrate as the memory chip, the one or more processors may generate the refresh commands for sending to the memory chip separate from the lower-level code for sending to the logic circuits.

Additionally or alternatively, the one or more processors may include an access command for execution by a memory controller (which may be separate from the refresh controller or incorporated into the same). The access command may comprise a dummy command configured to trigger a read operation on the memory segment but without having the logic circuits perform any further operation on the read or written variable from the memory segment.

In some embodiments, the compiler may include a combination of steps from process 3100 and from process 3200. For example, the compiler may assign variables according to step 3140 and then run the simulation described above to add in any additional memory refresh commands or memory access commands according to step 3250. This combination may allow for the compiler to distribute the variables across as many memory segments as possible and to generate refresh or access commands for any memory segments that cannot be accessed within the predetermined threshold amount of time. In another combinatory example, the compiler may simulate the code according to step 3230 and assign variables according to step 3140 based on any memory segments that the simulation indicates will not be accessed within the predetermined threshold amount of time. In some embodiments, this combination may further include step 3250 to allow for the compiler to generate refresh or access commands for any memory segments that cannot be accessed within the predetermined threshold amount of time, even after assignments according to step 3140 are complete.

Refresh controllers of the present disclosure may allow software executed by logic circuits (whether conventional logic circuits such as CPUs and GPUs or processing groups on the same substrate as the memory chip, e.g., as depicted in FIG. 7A) to disable an automatic refresh executed by the refresh controller and control the refresh via the executed software instead. Accordingly, some embodiments of the present disclosure may provide software with a known access pattern to a memory chip (e.g., if the compiler has access to a data structure defining a plurality of memory banks and a corresponding structure of the memory chip). In such embodiments, a post-compiling optimizer may disable automatic refresh and manually set refresh controls only for segments of the memory chip not accessed within threshold amounts of time. Thus, similar to step 3250 described above but after compilation, the post-compiling optimizer may generate refresh commands to ensure each memory segment is accessed or refreshed with the predetermined threshold amount of time.

Another example of reducing refresh cycles may include using predefined patterns of access to the memory chip. For example, if software executed by the logic circuits can control its access pattern for the memory chip, some embodiments may create access patterns for refresh beyond conventional linear line refreshes. For example, if a controller determines that software executed by the logic circuits accesses regularly every second row of memory, then a refresh controller of the present disclosure may use an access pattern that does not refresh every second line in order to speed up the memory chip and reduce power usage.

Figure 33:
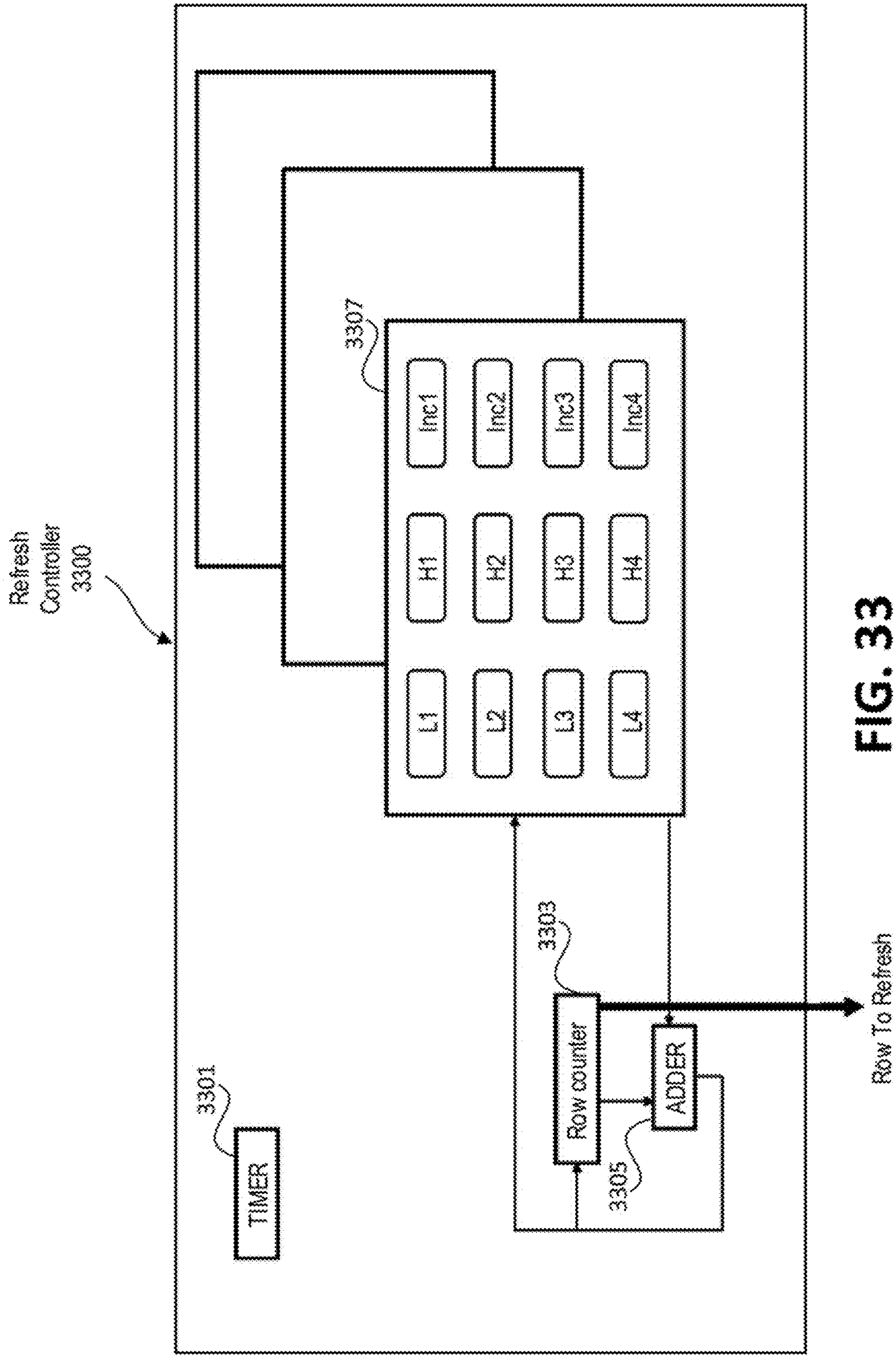
FIG. 33 shows an example refresh controller configured by stored patterns consistent with the present disclosure.

An example of such a refresh controller is shown in FIG. 33. FIG. 33 depicts an example refresh controller 3300 configured by stored patterns consistent with the present disclosure. Refresh controller 3300 may be incorporated in a memory chip of the present disclosure, e.g., having a plurality of memory banks and a plurality of memory segments included in each of the plurality of memory banks, such as memory chip 2800 of FIG. 28.

Refresh controller 3300 includes a timer 3301 (similar to timer 2901 of FIGS. 29A and 29B), a row counter 3303 (similar to row counter 2903 of FIGS. 29A and 29B), and an adder 3305 (similar to adder 2907 of FIGS. 29A and 29B). Moreover, refresh controller 3300 includes a data storage 3307. Unlike data store 2909 of FIG. 29B, data storage 3307 may store at least one memory refresh pattern to be implemented in refreshing the plurality of memory segments included in each of the plurality of memory banks. For example, as depicted in FIG. 33, data storage 3307 may include Li (e.g., L1, L2, L3, and L4 in the example of FIG. 33) and Hi (e.g., H1, H2, H3, and H4 in the example of FIG. 33) that define segments in the memory banks by row and/or column. Moreover, each segment may be associated with an Inci variable (e.g., Inc1, Inc2, Inc3, and Inc4 in the example of FIG. 33) which defines how the rows associated with the segment are incremented (e.g., whether each row is accessed or refresh, whether every other row is accessed or refreshed, or the like). Thus, as shown in FIG. 33, the refresh pattern may comprise a table including a plurality of memory segment identifiers assigned by the software to identify ranges of the plurality of memory segments in a particular memory bank that are to be refreshed during a refresh cycle and ranges of the plurality of memory segments in the particular memory bank that are not to be refreshed during the refresh cycle.

Thus, data storage 3308 may define a refresh pattern which the software executed by logic circuits (whether conventional logic circuits such as CPUs and GPUs or processing groups on the same substrate as the memory chip, e.g., as depicted in FIG. 7A) may select for use. The memory refresh pattern may be configurable using software to identify which of the plurality of memory segments in a particular memory bank are to be refreshed during a refresh cycle and which of the plurality of memory segments in the particular memory bank are not to be refreshed during the refresh cycle. Thus, refresh controller 3300 may refresh some or all rows within the defined segments that are not accessed during a current cycle according to Inci. Refresh controller 3300 may skip other rows of the defined segments that are set for access during the current cycle.

In embodiments where data storage 3308 of refresh controller 3300) includes a plurality of memory refresh patterns, each may represent a different refresh pattern for refreshing the plurality of memory segments included in each of the plurality of memory banks. The memory refresh patterns may be selectable for use on the plurality of memory segments. Accordingly, refresh controller 3300 may be configured to allow selection of which of the plurality of memory refresh patterns to implement during a particular refresh cycle. For example, the software executed by logic circuits (whether conventional logic circuits such as CPUs and GPUs or processing groups on the same substrate as the memory chip, e.g., as depicted in FIG. 7A) may select different memory refresh patterns for use during one or more different refresh cycles. Alternatively, the software executed by logic circuits may select one memory refresh pattern for use throughout some or all of the different refresh cycles.

The memory refresh patterns may be encoded using one or more variables stored in data storage 3308. For example, in embodiments where the plurality of memory segments are arranged in rows, each memory segment identifier may be configured to identify a particular location within a row of memory where a memory refresh should either begin or end. For example, in addition to Li and Hi, one or more additional variables may define which portions of the rows defined by Li and Hi are within the segment.

Figure 34:
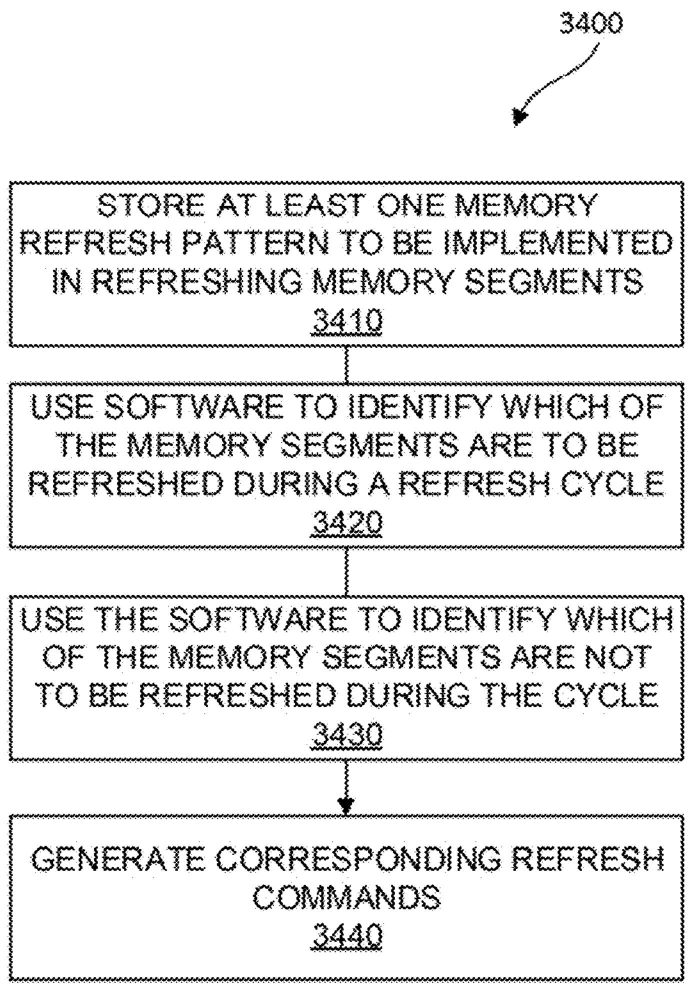
FIG. 34 is an example flowchart of a process implemented by software within a refresh controller consistent with the present disclosure.

FIG. 34 is an example flowchart of a process 3400 for determining refreshes for a memory chip (e.g., memory chip 2800 of FIG. 28). Process 3100 may be implemented by software within a refresh controller (e.g., refresh controller 3300 of FIG. 33) consistent with the present disclosure.

At step 3410, the refresh controller may store at least one memory refresh pattern to be implemented in refreshing a plurality of memory segments included in each of a plurality of memory banks. For example, as explained above with respect to FIG. 33, the refresh pattern may comprise a table including a plurality of memory segment identifiers assigned by the software to identify ranges of the plurality of memory segments in a particular memory bank that are to be refreshed during a refresh cycle and ranges of the plurality of memory segments in the particular memory bank that are not to be refreshed during the refresh cycle.

In some embodiments, the at least one refresh pattern may be encoded onto refresh controller (e.g., onto a read-only memory associated with or at least accessible by the refresh controller) during manufacture. Accordingly, the refresh controller may access the at least one memory refresh pattern but not store the same.

At steps 3420 and 3430, the refresh controller may use software to identify which of the plurality of memory segments in a particular memory bank are to be refreshed during a refresh cycle and which of the plurality of memory segments in the particular memory bank are not to be refreshed during the refresh cycle. For example, as explained above with respect to FIG. 33, software executed by logic circuits (whether conventional logic circuits such as CPUs and GPUs or processing groups on the same substrate as the memory chip, e.g., as depicted in FIG. 7A) may select the at least one memory refresh pattern. Moreover, the refresh controller may access the selected at least one memory refresh pattern to generate corresponding refresh signals during each refresh cycle. The refresh controller may refresh some or all portions within the defined segments that are not accessed during a current cycle according to the at least one memory refresh pattern and may skip other portions of the defined segments that are set for access during the current cycle.

At step 3440, the refresh controller may generate corresponding refresh commands. For example, as depicted in FIG. 33, an adder 3305 may comprise a logic circuit configured to nullify refresh signals for particular segments that are not to be refreshed according to the at least one memory refresh pattern in data storage 3307. Additionally or alternatively, a microprocessor (not shown in FIG. 33) may generate particular refresh signals based on which segments are to be refreshed according to the at least one memory refresh pattern in data storage 3307.

Method 3400 may further include additional steps. For example, in embodiments where the at least one memory refresh pattern is configured to change (e.g., moving from L1, H1, and Inc1 to L2, H2, and Inc2 as shown in FIG. 33) every one, two, or other number of refresh cycles, the refresh controller may access a different portion of the data storage for a next determination of refresh signals according to steps 3430 and 3440. Similarly, if the software executed by logic circuits (whether conventional logic circuits such as CPUs and GPUs or processing groups on the same substrate as the memory chip, e.g., as depicted in FIG. 7A) selects a new memory refresh pattern from the data storage for use in one or more future refresh cycles, the refresh controller may access a different portion of the data storage for a next determination of refresh signals according to steps 3430 and 3440.

Selectable Sized Memory Chins

When designing a memory chip and aiming for a certain capacity of memory, changes in memory capacity to a larger size or a smaller size may require redesign of the product and a redesign of a full mask set. Often, the product design is done in parallel with market research and, in some cases, the product design is completed before the market research is available. Thus, there is the potential for disconnects between product designs and actual demands of the market. The present disclosure proposes a way to flexibly provide a memory chips with memory capacities commensurate with market demands. The design method may include designing dies on a wafer along with appropriate interconnect circuitry such that memory chips that may contain one or more dies can selectively be cut from the wafer in order to provide an opportunity to produce memory chips of variable sized memory capacities from a single wafer.

Figure 35A:
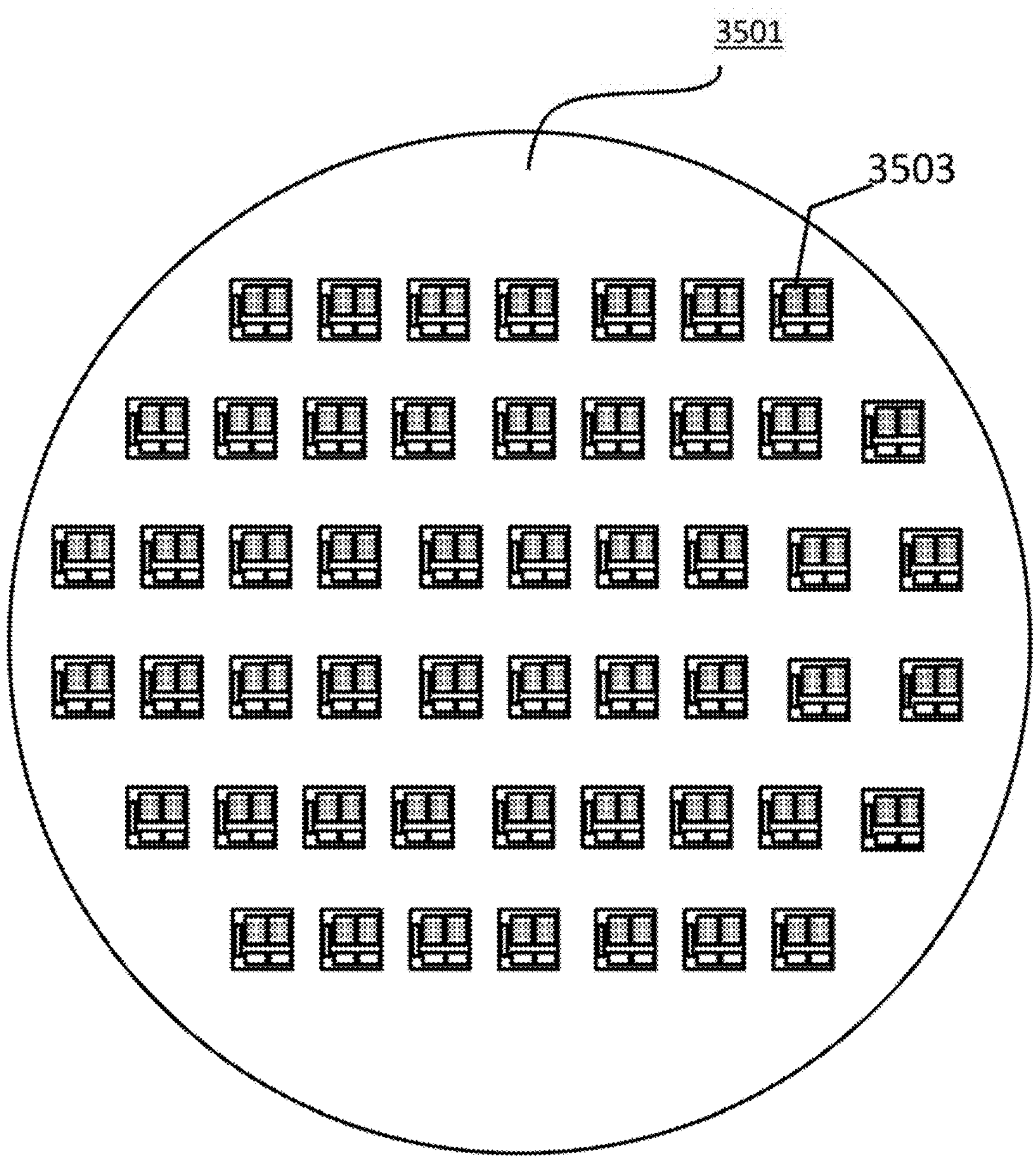
FIG. 35A shows an example wafer, including dies consistent with the present disclosure.

The present disclosure relates to systems and methods for fabricating memory chips by cutting them from a wafer. The method may be used for producing selectable sized memory chips from the wafer. An example embodiment of a wafer 3501 containing dies 3503 is shown in FIG. 35A. Wafer 3501 may be formed from a semiconductor material (e.g., silicon (Si), silicon-germanium (SiGe), silicon on insulator (SOI), gallium nitride (GaN), aluminum nitride (AlN), aluminum gallium nitride (AlGaN), boron nitride (BN), gallium arsenide (GaAs), gallium aluminum arsenide (AlGaAs), indium nitride (InN) combination of thereof, and the like). Dies 3503 may include any suitable circuit elements (e.g., transistors, capacitors, resistors, and/or the like) which may include any suitable semiconductor, dielectric or metallic components. Dies 3503 may be formed from a semiconductor material which may be the same or different as the material of wafer 3501. In addition to dies 3503, wafer 3501 may include other structures and/or circuitry. In some embodiments, one or more coupling circuits may be provided and may couple together one or more of the dies. In an example embodiment, such a coupling circuit may include a bus shared by two or more dies 3503. Additionally, the coupling circuit may include one or more logic circuits designed to control circuitry associated with dies 3503 and/or to direct information to/from dies 3503. In some cases, the coupling circuit may include a memory access management logic. Such logic may translate logical memory addresses into physical addresses associated with dies 3503. It should be noted that the term fabrication, as used herein, may refer collectively to any of the steps for building the disclosed wafers, dies, and/or chips. For example, fabrication may refer to the simultaneous laying out and forming of the various dies (and any other circuitry) included on the wafer. Fabrication may also refer to the cutting of selectable sized memory chips from the wafer to include one die, in some cases, or multiple dies in other cases. Of course, the term fabrication is not intended to be limited to these examples but may include other aspects associated with generation of the disclosed memory chips and any or all of the intermediate structures.

Figure 35B:
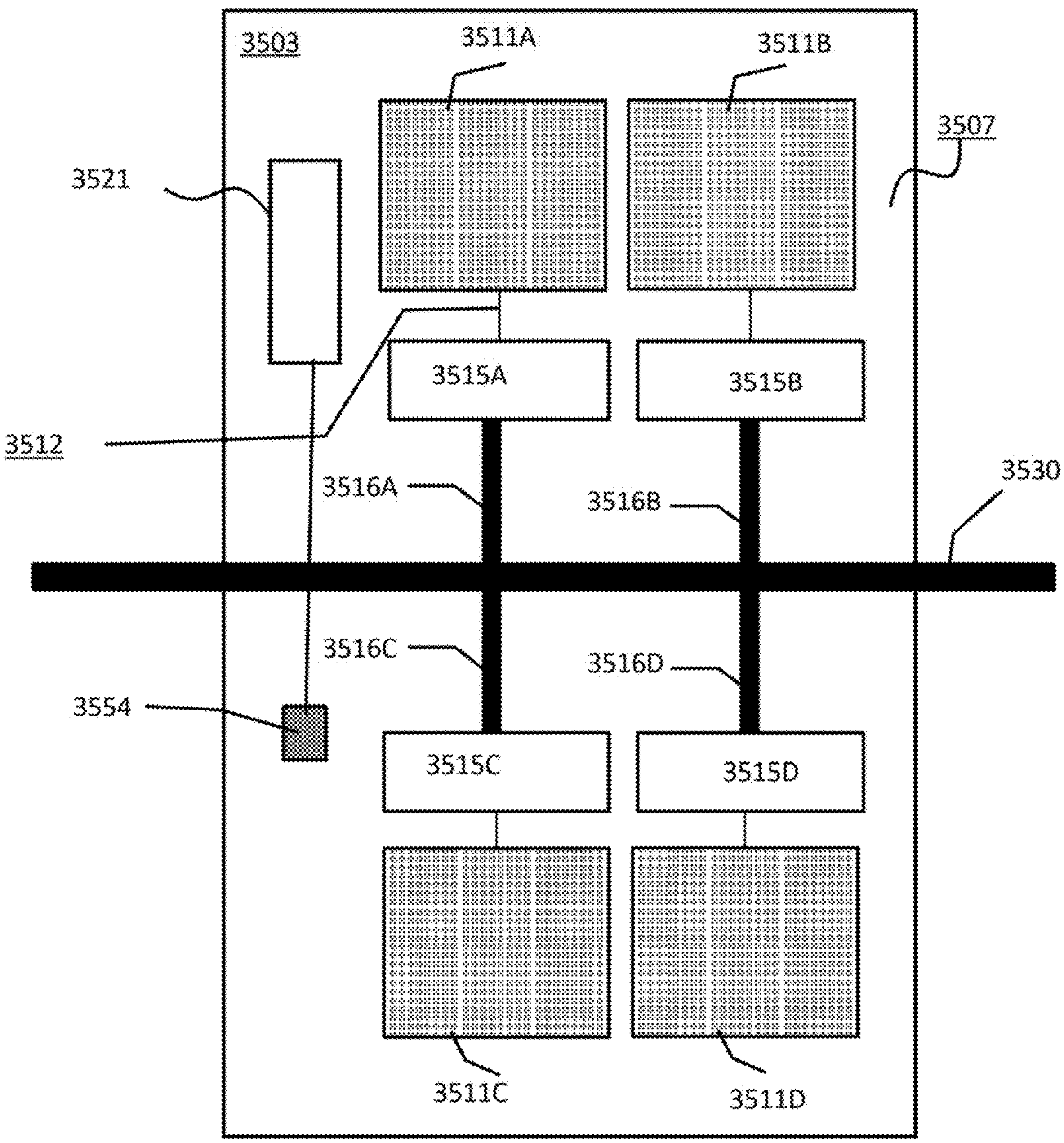
FIG. 35B shows an example memory chip connected to an input/output bus consistent with the present disclosure.

Die 3503 or a group of dies may be used for fabrication of a memory chip. The memory chip may include a distributed processor, as described in other sections of the present disclosure. As shown in FIG. 35B, die 3503 may include a substrate 3507 and a memory array disposed on the substrate. The memory array may include one or more memory units, such as, for example, memory banks 3511A-3511D designed to store data. In various embodiments, memory banks may include semiconductor-based circuit elements such as transistors, capacitors, and the like. In an example embodiment, a memory bank may include multiple rows and columns of storage units. In some cases, such a memory bank may have a capacity greater than one megabyte. The memory banks may include dynamic or static access memory.

Die 3503 may further include a processing array disposed on the substrate, the processing array including a plurality of processor subunits 3515A-3515D, as shown in FIG. 35B. As described above, each memory bank may include a dedicated processor subunit connected by a dedicated bus. For example, processor subunit 3515A is associated with memory bank 3511A via bus or connection 3512. It should be understood that various connections between memory banks 3511A-3511D and processor subunits 3515A-3515D are possible, and only some illustrative connections are shown in FIG. 35B. In an example embodiment, processor subunit may perform read/write operations for an associated memory bank and may further perform refreshing operations or any other suitable operations relative to memory stored in the various memory banks.

As noted, die 3503 may include a first group of buses configured to connect processor subunits with their corresponding memory banks. An example bus may include a set of wires or conductors that connect electrical components and allow transfers of data and addresses to and from each memory bank and its associated processor subunit. In an example embodiment, connection 3512 may serve as a dedicated bus for connecting processor subunit 3515A to memory bank 3511A. Die 3503 may include a group of such buses, each connecting a processor subunit to a corresponding, dedicated memory bank. Additionally, die 3503 may include another group of buses, each connecting processor subunits (e.g., subunits 3515A-3515D) to each other. For example, such buses may include connections 3516A-3516D. In various embodiments data for memory banks 3511A-3511D may be delivered via input-output bus 3530. In an example embodiment, input-output bus 3530 may carry data-related information, and command related information for controlling the operation of memory units of die 3503. Data information may include data for storing in memory banks, data read from memory banks, processing results from one or more of the processor subunits based on operations performed relative to data stored in corresponding memory banks, command related information, various codes, etc.

In various cases, data and commands transmitted by input-output bus 3530 may be controlled by input-output (IO) controller 3521. In an example embodiment, IO controller 3521 may control the flow of data from bus 3530 to and from processor subunits 3515A-3515D. IO controller 3521 may determine from which one of processor subunits 3515A-3515D information is retrieved. In various embodiments, IO controller 3521 may include a fuse 3554 configured to deactivate IO controller 3521. Fuse 3554 may be used if multiple dies are combined together to form a larger memory chip (also referred to as a multi-die memory chip, as an alternative to a single die memory chip that contains only one die). The multi-die memory chip may then use one of the IO controllers of one of the die units forming the multi-die memory chip while disabling other IO controllers related to the other die units by using fuses corresponding to the other IO controllers.

As noted, each memory chip or predecessor die or group of dies may include distributed processors associated with corresponding memory banks. These distributed processors, in some embodiments, may be arranged in a processing array disposed on the same substrate as a plurality of memory banks. Additionally, the processing array may include one or more logic portions each including an address generator (also referred to as address generator unit (AGU)). In some cases, the address generator may be part of at least one processor subunit. The address generator may generate memory addresses required for fetching data from the one or more memory banks associated with the memory chip. Address-generation calculations may involve integer arithmetic operations, such as addition, subtraction, modulo operations, or bit shifts. The address generator may be configured to operate on multiple operands at a time. Furthermore, multiple address generators may perform more than one address-calculation operation simultaneously. In various embodiments, an address generator may be associated with a corresponding memory bank. The address generators may be connected with their corresponding memory banks by means of corresponding bus lines.

In various embodiments, a selectable sized memory chip may be formed from wafer 3501 by selectively cutting different regions of the wafer. As noted, the wafer may include a group of dies 3503, the group including any group of two or more dies (e.g., 2, 3, 4, 5, 10, or more dies) included on the wafer. As will be discussed further below, in some cases, a single memory chip may be formed by cutting a portion of the wafer that includes just one of the dies of the group of dies. In such cases, the resulting memory chip would include memory units associated with one die. In other cases, however, selectable sized memory chips may be formed to include more than one die. Such memory chips may be formed by cutting regions of the wafer that include two or more dies of a group of dies included on the wafer. In such cases, the dies together with a coupling circuit that couples together the dies provide a multi-die memory chip. Some additional circuit elements may also be wired on board between chips, such as, for example, clock elements, data buses or any suitable logic circuits.

In some cases, at least one controller associated with the group of dies may be configured to control the operation of the group of dies as a single memory chip (e.g., a multiple memory unit memory chip). The controller may include one or more circuits that manage the flow of data going to and from the memory chip. A memory controller can be a part of the memory chip, or it can be a part of a separate chip not directly related to the memory chip. In an example embodiment, the controller may be configured to facilitate read and write requests or other commands associated with the distributed processors of the memory chip, and may be configured to control any other suitable aspects of the memory chip (e.g., refreshing the memory chip, interacting with the distributed processors, etc.). In some cases, the controller may be part of die 3503, and in other cases the controller may be laid out adjacent to die 3503. In various embodiments, the controller may also include at least one memory controller of at least one of the memory units included on the memory chip. In some cases, a protocol used for accessing information on a memory chip may be agnostic to duplicate logic and memory units (e.g., memory banks) that may be present on the memory chip. The protocol may be configured to have different IDs or address ranges for adequate access of data on the memory chip. An example of a chip with such protocol may include a chip with a Joint Electron Device Engineering Council (JEDEC) double data rate (DDR) controller where different memory banks may have different address ranges, a serial peripheral interface (SPI) connection, where different memory units (e.g., memory banks) have different identifications (IDs), and the like.

Figure 35C:
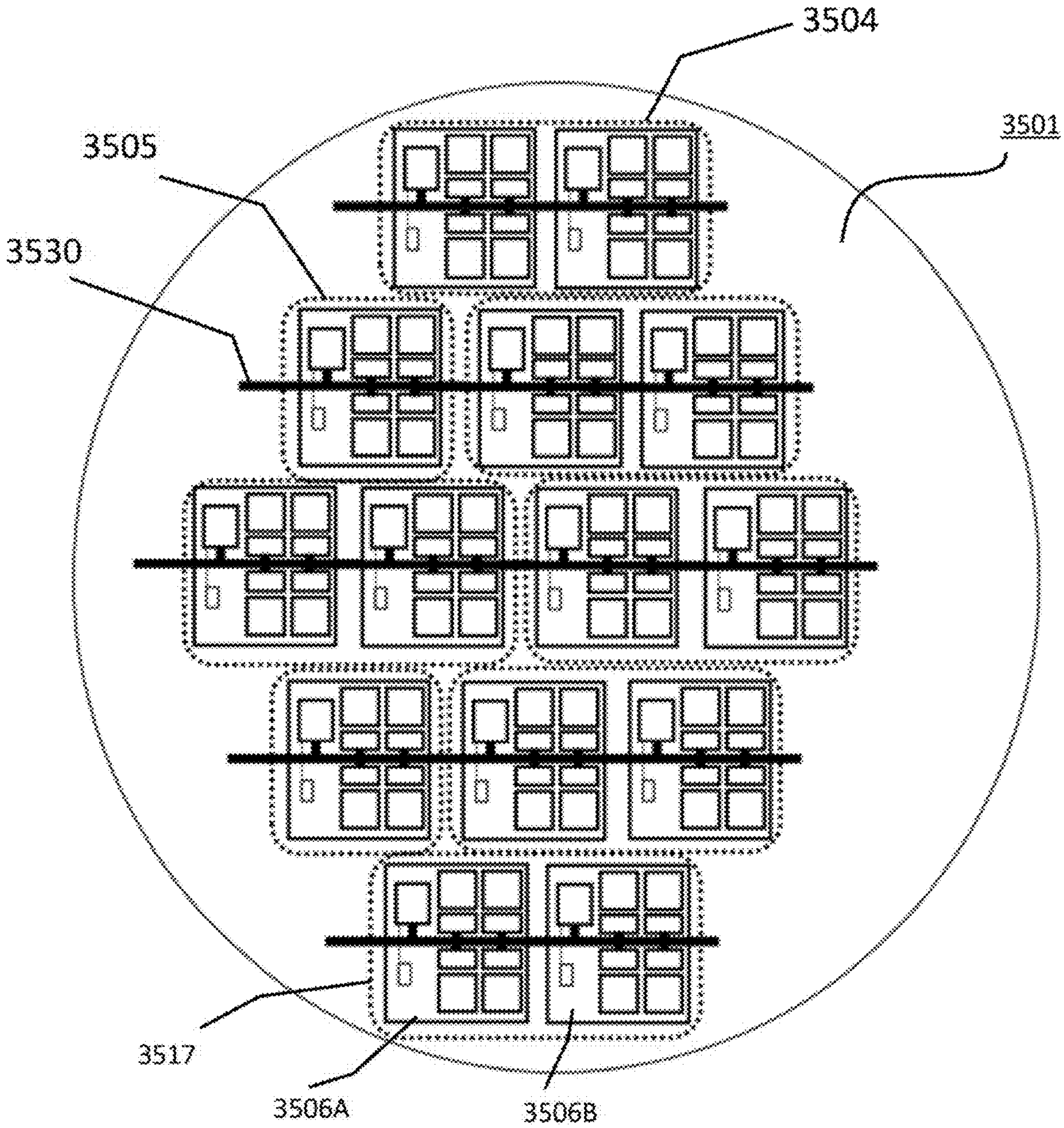
FIG. 35C shows an example wafer including memory chips arranged in rows, and connected to input-output buses consistent with the present disclosure.

In various embodiments, multiple regions may be cut from the wafer, with various regions including one or more dies. In some cases, each separate region may be used to build a multi-die memory chip. In other cases, each region to be cut from the wafer may include a single die to provide a single die memory chip. In some cases, two or more of the regions may have the same shape and have the same number of dies coupled to the coupling circuit in the same way. Alternatively, in some example embodiments, a first group of regions may be used to form a first type of the memory chip, and a second group of regions may be used to form a second type of memory chip. For example, wafer 3501, as shown in FIG. 35C may include a region 3505 that may include a single die, and a second region 3504 may include a group of two dies. When region 3505 is cut from the wafer 3501, a single die memory chip will be provided. When region 3504 is cut from the wafer 3501, a multi-die memory chip will be provided. Groups shown in FIG. 35C are only illustrative, and various other regions and groups of dies may be cut out from wafer 3501.

In various embodiments, dies may be formed on wafer 3501, such that they are arranged along one or more rows of the wafer, as shown, for example, in FIG. 35C. The dies may share input-output bus 3530 corresponding to one or more rows. In an example embodiment, group of dies may be cut out from wafer 3501 using various cutting shapes where, when cutting out a group of dies that may be used to form a memory chip, at least a portion of the shared input-output bus 3530 may be excluded (e.g., only a portion of input-output bus 3530 may be included as a part of the memory chip formed including a group of dies).

Figure 35D:
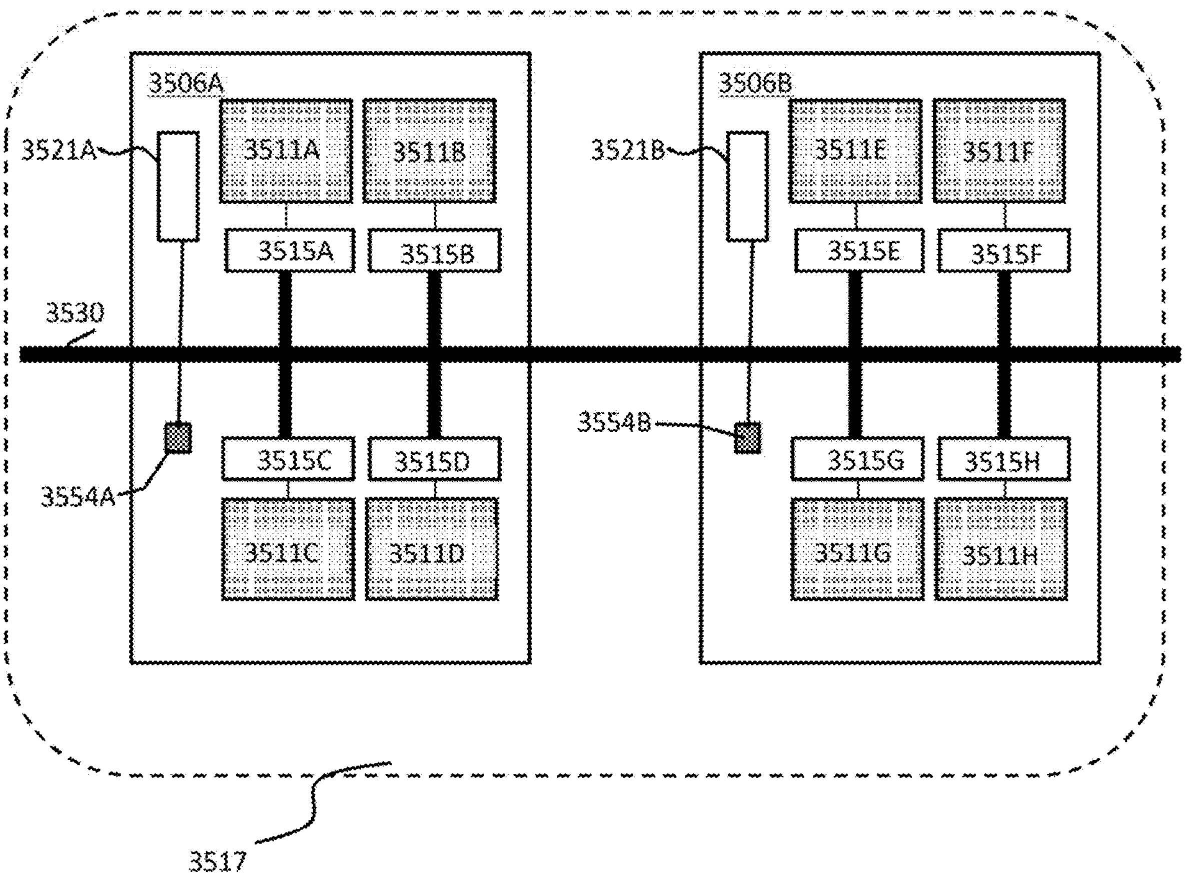
FIG. 35D shows two memory chips forming a group, and connected to input-output buses consistent with the present disclosure.

As previously discussed, when multiple dies (e.g., dies 3506A, and 3506B, as shown in FIG. 35C) are used to form a memory chip 3517, one IO controller corresponding to one of the dies may be enabled and configured to control data flow to all the processor subunits of dies 3506A and 3506B. For example, FIG. 35D shows memory dies 3506A and 3506B combined to form memory chip 3517 that includes memory banks 3511A-3511H, processor subunits 3515A-3515H, IO controllers 3521A, and 3521B and fuses 3554A and 3554B. It should be noted that memory chip 3517 corresponds to a region 3517 of wafer 3501 prior to removal of the memory chip from the wafer. In other words, as used here and elsewhere in the disclosure, regions 3504, 3505, 3517 etc. of wafer 3501 once cut from wafer 3501 will result in memory chips 3504, 3505, 3517, etc. Additionally, fuses herein are also referred to as disabling elements. In an example embodiment, fuse 3554B may be used to deactivate IO controller 3521B, and IO controller 3521A may be used to control data flow to all memory banks 3511A-3511H by communicating data to processor subunits 3515A-3515H. In an example embodiment, IO controller 3521A may be connected to various processor subunits using any suitable connection. In some embodiments, as further described below, processor subunits 3515A-3515H may be interconnected, and IO controller 3521A may be configured to control data flow to processor subunits 3515A-3515H that form processing logic of memory chip 3517.

In an example embodiment, IO controllers, such as controller 3521A and 3521B and corresponding fuses 3554A and 3554B may be formed on wafer 3501 together with the formation of memory banks 3511A-3511H and processor subunits 3515A-3515H. In various embodiments, when forming memory chip 3517, one of the fuses (e.g., fuse 3554B) may be activated such that dies 3506A and 3506B are configured to form memory chip 3517 that functions as a single chip and is controlled by a single input-output controller (e.g., controller 3521A). In an example embodiment, activating a fuse may include applying a current to trigger the fuse. In various embodiment, when more than one die is used for forming a memory chip, all but one IO controller may be deactivated via corresponding fuses.

Figure 35E:
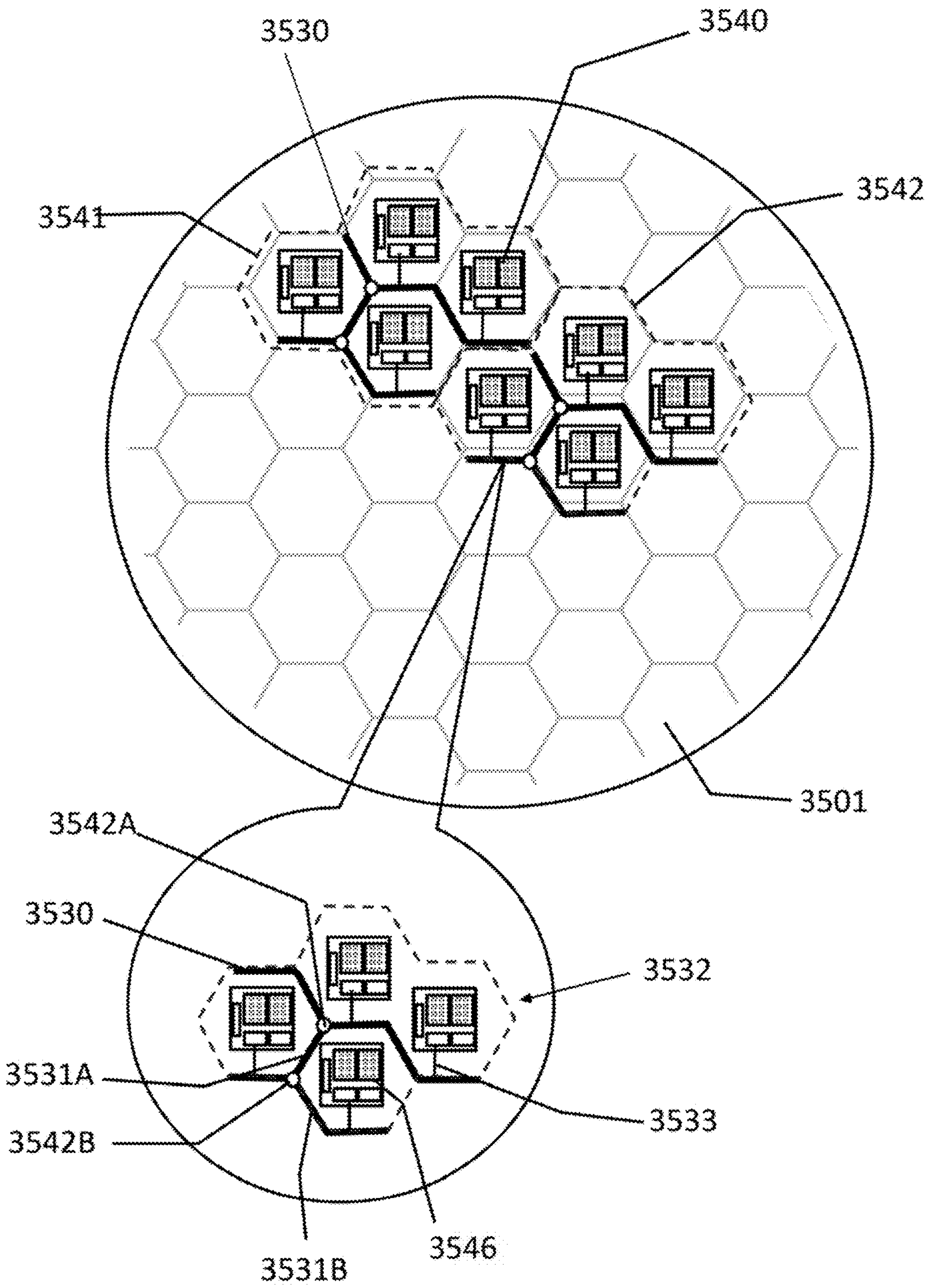
FIG. 35E shows an example wafer, including dies placed in a hexagonal lattice and connected to input-output buses consistent with the present disclosure.

In various embodiments, as shown in FIG. 35C, multiple dies are formed on wafer 3501 together with a set of input-output buses, and/or control buses. An example input-output bus 3530 is shown in FIG. 35C. In an example embodiment, one of the input-output buses (e.g., input-output bus 3530) may be connected to multiple dies. FIG. 35C shows an example embodiment of input-output bus 3530 passing next to dies 3506A and 3506B. Configuration of dies 3506A and 3506B and input-output bus 3530, as shown in FIG. 35C is only illustrative, and various other configurations may be used. For example, FIG. 35E illustrates dies 3540 formed on wafer 3501 and arranged in a hexagonal formation. A memory chip 3532 that includes four dies 3540 may be cut out form wafer 3501. In an example embodiment, memory chip 3532 may include a portion of input-output bus 3530 connected to the four dies by suitable bus lines (e.g., line 3533, as shown in FIG. 35E). In order to route information to appropriate memory unit of memory chip 3532, memory chip 3532 may include input/output controllers 3542A and 3542B placed at branch points for input-output bus 3530. Controllers 3542A and 3542B may receive command data via input-output bus 3530 and select a branch of bus 3530 for transmitting information to an appropriate memory unit. For example, if command data includes read/write information from/to memory units associated with die 3546, controller 3542A may receive command request and transmit data to a branch 3531A, of bus 3530, as shown in FIG. 35D, while controller 35428 may receive command request and transmit data to a branch 3531B. FIG. 35E indicates various cuts of different regions that may be made, where cut lines are represented by dashed lines.

Figure 36A:
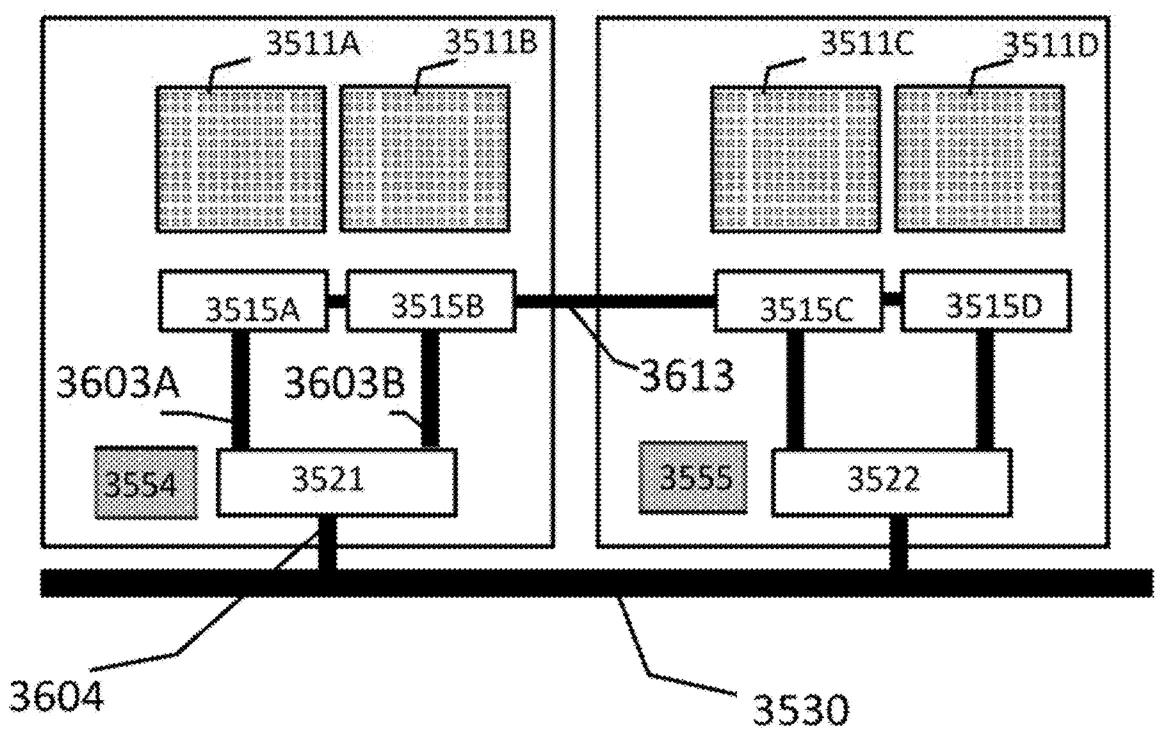
FIGS. 36A-36D show various possible configurations of memory chips connected to an input/output bus consistent with the present disclosure.

In an example embodiment, a group of dies and interconnecting circuitry may be designed for inclusion in a memory chip 3506 as shown in FIG. 36A. Such an embodiment may include processor subunits (for in-memory processing) that may be configured to communicate between one another. For example, each die to be included in memory chip 3506 may include various memory units such as memory banks 3511A-3511D, processor subunits 3515A-3515D, and IO controllers 3521 and 3522. IO controllers 3521 and 3522 may be connected in parallel to input-output bus 3530. IO controller 3521 may have a fuse 3554, and IO controller 3522 may have a fuse 3555. In an example embodiment, processor subunits 3515A-3515D may be connected by means of, for example, bus 3613. In some cases, one of IO controller may be disabled using a corresponding fuse. For instance, IO controller 3522 may be disabled using fuse 3555, and IO controller 3521 may control data flow into memory banks 3511A-3511D via processor subunits 3515A-3515D connected to each other via bus 3613.

Figure 36B:
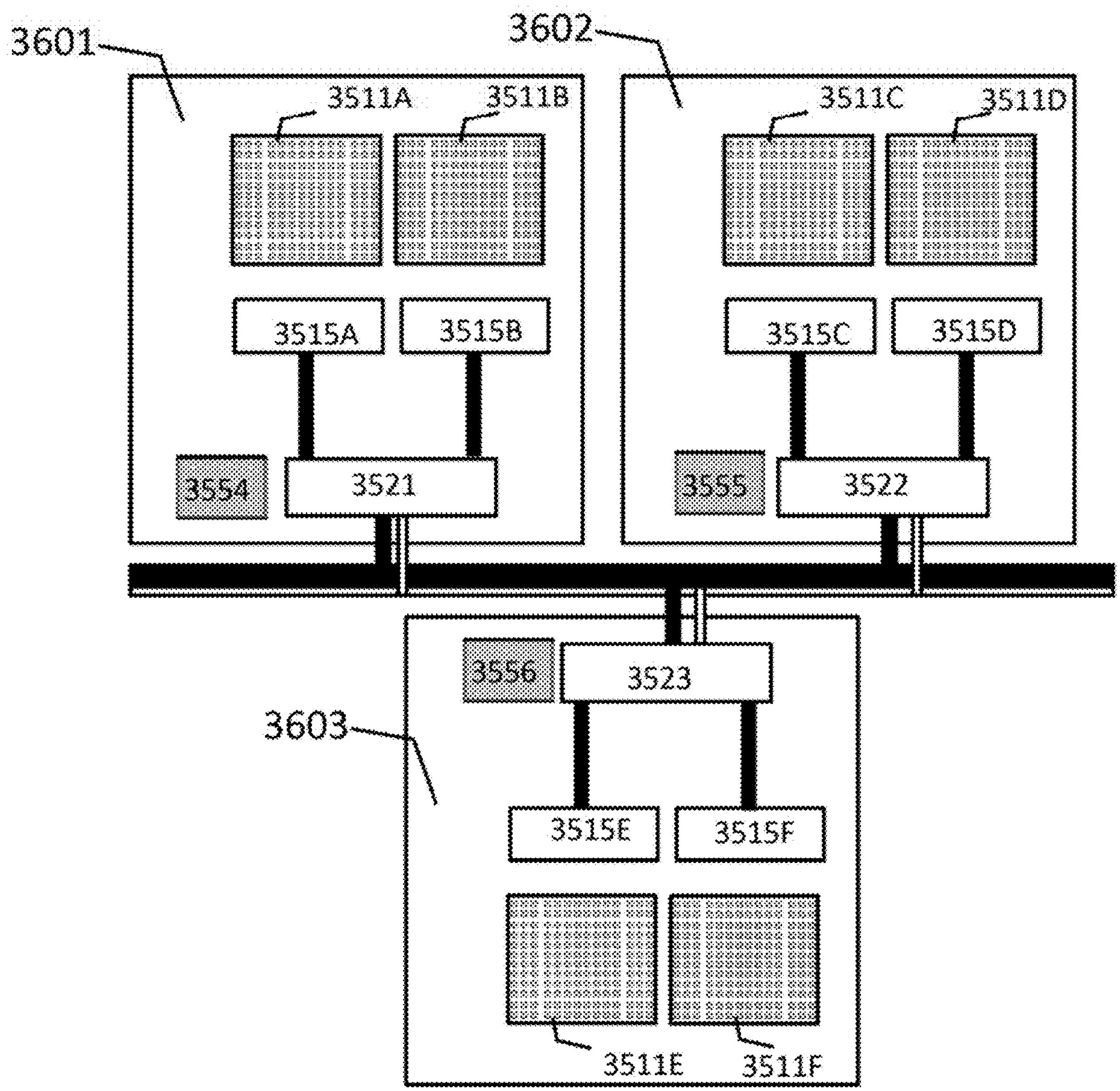
Figure 36C:
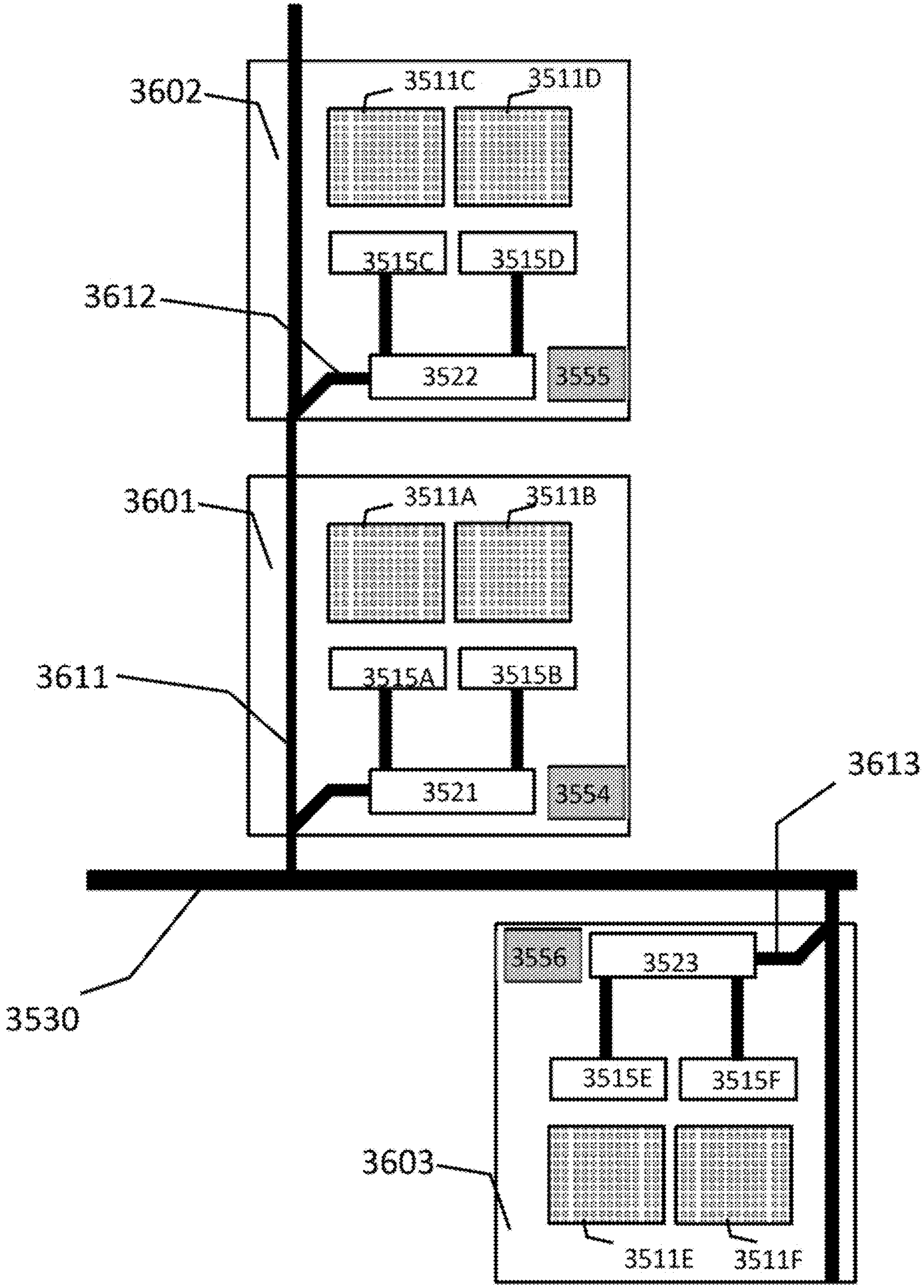
Figure 36D:
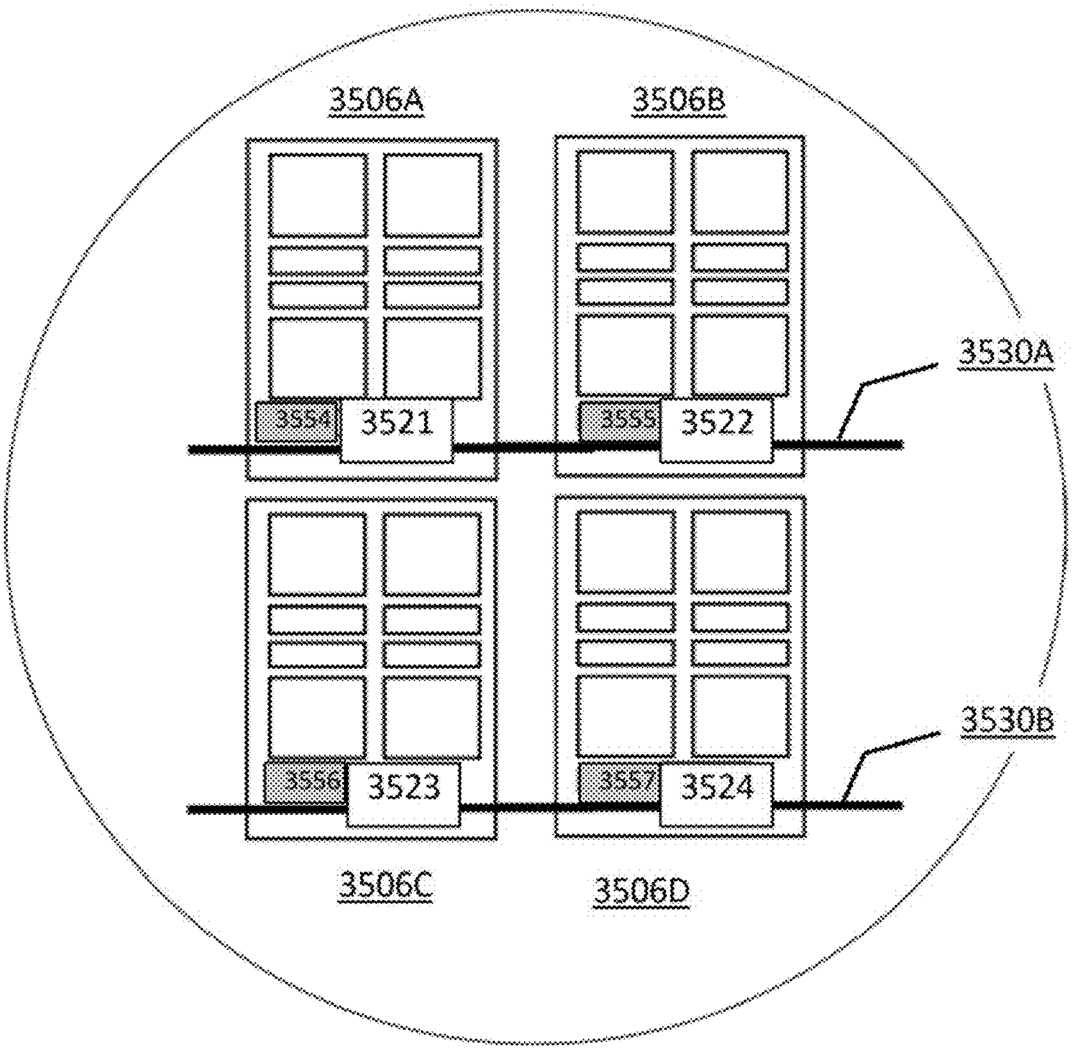

Configuration of memory units, as shown in FIG. 36A is only illustrative, and various other configurations may be formed by cutting different regions of wafer 3501. For example, FIG. 36B shows a configuration with three domains 3601-3603 containing memory units and connected to input-output bus 3530. In an example embodiment, domains 3601-3603 are connected to input-output bus 3530 using IO control modules 3521-3523 that may be disabled by corresponding fuses 3554-3556. Another example of embodiment of arranging domains containing memory units is shown in FIG. 36C where three domains 3601, 3602 and 3603 are connected to input-output bus 3530 using bus lines 3611, 3612 and 3613. FIG. 36D shows, another example embodiment of memory chips 3506A-3506D connected to input-output buses 3530A and 3530B via IO controllers 3521-3524. In an example embodiment, IO controllers may be deactivated using corresponding fuse elements 3554-3557, as shown in FIG. 36D.

Figure 37:
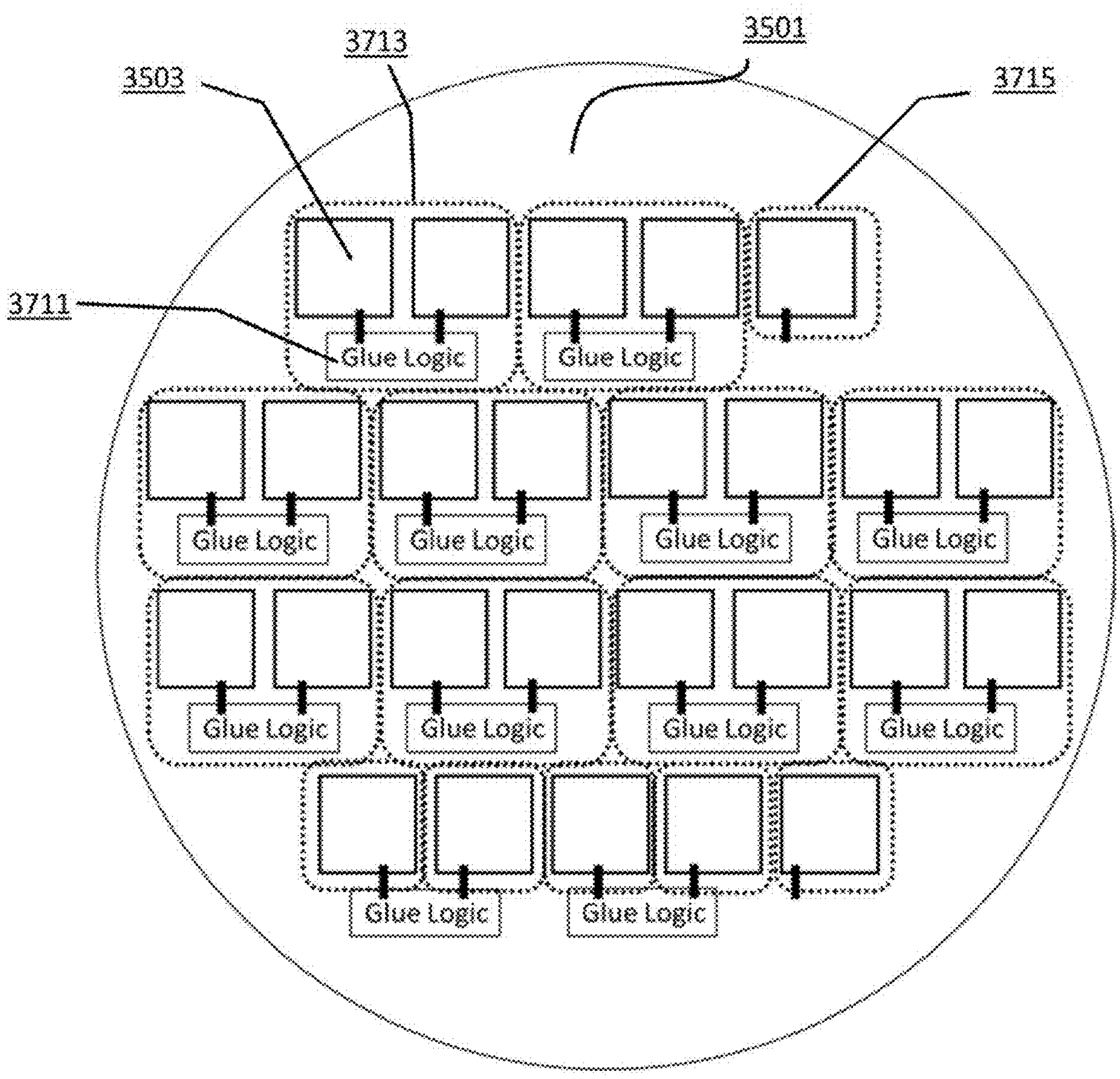
FIG. 37 shows an example grouping of dies sharing a glue logic consistent with the present disclosure.

FIG. 37 shows various groups of dies 3503, such as group 3713 and group 3715 that may include one or more dies 3503. In an example embodiment, in addition to forming dies 3503 on wafer 3501, wafer 3501 may also contain logical circuits 3711 referred to as glue logic 3711. Glue logic 3711 may take some space on wafer 3501 resulting in the fabrication of a fewer number of dies per wafer 3501 as compared to a number of the dies that could have been fabricated without the presence of glue logic 3711. However, the presence of glue logic 3711 may allow multiple dies to be configured to function together as a single memory chip. The glue logic, for example, may connect multiple dies, without having to make configuration changes and without having to designate area inside any of the dies themselves for circuitry that is only used for connecting dies together. In various embodiments, glue logic 3711 provides an interface with other memory controllers, such that multi-die memory chip functions as a single memory chip. Glue logic 3711 may be cut together with a group of dies as shown, for example, by group 3713. Alternatively, if only one die is required for the memory chip, as, for example, for group 3715, glue logic may not be cut. For example, the glue logic may be selectively eliminated where not needed to enable cooperation between different dies. In FIG. 37, various cuts of different regions may be made as shown, for example, by the dashed line regions. In various embodiments, as shown in FIG. 37, one glue logic element 3711 may be laid out on the wafer for every two dies 3506. In some cases, one glue logic element 3711 may be used for any suitable number of dies 3506 forming a group of dies. Glue logic 3711 may be configured to be connected to all the dies from the group of dies. In various embodiments, dies connected to glue logic 3711 may be configured to form a multi-die memory chip and may be configured to form separate single die memory chips when they are not connected to glue logic 3711. In various embodiments, dies connected to glue logic 3711 and designed to function together may be cur out from wafer 3501 as a group and may include glue logic 3711 as indicated, for example, by group 3713. The dies not connected to glue logic 3711 may be cut out from wafer 3501 without including glue logic 3711 as indicated, for example, by group 3715 to form a single die memory chip.

In some embodiments, during manufacturing of multi-die memory chips from wafer 3501, one or more cutting shapes (e.g., shapes forming groups 3713, 3715) may be determined for creating the desired set of the multi-die memory chips. In some cases, as shown by group 3715, the cutting shapes may exclude glue logic 3711.

In various embodiments, glue logic 3711 may be a controller for controlling multiple memory units of a multi-die memory chip. In some cases, glue logic 3711 may include parameters that may be modified by various other controllers. For example, a coupling circuit for multi-die memory chips may include a circuit for configuring parameters of glue logic 3711 or parameters of memory controllers (e.g., processor subunits 3515A-3515D, as shown, for example, in FIG. 35B). Glue logic 3711 may be configured to do a variety of tasks. For example, logic 3711 may be configured to determine which die may need to be addressed. In some cases, logic 3711 may be used to synchronize multiple memory units. In various embodiments, logic 3711 may be configured to control various memory units such that the memory units operate as a single chip. In some cases, amplifiers between input-output bus (e.g., bus 3530, as shown in FIG. 35C) and processor subunits 3515A-3515D may be added to amplify a data signal from bus 3530.

Figure 38A:
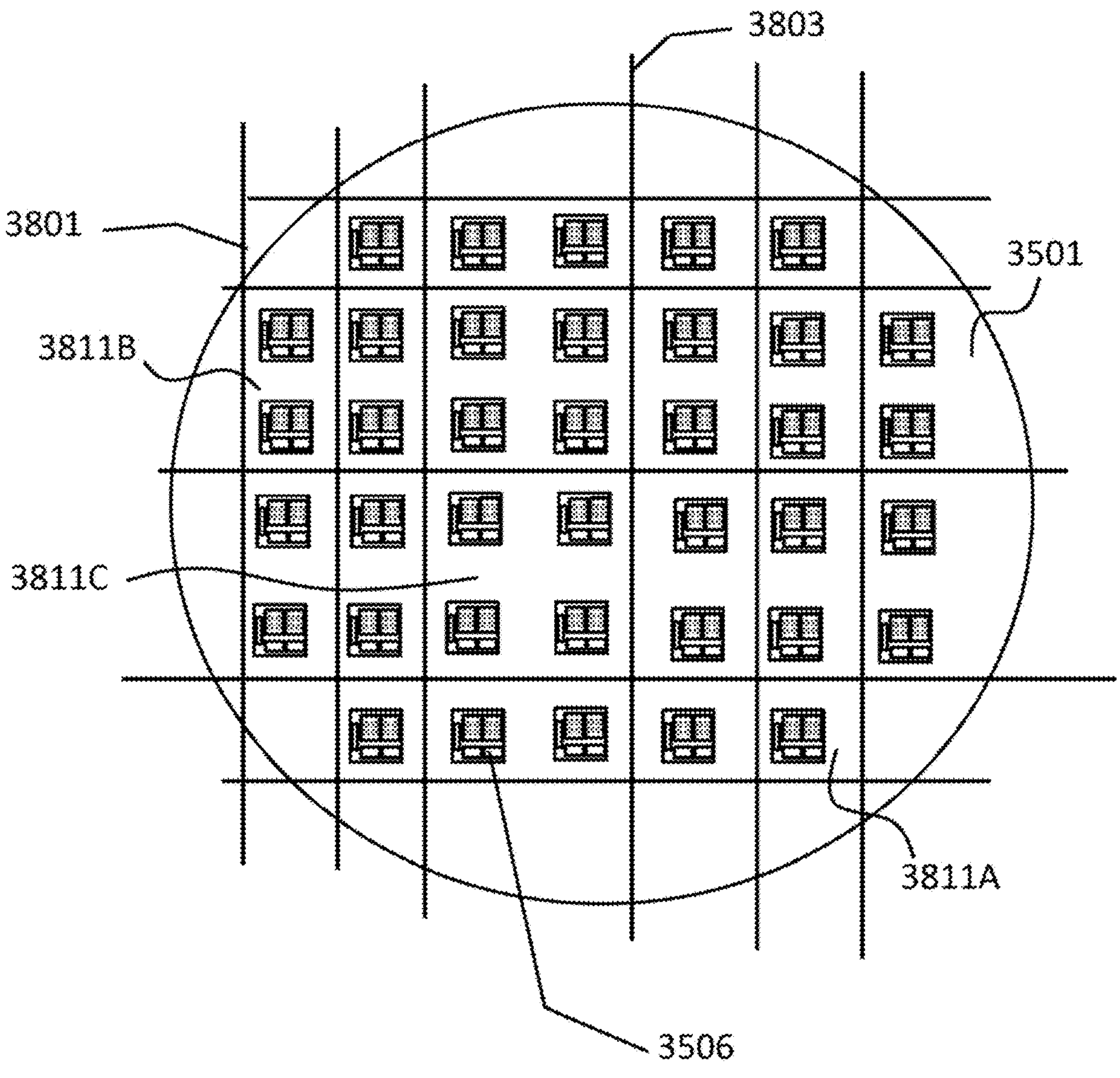
FIGS. 38A-38B show example cuts through a wafer consistent with the present disclosure.
Figure 38B:
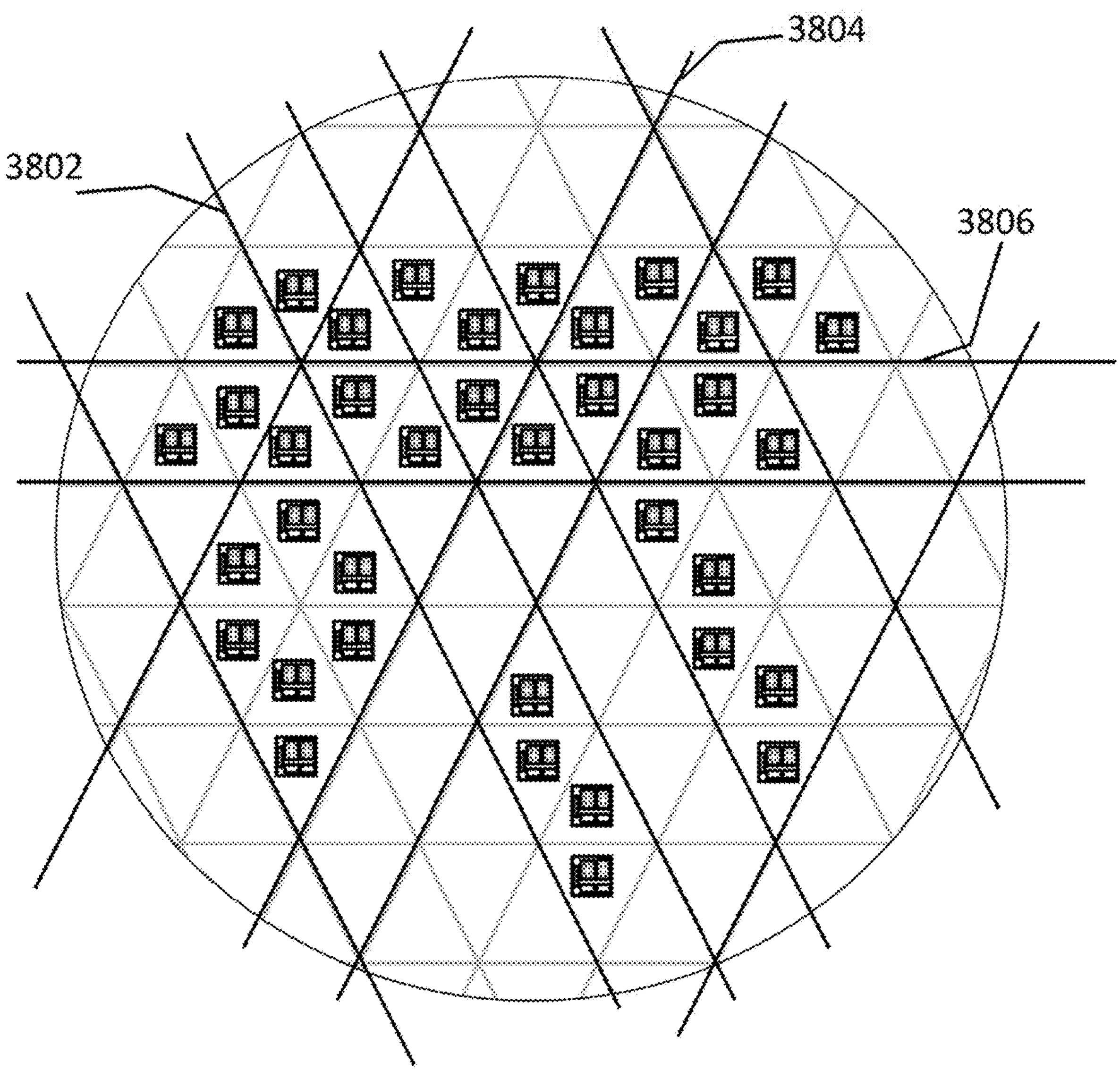

In various embodiments, cutting complex shapes from wafer 3501 may be technologically difficult/expensive, and a simpler cutting approach may be adopted, provided that dies are aligned on wafer 3501. For example, FIG. 38A shows dies 3506 aligned to form a rectangular grid. In an example embodiment, vertical cuts 3803 and horizontal cuts 3801 across entire wafer 3501 may be made to separate cut out groups of dies. In an example embodiment, vertical and horizontal cuts 3803 and 3801 can lead to a group containing a selected number of dies. For instance, cuts 3803 and 3801 can result in regions containing a single die (e.g., region 3811A), regions containing two dies (e.g., region 38111B) and regions containing four dies (e.g., region 3811C). The regions formed by cuts 3801 and 3803 are only illustrative, and any other suitable regions may be formed. In various embodiments, depending on the alignment of dies, various cuts may be made. For instance, if dies are arranged in a triangular grid, as shown in FIG. 38B, cut lines such as lines 3802, 3804, and 3806 may be used to make multi-die memory chips. For example, some regions may include six dies, five dies, four dies, three dies, two dies, one die, or any other suitable number of dies.

Figure 38C:
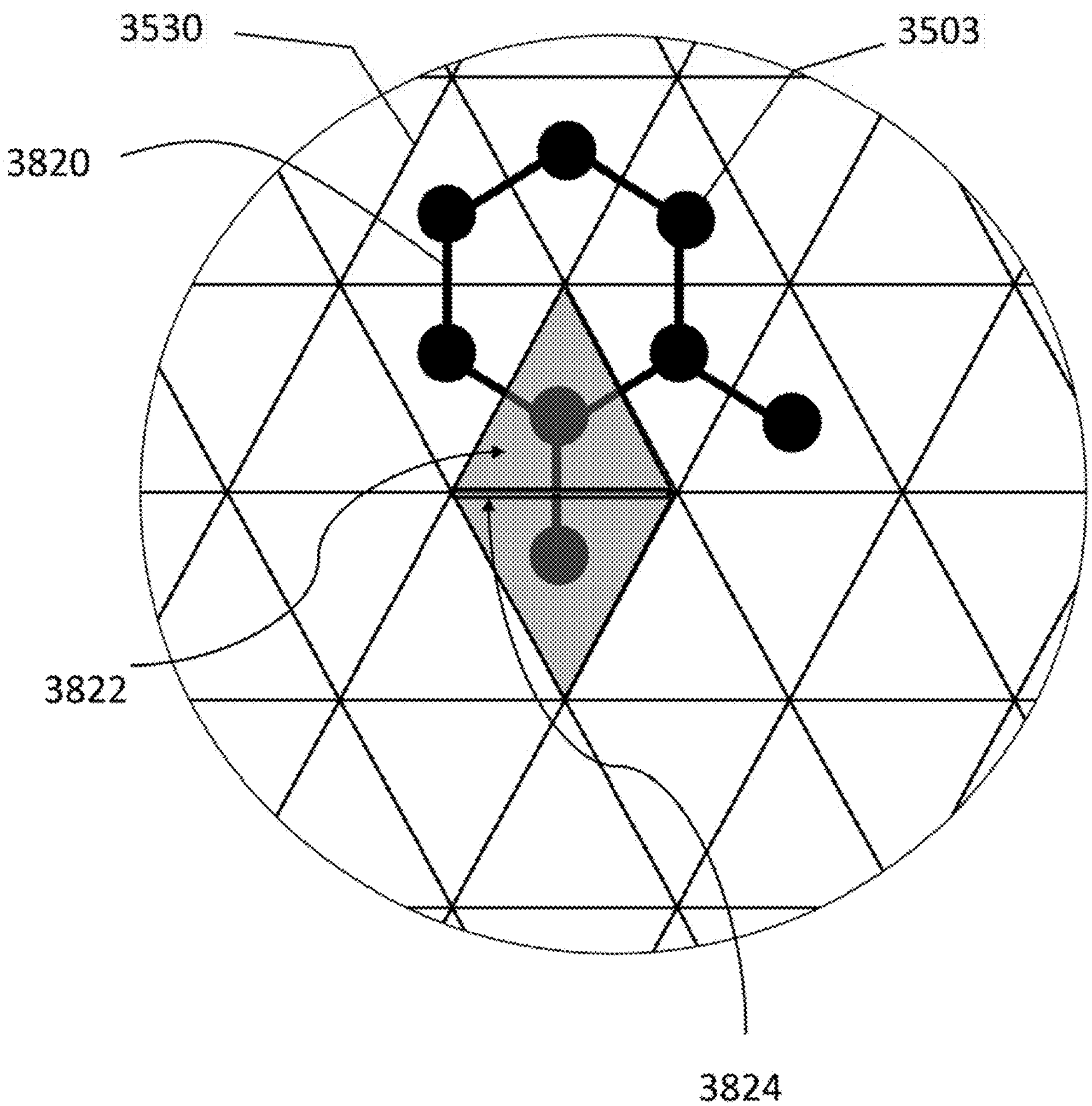
FIG. 38C shows an example arrangement of dies on a wafer and arrangement of input-output buses consistent with the present disclosure.

FIG. 38C shows bus lines 3530 arranged in a triangular grid, with dies 3503 aligned in the centers of triangles formed by intersecting bus lines 3530. Dies 3503 may be connected via bus lines 3820 to all the neighboring bus lines. By cutting a region containing two or more adjacent dies (e.g., region 3822, as shown in FIG. 38C) at least one bus line (e.g., line 3824) remains within region 3822, and bus line 3824 may be used to supply data and commands to a multi-die memory chip formed using region 3822.

Figure 39:
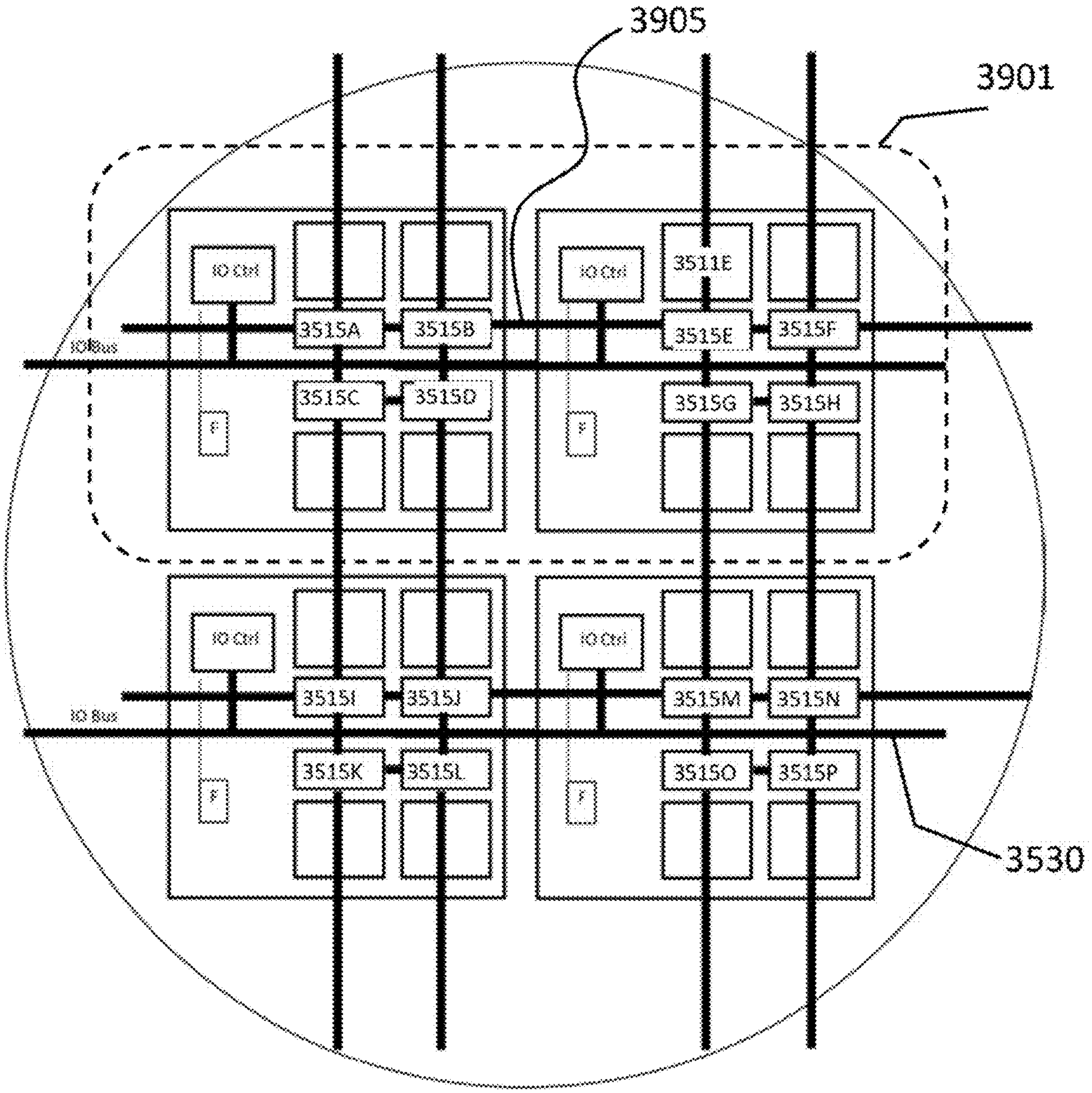
FIG. 39 shows example memory chips on a wafer with interconnected processor subunits consistent with the present disclosure.

FIG. 39 shows that various connections may be formed between processor subunits 3515A-3515P to allow a group of memory units to act as a single memory chip. For instance, a group 3901 of various memory units may include a connection 3905 between processor subunit 3515B and subunit 3515E. Connection 3905 may be used as a bus line for transmitting data and commands to from subunit 3515B to subunit 3515E that can be used to control a respective memory bank 3511E. In various embodiments, connections between processor subunits may be implemented during the formation of dies on wafer 3501. In some cases, additional connections may be fabricated during a packaging stage of a memory chip formed from several dies.

As shown in FIG. 39, processor subunits 3515A-3515P may be connected to each other using various buses (e.g., connection 3905). Connection 3905 may be free of timing hardware logic components such that data transfers between processor subunits and across connection 3905 may not be controlled by timing hardware logic components. In various embodiments, buses connecting processor subunits 3515A-3515P may be laid out on wafer 3501 prior to fabricating various circuits on wafer 3501.

In various embodiments, processor subunits (e.g., subunits 3515A-3515P) may be interconnected. For instance, subunits 3515A-3515P may be connected by suitable buses (e.g., connections 3905). Connections 3905 may be connect any one of subunits 3515A-3515P with any other of the subunits 3515A-3515P. In an example embodiment, connected subunits may be on a same die (e.g., subunits 3515A and 3515B) and in other cases, the connected subunits may be on different dies (e.g., subunits 3515B and 3515E). Connections 3905 may include dedicated buses for connecting subunits and may be configured to efficiently transmit data between subunits 3515A-3515P.

Various aspects of the present disclosure relate to methods for producing selectable sized memory chips from a wafer. In an example embodiment, selectable sized memory chips may be formed from one or more dies. The dies, as noted before, may be arranged along one or more rows, as shown, for example, in FIG. 35C. In some cases, at least one shared input-output bus corresponding to one or more rows may be laid out on wafer 3501. For example, bus 3530 may be laid out, as shown in FIG. 35C. In various embodiments, bus 3530 may be electrically connected to memory units of at least two of the dies, and the connected dies may be used to form a multi-die memory chip. In an example embodiment, one or more controllers (e.g., input-output controllers 3521 and 3522, as shown in FIG. 35B) may be configured to control the at memory units of least two dies that are used to form a multi-die memory chip. In various embodiments, the dies with memory units connected to bus 3530 may be cut off the wafer with at least one corresponding portion of the shared input-output bus (e.g., bus 3530, as shown in FIG. 35B) transmitting information to at least one controller (e.g., controllers 3521, 3522) to configure the controller to control the memory units of the connected dies to function together as a single chip.

In some cases, the memory units located on wafer 3501 may be tested prior to manufacturing memory chips by cutting regions of wafer 3501. The testing may be done using at least one shared input-output bus (e.g., bus 3530, as shown in FIG. 35C). The memory chip may be formed from a group of dies containing memory units when the memory units pass the testing. The memory units that do not pass the testing may be discarded, and not used for manufacturing of a memory chip.

Figure 40:
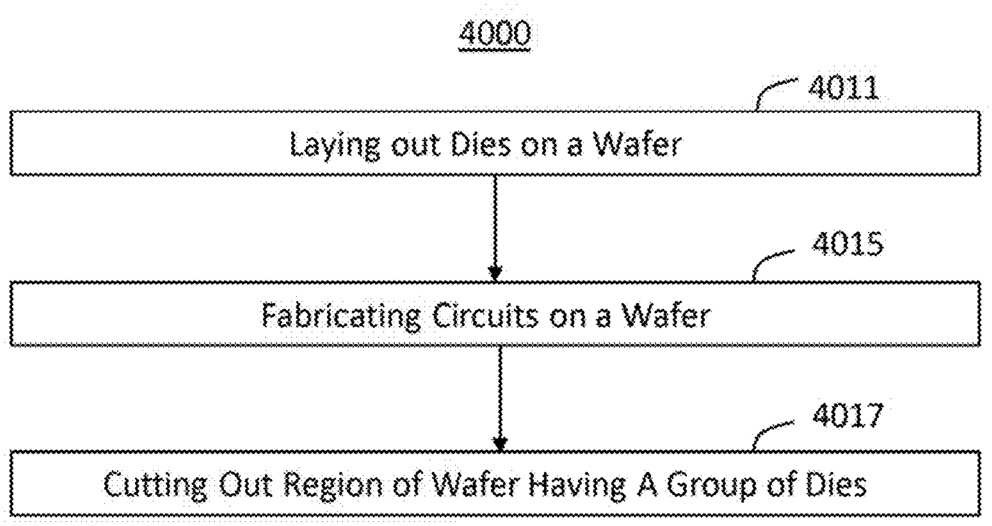
FIG. 40 is an example flowchart of a process of laying out a group of memory chips from a wafer consistent with the present disclosure.

FIG. 40 shows an example process 4000 of building memory chips from a group of dies. At step 4011 of process 4000, the dies may be laid out on semiconductor wafer 3501. At step 4015 the dies may be fabricated on wafer 3501 using any suitable approach. For example, dies may be fabricated by etching wafer 3501, depositing various dielectric, metallic or semiconductor layers, and further etching of the deposited layers, etc. For example, multiple layers may be deposited and etched. In various embodiments, layers may be n-type doped or p-type doped using any suitable doping elements. For instance, semiconductor layers may be n-type doped with phosphorus and may be p-type doped with boron. Dies 3503, as shown in FIG. 35A may be separated from each other by a space that may be used to cut dies 3503 out of wafer 3501. For example, dies 3503 may be spaced apart from each other by spacing regions, where the width of the spacing regions may be selected to allow wafer cuts in the spacing regions.

At step 4017, dies 3503 may be cut out from wafer 3501 using any suitable approach. In an example embodiment dies 3503 may be cut out using a laser. In an example embodiment, wafer 3501 may be scribed first following by mechanical dicing. Alternatively, mechanical dicing saw may be used. In some cases, a stealth dicing process may be used. During dicing, wafer 3501 may be mounted on a dicing tape for holding dies once they are cut out. In various embodiments large cuts may be done, as shown for example in FIG. 38A, by cuts 3801 and 3803 or in FIG. 38B as shown by cuts 3802, 3804, or 3806. Once dies 3503 are cut out individually or in groups, as shown for example by group 3504 in FIG. 35C, dies 3503 may be packaged. Packaging of dies may include forming contacts to dies 3503, depositing protective layers over contacts, attaching heat managing devices (e.g., heatsinks) and encapsulating dies 3503. In various embodiments, depending on how many dies are selected to form a memory chip, appropriate configuration of contacts and buses may be used. In an example embodiment, some of the contacts between different dies forming the memory chip may be made during memory chip packaging.

Figure 41A:
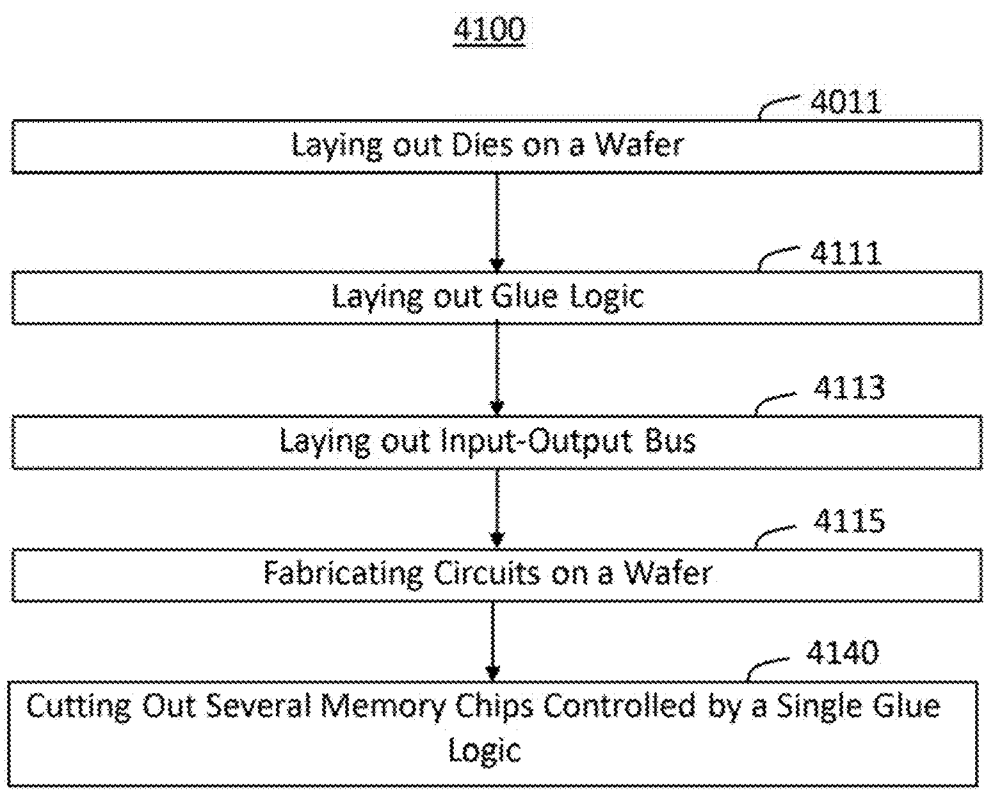
FIG. 41A is another example flowchart of a process of laying out a group of memory chips from a wafer consistent with the present disclosure.

FIG. 41A shows an example process 4100 for manufacturing memory chips containing multiple dies. Step 4011 of process 4100 may be the same as step 4011 of process 4000. At step 4111, glue logic 3711, as shown in FIG. 37 may laid out on wafer 3501. Glue logic 3711 may be any suitable logic for controlling operations of dies 3506, as shown in FIG. 37. As described before, the presence of glue logic 3711 may allow multiple dies to function as a single memory chip. Glue logic 3711 may provide an interface with other memory controllers, such that memory chip formed from multiple dies functions as a single memory chip.

At step 4113 of process 4100, buses (e.g., input-output buses and control buses) may be laid out on wafer 3501. The buses may be laid out such that they are connected with various dies and logic circuits, such as glue logic 3711. In some cases, buses may connect memory units. For example, buses may be configured to connect processor subunits of different dies. At step 4115, dies, glue logic and buses may be fabricated using any suitable approach. For example, logic elements may be fabricated by etching wafer 3501, depositing various dielectric, metallic or semiconductor layers, and further etching of the deposited layers, etc. Buses may be fabricated using, for example, metal evaporation.

Figure 41B:
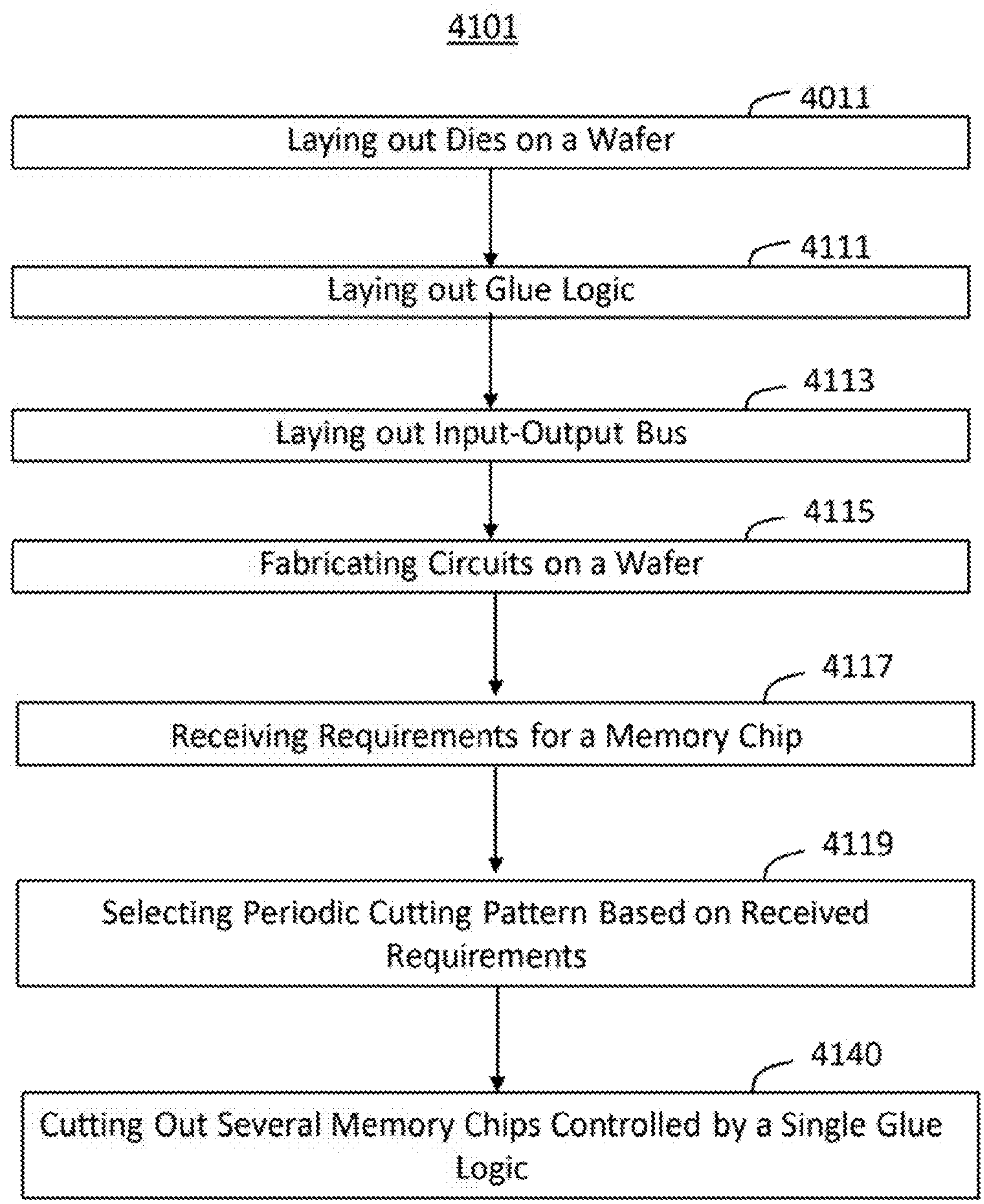
FIGS. 41B-41C are example flowcharts of processes of determining cutting patterns for cutting one or more groups of memory chips from a wafer consistent with the present disclosure.

At step 4140, cutting shapes may be used to cut groups of dies connected to a single glue logic 3711, as shown, for example, in FIG. 37. Cutting shapes may be determined using memory requirements for a memory chip containing multiple dies 3503. For instance, FIG. 41B shows a process 4101, which may be a variant of process 4100, where step 4140 of process 4100 may be preceded by steps 4117 and 4119. At step 4117 a system for cutting wafer 3501 may receive instructions describing requirements for a memory chip. For example, requirements may include forming a memory chip including four dies 3503. In some cases, a program software may determine a periodic pattern for group of dies and glue logic 3711 at step 4119. For instance, a periodic pattern may include two glue logic 3711 elements and four dies 3503 with every two dies connected to one glue logic 3711. Alternatively, at step 4119 the pattern may be provided by a designer of memory chips.

In some cases, the pattern may be selected to maximize a yield of memory chips from wafer 3501. In an example embodiment, memory units of dies 3503 may be tested to identify dies with faulty memory units (such dies are referred to as faulty of failed dies), and based on the location of faulty dies, groups of dies 3503 that contain memory units that pass the test can be identified and an appropriate cutting pattern can be determined. For example, if a large number of dies 3503 fail at edges of wafer 3501, a cutting pattern may be determined to avoid dies at the edges of wafer 3501. Other steps of process 4101, such as steps 4011, 4111, 4113, 4115, and 4140 may be the same as the same numbered steps of process 4100.

Figure 41C:
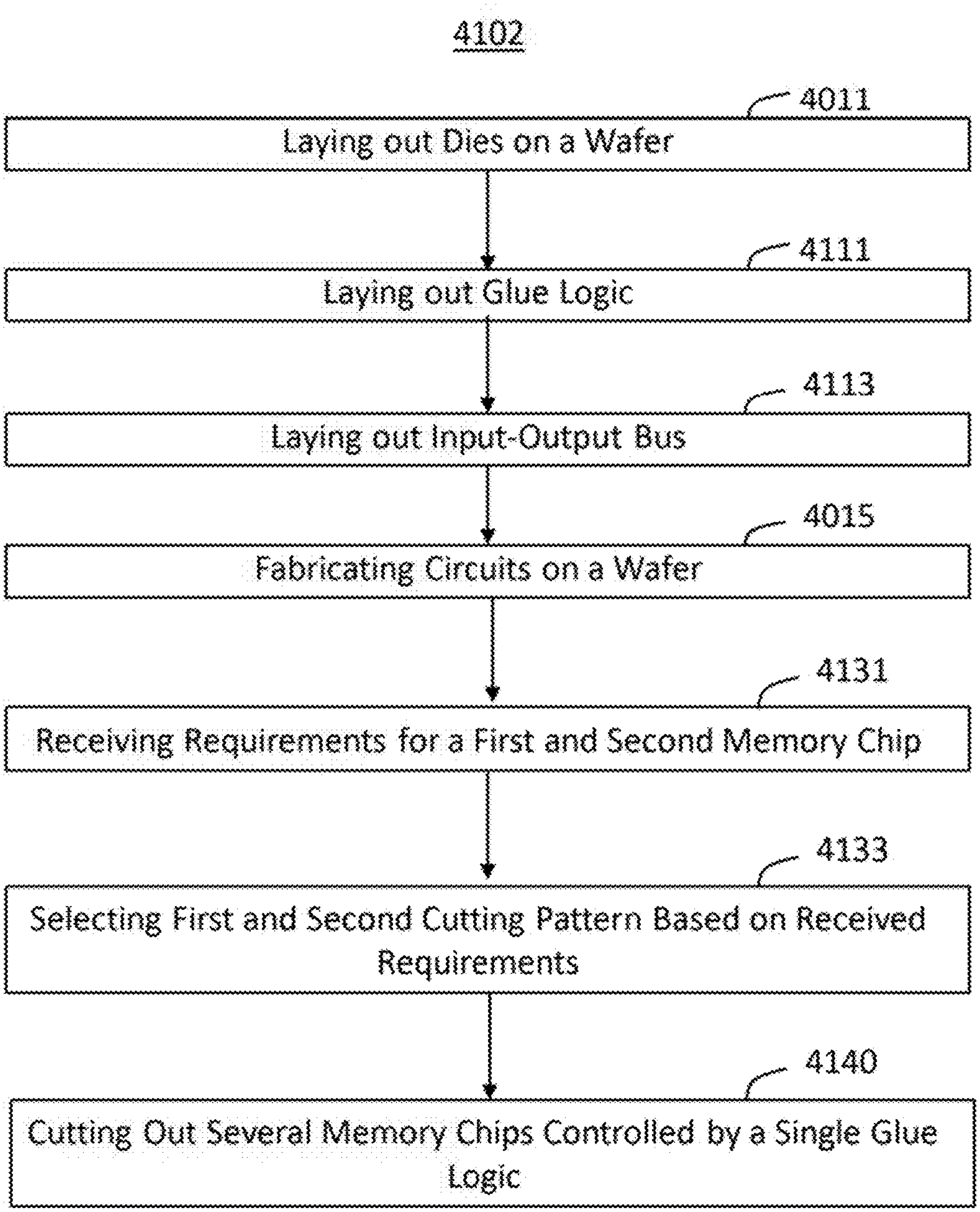

FIG. 41C shows an example process 4102 that may be a variation of process 4101. Steps 4011, 4111, 4113, 4115, and 4140 of process 4102 may be the same as the same numbered steps of process 4101, step 4131 of process 4102 may substitute step 4117 of process 4101, and step 4133 of process 4102 may substitute step 4119 of process 4101. At step 4131, a system for cutting wafer 3501 may receive instructions describing requirements for a first set of memory chips and a second set of memory chips. For example, requirements may include forming the first set of memory chip with memory chips consisting of four dies 3503, and forming a second set of memory chip with memory chips consisting of two dies 3503. In some cases, more than two sets of memory chips may need to be formed from wafer 3501. For instance, a third set of memory chips may include memory chips consisting of only one die 3503. In some cases, at step 4133, a program software may determine a periodic pattern for a group of dies and glue logic 3711 for forming memory chips for each set of memory chips. For instance, a first set of memory chips may include memory chips containing two glue logic 3711 and four dies 3503 with every two dies connected to one glue logic 3711. In various embodiments, glue logic units 3711 for the same memory chip may be linked together to act as a single glue logic. For example, during fabrication of glue logic 3711 appropriate bus lines may be formed linking glue logic units 3711 with one another.

The second set of memory chips may include memory chips containing one glue logic 3711 and two dies 3503 with dies 3503 connected to glue logic 3711. In some cases, when a third set of memory chips is selected, and when it includes a memory chip consisting of a single die 3503, no glue logic 3711 may be needed for these memory chips.

Dual Port Functionality

When designing memory chips or memory instances within a chip, one important characteristic is the number of words that can be accessed simultaneously during a single clock cycle. The more addresses (e.g., addresses along rows, also called words or word lines, and columns, also called bits or bitlines) that can be accessed at the same time for reading and/or writing, the faster the memory chip. While there has been some activity in developing memories that include multi-way ports that allow access to multiple addresses at the same time, e.g., for building register files, cashes, or shared memories, most instances use a memory mat that is larger in size and that supports the multiple address accesses. However, DRAM chips usually include a single bit line and a single row line connected to each capacitor of each memory cell. Accordingly, embodiments of the present disclosure seek to provide multi-port access on existing DRAM chips without modifying this conventional single-port memory structure of DRAM arrays.

Embodiments of the present disclosure may clock memory instances or chips at twice the speed of logic circuits using the memory. Any logic circuits using the memory may therefore "correspond" to the memory and any components thereof. Accordingly, embodiments of the present disclosure may retrieve or write to two addresses in two memory array clock cycles, which are equivalent to a single processing clock cycle for the logic circuits. The logic circuits may comprise circuits such as controllers, accelerators, GPUs, or CPUs or may comprise processing groups on the same substrate as the memory chip, e.g., as depicted in FIG. 7A. As explained above with respect to FIG. 3A, a "processing group" may refer to two or more processor subunits and their corresponding memory banks on a substrate. The group may represent a spatial distribution on the substrate and/or a logical grouping for the purposes of compiling code for execution on memory chip 2800. Accordingly, as described above with respect to FIG. 7A, a substrate with the memory chip may include a memory array with a plurality of banks, such as banks 2801*a* and other banks shown in FIG. 28. Furthermore, the substrate may also include a processing array that may include a plurality of processor subunits (such as subunits 730*a*, 730*b*, 730*c*, 730*d*, 730*e*, 730*f*, 730*g*, and 730*h* shown in FIG. 7A).

Accordingly, embodiments of the present disclosure may retrieve data from the array at each one of two consecutive memory cycles in order handle two addresses for each logic cycle and provide the logic with two results as though the single-port memory array were a two-port memory chip. Additional clocking may allow for memory chips of the present disclosure to function as though the single-port arrays are a two-port memory instance, a three-port memory instance, a four-port memory instance, or any other multi-port memory instance.

Figure 42:
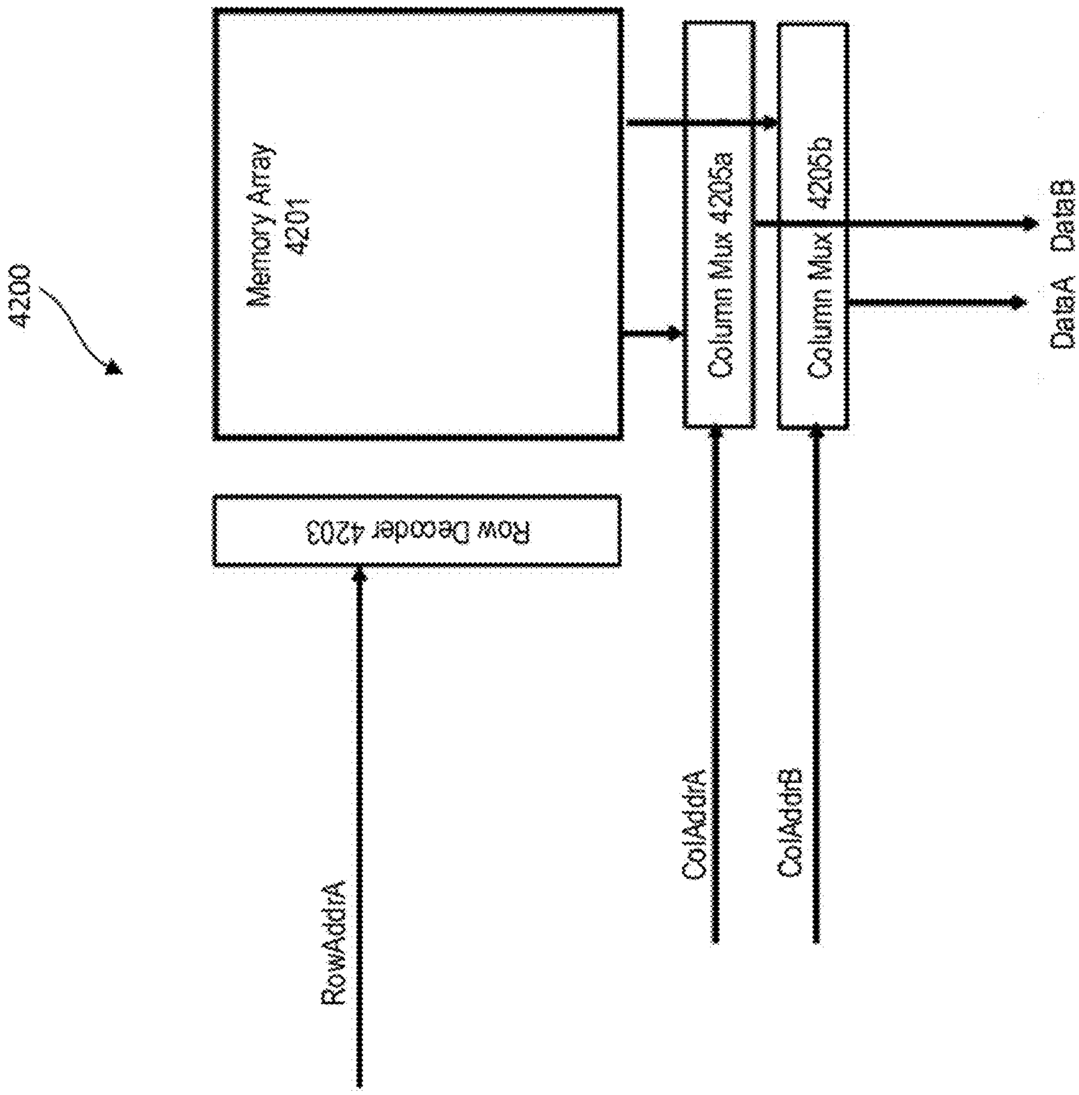
FIG. 42 shows an example of circuitry within a memory chip providing dual-port access along columns, consistent with the present disclosure.

FIG. 42 depicts example circuitry 4200 providing dual-port access along columns of a memory chip in which circuitry 4200 is used, consistent with the present disclosure. The embodiment depicted in FIG. 42 may use one memory array 4201 with two column multiplexers ("muxes") 4205*a* and 4205*b* to access two words on the same row during a same clock cycle for a logic circuit. For example, during a memory clock cycle, RowAddrA is used in row decoder 4203, and ColAddrA is used in multiplexer 4205*a* to buffer data from a memory cell with address (RowAddrA, ColAddrA). During the same memory clock cycle, ColAddrB is used in multiplexer 4205*b* to buffer data from a memory cell with address (RowAddrA, ColAddrB). Thus, circuitry 4200 may allow for dual-port access to data (e.g., DataA and DataB) stored on memory cells at two different addresses along the same row or word line. Thus, the two addresses may sham a row such that the row decoder 4203 activates the same word line for both retrievals. Moreover, embodiments like the example depicted in FIG. 42 may use column muxes such that two addresses may be accessed during a same memory clock cycle.

Figure 43:
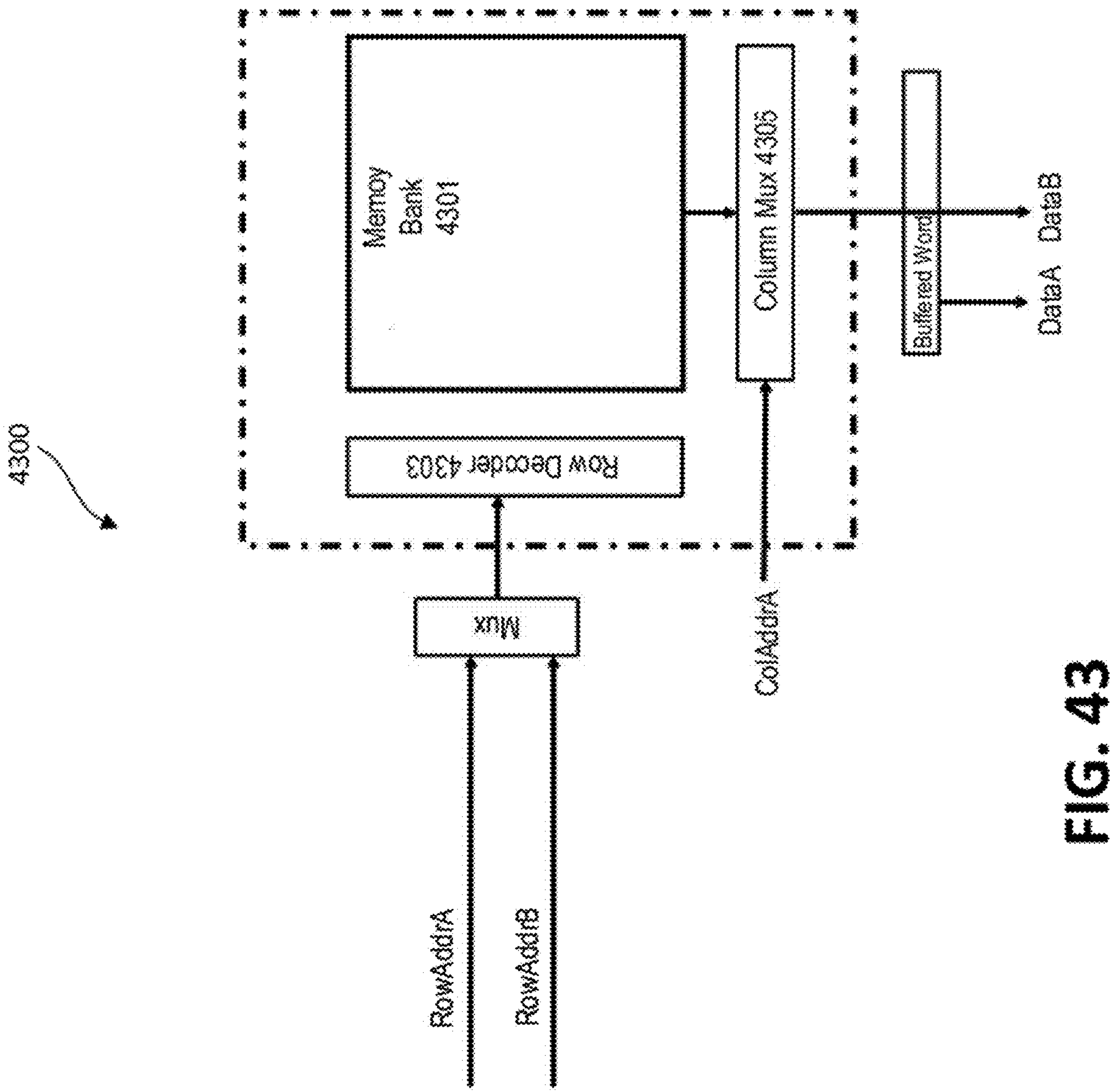
FIG. 43 shows an example of circuitry within a memory chip providing dual-port access along rows, consistent with the present disclosure.

Similarly, FIG. 43 depicts example circuitry 4300 providing dual-port access along rows of a memory chip in which circuitry 4300 is used, consistent with the present disclosure. The embodiment depicted in FIG. 43 may use one memory array 4301 with a row decoder 4303 coupled with a multiplexer ("mux") to access two words on the same column during a same clock cycle for a logic circuit. For example, on the first of two memory clock cycles, RowAddrA is used in row decoder 4303, and ColAddrA is used in column multiplexer 4305 to buffer data (e.g., to the "Buffered Word" buffer of FIG. 43) from a memory cell with address (RowAddrA, ColAddrA). On the second of two memory clock cycles, RowAddrB is used in row decoder 4303, and ColAddrA is used in column multiplexer 4305 to buffer data from a memory cell with address (RowAddrB, ColAddrA). Thus, circuitry 4300 may allow for dual-port access to data (e.g., DataA and DataB) stored on memory cells at two different addresses along the same column or bitline. Thus, the two addresses may share a row such that the column decoder (which may be separate from or combined with one or more column multiplexers, as depicted in FIG. 43) activates the same bitline for both retrievals. Embodiments like the example depicted in FIG. 43 may use two memory clock cycles because row decoder 4303 may need one memory clock cycle to activate each word line. Accordingly, a memory chip using circuitry 4300 may function as a dual-port memory if clocked at least twice as fast as a corresponding logic circuit.

Accordingly, as explained above, FIG. 43 may retrieve DataA and DataB during two memory clock cycles, which is faster than a clock cycle for a corresponding logic circuit. For example, the row decoder (e.g., row decoder 4303 of FIG. 43) and the column decoder (which may be separate from or combined with one or more column multiplexers, as depicted in FIG. 43) may be configured to be clocked at a rate at least twice a rate of a corresponding logic circuit generating the two addresses. For example, a clock circuit for circuitry 4300 (not shown in FIG. 43) may clock circuitry 4300 according to a rate at least twice a rate of a corresponding logic circuit generating the two addresses.

The embodiment of FIGS. 42 and 43 may be used separately or combined. Accordingly, circuitry (e.g., circuitry 4200 or 4300) providing dual-port functionality on a single-port memory array or mat may comprise a plurality of memory banks arranged along at least one row and at least one column. The plurality of memory banks are depicted as memory array 4201 in FIG. 42 and as memory array 4301 in FIG. 43. The embodiments may further use at least one row multiplexer (as depicted in FIG. 43) or at least one column multiplexer (as depicted in FIG. 42) configured to receive, during a single clock cycle, two addresses for reading or writing. Moreover, the embodiments may use a row decoder (e.g., row decoder 4203 of FIG. 42 and row decoder 4303 of FIG. 43) and a column decoder (which may be separate from or combined with one or more column multiplexers, as depicted in FIGS. 42 and 43) to read from or write to the two addresses. For example, the row decoder and column decoder may, during a first cycle, retrieve a first of the two addresses from the at least one row multiplexer or the at least one column multiplexer and decode a word line and a bitline corresponding to the first address. Moreover, the row decoder and column decoder may, during a second cycle, retrieve a second of the two addresses from the at least one row multiplexer or the at least one column multiplexer and decode a word line and a bitline corresponding to the second address. The retrievals may each comprise activating a word line corresponding to an address using the row decoder and activating a bit line on the activated word line corresponding to the address using the column decoder.

Although described above for retrievals, the embodiments of FIGS. 42 and 43, whether implemented separately or in combination, may include write commands. For example, during the first cycle, the row decoder and column decoder may write first data retrieved from the at least one row multiplexer or the at least one column multiplexer to the first of the two addresses. Moreover, during the second cycle, the row decoder and column decoder may write second data retrieved from the at least one row multiplexer or the at least one column multiplexer to the second of the two addresses.

The example of FIG. 42 shows this process when the first and second addresses share a word line address while the example of FIG. 43 shows this process when the first and second addresses share a column address. As described further with respect to FIG. 47 below, the same process may be implemented when the first and second address do not share either a word line address or a column address.

Figure 44:
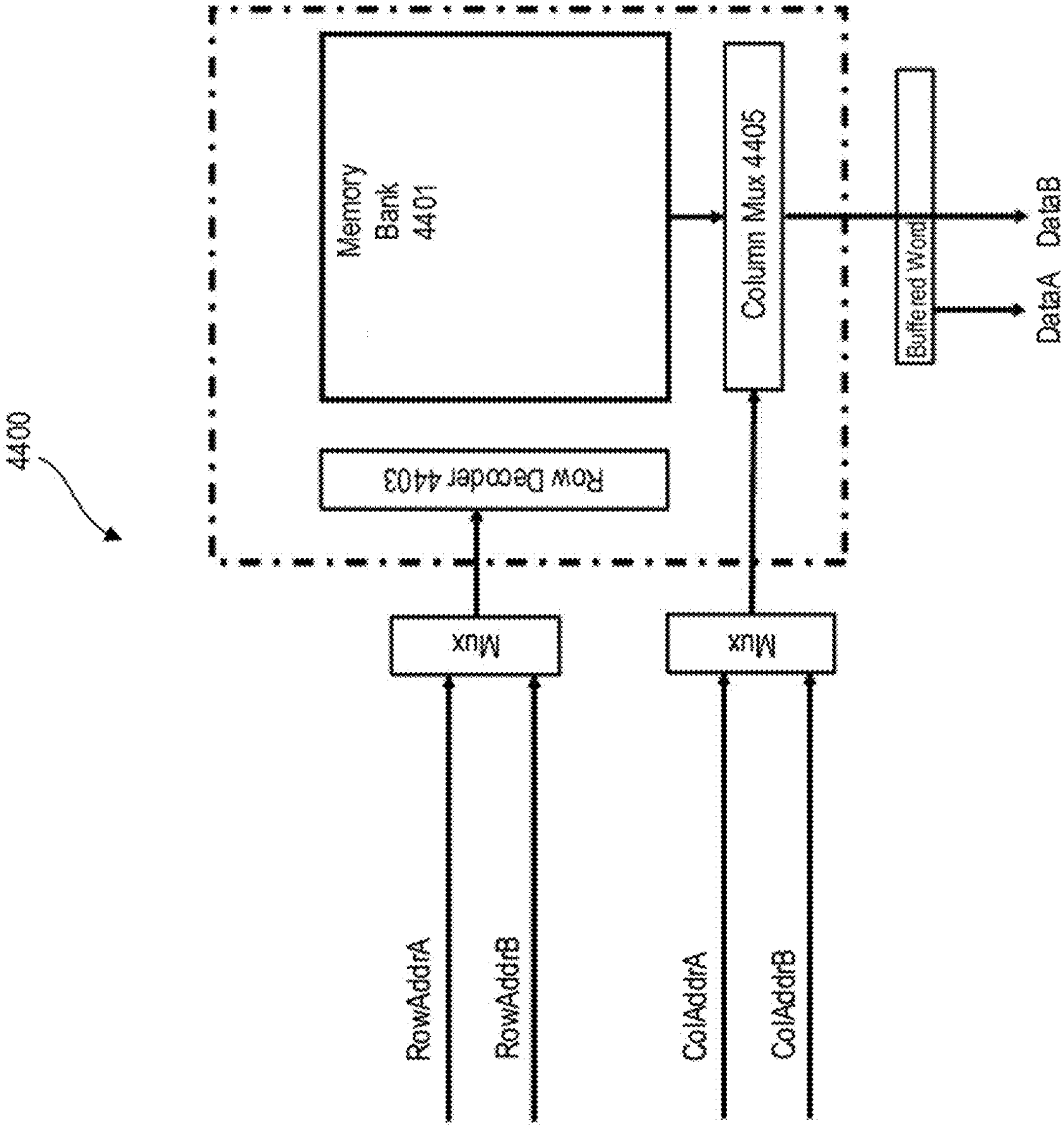
FIG. 44 shows an example of circuitry within a memory chip providing dual-port access along both rows and columns, consistent with the present disclosure.

Accordingly, although the examples above provide dual-port access along at least one of rows or columns, additional embodiments may provide dual-port access along both rows and columns. FIG. 44 depicts example circuitry 4400 providing dual-port access along both rows and columns of a memory chip in which circuitry 4400 is used, consistent with the present disclosure. Accordingly, circuitry 4700 may represent a combination of circuitry 4200 of FIG. 42 with circuitry 4300 of FIG. 43.

The embodiment depicted in FIG. 44 may use one memory array 4401 with a row decoder 4403 coupled with a multiplexer ("mux") to access two rows during a same clock cycle for a logic circuit. Moreover, the embodiment depicted in FIG. 44 may use memory array 4401 with a column decoder (or multiplexer) 4405 coupled with a multiplexer ("mux") to access two columns during the same clock cycle. For example, on the first of two memory clock cycles, RowAddrA is used in row decoder 4403, and ColAddrA is used in column multiplexer 4405 to buffer data (e.g., to the "Buffered Word" buffer of FIG. 44) from a memory cell with address (RowAddrA, ColAddrA). On the second of two memory clock cycles, RowAddrB is used in row decoder 4403, and ColAddrB is used in column multiplexer 4405 to buffer data from a memory cell with address (RowAddrB, ColAddrB). Thus, circuitry 4400 may allow for dual-port access to data (e.g., DataA and DataB) stored on memory cells at two different addresses. Embodiments like the example depicted in FIG. 44 may use the additional buffer because row decoder 4403 may need one memory clock cycle to activate each word line. Accordingly, a memory chip using circuitry 4400 may function as a dual-port memory if clocked at least twice as fast as a corresponding logic circuit.

Although not depicted in FIG. 44, circuitry 440) may further include the additional circuitry of FIG. 46 (described further below) along the rows or word lines and/or similar additional circuitry along the columns or bitlines. Accordingly, circuitry 4400 may activate corresponding circuitry (e.g., by opening one or more switching elements, such as one or more of switching elements 4613*a*, 4613*b*, and the like of FIG. 46) to activate disconnected portions including the addresses (e.g., by connecting voltages or allowing current to flow to the disconnected portions). Accordingly, the circuitry may "correspond" when elements of the circuitry (such as lines or the like) include locations identified the addresses and/or when elements of the circuitry (such as the switching elements) control a supply or voltage and/or a flow of current to memory cells identified by the addresses. Circuitry 4400 may then use row decoder 4403 and column multiplexer 4405 to decode corresponding word lines and bitlines to retrieve data from or write data to the addresses, which are located in the activated disconnected portions.

As further depicted in FIG. 44, circuitry 4400 may further use at least one row multiplexer (depicted separate from row decoder 4403 but may be incorporate therein) and/or at least one column multiplexer (e.g., depicted separate from column multiplexer 4405 but may be incorporate therein) configured to receive, during a single clock cycle, two addresses for reading or writing. Accordingly, the embodiments may use a row decoder (e.g., row decoder 4403) and a column decoder (which may be separate from or combined with column multiplexer 4405) to read from or write to the two addresses. For example, the row decoder and column decoder may, during a memory clock cycle, retrieve a first of the two addresses from the at least one row multiplexer or the at least one column multiplexer and decode a word line and a bitline corresponding to the first address. Moreover, the row decoder and column decoder may, during the same memory cycle, retrieve a second of the two addresses from the at least one row multiplexer or the at least one column multiplexer and decode a word line and a bitline corresponding to the second address.

Figure 45A:
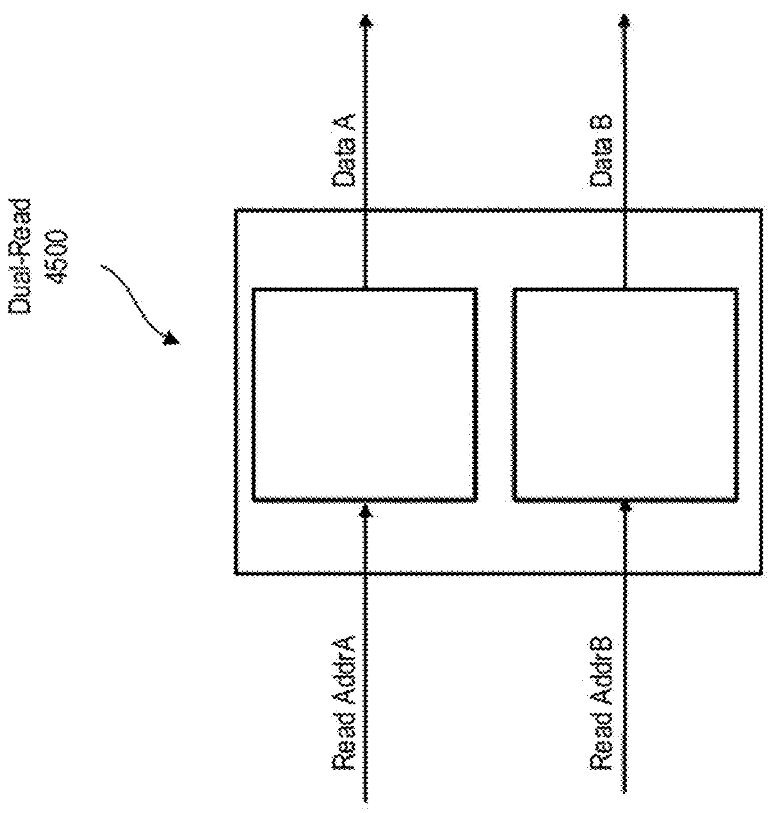
FIG. 45A shows a dual-read using duplicated memory arrays or mars.
Figure 45B:
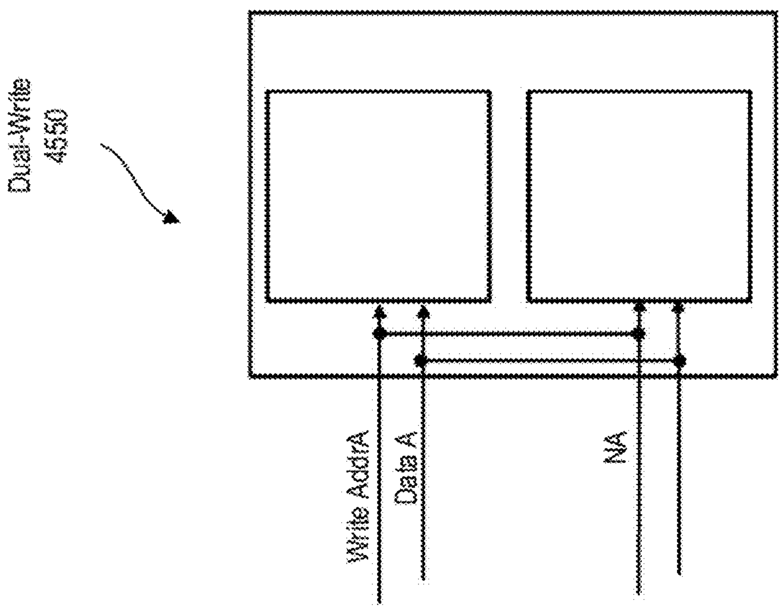
FIG. 45B shows a dual-write using duplicated memory arrays or mats.

FIGS. 45A and 45B depict existing duplication techniques for providing dual-port functionality on a single-port memory array or mat. As shown in FIG. 45A, dual-port reading may be provided by keeping duplicate copies of data in sync across memory arrays or mats. Accordingly, reading may be performed from both copies of the memory instance, as depicted in FIG. 45A. Moreover, as shown in FIG. 45B, dual-port writing may be provided by duplicating all writes across the memory arrays or mats. For example, the memory chip may require that logic circuits using the memory chip send write commands in duplicate, one for each duplicate copy of the data. Alternatively, in some embodiments, as shown in FIG. 45A, additional circuitry may allow for the logic circuits using the memory instance to send single write commands that are automatically duplicated by the additional circuitry to generate duplicate copies of the written data across the memory arrays or mats in order to keep the copies in sync. The embodiments of FIGS. 42, 43, and 44 may reduce the redundancy from these existing duplication techniques either by using multiplexers to access two bitlines in a single memory clock cycle (e.g., as depicted in FIG. 42) and/or by clocking the memory faster than a corresponding logic circuit (e.g., as depicted in FIGS. 43 and 44) and providing additional multiplexers to handle additional addresses rather than duplicating all data in the memory.

In addition to the faster clocking and/or additional multiplexers described above, embodiments of the present disclosure may use circuitry that disconnects the bitlines and/or word lines at some points within the memory array. Such embodiments may allow for multiple simultaneous access to the array as long as the row and column decoders access different locations that are not coupled to the same portions of the disconnect circuitry. For example, locations with different word lines and bitlines may be accessed simultaneously because the disconnecting circuitry may allow the row and column decodes to access the different addresses without electrical interference. The granularity of the disconnected regions within the memory array may be weighed against the additional area required by the disconnect circuitry during design of the memory chip.

Figure 46:
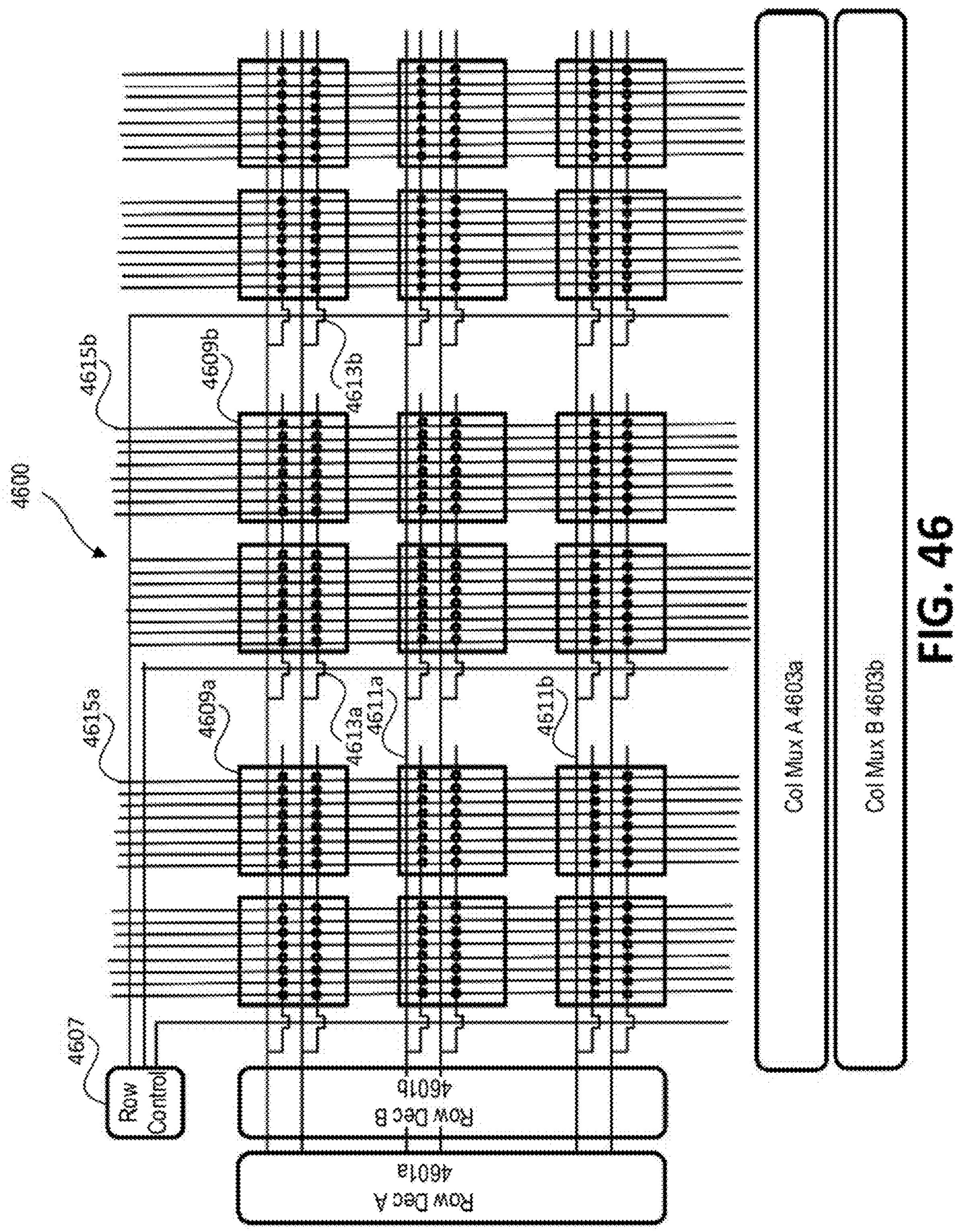
FIG. 46 shows an example of circuitry within a memory chip with switching elements for dual-port access along rows, consistent with the present disclosure.

An architecture for implementing such simultaneous access is depicted in FIG. 46. In particular, FIG. 46 depicts example circuitry 4600 providing dual-port functionality on a single-port memory array or mat. As depicted in FIG. 46, circuitry 4600 may include a plurality of memory mats (e.g., memory mat 4609*a*, mat 4609*b*, and the like) arranged along at least one row and at least one column. The layout of circuitry 4600 further includes a plurality of word lines, such as word lines 4611*a* and 4611*b* corresponding to rows and bitlines 4615*a* and 4615*b* corresponding to columns.

The example of FIG. 46 includes twelve memory mats, each with two lines and eight columns. In other embodiments, the substrate may include any number of memory mats, and each memory mat may include any number of lines and any number of columns. Some memory mats may include a same number of lines and columns (as shown in FIG. 46) while other memory mats may include different numbers of lines and/or columns.

Although not depicted in FIG. 46, circuitry 4600 may further use at least one row multiplexer (either separate from or incorporated with row decoder 4601*a* and/or 4601*b*) or at least one column multiplexer (e.g., column multiplexer 4603*a* and/or 4603*b*) configured to receive, during a single clock cycle, two (or three or any plurality of) addresses for reading or writing. Moreover, the embodiments may use a row decoder (e.g., row decoder 4601*a* and/or 4601*b*) and a column decoder (which may be separate from or combined with column multiplexer 4603*a* and/or 4603*b*) to read from or write to the two (or more) addresses. For example, the row decoder and column decoder may, during a memory clock cycle, retrieve a first of the two addresses from the at least one row multiplexer or the at least one column multiplexer and decode a word line and a bitline corresponding to the first address. Moreover, the row decoder and column decoder may, during the same memory cycle, retrieve a second of the two addresses from the at least one row multiplexer or the at least one column multiplexer and decode a word line and a bitline corresponding to the second address. As explained above, as long as the two addresses are in different locations that are not coupled to the same portions of the disconnect circuitry (e.g., switching elements such as 4613a, 4613b, and the like), the access may occur during the same memory clock cycle. Additionally, circuitry 4600 may access a first two addresses simultaneously during a first memory clock cycle and then a second two addresses simultaneously during a second memory clock cycle. In such embodiments, a memory chip using circuitry 4600 may function as a four-port memory if clocked at least twice as fast as a corresponding logic circuit.

FIG. 46 further includes at least one row circuit and at least one column circuit configured to function as switches. For example, corresponding switching elements such as 4613a, 4613b, and the like may comprise transistors or any other electrical element configured to allow or stop current to flow and/or connect or disconnect voltages from the word line or bitline connected to switching elements such as 4613a, 4613b, and the like. Thus, the corresponding switching elements may divide circuitry 4600 into disconnected portions. Although depicted as comprising single rows and sixteen columns of each row, the disconnected regions within the circuitry 4600 may include differing levels of granularity depending on design of the circuitry 4600.

Circuitry 4600 may use a controller (e.g., row control 4607) to activate corresponding ones of the at least one row circuit and the at least one column circuit in order to activate corresponding disconnected regions during the address operations described above. For example, circuitry 4600 may transmit one or more control signals to close corresponding ones of the switching elements (e.g., switching elements 4613a, 4613b, and the like). In embodiments where switching elements 4613a, 4613b, and the like comprises transistors, the control signals may comprise voltages to open the transistors.

Depending on the disconnected regions including the addresses, more than one of the switching elements may be activated by circuitry 4600. For example, to reach an address within memory mat 4609b of FIG. 46, the switching element allowing access to memory mat 4609a must be opened as well as the switching element allowing access to memory mat 4609b. Row control 4607 may determine the switching elements to activate in order to retrieve a particular address within circuitry 4600 according to the particular address.

FIG. 46 represents an example of circuitry 4600 used to divide word lines of a memory array (e.g., comprising memory mat 4609a, mat 4609b, and the like). However, other embodiments may use similar circuitry (e.g., switching elements dividing memory chip 4600 into disconnected regions) to divide bitlines of the memory array. Accordingly, the architecture of circuitry 4600 may be used in dual-column access like that depicted in FIG. 42 or FIG. 44 as well as dual-row access like that depicted in FIG. 43 or FIG. 44.

Figure 47A:
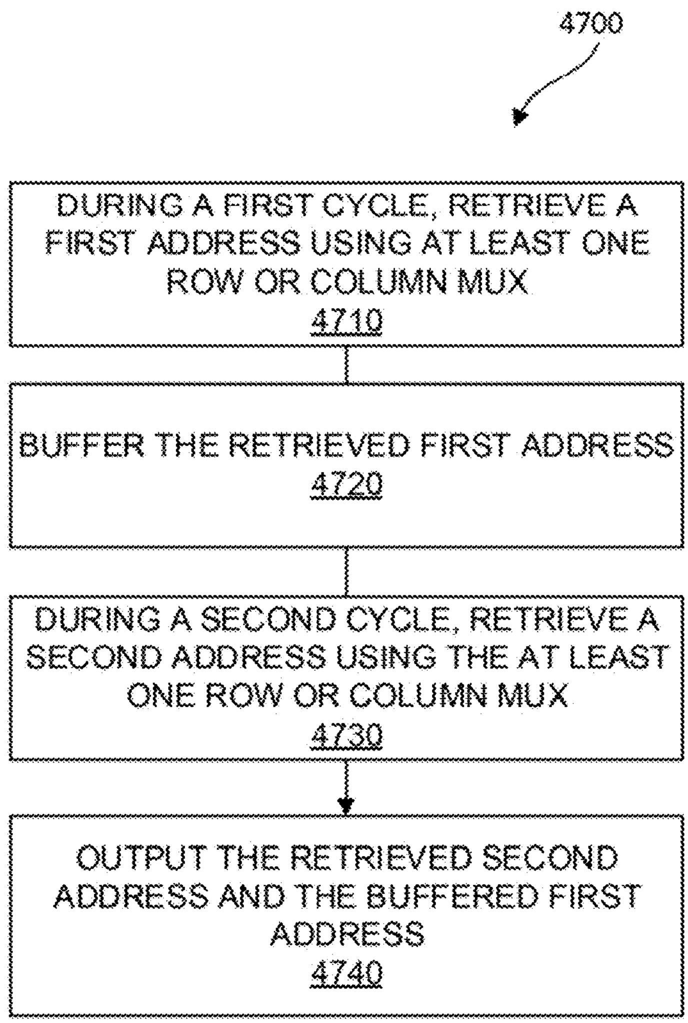
FIG. 47A is an example flowchart of a process for providing dual-port access on a single-port memory array or mat, consistent with the present disclosure.

A process for multi-cycle access to memory arrays or mats is depicted in FIG. 47A. In particular, FIG. 47A is an example flowchart of a process 4700 for providing dual-port access on a single-port memory array or mat (e.g., using circuitry 4300 of FIG. 43 or circuitry 4400 of FIG. 44) Process 4700 may be executed using row and column decoders consistent with the present disclosure, such as row decoder 4303 or 4403 of FIG. 43 or 44, respectively, and a column decoder (which may be separate from or combined with one or more column multiplexers, such as column multiplexer 4305 or 4405 depicted in FIG. 43 or 44, respectively).

At step 4710, during a first memory clock cycle, the circuitry may use at least one row multiplexer and at least one column multiplexer to decode a word line and a bitline corresponding to a first of two addresses. For example, the at least one row decoder may activate a word line, and the at least one column multiplexer may amplify a voltage from a memory cell along the activated word line and corresponding to the first address. The amplified voltage may be provided to a logic circuit using a memory chip including the circuitry or buffered according to step 4720 described below. The logic circuits may comprise circuits such as GPUs or CPUs or may comprise processing groups on the same substrate as the memory chip, e.g., as depicted in FIG. 7A.

Although described above as a read operation, method 4700 may similarly process a write operation. For example, the at least one row decoder may activate a word line, and the at least one column multiplexer may apply a voltage to a memory cell along the activated word line and corresponding to the first address to write new data to the memory cell. In some embodiments, the circuitry may provide confirmation of the write to the logic circuit using the memory chip including the circuitry or buffer the confirmation according to step 4720 below.

At step 4720, the circuitry may buffer the retrieved data of the first address. For example, as depicted in FIGS. 43 and 44, the buffer may allow the circuitry to retrieve a second of the two addresses (as described in step 4730 below) and return the results of both retrievals together. The buffer may comprise a register, an SRAM, a nonvolatile memory, or any other data storage device.

At step 4730, during a second memory clock cycle, the circuitry may use the at least one row multiplexer and the at least one column multiplexer to decode a word line and a bitline corresponding to a second address of the two addresses. For example, the at least one row decoder may activate a word line, and the at least one column multiplexer may amplify a voltage from a memory cell along the activated word line and corresponding to the second address. The amplified voltage may be provided to a logic circuit using a memory chip including the circuitry, whether individually or together with a buffered voltage. e.g., from step 4720. The logic circuits may comprise circuits such as GPUs or CPUs or may comprise processing groups on the same substrate as the memory chip, e.g., as depicted in FIG. 7A.

Although described above as a read operation, method 4700 may similarly process a write operation. For example, the at least one row decoder may activate a word line, and the at least one column multiplexer may apply a voltage to a memory cell along the activated word line and corresponding to the second address to write new data to the memory cell. In some embodiments, the circuitry may provide confirmation of the write to the logic circuit using the memory chip including the circuitry, whether individually or together with a buffered voltage, e.g., from step 4720.

At step 4740, the circuitry may output the retrieved data of the second address with the buffered first address. For example, as depicted in FIGS. 43 and 44, the circuitry may return the results of both retrievals (e.g., from steps 4710 and 4730) together. The circuitry may return the results to a logic circuit using a memory chip including the circuitry. The logic circuits may comprise circuits such as GPUs or CPUs or may comprise processing groups on the same substrate as the memory chip, e.g., as depicted in FIG. 7A.

Although described with reference to multiple cycles, if the two addresses share a word lines, as depicted in FIG. 42, method 4700 may allow for single-cycle access to the two addresses. For example, steps 4710 and 4730 may occur during a same memory clock cycle since multiple column multiplexers may decode different bitlines on a same word line during the same memory clock cycle. In such embodiments, the buffering step 4720 may be skipped.

Figure 47B:
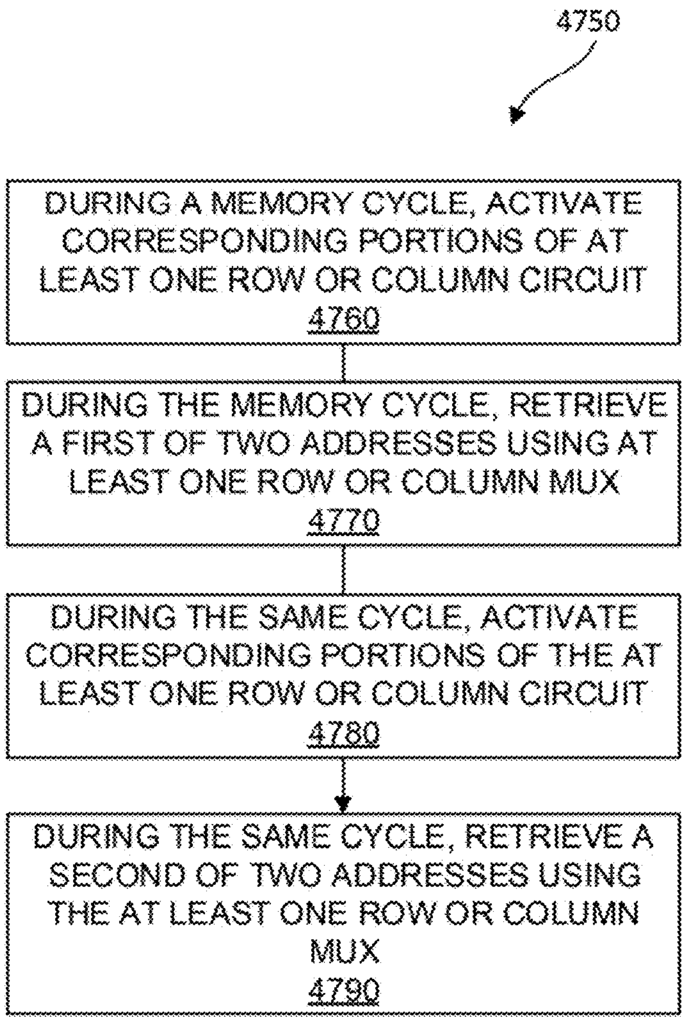
FIG. 47B is an example flowchart of another process for providing dual-port access on a single-port memory array or mat, consistent with the present disclosure.

A process for simultaneous access (e.g., using circuitry 4600 described above) is depicted in FIG. 47B. Accordingly, although shown in sequence, the steps of FIG. 47B may all occur during a same memory clock cycle, and at least some steps (e.g., steps 4760 and 4780 or steps 4770 and 4790) may be executed simultaneously. In particular, FIG. 47B is an example flowchart of a process 4750 for providing dual-port access on a single-port memory array or mat (e.g., using circuitry 4200 of FIG. 42 or circuitry 4600 of FIG. 46) Process 4750 may be executed using row and column decoders consistent with the present disclosure, such as row decoder 4203 or rows decoders 4601*a* and 4601*b* of FIG. 42 or 46, respectively, and a column decoder (which may be separate from or combined with one or more column multiplexers, such as column multiplexers 4205*a* and 4205*b* or column multiplexers 4603*a* and 4306*b* depicted in FIG. 42 or 46, respectively).

At step 4760, during a memory clock cycle, the circuitry may activate corresponding ones of at least one row circuit and at least one column circuit based on a first of two addresses. For example, the circuitry may transmit one or more control signals to close corresponding ones of switching elements comprising the at least one row circuit and the at least one column circuit. Accordingly, the circuitry may access a corresponding disconnected region including the first of the two addresses.

At step 4770, during the memory clock cycle, the circuitry may use at least one row multiplexer and at least one column multiplexer to decode a word line and a bitline corresponding to the first address. For example, the at least one row decoder may activate a word line, and the at least one column multiplexer may amplify a voltage from a memory cell along the activated word line and corresponding to the first address. The amplified voltage may be provided to a logic circuit using a memory chip including the circuitry. For example, as described above, the logic circuits may comprise circuits such as GPUs or CPUs or may comprise processing groups on the same substrate as the memory chip, e.g., as depicted in FIG. 7A.

Although described above as a read operation, method 4500 may similarly process a write operation. For example, the at least one row decoder may activate a word line, and the at least one column multiplexer may apply a voltage to a memory cell along the activated word line and corresponding to the first address to write new data to the memory cell. In some embodiments, the circuitry may provide confirmation of the write to the logic circuit using the memory chip including the circuitry.

At step 4780, during the same cycle, the circuitry may activate corresponding ones of the at least one row circuit and the at least one column circuit based on a second of the two addresses. For example, the circuitry may transmit one or more control signals to close corresponding ones of switching elements comprising the at least one row circuit and the at least one column circuit. Accordingly, the circuitry may access a corresponding disconnected region including the second of the two addresses.

At step 4790, during the same cycle, the circuitry may use the at least one row multiplexer and the at least one column multiplexer to decode a word line and a bitline corresponding to the second address. For example, the at least one row decoder may activate a word line, and the at least one column multiplexer may amplify a voltage from a memory cell along the activated word line and corresponding to the second address. The amplified voltage may be provided to a logic circuit using the memory chip including the circuitry. For example, as described above, the logic circuits may comprise conventional circuits such as GPUs or CPUs or may comprise processing groups on the same substrate as the memory chip, e.g., as depicted in FIG. 7A.

Although described above as a read operation, method 4500 may similarly process a write operation. For example, the at least one row decoder may activate a word line, and the at least one column multiplexer may apply a voltage to a memory cell along the activated word line and corresponding to the second address to write new data to the memory cell. In some embodiments, the circuitry may provide confirmation of the write to the logic circuit using the memory chip including the circuitry.

Although described with reference to a single cycle, if the two addresses are in disconnected regions sharing word lines or bitlines (or otherwise sharing switching elements in the at least one row circuit and the at least one column circuit), method 4500 may allow for multi-cycle access to the two addresses. For example, steps 4760 and 4770 may occur during a first memory clock cycle in which a first row decoder and a first column multiplexer may decode the word line and bitline corresponding to the first address while steps 4780 and 4790 may occur during a second memory clock cycle in which a second row decoder and a second column multiplexer may decode the word line and bitline corresponding to the second address.

Figure 48:
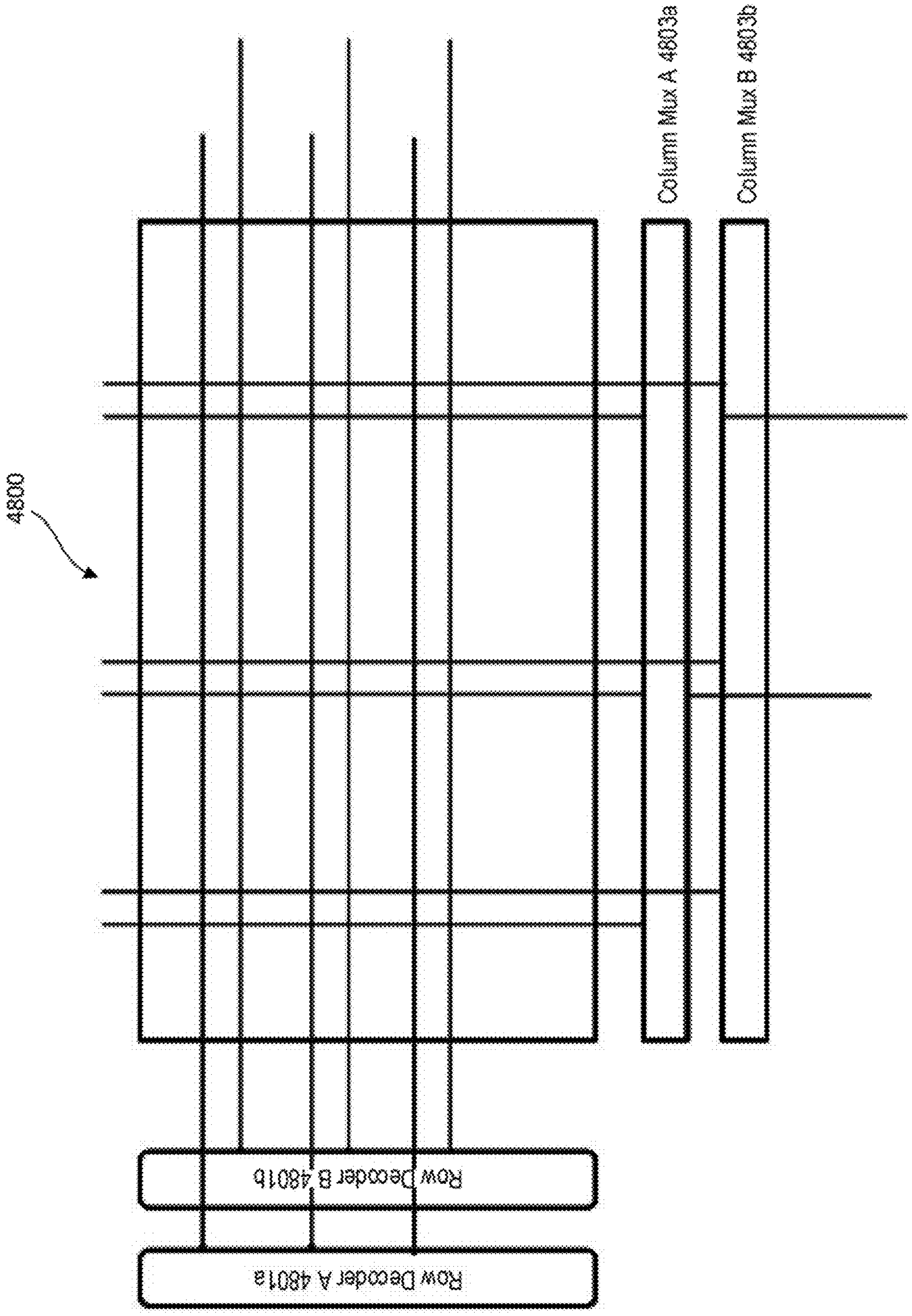
FIG. 48 shows another example of circuitry within a memory chip memory chip providing dual-port access along both rows and columns, consistent with the present disclosure.

A further example of architecture for dual-port access along both rows and columns is depicted in FIG. 48. In particular, FIG. 48 depicts example circuitry 4800 providing dual-port access along both rows and columns using multiple row decoders in combination with multiple column multiplexers. In FIG. 48, row decoder 4801*a* may access a first word line, and column multiplexer 4803*a* may decode data from one or more memory cells along the first word line while row decoder 4801*b* may access a second word line, and column multiplexer 4803*b* may decode data from one or more memory cells along the second word line.

As described with respect to FIG. 47B, this access may be simultaneous during one memory clock cycles. Accordingly, similar to the architecture of FIG. 46, the architecture of FIG. 48 (including the memory mats described in FIG. 49 below) may allow for multiple addresses to be accessed in a same clock cycle. For example, the architecture of FIG. 48 may include any number of row decoders and any number of column multiplexers such that a number of addresses corresponding to the number of row decoder and column multiplexers may be accessed all within a single memory clock cycle.

In other embodiments, this access may be sequential along two memory clock cycles. By clocking memory chip 4800 faster than a corresponding logic circuit, two memory clock cycles may be equivalent to one clock cycle for the logic circuit using the memory. For example, as described above, the logic circuits may comprise conventional circuits such as GPUs or CPUs or may comprise processing groups on the same substrate as the memory chip, e.g., as depicted in FIG. 7A.

Other embodiments may allow for simultaneous access. For example, as described with respect to FIG. 42, multiple column decoders (which may comprise column multiplexers such as 4803*a* and 4803*b* as shown in FIG. 48) may read multiple bitlines along a same word line during a single memory clock cycle. Additionally or alternatively, as described with respect to FIG. 46, circuitry 4800 may incorporate additional circuitry such that this access may be simultaneous. For example, row decoder 4801*a* may access a first word line, and column multiplexer 4803*a* may decode data from a memory cell along the first word line during a same memory clock cycle in which row decoder 4801*b* accesses a second word line, and column multiplexer 4803*b* decodes data from a memory cell along the second word line.

Figure 49:
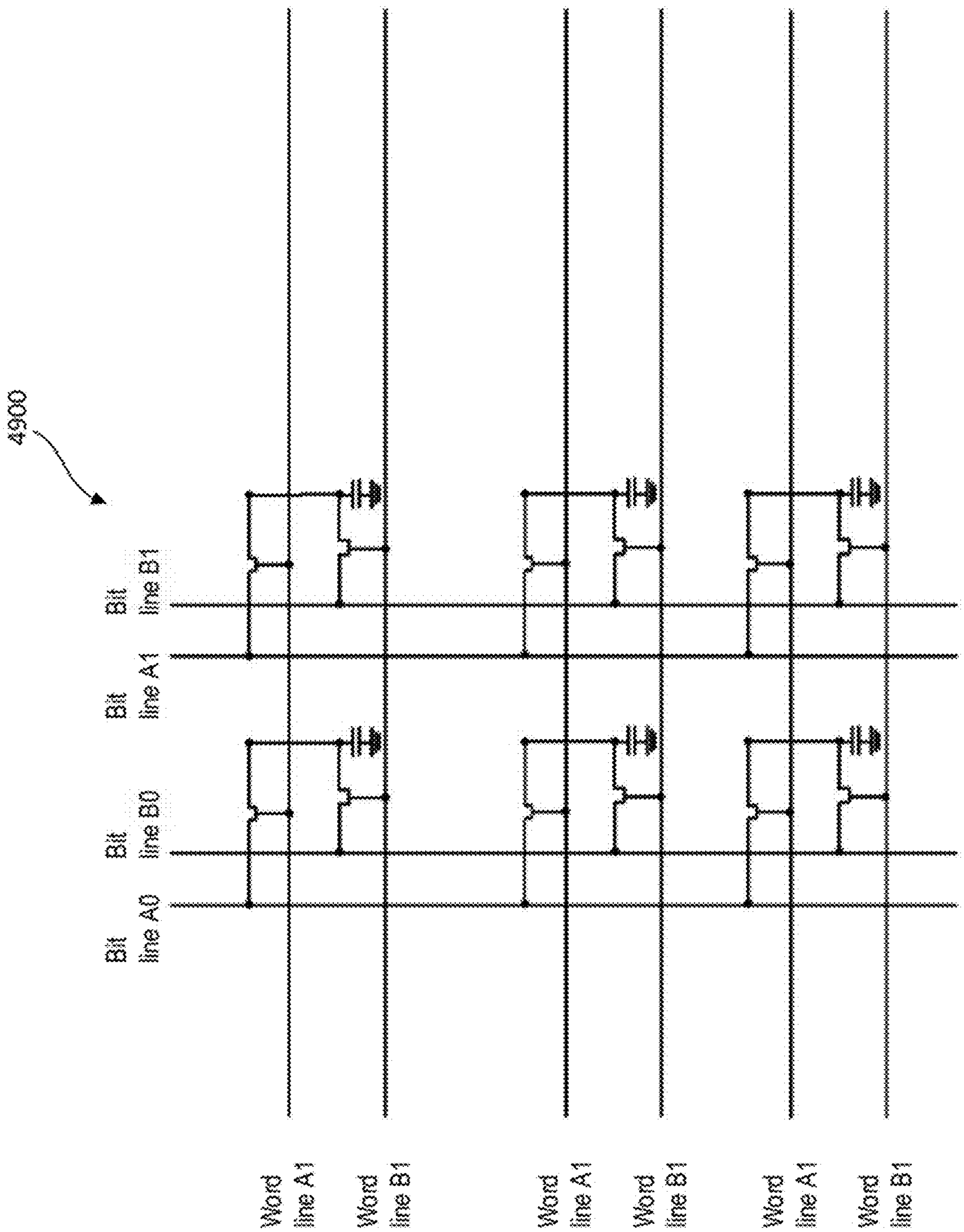
FIG. 49 shows an example of switching elements for dual-port access within a memory mat, consistent with the present disclosure.

The architecture of FIG. 48 may be used with modified memory mats forming the memory banks as shown in FIG. 49. In FIG. 49, each memory cell (depicted as a capacitor similar to DRAM but may also comprise a number of transistors arranged in a manner similar to SRAM or any other memory cell) is accessed by two word lines and by two bit lines. Accordingly, memory mat 4900 of FIG. 49 allows for access of two different bits simultaneously or even access to a same bit by two different logic circuits. However, the embodiment of FIG. 49 uses a modification to the memory mats rather than implementing a dual-port solution on standard DRAM memory mats, which are wired for single-port access, as the embodiments above do.

Although described with two ports, any of the embodiments described above may be extended to more than two ports. For example, the embodiments of FIGS. 42, 46, 48, and 49 may include additional column or row multiplexers, respectively, to provide access to additional columns or rows, respectively, during a single clock cycle. As another example, the embodiments of FIGS. 43 and 44 may include additional row decoders and/or column multiplexers to provide access to additional rows or columns, respectively, during a single clock cycle.

Variable Word Length Access in Memory

As used above and further blow, the term "coupled" may include directly connected, indirectly connected, in electrically communication with, and the like.

Moreover, terms like "first," "second," and the like are used to distinguish between elements or method steps having a same or similar name or title and do not necessarily indicate a spatial or temporal order.

Typically, a memory chip may include memory banks. The memory banks may be coupled to a row decoder and a column decoder configured to choose a specific word (or other fixed size data unit) to be read or written. Each memory bank may include memory cells to store the data units, sense amplifiers to amplify voltages from the memory cells selected by the row and column decoders, and any other appropriate circuits.

Each memory bank usually has a specific I/O width. For example, the L/O width may comprise a word.

While some processes executed by logic circuits using the memory chip may benefit from using very long words, some other processes may require only a part of the word.

Indeed, in-memory computing units (such as processor subunits disposed on the same substrate as the memory chip, e.g., as depicted and described in FIG. 7A) frequently perform memory access operations that require only a part of the word.

To reduce latency associated with accessing an entire word when only a portion is used, embodiments of the present disclosure may provide a method and a system for fetching only one or more parts of a word, thereby reducing data losses associated with transferring unneeded parts of the word and allowing power saving in a memory device.

Furthermore, embodiments of the present disclosure may also reduce power consumption in the interaction between the memory chip and other entities (such as logic circuits, whether separate like CPUs and GPUs or included on the same substrate as the memory chip, such as the processor subunits depicted and described in FIG. 7A) that access the memory chip, which may receive or write only a part of the word.

A memory access command (e.g., from a logic circuit using the memory) may include an address in the memory. For example, the address may include a row address and a column address or may be translated to a row address and a column address, e.g., by a memory controller of the memory.

In many volatile memories, such as DRAMs, the row address is sent (e.g., directly by the logic circuit or using the memory controller) to the row decoder, which activates the entire row (also called the word line) and loads all of the bitlines included in the row.

The column address identifies the bitline(s) on the activated row that are transferred outside a memory bank including the bitline(s) and to next level circuitry. For example, the next level circuitry may comprise an I/O bus of the memory chip. In embodiments using in-memory processing, the next level circuitry may comprise a processor subunit of the memory chip (e.g., as depicted in FIG. 7A).

Accordingly, the memory chip described below may be included in or otherwise comprise the memory chip as illustrated in any one of FIG. 3A, 3B, 4-6, 7A-7D, 11-13, 16-19, 22, or 23.

The memory chip may be manufactured by a first manufacturing process optimized for memory cells rather than logic cells. For example, the memory cells manufactured by the first manufacturing process may exhibit a critical dimension that is smaller (for example, by a factor that exceeds 2, 3, 4, 5, 6, 7, 8, 9, 10, and the like), than the critical dimension of a logic circuit manufactured by the first manufacturing process. For example, the first manufacturing process may comprise an analog manufacturing process, a DRAM manufacturing process, and the like.

Such a memory chip may comprise an integrated circuit that may include a memory unit. The memory unit may include memory cells, an output port, and read circuitry. In some embodiments, the memory unit may further include a processing unit, such as a processor subunit as described above.

For example, the read circuitry may include a reduction unit and a first group of memory read paths for outputting up to a first number of bits through the output port. The output port may connect to an off-chip logic circuit (such as an accelerator, CPU, GPU, or the like) or to an on-chip processor subunit, as described above.

In some embodiments, the processing unit may include the reduction unit, may be a part of the reduction unit, may differ from the reduction unit, or may otherwise comprise the reduction unit.

An in-memory read path may be included in the integrated circuit (for example, may in the memory unit) and may include any circuit and/or link configured for reading from and/or writing to a memory cell. For example, the in-memory read path may include a sense amplifier, a conductor coupled to the memory cell, a multiplexer, and the like.

The processing unit may be configured to send to the memory unit a read request for reading a second number of bits from the memory unit. Additionally or alternatively, the read request may originate from an off-chip logic circuit (such as an accelerator, CPU, GPU, or the like).

The reduction unit may be configured to assist in reducing power consumption related to an access request, e.g., by using any of the partial word accesses described herein.

The reduction unit may be configured to control the memory read paths, during a read operation triggered by the read request, based on the first number of bits and the second number of bits. For example, the control signal from the reduction unit may affect the memory consumption of the read paths to reduce energy consumption of memory read paths not relevant to the requested second number of bits. For example, the reduction unit may be configured to control irrelevant memory read paths when the second number is smaller than the first number.

As explained above, the integrated circuit may be included in, may include, or otherwise comprise a memory chip as illustrated in any one of FIG. 3A, 3B, 4-6, 7A-7D, 11-13, 16-19, 22, or 23.

The irrelevant in-memory read paths may be associated with irrelevant bits of the first number of bits, such as bits of the first number of bits not included in the second number of bits.

Figure 50:
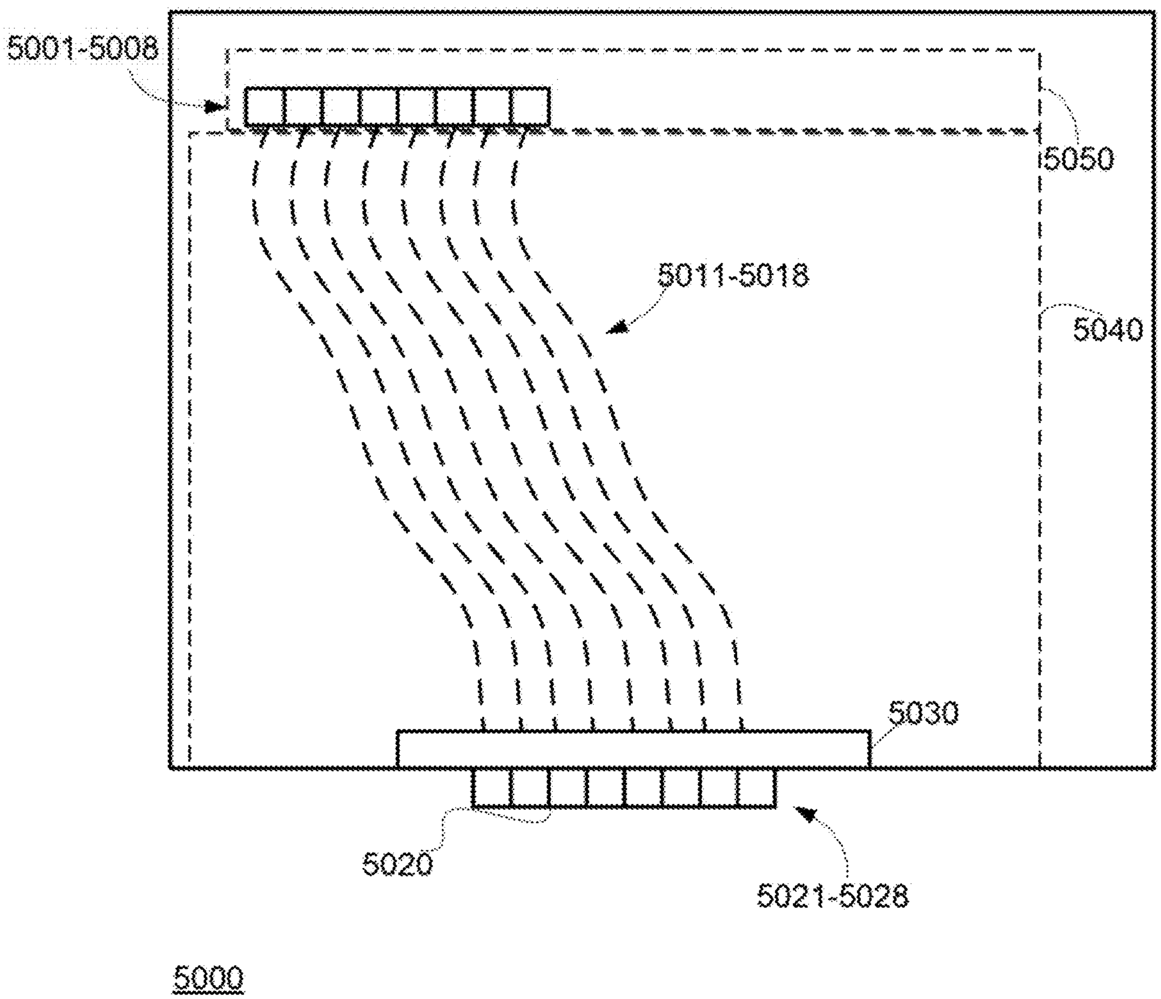
FIG. 50 illustrates an example integrated circuit with a reduction unit configured to access partial words, consistent with the present disclosure.

FIG. 50 illustrates an example integrated circuit 5000 including memory cells 5001-5008 of an array 5050 of memory cells, an output port 5020 that includes bits 5021-5028, read circuitry 5040 that includes memory read paths 5011-5018, and reduction unit 5030.

When a second number of bits are read using corresponding memory read paths, the irrelevant bits of the first number of bits may correspond to bits that should not be read (e.g., bits that are not included in the second number of bits).

During the read operation, the reduction unit 5030 may be configured to activate memory read paths corresponding to the second number of bits such that the activated memory read paths may be configured to convey the second number of bits. In such embodiments, only the memory read paths corresponding to the second number of bits may be activated.

During the read operation, the reduction unit 5030 may be configured to shut down at least a portion of each irrelevant memory read paths. For example, the irrelevant memory read paths may corresponding to the irrelevant bits of the first number of bits.

It should be noted that instead of shutting down at least one portion of an irrelevant memory path, the reduction unit 5030 may instead insure that the irrelevant memory path is not activated.

Additionally or alternatively, during the read operation, the reduction unit 5030 may be configured to maintain the irrelevant memory read paths in a low power mode. For example, a low power mode may comprise a mode in which the irrelevant memory paths are supplied with voltage or current lower than a normal operating voltage or current, respectively.

The reduction unit 5030 may be further configured to control bitlines of the irrelevant memory read paths.

Accordingly, the reduction unit 5030 may be configured to load bitlines of relevant memory read paths and maintain bitlines of the irrelevant memory read paths in the low power mode. For example, only the bitlines of the relevant memory read paths may be loaded.

Additionally or alternatively, the reduction unit 5030 may be configured to load bitlines of the relevant memory read paths while maintaining bitlines of the irrelevant memory read paths deactivated.

In some embodiments, the reduction unit 5030 may be configured to utilize portions of the relevant memory read paths during the read operation and to maintain in the low power mode a portion of each irrelevant memory read path, wherein the portion differs from a bitline.

As explained above, memory chips may use sense amplifiers to amplify voltages from memory cells included therein. Accordingly, the reduction unit 5030 may be configured to utilize portions of the relevant memory read paths during the read operation and to maintain in the low power mode a sense amplifier associated with at least some of the irrelevant memory read paths.

In such embodiments, the reduction unit 5030 may be configured to utilize portions of the relevant memory read paths during the read operation and to maintain in the low power mode one or more sense amplifiers associated with all of the irrelevant memory read paths.

Additionally or alternatively, the reduction unit 5030 may be configured to utilize portions of the relevant memory read paths during the read operation and to maintain in the low power mode portions of the irrelevant memory read paths that follow (e.g., spatially and/or temporally) one or more sense amplifiers associated with the irrelevant memory read paths.

In any of the embodiments described above, the memory unit may include a column multiplexer (not shown).

In such embodiments, the reduction unit 5030 may be coupled between the column multiplexer and the output port.

Additionally or alternatively, the reduction unit 5030 may be embedded in the column multiplexer.

Additionally or alternatively, the reduction unit 5030 may be coupled between the memory cells and the column multiplexer.

The reduction unit 5030 may comprise reduction subunits that may be independently controllable. For example, different reduction subunits may be associated with different memory unit columns.

Although described above with respect to read operations and read circuitry, and of the embodiments above may similarly be applied for write operations and write circuitry.

For example, an integrated circuit according to the present disclosure may include a memory unit comprising memory cells, an output port, and write circuitry. In some embodiments, the memory unit may further include a processing unit, such as a processor subunit as described above. The write circuitry may include a reduction unit and a first group of memory write paths for outputting up to a first number of bits through the output port. The processing unit may be configured to send to the memory unit a write request for writing a second number of bits from the memory unit. Additionally or alternatively, the write request may originate from an off-chip logic circuit (such as an accelerator, CPU, GPU, or the like). The reduction unit 5030 may be configured to control the memory write paths, during a write operation triggered by the write request, based on the first number of bits and the second number of bits.

Figure 51:
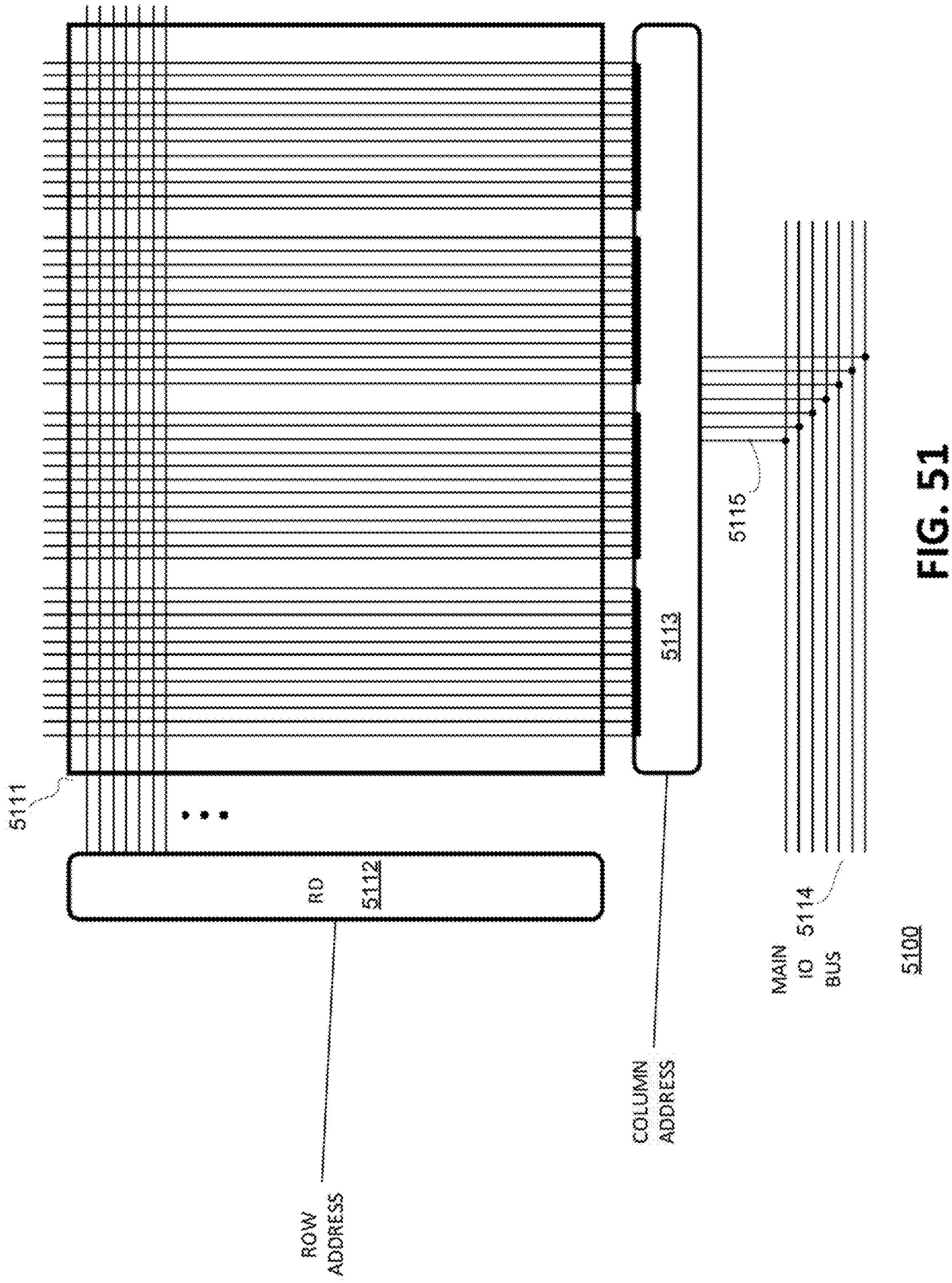
FIG. 51 illustrates a memory bank for using a reduction unit as described for FIG. 50.

FIG. 51 illustrates a memory bank 5100 that include an array 5111 of memory cells that are addressed using row and column addresses (e.g., from an on-chip processor subunit or an off-chip logic circuit, such as an accelerator, CPU, GPU, or the like). As shown in FIG. 51, the memory cells are fed to bitlines (vertical) and word lines (horizontal—many omitted for simplicity). Moreover, row decoder 5112 may be fed with a row address (e.g., from the on-chip processor subunit, the off-chip logic circuit, or a memory controller not shown in FIG. 51), column multiplexer 5113 may be fed with a column address (e.g., from the on-chip processor subunit, the off-chip logic circuit, or a memory controller not shown in FIG. 51), and column multiplexer 5113 may receive outputs from up to an entire line and output up to a word over output bus 5115. In FIG. 51, the output bus 5115 of the column multiplexer 5113 is coupled to a main I/O bus 5114. In other embodiments, the output bus 5115 may be coupled to a processor subunit of the memory chip (e.g., as depicted in FIG. 7A) sending the row and column addresses. The division of the memory bank into memory mats is not shown for simplicity.

Figure 52:
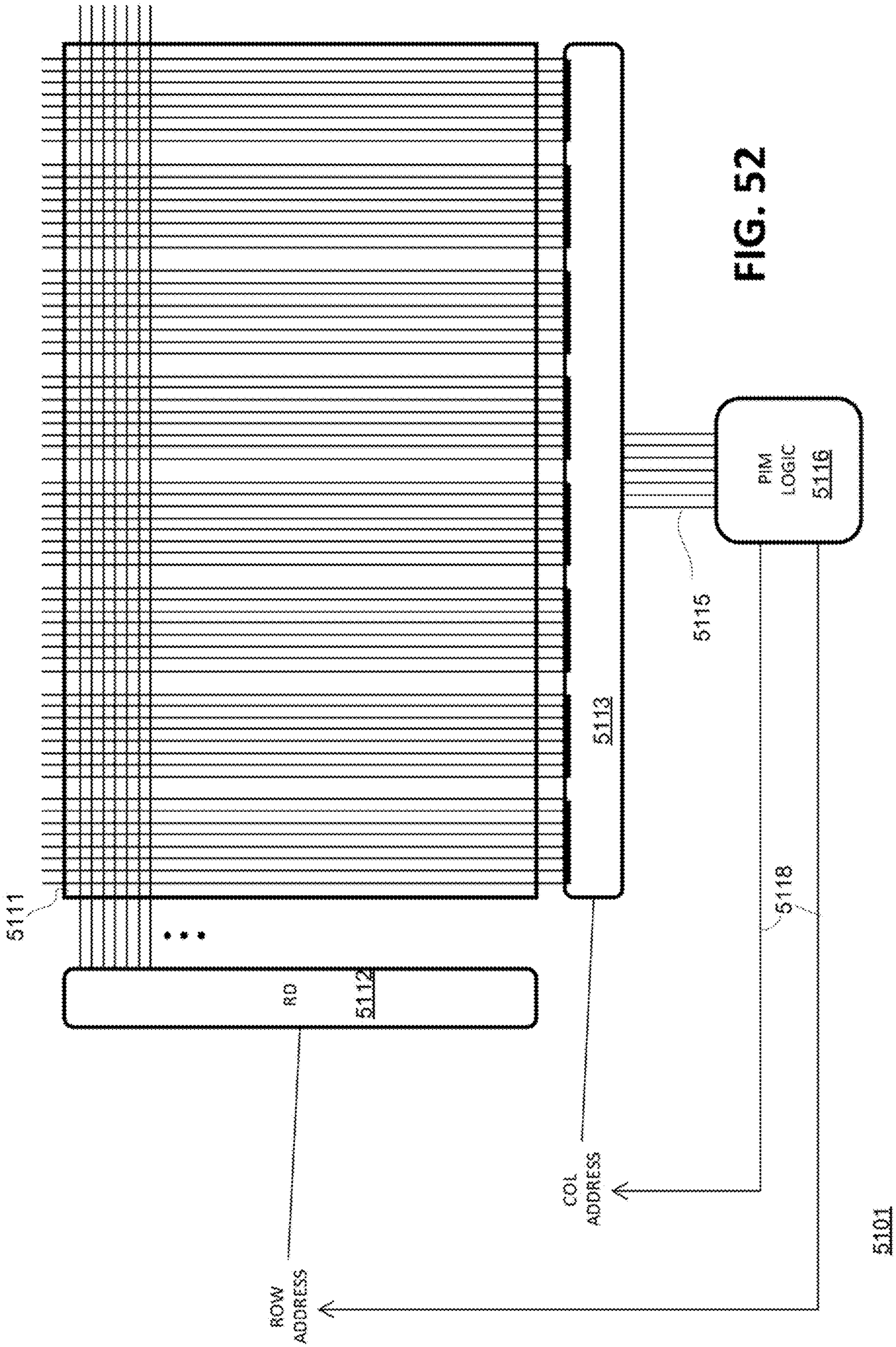
FIG. 52 illustrates a memory bank using a reduction unit integrated into PIM logic, consistent with the present disclosure.

FIG. 52 illustrates a memory bank 5101. In FIG. 52, the memory bank is also illustrated as including a PLM (processing in memory) logic 5116 that has inputs coupled to output bus 5115. PIM logic 5116 may generate addresses (e.g., comprising row addresses and column addresses) and output the addresses via PIM address buses 5118 to access the memory bank. PIM logic 5116 is an example of a reduction unit (e.g., unit 5030) that also comprises a processing unit. The PIM logic 5016 may control other circuits not shown in FIG. 52 that assist in the reduction of power. PIM logic 5116 may further control the memory paths of a memory unit including memory bank 5101.

As explained above, the word length (e.g., the number of bitlines chosen to be transferred at a time) may be large in some cases.

In those cases, each word for reading and/or writing may be associated with a memory path that may consume power at various stages of the reading and/or writing operation, for example:

a. loading the bitline- to avoid loading the bitline to the needed value (either from a capacitor on the bitline in a read cycle or to the new value to be written to the capacitor in a write cycle), there is a need to disable a sense amplifier located at the end of the memory array and make sure the capacitor holding the data is not discharged or charged (otherwise the data stored thereon would be destructed); and b. moving the data from the sense amplifier through a column multiplexer that chooses the bitlines and to the rest of the chip (either to the I/O bus that transfers data in and out of the chip or to the embedded logic, such as a processor subunit on the same substrate as the memory, that would use the data).

To achieve power saving, integrated circuits of the present disclosure may determine, at row activation time, that some parts of a word are irrelevant and then send a disable signal to one or more sense amplifier for the irrelevant parts of the word.

Figure 53:
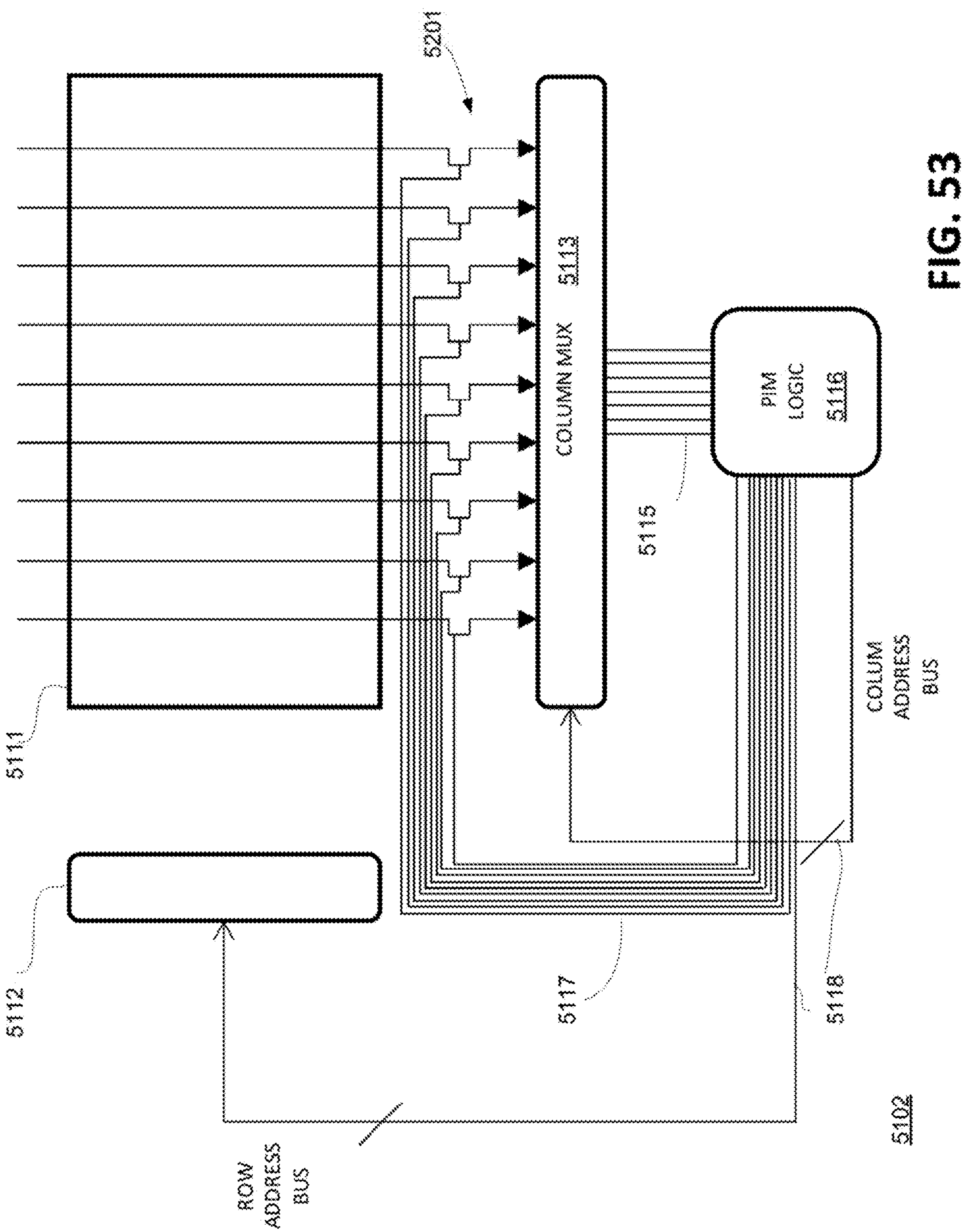
FIG. 53 illustrates a memory bank using a PIM logic to activate switches for accessing partial words, consistent with the present disclosure.

FIG. 53 illustrates a memory unit 5102 that includes an array 5111 of memory cells, a row decoder 5112, a column multiplexer 5113 that is coupled to output bus 5115, and PIM logic 5116.

Memory unit 5102 also includes switches 5201 that enable or disable the passage of bits to the column multiplexer 5113. Switches 5201 may comprise analog switches, transistors configured to function as switches, or any other circuitry configured to control a supply or voltage and/or a flow of current to part of memory unit 5102. The sense amplifiers (not shown) may be located at the end of the memory cell array, e.g. before (spatially and/or temporally) switches 5201.

The switches 5201 may be controlled by enable signals sent over bus 5117 from PIM logic 5116. The switches are configured, when disconnected, to disconnect the sense amplifiers (not shown) of the memory unit 5102 and therefore not discharge or charge bitlines disconnected from the sense amplifiers.

Switches 5201 and PIM logic 5116 may form a reduction unit (e.g., reduction unit 5030).

In yet another example, PIM logic 5116 may send enable signals to the sense amplifiers (e.g., when the sense amplifiers have an enable input) instead of being sent to switches 5201.

The bitlines may additionally or alternatively be disconnected at other points, e.g., not at the end of the bitlines and after the sense amplifiers. For example—a bitline may be disconnected before entering the array 5111.

In these embodiments, power may also be saved on data transfer from the sense amplifiers and forwarding hardware (such as output bus 5115).

Other embodiments (that may save less power but may be easier to implement) focus on saving the power of the column multiplexer 5113 and transfer losses from the column multiplexer 5113 to a next level circuitry. For example, as explained above, the next level circuitry may comprise an I/O bus of the memory chip (such as bus 5115). In embodiments using in-memory processing, the next level circuitry may additionally or alternatively comprise a processor subunit of the memory chip (such as PIM logic 5116).

Figure 54A:
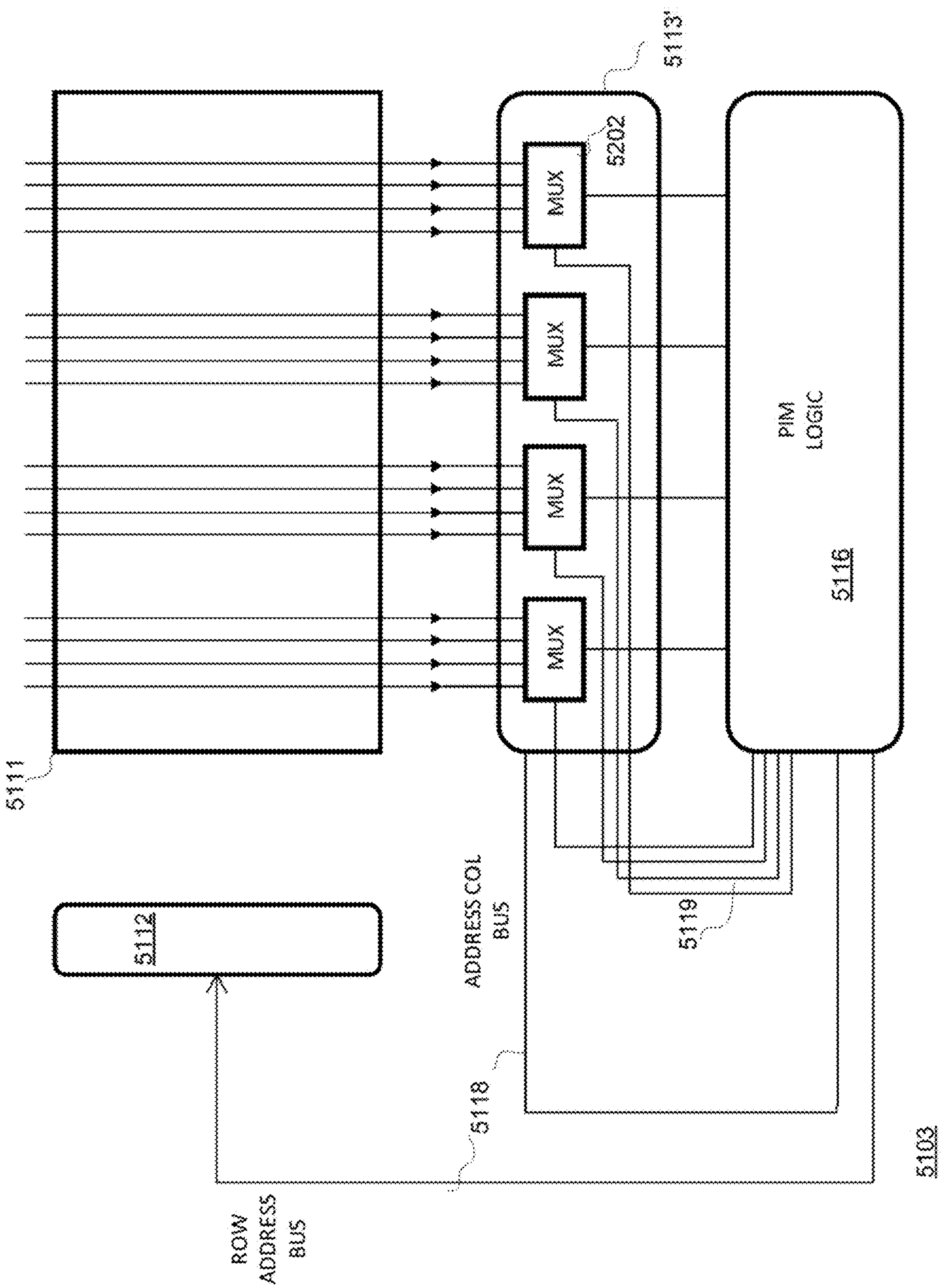
FIG. 54A illustrates a memory bank with segmented column multiplexes for deactivating to access partial words, consistent with the present disclosure.

FIG. 54A illustrates a column multiplexer 5113 segmented to segments 5202. Each segment 5202 of the column multiplexer 5113 may be individually enabled or disabled by enable and/or disable signals sent over bus 5119 from PIM logic 5116. Column multiplexer 5113 may also be fed by address columns bus 5118.

The embodiment of FIG. 54A may provide better control over different portions of the output from column multiplexer 5113.

It should be noted that the control of different memory paths may be of different resolutions, e.g., ranging from a bit resolution and to a resolution of multiple bits. The former may be more effective in sense of power savings. The latter may be simpler to implement and require fewer control signals.

Figure 54B:
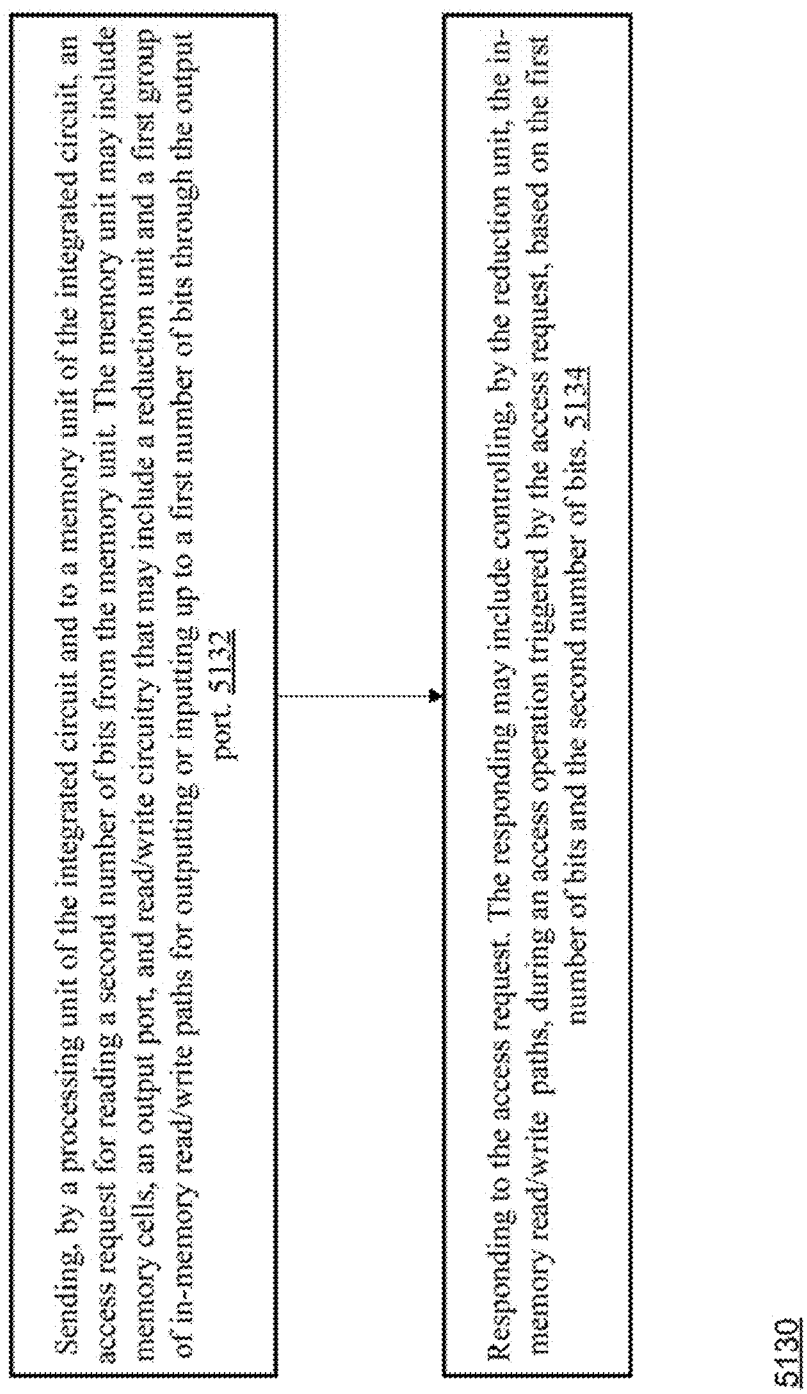
FIG. 54B is an example flowchart of a process for partial word access in a memory, consistent with the present disclosure.

FIG. 54B illustrates an example method 5130. For example, method 5130 may be implemented using any of the memory units described above with respect to FIG. 50, 51, 52, 53, or 54A.

Method 5130 may include steps 5132 and 5134.

Step 5132 may include sending, by a processing unit (e.g., PIM logic 5116) of the integrated circuit and to a memory unit of the integrated circuit, an access request for reading a second number of bits from the memory unit. The memory unit may include memory cells (e.g., memory cells of array 5111), an output port (e.g., output bus 5115), and read/write circuitry that may include a reduction unit (e.g., reduction unit 5030) and a first group of memory read/write paths for outputting and/or inputting up to a first number of bits through the output port.

An access request may comprise a read request and/or a write request.

A memory input/output path may comprise a memory read path, a memory write path, and/or a path used for both reading and writing.

Step 5134 may include responding to the access request.

For example, step 5134 may include controlling, by the reduction unit (e.g., unit 5030), the memory read/write paths, during an access operation triggered by the access request, based on the first number of bits and the second number of bits.

Step 5134 may further include any one of the following and/or any combination of any one of the following. Any of the listed below operations may be executed during the responding to the access request but may also be executed before and/or after responding to the access request.

Thus, step 5134 may include at least one of:

a. controlling irrelevant memory read paths when the second number is smaller than the first number, wherein the irrelevant memory read paths are associated with bits of the first number of bits not included in the second number of bits;
b. activating, during a read operation, relevant memory read paths, wherein the relevant memory read paths are configured to convey the second number of bits;
c. shutting down, during the read operation, at least a portion of each one of the irrelevant memory read paths;
d. maintaining, during the read operation, the irrelevant memory read paths in a low power mode;
e. controlling bitlines of the irrelevant memory read paths;
f. loading bitlines of the relevant memory read paths and maintaining bitlines of the irrelevant memory read paths in a low power mode;
g. loading bitlines of the relevant memory read paths, while maintaining bitlines of the irrelevant memory read paths deactivated;
h. utilizing portions of the relevant memory read paths during the read operation and maintaining in a low power mode a portion of each irrelevant memory read path, wherein the portion differs from a bitline;
i. utilizing portions of the relevant memory read paths during a read operation and maintaining in a low power mode a sense amplifier for at least some of the irrelevant memory read paths;
j. utilizing portions of the relevant memory read paths during a read operation and maintaining in a low power mode a sense amplifier of at least some of the irrelevant memory read paths; and
k. utilizing portions of the relevant memory read paths during a read operation and maintaining in a low power mode portions of the irrelevant memory read paths that follow sense amplifiers of the irrelevant memory read paths.

A low power mode or an idle mode may comprise a mode in which power consumption of a memory access path is lower than power consumption of the same when the memory access path is used for an access operation. In some embodiments, a low power mode may even involve shutting down the memory access path. A low power mode may additionally or alternatively include not activating the memory-access path.

It should be noted that power reductions that occur during the bitline phase may require that the relevancy or irrelevancy of the memory access paths should be known prior to opening the word line. Power reductions that occur elsewhere (for example, in the column multiplexer) may instead allow for deciding the relevancy or irrelevancy of the memory access paths on every access.

Fast and Low Power Activation and Fast Access Memory

DRAM and other memory types (such as SRAM, Flash, or the like) are often built from memory banks, which are usually built to allow for row and column access schemes.

Figure 55:
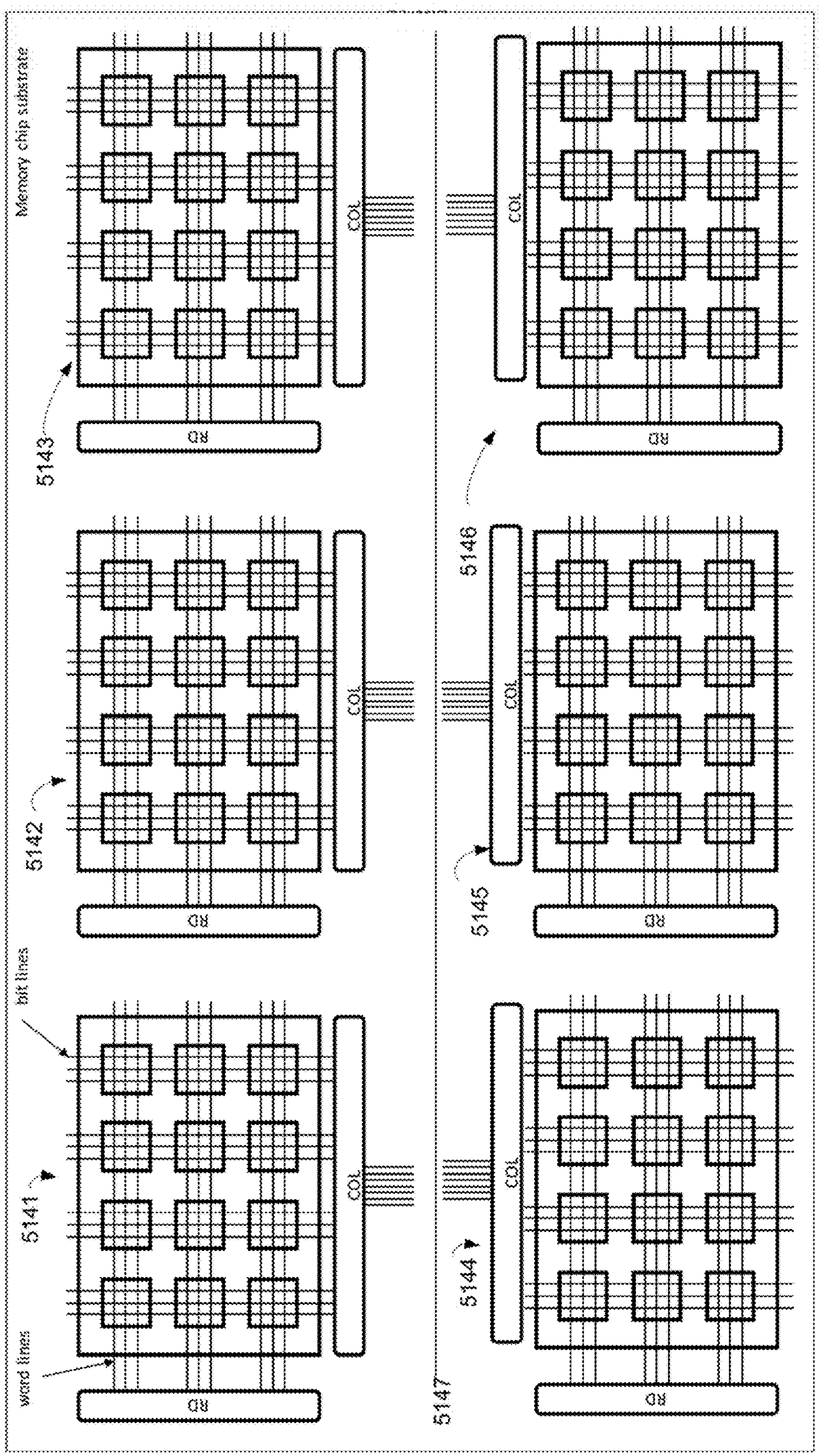
FIG. 55 illustrates an existing memory chip that includes multiple memory mats.

FIG. 55 illustrates an example of a memory chip 5140 that includes multiple memory mats and associated logic (such as row and column decoders—depicted as RD and COL in FIG. 55, respectively). In the example of FIG. 55, the mats are grouped into banks and have word lines and bitlines through them. The memory mats and associated logic are denoted 5141, 5142, 5143, 5144, 5145 and 5146 in FIG. 55 and share at least one bus 5147.

Memory chip 5140 may be included in, may include, or otherwise comprise a memory chip as illustrated in any one of FIG. 3A, 3B, 4-6, 7A-7D, 11-13, 16-19, 22, or 23.

In DRAM, for example, there is a lot overhead associated with activation of a new row (e.g., preparing a new line for access). Once a line is activated (also referred to as being opened), the data within that row may be available for much faster access. In DRAM, this access may occur in a random manner.

Two problems associated with activating a new line are power and time:

c. The power rises due to a rush of current caused by accessing all capacitors on the line together and having to load the line (e.g., the power can reach several Amperes when opening a line with just a few memory banks); and
d. the time delay problem is mostly associated with the time it takes to load the row (word) line and then the bit (column) lines.

Some embodiments of the present disclosure may include a system and method to reduce peak power consumption during activation of a line and reduce activation time of the line. Some embodiments may sacrifice full random access within a line, at least to some extent, to reduce these power and time costs.

For example, in one embodiment, a memory unit may include a first memory mat, a second memory mat, and an activation unit configured to activate a first group of memory cells included in the first memory mat without activating a second group of memory cells included in the second memory mat. The first group of memory cells and the second group of memory cells may both belong to a single row of the memory unit.

Alternatively, the activation unit may be configured to activate the second group of memory cells included in the second memory mat without activating the first group of memory cells.

In some embodiments, the activation unit may be configured to activate the second group of memory cells after activation of the first group of memory cells.

For example, the activation unit may be configured to activate the second group of memory cells following expiration of a delay period initiated after activation of the first group of memory cells has been completed.

Additionally or alternatively, the activation unit may be configured to activate the second group of memory cells based on a value of a signal developed on a first word line segment coupled to the first group of memory cells.

In any of the embodiments described above, the activation unit may include an intermediate circuit disposed between a first word line segment and a second word line segment. In such embodiments. The first word line segment may be coupled to the first memory cells and the second word line segment may be coupled to the second memory cells. Non-limiting examples of intermediate circuits include switches, flip-flops, buffers, inverters, and the like—some of which are illustrated throughout FIGS. 56-61.

Figure 61:
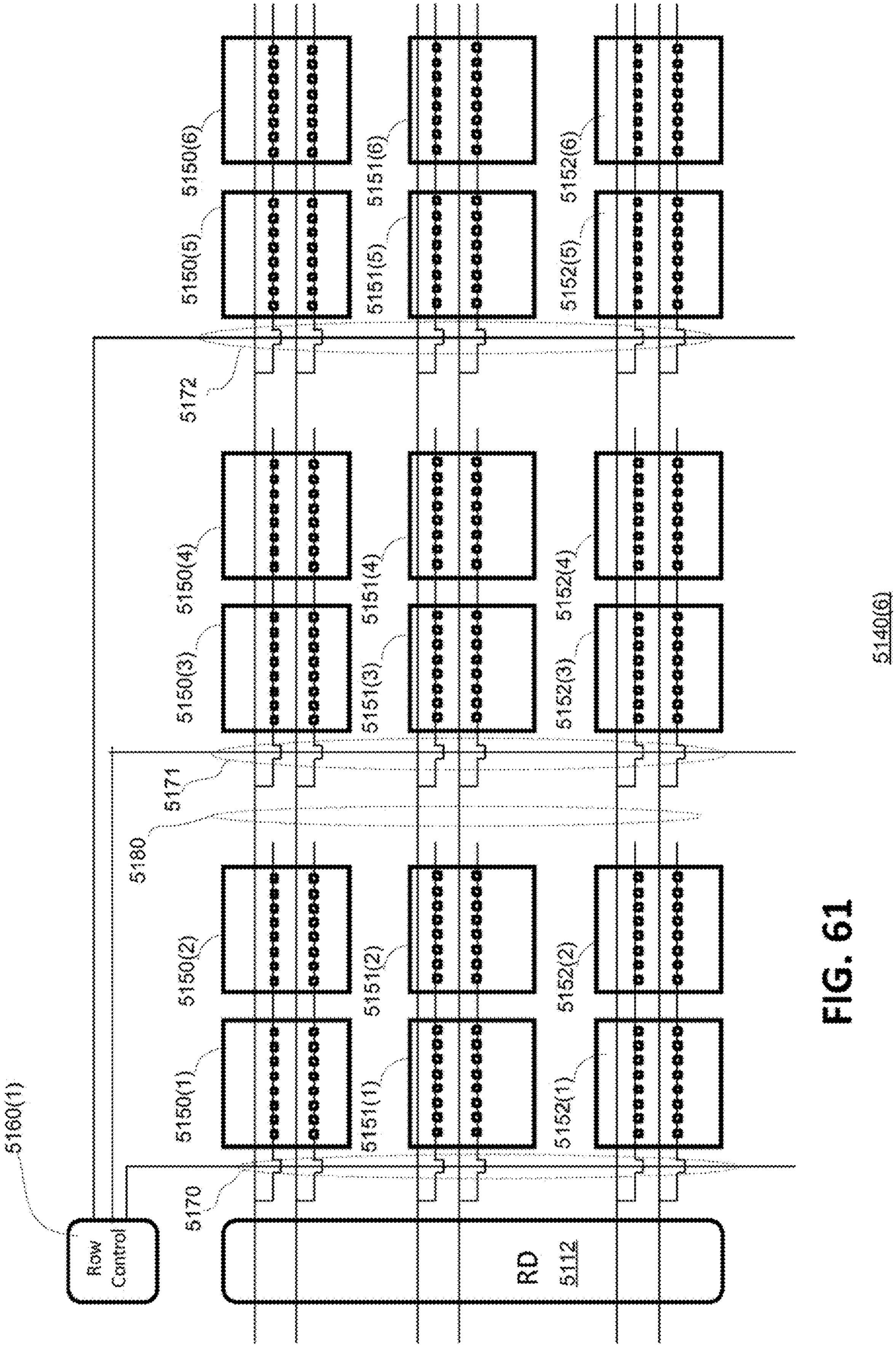
FIG. 61 illustrates another example memory chip with a global word line and local word lines for reducing power consumption during opening of a line, consistent with the present disclosure.

In some embodiments, the second memory cells may be coupled to a second word line segment. In such embodiments, the second word line segment may be coupled to a bypass word line path that passes through at least the first memory mat. An example of such bypass paths is illustrated in FIG. 61.

The activation unit may comprises a control unit configured to control a supply of voltage (and/or a flow of current) to the first group of memory cells and to the second group of memory cells based on an activation signal from a word line associated with the single row.

In another example embodiment, a memory unit may include a first memory mat, a second memory mat, and an activation unit configured to supply an activation signal to a first group of memory cells of the first memory mat and delay a supply of the activation signal to a second group of memory cells of the second memory mat at least until activation of the first group of memory cells has been completed. The first group of memory cells and the second group of memory cells may belong to a single row of the memory unit.

For example, the activation unit may include a delay unit that may be configured to delay the supply of the activation signal.

Additionally or alternatively, the activation unit may include a comparator that may be configured to receive the activation signal at an input of the comparator and to control the delay unit based on at least one characteristic of the activation signal.

In another example embodiment, a memory unit may include a first memory mat, a second memory mat, and an isolation unit configured to: isolate first memory cells of the first memory mat from second memory cells of the second memory mat during an initial activation period in which the first memory cells are activated; and couple the first memory cells to the second memory cells following the initial activation period. The first and second memory cells may belong to a single row of the memory unit.

In the following examples, no modifications to the memory mats themselves may be required. In certain examples, embodiments may rely on minor modifications to the memory bank.

The diagrams below depict a mechanism to shorten the word signal added to memory banks, thereby splitting a word line into a number of shorter portions.

In the following figures, various memory bank components wee omitted for clarity.

FIGS. 56-61 illustrate portions (denoted 5140(1), 5140(2), 5140(3), 5140(4), 5140(5), and 5149(6), respectively) of memory banks that include row decoder 5112 and multiple memory mats (such as 5150(1), 5150(2), 5150(3), 5150(4), 5150(5), 5150(6), 5151(1), 5151(2), 5151(3), 5151(4), 5151(5), 5151(6), 5152(1), 5152(2), 5152(3), 5152(4), 5152(5), and 5152(6)) that are grouped within different groups.

Memory mats that are arranged in a row may include different groups.

FIGS. 56-59 and 61 illustrates nine groups of memory mats, where each group includes a pair of memory mats. Any number of groups, each with any number of memory mats, may be used.

Memory mats 5150(1), 5150(2), 5150(3), 5150(4), 5150(5), and 5150(6) are arranged in a row, share multiple memory lines and are divided into three groups—a first upper group includes memory mats 5150(1) and 5150(2), a second upper group includes memory mats 5150(3) and 5150(4), and a third upper group includes memory mats 5150(5) and 5150(6).

Similarly, memory mats 5151(1), 5151(2), 5151(3), 5151(4), 5151(5), and 5151(6) are arranged in a row, share multiple memory lines and am divided into three groups—a first intermediate group includes memory mats 5151(1) and 5151(2), a second intermediate group includes memory mats 5151(3) and 5151(4), and a third intermediate group includes memory macs 5151(5) and 5151(6).

Moreover, memory mats 5152(1), 5152(2), 5152(3), 5152(4), 5152(5) and 5152(6) are arranged in a row, share multiple memory lines and are grouped to three groups—a first lower group includes memory mats 5152(1) and 5152(2), a second lower group includes memory mats 5152(3) and 5152(4), and a third lower group includes memory mats 5152(5) and 5152(6). Any number of memory mats may be arranged in a row and share memory lines and may be divided into any number of groups.

For example, the number of memory mats per group may be one, two, or may exceed two.

As explained above, an activation circuit may be configured to activate one group of memory mats without activating another group of memory mats that share the same memory lines—or at least are coupled to different memory line segments that have a same line address.

FIGS. 56-61 illustrates different examples of activation circuits. In some embodiments, at least a portion of the activation circuit (such as intermediate circuits) may be located between groups of memory mats to allow memory mats of one group to be activated while another group of memory mats of the same row is not activated.

Figure 56:
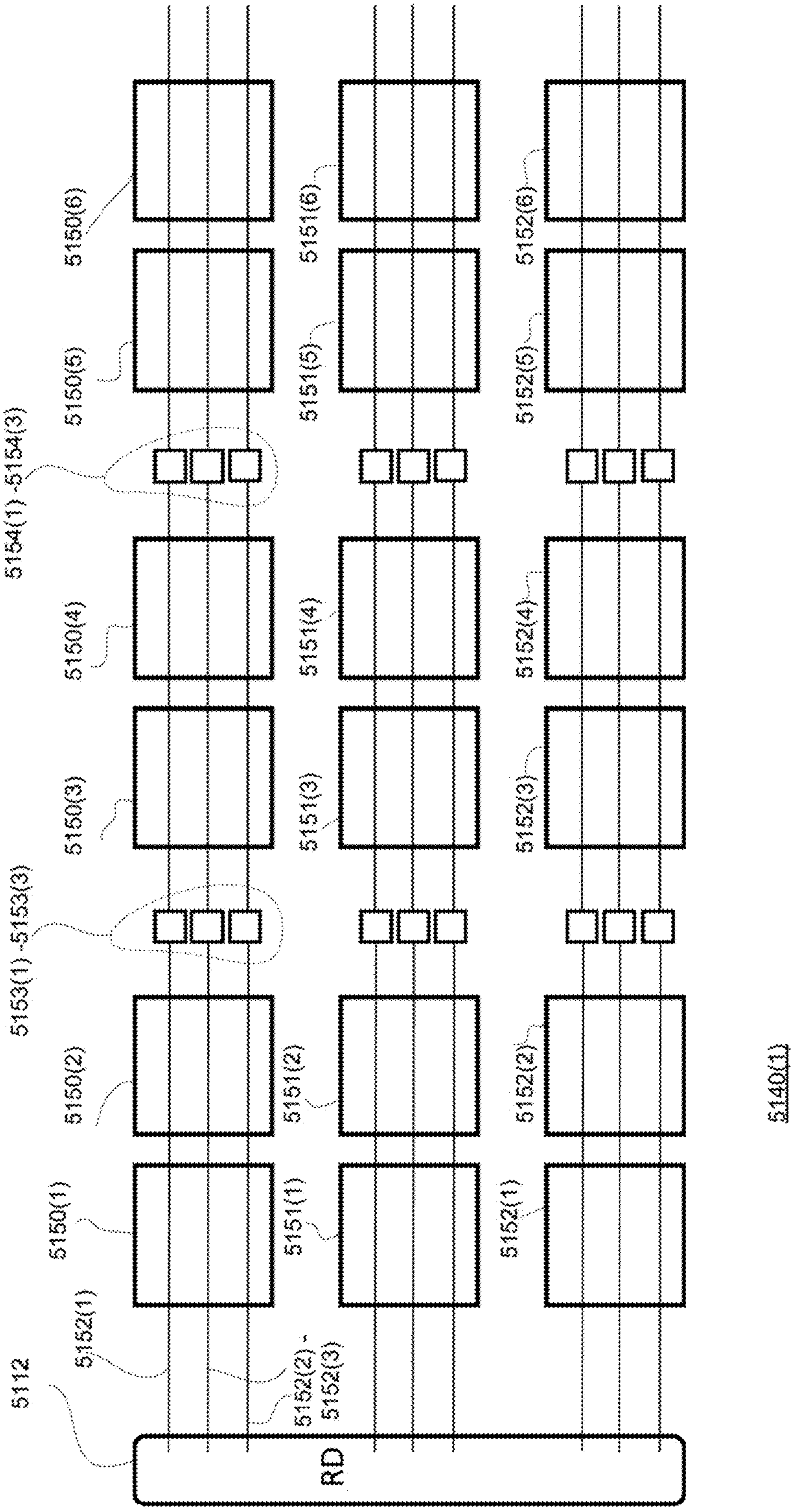
FIG. 56 illustrates an example memory chip with activation circuits for reducing power consumption during opening of a line, consistent with the present disclosure.

FIG. 56 illustrates intermediate circuits, such as delay or isolation circuits 5153(1)-5153(3), as positioned between different lines of the first upper group of memory and of the second upper group of memory mats.

FIG. 56 also illustrates intermediate circuits, such as delay or isolation circuits 5154(1)-5154(3), as positioned between different lines of second upper group of memory and of third upper group of memory mats. Additionally, some delay or isolation circuits are positioned between groups formed from memory mats of the intermediate groups. Moreover, some delay or isolation circuits are positioned between groups formed from memory mats of the lower groups.

The delay or isolation circuits may delay or stop a word line signal from the row decoder 5112 from propagating along a row to another group.

Figure 57:
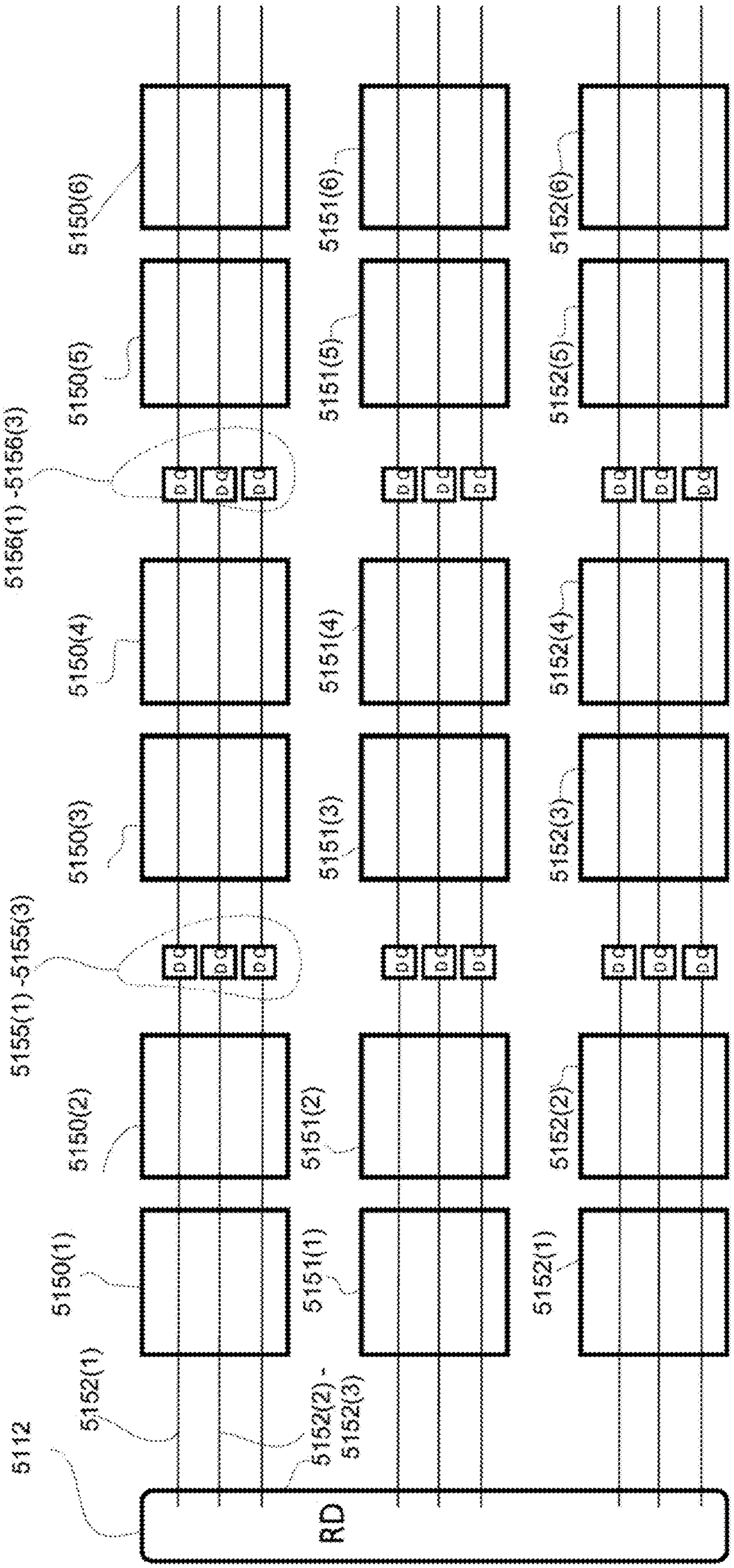
FIG. 57 illustrates another example memory chip with activation circuits for reducing power consumption during opening of a line, consistent with the present disclosure.

FIG. 57 illustrates intermediate circuits, such as delay or isolation circuits, that comprise flip-flops (such as 5155(1)-5155(3) and 5156(1)-5156(3)).

When an activation signal is injected to a word line, one of the first groups of mats (depending on the word line) is activated while the other groups along the word line remain deactivated. The other groups may be activated at the next clock cycle. For example, second groups of the other groups may be activated at the next clock cycle, and third groups of the other groups may be activated after yet another clock cycle.

The flipflops may comprise D-type flip-flops or any other type of flip-flop. The clock fed to the D-type flip-flop is omitted from the drawing for simplicity.

Thus, access to the first groups may use power to charge only the part of the word line associated with the first group, which is faster than charging the entire word line and requires less current.

More than one flip-flop may be used between groups of memory mats, thereby increasing the delay between opening parts. Additionally or alternatively, embodiments may use a slower clock to increase the delay.

Moreover, the groups that are activated may still contain groups from the previous line value that was used. For example, the method may allow activating a new line segment while still accessing data of the previous line, thereby reducing the penalty associated with activating a new line.

Accordingly, some embodiments may have a first group that is activated and allow other groups of the previously activated line to remain active with the signals of the bitlines not interfering with each other.

Additionally, some embodiments may include switches and a control signals. The control signals may be controlled by the bank controller or by adding flip-flops between control signals (e.g., generating the same timing effect that the mechanism described above had).

Figure 58:
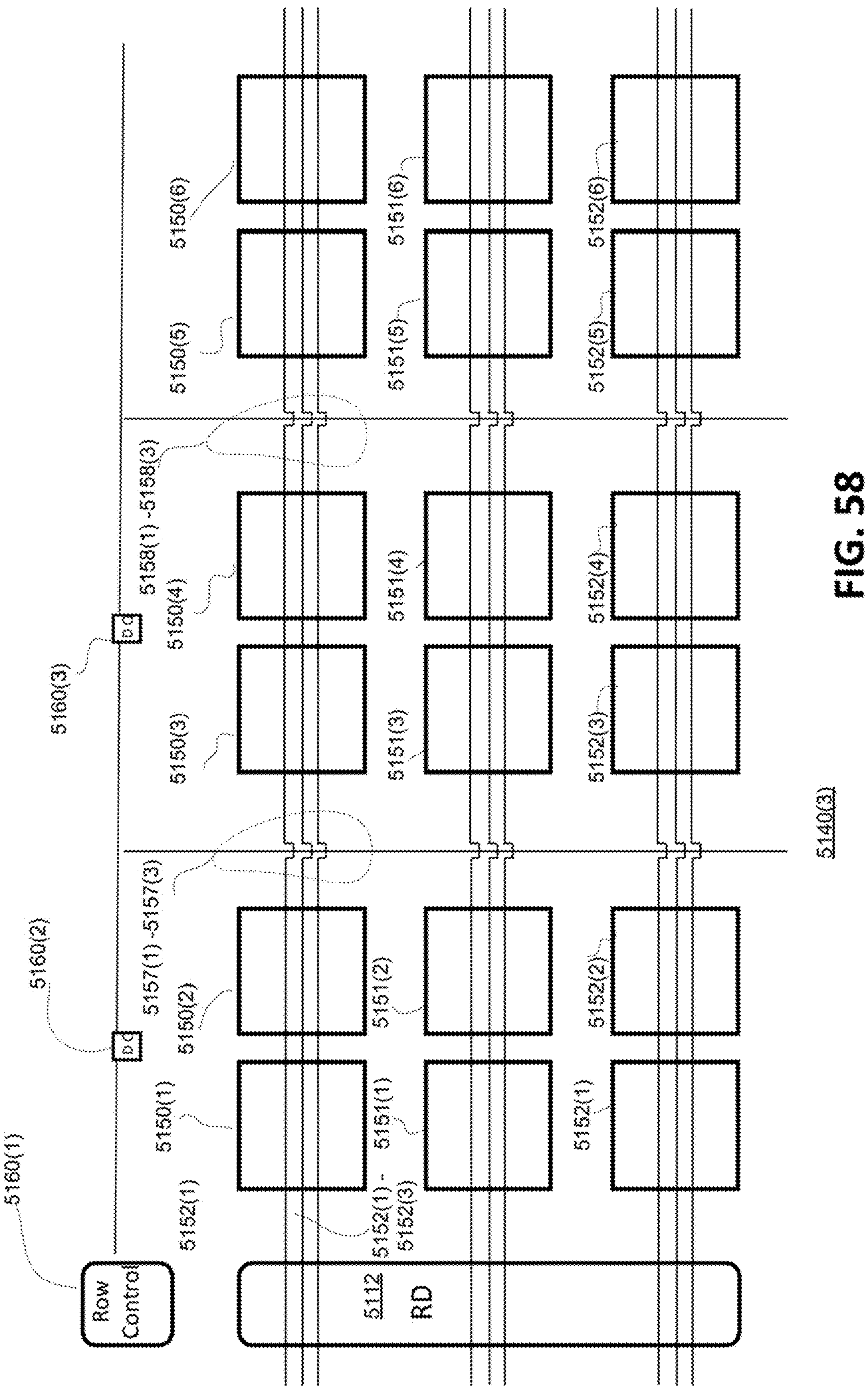
FIG. 58 illustrates yet another example memory chip with activation circuits for reducing power consumption during opening of a line, consistent with the present disclosure.

FIG. 58 illustrates intermediate circuits, such as delay or isolation circuits, that are switches (such as 5157(1)-5157(3) and 5158(1)-5158(3)) and positioned between one group of another. A set of switches positioned between groups may be controlled by a dedicated control signal. In FIG. 58 the control signal may be sent by a row control unit 5160(1) and delayed by a sequence of one or more delay units (e.g., units 5160(2) and 5160(3)) between different sets of switches.

Figure 59:
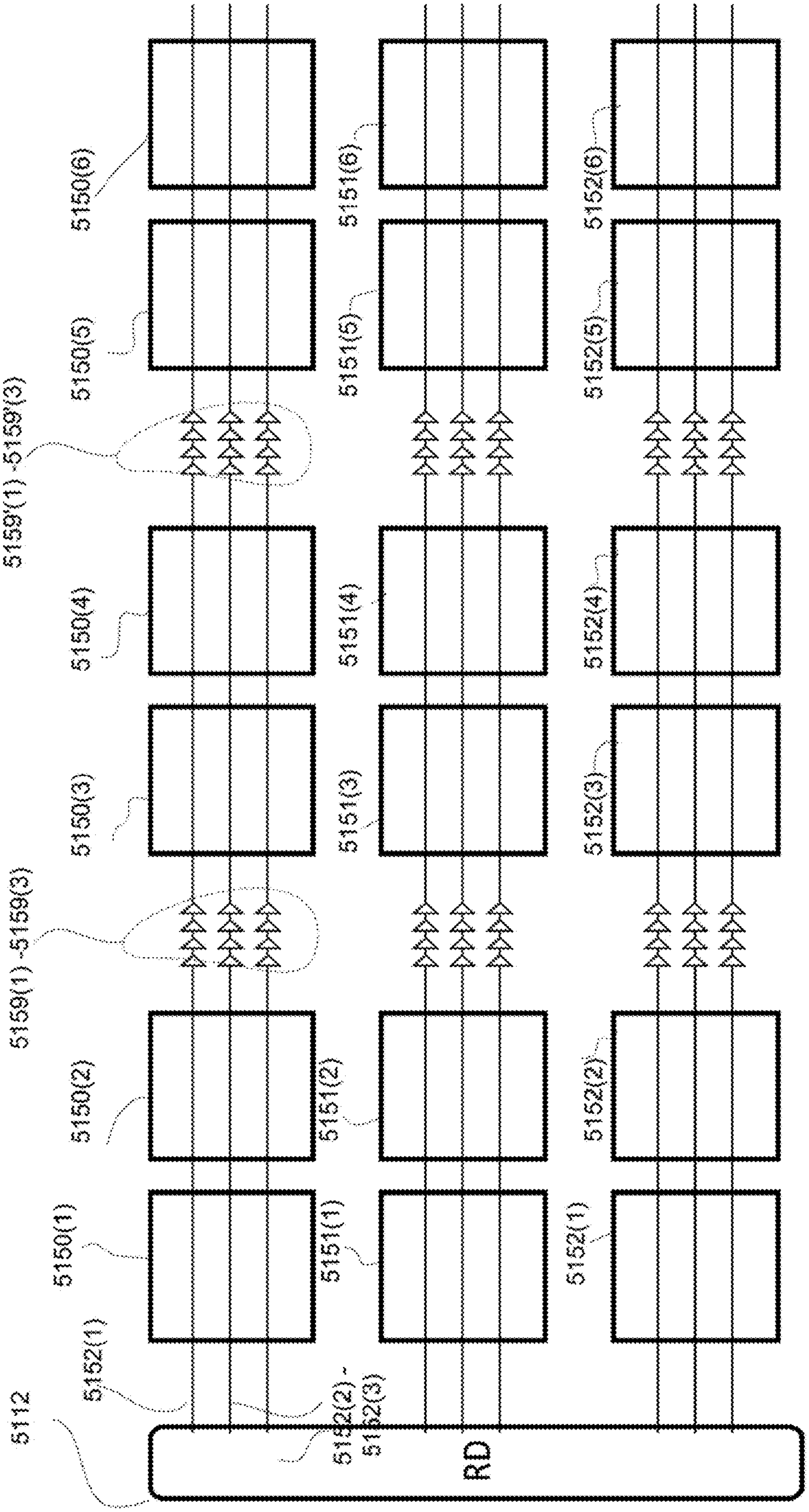
FIG. 59 illustrates an additional example memory chip with activation circuits for reducing power consumption during opening of a line, consistent with the present disclosure.

FIG. 59 illustrates intermediate circuits, such as delay or isolation circuits, that are sequences of inverter gates or buffers (such as 5159(1)-5159(3) and 5159'1(0-5159'(3)) and positioned between groups of memory mats.

Instead of switches, buffers may be used between groups of memory mats. Buffers may allow not dropping voltage along the word line from switch to switch, which is an effect that sometimes occurs when using the single transistor structure.

Other embodiments may allow for more random access and still provide very low activation power and time by using added area to the memory bank.

Figure 60:
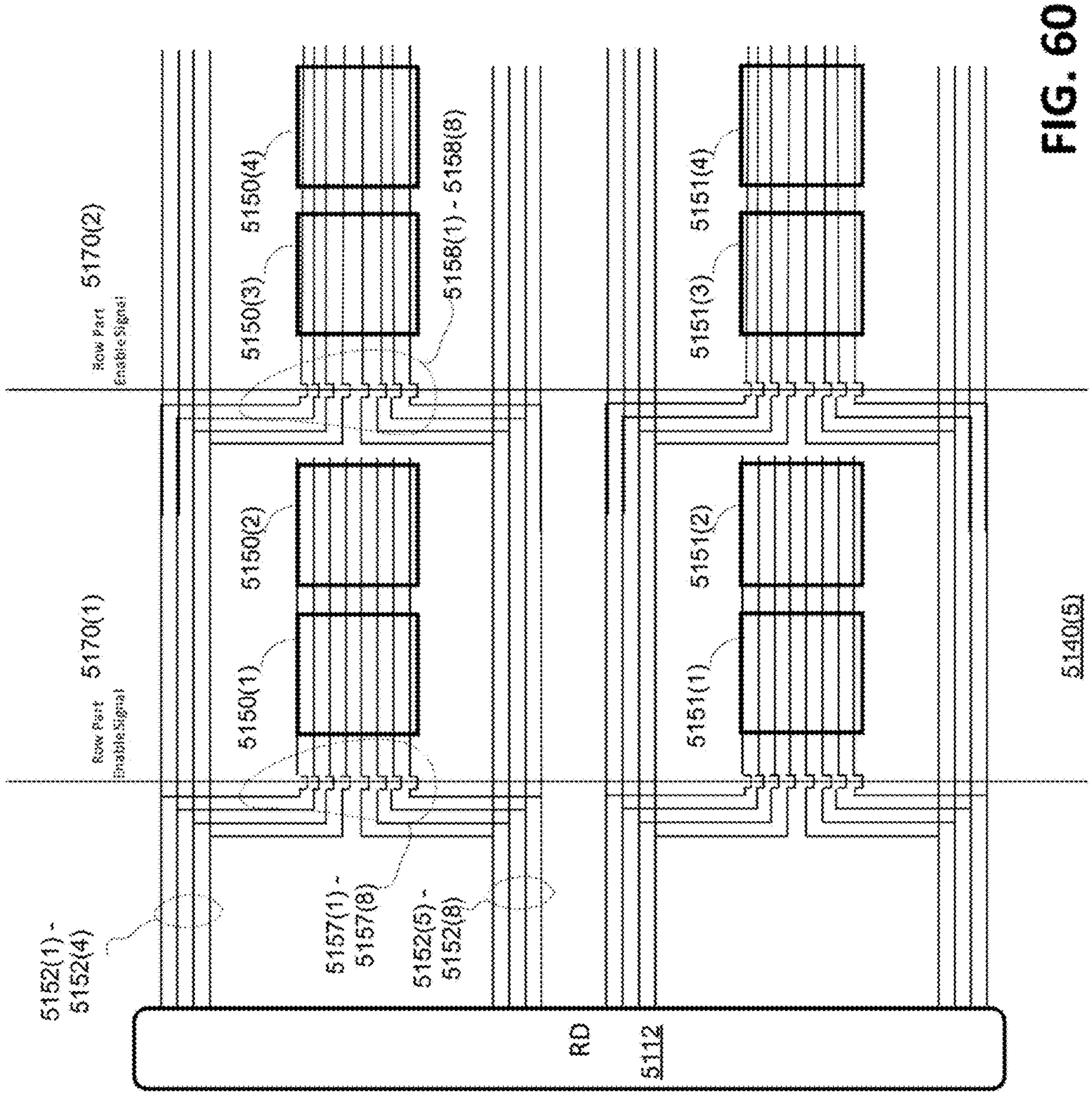
FIG. 60 illustrates an example memory chip with a global word line and local word lines for reducing power consumption during opening of a line, consistent with the present disclosure.

An example is shown in FIG. 60, which illustrates using global word lines (such as 5152(1)-5152(8)) positioned in proximity to the memory mats. These word lines may or may not pass through the memory mats and are coupled via intermediate circuits, such as switches (such as 5157(1)-5157(8)), to word lines within the memory mats. The switches may control which memory mat will be activated and allow a memory controller to activate, at each point of time, only the relevant line part. Unlike embodiments using a sequential activation of line portions described above, the example of FIG. 60 may provide greater control.

Enable signals, such as row part enable signals 5170(1) and 7150(2), may originate from logic, such as a memory controller, that is not shown.

FIG. 61 illustrates that the global word lines 5180 pass through the memory mats and form bypass paths for the word line signals, which may not need to be routed outside the mat. Accordingly, the embodiments shown in FIG. 61 may reduce the area of the memory bank at a cost of some memory density.

In FIG. 61, the global world line may pass uninterrupted through a memory mat and may not be connected to memory cells. A local word line segment may be controlled by one of the switches and connected to memory cells in the mat.

When the groups of memory mats provide a substantial partition of the word lines, the memory bank may virtually support full random access.

Another embodiment for slowing the spreading of the activation signal along a word line, that also may save some wiring and logic, uses switches and/or other buffering or isolating circuits between memory mats without using dedicated enable signals and dedicated lines for conveying the enable signals.

For example, a comparator may be used to control switches or other buffering or isolating circuits. The comparator may activate the switch or other buffering or isolating circuit when the level of signal on the word line segment monitored by the comparator reaches a certain level. For example, the certain level may indicate that the previous word line segment was fully loaded.

Figure 62:
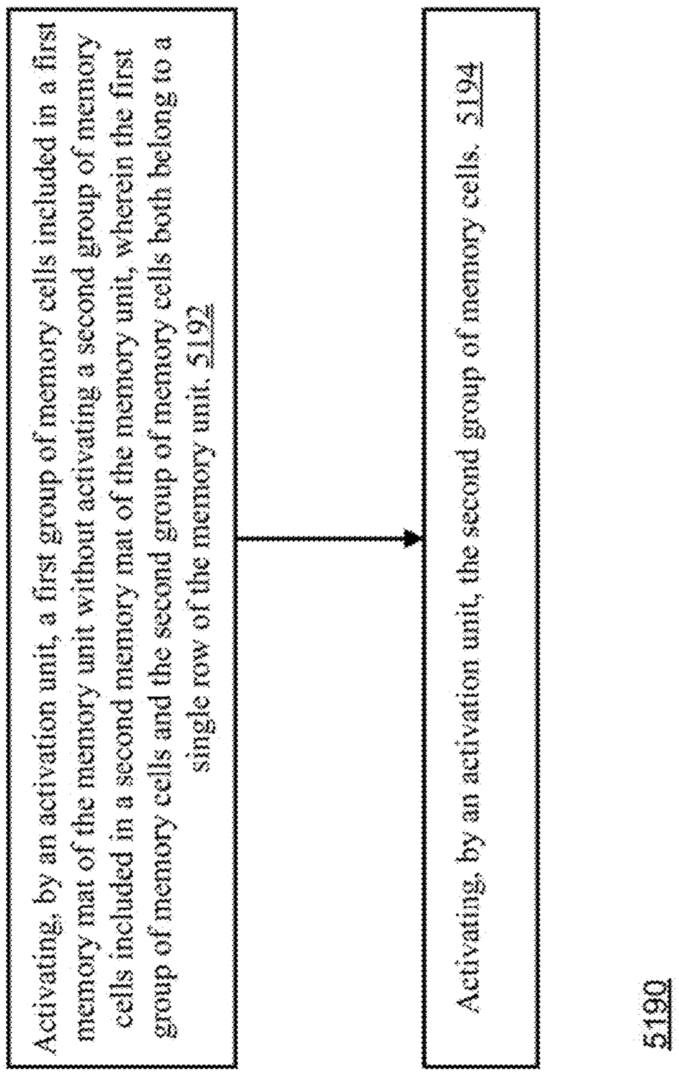
FIG. 62 is an example flowchart of a process for sequential opening of lines in a memory, consistent with the present disclosure.

FIG. 62 illustrates a method 5190 for operating a memory unit. For example, method 5130 may be implemented using any of the memory banks described above with respect to FIGS. 56-61.

Method 5190 may include steps 5192 and 5194.

Step 5192 may include activating, by an activation unit, a first group of memory cells included in a first memory mat of the memory unit without activating a second group of memory cells included in a second memory mat of the memory unit. The first group of memory cells and the second group of memory cells may both belong to a single row of the memory unit.

Step 5194 may include activating, by an activation unit, the second group of memory cells, e.g., after step 5192.

Step 5194 may be executed while the first group of memory cells are activated, after a full activation of the first group of memory cells, following expiration of a delay period initiated after activation of the first group of memory cells has been completed after the first group of memory cells are deactivated, and the like.

The delay period may be fixed or may be adjusted. For example, the duration of the delay period may be based on an expected access pattern of the memory unit or may be set regardless of the expected access pattern. The delay period may range between less than one millisecond and more than one second.

In some embodiments, step 5194 may be initiated based on a value of a signal developed on a first word line segment coupled to the first group of memory cells. For example, when a value of the signal exceeds a first threshold, it may indicate that the first group of memory cells are fully activated.

Either one of steps 5192 and 5194 may involve using an intermediate circuit (e.g., of the activation unit) disposed between a first word line segment and a second word line segment. The first word line segment may be coupled to the first memory cells and the second word line segment may be coupled to the second memory cells.

Examples of an intermediate circuit are illustrated throughout FIGS. 56-61.

Steps 5192 and 5194 may further include controlling, by a control unit, a supply to the first group of memory cells and to the second group of memory cells of an activation signal from a word line associated with the single row.

Using Memory Parallelism to Speedup Testing Times and Testing Logic in Memory Using Vectors Some embodiments of the present disclosure may speed up testing using in chip testing units.

Generally, memory chips testing requires significant testing time. Reducing testing time can reduce cost of production and also allow for more testing, leading to a more reliable product.

Figure 63:
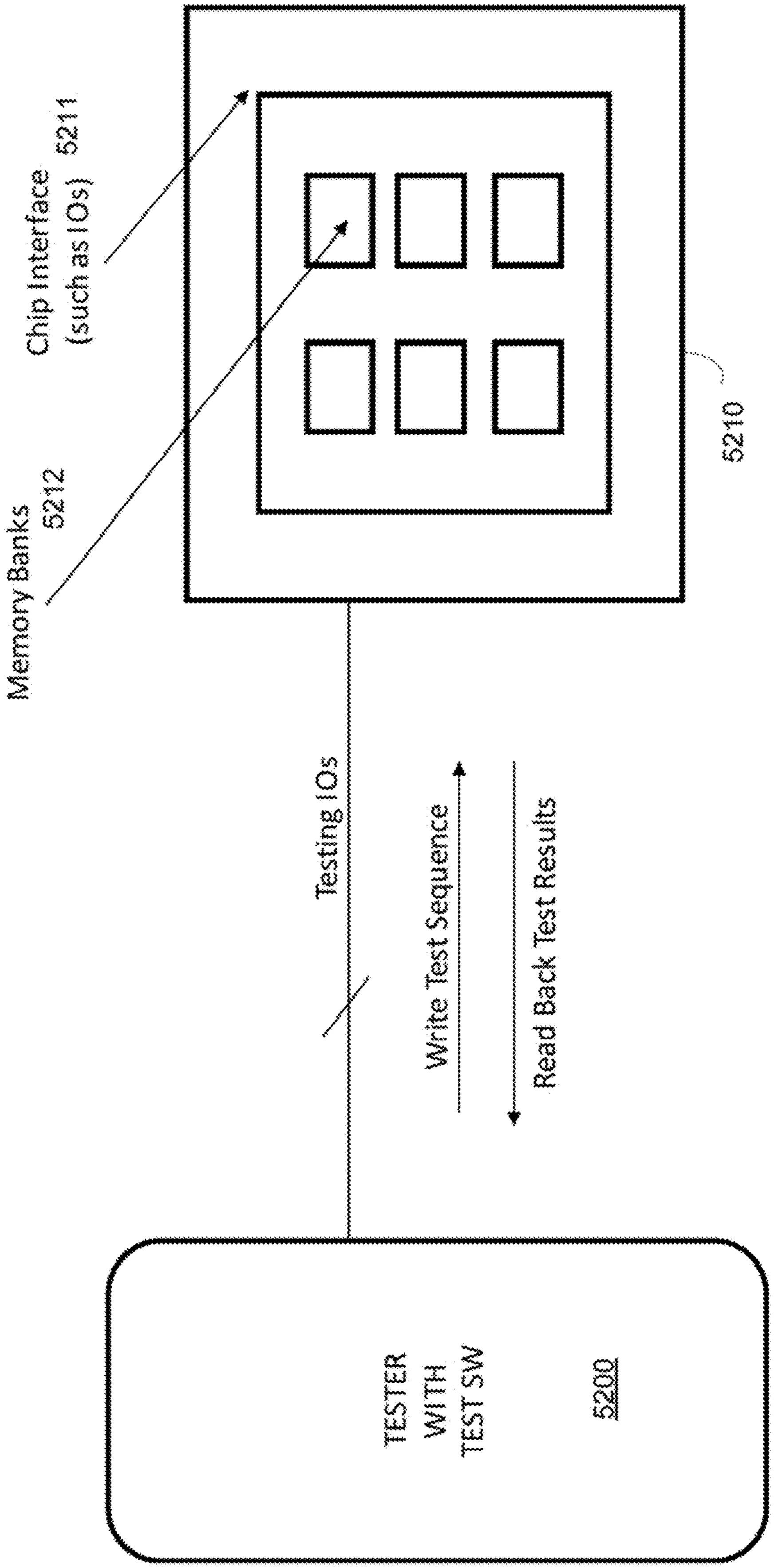
FIG. 63 illustrates an existing tester for memory chips.
Figure 64:
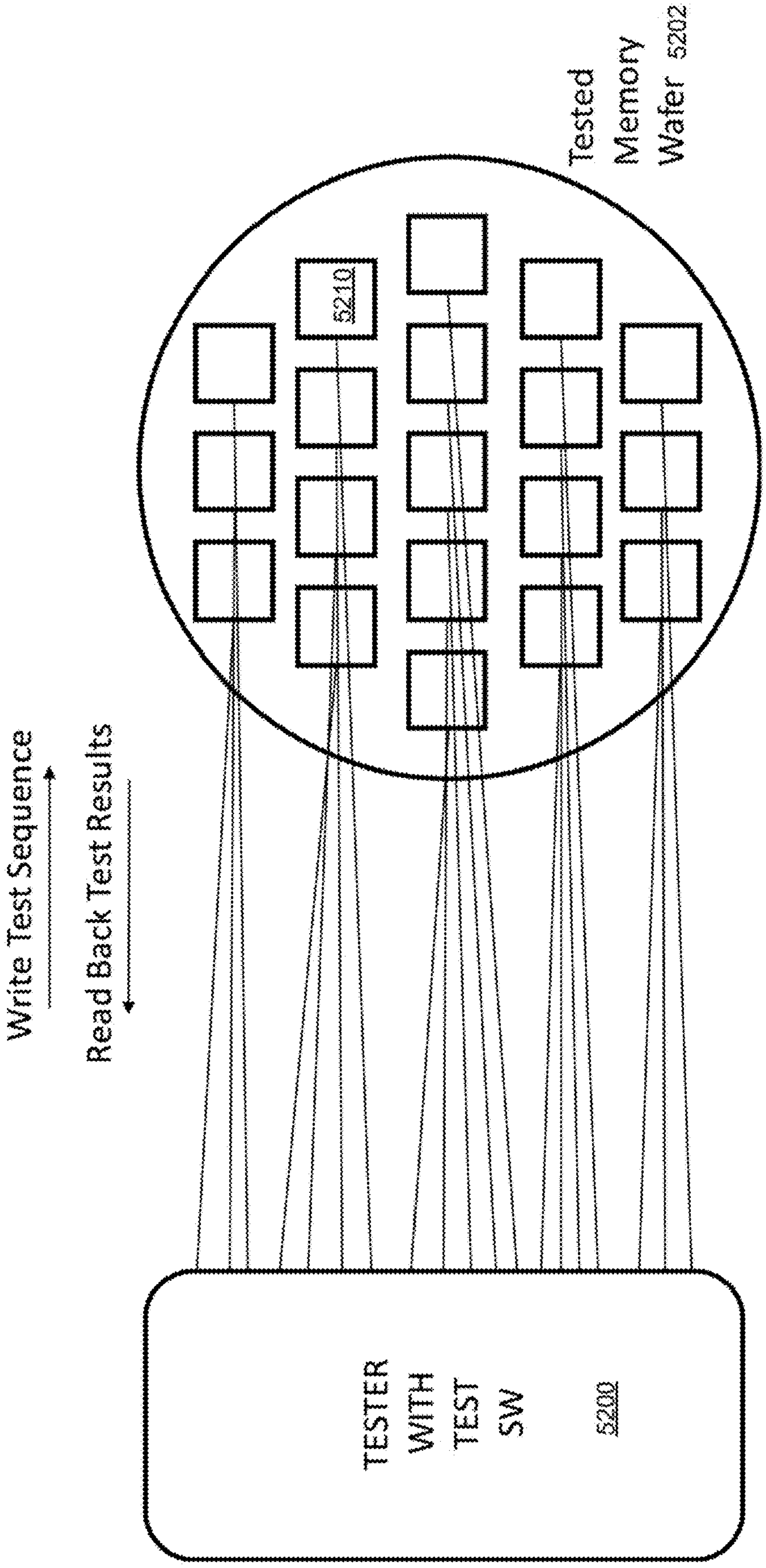
FIG. 64 illustrates another existing tester for memory chips.

FIGS. 63 and 64 illustrate a tester 5200 and a chip (or a wafer of chips) 5210. The tester 5200 may include software that manages the testing. The tester 5200 may run different sequences of data to all of memory 5210 and then read the sequences back to identify where failed bits of memory 5210 are located. Once recognized, the tester 5200 may issue a command to fix the bits, and if it was able to fix the problem, tester 5200 may declare memory 5210 as passed. In other cases, some chips may be declared as failed.

The tester 5200 may write test sequences and then read back the data to compare it to expected results.

FIG. 64 shows a test system with a tester 5200 and a full wafer 5202 of chips (such as 5210) being tested in parallel. For example, the tester 5200 may connect to each of the chips with a bus of wires.

As shown in FIG. 64, the tester 5200 has to read and write all of the memory chips a few times, and that data must be passed through the external chip interface.

Moreover, it may be beneficial to test both logic and memory banks of an integrated circuit, e.g., using programmable configuration information that may be provide using regular V/O operations.

The testing may also benefit from the presence of testing units within the integrated circuit.

The testing units may belong to the integrated circuit and may analyze a results of the test and find, for example, failures in logic (e.g., processor subunits as depicted in FIG. 7A and described) and/or memory (e.g., across a plurality of memory banks).

Memory testers are usually very simple and exchange test vectors with integrated circuits according to a simple format. For example, there may be write vectors that include pairs of addresses of memory entries to be written and the values to be written to the memory entries. There may also be a read vector that includes addresses of memory entries to be read. At least some of the addresses of the write vectors may be the same as at least some addresses of the read vectors. At least some other addresses of the write vectors may differ from at least some other addresses of the read vectors. When programmed, the memory testers may also receive an expected result vector that may include the addresses of memory entries to be read and the expected values to be read. The memory tester may compare the expected values to the values it reads.

According to an embodiment, the logic (e.g., processor subunits) of an integrated circuit (with or without the memory of the integrated circuit) may be tested by a memory tester using the same protocol\format. For example, some of the values in the write vector may be commands to be executed by the logic (and may, for example, involve calculations and/or memory access) of the integrated circuit. The memory tester may be programmed with the read vector and the expected result vector that may include memory entry addresses—at least some of which store expected values of the calculations. Thus, the memory tester may be used for testing the logic as well as the memory. Memory testers are usually much simpler and cheaper than logic testers, and the proposed methods allow for performing complex logic tests using a simple memory tester.

In some embodiments, a logic within the memory may enable testing of logic within the memory by using only vectors (or other data structures) and not more complex mechanisms common in logic testing (such as communicating with the controller, for example, through an interface, telling the logic which circuit to test).

Instead of using testing units, the memory controllers may be configured to receive instructions to access memory entries included in configuration information and execute the access instructions and output results.

Any of the integrated circuits illustrated in FIGS. 65-69 may execute the tests—even in the absence of testing units—or in the presence of testing units not capable to perform tests.

Embodiments of the present disclosure may include a method and system that use the parallelism of the memory and the internal chip bandwidth to speed up and improve test times.

The method and system may be based on a memory chip testing itself (as opposed to a tester running the test, reading results of the test, and analyzing the results), saving the results, and eventually allowing the tester to read them (and, if needed, to program the memory chip back, e.g., to activate redundancy mechanisms). The testing may include testing the memory or testing the memory banks and the logic (in case of a computational memory that has functional logic portions to test, such as that described above in FIG. 7A).

In one embodiments, the method may include reading and writing data within the chip such that external bandwidth does not limit the test.

In embodiments where the memory chip includes processor subunits, each processor subunit may be programmed with a test code or configuration.

In embodiments where the memory chip has processor subunits that cannot execute a test code or is without processor subunits but has memory controllers, then the memory controllers may be configured to read and write patterns (e.g., programmed to the controllers externally) and mark locations of faults (for example, writing a value to a memory entry, reading the entry, and receiving a value that differs from the written value) for further analysis.

It should be noted that the testing of a memory may require testing a vast number of bits, for example, testing each bit of the memory and verifying that the tested bits are functional. Moreover, sometimes the memory testing may be repeated under different voltage and temperature conditions.

For some defects, one or more redundancy mechanisms may be activated (e.g., by programming flash or OTP or burning fuses). In addition, the logic and analog circuits of the memory chips (e.g., controllers, regulators, I/Os) may also have to be tested.

In one embodiment, an integrated circuit that may include a substrate, a memory array disposed on the substrate, a processing array disposed on the substrate, and an interface disposed on the substrate.

The integrated circuits described herein may be included in, may include, or otherwise comprise a memory chip as illustrated in any one of FIG. 3A, 3B, 4-6, 7A-7D, 11-13, 16-19, 22, or 23.

FIGS. 65-69 illustrates various integrated circuits 5210 and tester 5200.

Figure 66:
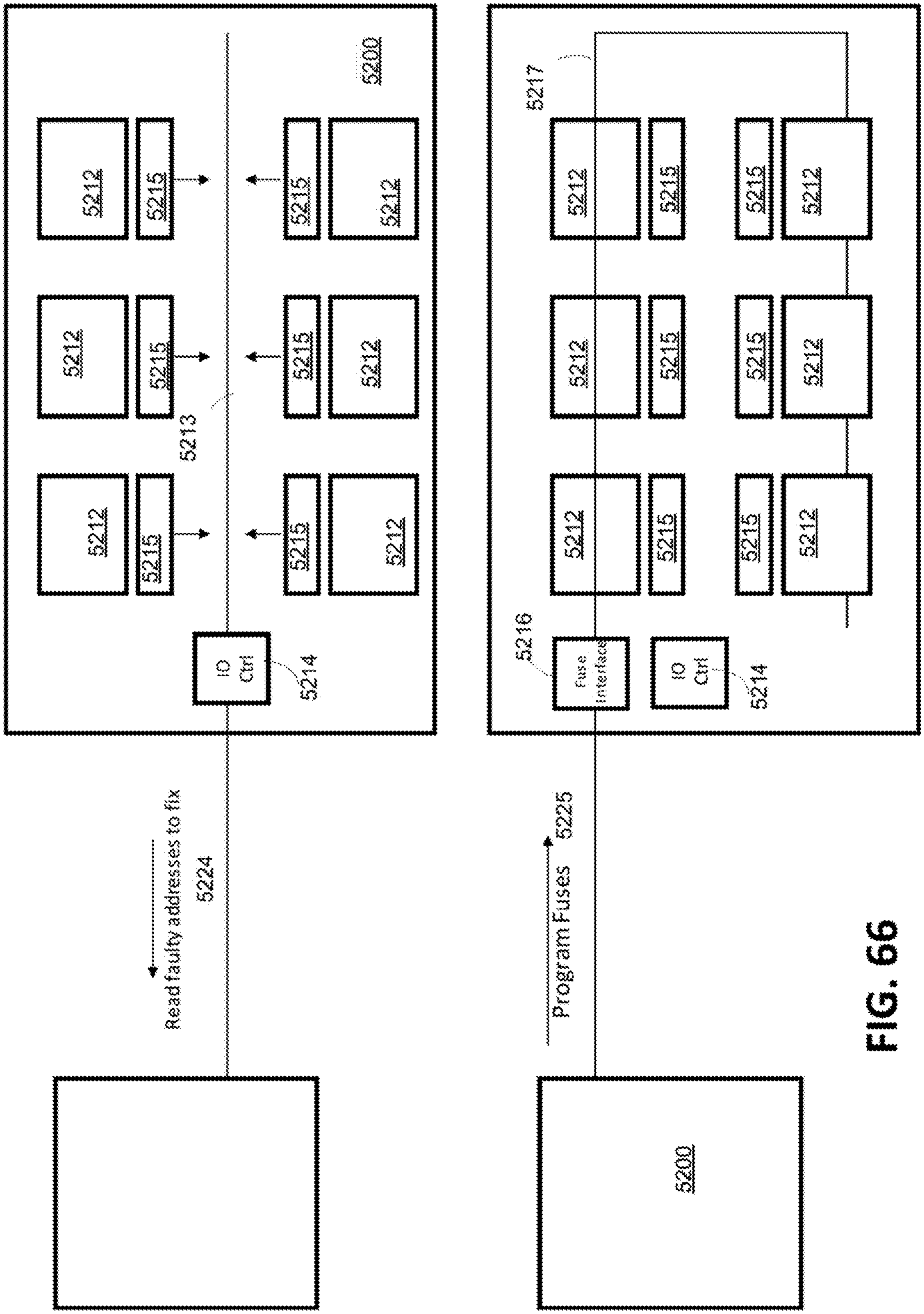
FIG. 66 illustrates another example of testing memory chips using logic units on the same substrate as the memory, consistent with the present disclosure.
Figure 67:
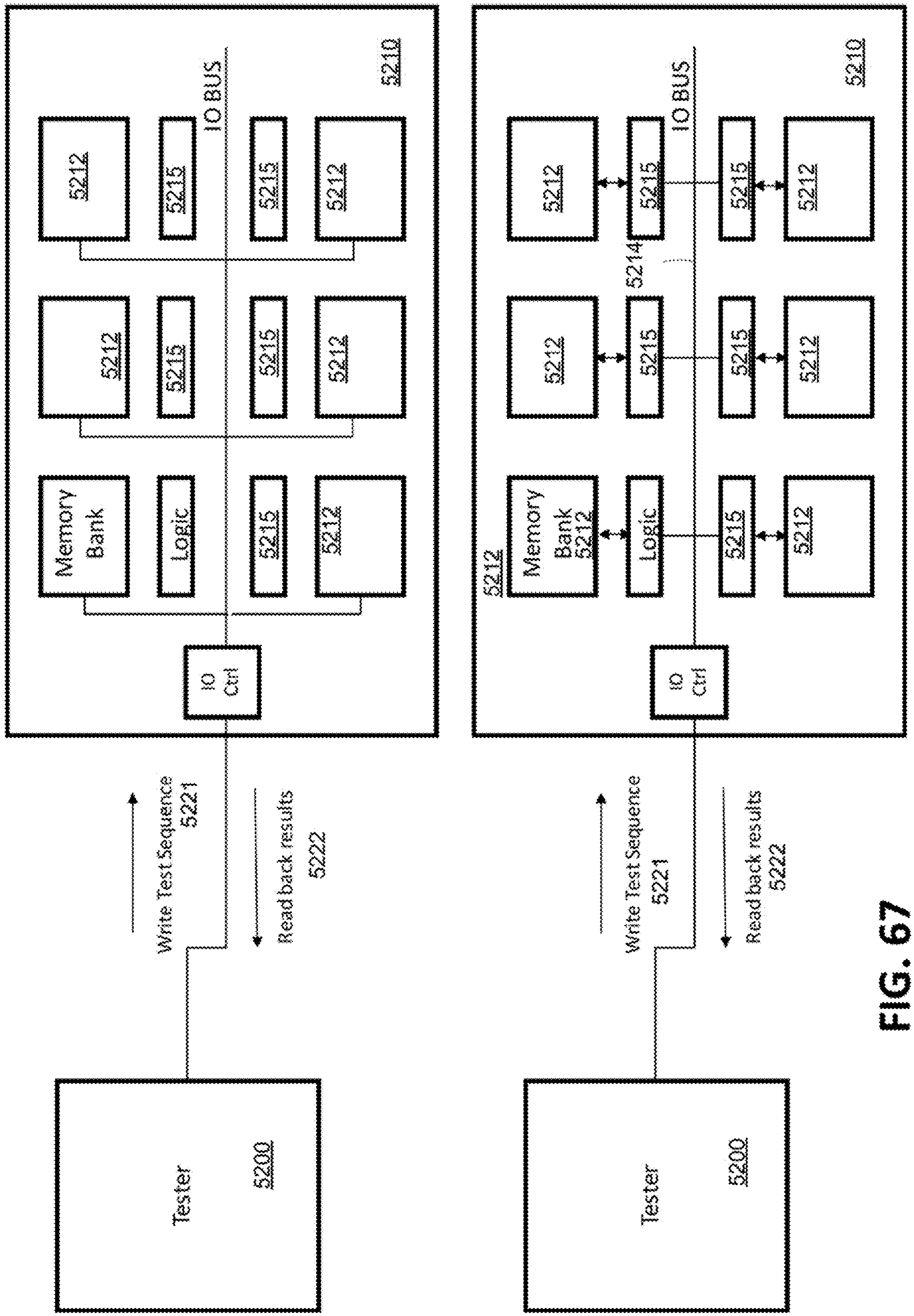
FIG. 67 illustrates yet another example of testing memory chips using logic units on the same substrate as the memory, consistent with the present disclosure.

The integrated circuit is illustrated as including memory banks 5212, a chip interface 5211 (such as I/O controller 5214 and bus 5213 shared by the memory banks), and logic unit (hereinafter "logic") 5215. FIG. 66 illustrates a fuse interface 5216 and a bus 5217 coupled to the fuse interface and the different memory banks.

FIGS. 65-70 also illustrate various steps in a testing process—such as:

a. write test sequence 5221 (FIGS. 65, 67, 68 and 69);
b. read back test results 5222 (FIGS. 67, 68 and 69);
c. write expected results sequence 5223 (FIG. 65);
d. read faulty addresses to fix 5224 (FIG. 66); and
e. program fuses 5225 (FIG. 66).

Each memory bank may be coupled to and/or controlled by its own logic unit 5215. However, as described above, any allocation of memory banks to logic unit 5215 may be provided. Thus, the number of logic units 5215 may differ from the number of memory banks, a logic unit may control more than a single memory bank or a fraction of a memory bank, and the like.

Figure 65:
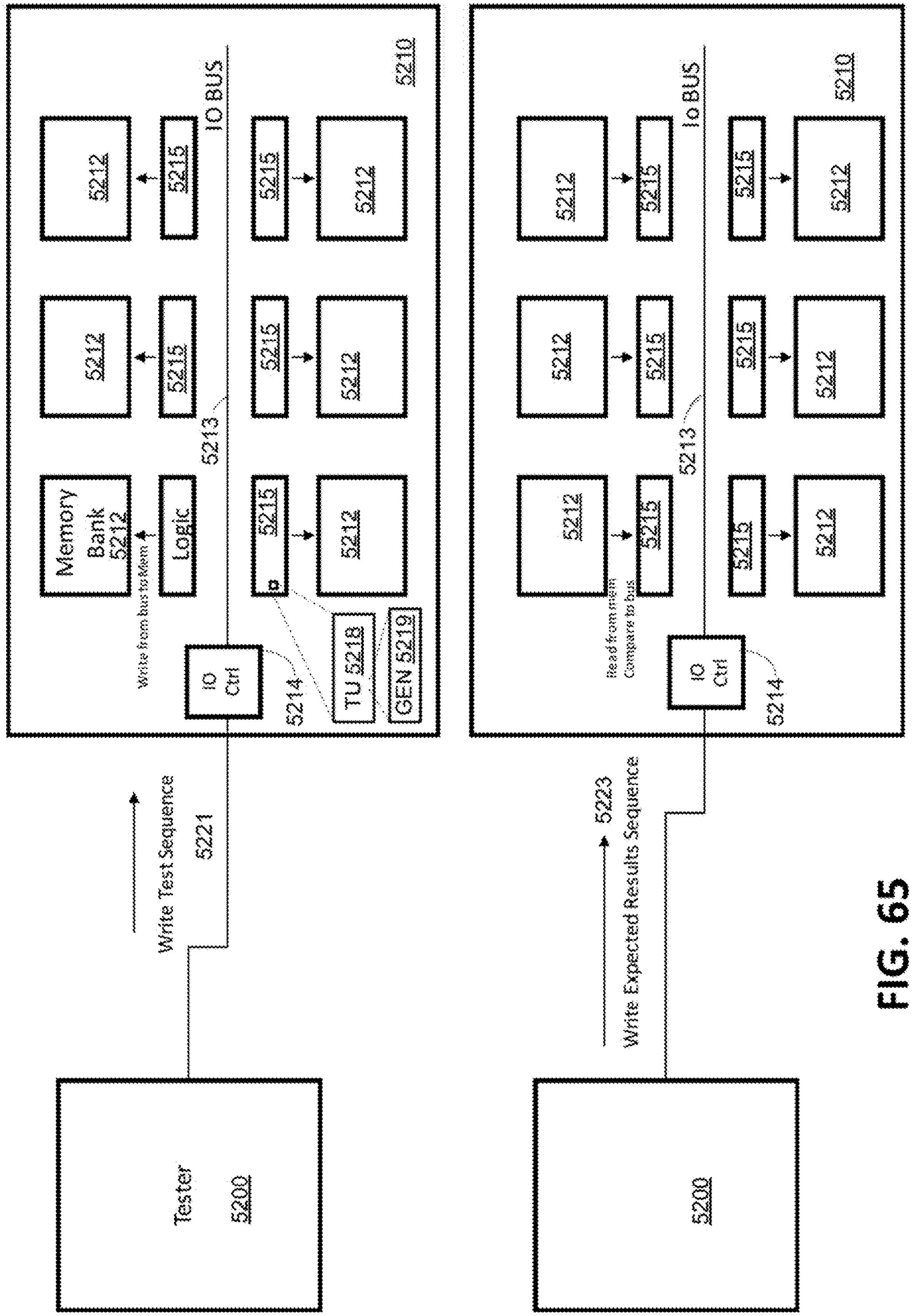
FIG. 65 illustrates an example of testing memory chips using logic units on the same substrate as the memory, consistent with the present disclosure.

The logic unit 5215 may include one or more testing units. FIG. 65 illustrates a testing unit (TU) 5218 within logic 5215. A TU may be included in all or some of the logic units 5212. It should be noted that the testing unit may be separate from the logic unit or integrated with the logic unit.

FIG. 65 also illustrates a test patter generator (denoted GEN) 5219 within TU 5218.

A test pattern generator may be included in all or some of the testing units. For simplicity, test patter generators and testing units are not illustrated in FIGS. 66-70 but may be included in such embodiments.

The memory array may include multiple memory banks. Moreover, the processing army may include a plurality of testing units. The plurality of testing units may be configured to test the multiple memory banks to provide test results. The interface may be configured to output, to a device external to the integrated circuit, information indicative of the test results.

The plurality of testing units may include at least one test pattern generator configured to generate at least one test pattern for use in testing one or more of the multiple memory banks. In some embodiments, as explained above, each of the plurality of testing units may include a test pattern generator configured to generate a test pattern for use by a particular one of the plurality of testing units to test at least one of the multiple memory banks. As indicated above, FIG. 65 illustrates a test pattern generator (GEN) 5219 within a testing unit. One or more or even all logic units may include the test pattern generator.

The at least one test pattern generator may be configured to receive instructions from the interface for generating the at least one test pattern. A test pattern may include memory entries that should be accessed (e.g., read and/or written) during a test and/or values to be written to the entries, and the like.

The interface may be configured to receive, from an external unit that may be external to the integrated circuit, configuration information including the instructions for generating the at least one test pattern.

The at least one test pattern generator may be configured to read configuration information including instructions for generating the at least one test pattern from the memory array.

In some embodiments, the configuration information may include a vector.

The interface may be configured to receive, from a device that may be external to the integrated circuit, configuration information that may include instructions that may be the at least one test pattern.

For example, at least one test pattern may include memory array entries to be accessed during the testing of the memory array.

The at least one test pattern further may include input data to be written to the memory arrays entries accessed during the testing of the memory array.

Additionally or alternatively, at least one test pattern further may include input data to be written to the memory array entries accessed during the testing of the memory array and expected values of output data to be read from the memory array entries accessed during the testing of the memory array.

In some embodiments, the plurality of testing units may be configured to retrieve, from the memory array, test instructions that once executed by the plurality of testing units cause the plurality of testing units to test the memory array.

For example, the test instructions may be included in configuration information.

The configuration information may include expected results of the testing of the memory array.

Additionally or alternatively, the configuration information may include values of output data to be read from memory array entries accessed during the testing of the memory array.

Additionally or alternatively, the configuration information may include a vector.

In some embodiments, the plurality of testing units may be configured to retrieve, from the memory array, test instructions that once executed by the plurality of testing units cause the plurality of testing units to test the memory array and to test the processing array.

For example, the test instructions may be included in configuration information.

The configuration information may include a vector.

Additionally or alternatively, the configuration information may include expected results of the testing of the memory array and of the processing array.

In some embodiments, as described above, the plurality of testing units may lack a test pattern generator for generating a test pattern used during the testing of the multiple memory banks.

In such embodiments, at least two of the plurality of testing units may be configured to test in parallel at least two of the multiple memory banks.

Alternatively, at least two of the plurality of testing units may be configured to test in series at least two of the multiple memory banks.

In some embodiments, the information indicative of the test results may include identifiers of faulty memory array entries.

In some embodiments, the interface may be configured to retrieve multiple times, during the testing of the memory array, partial test results obtained by the plurality of testing circuits.

In some embodiments, the integrated circuit may include an error correction unit configured to correct at least one error detected during the testing of the memory array. For example, the error correction unit may be configured to fix memory errors using any appropriate technique, for example, by disabling some memory words and replacing them with redundant words.

In any of the embodiments described above, the integrated circuit may be a memory chip.

For example, integrated circuit may include a distributed processor, wherein the processing array may include a plurality of subunits of the distributed processor, as depicted in FIG. 7A.

In such embodiments, each one of the processor subunits may be associated with a corresponding, dedicated one of multiple memory banks.

In any of the embodiments described above, the information indicative of the test results may indicate a status of at least one memory bank. The status of a memory bank may be provided in one or more granularities—per memory word, per a group of entries, or per the entire memory bank.

FIGS. 65-66 illustrates four steps in a tester testing phase.

In the first step, the tester writes (5221) the test sequence and the logic units of the banks write the data to their memories. The logic may also be complex enough to receive a command from the tester and generate the sequence on its own (as explained below).

In the second step, the tester writes (5223) to the tested memory the expected results and the logic units compare the expected results to data read from their memory banks, saving a list of errors. Writing the expected results may be simplified if the logic is complex enough to generate on its own the sequence of expected results (as explained below).

In the third step, the tester reads (5224) from the logic units the faulty addresses.

In the fourth step, the tester acts (5225) upon the results and can fix the errors. For example, it may connect to a specific interface to program fuses in the memory but can also use any other mechanism that allows for programming an error correction mechanism within the memory.

In such embodiments, the memory testers may use vectors to test the memory.

For example, each vector may be built from an input series and an output series.

The input series may include pairs of address and data to write to the memory (in many embodiments, this series could be modeled as a formula that allows a program, such as one executed by the logic units, to generate it when needed).

In some embodiments, a test pattern generator may generate such vectors.

It should be noted that a vector is an example data structure but some embodiments may use other data structures. The data structures may be compliant with other test data structures generated by testers located outside the integrated circuit.

The output series may include address and data pairs comprising expected data to be read back from the memory (in some embodiments, the series could additionally or alternatively be generated by a program at runtime, e.g., by the logic units).

Memory testing usually includes executing a list of vectors, each vector writing data to the memory according to the input series and then reading data back according to the output series and comparing it to its expected data.

In case of a mismatch, the memory may be either classifies as faulty or, if the memory includes mechanisms for redundancy, may have the redundancy mechanisms activated such that the vectors are tested again on the activated redundancy mechanisms.

In embodiments where memories include processor subunits (as described above with respect to FIG. 7A) or contain many memory controllers, the entire test may be handled by the logic units of the banks. Thus, a memory controller or processor subunit may perform the tests.

The memory controller may be programmed from the tester, and the results of the test may be saved in the controller itself to later be read by the tester.

To configure and test the operation of the logic unit, the tester may configure the logic unit for memory access and confirm that the results can be read by the memory access.

For example, an input vector may contain programming sequences for the logic unit, and the output vector may contain expected results of such testing. For example, if a logic unit such as a processor subunit comprises a multiplier or adder configured to perform computations on two addresses in the memory, an input vector may include a set of commands that writes data to the memory and a set of commands to the adder/multiplier logic. As long as the adder/multiplier results can be read back to an output vector, the results may be sent to the teste.

The testing may further include loading the logic configuration from the memory and having the logic output sent to the memory.

In embodiments where the logic unit loads its configuration from the memory (e.g., if the logic is a memory controller), the logic unit may run its code from the memory itself.

Accordingly, the input vector may include a program for the logic unit, and the program itself may test various circuits in the logic unit.

Thus, the testing may not be limited to receiving vectors in formats used by external testers.

If the commands that are loaded to the logic unit instruct the logic unit to write back results into the memory bank, then the tester may read those results and compare them to an expected output series.

For example, the vector written to the memory may be or may include a test program for the logic unit (e.g., the testing may assume the memory is valid, but even if not, the test program written would not work, and the test would fail, which is an acceptable result since the chip is invalid anyway) and/or how the logic unit ran the code and wrote back the results to the memory. Since all testing of the logic unit may be done through the memory (e.g., writing logic test inputs to the memory and writing test results back to the memory), the tester may run a simple vector test with an input sequence and expected, output sequence.

Logic configuration and results may be accessed as read and/or write commands.

Figure 68:
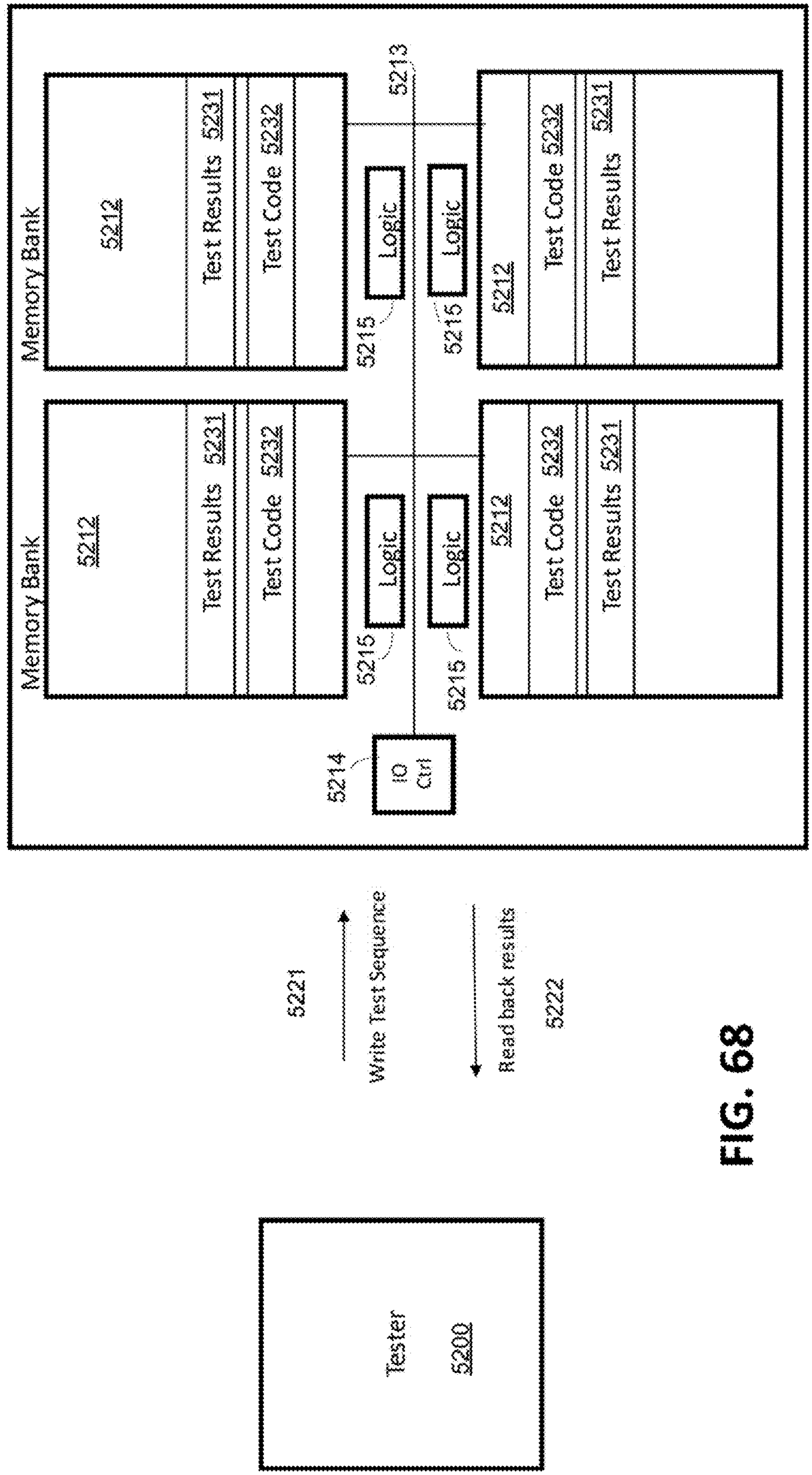
FIG. 68 illustrates an additional example of testing memory chips using logic units on the same substrate as the memory, consistent with the present disclosure.
Figure 69:
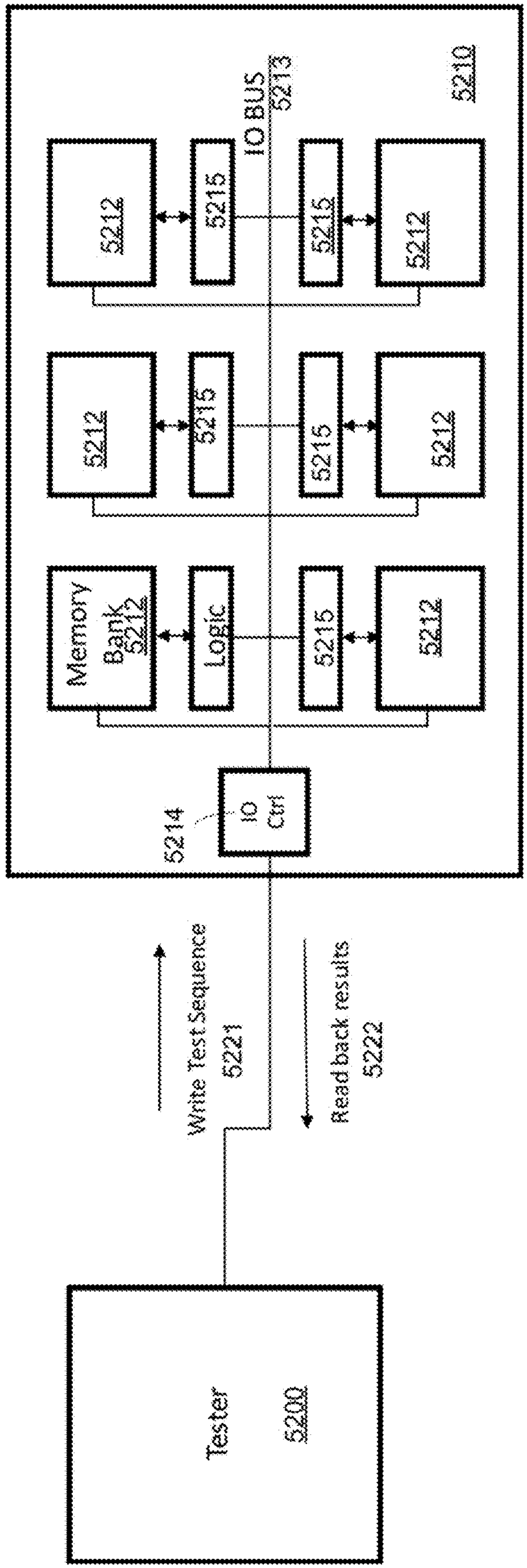
FIG. 69 illustrates a further example of testing memory chips using logic units on the same substrate as the memory, consistent with the present disclosure.

FIG. 68 illustrates a tester 520M that sends a write test sequence 5221 that is a vector.

Parts of the vector include test code 5232 that is split between memory banks 5212 that are coupled to logic 5215 of a processing array.

Each logic 5215 may execute the code 5232 stored in its associated memory bank, and the execution may include accessing one or more memory banks, performing calculations, and storing the results (e.g., test results 5231) in the memory banks 5212.

The test results may be sent back (e.g., read back results 5222) by tester 5200.

This may allow logic 5215 to be controlled by commands received by the I/O controller 5214.

In FIG. 68, the I/O controller 5214 is connected to the memory banks and to the logic. In other embodiments, logic may be connected between the I/O controller 5214 and the memory banks.

Figure 70:
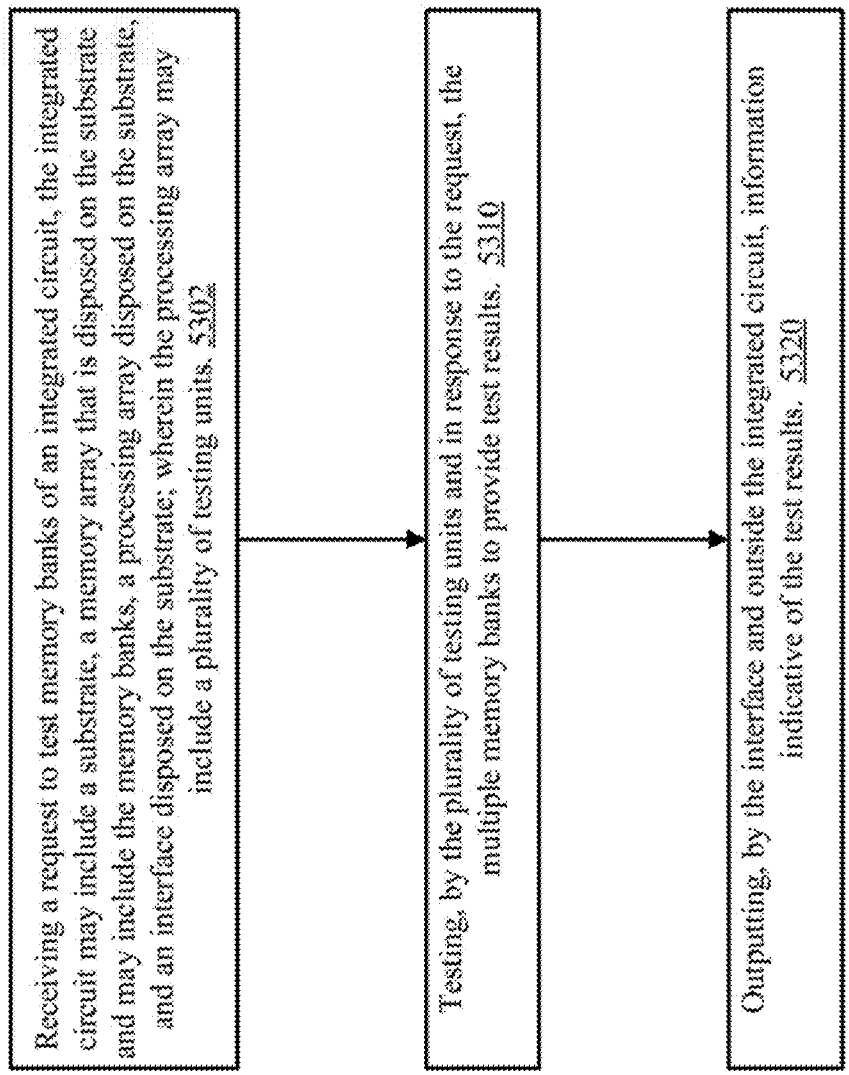
FIG. 70 is an example flowchart of a process for testing memory chips, consistent with the present disclosure.

FIG. 70 illustrates a method 5300 for testing memory banks. For example, method 5300 may be implemented using any of the memory banks described above with respect to FIGS. 65-69.

Method 5300 may include steps 5302, 5310, and 5320. Step 5302 may include receiving a request to test memory banks of an integrated circuit. The integrated circuit may include a substrate, a memory array that is disposed on the substrate and comprises the memory banks, a processing array disposed on the substrate, and an interface disposed on the substrate. The processing array may include a plurality of testing units, as described above.

In some embodiments, the request may include configuration information, one or more vectors, commands, and the like.

In such embodiments, the configuration information may include expected results of the testing of the memory array, instructions, data, values of output data to be read from memory array entries accessed during the testing of the memory array, a test pattern, and the like.

The test pattern may include at least one out of (i) memory array entries to be accessed during the testing of the memory array, (ii) input data to be written to the memory arrays entries accessed during the testing of the memory array, or (iii) expected values of output data to be read from the memory array entries accessed during the testing of the memory array.

Step 5302 may include at least one of the following and/or may followed by at least one of the following:

a. receiving by the at least one test pattern generator instructions from the interface for generating the at least one test pattern;
b. receiving by the interface and from an external unit that is external to the integrated circuit, configuration information including the instructions for generating the at least one test pattern;
c. reading, by the at least one test pattern generator, configuration information including instructions for generating the at least one test pattern from the memory array;
d. receiving, by the interface and from an external unit that is external to the integrated circuit, configuration information that comprises instructions that are the at least one test pattern;
e. retrieving, by a plurality of testing units and from the memory array, test instructions that, once executed by the plurality of testing units, cause the plurality of testing units to test the memory array; and
f. receiving by the plurality of testing units and from the memory array, test instructions that, once executed by the plurality of testing units, cause the plurality of testing units to test the memory array and to test the processing array.

Step 5302 may be followed by step 5310. Step 5310 may include testing, by the plurality of testing units and in response to the request, the multiple memory banks to provide test results.

Method 5300 may further include receiving, by the interface, a plurality of times, during the testing of the memory array, partial test results obtained by the plurality of testing circuits.

Step 5310 may include at least one of the following and/or may followed by at least one of the following:

a. generating, by one or more test pattern generators (e.g., included in one, some, or all of the plurality of testing units) test patterns for use by one or more testing units to test at least one of the multiple memory banks;
b. testing in parallel, by at least two of the plurality of testing units, at least two of the multiple memory banks;
c. testing in series, by at least two of the plurality of testing units, at least two of the multiple memory banks;
d. writing values to memory entries, reading the memory entries, and comparing the results; and
e. correcting, by an error correction unit, at least one error detected during the testing of the memory array.

Step 5310 may be followed by step 5320. Step 5320 may include outputting, by the interface and outside the integrated circuit, information indicative of the test results.

The information indicative of the test results may include identifiers of faulty memory array entries. This may save time by not sending read data regarding each memory entry.

Additionally or alternatively, the information indicative of the test results may indicate a status of at least one memory bank.

Accordingly, in some embodiments, the information indicative of the test results may be much smaller than the aggregate size of data units written to the memory banks of read from the memory banks during the testing and may be much smaller than the input data that may be sent from a tester that tests the memory without an assistance of the testing unit.

The tested integrated circuit may comprise memory chip and/or a distributed processor as illustrated in any of the previous figures. For example, the integrated circuits described herein may be included in, may include, or otherwise comprise a memory chip as illustrated in any one of FIG. 3A, 3B, 4-6, 7A-7D, 11-13, 16-19, 22, or 23.

Figure 71:
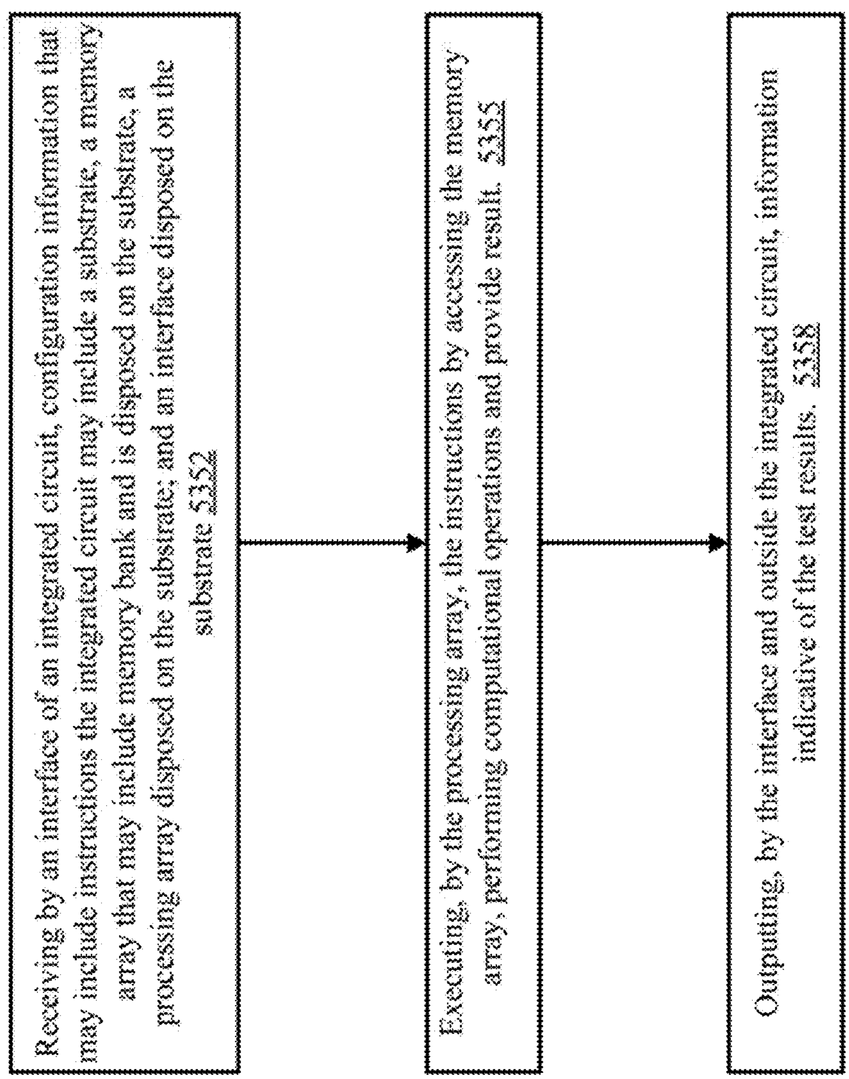
FIG. 71 is an example flowchart of another process for testing memory chips, consistent with the present disclosure.

FIG. 71 illustrates an example of method 5350 for testing memory banks of an integrated circuit. For example, method 5350 may be implemented using any of the memory banks described above with respect to FIGS. 65-69.

Method 5350 may include steps 5352, 5355, and 5358. Step 5352 may include receiving by an interface of an integrated circuit, configuration information that comprises instructions. The integrated circuit that includes the interface may also include a substrate, a memory army that comprises memory bank and is disposed on the substrate, a processing array disposed on the substrate; and an interface disposed on the substrate.

The configuration information may include expected results of the testing of the memory array, instructions, data, values of output data to be read from memory array entries accessed during the testing of the memory array, a test pattern, and the like.

Additionally or alternatively, the configuration information may include the instructions, addresses of memory entries to write the instructions, input data, and may also include addresses of memory entries to receive output values calculated during the execution of the instructions.

The test pattern may include at least one out of (i) memory array entries to be accessed during the testing of the memory array, (ii) input data to be written to the memory arrays entries accessed during the testing of the memory array, or (iii) expected values of output data to be read from the memory array entries accessed during the testing of the memory array.

Step 5352 may be followed by step 5355. Step 5355 may include executing, by the processing array, the instructions by accessing the memory array, performing computational operations, and providing results.

Step 5355 may be followed by step 5358. Step 5358 may include outputting, by the interface and outside the integrated circuit, information indicative of the results.

Cyber-Security and Tamper Detection Techniques

Memory chips and/or processors can be targeted by malicious actors and may be subjected to various types of cyber-attacks. In some cases, such attacks may attempt to change data and/or code stored in one or more memory resources. Cyber-attacks may be especially problematic relative to trained neural networks or other types of artificial intelligence (AI) models that depend on significant quantities of data stored in memory. If the stored data is manipulated or even obscured, such manipulation can be harmful. For example, an autonomous vehicle system reliant upon data intensive AI models to identify other vehicles or pedestrians, etc. may incorrectly assess the environment of a host vehicle if the data on which the models rely is corrupted or obscured. As a result, accidents may occur. As AI models become more prevalent across a wide array of technologies, cyber-attacks against the data associated with such models have the potential for major disruptions.

In other cases, cyber-attacks may include one or more actors tampering with or attempting to tamper with the operational parameters associated with a processor or other types of integrated circuit based logic elements. For example, a processor is usually designed to operate within certain operational specifications. Cyber attacks involving tampering may seek to change one or more of the operational parameters of processors, memory units, or other circuits such that they exceed their designed operational specifications (e.g., clock speed, bandwidth specifications, temperature limitations, operation rate, etc.). Such tampering may result in the malfunction of the targeted hardware.

Conventional techniques for defending against cyber-attacks may include computer programs operating at the processor level (e.g., anti-virus or anti-malware software). Other techniques may include the use of software-based firewalls associated with routers or other hardware. While these techniques may counter cyber-attacks using software programs executed outside of memory units, there remains a need for additional or alternative techniques for efficiently protecting data stored in memory units, especially where the accuracy and availability of that data is critical to the operation of a memory intensive application, such as a neural network, etc. Embodiments of the present disclosure can provide various integrated circuit designs comprising memory that resistant to cyber-attacks against the memory.

The retrieval of sensitive information and commands to the integrated circuit in a secure manner (for example during a boot process when interfaces to the outside of the chip/integrated circuit are not yet active) and then maintaining the sensitive information and commands within the integrated circuit without exposing it outside the integrated circuit and completing computations within the integrated circuit can increase the security of the sensitive information and commands. CPUs and other types of processing units are vulnerable to cyber attacks, especially when those CPUs/processing units operate with external memory. The disclosed embodiments, including distributed processor subunits disposed on a memory chip amongst a memory army including a plurality of memory banks may be less susceptible to cyber attacks and tampering (e.g., because the processing occurs within the memory chip). Including any combination of the disclosed safety measures, discussed in more detail below, may further decrease the susceptibility of the disclosed embodiments to cyber attack and/or tampering.

Figure 72A:
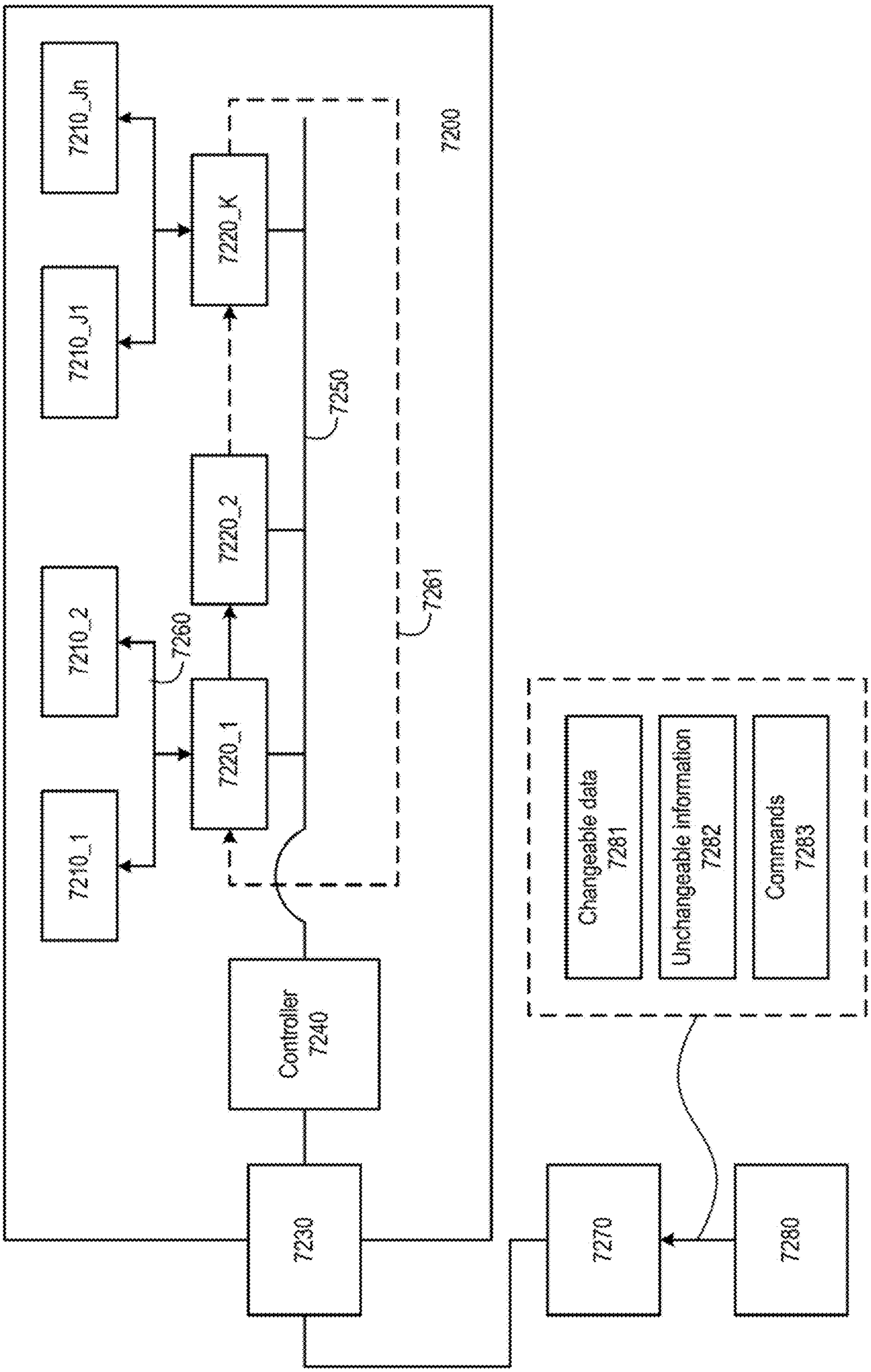
FIG. 72A is a diagrammatic representation of an integrated circuit including a memory array and a processing array, consistent with embodiments of the present disclosure.

FIG. 72A is a diagrammatic representation of an integrated circuit 7200 including a memory array and a processing array, consistent with embodiments of the present disclosure. For example, integrated circuit 7200 may include any of the distributed processor-on-a-memory chip architectures (and features) described in the sections above and throughout the disclosure. The memory array and the processing array may be formed on a common substrate, and in certain disclosed embodiments, integrated circuit 7200 can constitute a memory chip. For example, as discussed above, integrated circuit 7200 may include a memory chip including a plurality of memory banks and a plurality of processor subunits spatially distributed on the memory chip, where each of the plurality of memory banks is associated with a dedicated one or more of the plurality of processor subunits. In some cases, each processor subunit may be dedicated to one or more memory banks.

In some embodiments, the memory array may include a plurality of discrete memory banks 7210_1, 7210_2, . . . 7210_J, 7210_Jn, as shown in FIG. 72A. According to embodiments of the present disclosure, memory array 7210 may comprise one or more types of memory including, e.g., volatile memory (such as RAM. DRAM, SRAM, phase-change RAM (PRAM), magnetoresistive RAM (MRAM), resistive RAM (ReRAM), or the like) or non-volatile memory (such as flash or ROM). According to some embodiments of the present disclosure, memory banks 7210_1 to 7210_Jn can include a plurality of MOS memory structures.

As noted above, the processing array may include a plurality of processor subunits 7220_1 to 7220_K. In some embodiments, each of processor subunits 7220_1 to 7220_K may be associated with one or more discrete memory banks among the plurality of discrete memory banks 7210_1 to 7210_Jn. While the example embodiment of FIG. 72A illustrates each processor subunit associated with two discrete memory banks 7210, it is appreciated that each processor subunit may be associated with any number of discrete, dedicated memory banks. And vice versa, each memory bank may be associated with any number of processor subunits. According to embodiments of the present disclosure, the number of discrete memory banks included in the memory array of integrated circuit 7200 may be equal to, less than, or greater than the number of processor subunits included in the processing array of integrated circuit 7200.

Integrated circuit 7200 can further include a plurality of first buses 7260, consistent with embodiments of the present disclosure (and as described in the sections above). Each bus 7260 can connect a processor subunit 7220_*k* to a corresponding, dedicated memory bank 7210_*j*. According to some embodiments of the present disclosure, integrated circuit 7200 can further include a plurality of second buses 7261. Each bus 7261 can connect a processor subunit 7220_*k* to another processor subunit 7220_*k*+1. As shown in FIG. 72A, a plurality of processor subunits 7220_1 to 7220_K can be connected to one another via bus 7261. While FIG. 72A illustrates a plurality of processor subunits 7220_1 to 7220_K forming a loop as they are serially connected via bus 7261, it is appreciated that processor units 7220 can be connected in any other manner. For example, in some cases a particular processor subunit may not be connected to other processor subunits via bus 7261. In other cases, a particular processor subunit may be connected to only one other processor subunits, and in still other cases, a particular processor subunit may be connected to two or more other processor subunits via one or more buses 7261 (e.g., forming series connection(s), parallel connection(s), branched connection(s), etc.). It should be noted that the embodiments of integrated circuit 7200 described herein are exemplary only. In some cases, integrated circuit 7200 may have different internal components and connections, and in other cases one or more of the internal components and described connections may be omitted (e.g., depending on the needs of a particular application).

Referring back to FIG. 72A, integrated circuit 7200 may include one or more structures for implementing at least one security measure relative to integrated circuit 7200. In some cases, such structures may be configured to detect cyber-attacks that manipulate or obscure (or attempt to manipulate or obscure) data stored in one or more of the memory banks. In other cases, such structures may be configured to detect tampering with operational parameters associated with integrated circuit 7200 or tampering with one or more hardware elements (whether included within integrated circuit 7200 or outside of integrated circuit 7200) that directly or indirectly affect one or more operations associated with integrated circuit 7200.

In some cases, a contoller 7240 can be included in integrated circuit 7200. Controller 7240 may be connected, for example, to one or more of the processor subunits 7220_1 . . . 7220_*k* via one or more buses 7250. Controller 7240 may also be connected to one or more of the memory banks 7210_1 . . . 7210_Jn. While the example embodiment of FIG. 72A shows one controller 7240, it should be understood, that controller 7240 may include multiple processor elements and/or logic circuits. In the disclosed embodiments, controller 7240 may be configured to implement the at least one security measure relative to at least one operation of the integrated circuit 7200. Further, in the disclosed embodiments, controller 7240 may be configured to take (or cause) one or more remedial actions if the at least one security measure is triggered.

According to some embodiments of the present disclosure, the at least one security measure can include a controller implemented process for locking access to certain aspects of integrated circuit 7200. The locking of access involves having the controller prevent access (for read and/or write) to certain regions of the memory from outside of the chip. The access control may be applied in an address resolution, part of memory bank resolution, memory bank resolution, and the like. In some cases, one or more physical locations in memory associated with integrated circuit 7200 (e.g., one or more memory banks or any portion of one or more of the memory banks of integrated circuit 7200) may be locked. In some embodiments, controller 7240 may lock access to certain portions of integrated circuit 7200 associated with execution of an artificial intelligence model (or other type of software-based system). For example, in some embodiments, controller 7240 may lock access to weights of a neural network model stored in memory associated with integrated circuit 7200. It is noted that a software program (i.e., model) may include three components, including: input data to the program, code data of the program, and output data from executing the program. Such components may also be applicable to a neural network model. During operation of such a model, input data may be generated and fed to the model, and executing the model may generate output data for reading. The program code and data values (e.g., predetermined model weights, etc.) associated with executing the model using the received input data, however, may remain fixed.

Locking, as described herein, may refer to an operation of a controller, for example, not allowing a read or write operation relative to certain regions of memory initiated from outside of a chip/integrated circuit. The controller, through which the I/O of the chip/integrated circuit may pass, may lock not just full memory banks, but may also lock any range of memory addresses within the memory banks, from a single memory address to a range of addresses including all of the address of the available memory banks (or any range of addresses in between).

Because memory locations associated with receiving the input data and storing the output data are associated with changing values and interaction with components outside of integrated circuit 7200 (e.g., components that supply the input data or receive the output data), locking access to those memory locations may be impractical in some cases. On the other hand, restricting access to memory locations associated with the model code and fixed data values may be effective against certain types of cyber-attack. Thus, in some embodiments, memory associated with program code and data values (e.g., memory not used for writing/receiving input data and for reading/providing output data) can be locked as a security measure. The restricted access may include locking certain memory locations such that no changes can be made to certain program code and/or data values (e.g., those associated with executing a model based on received input data). Additionally, memory areas associated with intermediate data (e.g., data generated during execution of the model) may also be locked against external access. Thus, while various computational logic, whether onboard integrated circuit 7200 or located outside of integrated circuit 7200 may provide data to or receive data from memory locations associated with receiving input data or retrieving generated output data, such computational logic will not have the ability to access or modify memory locations storing the program code and data values associated with program execution based on received input data.

In addition to locking memory locations on integrated circuit 7200 to provide a security measure, other security measures may be implemented by restricting access to certain computational logic elements (and to the memory regions they access) configured to execute code associated with a particular program or model. In some cases, such access restriction may be accomplished relative to computational logic (and their associated memory regions) located on integrated circuit 7200 (e.g., a computational memory (e.g., a memory including computational abilities, such as the distributed processor on a memory chip disclosed herein), etc.). Access to computational logic (and associated memory locations) associated with any execution of code stored in a locked memory portion of integrated circuit 7200 or with any access to data values stored in a locked memory portion of integrated circuit 7200 can also be locked/restricted regardless of whether that computational logic is located onboard integrated circuit 7200 Restricting access to the computational logic responsible for executing a program/model may further ensure that the code and data values associated with operating on received input data remain protected from manipulation, being obscured, etc.

Controller-implemented security measures including locking or restricting access to hardware-based regions associated with certain portions of the memory array of integrated circuit 7200 may be accomplished in any suitable manner. In some embodiments, such locking may be implemented by adding or supplying a command to controller 7240 configured to cause controller 7240 to lock certain memory portions. In some embodiments, the hardware-based memory portions to be locked can be designated by particular memory addresses (e.g., addresses associated with any memory elements of memory banks 7210_1 . . . 7210_J2, etc.). In some embodiments, a locked region of memory may remain fixed during program or model execution. In other cases, the locked region may be configurable. That is, in some cases, controller 7240 may be supplied with commands such that during execution of a program or model, a locked region may change. For example, at particular times, certain memory locations may be added to the locked region of memory. Or, at particular times, certain memory locations (e.g., previously locked memory locations) may be excluded from the locked region of memory.

Locking of certain memory locations may be accomplished in any suitable manner. In some cases, a record of locked memory locations (e.g., a file, database, data structure, etc. that stores and identifies locked memory addresses) may be accessible by controller 7240 such that controller 7240 may determine whether a certain memory request relates to a locked memory location. In some cases, controller 7240 maintains a database of locked addresses to use controlling access to certain memory locations. In other cases, the controller may have a table or a set of one or more registers that are configurable until locking and may include fixed, predetermined values identifying memory locations to lock (e.g., to which memory access from outside the chip should be restricted). For example, when a memory access is requested, controller 7240 may compare the memory address associated with the memory access request to the locked memory addresses. If the memory address associated with the memory access request is determined to be within a list of locked memory addresses, then the memory access request (e.g., whether a read or write operation) can be denied.

As discussed above, the at least one security measure can include locking access to certain memory portions of memory array 7210 that are not used for receiving input data or for providing access to generated output data. In some cases, the memory portions within a locked region may be adjusted. For example, locked memory portions may be unlocked, and non-locked memory portions may be locked. Any suitable method may be used for unlocking a locked memory portion. For example, an implemented security measure can include requiring a passphrase for unlocking one or more portion of a locked memory region.

Triggering of an implemented security measure may occur upon detection of any action counter to the implemented security measure. For example, an attempted access (whether a read or a write request) to a locked memory portion may trigger a security measure. Additionally, if an entered passphrase (e.g., seeking to unlock a locked memory portion) does not match a predetermined passphrase, the security measure can be triggered. In some cases, a security measure can be triggered if a correct passphrase is not provided within an allowable threshold number of passphrase entry attempts (e.g., 1, 2, 3, etc.).

Memory portions may be locked at any suitable times. For example, in some cases, memory portions can be locked at various times during a program execution. In other cases, memory portions may be locked upon startup or prior to program/model execution. For example, memory addresses to be locked can be determined and identified along with programming of a program/model code or upon generation and storage of data to be accessed by a program/model. Thereby, vulnerability to attacks on memory array 7210 may be reduced or eliminated during times when or after a program/model execution begins, after data to be used by a program/model has been generated and stored, etc.

Unlocking of locked memory may be accomplished by any suitable method or at any suitable times. As described above, a locked memory portion may be unlocked after receipt of a correct passphrase or passcode, etc. In other cases, locked memory may be unlocked by restarting (by a command or by powering off and on) or deleting the entire memory array 7210. Additionally or alternatively, a release command sequence can be implemented to unlock one or more memory portions.

According to embodiments of the present disclosure, and as described above, controller 7240 can be configured to control traffic both to and from the integrated circuit 7200, especially from sources external to the integrated circuit 7200. For example, as shown in FIG. 72A, traffic between components external to the integrated circuit 7200 and components internal to integrated circuit 7200 (e.g., memory array 7210 or processor subunit 7220) can be controlled by controller 7240. Such traffic can pass through controller 7240 or through one or more buses (e.g., 7250, 7260, or 7261) that are controlled or monitored by controller 7240.

According to some embodiments of the present disclosure, integrated circuit 7200 can receive unchangeable data (e.g., fixed data; e.g., model weights, coefficients, etc.), and certain commands (e.g., code; e.g., identifying memory portions to be locked) during a boot process. Here, the unchangeable data may refer to data that is to remain fixed during execution of a program or model and which may remain unchanged until a subsequent boot process. During program execution, integrated circuit 7200 may interact with changeable data, which may include input data to be processed and/or output data generated by processing associated with integrated circuit 7200. As discussed above, access to memory array 7210 or processing array 7220 can be restricted during program or model execution. For example, access can be limited to certain portions of memory array 7210 or to certain processor subunits associated with processing or interaction with incoming input data to be written or with processing or interaction with generated output data to be read. During program or model execution, memory portions containing unchangeable data may be locked and, thereby, made inaccessible. In some embodiments, unchangeable data and/or commands associated with memory portions to be locked may be included in any appropriate data structure. For example, such data and/or commands may be made available to controller 7240 via one or more configuration files accessible during or after a bootup sequence.

Referring back to FIG. 72A, integrated circuit 7200 can further include a communication port 7230. As shown in FIG. 72A, controller 7240 can be coupled between communication port 7230 and bus 7250 that is shared between processing subunits 7220_1 to 7220_K. In some embodiments, communication port 7230 can be indirectly or directly coupled to a host computer 7270 associated with host memory 7280 that may include, e.g., a non-volatile memory. In some embodiments, host computer 7270 can retrieve changeable data 7281 (e.g., input data to be used during execution of a program or model), unchangeable data 7282, and/or commands 7283 from its associated host memory 7280. The changeable data 7181, unchangeable data 7282, and commands 7283 can be uploaded from host computer 7270 to controller 7240 via 7230 during a boot process.

Figure 72B:
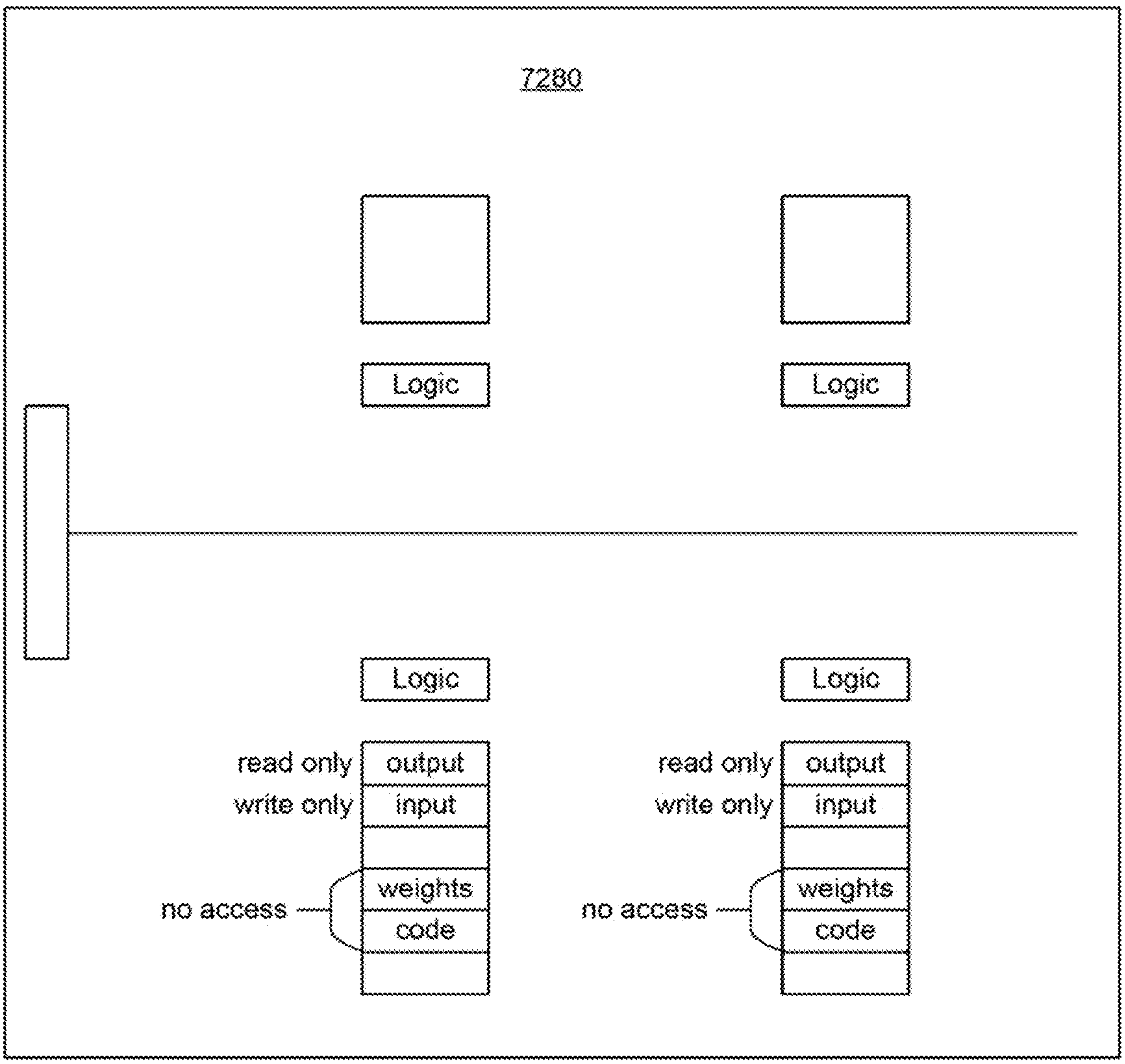
FIG. 72B is a diagrammatic representation of a memory region inside an integrated circuit, consistent with embodiments of the present disclosure.

FIG. 728 is a diagrammatic representation of a memory region inside an integrated circuit, consistent with embodiments of the present disclosure. As shown, FIG. 72B depicts examples of data structures included in host memory 7280.

Figure 73A:
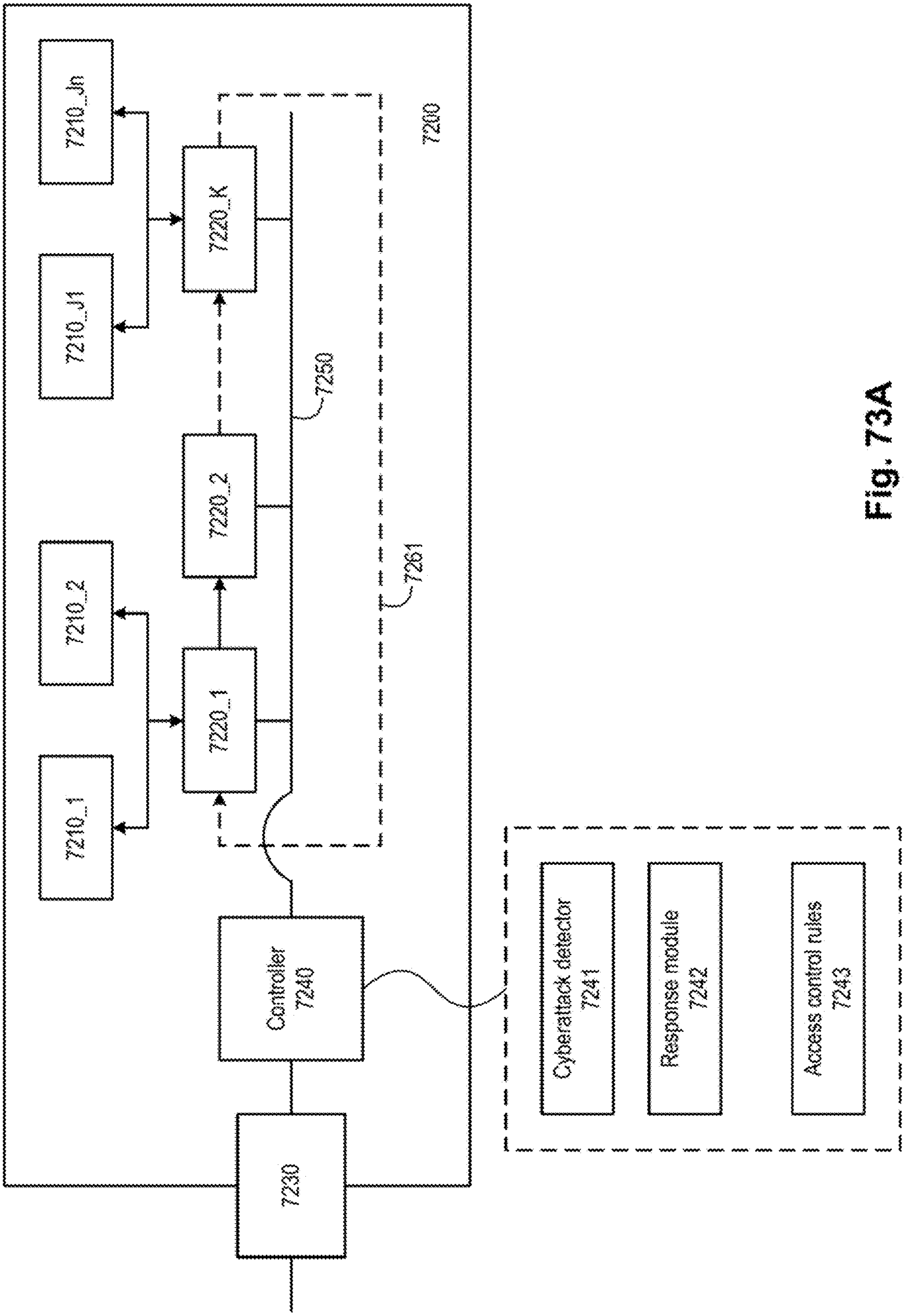
FIG. 73A is a diagrammatic representation of an integrated circuit with an example configuration of controller, consistent with embodiments of the present disclosure.

Reference is now made to FIG. 7A3 which another example of an integrated circuit, consistent with embodiments of the present disclosure. As shown in FIG. 73A, a controller 7240 may include a cyberattack detector 7241 and a response module 7242. In some embodiments of the present disclosure, controller 7240 can be configured to store or have access to access control rules 7243. According to some embodiments of the present disclosure, access control rules 7243 can be included in a configuration file accessible to controller 7240. In some embodiments, access control rules 7243 can be uploaded to controller 7240 during a booting process. Access control rules 7243 can comprise information indicating access rules associated with any of changeable data 7281, unchangeable data 7282, and commands 7283 and their corresponding memory locations. As explained above, access control rules 7243 or configuration file can include information identifying certain memory addresses among memory array 7210. In some embodiments, controller 7240 can be configured to provide a locking mechanism and/or function that locks various addresses of memory array 7210. e.g., addresses for storing commands or unchangeable data.

Controller 7240 can be configured to enforce access control rules 7243, e.g., to prevent unauthorized entities from changing unchangeable data or commands. In some embodiments, reading of unchangeable data or commands may be forbidden according to access control rules 7243. According to some embodiments of the present disclosure, controller 7240 can be configured to determine whether an access attempt is made to at least a portion of certain commands or unchangeable data. Controller 7240 (e.g., including cyberattack detector 7241) can compare memory addresses associated with an access request to the memory addresses for unchangeable data and commands to detect whether an unauthorized access attempt has been made to one or more locked memory locations. In this way, for example, cyberattack detector 7241 of controller 7240 may be configured to determine whether a suspected cyber attack occurs, e.g., a request to alter one or more commands or to change or obscure unchangeable data associated with one or more locked memory portions. Response module 7242 can be configured to determine how to respond and/or to implement a response to a detected cyberattack. For example, in some cases, in response to a detected attack on data or commands in one or more locked memory locations, response module 7242 of controller 7240 may implement or cause to be implemented a response that may include, for example, halting of one or more operations, such as a memory access operation associated with the detected attack. A response to a detected attack may also include halting one or more operations associated with execution of a program or model, remaining of a warning or other indicator of an attempted attack, asserting an indication line to the host or deleting the entire memory, etc.

In addition to locking memory portions, other techniques for protecting against cyber attack may also be implemented to provide the described security measures associated with integrated circuit 7200. For example, in some embodiments, controller 7240 may be configured to duplicate a program or model within different memory locations and processor subunits associated with integrated circuit 7200. In this way, the program/model and the duplicate of the program/model may be independently executed, and the results of the independent program/model executions can be compared. For example, a program/model may be duplicated in two different memory banks 7210 and executed in different processor subunits 7220 in the integrated circuit 7200. In other embodiments, a program/model can be duplicated in two different integrated circuits 7200. In either case, the results of the program/model execution can be compared to determine whether any differences exist between the duplicate program/model execution. A detected difference in execution results (e.g., intermediate execution results, final execution results, etc.) may indicate the presence of a cyberattack having altered one or more aspects of a program/model or its associated data. In some embodiments, different memory banks 7210 and processor subunits 7220 can be assigned to execute two duplicated models based on the same input data. In some embodiments, intermediate results can be compared during executing the two duplicated models based on same input data and, if there is mismatch between two intermediate results at the same stage, execution can be suspended as a potential remedial action. In the case processor subunits of the same integrated circuit execute the two duplicated models—that integrated circuit may also compare the results. This can be done without informing any entities outside the integrated circuit about the execution of the two duplicated models, in other words, entities outside of the chip are unaware that duplicate models are running in parallel on the integrated circuit.

Figure 73B:
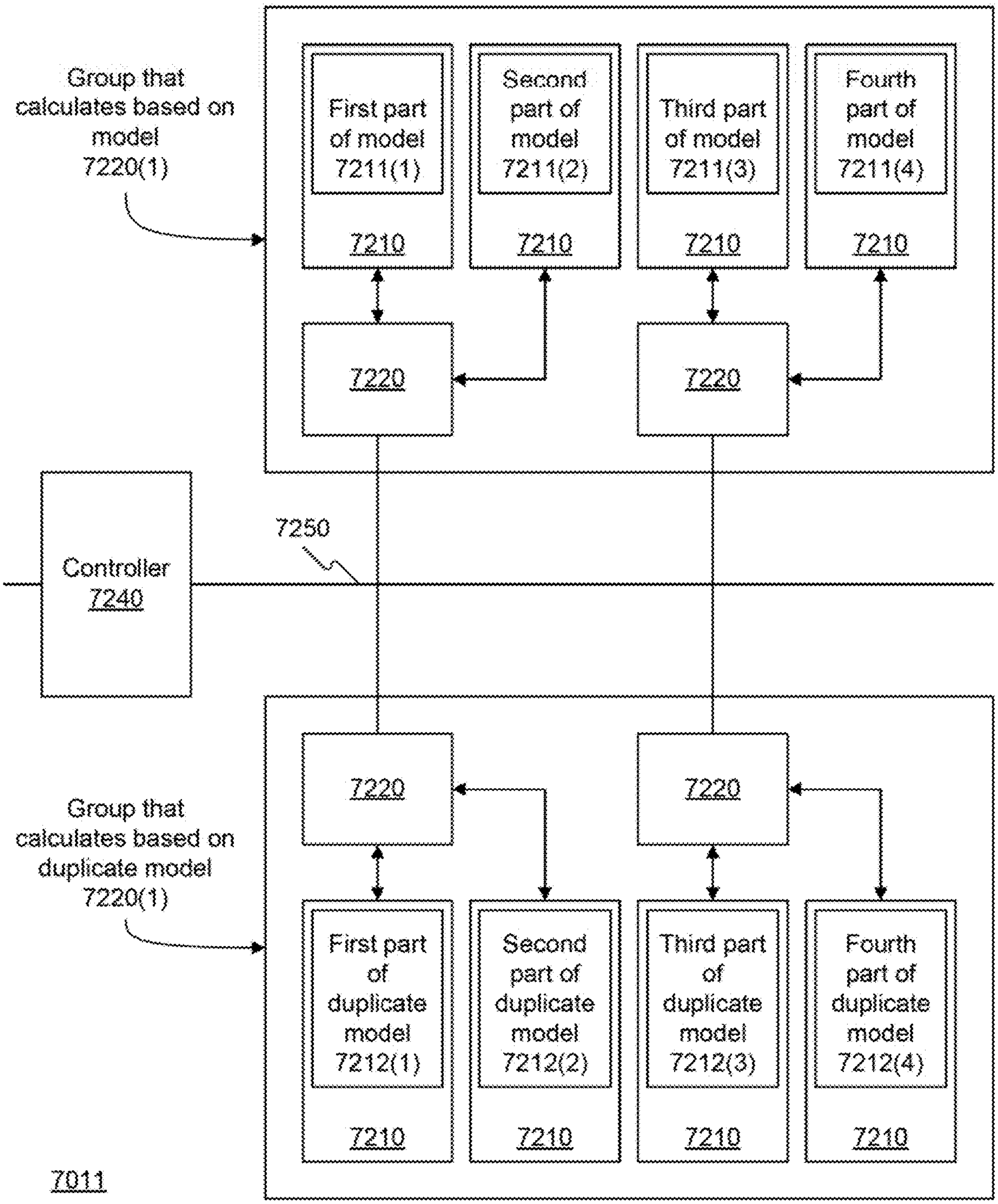
FIG. 73B is a diagrammatic representation of a configuration for executing duplicate models simultaneously, consistent with embodiments of the present disclosure.

FIG. 73B is a diagrammatic representation of a configuration for executing duplicate models simultaneously, consistent with embodiments of the present disclosure.

While a single program/model duplication is described as one example for detection of a possible cyber attack, any number of duplications (e.g., 1, 2, 3, or more) may be used to detect possible cyber attacks. As the number of duplications and independent program/model executions increases, a confidence level in detection of a cyber attack may also increase. A larger number of duplications can also decrease a potential success rate of a cyber attack, as it may be more difficult for an attacker to impact multiple program/model duplicates. The number of program or model duplicates may be determined at runtime to further increase the difficulty of a cyber attacker in successfully impacting a program or model execution.

In some embodiments, duplicated models can be non-identical in one or more aspects different with each other. In this example, code associated with two programs/models may be made different from one another, yet the programs/models may be designed such that both return the same output results. In at least this way, the two programs/models may be considered duplicates of one another. For example, two neural network models may have a different ordering of neurons in a layer relative to one another. Yet, despite this change in the model code, both may return the same output results. Duplicating programs/models in this manner may make it more difficult for a cyber attacker to identify these effective duplicates of programs or models to compromise, and as a result, the duplicate models/programs may provide not only a way to provide redundancy to minimize cyber attack impact, but can also enhance cyber attack detection (e.g., by highlighting tampering or unauthorized access where a cyber attacker alters one program/model or its data, but fails to make corresponding changes to the program/model duplicates).

In many cases, duplicate programs/models (especially including duplicate programs/models that exhibit code differences) may be designed such that their outputs do not exactly match, but rather constitute soft values (e.g., approximately the same output values) as opposed to exact, fixed values. In such embodiments, the output results from two or more effective program/model duplicates can be compared (e.g., using a dedicated module or with a host processor) to determine whether a difference between their output results (whether intermediate or final results) fall within a predetermined range. Differences in the outputted soft values that do not exceed a predetermined threshold or range may be considered as evidence of no tampering, unauthorized access, etc. On the other hand, if differences in the outputted soft values exceed the predetermined threshold or range, such differences may be considered as evidence that a cyber attack in the form of tampering, unauthorized access to memory, etc. has occurred. In such cases, the duplicate program/model security measure would be triggered and one or more remedial actions may be taken (e.g., halting execution of a program or model, shutting down one or more operations of integrated circuit 7200, operating in a safe mode with limited functionality, among many others).

Security measures associated with integrated circuit 7200 may also involve quantitative analysis of data associated with an executing or executed program or model. For example, in some embodiments, controller 7240 may be configured to calculate one or more checksum/hash/CRC (cyclic redundancy check)/parity values with respect to data stored in at least a portion of memory array 7210. The calculated value(s) can be compared to a predetermined value or predetermined values. If there is discrepancy between compared values, such a discrepancy may be interpreted as evidence of tampering on the data stored in the at least portion of memory army 7210. In some embodiments, a checksum/hash/CRC/parity value can be calculated for all memory locations associated with memory array 7210 to identify changes in data. In this example, entire memory (or memory bank) in question can be read by, e.g., host computer 7270 or processor associated with integrated circuit 7200, for calculating a checksum/hash/CRC/parity value. In other cases, a checksum/hash/CRC/parity value can be calculated for a predetermined subset of memory locations associated with memory array 7210 to identify changes in data associated with the subset of memory locations. In some embodiments, controller 7240 can be configured to calculate checksum/hash/CRC/parity values associated with a predetermined data path (e.g., associated with a memory access pattern), and the calculated values may be compared to one another or to predetermined values to determine whether tampering or another form of cyber attack has occurred.

Integrated circuit 7200 may be made even more secure against a cyber attack by safeguarding one or more predetermined values (e.g., expected checksum/hash/CRC/parity value, expected difference values in intermediate or final output results, expected difference ranges associated with certain values, etc.) within integrated circuit 7200 or in a location accessible to integrated circuit 7200. For example, in some embodiments, one or more predetermined values can be stored in a register of memory array 7210 and can be used (e.g., by controller 7240 of integrated circuit 7200) to evaluate intermediate or final output results, checksums, etc., during or after each run of the model. In some cases, the register values may be updated using a "save the last result data" command to calculate predetermined values on the fly, and the calculated value can be saved in the register or in another memory location. In this way, valid output values may be used to update the predetermined values used for comparison after each program or model execution or partial execution. Such a technique may increase the difficulty a cyber attacker may experience in attempting to modify or otherwise tamper with one or more predetermined reference values designed to expose cyber attacker activities.

In operation, a CRC calculator may be used to track memory accesses. For example, such a calculation circuit can be disposed at the memory bank level, in the processor subunits, or at the controller, where each may be configured to accumulate to a CRC calculator upon each memory access made.

Figure 74A:
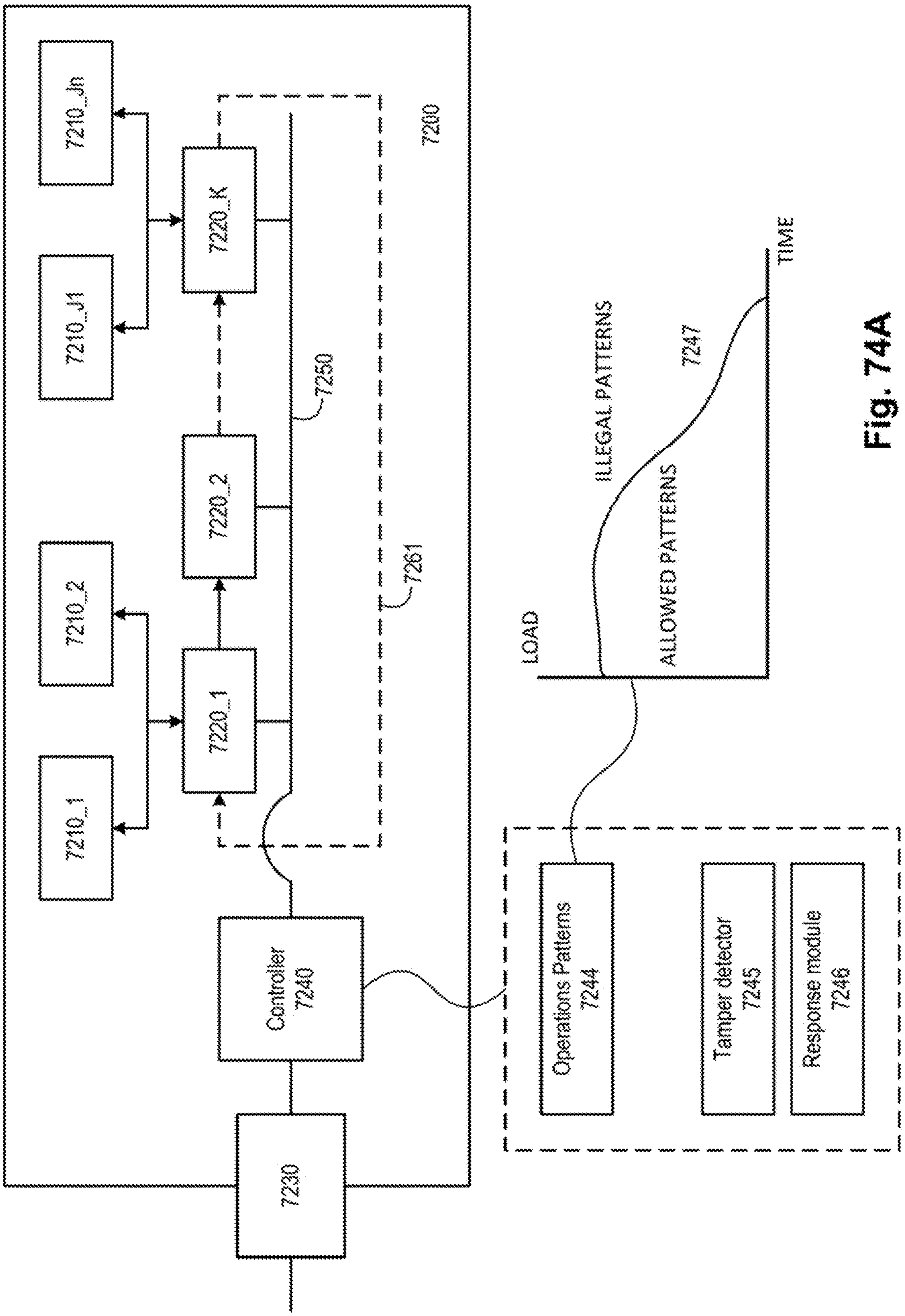
FIG. 74A is a diagrammatic representation of an integrated circuit with another example configuration of controller, consistent with embodiments of the present disclosure.

Reference is now made to FIG. 74A providing a diagrammatic representation of another embodiment of integrated circuit 7200. In the example embodiment represented by FIG. 74A, controller 7240 may include a tamper detector 7245 and a response module 7246. Similar to other disclosed embodiments, tamper detector 7245 can be configured to detect evidence of a potential tampering attempt. According to some embodiments of the present disclosure, a security measure associated with integrated circuit 7200 and implemented by controller 7240, for example, can include a comparison of actual program/model operational patterns to predetermined/allowed operational patterns. The security measure may be triggered if the actual program/model operational patterns are different in one or more aspects from the predetermined/allowed operational patterns. And if the security measure is triggered, a response module 7246 of controller 7240 can be configured to implement one or more remedial measures in response.

Figure 74B:
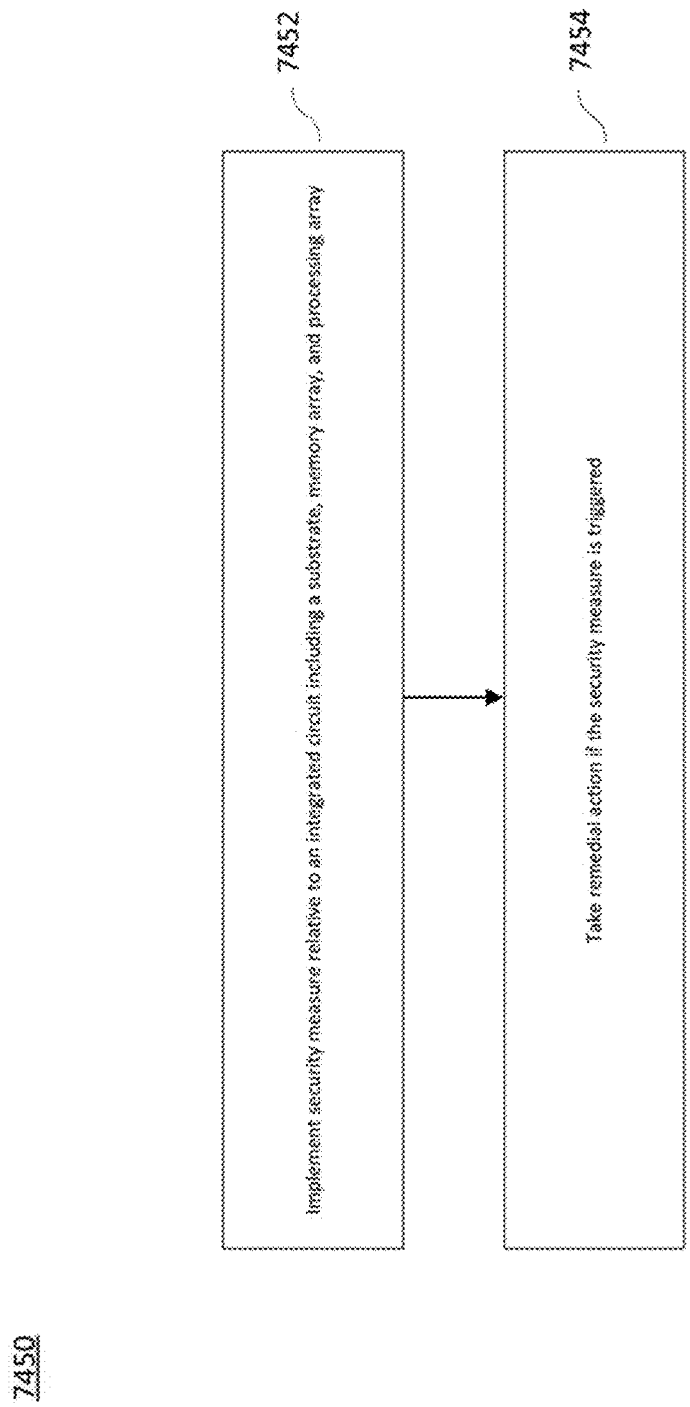
FIG. 74B is a flowchart representation of a method of securing an integrated circuit, according to exemplary disclosed embodiments.
Figure 74C:
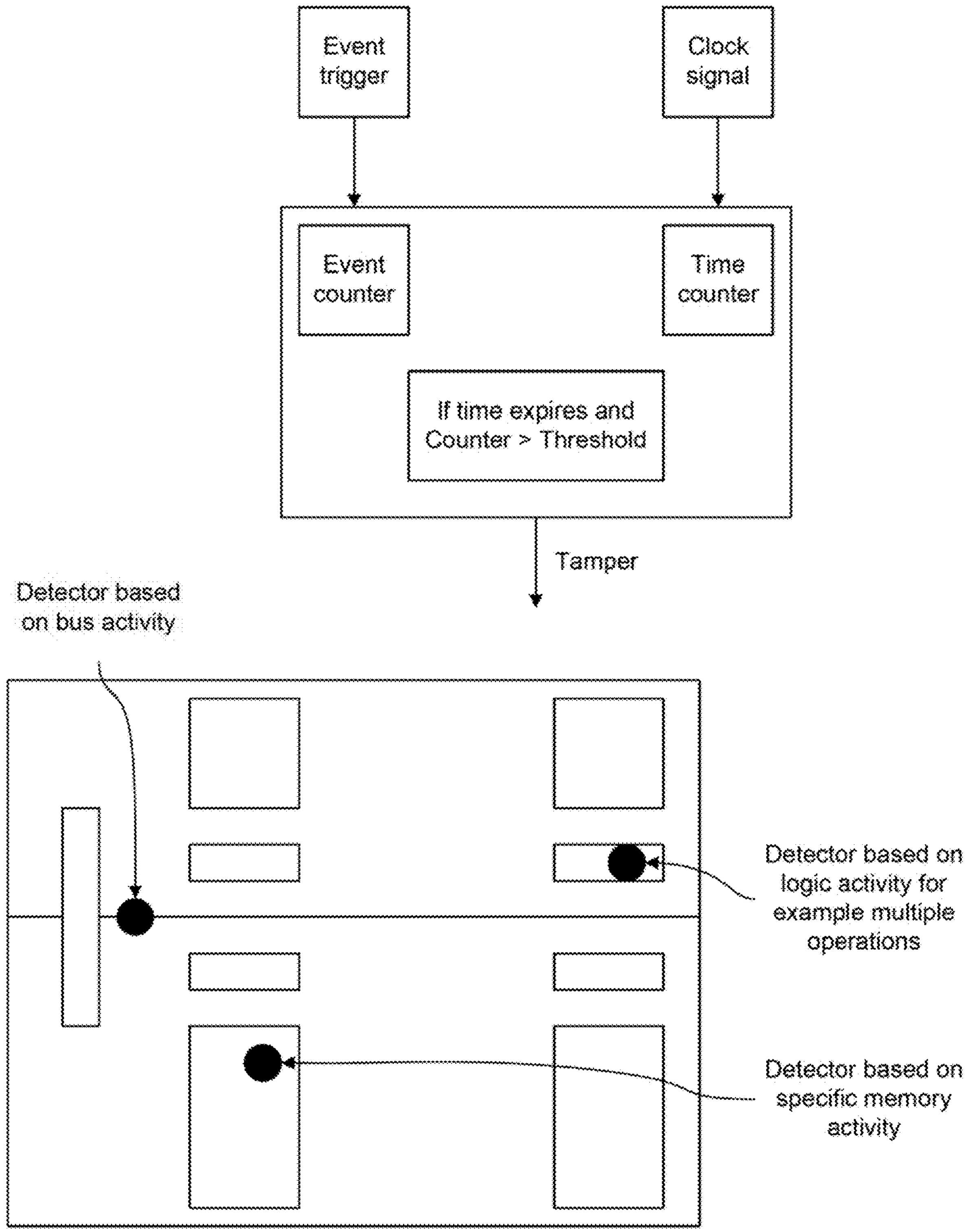
FIG. 74C is a diagrammatic representation of detection elements located at various point within a chip, according to exemplary disclosed embodiments.

FIG. 74C is a diagrammatic representation of detection dements that may be located at various point within a chip, according to exemplary disclosed embodiments. Detection of cyber attacks and tampering, as described above, may be performed using detection elements located at various point within a chip, as shown for example, in FIG. 74C. For example, certain code may be associated with an expected number of processing events within a certain time period. The detector shown in FIG. 74C can count the number of events (monitored by the event counter) that the system experiences during a certain time period (monitored by the time counter). If the number of events exceeds a certain predetermined threshold (e.g., a number of expected events during a predefined time period), then tampering may be indicated. Such detectors may be included in multiple points of the system to monitor various types of events, as shown in FIG. 74C.

More specifically, in some embodiments, controller 7240 can be configured to store or have access to expected program/model operational patterns 7244. For example, in some cases, an operational pattern may be represented as a graph 7247 indicating allowed load per time patterns and forbidden or illegal load per time patterns. Tampering attempts may cause memory array 7210 or processing array 7220 to operate outside of certain operational specifications. This may cause memory array 7210 or processing array 7220 to generate heat or to malfunction and may enable changes in data or code related to the memory array 7210 or processing array 7220. Such changes may result in operational patterns outside of the allowed operational patterns, as indicated by graph 7247.

According to some embodiments of the present disclosure, controller 7240 can be configured to monitor an operational pattern associated with memory array 7210 or processing array 7220. The operational pattern may be associated with the number of access requests, types of access requests, timing of access requests, etc. Controller 7240 can be further configured to detect tampering attacks if the operation patterns am different from allowable operation patterns.

It should be noted that the disclosed embodiments may be used not only to protect against cyber attacks, but also to protect against non-malicious errors in operation. For example, the disclosed embodiments may also be effective for protecting a system, such as integrated circuit 7200, against errors resulting from environmental factors such as temperature or voltage changes or levels, especially where such levels are outside of operational specifications for integrated circuit 7200.

In response to detection of a suspected cyber attack (e.g., as a response to a triggered security measure), any suitable remedial actions may be implemented. For example, remedial actions may include halting one or more operations associated with program/model execution, operating one or more components associated with integrated circuit 7200 in a safe mode, locking one or more components of integrated circuit 7200 to additional inputs or access, etc.

FIG. 748 provides a flowchart representation of a method 7450 of securing an integrated circuit against tampering, according to exemplary disclosed embodiments. For example, step 7452 may include implementing, using a controller associated with the integrated circuit, at least one security measure with respect to an operation of the integrated circuit. At step 7454, one or more remedial actions may be taken if the at least one security measure is triggered. The integrated circuit includes: a substrate; a memory array disposed on the substrate, the memory array including a plurality of discrete memory banks; and a processing array disposed on the substrate, the processing array including a plurality of processor subunits, each one of the plurality of processor subunits being associated with one or more discrete memory banks among the plurality of discrete memory banks.

In some embodiments, the disclosed security measures may be implemented in multiple memory chips, and at least one or more of the disclosed security mechanisms can be implemented for each memory chip/integrated circuit. In some cases, each memory chip/integrated circuit may implement the same security measure, but in some cases, different memory chips/integrated circuits may implement different security measures (e.g., when different security measures may be more suitable to a certain type of operation associated with a particular integrated circuit). In some embodiments, more than one security measure may be implemented by a particular controller of an integrated circuit. For example, a particular integrated circuit may implement any number or types of the disclosed security measures. Additionally, a particular integrated circuit controller may be configured to implement multiple different remedial measures in response to a triggered security measure.

It should also be noted that two or more of the above described security mechanisms may be combined to improve security against cyber-attacks or tamper attacks. Additionally, security measures may be implemented across different integrated circuits and such integrated circuits may coordinate security measure implementation. For example, model duplication can be performed within one memory chip or may be performed across different memory chips. In such an example, results from one memory chip or results from two or more memory chips can be compared to detect potential cyber-attacks or tamper attacks. In some embodiments, the duplicated security measures applied across multiple integrated circuits may include one or more of the disclosed access locking mechanisms, hash protection mechanisms, model duplication, program/model execution pattern analysis, or any combination of these or other disclosed embodiments.

Multi-Port Processor Sub-Units in a DRAM

As described above, the presently disclosed embodiments may include a distributed processor memory chip that includes an array of processor subunits and an array of memory banks where each of the processor subunits may be dedicated to at least one of the array of memory banks. As discussed in the section below, the distributed processor memory chip may serve as the basis for a scalable system. That is, in some cases, the distributed processor memory chip may include one or more communication ports configured to transfer data from one distributed processor memory chip to another. In this way, any desired number of distributed processor memory chips may be linked together (e.g., in series, in parallel, in a loop, or any combination thereof) to form a scalable array of distributed processor memory chips. Such an array may provide a flexible solution for efficiently performing memory intensive operations and for scaling the computing resources associated with performance of the memory intensive operations. Because the distributed processor memory chips may include clock having differing timing patterns, the presently disclosed embodiments include features to accurately control data transfers between distributed processor memory chips even in the presence of clock timing differences. Such embodiments may enable efficient data sharing among different distributed processor memory chips.

Figure 75A:
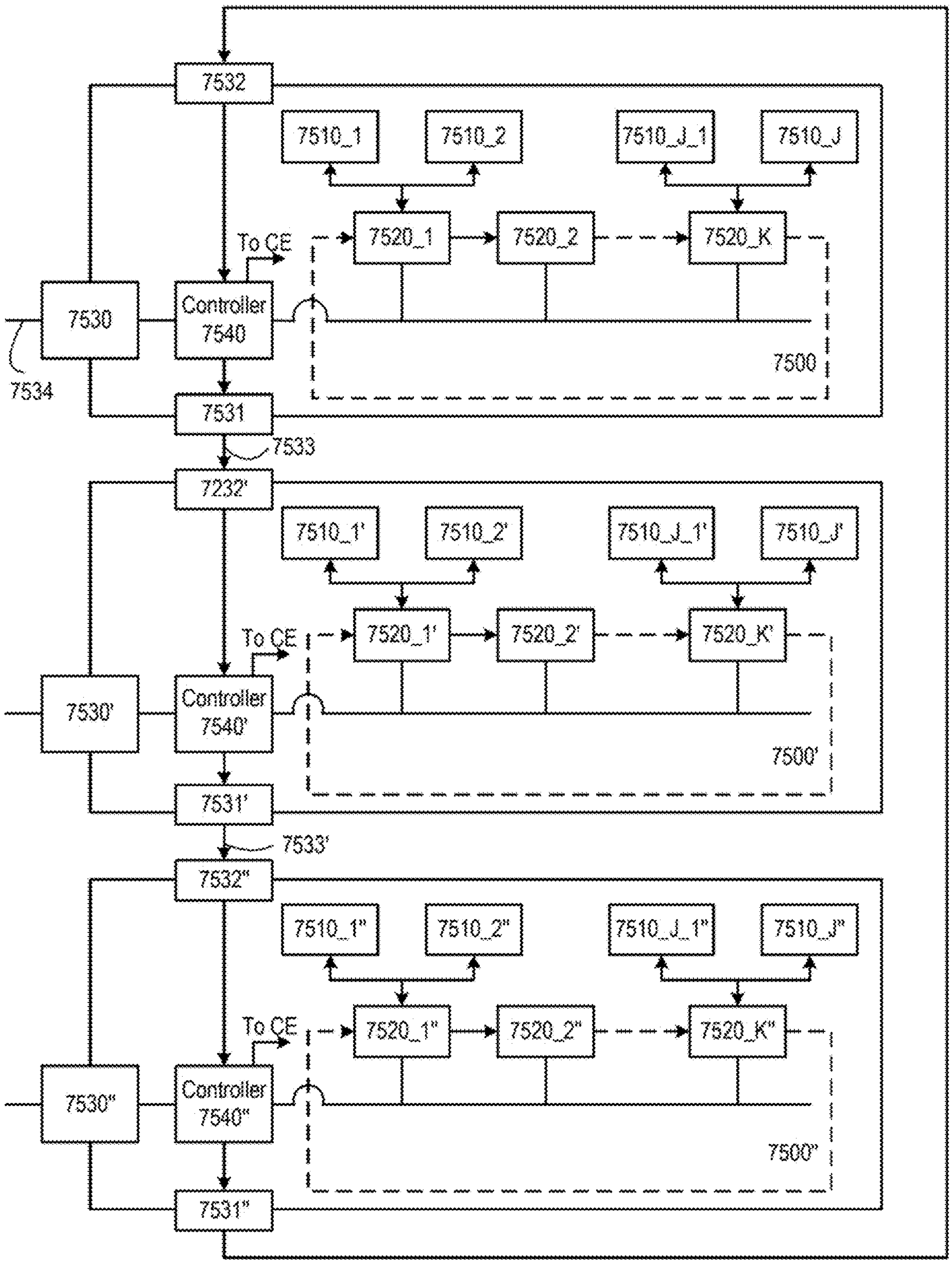
FIG. 75A is a diagrammatic representation of a scalable processor memory system including a plurality of distributed processor memory chips, consistent with embodiments of the present disclosure.

FIG. 75A is a diagrammatic representation of a scalable processor memory system including a plurality of distributed processor memory chips, consistent with embodiments of the present disclosure. According to embodiments of the present disclosure, a scalable processor memory system can include a plurality of distributed processor memory chips such as a first distributed processor memory chip 7500, a second distributed processor memory chip 7500', and a third distributed processor memory chip 7500". Each of the first distributed processor memory chip 7500, second distributed processor memory chip 7500', and a third distributed processor memory chip 7500" can include any of the configurations and/or features associated with any of the embodiments described in the present disclosure, distributed processor.

In some embodiments, each of first distributed processor memory chip 7500, second distributed processor memory chip 7500', and third distributed processor memory chip 7500" can be implemented similar to the integrated chip 7200 shown in FIG. 7200. As shown in FIG. 75A, first distributed processor memory chip 7500 can comprise a memory array 7510, a processing array 7520, and a controller 7540. Memory array 7510, processing array 7520, and controller 7540 can be configured similarly to memory array 7210, processing array 7220, and controller 7240 in FIG. 72A.

According to embodiments of the present disclosure, first distributed processor memory chip 7500 may include a first communication port 7530. In some embodiments, first communication port 7530 can be configured to communicate with one or more external entities. For example, communication port 7530 may be configured to establish a communication connection between distributed processor memory chip 7500 and an external entity other than another distributed processor memory chip, such as distributed processor memory chips 7500' and 7500". For example, communication port 7530 can be indirectly or directly coupled to a host computer, e.g., as illustrated in FIG. 72A, or any other computing device, communications module, etc.

According to embodiments of the present disclosure, first distributed processor memory chip 7500 can further comprise one or more additional communication ports configured to communicate with other distributed processor memory chips e.g., 7500' or 7500". In some embodiments, one or more additional communication ports can include a second communication port 7531 and a third communication port 7532, as shown in FIG. 75A. Second communication port 7531 can be configured to communicate with second distributed processor memory chip 7500' and to establish a communication connection between first distributed processor memory chip 7500 and second distributed processor memory chip 7500'. Similarly, third communication port 7532 can be configured to communicate with third distributed processor memory chip 7500' and to establish a communication connection between first distributed processor memory chip 7500 and third distributed processor memory chip 7500". In some embodiments, first distributed processor memory chip 7500 (and any of memory chips disclosed herein) may include a plurality of communication ports, including any appropriate number of communication ports (e.g., 2, 3, 4, 5, 6, 7, 8, 9, 10, 20, 50, 100, 1000, etc).

In some embodiments, the first communication port, the second communication port, and the third communication port are associated with a corresponding bus. The corresponding bus may be a bus common to each of the first communication port, the second communication port, and the third communication port. In some embodiments, the corresponding buses associated with each of the first communication port, the second communication port, and the third communication port are all connected to a plurality of discrete memory banks. In some embodiments, the first communication port is connected to at least one of a main bus internal to the memory chip or at least one processor subunit included in the memory chip. In some embodiments, the second communication port is connected to at least one of a main bus internal to the memory chip or at least one processor subunit included in the memory chip.

While configurations of the disclosed distributed processor memory chips are explained relative to first distributed processor memory chip 7500, it is noted that second processor memory chip 7500' and third processor memory chip 7500" may be configured similar to first distributed processor memory chip 7500. For example, second distributed processor memory chip 7500' may also comprise a memory array 7510', a processing array 7520', a controller 7540', and/or a plurality of communication ports such as ports 7530', 7531', and 7532'. Similarly, third distributed processor memory chip 7500" may comprise a memory array 7510", a processing array 7520", a controller 7540", and/or a plurality of communication ports such as ports 7530", 7531", and 7532". In some embodiments, second communication port 7531' and third communication port 7532' of second distributed processor memory chip 7500' may be configured to communicate with third distributed processor memory chip 7500" and first distributed processor memory chip 7500 respectively. Similarly, the second communication port 7531" and third communication port 7532" of third distributed processor memory chip 7500" may be configured to communicate with first distributed processor memory chip 7500 and second distributed processor memory chip 7500' respectively. This similarly in configurations among the distributed processor memory chips may facilitate scaling of a computational system based on the disclosed distributed processor memory chips. Further, the disclosed arrangement and configuration of the communication ports associated with each distributed processor memory chip may enable a flexible arrangement of an array of distributed processor memory chips (e.g., including connections in series, parallel, in looped, starred, or webbed connections, etc.).

According to embodiments of the present disclosure, distributed processor memory chips, e.g., first to third distributed processor memory chips 7500, 7500', and 7500" may communicate with each other via bus 7533. In some embodiments, bus 7533 can connect two communication ports of two different distributed processor memory chips. For example, second communication port 7531 of first processor memory chip 7500 may be connected to third communication port 7532' of second processor memory chip 7500' via bus 7533. According to embodiments of the present disclosure, distributed processor memory chips, e.g., first to third distributed processor memory chips 7500, 7500', and 7500" may also communicate with external entities (e.g., a host computer) via a bus, such as bus 7534. For example, first communication port 7530 of first distributed processor memory chip 7500 can be connected to one or more external entities via bus 7534. The distributed processor memory chips may be connected to each other in various ways. In some cases, the distributed processor memory chips may exhibit serial connectivity in which each distributed processor memory chip is connected to a pair of adjacent distributed processor memory chips. In other cases, the distributed processor memory chips may exhibit a higher degree of connectivity, where at least one distributed processor memory chip is connected to two or more other distributed processor memory chips. In some cases, all distributed processor memory chips within a plurality of memory chips may be connected to all other distributed processor memory chips in the plurality.

As shown in FIG. 75A, bus 7533 (or any other bus associated with the embodiment of FIG. 75A) may be unidirectional. While FIG. 75A illustrates bus 7533 as unidirectional and having a certain data transfer flow (as indicated by the arrows shown in FIG. 75A), bus 7533 (or any other bus in FIG. 75A) may be implemented as a bidirectional bus. According to some embodiments of the present disclosure, a bus connected between two distributed processor memory chips may be configured to have a higher communication speed than that of bus connected between a distributed processor memory chip and an external entity. In some embodiments, communication between distributed processor memory chips and an external entity may occur during limited times, e.g., during an execution preparation (loading a program code, input data, weight data, etc. from a host computer), during a period of outputting results generated by execution of a neural network model, etc. to a host computer. During execution of one or more programs associated with the distributed processors of chips 75M, 7500', and 7500", (e.g., during memory intensive operations associated with artificial intelligence applications, etc.) communication between distributed processor memory chips may occur over bus 7533, 7533' etc. In some embodiments, communication between a distributed processor memory chip and an external entity may occur less frequently than communication between two processor memory chips. According to communication requirements and embodiments, a bus between a distributed processor memory chip and an external entity may be configured to have a communication speed equal to, greater than, or less than that of a bus between distributed processor memory chips.

In some embodiments, as represented by FIG. 75A, a plurality of distributed processor memory chips such as first to third distributed processor memory chips 7500, 7500', and 7500" may be configured to communicate with one another. As noted, this capability may facilitate assembly of scalable distributed processor memory chip system. For example, memory arrays 7510, 7510', and 7510" and processing arrays 7520, 7520', and 7520" from first to third processor memory chips 7500, 7500', and 7500" when linked by communication channels (such as the busses shown in FIG. 75A, for example) may be considered as virtually belonging to a single distributed processor memory chip.

According to embodiments of the present disclosure, communication between a plurality of distributed processor memory chips and/or communication between a distributed processor memory chip and one or more external entities can be managed in any suitable manner. In some embodiments, such communications may be managed by processing resources such as processing array 7520 in distributed processor memory chip 7500. In some other embodiments, e.g., to relieve the processing resources provided by the arrays of distributed processors from computing loads imposed by communication management, a controller, such as controller 7540, 7540', 7540", etc. of a distributed processor memory chip may be configured to manage communications between distributed processor memory chips and/or communications between distributed processor memory chip(s) and one or more external entities. For example, each controller 7540, 7540', and 7540" of first to third processor memory chips 7500, 7500', and 7500" may be configured to manage communications related to its corresponding distributed processor memory chip relative to other distributed processor memory chips. In some embodiments, controllers 7540, 7540', and 7540" may be configured to control such communications through corresponding communication ports, such as ports 7531, 7531', 7531". 7532, 7532', and 7532", etc.

Controllers 7540, 7540', and 7540" may also be configured to manage communications between the distributed processor memory chips while taking into account timing differences that may exist among the distributed processor memory chips. For example, a distributed processor memory chip (e.g., 7500) may be fed by an internal clock, which may be different (e.g, have a different timing pattern) relative to clocks of other distributed processor memory chips (e.g., 7500' and 7500"). Therefore, in some embodiments, controller 7540 may be configured to implement one or more strategies for accounting for different clock timing patterns among distributed processor memory chips and to manage communications between the distributed processor memory chips by considering possible time deviations between distributed processor memory chips.

For example, in some embodiments, a controller 7540 of a first distributed processor memory chip 7500 may be configured to enable a data transfer from first distributed processor memory chip 7500 to a second processor memory chip 7500' under certain conditions. In some cases, controller 7540 may withhold the data transfer if one or more processor subunits of the first distributed processor memory chip 7500 are not ready to transfer the data. Alternatively or additionally, controller 7540 may withhold the data transfer if a receiving processor subunit of the second distributed processor memory chip 7500' is not ready to receive the data. In some cases, controller 7540 may initiate the data transfer from the sending processor subunit (in chip 7500, for example) to the receiving processor subunit (in chip 7500', for example) after establishing that both the sending processor subunit is ready to send the data, and the receiving processor subunit is ready to receive the data. In other embodiments, controller 7540 may initiate the data transfer based solely on whether the sending processor subunit is ready to send the data, especially if the data may be buffered in controller 7540 or 7540', for example, until the receiving processor subunit is ready to receive the transferred data.

According to embodiments of the present disclosure, controller 7540 may be configured to determine whether one or more other timing constraints are fulfilled in order to enable data transfers. Such time constraints may be related to a time difference between a transfer time from a sending processor subunit and a receipt time in a receiving processor subunit, to an access request from an external entity (e.g., host computer) to data that is processed, to a refresh operation performed on memory resources (e.g., memory array) associated with sending or receiving processor subunits, among others.

Figure 75B:
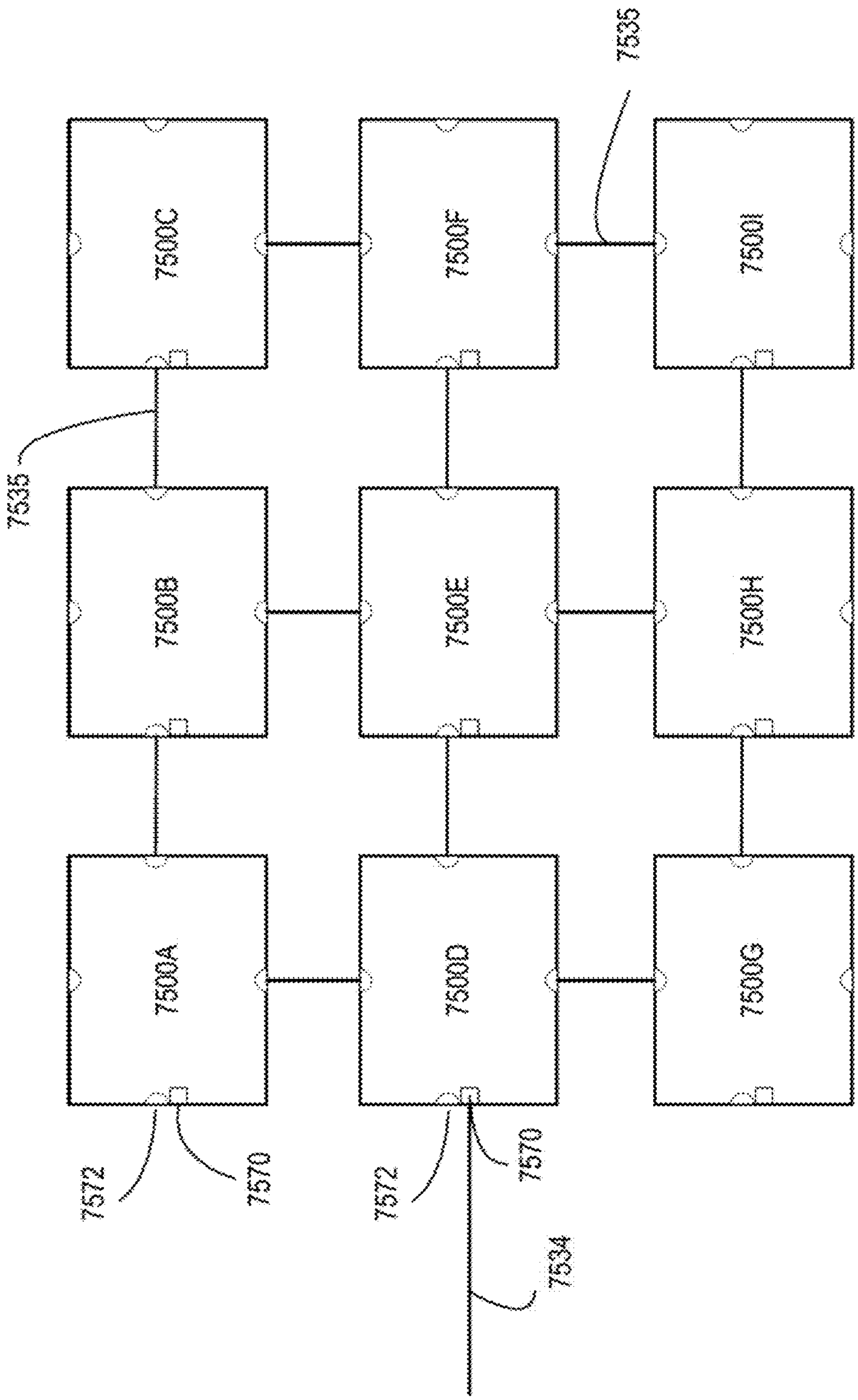
FIG. 75B is a diagrammatic representation of a scalable processor memory system including a plurality of distributed processor memory chips, consistent with embodiments of the present disclosure.
Figure 75C:
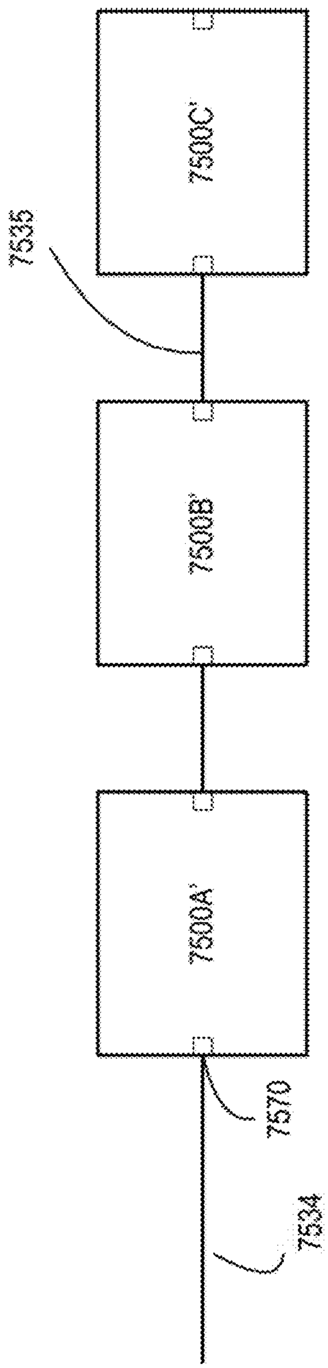
FIG. 75C is a diagrammatic representation of a scalable processor memory system including a plurality of distributed processor memory chips, consistent with embodiments of the present disclosure.
Figure 75D:
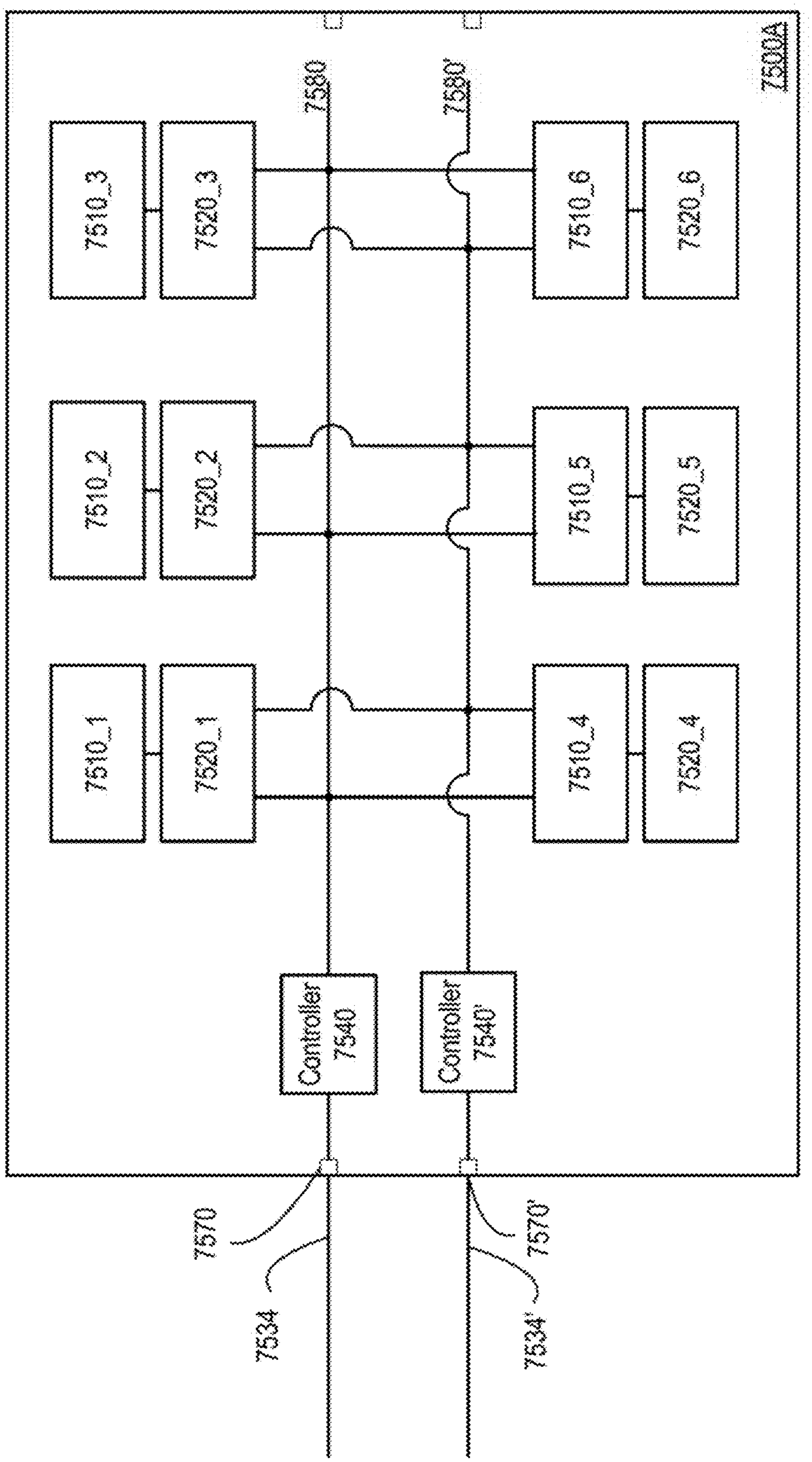
FIG. 75D is a diagrammatic representation of a dual port distributed processor memory chip, consistent with embodiments of the present disclosure.
Figure 75E:
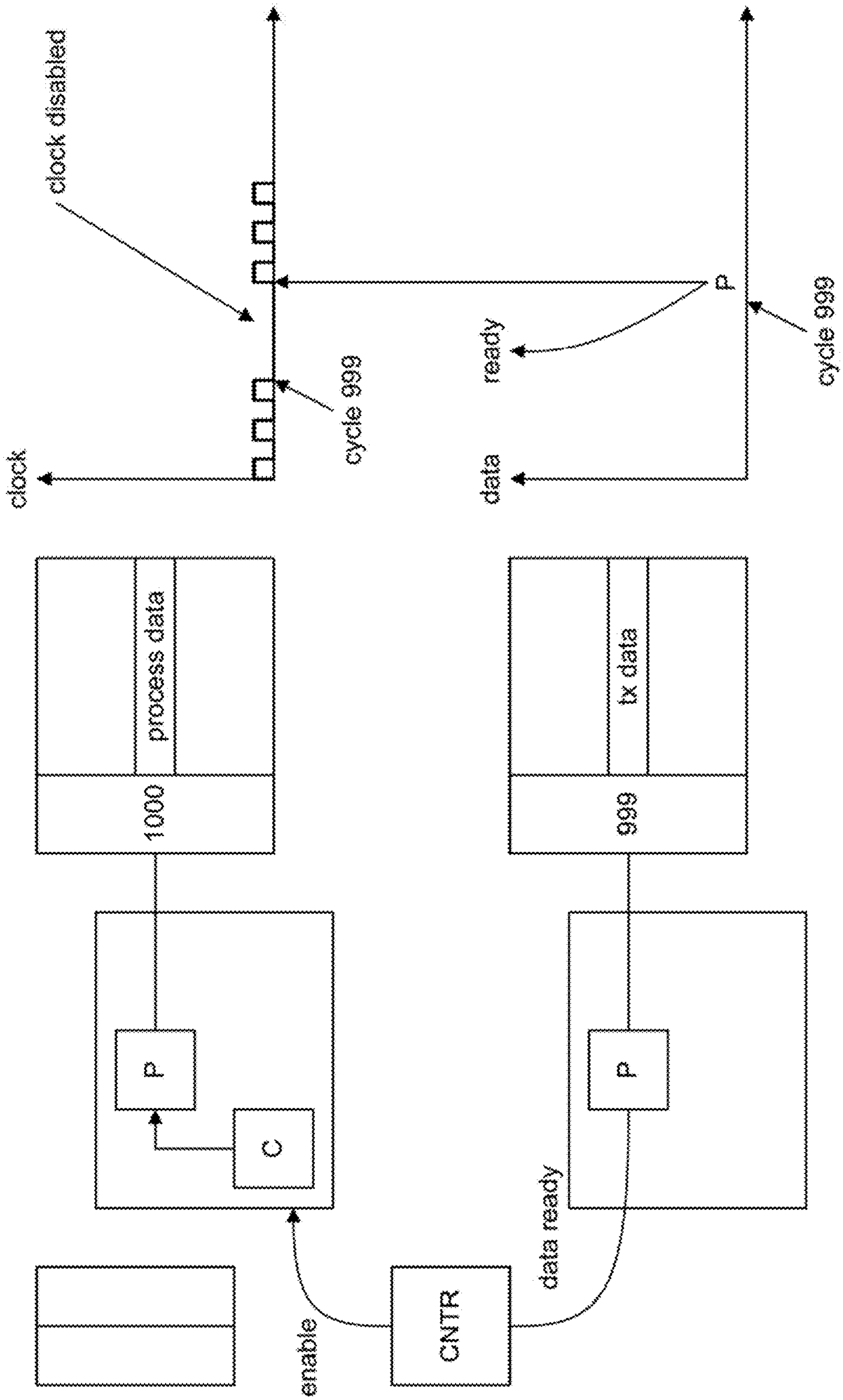
FIG. 75E is an example timing diagram, consistent with embodiments of the present disclosure.

FIG. 75E is an example timing diagram, consistent with embodiments of the present disclosure. FIG. 75E illustrates the following example.

In some embodiments, controller 7540, and other controllers associated with the distributed processor memory chips, may be configured to manage data transfers between chips using a clock enable signal. For example, a processing array 7520 may be fed by a clock. In some embodiments, whether or not one or more processor subunits responds to a supplied clock signal may be controlled, e.g., by controller 7540, using a clock enable signal (e.g., shown as "to CE" in FIG. 75A). Each processor subunit, e.g., 7520_1 to 7520_K may execute a program code and the program code may include communication commands. According to some embodiments of the present disclosure, controller 7540 can control timing of the communication commands by controlling a clock enable signal to processor subunits 7520_1 to 7520_K. For example, when a sending processor subunit (e.g., in first processor memory chip 7500) is programmed to transfer data at a certain cycle (e.g., $1000^{th}$ clock cycle) and a receiving processor subunit (e.g., in second processor memory chip 7500') is programmed to receive the data at the certain cycle (e.g., $1000^{th}$ clock cycle), controller 7540 of first processor memory chip 7500 and controller 7540' of second processor memory chip 7500' may not allow data transfer until both sending and receiving processor subunits are ready to perform the data transfer according to some embodiments. For example, controller 7540 may "hold" a data transfer from the sending processor subunit in chip 7500 by supplying the sending the processor subunit with a certain clock enable signal (e.g., a logic low) that may prevent the sending processor subunit from sending the data in response to the received clock signal. The certain clock enable signal may "freeze" the entire distributed processor memory chip or any part of the distributed processor memory chip. On the other hand, controller 7540 may cause the sending processor subunit to initiate the data transfer by supplying the sending processor subunit with an opposite clock enable signal (e.g., a logic high) that causes the sending processor subunit to respond to the received clock signal. Similar operation, e.g., receiving or not receiving by a receiving processor subunit in chip 7500' may be controlled using a clock enable signal issued by controller 7540'.

In some embodiments, clock enable signals can be sent to all processor subunits (e.g., 7520_1 to 7520_K) in a processor memory chip (e.g., 7500). The clock enable signals, in general, may have the effect of causing the processor subunits to either respond to their respective clock signals or to disregard those clock signals. For example, in some cases, when the clock enable signal is high (depending on the convention of a particular application), a processor subunit may respond to its clock signal and may execute one or more instructions according to its clock signal timing. On the other hand, when the clock enable signal is low, the processor subunit is prevented from responding to its clock signal such that it does not execute instructions in response to clock timing. In other words, when the clock enable signal is low, a processor subunit may disregard received clock signals.

Returning to the example of FIG. 75A, any of the controllers 7540, 7540', or 7540" may be configured to use a clock enable signal to control operations of the respective distributed processor memory chips by causing one or more processor subunits in the respective arrays to respond or not to respond to received clock signals. In some embodiments, controllers 7540, 7540', or 7540" may be configured to selectively advance code execution, e.g., when such code relates to or includes data transfer operations and timing thereof. In some embodiments, controllers 7540, 7540', or 7540" may be configured to use clock enable signals to control timing of data transmission through any one of communication ports 7531, 7531', 7531", 7532, 7532', and 7532", etc. between two different distributed processor memory chips. In some embodiments, controllers 7540, 7540', or 7540" may be configured to use clock enable signals to control times of data receipt through any one of communication ports 7531, 7531', 7531", 7532, 7532', and 7532", etc. between two different distributed processor memory chips.

In some embodiments, data transfer timing between two different distributed processor memory chips may be arranged based on compilation optimization steps. The compilation may allow for building of processing routines in which tasks may be efficiently assigned to processing subunits without being affected by transmission delays over buses connected between two different processor memory chips. The compilation may be performed by a compiler in a host computer or transmitted to the host computer. Normally, transfer delays over bus between two different processor memory chips would result in data bottlenecks for processing subunits requiring the data. The disclosed compilation may schedule data transmission in a way that enables processing units to continuously receive data even with disadvantageous transmission delays over buses.

While the embodiment of FIG. 75A includes three ports per distributed processor memory chip (7500', 7500", 7500'"), any number of ports may be included in the distributed processor memory chips according to the disclosed embodiments. For example, in some cases, the distributed processor memory chips may include more or fewer ports. In the embodiment of FIG. 75B, each distributed processor memory chip (e.g., 7500A-7500I) may be configured with multiple ports. These ports may be substantially the same as one another or may be different. In the example shown, each distributed processor memory chip includes five ports, including a host communication port 7570 and four chip ports 7572. Host communication port 7570 may be configured to communication (via bus 7534) between any of the distributed processor memory chips in an array, as shown in FIG. 75B and a host computer, for example, remotely located relative to the array of distributed processor memory chips. Chip ports 7572 may be configured to enable communication between distributed processor memory chips via busses 7535.

Any number of distributed processor memory chips may be connected to one another. In the example shown in FIG. 75B, including four chip ports per distributed processor memory chip may enable an array in which each distributed processor memory chip is connected to two or more other distributed processor memory chips, and in some cases, certain chips may be connected to four other distributed processor memory chips. Including more chip ports in the distributed processor memory chips may enable more interconnectivity between distributed processor memory chips.

Additionally, while distributed processor memory chips 7500A-7500I are shown in FIG. 75B with two different types of communication ports 7570 and 7572, in some cases a single type of communication port may be included in each distributed processor memory chip. In other cases, more than two different types of communication ports may be included in one or more of the distributed processor memory chips. In the example of FIG. 75C, each of distributed processor memory chips 7500A'-7500C' includes two (or more) of the same type of communication port 7570. In this embodiment, communication port 7570 may be configured to enable communication with an external entity, such as a host computer via bus 7534, and may also be configured to enable communication between distributed processor memory chips (e.g., between distributed processor memory chips 7500B' and 7500C' over bus 7535.

In some embodiments, the ports provided on one or more distributed processor memory chips may be used to provide access to more than one host. For example, in the embodiment shown in FIG. 75D, a distributed processor memory chip includes two or more ports 7570. Ports 7570 may constitute host ports, chip ports, or a combination of host and chip ports. In the example shown two ports 7570 and 7570' may provide two different hosts (e.g., host computers or computational elements, or other types of logic units) with access to distributed processor memory chip 7500A via buses 7534 and 7534'. Such an embodiment may provide access to distributed processor memory chip 7500A to two (or more) different host computers. In other embodiments, however, both buses 7534 and 7534' may be connected to the same host entity, for example, where that host entity requires additional bandwidth or parallel access to one or more of the processor subunits\memory banks of distributed processor memory chip 7500A.

In some cases, as shown in FIG. 75D, more than one controller 7540 and 7540' may be used to control accesses to the distributed processor subunits/memory banks of distributed processor memory chip 7500A. In other cases, a single controller may be used to handle communications from one or more external host entities.

Additionally, one or more buses internal to distributed processor memory chip 7500A may enable parallel access to the distributed processor subunits/memory banks of distributed processor memory chip 7500A. For example, distributed processor memory chip 7500A may include a first bus 7580 and a second bus 7580' enabling parallel access to, for example, distributed processor subunits 7520_1 to 7520_6 and their corresponding, dedicated memory banks 7510_1 to 7510_6. Such an arrangement may allow for simultaneous access to two different locations in distributed processor memory chip 7500A. Further, in cases where not all ports are simultaneously used, they can share hardware resources within distributed processor memory chip 7500A (e.g., a common bus and/or common controller) and can constitute IOs muxed to that hardware.

In some embodiments, some of the computational units (e.g., processor subunits 7520_1 to 7520_6) may be connected to an extra port (7570') or controller, while others are not. Nevertheless, data from computational units that are not connected to the extra port 7570' may flow through an inner grid of connections to computational units that are connected to port 7570'. In this way, communication can be performed at both ports 7570 and 7570' simultaneously without the need to add additional buses.

Figure 76:
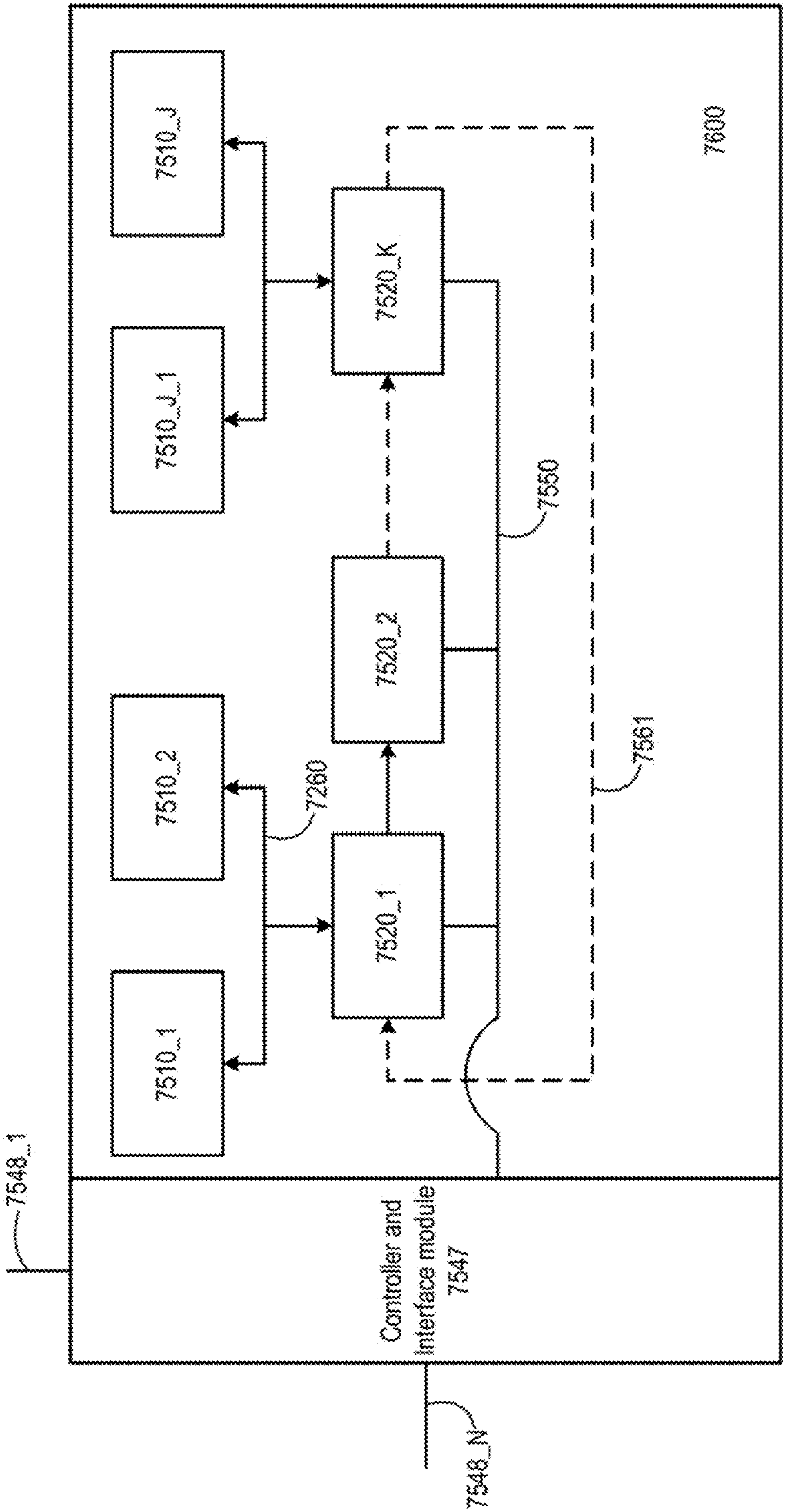
FIG. 76 is a diagrammatic representation of a processor memory chip having an integrated controller and interface module and constituting a scalable processor memory system, consistent with embodiments of the present disclosure.

While communication ports (e.g., 7530 to 7532) and controllers (e.g., 7540) have been illustrate as separate elements, it is appreciated that communication ports and controllers (or any other components) can be implemented as integrated units according to embodiments of the present disclosure. FIG. 76 provides a diagrammatic representation of a distributed processor memory chip 7600 having an integrated controller and interface module, consistent with embodiments of the present disclosure. As shown in FIG. 76, processor memory chip 7600 may be implemented with an integrated controller and interface module 7547 that is configured to perform functions of controller 7540 and communication ports 7530, 7531, and 7532 in FIG. 75. As shown in FIG. 76, controller and interface module 7547 configured to communicate with multiple different entities such as an external entity, one or more distributed processor memory chips, etc. through interfaces 7548_1 to 7548_N similar to communication ports (e.g., 7530, 7531, and 7532). Controller and interface module 7547 can be further configured to control communication between distributed processor memory chips or between distributed processor memory chip 7600 and an external entity, such as a host computer. In some embodiments, controller and interface module 7547 may include communication interfaces 7548_1 to 7548_N configured to communicate in parallel with one or more other distributed processor memory chips and with an external entity such as a host computer, communication module, etc.

Figure 77:
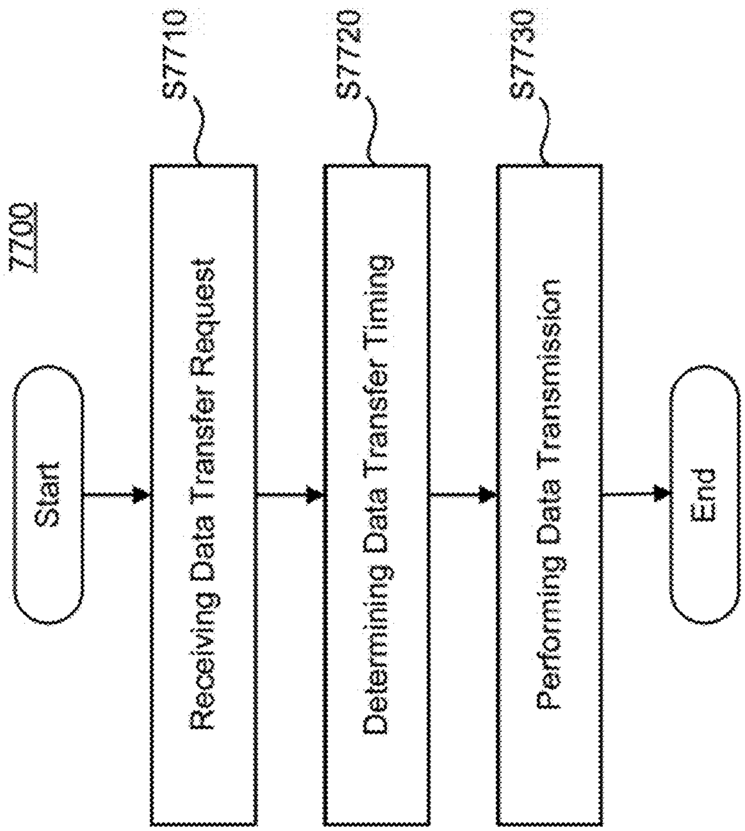
FIG. 77 is a flow diagram for transferring data between processor memory chips in a scalable processor memory system shown in FIG. 75A, consistent with embodiments of the present disclosure.

FIG. 77 provides a flow diagram representing a process for transferring data between distributed processor memory chips in a scalable processor memory system shown in FIG. 75, consistent with embodiments of the present disclosure.

For illustrative purposes, a flow for transferring data will be described referring to FIG. 75 and assuming that data is transferred from first processor memory chip 7500 to second processor memory chip 7500'.

At step S7710, a data transfer request may be received. It should be noted, however, and as described above, in some embodiments a data transfer request may not be necessary. For example, in some cases, timing of a data transfer may be predetermined (e.g., by a particular software code). In such cases, the data transfer may proceed without a separate data transfer request. Step S7710 can be performed by, for example, controller 7540, among others. In some embodiments, the data transfer request may include a request for transferring data from one processor subunit of a first distributed processor memory chip 7500 to another processor subunit of a second distributed processor memory chip 7500'.

At step S7720, data transfer timing may be determined. As noted, data transfer timing may be predetermined and may depend on the order of execution of a particular software program. Step S7720 can be performed by, for example, controller 7540, among others. In some embodiments, data transfer timing may be determined by considering (1) whether a sending processor subunit is ready to transfer the data and/or (2) whether a receiving processor subunit is ready to receive the data. According to embodiments of the present disclosure, whether one or more other timing constraints are fulfilled to enable such data transfer can also be considered. The one or more time constraints may be related to a time difference between a transfer time from a sending processor subunit and a receipt time at a receiving processor subunit, to an access request from an external entity (e.g., host computer) to data that is processed, to a refresh operation performed on memory resources (e.g., memory array) associated with sending or receiving processor subunits, and etc. According to embodiments of the present disclosure, processing subunits may be fed by a clock. In some embodiments, the clock supplied to the processing subunits can be controlled, e.g., using a clock enable signal. According to some embodiments of the present disclosure, controller 7540 can control timing of the communication commands by controlling a clock enable signal to processor subunits 7520_1 to 7520_K.

At step S7730, data transmission can be performed based on the determined data transfer timing at step S7720. Step S7730 can be managed by, for example, controller 7540, among others. For example, a sending processor subunit of first processor memory chip 7500 can transfer data to a receiving processor subunit of second processor memory chip 7500' according to the determined data transfer timing at step S7720.

The disclosed architectures may be useful in a variety of applications. For example, in some cases, the architectures above may facilitate sharing among different distributed processor memory chips data such as the weights or neuron values or partial neuron values associated with neural networks (especially large neural networks). Additionally, in certain operations, such as SUM, AVG, etc. may require data from multiple different distributed processor memory chips. In such cases, the disclosed architectures may facilitate sharing of this data from multiple distributed processor memory chips. Further still, the disclosed architectures may facilitate sharing of records between distributed processor memory chips to support join operations of queries, for example.

It should also be noted that while the embodiments above have been described relative to distributed processor memory chips, the same principles and techniques may be applied to regular memory chips not including distributed processor sub-units, for example. For example, in some cases, multiple memory chips may be combined together into a multi-port memory chip to form an array of memory chips even without the array of processor subunits. In another embodiment, multiple memory chips may be combined together to form an array of connected memories, providing the host with virtually one larger memory comprised of the multiple memory chips.

Internal connections of the ports may be to a main bus or to one of the internal processor sub-units included in the processing array.

In-Memory Zero Detection

Some embodiments of the present disclosure are directed to memory units for detecting a zero value stored in one or more particular addresses of a plurality of memory banks. This zero value detection feature of the disclosed memory units may be useful in reducing power consumption of a computing system and may, additionally or alternatively, also reduce processing time required for retrieving zero values from memory. This feature may be especially relevant in a system where a lot of data read is actually 0 values and also for calculation operations, such as multiplication\addition\subtraction\and more operations, for which retrieval of a zero value from memory may not be necessary (e.g., a multiplication of a zero value by any other value is zero) and the computation circuit can use the fact that one of the operands is zero and calculate the results more efficiently in time or energy. In such cases, detection of the presence of a zero value may be used in place of a memory access and retrieval of the zero value from memory.

Throughout this section, the disclosed embodiments are described relative to a read function. It should be noted, however, that the disclosed architectures and techniques are equally applicable for zero-value write operations or also for other specific predetermined non-zero value operations in case other values may be more likely to appear more often.

In the disclosed embodiments, rather than a retrieving a zero value from memory, when such a value is detected at a particular address, the memory unit may return a zero value indicator to one or more circuits outside the memory unit (e.g., one or more processors, CPUs, etc. located outside the memory unit). The zero value is a multiple-bit zero value zero (for example a zero-value byte, a zero-value word, a multi-bit zero value that is less than a byte, more than a byte, and the like). The zero value indicator is an I-bit signal indicating a zero value stored in the memory, thus it is beneficial to transfer the 1-bit zero value indicating signal than transferring n-bits of data stored in the memory. The transmitted zero indication may reduce energy consumption for the transfer by 1/n and may speed up computations, for example, where multiplication operations are involved in calculations of input by weights of neurons, convolutions, applying a kernel on input data, and many other calculations associated with trained neural networks, artificial intelligence, and a wide array of other types of computations. To provide this functionality, the disclosed memory units may include one or more zero value detection logic units that may detect the presence of a zero value in a particular location in memory, prevent retrieval of the zero value (e.g., via a read command), and cause a zero value indicator instead to be transmitted to circuitry outside the memory unit (for example using one or more control lines of the memory, one or more buses associated with the memory unit, etc). The zero value detection may be performed at a memory mat level, at a bank level, at a sub-bank level, at a chip level, etc.

It should be noted that while the disclosed embodiments are described relative to the delivery of a zero indicator to a location external to a memory chip, the disclosed embodiments and features may also provide significant benefits in systems where processing may be done inside a memory chip. For example, in embodiments, such as the distributed processor memory chips disclosed herein, processing may be performed on the data in various memory banks by corresponding processor subunits. In many cases, such as the execution of neural networks or data analytics, for which the associated data may include many zeros, the disclosed techniques may speed processing and/or reduce power consumption associated with processing performed by the processor subunits in a distributed processor memory chip.

Figure 78A:
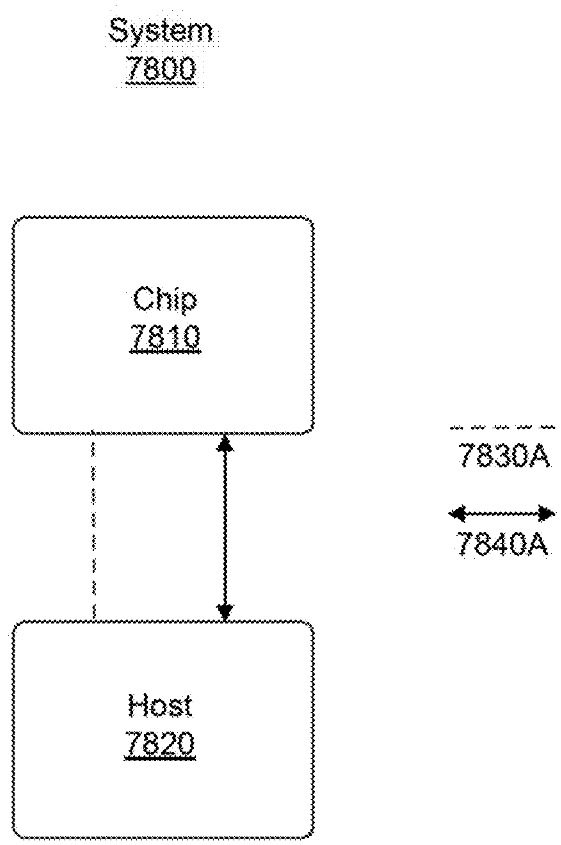
FIG. 78A illustrates a system for detecting a zero value stored in one or more particular addresses of a plurality of memory banks implemented in a memory chip at a chip level, consistent with embodiments of the present disclosure.

FIG. 78A illustrates a system 7800 for detecting a zero value stored in one or more particular addresses of a plurality of memory banks implemented in a memory chip 7810 at a chip level, consistent with embodiments of the present disclosure. System 7800 may include memory chip 7810 and host 7820. Memory chip 7810 may include a plurality of control units and each control unit may have a dedicated memory bank. For example, a control unit may be operably connected to a dedicated memory bank.

In some cases, for example relative to the distributed processor memory chips disclosed here, which include processor subunits spatially distributed among an array of memory banks, processing within the memory chip may involve memory accesses (whether for reading or writing). Even in the case of processing internal to a memory chip, the disclosed techniques of detecting a zero value associated with a read or write command may allow the internal processor unit or subunits to forego transfer of a actual zero value. Instead, in response to a zero value detection and transmission of a zero value indicator (e.g., to one or more internal processing subunits), the distributed processor memory chip may save energy that would have otherwise been used for transmission of a zero data value within the memory chip.

In another example, each of memory chip 7810 and host 7820 may include input/output (IO) to enable communications between memory chip 7810 and host 7820. Each IO can be coupled with zero value indicator line 7830A and bus 7840A. Zero value indicator line 7830A may transfer a zero value indicator from memory chip 7810 to host 7820, wherein the zero value indicator may include a 1-bit signal generated by memory chip 7810 upon detecting a zero value stored in a particular address of a memory bank requested by host 7820. Host 7820, upon receiving the zero value indicator via zero value indicator line 7830A, may perform one or more predefined actions associated with the zero value indicator. For example, if host 7820 requested to retrieve an operand for a multiplication to memory chip 7810, host 7820 may calculate the multiplication more efficiently because host 7820 will have confirmation (without receiving the actual memory value) from the received zero value indicator that one of the operands is zero. Host 7820 may also provide instructions, data, and other input to memory chip 7810 and read output from memory chip 7810 via bus 7840. Upon receiving communications from host 7820, memory chip 7810 may retrieve data associated with the received communication and transfer the retrieved data to host 7820 via bus 7840.

In some embodiments, the host may send a zero value indicator to the memory chip rather than a zero data value. In this way, the memory chip (e.g., a controller disposed on the memory chip) may store or refresh a zero value in memory without having to receive the zero data value. Such an update may occur based on receipt of a zero value indicator (e.g., as part of a write command).

Figure 78B:
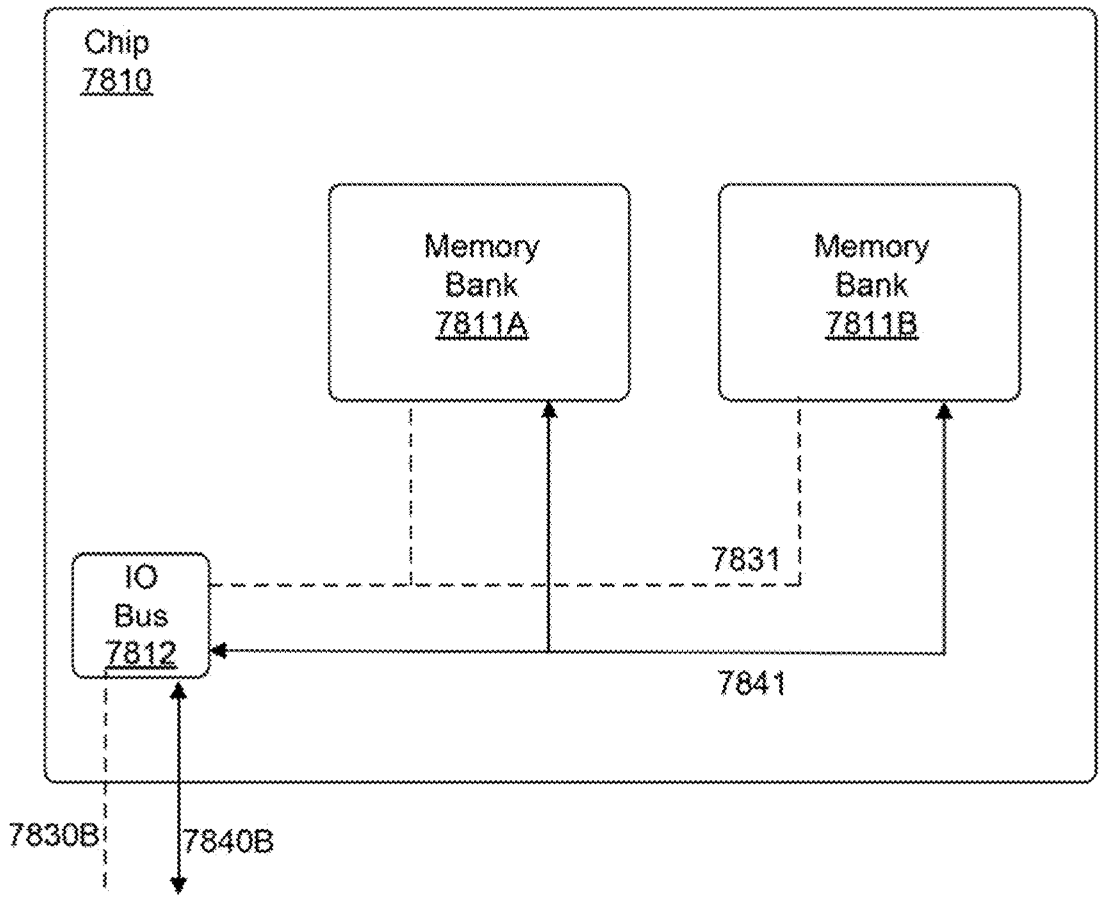
FIG. 78B illustrates a memory chip for detecting a zero value stored in one or more of particular addresses of a plurality of memory banks at a memory bank level, consistent with embodiments of the present disclosure.

FIG. 78B illustrates a memory chip 7810 for detecting a zero value stored in one or more particular addresses of a plurality of memory banks 7811A-B at a memory bank level, consistent with embodiments of the present disclosure. Memory chip 7810 may include a plurality of memory banks 7811A-B and IO bus 7812. Although FIG. 78B depicts two memory banks 7811A-B implemented in memory chip 7810, memory chip 7810 may include any number of memory banks.

IO bus 7812 may be configured to transfer data to/from an external chip (e.g., host 7820 in FIG. 78A) via bus 7840B. Bus 7840B may function similar to bus 7840A in FIG. 78A. 107812 may also transmit a zero value indicator via zero value indicator line 7830B, wherein zero value indicator line 7830B may function similar to zero value indicator line 7830A in FIG. 78A. IO bus 7812 may also be configured to communicate with memory banks 7811A-B via internal zero value indicator line 7831 and bus 7841. IO bus 7812 may transmit the received data from the external chip to one of memory banks 7811A-B. For example, IO bus 7812 may transfer data comprising instructions to read data stored in a particular address of memory bank 7811A via bus 7841. A mux can be included between IO bus 7812 and memory banks 7811A-B and may be connected by internal zero value indicator line 7831 and bus 7841A. The mux can be configured to transmit received data from IO bus 7812 to a particular memory bank and may be further configured to transmit received data or a received zero value indicator from the particular memory bank to IO bus 7812.

In some cases, a host entity may be configured only to receive regular data transmissions and may be unequipped to interpret or respond to the disclosed zero value indicator. In such a case, the disclosed embodiments (e.g., controller/chip IO, etc.) may re-generate a zero value on the data line to the host IO in place of the zero value indicator signal, and thus may save data transmission power internally within the chip.

Each of memory banks 7811A-B may include a control unit. The control unit may detect a zero value stored in a requested address of a memory bank. Upon detecting a stored zero value, the control unit may generate a zero value indicator and transmit the generated zero value indicator via an internal zero value indicator line 7831 to IO bus 7812, wherein the zero value indicator is further transferred to an external chip via zero value indicator line 7830B.

Figure 79:
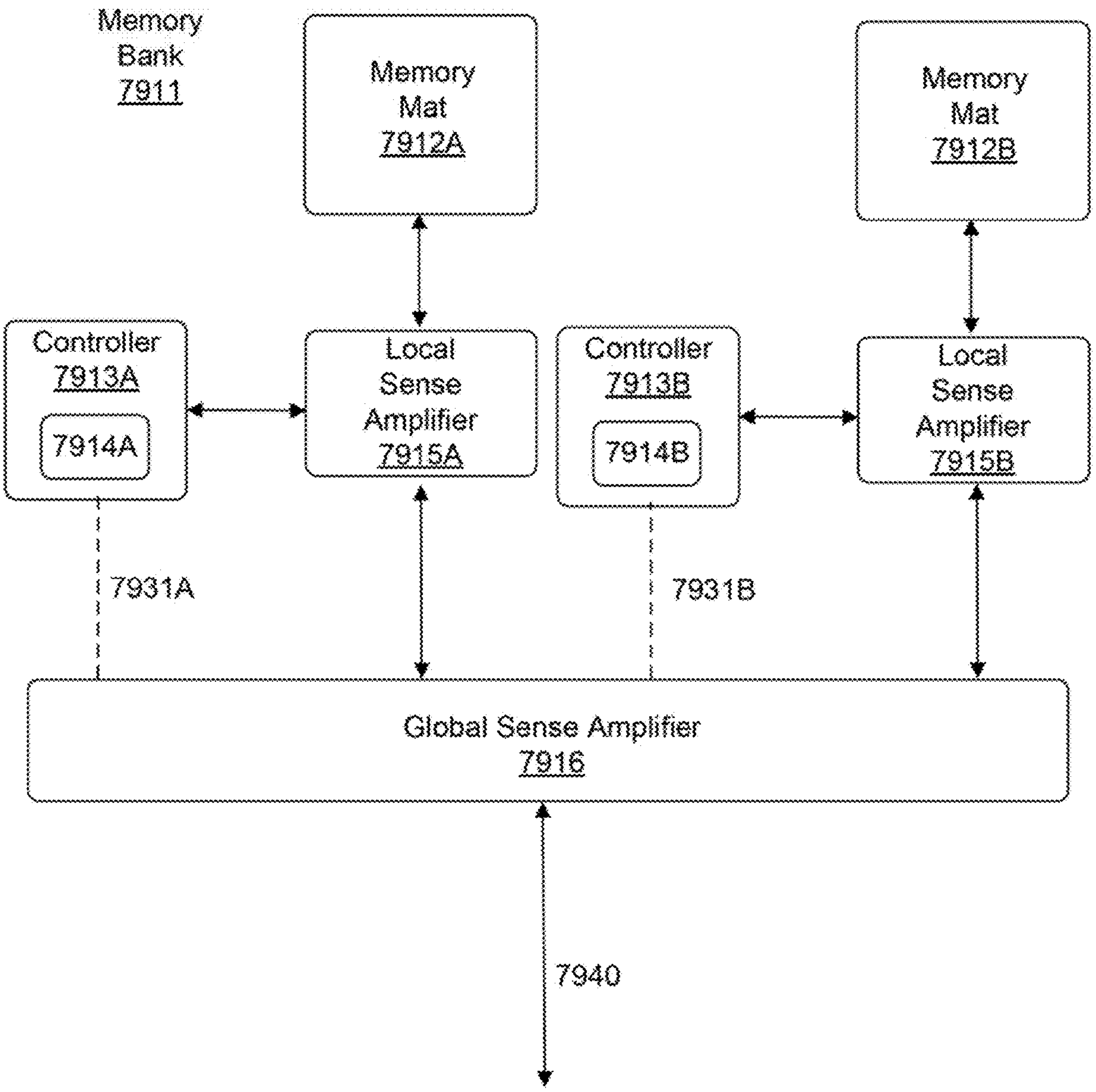
FIG. 79 illustrates a memory bank for detecting a zero value stored in one or more of particular addresses of a plurality of memory mats at a memory mat level, consistent with embodiments of the present disclosure.

FIG. 79 illustrates a memory bank 7911 for detecting a zero value stored in one or more of particular addresses of a plurality of memory mats at a memory mat level, consistent with embodiments of the present disclosure. In some embodiments, memory bank 7911 may be organized into memory mats 7912A-B, each of which may be independently controlled and independently accessed. Memory bank 7911 may include memory mat controllers 7913A-B, that may include zero value detection logic units 7914A-B. Each of memory mat controllers 7913A-B may allow reads and writes to locations on the memory mats 7912A-B. Memory bank 7911 may further include a read-disable element, local sense amplifiers 7915A-B, and/or a global sense amplifier 7916.

Each of memory mats 7912A-B may include a plurality of memory cells. Each of the plurality of memory cells may store one bit of binary information. For example, any of the memory cells may individually store a zero value. If all memory cells in a particular memory mat store zero values, then a zero value may be associated with the entire memory mat.

Each of memory mat controllers 7913A-B can be configured to access a dedicated memory mat, and read data stored in the dedicated memory mat or write data in the dedicated mat.

In some embodiments, zero value detection logic unit 7914A or 7914B can be implemented in a memory bank 7911. One or more zero value detection logic units 7914A-B may be associated with memory banks, memory sub-banks, memory mats, and a set of one or more memory cells. Zero value detection logic unit 7914A or B may detect that a requested particular address (e.g., memory mat 7912A or 7912B) stores a zero value. The detection can be performed in many methods.

A first method may include using a digital comparator against zero. The digital comparator can be configured to take two numbers as input in binary form and determine whether a first number (retrieved data) is equal to a second number (zero). If the digital comparator determines that two numbers are equal, a zero value detection logic unit may generate a zero value indicator. The zero value indicator may be a 1-bit signal and may disable amplifiers (e.g., local sense amplifiers 7915A-B), transmitters, and buffers that may send data bits to the next level (e.g., IO bus 7812 in FIG. 78B). The zero value indicator may be further transmitted via zero value indicator line 7931A or 7931B to a global sense amplifier 7916, but in some cases, may bypass the global sense amplifier.

A second method for zero detection may include using an analog comparator. The analog comparator may function similar to the digital comparator except for using voltages of two analog inputs for a comparison. For example, all of the bits may be sensed, and a comparator can act as a logical OR function between the signals.

A third method for zero value detection may include using a transferred signal from local sense amplifiers 7915A-B into global sense amplifier 7916, wherein global sense amplifier 7916 is configured to sense if any of the inputs is high (non-zero) and use that logic signal to control the next level of amplifiers. Local sense amplifiers 7915A-B and global sense amplifier 7916 may include a plurality of transistors configured to sense low-power signals from the plurality of memory banks and amplify a small voltage swing to higher voltage levels such that data stored in the plurality of memory banks can be interpreted by the at least one controller such as memory mat controller 7913A or 7913B. For example, memory cells may be laid out in rows and columns on memory bank 7911. Each line may be attached to each memory cell in the row. The lines which run along the rows are called wordlines which are activated by selectively applying a voltage to the wordlines. The lines which run along the columns are called bitlines, and two such complementary bitlines may be attached to a sense amplifier at the edge of the memory array. The number of sense amplifiers may correspond to the number of bitlines (columns) on memory bank 7911. To read a bit from a particular memory cell, the wordline along the cell's row is turned on, activating all the memory cells in the row. The stored value (0 or 1) from each cell is then available on the bitline associated with the particular cell. The sense amplifier at the end of the two complementary bitlines may amplify the small voltages to a normal logic level. The bit from the desired cell may then be latched from the cell's sense amplifier into a buffer, and put on the output bus.

A fourth method for zero value detection may include using an extra bit per each word saved to a memory and stored at write time if the value is 0 and use that extra bit when reading the data out to know if it is zero or not. The method may avoid a write of all zeroes to the memory, thus saving more energy.

As described above and throughout the disclosure, some embodiments may include a memory unit (such as memory unit 7800) that includes a plurality of processor subunits. These processor subunits may be distributed spatially on a single substrate (e.g., a substrate of a memory chip such as memory unit 7800). Moreover, each of the plurality of processor subunits may be dedicated to a corresponding memory bank from among a plurality of memory banks of memory unit 7800. And, these memory banks dedicated to corresponding processor subunits may also be spatially distributed on the substrate. In some embodiments, a memory unit 7800 may be associated with a particular task (e.g., performing one or more operations associated with running a neural network, etc.), and each one of the processor subunits of the memory unit 7800 may be responsible for performing a portion of this task. For example, each processor subunit may be equipped with instructions that may include data handling and memory operations, arithmetic and logic operations, etc. In some cases, the zero value detection logic may be configured to provide a zero value indicator to one or more of the described processor subunits spatially distributed on the memory unit 7800.

Figure 80:
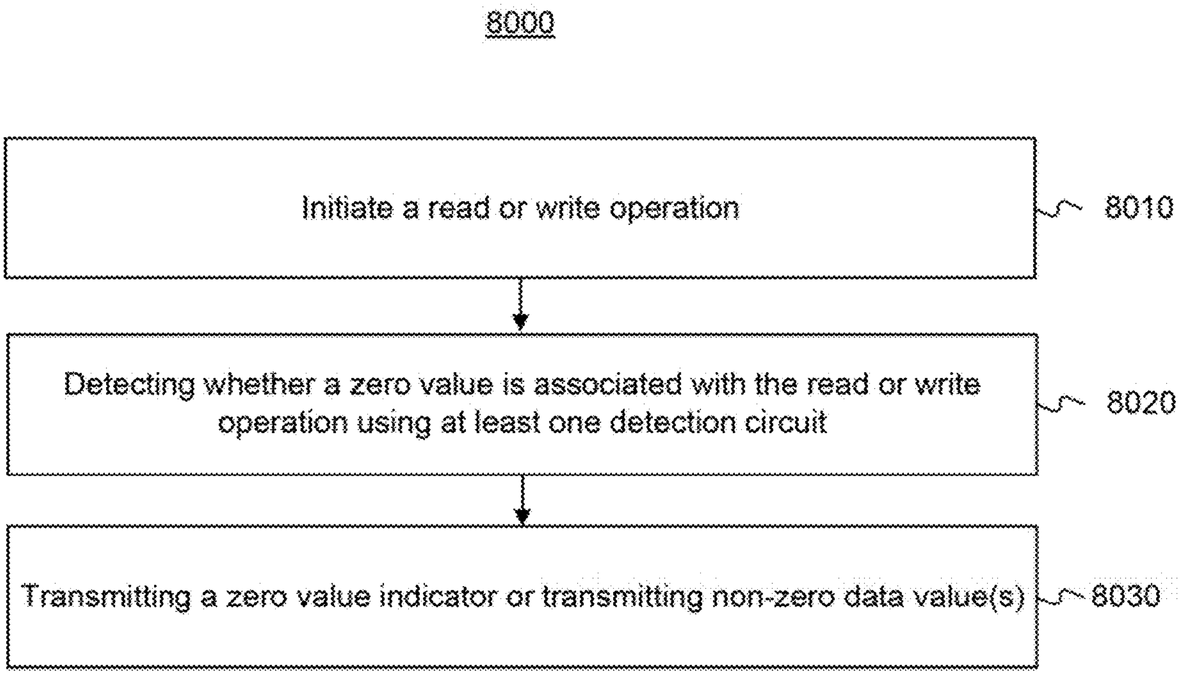
FIG. 80 is a flow chart illustrating an exemplary method of detecting a zero value in a particular address of a plurality of discrete memory banks, consistent with embodiments of the present disclosure.

Reference is now made to FIG. 80, which is a flow chart illustrating an exemplary method 8000 of detecting a zero value stored in a particular address of a plurality of memory banks, consistent with embodiments of the present disclosure. Method 8000 may be performed by a memory chip (e.g., memory chip 7810 of FIG. 78B). In particular, a controller (e.g., controller 7913A of FIG. 79) and a zero value detection logic unit (e.g., zero value detection logic unit 7914A) of the memory unit may perform method 8000.

In step 8010, a read or write operation may be initiated by any suitable technique. In some cases, a controller may receive a request to read data stored in a particular address of a plurality of discrete memory banks (e.g., memory banks depicted in FIG. 78). The controller can be configured to control at least one aspect of read/write operations relative to the plurality of discrete memory banks.

In step 8020, one or more zero value detection circuits may be used to detect the presence of a zero value associated with the read or write command. For example, a zero value detection logic unit (e.g., zero value detection logic unit 7830 of FIG. 78) may detect a zero value associated with a particular address associated with the read or write.

In step 8030, the controller may transmit a zero value indicator to one or more circuits outside the memory unit in response to a zero value detection by the zero value detection logic unit in step 8020. For example, a zero value detection logic may detect that a requested address stores zero value and may transmit an indication that the value is zero to an entity (e.g., one or more circuits) outside of the memory chip (or within the memory chip, e.g., in the case of the disclosed distributed processor memory chips including processor subunits distributed among an array of memory banks). If a zero value is not detected as associated with the read or write command, then the controller may transmit a data value instead of a zero value indicator. In some embodiments, the one or more circuits to which the zero value indicator is returned may be inside the memory unit.

While the disclosed embodiments have been described with respect to zero-value detection, the same principles and techniques would be applicable to detection of other memory values (e.g., 1, etc.). In some cases, in addition to a zero value indicator, the detection logic may return one or more indicators of other values associated with a read or write command (e.g., 1, etc.), and these indicators may be returned/transmitted in the event of a detection of any of the values corresponding to the value indicators. In some cases, the values may be adjusted by a user (e.g., through updating of one or more registers). Such updates may be especially useful where characteristics may be known about data sets, and there is an understanding (e.g., on the part of the user) that certain values may be more prevalent in the data than others. In such cases, one, two, three or more value indicators may be associated with the most prevalent data values associated with a data set.

Compensating for DRAM Activation Penalties

In certain types of memory (e.g., DRAM), memory cells may be arranged in arrays within a memory bank, and values included in the memory cells may be accessed and retrieved (read) one line of memory cells in the array at a time. This reading process may involve first opening (activating) a line (or row) of memory cells to make the data values stored by the memory cells available. Next, the values of the memory cells in the open line may be sensed simultaneously, and column addresses can be used to cycle through the individual memory cell values or groups of memory cell values (i.e. words) and connect each memory cell value to an external data bus in order to read the memory cell values. These processes take time. In some cases, opening a memory line for reading may require 32 cycles of compute time, and reading the values from the open line may require another 32 cycles. Significant latency may result if a next line to be read is opened only after completing a read operation of a current open line. In this example, during the 32 cycles required to open the next line, no data is being read, and reading each line effectively requires a total of 64 cycles instead of just the 32 it takes to iterate over the line data. Conventional memory systems do not allow opening a second line in the same bank while a first line is being read or written. To save the latency, the next line to open may thus be in a different bank o in a special bank for dual line access, as discussed below in further detail. The current line may all be sampled to flipflops or latches prior to opening the next line and all processing is done on the FF's\latches while the next line can be opened. If the next predicted line is in the same bank (and none of the above exists) then the latency may not be avoided and the system may need to wait. These mechanisms are relevant both for standard memories and especially to memory processing devices.

The presently disclosed embodiments may reduce this latency by, for example, making a prediction of the next memory line to be opened before a read operation of a current, open memory line has been completed. That is, if the next line to be opened can be predicted, then the process for opening the next line may begin before a read operation of the current line has been completed. Depending on when in the process the next line prediction is made, the latency associated with opening the next line may be reduced from 32 cycles (in the particular example described above) to less than 32 cycles. In one particular example, if the next line opening is predicted 20 cycles in advance, then the additional latency is only 12 cycles. In another example, if the next line opening is predicted 32 cycles in advance, then there is no latency at all. As a result, rather than requiring a total of 64 cycles to serially open and read each row, by opening the next row while reading the current row, the effective time to read each row may be reduced.

The following mechanisms may require the current and predicted lines to be in the same banks but if there is such a bank that can support activating and working simultaneously on a line then they can be also used.

In the disclosed embodiments, the next row prediction may be performed using various techniques (discussed in more detail below). For example, the next row prediction may be based on pattern recognition, based on a predetermined row access schedule, based on the output of an artificial intelligence model (e.g., a trained neural network to analyze row accesses and make a prediction of a next row to open), or based on any other suitable prediction technique. In some embodiments, 100% successful predictions can be achieved by using a delayed address generator or formulas as described below or other methods. The prediction may comprise building a system with capacities to sufficiently predict a next line to open prior to an access needed to it. In some cases, the next row prediction may be performed by a next row predictor that may be implemented in various ways. For example, a predicted address generator used to generate the current addresses for reading and/or writing from memory rows. An entity that generates addresses for access in the memory (either reads or writes) may be based on any logic circuit or a controller\CPU executing software instructions. The predicted address generator may include a pattern learning model that observes the accessed rows, identifies one or more patterns associated with the accesses (e.g., sequential line access, access to every second line, access to every third line, etc.), and estimates the next row to be accessed based on the observed patterns. In other examples, the predicted address generator may include a unit that applies a formula/algorithm to predict the next row to be accessed. In still further embodiments, the predicted address generator may include a trained neural network that outputs a predicted next row to access (including one or more addresses associated with the predicted row) based on inputs such as the current address/row being accessed, the last 2, 3, 4 or more addresses/rows that were accessed etc. Predicting the next memory line to access using any of the described predicted address generators may significantly reduce latency associated with memory accesses. The described predicted address/row generators may be useful in any system involving accesses to memory to retrieve data. In some cases, the described predicted address/row generators and the associated techniques for predicting the next memory line access may be especially suited in systems that executed artificial intelligence models, as AI models may be associated with repetitive memory access patterns that may facilitate next row prediction.

Figure 81A:
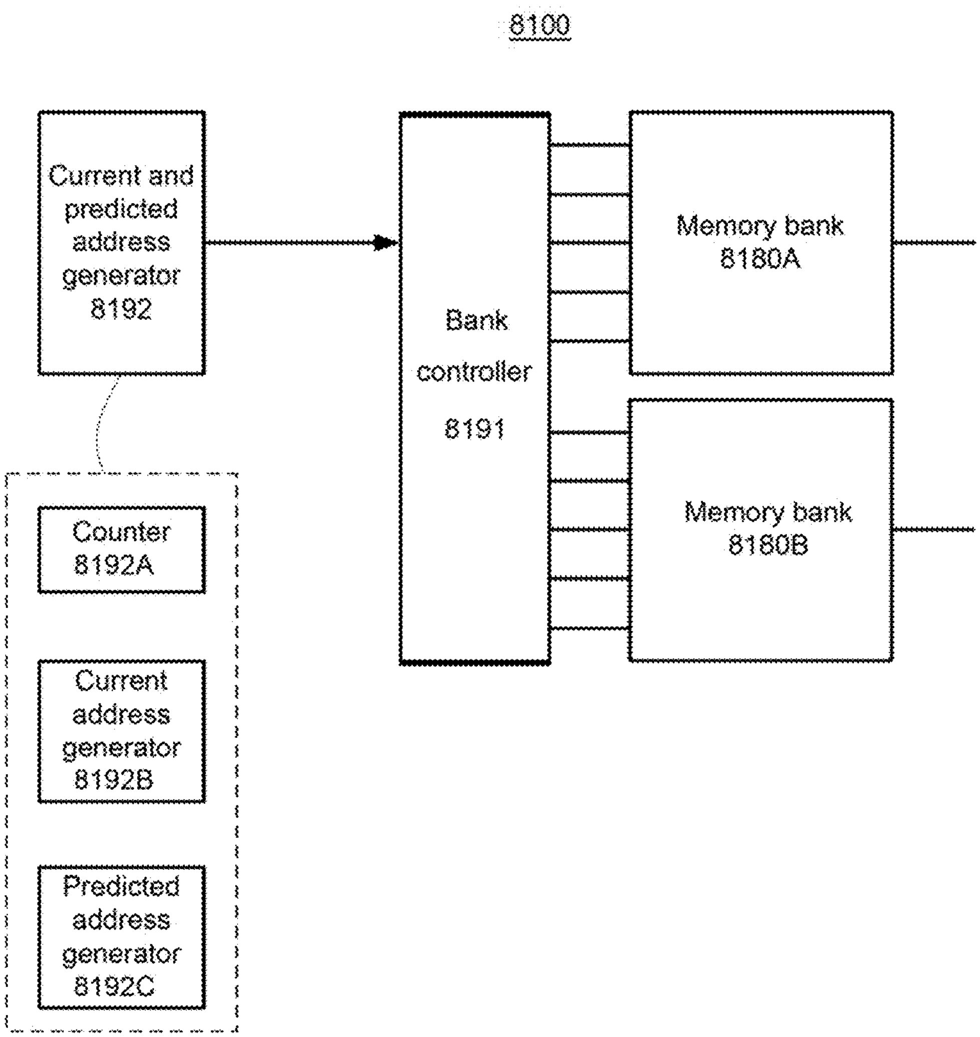
FIG. 81A illustrates a system for activating a next row associated with a memory bank based on a next row prediction, consistent with embodiments of the present disclosure.

FIG. 81A illustrates a system 8100 for activating a next row associated with a memory bank 8180 based on a next row prediction, consistent with embodiments of the present disclosure. System 8100 may include a current and predicted address generator 8192, bank controller 8191, and memory banks 8180A-B. Address generator may be an entity generating addresses for access in memory banks 8180A-B and may be based on any logic circuits, a controller, or a microprocessor executing software programs. Bank controller 8191 may be configured to access a current row of memory bank 8180A (e.g., using a current row identifier generated by address generator 8192). Bank controller 8191 may also be configured to activate a predicted next row to be accessed within memory bank 8180B based on a predicted row identifier generated by address generator 8192. The following example describes two banks. In other examples, more banks may be used. In some embodiments, there may be memory banks that allow accessing more than one row at a time (as discussed below) and hence that same process may be done on a single bank. As described above, the activation of the predicted next row to be accessed may begin before a completion of a read operation performed relative to the current row being accessed. Thus, in some cases, address generator 8192 may predict the next row to access and may send an identifier (e.g., one or more addresses) of the predicted next row to bank controller 8191 at any time before an access to a current row has been completed. Such timing may allow the bank controller to initiate activation of the predicted next row at any point in time during which the current row is being accessed and before access to the current row is completed. In some cases, bank controller 8291 may initiate activation of the predicted next row of memory bank 8180 at the same time (or within a few clock cycles) of when the activation of the current row to be accessed is completed and/or when the reading operation relative to the current row has begun.

In some embodiments, the operation relative to the current row associated with the current address may be a read or write operation. In some embodiments, the current row and the next row may be in the same memory bank. In some embodiments, the same memory bank may allow the next row to be accessed while the current row is being accessed. The current row and the next row may be in a different memory bank. In some embodiments, the memory unit may include a processor configured to generate the current address and the predicted address. In some embodiments, the memory unit may include a distributed processor. The distributed processor may include a plurality of processor subunits of a processing array that are spatially distributed among the plurality of discrete memory banks of the memory array. In some embodiments, the predicted address may be generated by a chain of flip flops sampling the address generated in a delay. The delay may be configurable via a mux that selects between flip flops storing the sampled address.

It should be noted that the predicted next row may become the current row to be accessed upon confirmation (e.g., after completion of a read operation relative to the current row) that the predicted next row is actually the next row that executing software requests to access. In the disclosed embodiments, because the process for activating the predicted next row can be initiated prior to completing a current row read operation, upon confirmation that the predicted next row is the correct next row to access, the next row to access may already be fully or partially activated. This can significantly reduce latency associated with line activation. Power reduction may be obtained if the next row is activated so that the activation ends before or at the same time the reading of the current row ends.

Current and predicted address generator 8192 may include any suitable logic components, compute units, memory units, algorithms, trained models, etc. configured to identify rows to be accessed in memory bank 8180 (e.g., based on program execution) and to predict a next row to access (e.g., based on observed patterns in row access, based on predetermined patterns (n+1, n+2), etc.). For example, in some embodiments, current and predicted address generator 8192 may include a counter 8192A, current address generator 8192B, and predicted address generator 8192C. Current address generator 8192B may be configured to generate a current address of a current row to be accessed in memory bank 8180 based on an output of counter 8192A, for example, or based on requests from a compute unit. The address associated with the current row to be accessed may be provided to bank controller 8191. Predicted address generator 8192C can be configured to determine a predicted address of a next row to be accessed in memory bank 8180 based on an output of counter 8192A, based on a predetermined access pattern (e.g., in conjunction with counter 8192A), or based on the output of a trained neural network or other type of pattern prediction algorithm that observes line accesses and predicts the next line to access based, for example, on patterns associated with the observed line accesses. Address generator 8192 may provide to bank controller 8191 the predicted next row address from predicted address generator 8192C.

In some embodiments, current address generator 8192B and predicted address generator 8192C can be implemented inside or outside of system 8100. An external host may also be implemented outside of system 8100 and further connected to system 8100. For example, current address generator 8192B may be a software at an external host executing a program and to avoid any latencies, predicted address generator 8192C can be implemented inside system 8100 or outside of system 8100.

As noted, the predicted next row address may be determined using a trained neural network that predicts the next row to access based on input(s) that may include one or more previously accessed row addresses. The trained neural network or other type of model may run within logic associated with the predicted address generator 8192C. In some cases, the trained neural network, etc., may be executed by one or more compute units outside of, but in communication with, predicted address generator 8192C.

In some embodiments, the predicted address generator 8192C may include a duplicate or substantial duplicate of the current address generator 8192B. Further, the timing of the operations of current address generator 8192B and predicted address generator 8192C may be fixed or adjustable relative to one another. For example, in some cases, predicted address generator 8192C may be configured to output an address identifier associated with the predicted next row at a fixed time (e.g., a fixed number of clock cycles) relative to when the current address generator 8192B issues an address identifier associated with the next row to be accessed. In some cases, the predicted next row identifier may be generated before or after the activation of the current row to be accessed begins, before or after a read operation associated with the current row to be accessed begins, or at any time before the read operation associated with the current row being accessed is completed. In some cases, the predicted next row identifier may be generated at the same time that the activation of the current row to be accessed begins or at the same time that a read operation associated with the current row to be accessed begins.

In other cases, the time between generation of the predicted next row identifier and either the activation of the current row to be accessed the initiation of a read operation associated with the current row may be adjustable. For example, in some cases, this time may be lengthened or shortened during operation of the memory unit 8100 based on values associated with one or more operational parameters. In some cases, a current temperature (or any other parameter value) associated with the memory unit or another component of a computing system may cause the current address generator 8192B and the predicted address generator 8192C to change their relative timing of operations. In embodiments in which in memory processing, the prediction mechanisms may be part of that logic.

Current and predicted address generator 8192 may generate a confidence level associated with a predicted next row to access determination. Such a confidence level (which may be determined by predicted address generator 8192C as part of the prediction process) may be used in determining, for example, whether to initiate activation of the predicted next row during a read operation of the current row (i.e., before the current row read operation has been completed and before the identity of the next row to access has been confirmed). For example, in some cases, the confidence level associated with a predicted next row to access may be compared to a threshold level. If the confidence level falls below the threshold level, for example, memory unit 8100 may forego activation of the predicted next row. On the other hand, if the confidence level exceeds the threshold level, then memory unit 8100 may initiate activation of the predicted next row in memory bank 8180.

The mechanics of testing the confidence level of the predicted next row relative to a threshold level and the subsequent initiation or non-initiation of activation of the predicted next row may be accomplished in any suitable manner. In some cases, for example, if the confidence level associated with the predicted next row falls below the threshold, then predicted address generator 8192C may forego outputting its predicted next row result to downstream logic components. Alternatively, in such a case, the current and predicted address generator 8192 may withhold the predicted next row identifier from bank controller 8191, or bank controller (or another logic unit) may be equipped to use the confidence level in the predicted next row to determine whether to begin activation of the predicted next row before completion of a read operation associated with the current row being read.

The confidence level associated with the predicted next row may be generated in any suitable manner. In some cases, such as where the predicted next row is identified based on a predetermined, known access pattern, the predicted address generator 8192C may generate a high confidence level or may forego generation of a confidence level altogether in view of the predetermined pattern of row accesses. On the other hand, in cases where predicted address generator 8192C executes one or more algorithms to monitor row accesses and output a predicted row based on patterns calculated relative to the monitored row accesses or where one or more trained neural networks or other models are configured to output a predicted next row based on inputs including recent row accesses, the confidence level in the predicted next row may be determined based on any relevant parameters. For example, in some cases, the confidence level may depend on whether one or more prior next row predictions proved to be accurate (e.g., a past performance indicator). The confidence level may also be based on one or more characteristics of inputs to the algorithm/model. For example, inputs including actual row accesses that follow a pattern may result in higher confidence levels than actual row accesses that exhibit less patterning. And, in some cases, where randomness is detected relative to a stream of inputs including recent row accesses, for example, a generated confidence may be low. Further, in cases where randomness is detected, the next row prediction process may be aborted altogether, a next row prediction may be ignored by one or more of the components of memory unit 8100, or any other action may be taken to forego activation of the predicted next row.

In some cases, a feedback mechanism may be included relative to operation of memory 8100. For example, periodically or even after each next row prediction, an accuracy of the predicted address generator 8192C in predicting the actual next row to be accessed may be determined. In some cases, if there is an error (or after a predetermined number of errors) in predicting the next row to access, the next row prediction operation of predicted address generator 8192C may be suspended. In other cases, predicted address generator 8192C may include a learning element, such that one or more aspects of its prediction operation may be adjusted based on received feedback regarding its accuracy in predicting the next row to access. Such a capability may refine the operation of predicted address generator 8192C, such that address generator 8192C can adapt to changing access patterns, etc.

In some embodiments, the timing of generation of a predicted next row and/or activation of a predicted next row may depend on the overall operation of memory unit 8100. For example, after powering on or after a reset of memory unit 8100 a prediction of a next row to access (or forwarding of a predicted next row to bank controller 8191) may be suspended (e.g., for a predetermined amount of time or clock cycles, until a predetermined number of row accesses/reads have been completed, until a confidence level in a predicted next row exceeds a predetermined threshold, or based on any other suitable criteria).

Figure 81B:
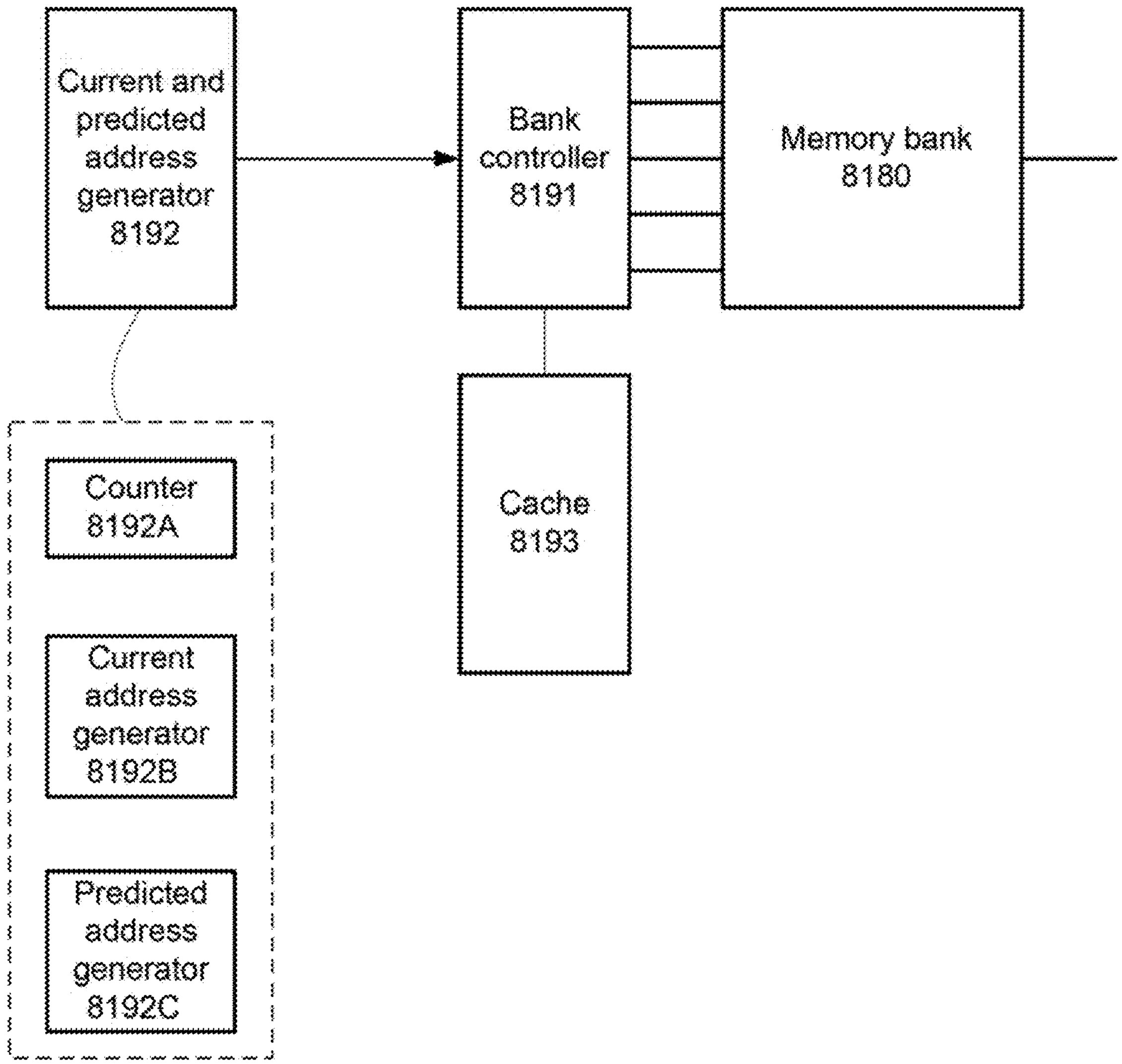
FIG. 81B illustrates another embodiment of system of FIG. 81A, consistent with embodiments of the present disclosure.

FIG. 81B illustrates another configuration of memory unit 8100, according to exemplary disclosed embodiments. In system 8100B of FIG. 81B, a cache 8193 may be associated with bank controller 8191. Cache 8193 may be configured to store one or more rows of data after they were accessed and prevent the need to activate them again, for example. Thus, cache 8193 may enable bank controller 8191 to access row data from cache 8193 rather than accessing memory bank 8180. For example, cache 8193 may store last X row data (or any other cache saving strategy) and bank controller 8191 may fill in cache 8193 according to predicted rows. Moreover, if a predicted row is already in cache 8193, the predicted row does not need to be opened again and bank controller (or a cache controller implemented in cache 8193) may protect the predicted row from swapping. Cache 8193 may provide several benefits. First, since cache 8193 loads a row to cache 8193 and bank controller can access cache 8193 to retrieve row data, special banks or more than one bank for a next row prediction is not required. Second, reading and writing from cache 8193 may save energy since a physical distance from bank controller 8191 to cache 8193 is smaller than a physical distance from bank controller 8191 to memory bank 8180. Third, latencies caused by cache 8193 are usually lower compare to that of memory bank 8180 since cache 8193 is smaller and closer to controller 8191. In some cases, an identifier of a predicted next row generated by predicted address generator, for example, may be stored in cache 8193 as the predicted next row is activated in memory bank 8180 by bank controller 8191. Based on program execution, etc., current address generator 8192B may identify an actual next row to access in memory bank 8191. An identifier associated with the actual next row to access may be compared to the identifier of the predicted next row stored in cache 8193. If the actual next row to access and the predicted next row to access are the same, then bank controller 8191 may commence a read operation relative to the actual next row to access (which may be fully or partially activated as a result of the next row prediction process) after activation of that row has completed. On the other hand, if the actual next row to access (determined by current address generator 8192B) does not match the predicted next row identifier stored in cache 8193, then a read operation will not commence with respect to the fully or partially activated predicted next row, but instead, the system will begin activation of the actual next row to be accessed.

Dual Activation Bank

Figure 81C:
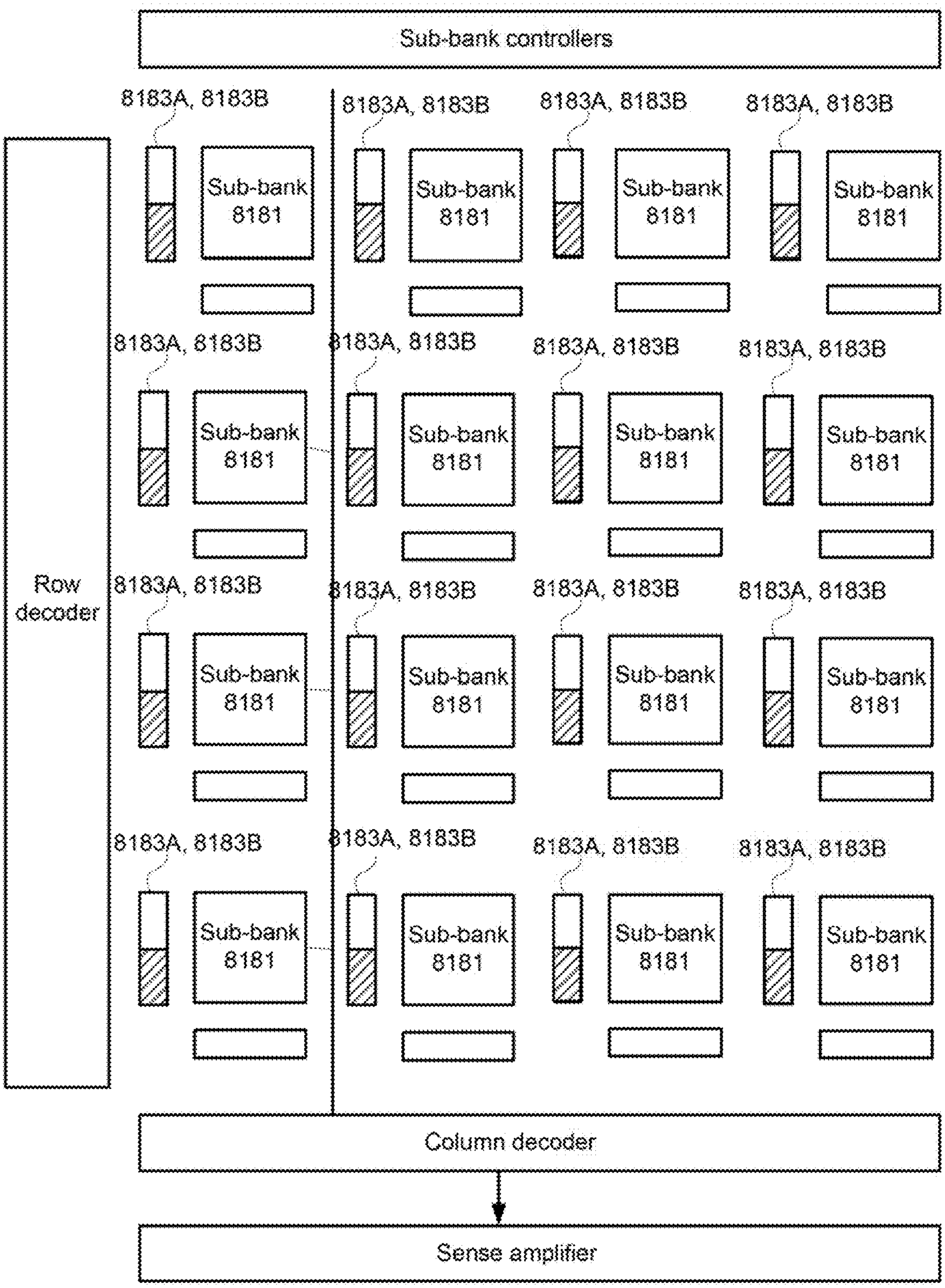
FIG. 81C illustrates first and second sub-bank row controllers per each memory sub-bank, consistent with embodiments of the present disclosure.

As discussed, it is valuable to describe several mechanisms that allows building a bank that is capable of activating a row while another is still being processed. Several embodiments can be provided for a bank that activates an additional row while another row is being accessed. While the embodiments only describe two row activations, it is appreciated that it can be applied for more rows. In the first suggested embodiment, a memory bank may be divided into memory sub-banks, and the described embodiments may be used to perform a read operation relative to a line in one sub-bank while activating a predicted or needed next row in another sub-bank. For example, as shown in FIG. 81C, memory bank 8180 may be arranged to include multiple memory sub-banks 8181. Further, bank controller 8191 associated with memory bank 8180 may include a plurality of sub-bank controllers associated with corresponding sub-banks. A first sub-bank controller of the plurality of sub-bank controllers can be configured to enable access to data included in a current row of a first sub-bank of the plurality of sub-banks while a second sub-bank controller of the plurality of sub-bank controllers may activate a next row in a second sub-bank of the plurality of sub-banks. Only one column decoder may be used when accessing only words in one sub-bank at a time. Two banks may be tied to the same output bus to appear as a single bank. The new single bank input can also be a single address and an additional row-address for opening the next row.

FIG. 81C illustrates first and second sub-bank row controllers (8183A, 8183B) per each memory sub-bank 8181. Memory bank 8180 may include a plurality of sub-banks 8181, as shown in FIG. 81C. Further, bank controller 8191 may include a plurality of sub-bank controllers 8183A-B each associated with a corresponding sub-bank 8181. A first sub-bank controller 8183A of the plurality of sub-bank controllers can be configured to enable access to data included in a current row of a first portion of sub-bank 8181 while a second sub-bank controller 8183B may activate a next row in a second portion of sub-bank 8181.

Because, activation of a row directly adjacent to a row being accessed may distort the accessed row and/or corrupt data being read from the accessed row, the disclosed embodiments may be configured such that the predicted next row to be activated may be spaced apart, by at least two rows (for example), from the current row in the first sub-bank from which data is being accessed. In some embodiments, rows to be activated may be spaced apart by at least a mat that the activations may be executed in different mats. The second sub-bank controller can be configured to cause access to data included in a current row of the second sub-bank while the first sub-bank controller activates a next row in the first sub-bank. The activated next row of the first sub-bank may be spaced apart, by at least two rows, from the current row in the second sub-bank from which data is being accessed.

This predefined distance between rows being read/accessed and rows being activated may be determined by hardware—for example coupling different parts of the memory bank to different row decoders and the software may maintain it in order not to destroy the data. The spacing between the current row may exceed two (for example may be 3, 4, 5, and even more than five). The distance can be changed over time—for example based on evaluations about distortions introduced in stored data. The distortions may be evaluated in various manners—for example by calculating signal to noise ratio, error rates, error codes required to repair distortions, and the like. Two rows can actually be activated if they are far enough and two bank controllers are implemented on the same bank. The new architecture (implementing two controllers on the same bank) may protect from opening lines in the same mat.

Figure 81D:
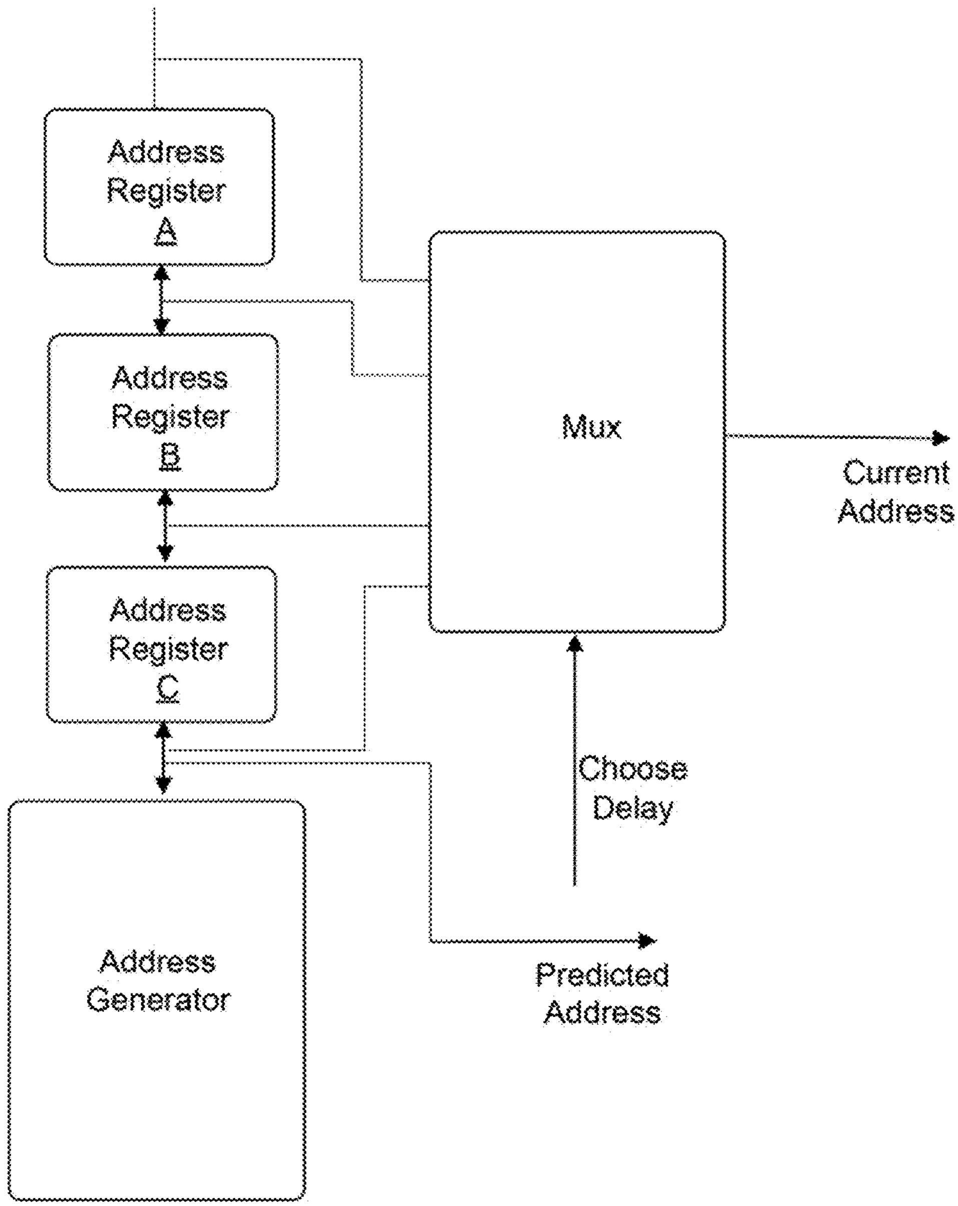
FIG. 81D illustrates an embodiment for a next row prediction, consistent with embodiments of the present disclosure.

FIG. 81D illustrates an embodiment for a next row prediction, consistent with embodiments of the present disclosure. The embodiment may include additional a pipeline of flipflops (address registers A-C). The pipeline can be implemented with any number of flipflops (stages) as a delay needed for activation after an address generator and delaying the entire execution to use the delayed address then the prediction can be the new address generated (at the beginning of pipe, below address register C) and the current address is the end of the pipeline. In this embodiment, a duplicate address generator is not needed. A selector (a mux shown in FIG. 81D) can be added to configure the delay while address registers provide the delay.

Figure 81E:
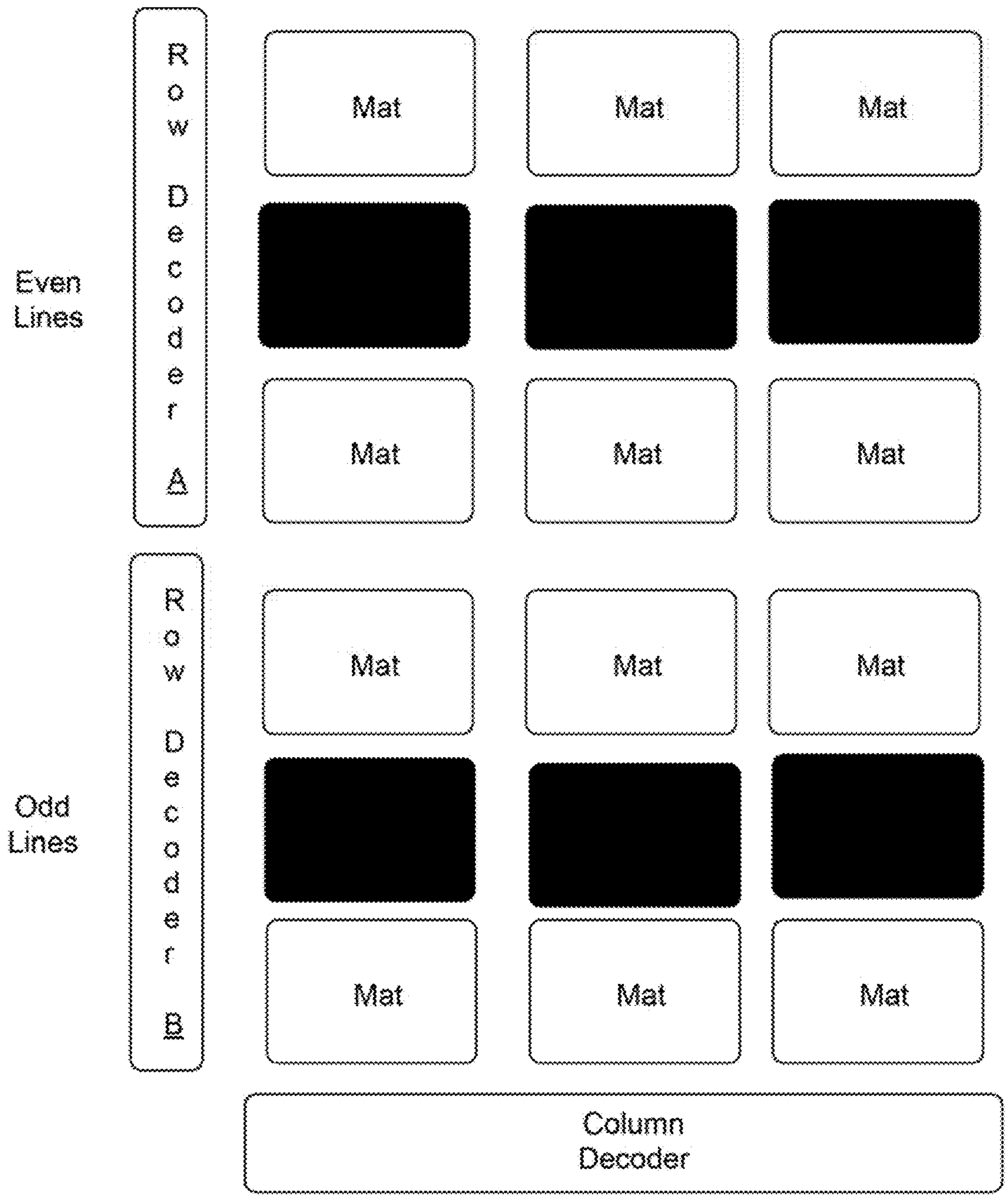
FIG. 81E illustrates an embodiment for a memory bank, consistent with embodiments of the present disclosure.

FIG. 81E illustrates an embodiment for a memory bank, consistent with embodiments of the present disclosure. The memory bank may be implemented that if newly activated line is far enough from a current line, activating the new line will not destroy the current line. As shown in FIG. 81E, memory bank may include additional memory mats (black) between every tow lines of mats. Thus, a control unit (such as row decoders) may activate lines that are spaced apart by a mat.

In some embodiments, the memory unit may be configured to receive a first address for processing and a second address to active and access at a predetermined time.

Figure 81F:
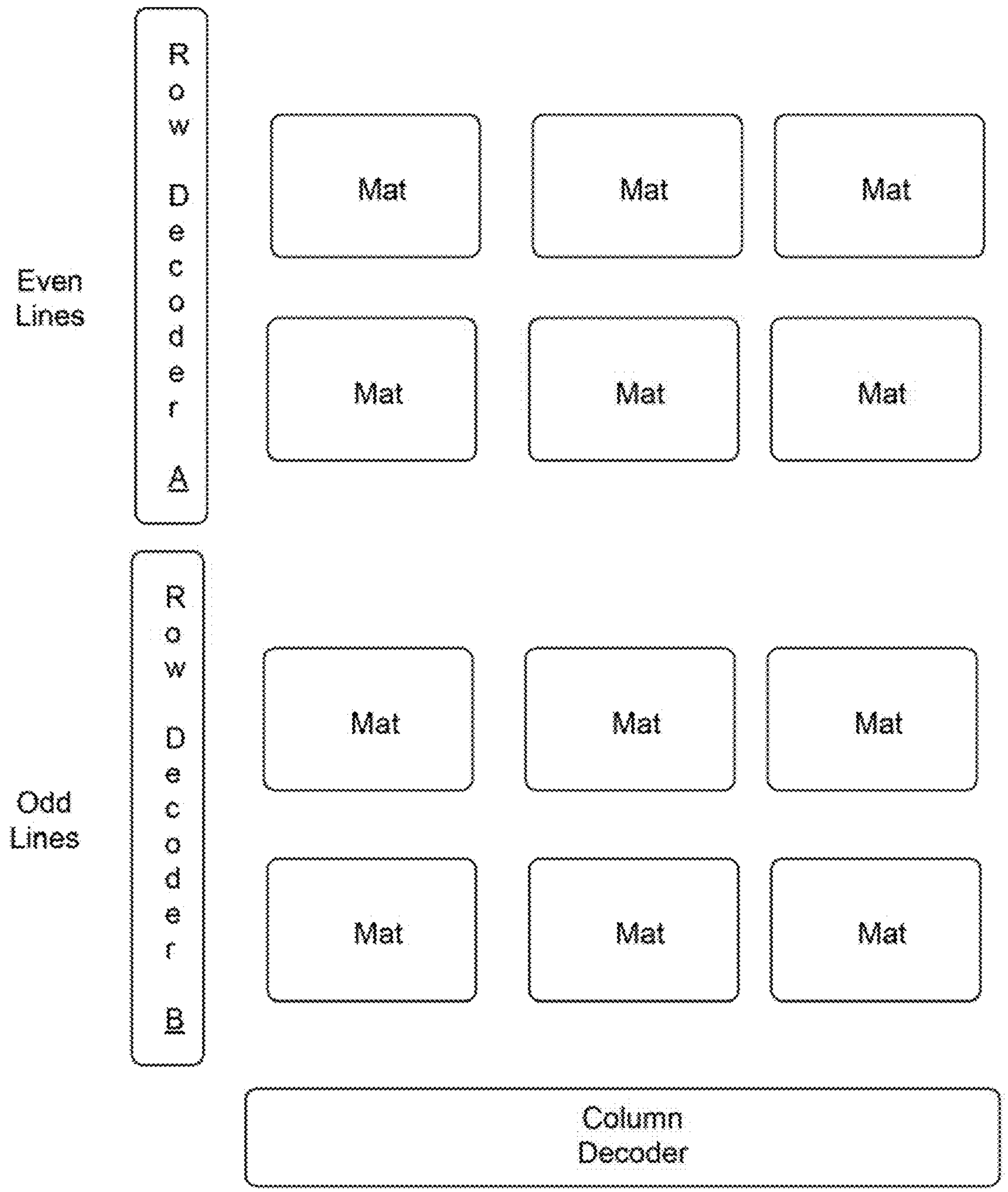
FIG. 81F illustrates another embodiment for a memory bank, consistent with embodiments of the present disclosure.

FIG. 81F illustrates another embodiment for a memory bank, consistent with embodiments of the present disclosure. The memory bank may be implemented that if newly activated line is far enough from a current line, activating the new line will not destroy the current line. The embodiment depicted in FIG. 81F may allow row decoders to open line n and n+1 by ensuring that all even lines are implemented at the upper half of memory bank and all odd lines are implemented at the lower half of memory bank. The implementation may allow accessing consecutive lines that are always far enough.

A dual control memory bank, according to the disclosed embodiments, may allow accessing and activating different parts of a single memory bank, even when the dual control memory bank is configured to output one data unit at a time. For example, as described, the dual control may enable the memory bank to access a first row while activating a second row (e.g., a predicted next row or a predetermined next row to access).

Figure 82:
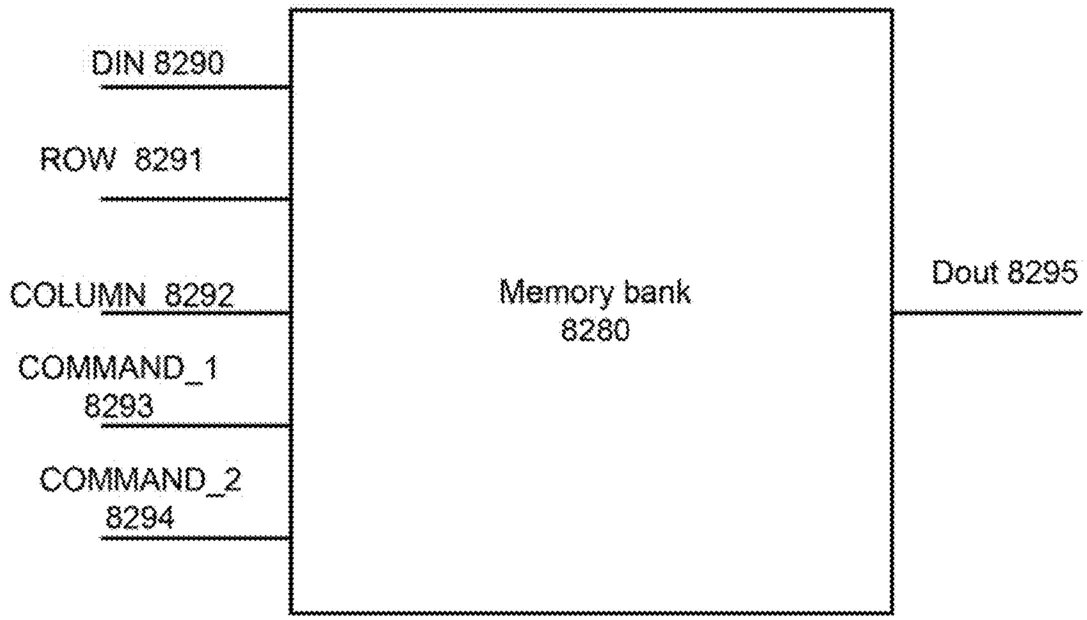
FIG. 82 illustrates a dual control memory bank for reducing a memory row activation penalty, consistent with embodiments of the present disclosure.

FIG. 82 illustrates dual control memory bank 8280 for reducing a memory row activation penalty (e.g., latency), consistent with embodiments of the present disclosure. Dual control memory bank 8280 may include inputs including a data input (DIN) 8290, row address (ROW) 8291, column address (COLUMN) 8292, first command input (COMMAND_1) 8293, and a second command input (COMMAND_2) 8294. Memory bank 8280 may include a data output (Dout) 8295.

It is assumed that addresses may include row addresses and column addresses, and that there are two row decoders. Other arrangements of addresses may be provided, the number of row decoders may exceed two, and there may be more than a single columns decoder.

Row address (ROW) 8291 may identify a row that is associated with a command such as an activate command. Because a row activation may be followed by reading from the row or writing to the row—then while the row is open (following its activation) there may be no need to send the row address for writing to or reading from the open row.

First command input (COMMAND_1) 8293 may be used to send commands (such as but not limited to an activate command) to rows accessed by a first-row decoder. Second command (COMMAND_2) input 8294 may be used to send commands (such as but not limited to an activate command) to rows accessed by a second-row decoder.

Data input (DIN) 8290 may be used to feed data when executing a write operation.

Because the entire row may not be read at once, single row segments may be read sequentially, and column address (COLUMN) 8292 may indicate which segment of the row (which columns) is to be read. It may be assumed, for simplicity of explanation, that there are 2Q segments and that the column input has Q bits; Q being a positive integer that exceeds one.

Dual control memory bank 8280 may operate with or without address prediction described above with respect to FIGS. 81A-B. Of course, to reduce latency in operation, the dual control memory bank may operate with address prediction, according to the disclosed embodiments.

Figure 83A:
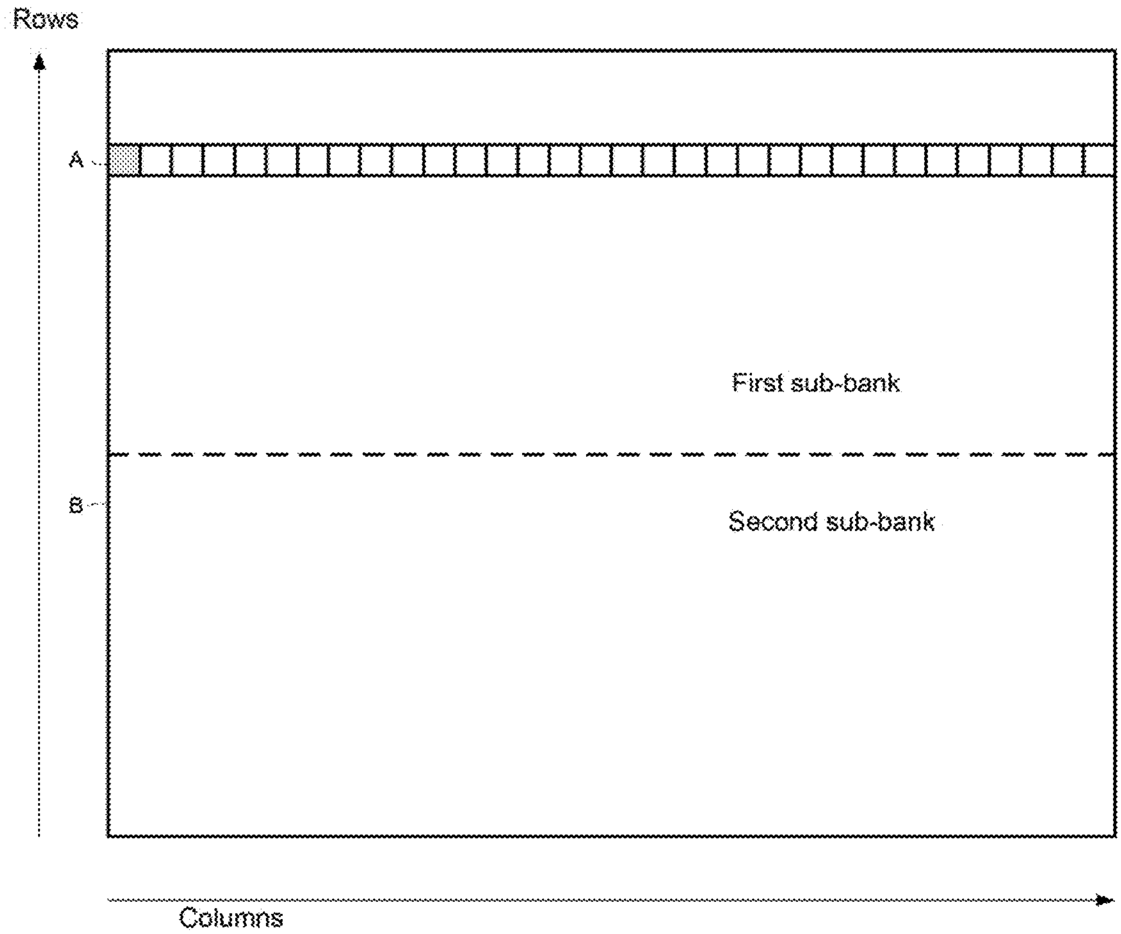
FIG. 83A illustrates a first example of accessing and activating rows of memory bank.
Figure 83B:
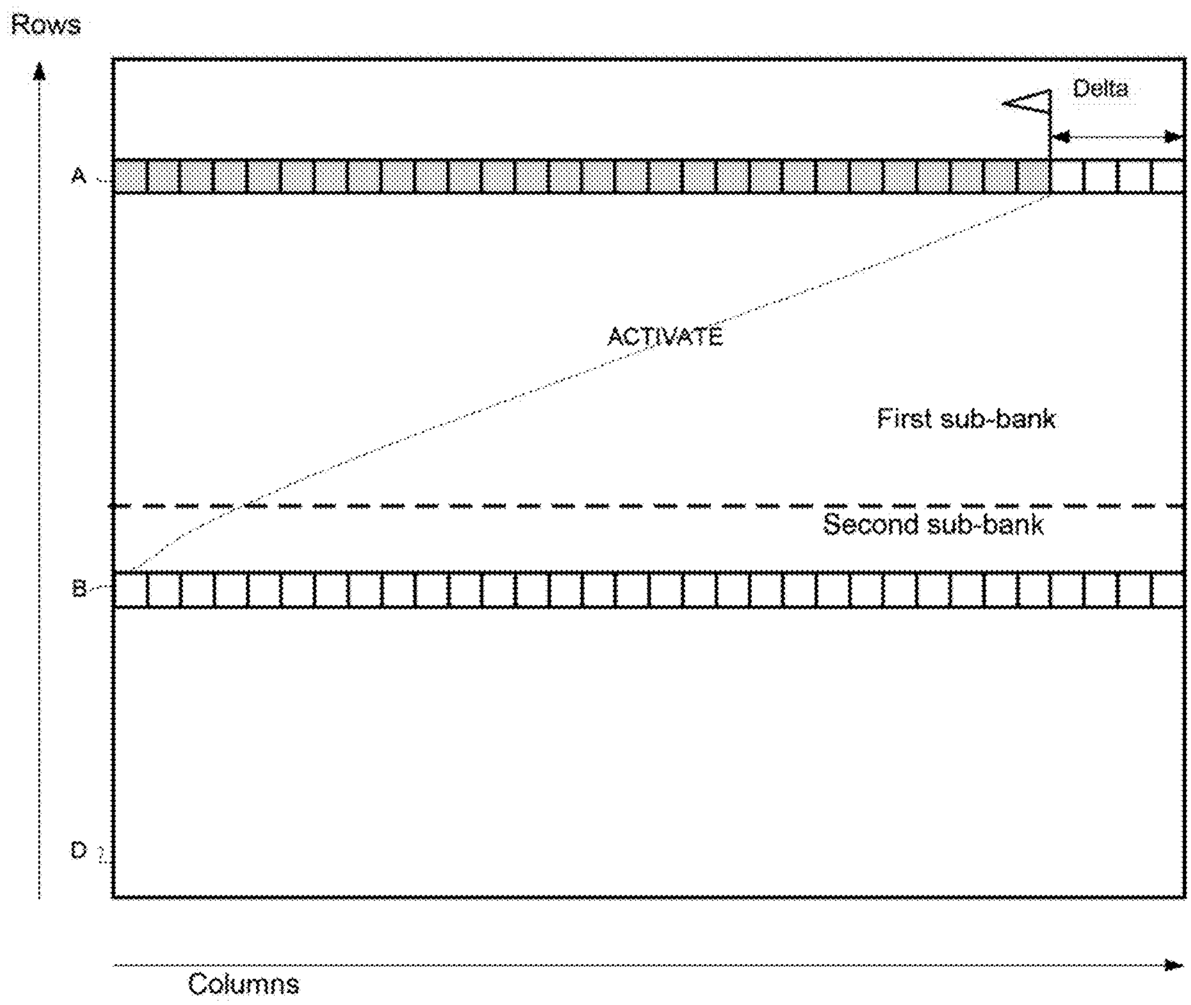
FIG. 83B illustrates a second example of accessing and activating rows of memory bank.
Figure 83C:
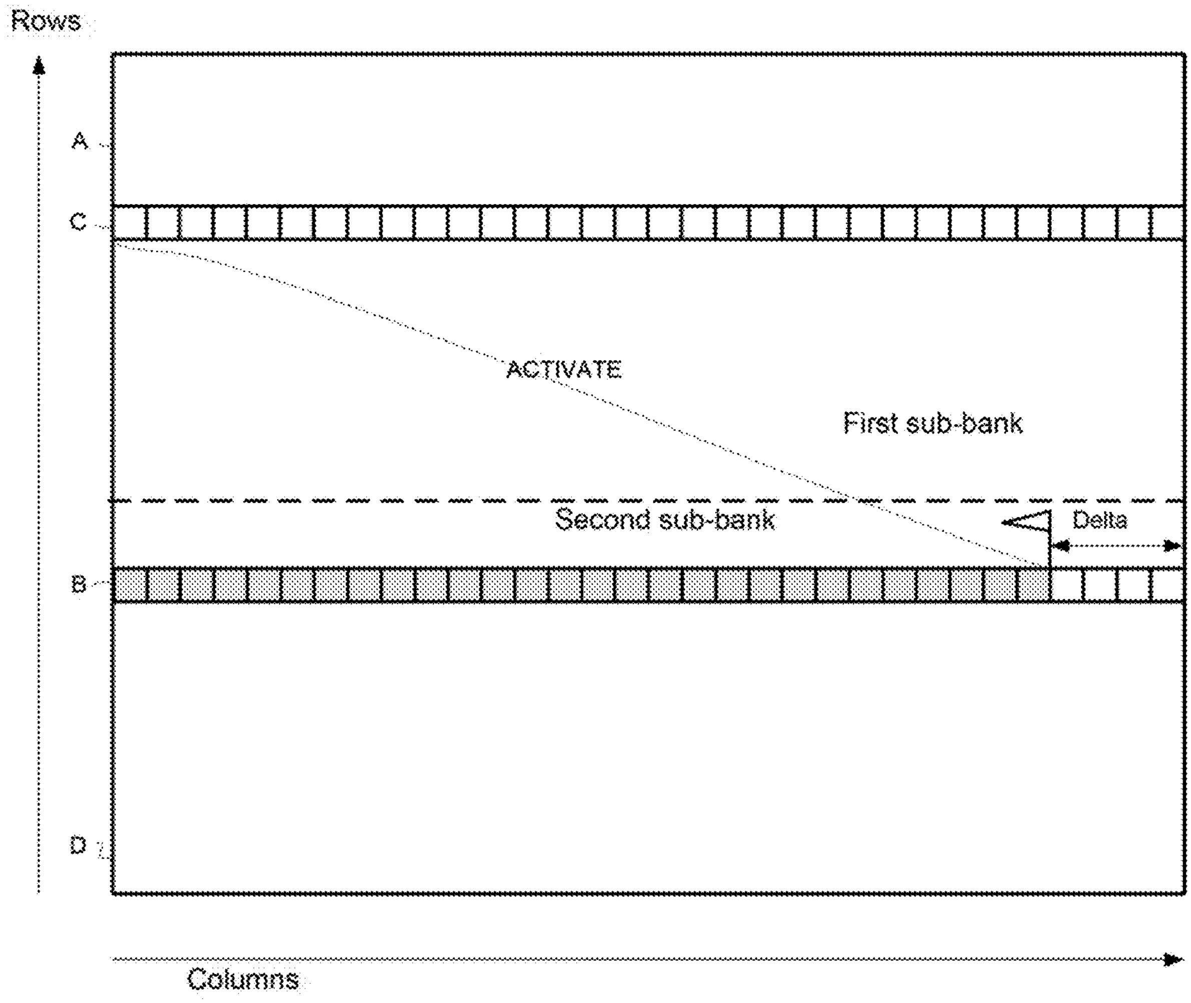
FIG. 83C illustrates a third example of accessing and activating rows of memory bank.

FIGS. 83A, 83B, and 83C illustrate examples of accessing and activating rows of memory bank 8180. It is assumed in one example, as noted above, that reading and activating a row both require 32 cycles (segments). Further, in order to reduce the activation penalty (of a length denoted Delta), it may be beneficial to know in advance (at least Delta before the need to access a next row) that a next row should be opened. In some cases, Delta may equal four cycles. Each memory bank depicted in FIGS. 83A, 83B, and 83C may include two or more sub-banks within which, in some embodiments, only one row may be open at any given time. In some cases, even rows may be associated with a first sub-bank, and odd rows may be associated with a second sub-bank. In such an example, the use of the disclosed predictive addressing embodiments may enable initiation of activation of one row of a certain memory sub-bank before (a Delay period before) reaching an end of a read operation relative to a row of another memory sub-bank. In this way, a sequential memory access (e.g., a predefined memory access sequence where rows 1, 2, 3, 4, 5, 6, 7, 8 . . . are to be read, and rows 1, 3, 5, . . . etc. are associated with a first memory sub-bank and rows 2, 4, 6 . . . etc. are associated with a second, different memory sub-bank) can be done in a highly efficient manner.

FIG. 83A may illustrate a state for accessing memory rows included in two different memory sub-banks. In the state shown in FIG. 83A:

a. Row A may be accessible by a first-row decoder. A first segment (leftmost segment marked in gray) may be accessed after the first-row decoder activates row A.
b. Row B may be accessible by a second-row decoder. In these state shown in FIG. 83A, Row B is closed and has not yet been activated.

The state illustrated in FIG. 83A may be preceded by sending an activate command and an address of row A to the first-row decoder.

FIG. 83B illustrates a state for accessing row B after accessing row A. According to this example: Row A that may be accessible by a first-row decoder. In the state shown in FIG. 83B, the first-row decoder activated row A and has accessed all but the four rightmost segments (the four segments not yet marked in gray). Because Delta (white four segments in row A) equals four cycles, a bank controller may enable a second-row decoder to activate row B before accessing the rightmost segments in row A. In some cases, activation of row B may be in response to a predetermined access pattern (e.g., a sequential row access where odd rows are designated in the first sub-bank, and even rows are designated in the second sub-bank). In other cases, activation of row B may be in response to any of the row prediction techniques described above. The bank controller may enable the second-row decoder to activate row B in advance so that when row B is accessed, row B is already activated (opened) instead of waiting for activating row B to open row B.

The state illustrated in FIG. 83B may be preceded by:

a. Sending an activate command and an address of row A to the first-row decoder.
b. Writing or reading the first twenty-eight segments of row A.
c. Following the read or write operations on the twenty-eight segments of row, sending an activate command relative to an address of row B to the second-row decoder.

In some embodiments, the even numbered rows are located in one half of the one or more memory banks. In some embodiments, the odd numbered rows are located in one half of the one or more memory banks.

In some embodiments, a line of extra redundant mats are placed between each of two mat lines to create distance for allowing activation. In some embodiments, lines in proximity to each other may not be activated at the same time.

FIG. 83C may illustrate a state for accessing row C after accessing row A (e.g., the next odd row included in the first sub-bank). As shown in FIG. 83C, row B may be accessible by a second-row decoder. As shown, the second-row decoder has activated row B and has accessed all but the four rightmost segments (the four remaining segments not marked in gray). Because in this example, Delta equals four cycles, a bank controller may enable a first-row decoder to activate row C before accessing the rightmost segments in row B. The bank controller may enable the first-row decoder to activate row C in advance so that when row C is accessed, row C is already activated instead of waiting for activating row C. Operating in this way can reduce or completely eliminate latency associate with memory read operations.

Memory Mat as a Register File

In computer architecture, processor registers constitute storage locations that are quickly accessible to a computer's processors (e.g., a central processing unit (CPU)). Registers normally include memory units closest to a processor core (L0). Registers may provide the fastest way to access certain types of data. A computer may have several types of registers, each being classified according to the type of information they store or based on the types of instructions that operate on the information in a certain type of register. For example, a computer may include data registers that hold numeric information, operands, intermediate results, and configurations, address registers that store address information that are used by instructions to access primary memory, general purpose registers that store both data and address information, and status registers, among others. A register file includes a logical group of registers available for use by a computer processing unit.

In many cases, a computer's register file is located within the processing unit (e.g., the CPU) and is implemented by logic transistors. In the disclosed embodiments, however, computational processing units may not reside in a traditional CPU. Instead, such processing elements (e.g., processor subunits) may be spatially distributed (as described in the sections above) within a memory chip as a processing array. Each processor subunit may be associated with one or more corresponding and dedicated memory units (e.g., memory banks). Through this architecture, each processor subunit may be spatially located proximate to the one or more memory elements that store the data on which a particular processor subunit is to operate. Such an architecture, as described herein, may significantly speed up the operation of certain memory intensive operations by, for example, eliminating the memory access bottleneck experienced by typical CPU and external memory architectures.

The distributed processor memory chip architecture described herein, however, may still take advantage of register files including various types of registers for operating on data from memory elements dedicated to corresponding processor subunits. As the processor subunits may be distributed among the memory elements of a memory chip, however, it may be possible to add one or more memory elements (which may benefit from the specific fabrication process compared to logic elements in that same process) in the corresponding processor subunits, to function as register files or caches for the corresponding processor subunits, rather than to serve as primary memory storage.

Such an architecture may offer several advantages. For example, as the register files are part of the corresponding processor subunits, the processor subunits may be spatially located close to the relevant register files. Such an arrangement may significantly increase operating efficiency. A conventional register file is implemented by logic transistors. For example, each bit of a conventional register file is made of about 12 logic transistors, and thus a register file of 16 bits is made of 192 logic transistors. Such a register file may require a large number of logic components to access the logic transistors, and therefore, may occupy a large space. As compared to register files implemented by logic transistors, the register files of the presently disclosed embodiments may require significantly less space. This reduction in size may be realized by implementing the register files of the disclosed embodiments using memory mats including memory cells, which are manufactured by processes optimized for fabricating memory structures rather than for fabricating logic structures. The reduction in size may also allow for larger register files or caches.

In some embodiments, a distributed processor memory chip may be provided. The distributed processor memory chip may include a substrate, a memory array disposed on the substrate and including a plurality of discrete memory banks, and a processing array disposed on the substrate and including a plurality of processor subunits. Each one of the processor subunits may be associated with a corresponding, dedicated one of the plurality of discrete memory banks. The distributed processor memory chip may also include a first plurality of buses and a second plurality of buses. Each one of the first plurality of buses may connect one of the plurality of processor subunits to its corresponding, dedicated memory bank. Each one of the second plurality of buses may connect one of the plurality of processor subunits to another of the plurality of processor subunits. In some cases, the second plurality of buses may connect one or more of the plurality of processor subunits to two or more other processor subunits among the plurality of processor subunits. One or more of the processor subunits may also include at least one memory mat disposed on the substrate. The at least one memory mat may be configured to act as at least one register of a register file for one or more of the plurality of processing subunits.

In some cases, the register file may be associated with one or more logic components to enable the memory mat serve as one or more registers of the register file. For example, such logic components may include switches, amplifiers, inverters, sense amplifiers, among others. In an example where a register file is implemented by a dynamic random access memory (DRAM) mat, logic components may be included to perform refresh operations to keep stored data from being lost. Such logic components may include row and column multiplexers ("muxes"). In addition, the register file implemented by DRAM mats may include redundancy mechanisms to counter drops in yield.

Figure 84:
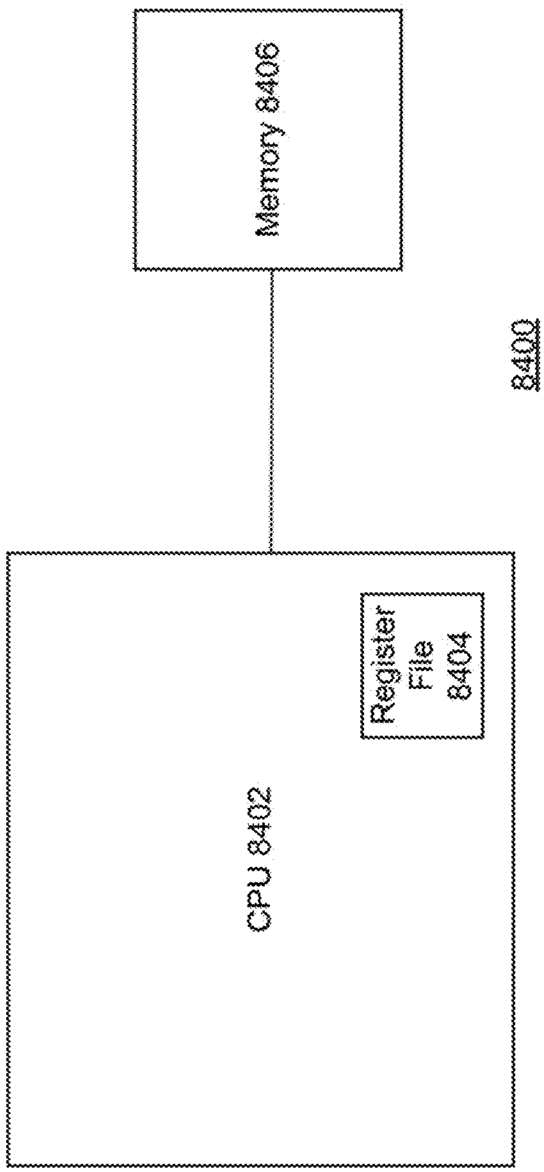
FIG. 84 provides a diagrammatic representation of a conventional CPU/register file and external memory architecture.

FIG. 84 illustrates a traditional computer architecture 8400, which includes a CPU 8402 and an external memory 8406. During operation, values from memory 8406 may be loaded into registers associated with a register file 8504 included in CPU 8402.

Figure 85A:
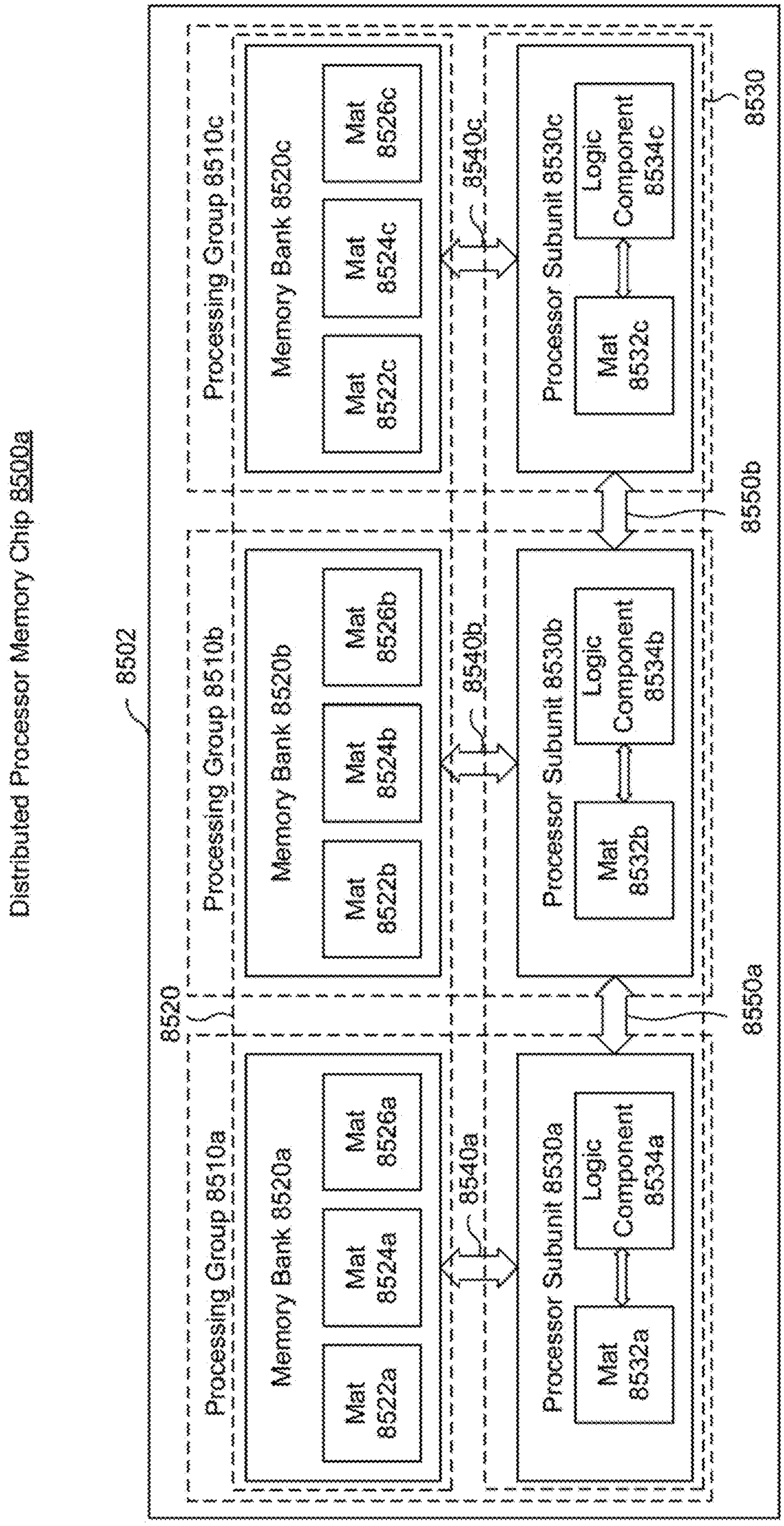
FIG. 85A illustrates an exemplary distributed processor memory chip having a memory mat serving as a register file, consistent with one embodiment.

FIG. 85A illustrates an exemplary distributed processor memory chip 8500*a*, consistent with disclosed embodiments. In contrast to the architecture of FIG. 84, the distributed processor memory chip 8500*a* includes memory elements and processor elements disposed on the same substrate. That is, chip 8500*a* may include a memory array and a processing array including a plurality of processor subunits each associated with one or more dedicated memory banks included in the memory array. In the architecture of FIG. 85, registers used by the processor subunits are provided by one or more memory mats disposed on the same substrate on which the memory array and the processing array are formed.

As depicted in FIG. 85A, distributed processor memory chip 8500*a* may be formed by a plurality of processing groups 8510*a*, 8510*b*, and 8510*c* disposed on a substrate 8502. More specifically, distributed processor memory chip 8500*a* may include a memory array 8520 and a processing array 8530 disposed on substrate 8502. Memory array 8520 may include a plurality of memory banks, such as memory banks 8520*a*, 8520*b*, and 8520*c*. Processing array 8530 may include a plurality of processor subunits, such as processor subunits 8530*a*, 8530*b*, and 8530*c*.

Furthermore, each of processing groups 8510*a*, 8510*b*, and 8510*c* may include a processor subunit and one or more corresponding memory banks dedicated to the processor subunit. In the embodiment depicted in FIG. 85A, each one of the processor subunits 8530*a*, 8530*b*, and 8530*c* may be associated with a corresponding, dedicated memory bank 8520*a*, 8520*b*, or 8520*c*. That is, processor subunit 8530*a* may be associated with memory bank 8520*a*; processor subunit 8530*b* may be associated with memory bank 8520*b*; and processor subunit 8530*c* may be associated with memory bank 8520*c*.

To allow each processor subunit to communicate with its corresponding, dedicated memory bank(s), distributed processor memory chip 8500*a* may include a first plurality of buses 8540*a*, 8540*b*, and 8540*c* connecting one of the processor subunits to its corresponding, dedicated memory bank(s). In the embodiment depicted in FIG. 85A, bus 8540*a* may connect processor subunit 8530*a* to memory bank 8520*a*; bus 8540*b* may connect processor subunit 8530*b* to memory bank 8520*b*; and bus 8540*e* may connect processor subunit 8530*c* to memory bank 8520*c*.

Moreover, to allow each processor subunit to communicate with other processor subunits, distributed processor memory chip 8500*a* may include a second plurality of buses 8550*a* and 8550*b* connecting one of the processor subunits to at least one other processor subunit. In the embodiment depicted in FIG. 85, bus 8550*a* may connect processor subunit 8530*a* to processor subunit 8530*b*, and bus 8550*b* may connect processor subunit 8530*a* to processor subunit 8550*b*, etc.

Each one of the discrete memory banks 8520*a*, 8520*b*, and 8520*c* may include a plurality of memory mats. In the embodiment depicted in FIG. 84, memory bank 8520*a* may include memory mats 8522*a*, 8524*a*, and 8526*a*; memory bank 8520*b* may include memory mats 8522*b*, 8524*b*, and 8526*b*; and memory bank 8520*c* may include memory mats 8522*c*, 8524*c*, and 8526*c*. As previously disclosed with respect to FIG. 10, a memory mat may include a plurality of memory cells, and each cell may comprise a capacitor, a transistor, or other circuitry that stores at least one bit of data. A conventional memory mat may comprise, for example, 512 bits by 512 bits, but the embodiments disclosed herein are not limited thereto.

At least one of processor subunits 8530*a*, 8530*b*, and 8530*c* may include at least one memory mat, such as memory mats 8532*a*, 8532*b*, and 8532*c*, that is configured to act as a register file for the corresponding processor subunits 8530*a*, 8530*b*, and 8530*c*. That is, the at least one memory mat 8532*a*, 8532*b*, and 8532*c* provides at least one register of a register file used by one or more of the processor subunits 8530*a*, 8530*b*, and 8530*c*. The register rile may include one or more registers. In the embodiment depicted in FIG. 85A, memory mat 8532*a* in processor subunit 8530*a* may serve as a register file (also referred to as "register file 8532*a*") for processor subunit 8530*a* (and/or any other processor subunits included in the distributed processor memory chip 8500*a*); memory mat 8532*b* in processor subunit 8530*b* may serve as a register file for processor subunit 8530*b*: and memory mat 8532*c* in processor subunit 8530*c* may serve as a register file for processor subunit 8530*c*.

At least one of processor subunits 8530*a*, 8530*b*, and 8530*c* may also include at least one logic component, such as logic components 8534*a*, 8534*b*, and 8534*c*. Each logic component 8534*a*, 8534*b*, or 8534*c* may be configured to enable the corresponding memory mat 8532*a*, 8532*b*, or 8532*c* to serve as a register file for the corresponding processor subunits 8530*a*, 8530*b*, or 8530*c*.

In some embodiments, at least one memory mat may be disposed on the substrate, and the at least one memory mat may contain at least one redundant memory bits configured to provide at least one redundant register for one or more of the plurality of processor subunits. In some embodiments, at least one of the processor subunits may include a mechanism to halt a current task and to trigger a memory refresh operation at certain times to refresh the memory mat.

Figure 85B:
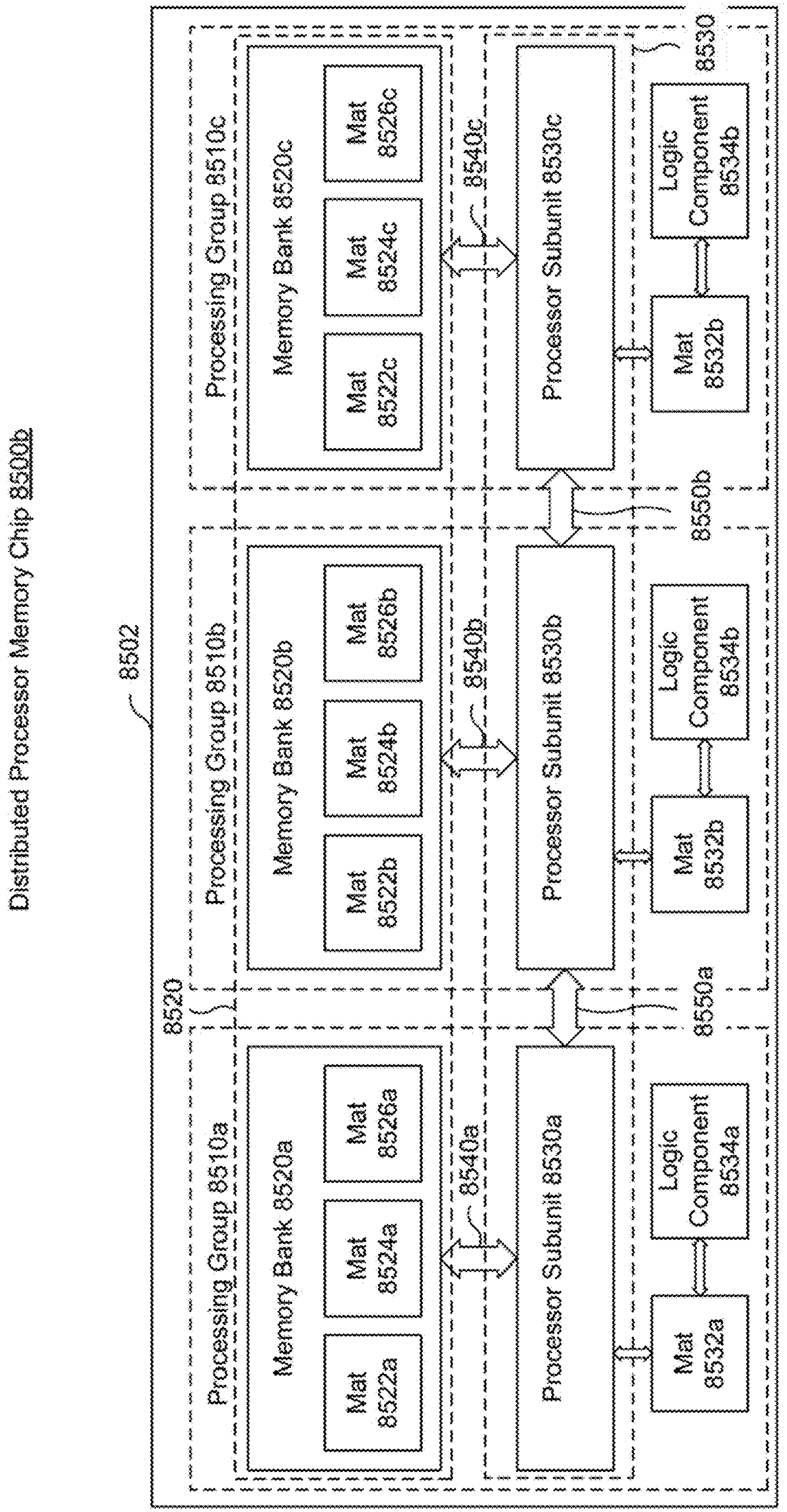
FIG. 85B illustrates an exemplary distributed processor memory chip having a memory mat configured to serve as a register file, consistent with another embodiment.

FIG. 85B illustrates an exemplary distributed processor memory chip 8500*b*, consistent with disclosed embodiments. Memory chip 8500*b* illustrated in FIG. 85B is substantially the same as memory chip 8500 illustrated in FIG. 85A, except that memory mats 8532*a*, 8532*b*, and 8532*c* in FIG. 85B are not included in the corresponding processor subunits 8530*a*, 8530*b*, and 8530*c*. Instead, memory mats 8532*a*, 8532*b*, and 8532*c* in FIG. 85B are disposed outside of, but spatially near, the corresponding processor subunits 8530*a*, 8530*b*, and 8530*c*. In this manner, memory mats 8532*a*, 8532*b*, and 8532*c* may still serve as registers files for the corresponding processor subunits 8530*a*, 8530*b*, and 8530*c*.

Figure 85C:
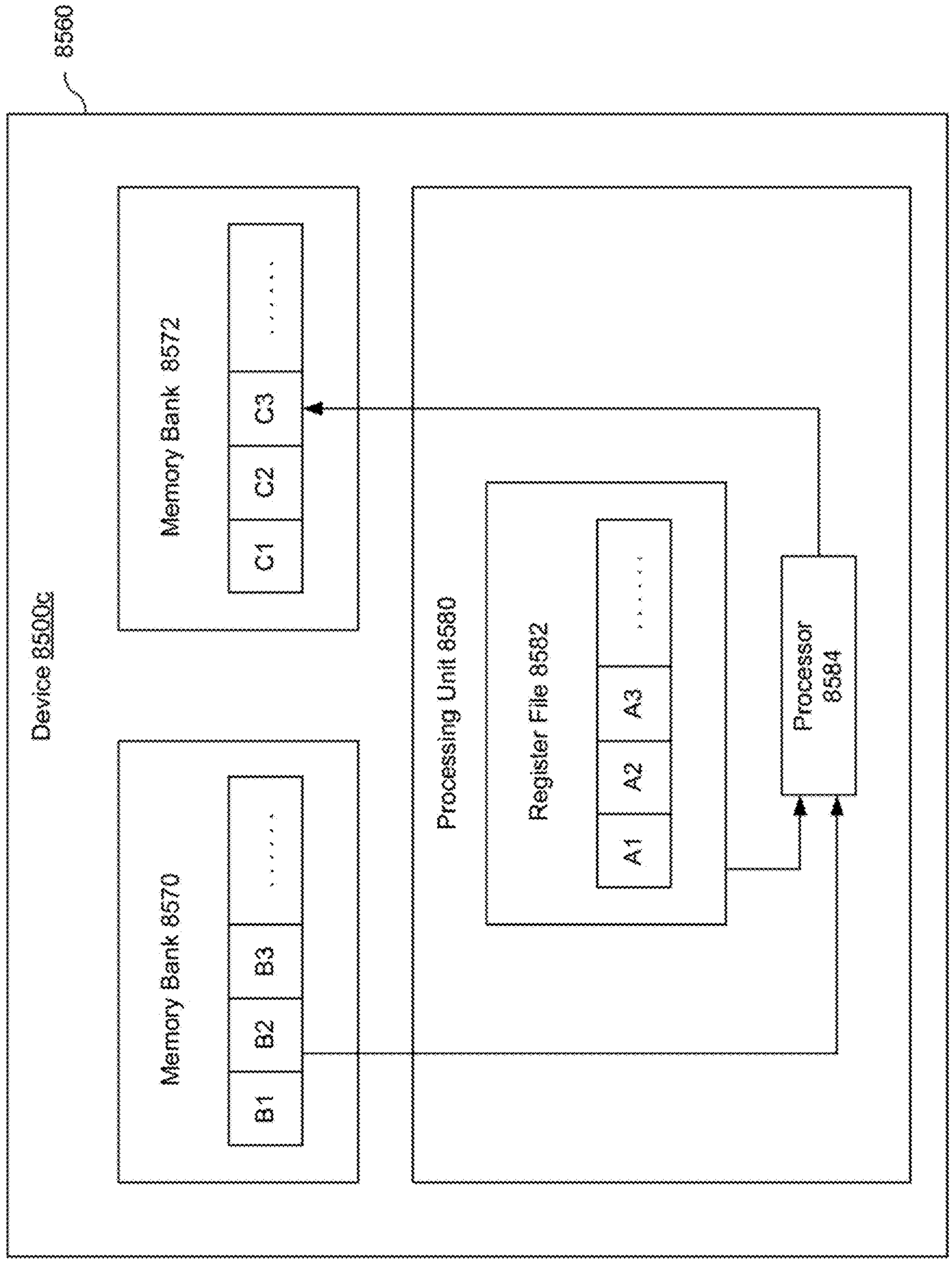
FIG. 85C illustrates an exemplary device having a memory mat serving as a register file, consistent with another embodiment.

FIG. 85C illustrates a device 8500*c*, consistent with the disclosed embodiments. Device 8500*c* includes a substrate 8560, a first memory bank 8570, a second memory bank 8572, and a processing unit 8580. First memory bank 8570, second memory bank 8572, and processing unit 8580 are disposed on substrate 8560. Processing unit 8580 includes a processor 8584 and a register file 8582 implemented by a memory mat. During operation of processing unit 8580, processor 8584 may access register file 8582 to read or write data.

The distributed processor memory chip 8500*a*, 8500*b*, or device 8500*c* may provide a variety of functions based on the access of the processor subunits to registers provided by memory mats. For example, in some embodiments, distributed processor memory chip 8500*a* or 8500*b* may include a processor subunit that functions as an accelerator coupled to memory allowing it to use more memory bandwidth. In the embodiment depicted in FIG. 85A, processor subunit 8530*a* may function as an accelerator (also referred to as "accelerator 8530*a*"). Accelerator 8530*a* may use memory mat 8532*a* disposed in accelerator 8530*a* to provide one or more registers of a register file. Alternatively, in the embodiment depicted in FIG. 85B, accelerator 8530*a* may use memory mat 8532*a* disposed outside of accelerator 8530*a* as a register file. Still further, accelerator 8530*a* may use any one of memory mats 8522*b*, 8524*b*, and 8526*b* in memory bank 8520*b*, or any one of memory mats 8522*c*, 8524*c*, and 8526*c* in memory bank 8520*c* to provide one or more registers.

The disclosed embodiments may be especially useful for certain types of image processing, neural networks, database analysis, compression and decompression, and more. For example, in the embodiment of FIG. 85A or 85B, a memory mat may provide one or more registers of a register file for one or more processor subunits included on the same chip as the memory mat. The one or more registers may be used to store data that are frequently accessed by the processor subunit(s). For example, during convolutional image processing, a convolution accelerator may use the same coefficients again and again on an entire image held in the memory. A suggested implementation for such a convolution accelerator may be to hold all of these coefficients in a "close" register file—that is within one or more registers included within a memory mat dedicated to one or more processor subunits located on the same chip as the register file memory mat. Such an architecture may place the registers (and the stored coefficient values) in close proximity to the processor subunits that operate on the coefficient values. Because the register file implemented by a memory mat may serve as a spatially close, efficient cache, significantly lower losses on data transfer and lower latencies in access can be achieved.

In another example, the disclosed embodiments may include an accelerator that may input words into registers provided by a memory mat. The accelerator may handle the registers as a cyclic buffer to multiply vectors in a single cycle. For example, in device 8500*c* illustrated in FIG. 85C, processor 8584 in processing unit 8580 functions as an accelerator, which uses register file 8582, implemented by a memory mat, as a cyclic buffer to store data A1, A2, A3, . . . . First memory bank 8570 stores data B1, B2, B3, . . . to be multiplied with data A1, A2, A3, . . . . Second memory bank 8572 stores multiplication results C1, C2, C3, . . . . That is, Ci=Ai×Bi. If there is no register file in processing unit 8580, then processor 8584 would need more memory bandwidth and more cycles to read both data A1. A2, A3, . . . and data B1, B2, B3, . . . from an external memory bank, such as memory bank 8570 or 8572, which can cause significant delays. On the other hand, in the present embodiment, data A1, A2, A3, . . . is stored in a register file 8582 formed within processing unit 8580. Thus, processor 8584 would only need to read data B1, B2, B3, . . . from the external memory bank 8570. Thus, the memory bandwidth can be significantly reduced.

In a memory process, usually the memory mats allow for one-way access (i.e., single access). In one-way access, there is one port to the memory. As a result, only one access operation, e.g., read or write, from a specific address can be performed at a certain time. However, if the memory mat itself allows for a two-way access, then the two-way access may be a valid option. In two-way access, two different addresses can be accessed at a certain time. The method of accessing the memory mats may be determined based on the area and the requirements. In some cases, register files implemented by memory mats may allow for four-way access, if they are connected to a processor which needs to read two sources and has one destination register. In some cases, when register files are implemented by DRAM mats to store configuration or cache data, the register files may only allow for one-way access. Standard CPUs may include many-way access mats, while one-way access mats may be more preferred for DRAM applications.

When a controller or an accelerator is designed in a manner that it requires only single access to registers (in a few instances may be), the memory mat implemented registers may be used instead of a traditional register file. In the single access, only one word can be accessed at a time. For example, a processing unit may access two words from two register files at a certain time. Each one of the two register files may be implemented by a memory mat (e.g., DRAM mat) which allows for only single access.

In most technologies, a memory mat IP, which is a closed block (IP) obtained from a manufacturer, would come with wirings, such as word lines and row lines, in place for row and column access. But the memory mat IP does not include the surrounding logic components. Hence the register files implemented by memory mats disclosed in the present embodiments may include logic components. The size of the memory mat may be selected based on the required size of the register file.

Certain challenges may arise when using memory mats to provide registers of a register file, and these challenges may depend on the particular memory technology used to form the memory mats. For example, in memory production, not all fabricated memory cells may operate properly after production. This is a known problem, especially where there is a high density of SRAM or DRAM on a chip. To address this issue in memory technology, one or more redundancy mechanisms may be used in order to maintain yield at a reasonable level. In the disclosed embodiments, because the number of memory instances (e.g., memory banks) used to provide registers of a register file may be fairly small, redundancy mechanisms may not be as important as in normal memory applications. On the other hand, the same production issues that affect memory functionality may also impact whether a particular memory mat may function properly in providing one or more registers. As a result, redundancy elements may be included in the disclosed embodiments. For example, at least one redundant memory mat may be disposed on the substrate of the distributed processor memory chip. The at least one redundant memory mat may be configured to provide at least one redundant register for one or more of the plurality of processor subunits. In another example, a mat may be larger than required (e.g., 620×620 rather than 512×512), and the redundancy mechanisms may be built into the region of the memory mat outside of a 512×512 region or its equivalent.

Another challenge may relate to timing. Usually the timing of loading the word and bit lines is determined by the size of the memory. Since the register file may be implemented by a single memory mat (e.g., 512×512 bits) which is fairly small, the time required for loading a word from the memory mat would be small, the timing may be sufficient to run fairly fast compared to the logic.

Refresh—Some memory types, like DRAM, require refresh periodically. The refresh may be performed when pausing the processor or the accelerator. For a small memory mat, the refreshing time may be a small percentage of the time. Therefore, even if the system stops for a short period of time, the gain obtained by using memory mats as registers may be worth the downtime when looking at overall performance. In one embodiment, a processing unit may include a counter that counts backwards from a predefined number. When the counter reaches "0", the processing unit may halt a current task performed by the processor (e.g., an accelerator) and trigger a refresh operation in which the memory mat is refreshed line by line. When the refresh operation is finished, the processor may resume its task, and the counter may be reset to count backwards from the predefined number.

Figure 86:
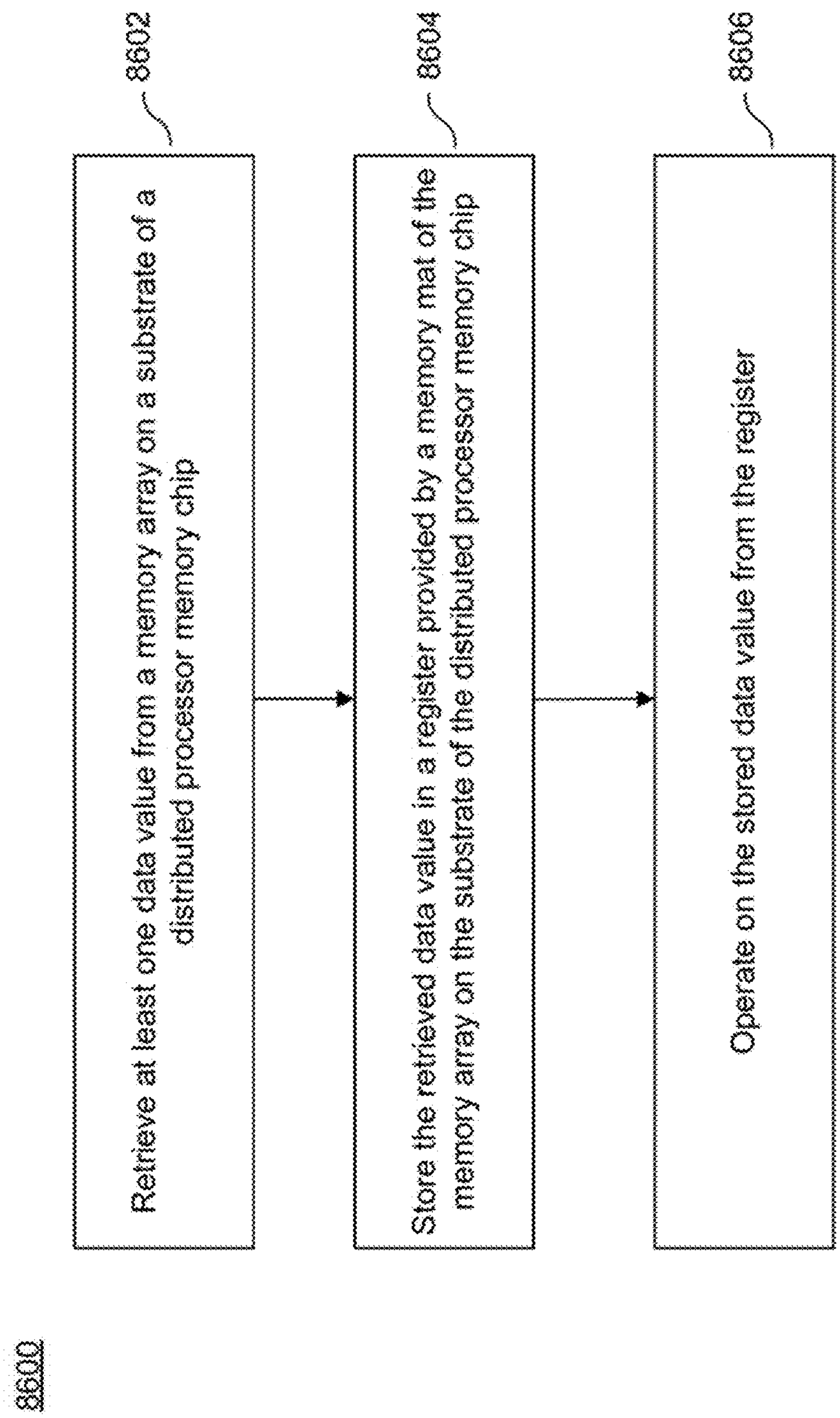
FIG. 86 provides a flowchart representative of an exemplary method for executing at least one instruction in a distributed processor memory chip, consistent with disclosed embodiments.

FIG. 86 provides a flowchart 8600 representative of an exemplary method for executing at least one instruction in a distributed processor memory chip, consistent with disclosed embodiments. For example, at step 8602, at least one data value may be retrieved from a memory array on a substrate of a distributed processor memory chip. At step 8604, the retrieved data value may be stored in a register provided by a memory mat of the memory array on the substrate of the distributed processor memory chip. At step 8606, a processor element, such as one or more of the distributed processor subunits onboard the distributed processor memory chip, may operate on the stored data value from the memory mat register.

Here and throughout, it should be understood that all references to register files should refer equally to caches, as a register file may be a lowest level cache.

Processing Bottlenecks

The terms "first" "second", "third" and the like are merely used to differentiate between different terms. These terms may not indicate an order and/or timing and/or importance of the elements. For example a first process may be preceded by a second process, and the like.

The term "coupled" may mean connected directly and/or connected indirectly.

The terms "memory/processing", "memory and processing" and "memory processing" are used in an interchangeable manner.

There may be provided multiple methods, computer readable media, memory/processing units, and/or systems, that may be memory/processing units.

A memory/processing unit is a hardware unit that has memory and processing capabilities.

A memory/processing unit may be a memory processing integrated circuit, may be included in a memory processing integrated circuit or may include one or more memory processing integrated circuits.

A memory/processing unit may be a distributed processor as illustrated in PCT patent application publication WO2019025892.

A memory/processing unit may include a distributed processor as illustrated in PCT patent application publication WO2019025892.

A memory/processing unit may belong to a distributed processor as illustrated in PCT patent application publication WO2019025892.

A memory/processing unit may be a memory chip as illustrated in PCT patent application publication WO2019025892.

A memory/processing unit may include a memory chip as illustrated PCT patent application publication WO2019025892.

A memory/processing unit may belong to a memory chip as illustrated in PCT patent application publication WO2019025892.

A memory/processing unit may be a distributed processor as illustrated in PCT patent application serial number PCT/IB2019/001005.

A memory/processing unit may include a distributed processor as illustrated in PCT patent application serial number PCT/IB2019/001005.

A memory/processing unit may belong to a distributed processor as illustrated in PCT patent application serial number PCT/IB2019/001005.

A memory/processing unit may be a memory chip as illustrated in PCT patent application serial number PCT/IB2019/001005.

A memory/processing unit may include a memory chip as illustrated in PCT patent application serial number PCT/IB2019/001005.

A memory/processing unit may belong to a memory chip as illustrated in PCT patent application serial number PCT/IB2019/001005.

A memory/processing unit may be integrated circuits that are connected to each other using a wafer to wafer bond and multiple conductors.

Any reference to a distributed processor memory chip, distributed memory processing integrated circuit, a memory chip, a distributed processor, may be implemented as a pair of integrated circuits connected to each other by wafer to wafer bond and multiple conductors.

A memory/processing unit may be manufactured by a first manufacturing process that better fits memory cells than logic cells. Thus—the first manufacturing process may be regarded as a memory flavored manufacturing process. A memory cell may include one of more transistors. A logic cell may include one or more transistors. The first manufacturing process may be applied to manufacture memory banks. A logic cell may include one or more transistors implementing together a logic function and may be used as a basic building block of a bigger logic circuit. A memory cell may include one or more transistors implementing together a memory function and may be used as a basic building block of a bigger logic circuit. Corresponding logic cells may implement the same logic function.

The memory/processing unit may differ from any one of a processor, a processing integrated circuit and/or a processing unit that are manufactured by a second manufacturing process that better fits logic cells than memory cells. Thus—the first manufacturing process may be regarded as a logic flavored manufacturing process. The second manufacturing process may be sued to manufacture central processing units, graphic processing units, and the like.

The memory/processing unit may be more fit to perform less arithmetic intense operations than the processor, a processing integrated circuit and/or a processing unit.

For example—memory cells manufactured by the first manufacturing process may exhibit a critical dimension that exceeds, and even greatly exceeds (for example by a factor that exceeds 2, 3, 4, 5, 9, 7, 8, 9, 10, and the like) the critical dimension of a logic circuit manufactured by the first manufacturing process.

The first manufacturing process may be an analog manufacturing process, the first manufacturing process may be a DRAM manufacturing process, and the like.

A size of a logic cell manufactured by the first manufacturing process may exceed by at least two a size of a corresponding logic cell manufactured by the second manufacturing process. The corresponding logic call may have the same functionality as the logic cell manufactured by the first manufacturing process.

The second manufacturing process may be a digital manufacturing process.

The second manufacturing process may be any one of complementary metal-oxide-semiconductor (CMOS), bipolar, bipolar-CMOS (BiCOMS), double-diffused metal-oxide-semiconductor (DMOS), silicon on oxide manufacturing process, and the like.

A memory/processing unit may include multiple processor subunits.

Processor subunits of one or more memory/processing units may operate independently from each other and/or may cooperate with each other and/or perform a distributed processing. The distributed processing may be executed in various manners—for example in a flat manner or in a hierarchical manner.

A flat manner may involve having processor subunits perform the same operations (and may or may not output the results of the processing between them).

A hierarchical manner may involve executing a sequence of processing operations of different levels—whereas a processing operation of a certain layer follows a processing operation of yet another level. The processor subunits may be allocated (dynamically or statically) to different layers and participate in a hierarchical processing.

The distributed processing may also involve other units—for example a controller of a memory/processing unit and/or units that do not belong to the memory/processing unit.

The terms logic and processor subunit are used in an interchangeable manner.

Any processing mentioned in the application may be executed in any manner—distributed and/or non-distributed, and the like.

In the following application various references and/or incorporations by reference—re made in relation to PCT patent application publication WO2019025892 and to PCT patent application serial number PCT/IB2019/001005 Sep. 9, 2019. PCT patent application publication WO2019025892 and/or PCT patent application serial number PCT/IB2019/001005 provides non-limiting examples of various method, systems, processors, memory chips, and the like. Other methods, systems, processors, may be provided.

There may be provided a processing system (system) in which a processor is preceded by one or more memory/processing units, each memory and processing unit (memory/processing unit) has processing resources and storage resources.

The processor may request or instruct the one or more memory/processing units to perform various processing tasks. The execution of the various processing tasks may offload the processor, reduce the latency, and in some cases reduce the overall bandwidth of information between the one or more memory/processing units and the processor, and the like.

The processor may provide instructions and/or requests at different granularity—for example the processor may send instructions aimed to certain processing resources or may send higher level instructions aimed to the memory/processing unit without specifying any processing resources.

A memory/processing units may manage its processing and/or memory resources in any manner—dynamic, static, distributed, centralized, off line, on-line, and the like. The management of resources may be executed autonomously, under the control of the processor, following a configuration by the processor, and the like.

For example—a task may be partitioned to sub-tasks that may require an execution or one or more instructions by one or more processing resources and/or memory resources of the one or more memory/processing units. Each processing resource may be configured to execute (for example independently or not) at least one instruction. See, for example, the execution of sub-series of instructions by processing resources such as processor subunits of PCT patent application publication WO2019025892.

At least the allocation of memory resources may also be provided to entities other than the one or more memory/processing units—for example a direct access memory (DMA) unit that may be coupled to the one or more memory/processing units.

The complier may prepare a configuration file per type of task executed by a memory/processing unit. The configuration file includes the memory allocation and the processing resource allocations associated with type of task. The configuration file may include instructions that may be executed by different processing resources and/or may defined memory allocation.

For example—a configuration file related to a task of matrix multiplication (multiplying matrix A by matrix B–A*B=C) may indicate where to store elements of matrix A, where to store elements of matrix B, where to store elements of matrix C, where to store intermediate results generated during the matrix multiplication, and may include instructions aimed to the processing resources for performing any mathematical operation related to the matrix multiplication. The configuration file is an example of a data structure—other data structures may be provided.

The matrix multiplication may be executed in any manner by the one or more memory/processing units.

The one or more memory/processing units may multiply a matrix A by a vector V. This can be done in any manner. For example—this may involve maintaining a row or column of the matrix per processing resource (different rows of columns per different processing resources) and circling (between the different processing resources) the outcome of the multiplications of the rows or columns of the matrix by the vector (during the first iteration) and circling the outcome of a previous multiplication (during second till last iterations).

Assuming that matrix A is a 4×4 matrix, the vector V is a 1×4 vector, and there are four processing resources. Under these assumptions the first row of matrix A is stored at the first processor subunit, the second row of matrix A is stored at the second processor sub unit, the third row of matrix A is stored at the third processing resource and the fourth row of matrix A is stored at the fourth processor sub unit. The multiplication starts by sending the first till fourth elements of vector V to the first till forth processing resource and multiplying the first till fourth elements of vector V by the different vectors of A to provide first intermediate results. The multiplication continues by circulating the first intermediate results—sending, by each processing resource, the first intermediate result calculated by the first processing resource to its neighbor processing resource. Each processing resource multiplies the first multiplication result by the vector to provide a second multiplication result. This is repeated multiple times till the multiplication of matrix A by vector V ends.

FIG. 90A is an example of a system 10900 that includes one or more memory/processing unit (collectively denoted 10910) and processor 10920. Processor 10920 may send requests or instructions (via link 10931) to the one or more memory/processing units 10920 that in turn fulfill (or selectively fulfill) the requests and/or the instructions and scud results (via link 10932) to the processor 10920, as illustrated above. The processor 10920 may further process the results to provide (via link 10933) one or more outputs.

The one or more memory/processing units may include J (J being a positive integer) memory resources 10912(1,1)-10912(1,J) and K (K being a positive integer) processing resources 10911(1,1)-10911(1,K).

J may equal K, or may differ from K.

The processing resources 10911(1,1)-1091(1,K) may be, for example, processing groups, or processor subunits as illustrated in PCT patent application publication WO2019025892.

The memory resources 10912(1,1)-10912(1,J) may be memory instances, memory mats, memory banks as illustrated in PCT patent application publication WO2019025892.

There may be any connectivity and/or any functional relationships between any of the resources (memory or processing) of the one or more memory/processing units.

FIG. 90B is an example of a memory/processing unit 10910(*l*).

In FIG. 90B, the K (K being a positive integer) processing resources 10911(1,1)-10911(1,K) form a loop as they are serially connected to each other (see link 10915). Each processing resource is also coupled to its own pair of dedicated memory resources (for example—processing resource 10911(1) is coupled to memory resources 10912(1) and 10912(2), and processing resource 10911(K) is coupled to memory resources 10912(J–1) and 10912(J). The processing resources may be connected to each other in any other manner. The number of memory resources allocated per each processing resources may differ from two. Examples of a connectivity between different resources is illustrated in PCT patent application publication WO2019025892.

FIG. 90C is an example of a system 10901 that N (N being a positive integer) memory/processing unit 10910(1)-10910(N) and processor 10920. Processor 10920 may send requests or instructions (via links 10931(1)-10931(N)) to the memory/processing units 10920(1)-10910(N) that in turn fulfill the requests and/or the instructions and send results (via links 10932(1)-3232(N)) to the processor 10920, as illustrated above. The processor 10920 may further process the results to provide (via link 10933) one or more outputs.

FIG. 90D is an example of a system 10902 that includes N (N being a positive integer) memory/processing unit 10910(1)-10910(N) and processor 10920. FIG. 90D illustrates a preprocessor 10909 that precedes memory/processing unit 10910(1)-10910(N). The preprocessor may perform various preprocessing operations such as frame extraction, header detection, and the like.

FIG. 90E is an example of a system 10903 that includes one or more memory/processing units 10910 and processor 10920. FIG. 90E illustrates a preprocessor 10909 that precedes the one or more memory/processing units 10910 and a DMA controller 10908.

FIG. 90F illustrates method 10800 for distributed processing of at least one information stream.

Method 10800 may start by step 10810 of receiving, over first communication channels, the at least one information stream by one or more memory processing integrated circuits; wherein each memory processing integrated unit comprises a controller, multiple processor subunits, and multiple memory units.

Step 10810 may be followed by steps 10820 and 10830.

Step 10820 may include buffering the information streams by the one or more memory processing integrated circuits.

Step 10830 may include performing, by the one or more memory processing integrated circuits, first processing operations on the at least one information streams to provide first processing results.

Step 10830 may involve compression or decompression.

Accordingly—an aggregate size of the information streams may exceed an aggregate size of the first processing results. An aggregate size of the information streams may reflect the amount of information received during a period of a given duration. An aggregate size of the first processing results may reflect the amount of first processing results outputted any during period of the same given duration.

Alternatively—an aggregate size of the information streams (or any other information entity mentioned in the specification) is smaller than the aggregate size of the first processing results. In this case a compression is obtained.

Step 10830 may be followed by step 10840 of sending the first processing results to one or more processing integrated circuits.

The one or more memory processing integrated circuits may be manufactured by a memory flavored manufacturing process.

The one or more processing integrated circuit may be manufactured by a logic flavored manufacturing process.

In the memory processing integrated unit each of the memory units may be coupled to a processor subunit.

Step 10840 may be followed by step 10850 of performing, by the one or more processing integrated circuits, second processing operations on the first processing results to provide second processing results.

Step 10820 and/or step 10830 may be instructed by the one or more processing integrated circuit, may be requested by the one or more processing integrated circuit, may be executed following a configuration of the one or more memory processing integrated circuits by the one or more processing integrated circuits, or may be executed independently—without intervention from the one or more processing integrated circuit.

The first processing operations may be of lower arithmetic intensity than the second processing operations.

Step 10830 and/or step 10850 may be at least one out of (a) cellular network processing operations, (b) other network related processing operations (processing of networks that differ from cellular networks, (c) database processing operations, (d) database analytics processing operations, (e) artificial intelligence processing operations, or any other processing operations.

Disaggregated System Memory/Processing Units and a Method for Distributed Processing There may be provided a disaggregated system, a method for distributed processing, a processing/memory unit, a method for operating the disaggregated system, a method for operating the processing/memory unit, and a computer readable medium that is non-transitory and stores instructions for executing any of the methods. A disaggregated system allocates different subsystems to perform different functions. For example—storage may be mainly implemented in one or more storage subsystems while computing may be mainly in one or more storage subsystems.

The disaggregated system may be a disaggregated server, one or more disaggregated servers, and/or may differ from one or more servers.

The disaggregated system may include one or more switching subsystems, one or ore computing subsystems, one or more storage subsystems, and one or more processing/memory subsystems.

The one or more processing/memory subsystems, the one or more computing subsystems and one or more storage subsystems are coupled to each other via the one or more switching subsystems.

The one or more processing/memory subsystems may be included in one or more subsystems of the disaggregated system.

FIG. 87A illustrates various examples of disaggregated systems.

Any number of any type of subsystems may be provided. A disaggregated system may include one or more additional subsystems of types not included in FIG. 87A, may include less types of subsystems, and the like.

Disaggregated system 7101 includes two storage subsystems 7130, a computing subsystem 7120, switching subsystem 7140, and processing/memory subsystem 7110.

Disaggregated system 7102 includes two storage subsystems 7130, a computing subsystem 7120, switching subsystem 7140, processing/memory subsystem 7110 and accelerator subsystem 7150.

Disaggregated system 7103 includes two storage subsystems 7130, a computing subsystem 7120, and A switching subsystem 7140 that includes processing/memory subsystem 7110.

Disaggregated system 7104 includes two storage subsystems 7130, a computing subsystem 7120, A switching subsystem 7140 that includes processing/memory subsystem 7110, and accelerator subsystem 7150.

The inclusion of the processing/memory subsystem 7110 in the switching subsystem 7140 may reduce the traffic within disaggregated systems 7101 and 7102, may reduce the latency of the switching, and the like.

The different subsystems of the disaggregated system may communicate with each other using various communication protocols. It has been found that using Ethernet and even RDMA over Ethernet communication protocols may increase the throughput and may even reduce the complexity of various control and/storage operations related to the exchange of information units between the elements of the disaggregated system.

The disaggregated system may perform distributed processing by allowing the processing/memory subsystems to participate in calculations—especially by executing memory intense calculations.

For example—assuming that N computing units should share information units between them (all to all sharing)—then (a) the N information units may be sent to one or more processing/memory units of the one or more processing/memory subsystems, (b) the one or more processing/memory units may perform the calculation that required the all to all sharing, and (c) sent N updated information units to the N computing units. This will require the order of N transfer operations.

For example—FIG. 87B illustrates a distributed processing that updated a model of a neural network (the model includes the weights assigned to the nodes of the neural network).

Each one of N computing units PU(1)-PU(N) 7120(1)-7120(N) may belong computing subsystem 7120 of any one of the disaggregated systems 7101, 7102, 7103 and 7104.

The N computing units calculate N partial model updates (N different parts of an updated) 7121(1)-7121(N) and send them (over the switching subsystem 7140) to the processing/memory subsystem 7110.

The processing/memory subsystem 7110 calculates the updated model 7122 and sends (via the switching subsystem 7140) the updated model to the N computing units PU(1)-PU(N) 7120(1)-7120(N).

FIGS. 87C, 87D and 87E illustrate examples of memory/processing units 7011, 7012 and 7013 respectively and FIGS. 87F and 87G illustrate integrated circuits 7014 and 7015 that include a memory/processing unit 9010 one or more communication modules such as an Ethernet module and a RDMA over Ethernet module 22.

The memory/processing units include controller 9020, an internal bus 9021, and multiple pairs of logic 9030 and memory banks 9040. The controller is configured to operate as communication module or may be coupled to a communication module.

The connectivity between the controller 9020, and multiple pairs of logic 9030 and memory banks 9040 may be implemented in other manners. The memory banks and the logic may be arranged in other manners (not in pairs).

One or more memory/processing units 9010 of processing/memory subsystem 7110 may process in parallel (using different logics and retrieve in parallel different parts of the model from different memory banks) the model update and benefiting from the large amount of memory resources, very high bandwidth of connections between the memory banks and the logic, may perform such calculations in a highly efficient manner.

Memory/processing units 7011, 7012 and 7013 of FIGS. 87C-87E and integrated circuits 7014 and 7015 of FIGS. 87C-87E include one or more communication modules such as an Ethernet module 7023 (in FIGS. 87C-87G) and a RDMA over Ethernet module 7022 (in FIGS. 87E and 870).

Having such RDMA and/or Ethernet modules (either within the memory/processing unit or within the same integrated circuit as the memory/processing unit) greatly speeds the communication between the different elements of the disaggregated system and in case of RDMA greatly simplifies the communication between different elements of the disaggregated system.

It should be noted that a memory/processing unit that includes RDMA and/or Ethernet modules may be beneficial in other environments—even when the memory/processing units are not included in a disaggregated system.

It should also be noted that the RDMA and/or Ethernet modules may be allocated per a group of memory/processing units—for example—for cost reduction reasons.

It should be noted that a memory/processing unit, a group of memory/processing units and even a processing/memory subsystem may include other communication ports—for example a PCIe communication port.

Using a RDMA and/or Ethernet module may be cost effective as is may eliminate the need to connect to a memory/processing unit to a bridge that is connected to a network integrated circuit (NIC) that may have an Ethernet por.

Using a RDMA and/or Ethernet module may cause the Ethernet (or an RDMA over Ethernet) to be native in the memory/processing units.

It should be noted that the Ethernet is merely an example of a local area network (LAN) protocol. PCIe is merely an example of another communication protocol that may be used over larger distances than the Ethernet.

FIG. 87H illustrates method 7000 for distributed processing.

Method 7000 may include one or more processing iterations.

A processing iteration may be executed by one or more memory processing integrated circuits of a disaggregated system.

A processing iteration may be executed by one or more processing integrated circuits of a disaggregated system.

A processing iteration executed by the more memory processing integrated circuits may be followed by a processing iteration executed by the one or more processing integrated circuits.

A processing iteration executed by the more memory processing integrated circuits may be preceded by a processing iteration executed by the one or more processing integrated circuits.

Yet another processing iteration may be executed by other circuits of the disaggregated system. For example—one or more preprocessing circuits may perform any type of preprocessing—including preparing the information units for a processing iteration by the one or more memory processing integrated circuits.

Method 7000 may include step 7020 of receiving information units by one or more memory processing integrated circuits of a disaggregated system.

Each memory processing integrated unit may include a controller, multiple processor subunits, and multiple memory units.

The one or more memory processing integrated circuits may be manufactured by a memory flavored manufacturing process.

The information units may convey parts of a model of a neural network.

The information units may convey partial results of at least one database query.

The information units may convey partial results of at least one aggregative database query.

Step 7020 may include receiving the information units from one or more storage subsystems of the disaggregated system.

Step 7020 may include receiving the information units from one or more computing subsystems of the disaggregated system, the one or more computing subsystems may include multiple processing integrated circuits that are manufactured by a logic flavored manufacturing process.

Step 7020 may be followed by step 7030 of performing, by the one or more memory processing integrated circuits, processing operations on the information units to provide processing results.

The aggregate size of the information units may exceed, may equal or may be smaller than an aggregate size of the processing results.

Step 7030 may be followed by step 7040 of outputting the processing results by the one or more memory processing integrated circuits.

Step 7040 may include outputting the processing results to one or more computing subsystems of the disaggregated system, the one or more computing subsystems may include multiple processing integrated circuits that are manufactured by a logic flavored manufacturing process.

Step 7040 may include outputting the processing results to one or more storage subsystems of the disaggregated system.

The information units may be sent from different groups of processing units of the multiple processing integrated circuits and may be different parts of an intermediate result of a process that is executed in the distributed manner by the multiple processing integrated circuits. A group of processing units may include at least one processing integrated circuit.

Step 7030 may include processing the information units to provide a result of the entire process.

Step 7040 may include sending the result of the entire process to each one of the multiple processing integrated circuits.

The different pans of the intermediate result may be different parts of an updated neural network model, and wherein the result of the entire process is the updated neural network model.

Step 7040 may include sending the updated neural network model to each one of the multiple processing integrated circuits.

Step 7040 may be followed by step 7050 of performing another processing by the multiple processing integrated circuits based, at least in part, on the processing results to the multiple processing integrated circuits.

Step 7040 may include outputting the processing results using switching subunits of the disaggregated system.

Step 7020 may include receiving information units that are preprocessed information units.

FIG. 87I illustrates method 7001 for distributed processing.

Method 7001 differs from method 7000 by including step 7010 of preprocessing information to provide the preprocessed information units by the multiple processing integrated circuits.

Step 7010 may be followed by steps 7010, 7020, 7030 and 7040.

Database Analytics Acceleration

There is provided a device, a method and a computer readable medium that stores instructions for performing at least the filtering by filtering units that belong to the same integrated circuit as the memory unit, whereas the filters may indicate which entries are relevant to a certain database query. An arbitrator or any other flow control manager may send the relevant entries to the processor and not send irrelevant entries to the processor—thus saving virtually most of the traffic to the processor and from the processor.

See, for example, FIG. 91A that shows a processor (CPU 9240), an integrated circuit that includes a memory and filtering system 9220. The memory and filtering system 9220 may include filtering units 9224 that are coupled to memory unit entries 9222 and to one or more arbitrators—such as arbitrator 9229 for sending relevant entries to the processor. Any arbitration process may be applied. There may be any relationship between the number of entries, the number of filtering units and the number of arbitrators.

The arbitrator may be replaced by any unit capable of controlling the flow of information—for example a communication interface, a flow controller, and the like.

Referring to the filtering—it is based on one or more relevancy/filtering criteria.

The relevancy may be set per database query and may be indicated in any manner—for example—the memory units may store relevancy flags 9224' indicating which entry is relevant. There is also a storage devices 9210 that store K database segments 9220(*k*), whereas k ranges between 1 and K. It should be noted that the entire database may be stored in memory units and not in a storage device (said solution is also referred to as volatile memory stored database).

The memory unit entries may be too small for storing the entire database—and thus may receive one segment at a time.

The filtering units may perform filtering operations such as comparing a value of a field to a threshold, comparing a value of a field to a predefined value, determining if a value of a field is within a predefined range, and the like.

Thus—the filtering unit may perform known data base filtering operations and may be a compact and cheap circuit.

The outcome of the filtering operation (for example—content of relevant database entries) 9101 is sent to CPU 9420 for processing.

The memory and filtering system 9220 may be replaced by a memory and processing system—as illustrated in FIG. 91B.

A memory and processing system 9229 includes processing units 9225 that are coupled to memory unit entries 9222. The processing units 9225 may perform filtering operation and may participate, at least in part, in executing the one or more additional operations on the relevant records.

A processing unit may be tailored to perform specific operations and/or may be a programmable unit configured to perform multiple operations. For example—the processing unit may be a pipelined processing unit, may include an ALU, may include multiple ALUs, and the like.

The processing units 9225 may perform the entire one or more additional operations.

Alternatively—a part of the one or more additional operations are executed by the processing units, and the processor (CPU 9240) may execute another part of the one or more additional operations.

The outcome of the processing operation (for example—partial response 9102 to the database query or a full response 9103) is sent to CPU 9420.

A partial response requires further processing.

FIG. 92A illustrates memory/processing system 9228 that includes memory/processing units 9227 that are configured to perform the filtering and additional processing.

The memory/processing system 9228 implements the processing units and the memory units of FIG. 91 by memory/processing unit 9227.

The role of the processor may include controlling the processing units, executing at least a part of the one or more additional operations, and the like.

The combination of the memory entries and the processing units may be implemented, at least in part by one or more memory/processing units.

FIG. 92B illustrates an example a memory/processing unit 9010.

The memory/processing unit 9010 includes controller 9020, an internal bus 9021, and multiple pairs of logic 9030 and memory banks 9040. The controller is configured to operate as communication module or may be coupled to a communication module.

The connectivity between the controller 9020, and multiple pairs of logic 9030 and memory banks 9040 may be implemented in other manners. The memory banks and the logic may be arranged in other manners (not in pairs). Multiple memory banks may be coupled to and/or managed by a single logic.

A database query 9100 is received, by a memory/processing system, via an interface 9211. Interface 9211 may be a bus, a port, an input/output interface, and the like.

It should be noted that the response to a database query can be generated by at least one out (or a combination of one or more out of): one or more memory/processing systems, one or more memory and processing systems, one or more memory and filtering systems, by one or more processors located outside these systems, and the like.

It should be noted that the response to a database query can be generated by at least one out (or a combination of one or more out of): one or more filtering units, one or more memory/processing units, one or more processing units, one or more other processor (such as one or more other CPUs, and the like.

Any process may include finding the relevant database entries and them processing the relevant database entries. The processing may be executed by one or more processing entities.

A processing entity may be at least one out of a processing unit of a memory and processing system (for example processing units 9225 of memory and processing system 9229), a processor subunit (or logic) of a memory/processing unit, another processor (for example—CPU 9240 of FIGS. 91A, 91B and 74), and the like.

The processing involved in the generation of the response to a database query may be generated by any one of the following or a combination thereof:

a. Processing units 9225 of memory and processing system 9229.
b. Processing units 9225 of different memory and processing systems 9229.
c. Processor subunits (or logic 9030) of one or more memory/processing units 9227 of a memory/processing system 9228.
d. Processor subunits (or logic 9030) of memory/processing units 9227 of different memory/processing systems 9228.
e. Controllers of one or more memory/processing units 9227 of a memory/processing system 9228.
f. Controllers of one or more memory/processing units 9227 of different memory/processing systems 9228.

Thus, a processing involved in a responding to database query may be executed by any combination or sub-combination of (a) one or more controllers of one or more memory/processing units, (b) one or more processing units of memory processing systems, (c) one or more processor subunits of one or more memory/processing units, and (d) one or more other processors, and the like.

A processing executed by more than one processing entities may be referred to as a distributed processing.

It should be noted that the filtering may be executed by filtering entities out of one or more filtering unit and/or one or more processing units and/or one or more processor subunits. In this sense a processing unit and/or a processor subunit that performs a filtering operation may be referred to as a filtering unit.

A processing entity may be a filtering entity or may differ from a filtering entity.

A processing entity may perform processing operations of database entries that were deemed to be relevant by another filtering entity.

A processing entity may also perform the filtering operation.

A response to a database query may utilize one or more filtering entities and one or more processing entities.

The one or more filtering entities and the one or more processing entities may belong to the same system (for example—memory/processing system 9228, memory and processing system 9229, memory and filtering system 9220) or to different systems.

A memory/processing unit may include multiple processor subunits. The processor subunits may operate independently from each other, may partially collaborate with each other, may participate in a distributed processing, and the like.

FIG. 92C illustrates multiple memory and filtering systems 9220, multiple other processors (such as CPU 9240) and a storage device 9210.

The multiple memory and filtering systems 9220 may participate (concurrently or not) in the filtering of one or more database entries—based on one or more filtering criteria within one of more database queries.

FIG. 92D illustrates multiple memory and processing systems 9229, multiple other processors (such as CPU 9240) and a storage device 9210.

The multiple memory and processing systems 9229 may participate (concurrently or not) in the filtering and at least partially processing involved in responding to one of more database queries.

FIG. 92F illustrates multiple memory/processing systems 9228, multiple other processors (such as CPU 9240) and a storage device 9210.

The multiple memory/processing systems 9228 may participate (concurrently or not) in the filtering and at least partially processing involved in responding to one of more database queries.

FIG. 92G illustrate method 9300 method for database analytics acceleration.

Method 9300 may start by step 9310 of receiving, by a memory processing integrated circuit, a database query that comprises at least one relevancy criterion indicative of database entries of a database that are relevant to the database query.

The database entries of a database that are relevant to the database query may be none, one, some or all of the database entries of the database.

The memory processing integrated circuit may include a controller, multiple processor subunits, and multiple memory units.

Step 9310 may be followed by step 9320 of determining, by the memory processing integrated circuit and based on the at least one relevancy criterion, a group of relevant database entries stored in the memory processing integrated circuit.

Step 9320 may be followed by step 9330 of sending the group of relevant database entries to one or more processing entities for further processing without substantially sending irrelevant data entries stored in the memory processing integrated circuit to the one or more processing entities.

The phrase "without substantially sending" means either not sending at all (during the responding to the database query) or sending an insignificant number of irrelevant entries. Insignificant—may mean up to 1, 2, 3, 4, 5, 9, 7, 8, 9, 10 percent—or sending any amount that does not have a significant effect on bandwidth.

Step 9330 may be followed by step 9340 of processing the group of relevant database entries to provide a response to the database query.

FIG. 92H illustrate method 9301 for database analytics acceleration.

It is assumed that the filtering and the entire processing required for responding to the database query are executed by a memory processing integrated circuit.

Method 9301 may start by step 9310 of receiving, by a memory processing integrated circuit, a database query that comprises at least one relevancy criterion indicative of database entries of a database that are relevant to the database query.

Step 9310 may be followed by step 9320 of determining, by the memory processing integrated circuit and based on the at least one relevancy criterion, a group of relevant database entries stored in the memory processing integrated circuit.

Step 9320 may be followed by step 9331 of sending the group of relevant database entries to one or more processing entities of the for memory processing integrated circuit for fully processing without substantially sending irrelevant data entries stored in the memory processing integrated circuit to the one or more processing entities.

Step 9331 may be followed by step 9341 of fully processing the group of relevant database entries to provide a response to the database query.

Step 9341 may be followed by step 9351 of outputting the response to the database query from the memory processing integrated circuit.

FIG. 92I illustrate method 9302 for database analytics acceleration.

It is assumed that the filtering and only a part of the processing required for responding to the database query are executed by a memory processing integrated circuit. The memory processing integrated circuit will output partial results that will be processed by one or more other processing entities located outside the memory processing integrated circuit.

Method 9301 may start by step 9310 of receiving, by a memory processing integrated circuit, a database query that comprises at least one relevancy criterion indicative of database entries of a database that are relevant to the database query.

Step 9310 may be followed by step 9320 of determining, by the memory processing integrated circuit and based on the at least one relevancy criterion, a group of relevant database entries stored in the memory processing integrated circuit.

Step 9320 may be followed by step 9332 of sending the group of relevant database entries to one or more processing entities of the for memory processing integrated circuit for partially processing without substantially sending irrelevant data entries stored in the memory processing integrated circuit to the one or more processing entities.

Step 9332 may be followed by step 9342 of partially processing the group of relevant database entries to provide an intermediate response to the database query.

Step 9342 may be followed by step 9352 of outputting the intermediate response to the database query from the memory processing integrated circuit.

Step 9352 may be followed by step 9390 of further processing the intermediate response to provide the response to the database.

FIG. 92J illustrate method 9303 for database analytics acceleration.

It is assumed that the filtering and not the processing of the relevant database entries are executed by a memory processing integrated circuit. The memory processing integrated circuit will output group of relevant database entries that will be fully processed by one or more other processing entities located outside the memory processing integrated circuit.

Method 9301 may start by step 9310 of receiving, by a memory processing integrated circuit, a database query that comprises at least one relevancy criterion indicative of database entries of a database that are relevant to the database query.

Step 9310 may be followed by step 9320 of determining, by the memory processing integrated circuit and based on the at least one relevancy criterion, a group of relevant database entries stored in the memory processing integrated circuit.

Step 9320 may be followed by step 9333 of sending the group of relevant database entries to one or more processing entities located outside the memory processing integrated circuit without substantially sending irrelevant data entries stored in the memory processing integrated circuit to the one or more processing entities.

Step 9333 may be followed by step 9391 of fully processing the intermediate response to provide the response to the database.

FIG. 92K illustrates method 9304 of database analytics acceleration.

Method 9303 may start by step 9315 of receiving, by an integrated circuit, a database query that comprises at least one relevancy criterion indicative of database entries of a database that are relevant to the database query; wherein the integrated circuit comprises a controller, filtering units, and multiple memory units.

Step 9315 may be followed by step 9325 of determining, by the filtering units and based on the at least one relevancy criterion, a group of relevant database entries stored in the integrated circuit.

Step 9325 may be followed by step 9335 of sending the group of relevant database entries to one or more processing entities located outside the integrated circuit for further processing without substantially sending irrelevant data entries stored in the integrated circuit to the one or more processing entities.

Step 9335 may be followed by step 9391.

FIG. 92L illustrates method 9305 of database analytics acceleration.

Method 9305 may start by step 9314 of receiving, by an integrated circuit, a database query that comprises at least one relevancy criterion indicative of database entries of a database that are relevant to the database query; wherein the integrated circuit comprises a controller, processing units, and multiple memory units.

Step 9314 may be followed by step 9324 of determining, by the processing units and based on the at least one relevancy criterion, a group of relevant database entries stored in the integrated circuit.

Step 9324 may be followed by step 9334 of processing the group of relevant database entries by the processing units without processing irrelevant data entries stored in the integrated circuit by the processing units to provide processing results.

Step 9334 may be followed by step 9344 of outputting the processing results from the integrated circuit.

In any one of methods 9300, 9301, 9302, 9304 and 9305 the memory processing integrated circuit outputs an output. The output may be the group of relevant database entries, one or more intermediate results or one or more (full) results.

The outputting may be preceded by retrieving one or more relevant data base entries and/or one or more results (full or intermediate) from filtering entities and/or processing entities of the memory processing integrated circuit.

The retrieving may be controlled in one or more manner and may be controlled by an arbiter and/or one or more controller of the memory processing integrated circuit.

The outputting and/or the retrieval may include controlling one or more parameters of the retrieval and/or of the outputting. The parameters may include timing of retrieval, rate of the retrieval, source of the retrieval, bandwidth, order or retrieval, timing of outputting, rate of the outputting, source of the outputting, bandwidth, order or outputting, type of retrieval method, type of arbitration method, and the like.

The outputting and/or the retrieving may perform a flow control process.

The outputting and/or the retrieving (for example the applying of the flow control process) may be responsive to indicators, outputted from the one or more processing entities, regarding a completion of a processing of database entries of the group. An indicator may indicate whether an intermediate result is ready to be retrieved from a processing entity or not.

The outputting may include attempting to match a bandwidth used during the outputting to a maximal allowable bandwidth over a link that coupled the memory processing integrated circuit to a requestor unit. The link may be a link to a recipient of the output of the memory processing integrated circuit. The maximal allowable bandwidth may be dictated by the capacity and/or availability of the link, by the capacity and/or availability of the recipient of the outputted content, and the like.

The outputting may include attempting to output the outputted content in an optimal or suboptimal manner.

The outputting of the outputted content may include attempting to maintain fluctuations of output traffic rate below a threshold.

Any method of methods 9300, 9301, 9302 and 9305 may include generating by the one or more processing entities processing status indicators that may be indicative of a progress of the further processing of the group of relevant database entries.

When the processing included in any of the mentioned above methods is executed by more than a single processing entity—then the processing may be regarded as a distributed processing—as it is executed in a distributed manner.

As indicated above—the processing may be executed in a hierarchical manner or in a flat manner.

Any one of methods 9300-9305 may be executed by multiple systems—that may respond to one or multiple database queries—concurrently or sequentially.

Word Embedding

As mentioned above—word embedding is the collective name for a set of language modeling and feature learning techniques in natural language processing (NLP) where words or phrases from the vocabulary are mapped to vectors of elements. Conceptually it involves a mathematical embedding from a space with many dimensions per word to a continuous vector space with a much lower dimension.

The vectors may be mathematically processed. For example—the vectors that belong to the matrix may be summed to provide a summed vector.

Yet for another example—the covariance of the matrix (of the sentence) may be calculated. This may include multiplying the matrix by its transposed matrix.

A memory/processing unit may store the vocabulary. Especially—parts of the vocabulary may be stored in multiple memory banks of the memory/processing unit.

Thus—the memory/processing unit may be accessed with access information that (such as retrieval keys) will represent the set of words of phrases of a sentence—so that the vectors that represent the words of phrases of the sentence will be retrieved from at least some of the memory banks of the memory/processing unit.

Different memory banks of the memory/processing unit may store different parts of the vocabulary—and may be accessed in parallel (depending on the distribution of indexes of a sentence). Even when a more than a single line of a memory bank needs to be sequentially accessed—prediction may reduce the penalty.

The allocation of words of the vocabulary between the different memory banks of the memory/processing unit may be optimized or highly beneficial in the senses that it may increase the chances of parallel access to different memory banks of the memory/processing unit per sentence. The allocation can be learnt per user, can be learnt per the general population or may be learnt per a group of persons.

In addition—the memory/processing unit may also be used to perform at least some of the processing operations (by its logic) and thereby may reduce bandwidth required from busses outside the memory/processing unit, may calculate in an efficient manner (even in parallel) multiple computations (using multiple processors of the memory/processing unit in parallel.

A memory bank may be associated with a logic.

At least a part of the processing operations may be executed by one or more additional processors (such as vector processors—including but not limited to vector adders).

A memory/processing unit may include one or more additional processor that may be allocated to some or all of the memory bank—logic pairs.

Thus—a single additional processor may be allocated to all or some of the memory bank—logic pairs. Yet for another example—the additional processors may be arranged in a hierarchical manner so that an additional processor of some level processes output from additional processors of a lower level.

It should be noted that the processing operation may be executed without using any additional processors—but may be executed by the logic of the memory/processing unit.

FIGS. 89A, 89B, 89C, 89D, 89E, 89F and 89G illustrate examples of memory/processing units 9010, 9011, 9012, 9013, 9014, 9015 and 9019 respectively. Memory/processing unit 9010 includes a controller 9020, an internal bus 9021, and multiple pairs of logic 9030 and memory banks 9040.

It should be noted that the logic 9030 and memory banks 9040 may be coupled to the controller and/or to each other in other manners—for example multiple buses may be provided between the controller and the logics, the logics may be arranged in multiple layers, a single logic may be shared by multiple memory banks (see for example FIG. 89E), and the like.

The length of a page of each memory bank within the memory/processing unit 9010 can be defined in any manner—for example it may be small enough, and the number of memory banks can be big enough to enable to output in parallel a large number of vectors without wasting many bits on irrelevant information.

Logic 9020 may include a full ALU, a partial ALU, a memory controller, a partial memory controller, and the like. A partial ALU (memory controller) unit is capable of executing only a part of the functions executable by the full ALU (memory controller). Any logic or sub-processors illustrates in the application may include a full ALU, a partial ALU, a memory controller, a partial memory controller, and the like.

The connectivity between the controller 9020, and multiple pairs of logic 9030 and memory banks 9040 may be implemented in other manners. The memory banks and the logic may be arranged in other manners (not in pairs).

The memory/processing unit 9010 may not have additional vectors—and the processing of the vectors (from the memory banks) is done by the logic 9030.

FIG. 89B illustrates an additional processor such as vector processor 9050 that is coupled to internal bus 9021.

FIG. 89C illustrates additional processors such as vector processors 9050 that are coupled to internal bus 9021. The one or more additional processors execute (alone or in cooperation with the logic) the processing operations.

FIG. 89D also illustrates a host 9018 coupled via bus 9022 to the memory/processing unit 9010.

FIG. 89D also illustrates the vocabulary 9070 that maps word/phrases 9072 to vectors 9073. The memory/processing unit is accessed using retrieval keys 9071, each retrieval key represents a previously recognized word or phrase. Host 9018 sends to the memory/processing unit multiple retrieval keys 9071 that represent a sentence and memory/processing unit may output the vectors 9070 or an outcome of a processing operation applied by the vectors related to the sentence. The word/phrases are usually not stored in the memory/processing unit 9010.

Memory controller functionality for controlling the memory banks may be included (solely or partially) in the logic, may be included (solely or partially) in controller 9020 and/or may be included (solely or partially) in one or more memory controllers (not shown) within the memory/processing unit 9010.

The memory/processing unit may be configured to maximize the throughput of vectors/results sent to the host 9018—or may apply any process for controlling internal memory/processing unit traffic and/or controlling traffic between the memory/processing unit and the host computer (or any other entity outside the memory/processing unit).

The different logic 9030 are coupled to the memory banks 9040 of the memory/processing unit and may perform (preferably in parallel) mathematical operations on the vectors to generate processed vectors. One logic 9030 may send to another logic a vector (see, for example line 38 of FIG. 89G) and the other logic may apply a mathematical operation on the received vector and the vector it calculated. The logic may be arranged in levels and a logic of a certain level may process vectors or intermediate results (generated from applying mathematical operations) from a previous level logic. The logics may form a tree (binary, trinary, and the like)

When the aggregate size of processed vectors exceeds the aggregate size of the results then a reduction of output bandwidth (out of the memory/processing unit) is obtained. For example—when K vectors are summed by the memory/processing unit to provide a single output vecto—then a K:1 reduction in bandwidth is obtained.

Controller 9020 may be configured to open multiple memory banks in parallel by broadcasting the addresses of the different vectors to be accessed.

The controller may be configured to control the order of retrieving the different vectors from the multiple memory banks (or from any intermediate buffer or storage circuit that stores the different vectors—see buffers 9033 of FIG. 89D) based, at least in part, on the order of the words or phrases in the sentence.

The controller 9020 may be configured to manage the retrieval of the different vectors based on one or more parameters related to outputting the vectors outside the memory/processing unit 9010—for example the rate of the retrieval of the different vectors from the memory banks may be set to substantially equal the allowable rate of outputting the different vectors from the memory/processing unit 9010.

The controller may output the different vectors outside the memory/processing unit 9010 by applying any traffic shaping process. For example—the controller 9020 may aim to output the different vectors at a rate that is close as possible to a maximal rate allowable by the host computer or the link coupling the memory/processing unit 9010 to the host computer. Yet for another example—the controller may output the different vectors while minimizing or at least substantially reducing traffic rate fluctuations over time.

The controller 9020 belongs to the same integrated circuit as the memory banks 9040 and logic 9030, and thus can easily receive feedback from the different logic/memory banks regarding the status of the retrieval of the different vectors (for example whether a vector is ready, whether a vector is ready but another vector is being retrieved or is about to be retrieved from the same memory bank), and the like. The feedback may be provided in any manner—over a dedicated control line, over a shared control line. Using a status bit or status bits, and the like (see status lines 9039 of FIG. 89F).

The controller 9020 can independently control the retrieval and outputting of the different vectors—and thus may reduce the involvement of the host computer. Alternatively—the host computer may be unaware of the management capabilities of the controller and may continue to send detailed instructions—and in this case the memory/processing unit 9010 may ignore the detailed instructions, may conceal the management capabilities of the controller and the like. The mentioned above solutions may be used based on the protocol that is manageable by the host computer.

It has been found that performing processing operations in the memory/processing unit is very beneficial (energy wise) even when these operations are more power consuming than the processing operations in the host- and even when these operations are more power consuming than the transfer operations between the host and the memory/processing unit. For example, assuming large enough vectors—energy consumption of transferring a data unit is 4 pJ, energy consumption of a processing operation of the data unit (by the host) is 0.1 pJ—then the processing of the data unit by the memory/processing unit was more effective when the energy consumption of processing of the data unit by the memory/processing unit was lower than 5 pJ.

Each vector (of the matrix that represents the sentence) may be represented by a sequence of words (or other multiple-bit segments). For simplicity of explanation it is assumed that the multiple bit segments are words.

Additional power saving may be obtained when a vectors includes zero-value words. Instead of outputting the entire zero-value word, a zero value flag (even conveyed over a dedicated control line) that is shorter than a word (for example—a bit) may be outputted—instead of the entire word. Flags may be allocated to other values (for example 1-valued word).

FIG. 88A illustrates method 9400 for embedding—or rather may be a method for retrieving features vector related information. The features vector related information may include the feature vectors and/or a result of processing the feature vectors.

Method 940 may start by step 9410 of receiving, by a memory processing integrated circuit, retrieval information for a retrieval of multiple requested feature vectors that may be mapped to multiple sentence segments.

The memory processing unit may include a controller, multiple processor subunits, and multiple memory units. Each of the memory units may be coupled to a processor subunit.

Step 9410 may be followed by step 9420 of retrieving the multiple requested feature vectors from at least some of the multiple memory units.

The retrieving may include concurrently requesting, from two or more memory units, requested feature vectors stored in the two or more memory units.

The requesting is executed based on a known mapping between sentence segments and locations of feature vectors mapped to the sentence segments.

The mapping may be uploaded during a boot process of the memory processing integrated circuit.

It may be beneficial to retrieve as many requested feature vectors at once—but this depends on where the requested feature vectors are stored and the number of different memory units.

If more than one requested feature vector is stored in the same memory bank—the predictive retrieval may be applied—for reducing the penalty associated with retrieving information from memory banks. Various method for reduction of penalty are illustrated in various sections of the application.

The retrieving may include applying a predictive retrieval of at least some requested feature vectors of a set of requested feature vectors stored in a single memory unit.

The requested feature vectors may be distributed between the memory units in an optimal manner.

The requested feature vectors may be distributed between the memory units based on expected retrieval patterns.

The retrieving of the multiple requested feature vectors may be executed according to the certain order. For example—the order of the sentence segments in one or more sentences.

The retrieving of the multiple requested feature vectors may be executed, at least in part, out of order; and wherein the retrieving further may include re-ordering the multiple requested feature vectors.

The retrieving of the multiple requested feature may include buffering the multiple requested feature vectors before they may be read by the controller.

The retrieving of the multiple requested feature may include generating buffer state indicators that indicate when one or more buffers associated with the multiple memory units store one or more requested feature vectors.

The method may include conveying the buffer state indicators over dedicated control lines.

The one dedicated control line may be allocated per memory unit.

The buffer state indicator may be status bits stored in one or more the buffers.

The method may include conveying the buffer state indicators over one or more shared control lines.

Step 9420 may be followed by step 9430 of processing the multiple requested feature vectors to provide processing results.

Additionally or alternatively, step 9420 may be followed by step 9440 of outputting from the memory processing integrated circuit, an output that may include at least one out of (a) the requested feature vectors and (b) a result of processing the requested feature vectors. The at least one out of (a) requested feature vectors and (b) a result of processing the requested feature vectors is also referred to as feature vector related information.

When step 9430 is executed then step 9440 may include outputting (at least) the result of processing the requested feature vectors.

When step 9430 is skipped then step 9440 includes outputting the requested feature vectors and may not include outputting the result of processing the requested feature vectors.

FIG. 88B illustrates method 9401 for embedding.

It is assumed that the output includes requested feature vectors but not the result of processing the requested feature vectors.

Method 9401 may start by step 9410 of receiving, by a memory processing integrated circuit, retrieval information for a retrieval of multiple requested feature vectors that may be mapped to multiple sentence segments.

Step 9410 may be followed by step 9420 of retrieving the multiple requested feature vectors from at least some of the multiple memory units.

Step 9420 may be followed by step 9431 of outputting from the memory processing integrated circuit, an output that includes the requested feature vectors and not a result of processing the requested feature vectors.

FIG. 88C illustrates method 9402 for embedding.

It is assumed that the output includes results of processing the requested feature vectors.

Method 9402 may start by step 9410 of receiving, by a memory processing integrated circuit, retrieval information for a retrieval of multiple requested feature vectors that may be mapped to multiple sentence segments.

Step 9410 may be followed by step 9420 of retrieving the multiple requested feature vectors from at least some of the multiple memory units.

Step 9420 may be followed by step 9430 of processing the multiple requested feature vectors to provide processing results.

Step 9430 may be followed by step 9442 of outputting from the memory processing integrated circuit, an output that may include a result of processing the requested feature vectors.

The outputting of the output may include applying traffic shaping on the output.

The outputting of the output may include attempting to match a bandwidth used during the outputting to a maximal allowable bandwidth over a link that coupled the memory processing integrated circuit to a requestor unit.

The outputting of the output may include attempting to maintain fluctuations of output traffic rate below a threshold.

Any step out of the retrieving and the outputting may be executed under the control of the host and/or independently or partially independently by the controller.

The host may send retrieval commands of different granularity—from generally sending retrieval information regardless of the locations of the requested feature vectors within the multiple memory units—till sending detailed retrieval information based on the location of the requested feature vectors within the multiple memory units.

The host may control (or attempt to control) the timing of different retrieval operations within the memory processing integrated circuit—but may be indifferent to the timing.

The controller may be controlled in various levels by the host- and may even ignore the detailed commands of the host and independently control at least the retrieval and/or the outputting.

The processing of the requested feature vectors can be executed by at least one out (or a combination of one or more out of): one or more memory/processing units and one or more processors located outside the one or more memory/processing units, and the like.

It should be noted that the processing of the requested feature vectors can be executed by at least one out (or a combination of one or more out of): one or more processor subunits, a controller, one or more vector processors, and one or more memory/processing units located outside the one or more memory/processing units.

The processing of the requested feature vectors can be executed by may be generated by any one of the following or a combination thereof:

a. Processor subunits (or logic 9030) of a memory/processing unit.
b. Processor subunits (or logic 9030) of multiple memory/processing units.
c. A controller of a memory/processing unit
d. A controller of multiple memory/processing units.
e. One or more vector processors of a memory/processing unit.
f. One or more vector processors multiple memory/processing units.

Thus, a processing of the requested feature vectors may be executed by any combination or sub-combination of (a) one or more controllers of one or more memory/processing units, (b) one or more processor subunits of one or more memory/processing units, (c) one or more vector processors of one or more memory/processing units, and (d) one or more other processors located outside the one or more memory/processing units.

A processing executed by more than one processing entities may be referred to as a distributed processing.

A memory/processing unit may include multiple processor subunits. The processor subunits may operate independently from each other, may partially collaborate with each other, may participate in a distributed processing, and the like.

The processing may be executed in a flat manner in which all processor subunits perform the same operations (and may or may not output the results of the processing between them).

The processing may be executed in a hierarchical manner in which the processing involves a sequence of processing operations of different levels—whereas a processing operation of a certain layer follows a processing operation of yet another level. The processor subunits may be allocated (dynamically or statically) to different layers and participate in a hierarchical processing.

Any processing of the requested feature vectors can be executed by more than one processing entity (processor subunit, controller, vector processor, other processor) may be distributed processed—in any manner—flat, hierarchical or other. For example—processor subunits may output their processed results to a controller that may further process the results. One or more other processors located outside the one or more memory/processing units may further processed the output of the memory processing integrated circuit.

It should be noted that the retrieval information may also include information for retrieval of requested feature vectors that are not mapped to the sentence segments. These feature vectors may be mapped to one or more persons, devices or any other entity that may be related to sentence segments. For example—a user of a device that sensed the sentence segments, a device that sensed the segment, a user that was identified as the source of the sentence segments, a web site that was accessed while the sentence was generated, a location in which the sentence was captured, and the like.

Methods 9400, 9401 and 9402 are applicable, mutatis mutandis to the processing and/or requested retrieval vectors that are not mapped to the sentence segments.

Non-limiting example of processing of feature vectors may include a sum, a weighted sum, an average, a subtraction or an applying of any other mathematical function.

Hybrid Device

As processor speeds and memory sizes both continue to increase, a significant limitation on effective processing speeds is the von Neumann bottleneck. The von Neumann bottleneck results from throughput limitations resulting from conventional computer architecture. In particular, data transfer from memory (that is external to the logic die—such as an external DRAM memory) to the processor is often bottlenecked compared to actual computations undertaken by the processor. Accordingly, the number of clock cycles to read and write f om memory increases significantly with memory-intensive processes. These clock cycles result in lower effective processing speeds because reading and writing from memory consumes clock cycles that cannot be used for performing operations on data. Moreover, the computational bandwidth of the processor is generally larger than the bandwidth of the buses that the processor uses to access the memory.

These bottlenecks are particularly pronounced for memory-intensive processes, such as neural network and other machine learning algorithms; database construction, indexing searching, and querying; and other tasks that include more reading and writing operation than data processing operations.

The present disclosure describes solutions for mitigating or overcoming one or more of the problems set forth above, among other problems in the prior art.

There may be provided a hybrid device for memory intense processing, the hybrid device may include a base die, multiple processors, first memory resources of at least one other die and second memory resources of at least one further dies.

The base die and the at least one other die are connected to each other by wafer on wafer bonding.

The multiple processors are configured to perform processing operations, and to retrieve retrieved information stored in the first memory resources.

The second memory resources are configured to send additional information from the second memory resources to the first memory resources.

An overall bandwidth of first paths between the base die and the at least one other die exceed an overall bandwidth of second paths between the at least one other die and the at least one further die, and a storage capacity of the first memory resources is a fraction of a storage capacity of the second memory resource.

The second memory resources are high bandwidth memory (HBM) resources.

The at least one further dies are a stack of high bandwidth memory (HBM) chips.

The at least some of the second memory resources may belong to a further die that is connected to the base die by a connectivity that differs from wafer to wafer bonding.

The at least some of the second memory resources belong to a further die that is connected to an other die by a connectivity that differs from wafer to wafer bonding.

The first memory resources and the second memory resources are cache memories of different levels.

The first memory resources are positioned between the base die and the second memory resources.

The first memory resources are positioned to the side of the second memory resources.

The an other die is configured to perform additional processing, wherein the other die comprises a plurality of processor sub-units and the first memory resources.

The each processor sub-unit is coupled to a unique portion of the first memory resources allocated to the processor sub-unit.

The unique portion of the first memory resources is at least one memory bank.

The multiple processors are a plurality of processor subunits included in a memory processing chip that the first memory resources.

The base die comprises the multiple processors, wherein the multiple processors am a plurality of processor subunits that are coupled via conductors formed in the wafer to wafer bonding, to the first memory resources.

The each processor sub-unit is coupled to a unique portion of the first memory resources allocated to the processor sub-unit.

There may be provided a hybrid integrated circuit may utilize wafer on wafer (WOW) connectivity to couple at least a portion of a base die to second memory resources that are included in one or more further dies and are connected using connectivity that differs from WOW connectivity. An example of the second memory resources may be high bandwidth memory (HBM) memory resources. In various figures the second memory resources are included in a stack of HBM memory units may be coupled to a controller using through silicon via (TSV) connectivity. The controller may be included in the base die or coupled (for example via micro-bumps) to the at least portion of the base die.

The base die may be a logic die but may be a memory/processing unit.

The WOW connectivity is used to couple one or more portions of the base die to one or more portions of another die (WOW-connected die) that may be a memory die or a memory/processing unit. The WOW connectivity is an extremely high throughput connectivity.

The stack of high bandwidth memory (HBM) chips may be coupled to the base die (directly or through a WOW-connected die) and may provide a high throughput connection and very extensive memory resources.

The WOW connected-die may be coupled between the stack of HBM chips and the base die to form an HBM memory chip stack with TSV connectivity and having a WOW-connected die at its bottom.

The HBM chip stack with TSV connectivity and having a WOW-connected die at it bottom may provide a multi-layer memory hierarchy in which the WOW-connected die may be used as the lower level memory (for example a level 3 cache) that can be accessed to the base die, wherein fetch and/or pre-fetch operations from the higher level HBM memory stack fill the WOW-connected die.

The HBM memory chips may be HBM DRAM chips but any other memory technology may be used.

Using the combination of WOW connectivity and HMB chips enable to provide a multi-level memory structure that may include multiple memory layers that may provide different tradeoffs between bandwidth and memory density.

The suggested solution may serve as an additional, brand new, memory hierarchy between traditional DRAM memory/HBM to internal cache of the logic die, enabling more bandwidth and better management and reuse on DRAM side.

This may provide a new memory hierarchy on DRAM side that better manages memory reads in fast manner.

FIGS. 93A-93I illustrates hybrid integrated circuits 11011'-11019' respectively.

FIG. 93A illustrates an HBM DRAM stack with TSV connectivity and micro-bumps at lowest level (collectively denoted 11030) that includes a stack of HDM DRAM memory chips 11032 coupled to each other and to a first memory controller 11031 of a base die using TSVs (11039).

FIG. 93A also illustrates a wafer with at least memory resources and coupled using WOW technology (collectively denoted 11040) that includes a second memory controller 11022 of the base die 11019 that is coupled via one or more WOW intermediate layers (11023) to a DRAM wafer (11021). The one or more WOW intermediate layers can be made of different materials but may differ from pad connectivity and/or may differ from TSV connectivity.

Conductors 11022' pass through the one or more WOW intermediate layers are electrically couple the DRAM die to components of the base die.

The base die 11019 is coupled to an interposer 11018 that in turn is coupled to a package substrate 11017 using micro-bumps. The package substrate has at its lower surface an array of micro-bumps.

The micro-bumps may be replaced by other connectivity. The interposer 11018 and the package substrate 11017 may be replaced by other layers.

The first and/or second memory controllers (11031 and 11032 respectively) may be positioned (at least in part) outside the base die 11019—for example in the DRAM wafer, between the DRAM wafer and the base die, between the stack of HBM memory units and the base die, and the like.

The first and second memory controllers (11031 and 11032 respectively) may belong to a same controller or may belong to different controllers.

One or more of the HBM memory units may include logic as well as memory—and may be or may include a memory/processing unit.

The first and second memory controller are coupled to each other by multiple buses 11016—for conveying information between the first and second memory resources. FIG. 93A also illustrates bus 11014 from the second memory controller to components (for example—multiple processors) of the base die. FIG. 93A further illustrates bus 11015 from the first memory controller to components (for example—multiple processors—as shown in FIG. 93C) of the base die.

FIG. 93B illustrated hybrid integrated circuit 11012 that differs from hybrid integrated circuit 11011 of FIG. 93A by having a memory/processing unit 11021' instead of the DRAM die 11021.

FIG. 93C illustrated hybrid integrated circuit 11013 that differs from hybrid integrated circuit 11011 of FIG. 93A by having an HBM memory chip stack with TSV connectivity and having a WOW-connected die at its bottom (collectively denoted 11040) that includes a DRAM die 11021 between the stack of HBM memory units and the base die 11018.

The DRAM die 11021 is coupled to the first memory controller 11031 of the base die 11019 using WOW technology (see WOW intermediate layers 11023). One or more of the HBM memory dies 11032 may include logic as well as memory—and may be or may include a memory/processing unit.

The lowermost DRAM die (denoted DRAM die 11021 in FIG. 93C) may be an HBM memory die or may differ from an HBM die. The lowermost DRAM die (DRAM die 11021) may be replaced by a memory/processing unit 11021'—as illustrated by hybrid integrated circuit 11014 of FIG. 93D.

FIGS. 93E-93G illustrate hybrid integrated circuits 11015, 11016 and 11016' respectively in which base die 11019 is be coupled to multiple instances of HBM DRAM stack with TSV connectivity and microbumps (11020) at lowest level and wafer with at least memory resources and coupled using WOW technology (11030), and/or to multiple instances of HBM memory chip stack with TSV connectivity and having a WOW-connected die at its bottom (11040).

FIG. 93H illustrates hybrid integrated circuit 11014' that differs from hybrid integrated circuit 11014 of FIG. 93D by illustrating a memory unit 53, a level two cache memory (L2 cache 52), multiple processors 11051. Multiple processors 11051 is coupled to the L2 cache 11052 and can be fed by coefficients and/or data stored in memory unit 11053 and L2 cache 11052.

Any of the mentioned above hybrid integrated circuits may be used for Artificial Intelligence (AI) processing—which are bandwidth intensive.

A memory/processing unit 11021' of FIGS. 93D and 93H, when coupled to a memory controller using WOW-technology may perform AI calculations and may receive both data and coefficients at a very high rate from the HBM DRAM stack and/or from the WOW-connected die.

Any memory/processing unit may include a distributed memory array and processor array. The distributed memory and processor arrays may include multiple memory banks and multiple processors. The multiple processor may form a processing army.

Referring to FIGS. 93C, 93D and 93H, and assuming that the hybrid integrated circuits (11013, 11014 or 11014') are required to execute general matrix-vector multiplications (GEMV) that includes calculating a multiplication of a matrix by a vector. This type of calculation is bandwidth intensive because there is no re-use of retrieved matrix data. Thus the entire matrix needs to be retrieved and used only once.

GEMV may be a part of a sequence of mathematical operations that involves (i) multiplying a first matrix (A) by a first vector (V1) to provide a first intermediate vector, applying a first non-liner operation (NLO1) on the first intermediate vector to provide a first intermediate result, (ii) multiplying a second matrix (B) by the first intermediate result to provide a second intermediate vector, applying a second non-liner operation (NLO2) on the second intermediate vector to provide a second intermediate result, and so on (till receiving an N'th intermediate result, N may exceed 2).

Assuming that each matrix is large (for example 1 Gb), that the calculation will requite 1 Tbs computational power and a bandwidth/throughput of 1 Tbs. The computation and the calculations may be executed in parallel.

Assuming that the GEMV calculation exhibits N=4 and has the following form: Result=NLO4(D*(NLO3(C*(NLO2(B*(NLO1(A*V1))))))).

Also assuming that DRAM die 11021 (or memory/processing unit 11021') do not have enough memory resources to store A, B, C and D at the same time—then at least some of these matrixes will be stored in the HDM DRAM dies 11032.

It is assumed that the base die is a logic dies that include calculation units such as but not limited to processors, arithmetic logic units, and the like.

While the first die calculates A*V1, the first memory controller 11031 retrieves from the one or mom HBM DRAM dies 11032 the missing parts of the other matrixes for the next calculations.

Referring to FIG. 93H—and assuming that (a) DRAM die 11021 has bandwidth of 2 TBs and capacity of 512 Mb, (b) HBM DRAM die 11032 has 0.2 TBs bandwidth and capacity of 8 Gb, and (c) the L2 cache 11052 is SRAM that has a bandwidth of 6 Ts and capacity of 10 Mb.

Multiplication of matrixes involve re-using data—segmenting large matrixes to segments (for example 5 Mb segments—to fit the L2 cache—that may be used at a double buffer configuration) and multiplying a fetches first matrix segment by segments of a second matrix—one second matrix segment after the other.

While a first matrix segments is multiplied by a second matrix segment—another second matrix segment is fetched from the DRAM die 11021 (of memory processing unit 11021') to the L2 cache.

Assuming that the matrixes are 1 Gb each—while the fetching and calculation are executed—the DRAM die 11021 or the memory/processing unit 11021' are fed by matrix segments from the HBM DRAM dies 11032.

The DRAM die 11021 or the memory/processing unit 11021' aggregate matrix segments and the matrix segments are then fed over the WOW intermediate layers (11023) to the base die 11019.

The memory/processing unit 11021' may reduce the amount of information sent through the WOW intermediate layers (11023) to the base die 11019—by performing calculations and sending results—instead of sending the intermediate values that are calculated to provide the results. When multiple (Q) intermediate values are processed to provide a result—then the compression ratio can be Q to 1.

FIG. 93I illustrates an example of a memory processing unit 11019' that is implemented using WOW technology. Logic units 9030 (may be processor sub-units), a controller 9020 and a bus 9021 are located in one chip 111061, the memory banks 9040 allocated to the different logic units are located in a second chip 11062, whereas the first and second chips are connected to each other using conductors 11012' that pass through a WOW bonding 11061—that may include one or more WOW intermediate layers.

FIG. 93J is an example of a method 11100 for memory intense processing. The memory intense means that the processing requires or is associated with high bandwidth memory consumption.

Method 110 may start by steps 11110, 11120 and 11130.

Step 11110 includes performing processing operations by multiple processors a hybrid device that comprises a base die, first memory resources of at least one other die, and second memory resources of at least one further dies; wherein the base die and the at least one other die are connected to each other by wafer on wafer bonding.

Step 11120 includes retrieving, by the multiple processors, retrieved information stored in the first memory resources.

Step 11130 may include sending additional information from the second memory resources to the first memory resources, wherein an overall bandwidth of first paths between the base die and the at least one other die exceed an overall bandwidth of second paths between the at least one other die and the at least one further die, and wherein a storage capacity of the first memory resources is a fraction of a storage capacity of the second memory resource.

Method 11100 may also include step 11140 of performing additional processing by an other die that includes a plurality of processor sub-units and the first memory resources.

Each processor sub-unit may be coupled to a unique portion of the first memory resources allocated to the processor sub-unit.

The unique portion of the first memory resources is at least one memory bank.

Steps 11110, 11120, 11130 and 11140 may be executed concurrently, in a partly overlapping manner, and the like.

The second memory resources may be high bandwidth memory (HBM) memory resources or may differ from HBM memory resources.

The at least one further dies are a stack of high bandwidth memory (HBM) memory chips.

Communication Chip

Databases include many entries that include multiple fields. Database processing usually included executing one or more queries that include one or more filtering parameter (for example identity one or more relevant fields and one or more relevant field values) and also include one or more operation parameters that may determine a type of operation to be executed, a variable or constant to be used when applying the operation, and the like. The data processing may include database analytics or other database processes.

For example—a database query may request to perform a statistical operation (operational parameter) on all records of the database in which a certain field has a value within a predefined range (filtering parameter). Yet for another example—a database query may request to delete (operation parameter) records that have a certain field that is smaller than a threshold (filtering parameter).

A large database is usually stored in storage devices. In order to respond to a query, the database is sent to a memory unit—usually one database segment after the other.

The entries of the database segments are sent from the memory unit to a processor that does not belong to the same integrated circuit as the memory unit. The entries are then processed by the processor.

For each database segment of the database stored in the memory unit the processing includes the following steps: (i) selecting a record of the database segment, (ii) sending the record to the processor from the memory unit, (iii) filtering the record by the processor to determine whether the record is relevant, and (iv) performing one or more additional operations (summing, applying any other mathematical and/or statistical operation) on the relevant records.

The filtering process ends after all the records were sent to the processor and the processor determined which records were relevant.

In case where the relevant entries of a database segment are not stored in the processor—then there is a need to send these relevant records to the processor to be further processed (applying the operation that follows the processing) after the filtering stage.

When multiple processing operations follow a single filtering then the results of each operation may be sent to the memory unit and then sent again to the processor.

This process is bandwidth and time consuming.

There is a growing need to provide an efficient manner to perform database processing.

There may be provided a device that may include a database acceleration integrated circuit.

There may be provided a device that may include one or more groups of database acceleration integrated circuits that may be configured to exchange information and/or accelerated results (outcome of processing done by a database acceleration integrated circuit) between database acceleration integrated circuits of the one or more groups of database acceleration integrated circuits.

The database acceleration integrated circuits of a group may be connected to same printed circuit board.

The database acceleration integrated circuits of a group may belong to a modular unit of a computerized system.

The database acceleration integrated circuits of different groups may be connected to different printed circuit boards.

The database acceleration integrated circuits of different groups may belong to different modular units of a computerized system.

The device may be configured to execute distributed process by the database acceleration integrated circuits of the one or more groups.

The device may be configured to use at least one switch for exchanging, at least one out (a) information and (b) database accelerated results between database acceleration integrated circuits of different groups of the one or more groups.

The device may be configured to execute distributed process by some of the database acceleration integrated circuits of some of the one or more groups.

The device may be configured to perform a distributed process of a first and second data structures, wherein an aggregate size of the first and second data structures exceeds a storage capability of the multiple memory processing integrated circuits.

The device may be configured to perform the distributed process by performing multiple iterations of (a) performing a new allocation of different pairs a first data structure portion and a second data structure portion to different database acceleration integrated circuits, and (b) processing the different pairs.

FIGS. 94A and 9B illustrate examples of a storage system 11560, a computer system 11150 and one or more devices for database acceleration 11520. The one or more devices for database acceleration 11520 may monitor the communication between storage system 11560 and the computer system 11150 in various manner—either by sniffing or by being positioned between the computer system 11150 and the storage system 11560.

The storage system 11560 may include many (for example—more than 20, 50, 100, 100 and the like) storage units (such as disks or raids of disks) and may, for example, store more than 100 Tbytes of information. The compute system 11510 may be a vast computer system and may include tens, hundreds and even thousands of processing units.

The compute system 11510 may include multiple compute nodes 11512 that are controlled by a manager 11511.

The compute nodes may control or otherwise interact with the one or more devices for database acceleration 11520.

The one or more devices for database acceleration 11520 may include one or more database acceleration integrated circuits (see for example database acceleration integrated circuit 11530 of FIGS. 94A and 94B), and memory resources 11550. The memory resources may belong to one or more chips dedicated for memory but may belong to memory/processing units.

FIGS. 94C and 94D illustrate examples of a computer system 11150 and one or more devices for database acceleration 11520.

One or more database acceleration integrated circuits of the one or more devices for database acceleration 11520 may be controlled by a management unit 11513 that may be located within the computer system (see FIG. 94C) or within the one or more devices for database acceleration 11520 (FIG. 94D).

FIG. 94E illustrated a device for database acceleration 11520 that includes a database acceleration integrated circuit 11530 and multiple memory processing integrated circuits 1151. Each memory processing integrated circuit may include a controller, multiple processor subunits, and multiple memory units.

The database acceleration integrated circuit 11530 is illustrated as including network communication interface 11531, first processing units 11532, memory controllers 11533, database acceleration unit 11535, interconnect 11536, and management unit 11513.

The network communication interface (11531) may be configured to receive (for example via first ports of network communication interface 11531(1)) a vast amount of information from a large number of storage units. Each storage unit may output information at rate that exceeds tens and even hundreds of megabyte per second, while the data transfer rate is expected to increase over time (for example double each 2-3 years). The number of storage data units (large number) may exceed 10, 50, 100, 200 and even more. The vast amount of information may exceed tens, hundreds of Gigabytes per second, and even may be in the range of terabytes per second and petabytes per second.

The first processing units 11532 may be configured to first process (pre-process) the vast amount of information to provide first processed information.

The memory controllers 11533 may be configured to send over a vast throughput interface 11534, the first processed information to the multiple memory processing integrated circuits.

The multiple memory processing integrated circuits 11551 may be configured to second process (process) at least parts of the first processed information by the multiple memory processing integrated circuits to provide second processed information.

The memory controllers 11533 may be configured to retrieve retrieved information from the multiple memory processing integrated circuits. The retrieved information may include at least one out of (a) at least one portion of the first processed information, and (b) at least one portion of the second processed information.

The database acceleration unit 11535 may be configured to perform database process operations on the retrieved information, to provide database accelerated results.

The database acceleration integrated circuit may be configured to output the database accelerated results—for example through one or more second ports 11531(2) of the network communication interface.

FIG. 94E also illustrates a management unit 11513 that is configured to manage at least one of a retrieval of the retrieved information, a first process (pre-process), the second process (process) and the third process (database processing). The management unit 11513 may be located outside the database acceleration integrated circuit.

The management unit may be configured to perform said management based on an execution plan. The execution plan may be generated by the management unit or may be generated by an entity located outside the database acceleration integrated circuit. The execution plan may include at least one out of (a) instructions to be executed by the various components of the database acceleration integrated circuit, (b) data and/or coefficients required for the implementation of the execution plan, (c) memory allocation of instructions and/or data.

The management unit may be configured to perform the management by allocating at least some out of (a) network communication network interface resources, (b) decompression unit resources, (c) memory controllers resources, (d) multiple memory processing integrated circuits resources, and (c) database acceleration units resources.

As illustrated in FIGS. 94E and 94G, the network communication network interface may include different types of network communication ports.

The different types of network communication ports may include storage interface protocol ports (for example SATA ports, ATA ports, ISCSI ports, network file system, fiber channel ports) and storage interface over general network protocol ports (for example ATA over Ethernet, fiber channel over Ethernet, NVME, Roce, and more).

The different types of network communication ports may include storage interface protocol ports and PCIe ports.

FIG. 94F includes dashed lines that illustrate the flow of the vast information, first processed information, retrieved information and database accelerated results. FIG. 94F illustrates the database acceleration integrated circuit 11530 as being coupled to multiple memory resources 11550. The multiple memory resources 11550 may not belong to a memory processing integrated circuit.

The device for database acceleration 11520 may be configured to execute multiple tasks concurrently by the database acceleration integrated circuit 11530—as the network communication interface 11531 may receive multiple streams of information (concurrently), first processing units 11532 may perform first processing on multiple information units concurrently, the memory controllers 11533 may send multiple first processed information units concurrently to the multiple memory processing integrated circuits 11551, the database acceleration unit 11535 may process multiple retrieved information units concurrently.

The device for database acceleration 11520 may be configured to execute at least one out of the retrieve, first process, send and third process, based on an execution plan sent to the database acceleration integrated circuit by a compute node of a vast compute system.

The device for database acceleration 11520 may be configured to manage at least one of the retrieve, first process, send and third process in a manner that substantially optimizes the utilization of the database acceleration integrated circuit. The optimization considers the latency, throughput and any other timing or storage or processing consideration and attempts to keep all components along the flow path busy and without bottlenecks.

The database acceleration integrated circuit may be configured to output the database accelerated results—for example through one or more second ports 11531(2) of the network communication interface.

The device for database acceleration 11520 may be configured to substantially optimize a bandwidth of traffic exchanged by the network communication network interface.

The device for database acceleration 11520 may be configured to substantially prevent a formation of bottlenecks in at least one of the retrieve, first process, send and third process in a manner that substantially optimizes the utilization of the database acceleration integrated circuit.

The device for database acceleration 11520 may be configured to allocate resources of the database acceleration integrated circuit according to temporal I/O bandwidth.

FIG. 94G illustrated a device for database acceleration 11520 that includes a database acceleration integrated circuit 11530 and multiple memory processing integrated circuits 1151. FIG. 94G also illustrates various units that are coupled to the database acceleration integrated circuit 11530-remote RAM 11546, Ethernet memory DIMMs 11547, storage system 11560, local storage unit 11561, and nonvolatile memory (NVM) 11563 (the nonvolatile memory may be an NVM express unit—NVME).

The database acceleration integrated circuit 11530 is illustrated as including Ethernet ports 11531(1), RDMA unit 11545, serial scale up port 11531(15), SATA controller 11540, PCIe port 11531(9), first processing units 11532, memory controllers 11533, database acceleration unit 11535, interconnect 11536, management unit 11513, cryptographic engine 11537 for executing cryptographic operations, and level two static random access memory (L2 SRAM) 11538.

The database acceleration unit is illustrated as including a DMA engine 11549, a level three L3 memory 11548, and database acceleration subunits 11547. The database acceleration subunits 11547 may be configurable units.

The Ethernet ports 11531(1), RDMA unit 11545, serial scale up port 11531(15), SAT controller 11540, PCIe port 11531(9) may be regarded as parts of network communication interface 11531.

The remote RAM 11546, Ethernet memory DIMMs 11547, storage system 11560 are coupled to Ethernet ports 11531(1) that in turn is coupled to RDMA unit 11545.

The local storage unit 11561 is coupled to the SATA controller 11540.

The PCIe port 11531(9) is coupled to NVM 11563. The PCIe port may also be used for exchanging commands—for example for management purposes.

FIG. 94H is an example of a database acceleration unit 11535.

The database acceleration unit 11535 may be configured to perform concurrently database process instructions by database processing subunits 11573, wherein the data base acceleration unit may include a group of database accelerator subunits that share a shared memory unit 11575.

Different combinations of database acceleration subunit 11535 may be dynamically linked to each other (via configurable links or interconnects 11576) to provide execution pipelines required for execute a database process operation that may include multiple instructions.

Each database process subunit may be configured to execute a specific type of database process instructions (for example—filter, merge, accumulate, and the like).

FIG. 94H also illustrates independent data base processing units 11572 coupled to caches 11571. The data base processing units 11572 and the caches 11571 may be provided instead of the Reconfigurable array of DB accelerators 11574 or in addition to the Reconfigurable array of DB accelerators 11574.

The device may facilitate scale-in and/or scale-out—therefor enable multiple database acceleration integrated circuit 11530 (and their associated memory resources 11550 or their associated multiple memory processing integrated circuits 11551) to co-operate with each other—for example by participating in distributed processing of database operations.

FIG. 94I illustrates a modular unit such as blade 11580 that includes two database acceleration integrated circuits 11530 (and their associated memory resources 11550). The blade may include one, two, or more than two memory processing integrated circuits 11551 and their associated memory resources 11550.

The blade may also include one or more nonvolatile memory unit, an Ethernet switch, a PCIe switch and an ethernet switch.

Multiple blades may communicate with each other using any communication method, communication protocol and connectivity.

FIG. 94I illustrates four database acceleration integrated circuit 11530 (and their associated memory resources 11550) that are fully connected to each other—each database acceleration integrated circuit 11530 is connected to all three other database acceleration integrated circuits 11530. The connectivity may be achieved using any communication protocol—for example by using RDMA over Ethernet protocol.

FIG. 94I also illustrates a database acceleration integrated circuit 11530 that is connected to its associated memory resources 11550 and to unit 11531 that includes RAM memory and an Ethernet port.

FIGS. 94J, 94K, 94L and 94M illustrate four groups 11580 of database acceleration integrated circuits, each group including four database acceleration integrated circuits 11530 (that are fully connected to each other) and their associated memory resources 11550. The different groups are connected to each other via switch 11590.

The number of groups may be two, three or more than four. The number of database acceleration integrated circuits per group may be two, three or more than four. The number of groups may be the same as (or may differ from) the number of database acceleration integrated circuits per group.

FIG. 94K illustrates two tables A and B that are too big (for example 1 Tbyte) for being efficiently joined at once.

The tables are virtually segmented to patches and the join operation is applied on pairs that include a patches of table A and a patch of table B.

The groups of database acceleration integrated circuits may process the patches in various manner.

For example, the device may be configured to perform the distributed process by:

g. Allocating different first data structure portions (patches of table A—for example first till sixteenth patches A0-A15) to different database acceleration integrated circuits of the one or more groups.
h. Perform multiple iterations of: (i) newly allocating different second data structure portions (patches of table B—for example first till sixteenth patches B0-B15) to different database acceleration integrated circuits of the one or more groups, and (ii) processing by the database acceleration integrated circuits the first and second data structure portions.

The device may be configured to execute the newly allocating of a next iteration in an at least partially time overlapping manner with a processing of a current iteration.

The device may be configured to execute the newly allocating by exchanging second data structure portions between the different database acceleration integrated circuits.

The exchanging may be executed in an at least partially time overlapping manner with the process.

The device may be configured to execute the newly allocating by exchanging second data structure portions between the different database acceleration integrated circuits of a group; and once the exchanging has been exhausted—exchanging second data structure portions between different groups of database acceleration integrated circuits.

In FIG. 94K four cycles of some of joint operations are shown—for example—referring to the upper left database acceleration integrated circuit 11530 of the upper left group—the four cycles include calculating Join(A0, B0), Join(A0, B3), Join(A0, B2), and Join(A0, B1). During these four cycles A0 stays at the same database acceleration integrated circuit 11530 while patches of matrix B (B0, B1, B2 and B3) are rotated between members of the same group of database acceleration integrated circuits 11530.

In FIG. 94L the patches of the second matrix are rotated between the different group—(a) patches B0, B1, B2 and B3 (previously processed by the upper left group) are sent from the upper left group to the lower left group, (b) patches B4, B5, B6 and B7 (previously processed by the lower left group) are send from the lower left group to the upper right group, (c) patches B8, B9, B10 and B11 (previously processed by the upper right group) are send from the upper right group to the lower right group, and (d) patches B12, B13, B14 and B15 (previously processed by the lower right group) are send from the lower right group to the upper left group.

FIG. 94N is an example of a system that includes multiple blades 11580, SATA controller 11540, local storage unit 11561, NVME 11563, PCIe switch 11601, Ethernet memory DIMMs 11547, and Ethernet ports 11531(4).

The blades 11580 may be coupled to each one of PCIE switch 11601, Ethernet ports 11531 and SATA controller 11540.

FIG. 94O illustrates two systems 11621 and 11622.

System 11621 may include one or more devices for data base acceleration 11520, a switching system 11611, storage system 11612 and compute system 11613. The switching system 11611 provides connectivity between the one or more devices for data base acceleration 11520, the storage system 11612 and the compute system 11613.

System 11622 may include storage system and one or more devices for data base acceleration 11615, a switching system 11611, and compute system 11613. The switching system 11611 provides connectivity between the storage system and one or more devices for data base acceleration 11615 and the compute system 11613.

FIG. 95A illustrates a method 11200 for database acceleration.

Method 11200 may start by step 11210 of retrieving, by a network communication network interface of a database acceleration integrated circuit, a vast amount of information from a large number of storage units.

The connection to a large number of storage units (for example using multiple different buses) enables the network communication network interface to receive the vast amount of information—even when a single storage unit has a limited throughput.

Step 11210 may be followed by first processing the vast amount of information to provide first processed information. The first processing may include buffering, extraction of information from payloads, removing headers, decompressing, compressing, decrypting, filtering database queries, or performing any other processing operations. The first processing may also be limited to buffering.

Step 11210 may be followed by step 11220 of sending, by memory controllers of the database acceleration integrated circuit and over a vast throughput interface, the first processed information to multiple memory processing integrated circuits, wherein each memory processing integrated circuit may include a controller, multiple processor subunits, and multiple memory units. The memory processing integrated circuits may be memory/processing units or distributed processor or memory chips as illustrated in any other part of this patent application.

Step 11220 may be followed by step 11230 of second processing at least pans of the first processed information by the multiple memory processing integrated circuits to provide second processed information.

Step 11230 may include executing multiple tasks concurrently by the database acceleration integrated circuit.

Step 11230 may include performing concurrently database processing instructions by database processing subunits, wherein the data base acceleration unit may include a group of database accelerator subunits that share a shared memory unit.

Step 11230 may be followed by step 11240 of retrieving retrieved information from the multiple memory processing integrated circuits, by the memory controllers of the database acceleration integrated circuit, wherein the retrieved information may include at least one out of (a) at least one portion of the first processed information, and (b) at least one portion of the second processed information.

Step 11240 may be followed by step 11250 of performing, by a database acceleration unit of the database acceleration integrated circuit, database processing operations on the retrieved information, to provide database accelerated results.

Step 11250 may include allocating resources of the database acceleration integrated circuit according to temporal I/O bandwidth.

Step 11250 may be followed by step 11260 of outputting the database accelerated results.

Step 11260 may include dynamically linking database processing subunits to provide execution pipelines required for executing a database processing operation that may include multiple instructions.

Step 11260 may include outputting the database accelerated results to a local storage and retrieving the database accelerated results from the local storage.

It should be noted that steps 11210, 11220, 11230, 11240, 11250 and 11260 or any other step of method 11100 may be executed in a pipelined manner. These steps may be executed concurrently, or in an order that differs from the order mentioned above.

For example—step 1120 may be followed by step 11250—so that first processed information is further processed by the database acceleration unit.

Yet for another example—first processed information may be sent to the multiple memory processing integrated circuits and then sent (without being processed by the multiple memory processing integrated circuits) to the database acceleration unit.

Yet for a further example—first processed information and/or second processed information may be outputted from the database acceleration integrated circuit—without being database processed by the database acceleration unit.

The method may include executing at least one out of the retrieving, first processing, sending and third processing based on an execution plan sent to the database acceleration integrated circuit by a compute node of a vast compute system.

The method may include managing at least one of the retrieving, first processing sending and third processing in a manner that substantially optimizes the utilization of the database acceleration integrated circuit.

The method may include substantially optimizing a bandwidth of traffic exchanged by the network communication network interface.

The method may include substantially preventing a formation of bottlenecks in at least one of the retrieving, first processing sending and third processing in a manner that substantially optimizes the utilization of the database acceleration integrated circuit.

Method 11200 may also include at least one of the following steps:

Step 11270 may include managing, by a management unit of the database acceleration integrated circuit, at least one of the retrieving, first processing sending and third processing.

The managing may be executed based on an execution plan generated by the management unit of the database acceleration integrated circuit.

The managing may be executed based on an execution plan received by not generated by the management unit of the database acceleration integrated circuit.

The managing may include allocating at least some out of (a) network communication network interface resources, (b)

decompression unit resources, (c) memory controllers resources, (d) multiple memory processing integrated circuits resources, and (e) database acceleration units resources.

Step 11271 may include controlling at least one of the at least one of the retrieving, first processing sending and third processing by a compute node of a vast compute system.

Step 11272 may include managing, by a management unit located outside the database acceleration integrated circuit, at least one of the retrieving, first processing sending and third processing.

FIG. 95B illustrates method 11300 for operating a group of database acceleration integrated circuits.

Method 11300 may start by step 11310 of performing database acceleration operations by database acceleration integrated circuits. Step 11310 may include executing one or more steps of method 11200.

Method 11300 may also include step 11320 of exchanging at least one out (a) information and (b) database accelerated results between database acceleration integrated circuits of one or more groups of database acceleration integrated circuits.

The combination of steps 11310 and 11320 may amount to executing distributed processing by the database acceleration integrated circuits of the one or more groups.

The exchanging may be executed using network communication network interfaces of the database acceleration integrated circuits of one or more groups.

The exchanging may be executed over multiple groups that may be connected to each other by a star-connection.

Step 11320 may include using at least one switch for exchanging, at least one out (a) information and (b) database accelerated results between database acceleration integrated circuits of different groups of the one or more groups.

Step 11310 may include step 11311 of executing distributed processing by some of the database acceleration integrated circuits of some of the one or more groups.

Step 11311 may include performing a distributed processing of a first and second data structures, wherein an aggregate size of the rust and second data structures exceeds a storage capability of the multiple memory processing integrated circuits.

The performing of the distributed processing may include performing multiple iterations of (a) performing a new allocation of different pairs a first data structure portion and a second data structure portion to different database acceleration integrated circuits, and (b) processing the different pairs.

The performing of the distributed processing may include executing a database join operation.

Step 11310 may include (a) step 11312 of allocating different first data structure portions to different database acceleration integrated circuits of the one or more groups; and (b) performing multiple iterations of: step 11314 of newly allocating different second data structure portions to different database acceleration integrated circuits of the one or more groups, and step 11316 of processing by the database acceleration integrated circuits the first and second data structure portions.

Step 11314 may be executed in an at least partially time overlapping manner with the processing of current iteration.

Step 11314 may include exchanging second data structure portions between the different database acceleration integrated circuits.

Step 11320 may be executed in an at least partially time overlapping manner with step 11310.

Step 11314 may include exchanging second data structure portions between the different database acceleration integrated circuits of a group; and once the exchanging has been exhausted—exchanging second data structure portions between different groups of database acceleration integrated circuits.

FIG. 95C illustrates method 11350 for database acceleration.

Method 11350 may include step 11352 of retrieving, by a network communication network interface of a database acceleration integrated circuit, a vast amount of information from a large number of storage units.

Step 11352 may be followed by step 11354 of first processing the vast amount of information to provide first processed information.

Step 11352 may be followed by step 11354 of sending, by memory controllers of the database acceleration integrated circuit and over a vast throughput interface, the first processed information to multiple memory resources.

Step 11354 may be followed by step 11356 of retrieving retrieved information from the multiple memory resources.

Step 11356 may be followed by step 11358 of performing, by a database acceleration unit of the database acceleration integrated circuit, database processing operations on the retrieved information, to provide database accelerated results.

Step 11358 may be followed by step 11359 of outputting the database accelerated results.

The method may also include step 11355 of second processing the first processed information to provide second processed information. The second processing is executed by multiple processors located in one or more memory processing integrated circuits that further comprise the multiple memory resources. Step 11355 follows step 11354 and precedes step 11356.

The aggregate size of the second processed information may be smaller than an aggregate size of the first processed information.

The aggregate size of the first processed information may be smaller than an aggregate size of the vast amount of information.

The first processing may include filtering database entries. Thus—filtering out database entries that are not relevant to a query—thereby saving bandwidth, storage resources and further processing resources before performing any further processing and/or even before storing the irrelevant database entries in the multiple memory resources.

The second processing may include filtering database entries. The filtering may be applied when a filtering condition may be complex (includes multiple conditions) and may require receiving multiple data base entry fields before the filtering can be done. For example—when searching for (a) persons that are above a certain age and like bananas and (b) persons that are above another age and like apples.

Database

The following examples may refer to a data base. The database may be a data center, may be a part of a data center, or may not belong to a data center.

The database may we coupled over one or more networks to multiple users. The database may be a cloud database.

There may be provided a database that include one or more management units and multiple database accelerator boards that include one or more memory/processing units.

FIG. 96B illustrates database 12020 that includes a management unit 12021 and multiple DB accelerator boards 12022—each including a communication/management processor (processor 12024) and multiple memory/processing units 12026.

The processor 12024 may support various communication protocols—such as but not limited PCIe. ROCE like protocols, and the like.

The database commands may be executed by the memory/processing units 12026 and the processor may rout traffic between the memory/processing units 12026, between different DB accelerator boards 12022 and with the management unit 12021.

Using the multiple memory/processing units 12026 especially when including large internal memory banks dramatically accelerates the execution of data base commands and avoids communication bottlenecks.

FIG. 96C illustrates a DB accelerator board 12022—that includes processor 12024 and multiple memory/processing units 12026. The processor 12024 includes multiple communication dedicated components such as DDR controllers 12033 for communicating with the memory/processing units 12026, RDMA engines 12031, DB query database engines 12034 and the like. DDR controllers are examples of communication controllers and R DMA engines are examples of any communication engines.

There may be provided a method for operating the system (or of operating any part of the system) of any one of FIGS. 96B, 96C and 96D.

It should noted that the database acceleration integrated circuit 11530 may be associated with multiple memory resources that are not included in multiple memory processing integrated circuits—or otherwise not associated with processing units. In this case the processing is executed mainly and even solely by the database acceleration integrated circuit.

FIG. 94P illustrates method 11700 for database acceleration.

Method 11700 may include step 11710 of retrieving, by a network communication interface of a database acceleration integrated circuit, information from storage units.

Step 11710 may be followed by step 11720 of first processing the amount of information to provide first processed information.

Step 11720 may be followed by step 11730 of sending, by memory controllers of the database acceleration integrated circuit and over a throughput interface, the first processed information to multiple memory resources.

Step 11730 may be followed by step 11740 of retrieving information from the multiple memory resources.

Step 11740 may be followed by step 11750 of performing, by a database acceleration unit of the database acceleration integrated circuit, database processing operations on the retrieved information, to provide database accelerated results.

Step 11750 may be followed by step 11760 of outputting the database accelerated results.

The first processing and/or the second processing may include filtering database entries—determining which database entries should be further processed.

The second processing comprises filtering database entries.

Hybrid System

A memory/processing unit may be highly effective when executing calculations that may be memory intensive and/or in which the bottleneck is related to retrieval operations. Processing oriented (and less memory oriented) processor units (such as but not limited graphic processing units, central processing units) may be more effective when the bottleneck is related to computing operations.

A hybrid system may include both one or more processor units and one or more memory/processing units that may be fully or partially connected to each other.

A memory/processing unit (MPU) may be manufactured by a first manufacturing process that better fits memory cells than logic cells. For example—the memory cells manufactured by the first manufacturing process may exhibit a critical dimension that is smaller, and even much smaller (for example by a factor that exceeds 2, 3, 4, 5, 6, 7, 8, 9, 10, and the like) than the critical dimension of a logic circuit manufactured by the first manufacturing process. For example—the first manufacturing process may be an analog manufacturing process, the first manufacturing process may be a DRAM manufacturing process, and the like.

The processor may be manufactured by a second manufacturing process that better fits logic. For example—the critical dimension of a logic circuit manufactured by the second manufacturing process may be smaller and even much smaller than the critical dimension of a logic circuit manufactured by the first manufacturing process. Yet for another example—the critical dimension of a logic circuit manufactured by the second manufacturing process may be smaller and even much smaller than the critical dimension of a memory cells manufactured by the first manufacturing process. For example—the second manufacturing process may be a digital manufacturing process, the second manufacturing process may be a CMOS manufacturing process, and the like.

Tasks may be allocated between the different units in a static or dynamic manner—by taking into account the benefits of each unit and any penalty related to transfer of data between the units.

For example—a memory intensive process may be allocated to a memory/processing unit while a processing intensive memory light process may be allocated to the processing units.

The processor may request or instruct the one or more memory/processing units to perform various processing tasks. The execution of the various processing tasks may offload the processor, reduce the latency, and in some cases reduce the overall bandwidth of information between the one or more memory/processing units and the processor, and the like.

The processor may provide instructions and/or requests at different granularity—for example the processor may send instructions aimed to certain processing resources or may send higher level instructions aimed to the memory/processing unit without specifying any processing resources.

FIG. 96D is an example of a hybrid system 12040 that includes one or more memory/processing unit (MPUs) 12043 and processor 12042. Processor 12042 may send requests or instructions to the one or more MPUs 12043 that in turn fulfill (or selectively fulfill) the requests and/or the instructions and send results to the processor 12042, as illustrated above.

The processor 12042 may further process the results to provide one or more outputs.

Each MPU includes memory resources, processing resources (such as compact microcontrollers 12044), and cache memories 12049. The microcontrollers may have limited computational capabilities (for example may include mainly a multiply accumulate unit).

The microcontrollers 12044 may apply a process for in-memory acceleration purposes, can also be a CPU or a full DB processing engine or a subset of them.

MPU 12043 may include microprocessors and Packet processing units that may be connected in a mesh/ring/or other topology for fast inter-bank communication.

More than one DDR controller can be present for fast inter DIMM communication.

Goal of in-memory packet processors is to reduce BW, data movement, power consumption and increase performance. Using them will yield a dramatic increase in Perf/TCO over standard solutions.

It should be noted that the management unit is optional.

Each MPU may operate as an Artificial intelligence (AI) memory/processing unit—as it may perform AI calculations and return only the results to the processor—thereby reducing the amount of traffic—especially when the MPU receives and stores neural network coefficients to be used in multiple calculations- and does not need to receive from an outside chip the coefficients each time a portion of a neural network is used to processed new data.

The MPU may determine when a coefficient is zero and inform the processor that there is no need to perform a multiplication that includes the zero value coefficient.

It should be noted that the first processing and the second processing may include filtering database entries.

The MPU may be any memory processing unit illustrated in this specification, in any one of PCT patent applications WO2019025862 and PCT patent application serial number PCT/IB2019/001005.

There may be provided an AI computing system (and a system executable by the system) in which a the network interface card has AI processing capabilities and is configured to perform some AT processing tasks in order to reduce the amount of traffic to be sent over a network that couples multiple AI acceleration servers.

For example—in some inference systems, the input is the network (e.g multiple streams of IP cameras connected to an AI server). In such cases, leveraging RDMA+AI on processing and networking unit can reduce the load of the CPU and PCIe bus and provide processing on the processing and networking units instead by a GPU not included in a processing and networking unit.

For example—instead of calculating initial results and sending the initial results to a target AI acceleration server (that applies one or more AI processing operations)—the processing and networking units may perform pre-processing that reduces the amount of values sent to the target AI acceleration server. The target AI computing server is an AI computing server allocated to perform calculations on values provided by other AI acceleration servers. This reduces the bandwidth of traffic exchanged between the AI acceleration servers and also reduces the load of the target AI acceleration server.

The target AI acceleration server may be allocated in dynamic or static manner, by using load balancing or other allocation algorithm. There may be more than a single target AI acceleration server.

For example—if the target AI acceleration server adds multiple losses—the processing and networking units may add losses generated by their AI acceleration server and send sums of losses to the target AI acceleration server—thereby reducing bandwidth. The same benefit may be gained when performing other pre-processing operations such as derivative calculation and aggregation, and the like.

FIG. 97B illustrates a system 12060 that include subsystems, each sub-system includes a switch 12061 for connecting AI processing and networking units 12063 having server motherboards 12064 to each other. The server motherboards include one or more AI processing and networking units 12063 that have network capabilities and has AI processing capabilities. The AI processing and networking unit 12063 may include one or more NICs, and ALU; or other calculation circuits for performing the pre-processing.

An AI processing and networking unit 12063 may be a chip, or may include more than a single chip. It may be beneficial to have an AI processing and networking unit 12063 that is a single chip.

The AI processing and networking unit 12063 may include (solely or mainly) processing resources. The AI processing and networking unit 12063 may include in-memory computing circuits or may not include in-memory computing circuits or may not include significant in-memory computing circuits.

The AI processing and networking unit 12063 may be an integrated circuit, may include more than a single integrated circuit, may be a part of an integrated circuit, and the like.

The AI processing and networking unit 12063 may convey (see, for example, FIG. 97C) traffic (for example by using communication ports such as DDR channels, network channels and/or PCIe channels, between the AI acceleration server that include the AI processing and networking unit 12063 and other AI acceleration servers. The AI processing and networking unit 12063 may also be coupled to external memories such as DDR memories. The processing and networking unit may include memories and/or may include memory/processing units.

In FIG. 97C the AI processing and networking unit 12063 is illustrating as including local DDR connections, DDR channels, AI accelerators, RAM memory, encryption/decryption engines, PCIe switches, PCIe interfaces, multiple core processing array, fast networking connections, and the like.

There may be provided a method for operating the system (or of operating any part of the system) of any one of FIGS. 97B and 97C.

Any combination of any steps of any method mentioned in this application may be provided.

Any combination of any unit, integrated circuit, memory resources, logic, processing subunits, controller, components mentioned in this application may be provided.

Any reference to "including" and/or "comprising" may be applied, mutatis mutandis to "consisting" "substantially consisting".

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A memory unit comprising:

one or more memory banks;

a bank controller;

a plurality of address generators, the plurality of address generators including at least a first address generator and a second address generator;

wherein at least one of the plurality of address generators is configured to:

provide to the bank controller a current address of a current row to be accessed in an associated memory bank of the one or more memory banks, the current address being generated by the first address generator;

determine a predicted address of a next row to be accessed in the associated memory bank, the predicted address being generated by the second address generator within a predetermined time period after the first address generator has generated the current address; and provide the predicted address to the bank controller before completion of an operation relative to the current row associated with the current address.

2. The memory unit of claim 1, wherein the operation relative to the current row associated with the current address is a read operation or a write operation.

3. The memory unit of claim 1, wherein the current row and the next row are in the same memory bank.

4. The memory unit of claim 3, wherein the same memory bank allows the next row to be accessed while the current row is being accessed.

5. The memory unit of claim 1, wherein the current row and the next row are in a different memory bank.

6. The memory unit of claim 1, further comprising a distributed processor, wherein the distributed processor comprises a plurality of processor subunits of a processing array that are spatially distributed among the one or more memory banks of the memory unit.

7. The memory unit of claim 1, wherein the bank controller is configured to access the current row and to activate the next row before a completion of the operation relative to the current row.

8. The memory unit of claim 1, wherein each of the one or more memory banks includes at least a first sub-bank and a second sub-bank, and wherein the bank controller associated with each of the one or more memory banks includes a first sub-bank controller associated with the first sub-bank and a second bank controller associated with the second sub-bank.

9. The memory unit of claim 1, wherein the predicted address is determined using a trained neural network.

10. The memory unit of claim 1, wherein the predicted address is determined based on a determined line access pattern.

11. The memory unit of claim 1, wherein the predetermined time period is adjustable.

12. The memory unit of claim 11, wherein the predetermined time period is adjusted based on a value of at least one operational parameter associated with the memory unit.

13. The memory unit of claim 12, wherein the at least one operational parameter includes a temperature of the memory unit.

14. The memory unit of claim 1, wherein at least one of the plurality of address generators is configured to generate a confidence level associated with the predicted address and to cause the bank controller to forego accessing the next row at the predicted address if the confidence level falls below a predetermined threshold.

15. The memory unit of claim 1, wherein the predicted address is generated by a chain of flip flops sampling the current address generated in a delay.

16. The memory unit of claim 15, wherein the delay is configurable via a mux that selects between flip flops storing the sampled address.

17. The memory unit of claim 1, wherein the bank controller is configured to ignore predicted addresses received from at least one of the plurality of address generators during a predetermined period following a reset of the memory unit.

18. The memory unit of claim 1, wherein at least one of the plurality of address generators is configured to forego providing the predicted address to the bank controller after detecting a random pattern in row accesses relative to the associated memory bank.

* * * * *